US012252275B2

(12) United States Patent
Gorokhovsky

(10) Patent No.: US 12,252,275 B2
(45) Date of Patent: Mar. 18, 2025

(54) REACTORS FOR PLASMA ASSISTED TREATMENT OF POWDER

(71) Applicant: Nano-Product Engineering, LLC, Lafayette, CO (US)

(72) Inventor: Vladimir Gorokhovsky, Lafayette, CO (US)

(73) Assignee: Nano-Product Engineering, LLC, Lafayette, CO (US)

( * ) Notice: Subject to any disclaimer, the term of this patent is extended or adjusted under 35 U.S.C. 154(b) by 0 days.

(21) Appl. No.: 18/489,551

(22) Filed: Oct. 18, 2023

(65) Prior Publication Data

US 2024/0043142 A1 Feb. 8, 2024

Related U.S. Application Data

(62) Division of application No. 16/373,378, filed on Apr. 2, 2019, now Pat. No. 11,834,204.

(60) Provisional application No. 62/726,794, filed on Sep. 4, 2018, provisional application No. 62/653,505, filed on Apr. 5, 2018.

(51) Int. Cl.

| | |
|---|---|
| ***B64G 1/40*** | (2006.01) |
| ***F03H 1/00*** | (2006.01) |
| ***H05H 1/50*** | (2006.01) |

(52) U.S. Cl.

CPC ............ *B64G 1/405* (2013.01); *B64G 1/413* (2023.08); *F03H 1/0037* (2013.01); *F03H 1/0043* (2013.01); *H05H 1/50* (2013.01)

(58) Field of Classification Search

None

See application file for complete search history.

(56) References Cited

U.S. PATENT DOCUMENTS

| | | | |
|---|---|---|---|
| 636,270 | A | 11/1899 | Loos |
| 3,243,954 | A | 4/1966 | Cann |
| 4,038,171 | A | 7/1977 | Moss et al. |
| 4,111,783 | A | 9/1978 | Bindell et al. |
| 4,140,943 | A | 2/1979 | Ehlers |
| 4,434,038 | A | 2/1984 | Morrison |
| 4,588,490 | A | 5/1986 | Cuomo et al. |
| 4,730,334 | A | 3/1988 | Collins et al. |
| 5,026,466 | A | 6/1991 | Wesemeyer et al. |
| 5,067,051 | A | 11/1991 | Ladyjensky |
| 5,087,434 | A | 2/1992 | Frenklach et al. |

(Continued)

FOREIGN PATENT DOCUMENTS

| | | |
|---|---|---|
| EP | 2602354 A1 | 6/2013 |
| RU | 2324255 C2 | 5/2008 |

(Continued)

OTHER PUBLICATIONS

"Dual Arc Evaporator with Plasma Separation: Arc Evaporation Basics. Ion Coating Deposition from Vacuum Arc Discharge Metal Plasma," Brochure, VECOR, Irvine CA, 6 pages.

(Continued)

*Primary Examiner* — Ehud Gartenberg
*Assistant Examiner* — William L Breazeal
(74) *Attorney, Agent, or Firm* — Cozen O'Connor

(57) ABSTRACT

An apparatus generates energetic particles and generates a plasma of a vaporized solid material and gaseous precursors for the application of coatings to surfaces of a substrate by way of condensation of plasma and for electric propulsion applications.

27 Claims, 177 Drawing Sheets

(56) References Cited

U.S. PATENT DOCUMENTS

| | | | | |
|---|---|---|---|---|
| 5,111,656 | A | 5/1992 | Simon et al. | |
| 5,262,032 | A | 11/1993 | Hartig et al. | |
| 5,294,322 | A | 3/1994 | Vetter et al. | |
| 5,317,235 | A | 5/1994 | Treglio | |
| 5,435,900 | A | 7/1995 | Gorokhovsky | |
| 5,458,754 | A | 10/1995 | Sathrum et al. | |
| 5,468,363 | A | 11/1995 | Falabella | |
| 5,478,608 | A | 12/1995 | Gorokhovsky | |
| 5,480,527 | A | 1/1996 | Welty | |
| 5,486,096 | A | 1/1996 | Hertel et al. | |
| 5,503,725 | A | 4/1996 | Sablev et al. | |
| 5,554,255 | A | 9/1996 | Karner et al. | |
| 5,578,831 | A | 11/1996 | Hershcovitch | |
| 5,580,429 | A | 12/1996 | Chan et al. | |
| 5,587,207 | A * | 12/1996 | Gorokhovsky | H01J 37/32055 118/721 |
| 5,616,373 | A | 4/1997 | Karner et al. | |
| 5,733,418 | A | 3/1998 | Hershcovitch et al. | |
| 5,753,045 | A | 5/1998 | Karner et al. | |
| 5,876,572 | A | 3/1999 | Rickerby et al. | |
| 5,902,462 | A | 5/1999 | Krauss | |
| 5,902,649 | A | 5/1999 | Karner et al. | |
| 5,944,901 | A | 8/1999 | Landes et al. | |
| 6,042,900 | A | 3/2000 | Rakhimov et al. | |
| 6,075,321 | A | 6/2000 | Hruby | |
| 6,153,067 | A | 11/2000 | Maishev et al. | |
| 6,296,742 | B1 | 10/2001 | Kouznetsov | |
| 6,300,720 | B1 | 10/2001 | Birx | |
| 6,477,216 | B2 | 11/2002 | Koloc | |
| 6,495,002 | B1 | 12/2002 | Klepper et al. | |
| 6,635,156 | B1 | 10/2003 | Dodonov et al. | |
| 6,663,755 | B2 | 12/2003 | Gorokhovsky | |
| 6,692,617 | B1 | 2/2004 | Fu et al. | |
| 6,703,081 | B2 | 3/2004 | Karner et al. | |
| 6,756,596 | B2 | 6/2004 | Sathrum | |
| 6,767,436 | B2 | 7/2004 | Wei | |
| 6,922,455 | B2 | 7/2005 | Jurczyk et al. | |
| 6,923,891 | B2 | 8/2005 | Cheah et al. | |
| 7,014,738 | B2 | 3/2006 | Shi et al. | |
| 7,033,682 | B1 | 4/2006 | Rai et al. | |
| 7,052,736 | B2 | 5/2006 | Wei et al. | |
| 7,147,759 | B2 | 12/2006 | Chistyakov | |
| 7,229,675 | B1 | 6/2007 | Paderov et al. | |
| 7,252,745 | B2 | 8/2007 | Gorokhovsky | |
| 7,300,559 | B2 | 11/2007 | Gorokhovsky | |
| 7,327,089 | B2 | 2/2008 | Madocks | |
| 7,351,480 | B2 | 4/2008 | Wei et al. | |
| 7,381,311 | B2 | 6/2008 | Aksenov et al. | |
| 7,452,513 | B2 | 11/2008 | Matveev | |
| 7,459,704 | B2 | 12/2008 | Olson et al. | |
| 7,498,587 | B2 | 3/2009 | Welty | |
| 7,541,069 | B2 | 6/2009 | Tudhope et al. | |
| 7,581,933 | B2 | 9/2009 | Bruce et al. | |
| 7,622,693 | B2 | 11/2009 | Foret | |
| 7,955,567 | B2 | 6/2011 | Matveev | |
| 8,034,459 | B2 | 10/2011 | Wei et al. | |
| 8,105,660 | B2 | 1/2012 | Tudhope et al. | |
| 8,110,155 | B2 | 2/2012 | Fridman et al. | |
| 8,118,561 | B2 | 2/2012 | Bruce et al. | |
| 8,147,765 | B2 | 4/2012 | Muradov et al. | |
| 8,157,976 | B2 | 4/2012 | Druz et al. | |
| 8,282,794 | B2 | 10/2012 | Gorokhovsky | |
| 8,500,975 | B2 | 8/2013 | Le et al. | |
| 8,541,069 | B2 | 9/2013 | Greenberg et al. | |
| 8,715,789 | B2 | 5/2014 | Upadhyaya et al. | |
| 8,796,581 | B2 | 8/2014 | Foret | |
| 8,895,115 | B2 | 11/2014 | Gorokhovsky | |
| 9,257,263 | B2 | 2/2016 | Gorokhovsky | |
| 9,412,569 | B2 | 8/2016 | Gorokhovsky et al. | |
| 9,552,952 | B2 | 1/2017 | Rand et al. | |
| 9,761,424 | B1 | 9/2017 | Gorokhovsky | |
| 9,793,098 | B2 | 10/2017 | Gorokhovsky et al. | |
| 10,056,237 | B2 | 8/2018 | Gorokhovsky et al. | |
| 11,834,204 | B1 * | 12/2023 | Gorokhovsky | F03H 1/0043 |
| 2003/0047444 | A1 | 3/2003 | Boxman et al. | |
| 2003/0089601 | A1 | 5/2003 | Ding et al. | |
| 2004/0055884 | A1 | 3/2004 | Fujii et al. | |
| 2004/0264044 | A1 | 12/2004 | Konishi et al. | |
| 2007/0000770 | A1 | 1/2007 | Yamamoto | |
| 2007/0017804 | A1 | 1/2007 | Myrtveit et al. | |
| 2007/0087185 | A1 | 4/2007 | Wei et al. | |
| 2008/0035470 | A1 | 2/2008 | Tietema et al. | |
| 2008/0298910 | A1 | 12/2008 | Weber et al. | |
| 2009/0065350 | A1 | 3/2009 | Anders | |
| 2009/0078565 | A1 | 3/2009 | Rodmar et al. | |
| 2009/0214787 | A1 | 8/2009 | Wei et al. | |
| 2010/0264016 | A1 | 10/2010 | Anders et al. | |
| 2011/0100800 | A1 | 5/2011 | Gorokhovsky | |
| 2011/0226617 | A1 | 9/2011 | Hofmann et al. | |
| 2012/0008728 | A1 | 1/2012 | Fleming | |
| 2012/0070963 | A1 | 3/2012 | Martin et al. | |
| 2012/0114871 | A1 | 5/2012 | Gorokhovsky | |
| 2012/0199070 | A1 | 8/2012 | Brondum | |
| 2012/0231177 | A1 | 9/2012 | Wei et al. | |
| 2014/0076715 | A1 | 3/2014 | Gorokhovsky et al. | |
| 2014/0076716 | A1 | 3/2014 | Gorokhovsky et al. | |
| 2014/0076718 | A1 | 3/2014 | Gorokhovsky et al. | |

FOREIGN PATENT DOCUMENTS

| | | |
|---|---|---|
| SU | 289458 | 6/1968 |
| SU | 814251 | 11/1980 |
| SU | 820635 | 12/1980 |
| SU | 1297337 | 11/1985 |
| SU | 1240325 | 2/1986 |
| SU | 1324178 | 3/1987 |
| SU | 1356947 | 8/1987 |
| SU | 1396950 | 1/1988 |
| SU | 1398760 | 1/1988 |
| SU | 1400457 | 2/1988 |
| SU | 1519519 | 7/1989 |
| WO | 2007065915 A1 | 6/2007 |
| WO | 2013038335 A2 | 3/2013 |

OTHER PUBLICATIONS

Adamovich, "Plasma Dynamics and Flow Control Applications," Encyclopedia of Aerospace Engineering, John Wiley & Sons, Ltd., 2010, 10 pages.

Aksenov et al., "Two-Cathode Filtered Vacuum-Arc Plasma Source," IEEE Transactions on Plasma Science, vol. 37(8), Aug. 2009, 6 pages.

Andersson et al., "Gasless Sputtering: Opportunities for Ultraclean Metallization, Coatings in Space, and Propulsion," Applied Physics Letters 92, 221503, 2008, 3 pages.

Bayer et al., "Plasma Enhanced Chemical Vapor Deposition on Powders in a Low Temperature Plasma Fluidized Bed," Chem. Eng. Technol., vol. 21, 1998, 4 pages.

Bhat et al., "Advantages of Filtered Cathodic Arc Deposition, Hard Coatings for Tools, Dies, and Molds," Business and Technical News from Balzers Materials, Issue 7 (1999).

Bhat et al., "Development of a Coating for Wear and Cracking Prevention in Die-Casting Dies by the Filtered Cathodic Arc Process," North American Die Casting Association, Ohio State University, Nov. 1999, 9 pages.

Bhattacharya, "Advanced Thermal Barrier Coatings," Final Report for May 3, 1999-Feb. 3, 2000, Universal Energy Systems, Inc., Apr. 2000, 37 pages.

Chaudhury et al., "Three-Dimensional Computation of Reduction in Radar Cross Section Using Plasma Shielding," IEEE Transactions on Plasma Science, vol. 33(6), Dec. 2005, 8 pages.

Degout et al., "High Current Density Triode Magnetron Sputtering," Surface and Coating Technology (57), 1995, 6 pages.

Dorf et al., "Experimental studies of anode sheath phenomena in a Hall thruster discharge," Journal of Applied Physics, vol. 97, 2005, 103309, 10 pages.

Eensinger, "Processing of powder surfaces by ion beam techniques," Nuclear Instruments and Methods in Physics Research B, vol. 148, 1999, 8 pages.

(56) References Cited

OTHER PUBLICATIONS

Feuerstein et al., "T-N multilayer systems for compressor airfoil sand erosion protection," Surface & Coatings Technology, vol. 204, 2009, 5 pages.
Goebel et al., "High Current Lanthanum Hexaboride Hollow Cathodes for High Power Hall Thrusters," The 32nd International Electric Propulsion Conference, Wiesbaden Germany, Sep. 11-15, 2011, 16 pages.
Gorokhovsky et al., "Deposition and characterization of hybrid filtered arc/magnetron multilayer nanocomposite cermet coatings for advanced tribological applications," Wear, vol. 265, 2008, 16 pages.
Gorokhovsky et al., "Deposition of various metal, ceramic, and cermet coatings by an industrial-scale large area filtered arc deposition process," J. Vac. Sci. Technol. A 27(4), Jul./Aug. 2009, 16 pages.
Gorokhovsky et al., "Distributed Arc Sources," Handbook of Vacuum Arc Science and Technology, ed. by R. Boxman, P.Martin and D.Sanders, Noyes Publications, 1995, 22 pages.
Gorokhovsky et al., "Evaluation of SOFC Interconnects Made of Ferritic Steels with Nano-Structured Oxi-Ceramic Protective Coatings Deposited by the LAFAD Process," Journal of The Electrochemical Society, vol. 158(5), B526- B535, 2011, 10 pages.
Gorokhovsky et al., "Ion treatment by low pressure arc plasma immersion surface engineering processes," Surface & Coatings Technology, vol. 215, 2013, 10 pages.
Gorokhovsky et al., "LAFAD Hard Ceramic and Cermet Coatings for Erosion Protection of Turbomachinery Components," Proceedings of ASME Turbo Expo 2009: Power for Land, Sea and Air GT2009 Jun. 8-12, 2009, Orlando, Florida, USA Paper #GT2009-59391, 11 pages.
Gorokhovsky et al., "Principles and Applications of Vacuum Arc Plasma-assisted Surface Engineering Technologies," Int. Workshop on Surface Engineering and Coatings, Allied Publishers Ltd, India, 1998, 23 pages.
Gorokhovsky et al., "Processes in a plasma arc installation for vacuum coating depositions, Part I: Plasma Generation," Surface and Coatings Technology, vol. 61, Dec. 1993, 7 pages.
Gorokhovsky, "Characterization of Cascade Arc Assisted CVD Diamond Coating Technology Part I. Plasma processing parameters," Surface and Coatings Technology, vol. 194, 2005, 19 pages.
Gorokhovsky, "LAFAD—Assisted Plasma Surface Engineering Processes for Wear and Corrosion Protection: A Review," In Advanced Ceramic Coatings and Interfaces V: Ceramic Engineering and Science Proceedings, vol. 31(3), 18 pages.
Has et al., "The System for Depositing Hard Diamond-Like Films onto Complex-Shaped Machine Elements in an R.F. Arc Plasma," Surface and Coatings Technology, vol. 47(1) , 1991, 7 pages.
Jung et al., "Surface modification of HDPE powders by oxygen plasma in a circulating fluidized bed reactor," Polymer Bulletin, vol. 47, 2001, 7 pages.
Karner et al., "High current d.c. arc (HCDCA) technique for diamond deposition," Diamond and Related Materials, vol. 5, 1996, 4 pages.
Keidar, "Anodic plasma in Hall thrusters," Journal of Applied Physics 103, 053309, 2008, 5 pages.
Kojima et al., "Development of a Plasma Jetting Fluidized Bed Reactor," Journal de Physique IV Colloque, vol. 1, Sep. 1991, 10 pages.
Kuranov et al., "Scramjet With Mhd Control Under "AJAX" Concept. Requirements for MHD Systems." 32nd AIAA Plasmadynamics and Lasers Conference and 4th Weakly Ionized Gases Workshop, Jun. 2001, Anahem, CA, 12 pages.
Li et al., "A Description of Metal-Vapour Production in a Hollow-Cylindrical Magnetron Sputtering Discharge," J. Phys. D: Appl. Phys. 32, 1999, 6 pages.
Liu et al., "A direct current, plasma fluidized bed reactor: its characteristics and application in diamond synthesis," Powder Technology, vol. 88, 1996, 6 pages.
Miley et al., "Inertial Electrostatic Confinement (IEC) Fusion: Fundamentals and Applications," Springer, 2014, 415 pages.
Non Final Office Action for U.S. Appl. No. 16/373,378, mailed Feb. 9, 2023, 14 pages.
Novikov et al., "Superhard i-C coatings used in complex processes of surface strengthening of tools and machine parts," Surface and Coatings Technology, vol. 47, 1991, 22 pages.
Rubin et al., "Magnetic filter type plasma source for ground-based simulation of low earth orbit environment," Plasma Sources Sci. Technol., vol. 18, 2009, 025015, 10 pages.
Sanders et al., "Review of cathodic arc deposition technology at the start of the new millennium," Surface & Coatings Technology 133-134, 2000, 24 pages.
Shin et al., "Deposition of diamond coatings on particles in a microwave plasma-enhanced fluidized bed reactor," Material letters, vol. 19, 1994, 4 pages.
Tisone et al., "Low-Voltage Triode Sputtering With A Confined Plasma: Part 1—Geometric Aspects of Deposition," J. Vac. Sci. Technol., vol. 11, No. 2, Mar./Apr. 1974, pp. 519-527.
Zimmer, "Vacuum arc deposition by using a Venetian blind particle filter," Surface & Coatings Technology, vol. 200, 2005, 4 pages.
Zimmermann et al., "LARGE—A Plasma Torch for Surface Chemistry Applications and CVD Processes—A Status Report," Journal of Thermal Spray Technology, vol. 17(5-6), Dec. 2008, 5 pages.

* cited by examiner

Vertical plane of symmetry of bi-directional magnetic cusp
Horizontal plane of symmetry of bi-directional magnetic cusp
Cathode target (12)
Cathode target (12)
80b
80b
90b
No plasma losses across this (right) concave boundary
90
90
44
80a
80a
90a
No plasma losses across this (left) concave boundary
46
21
To Substrates

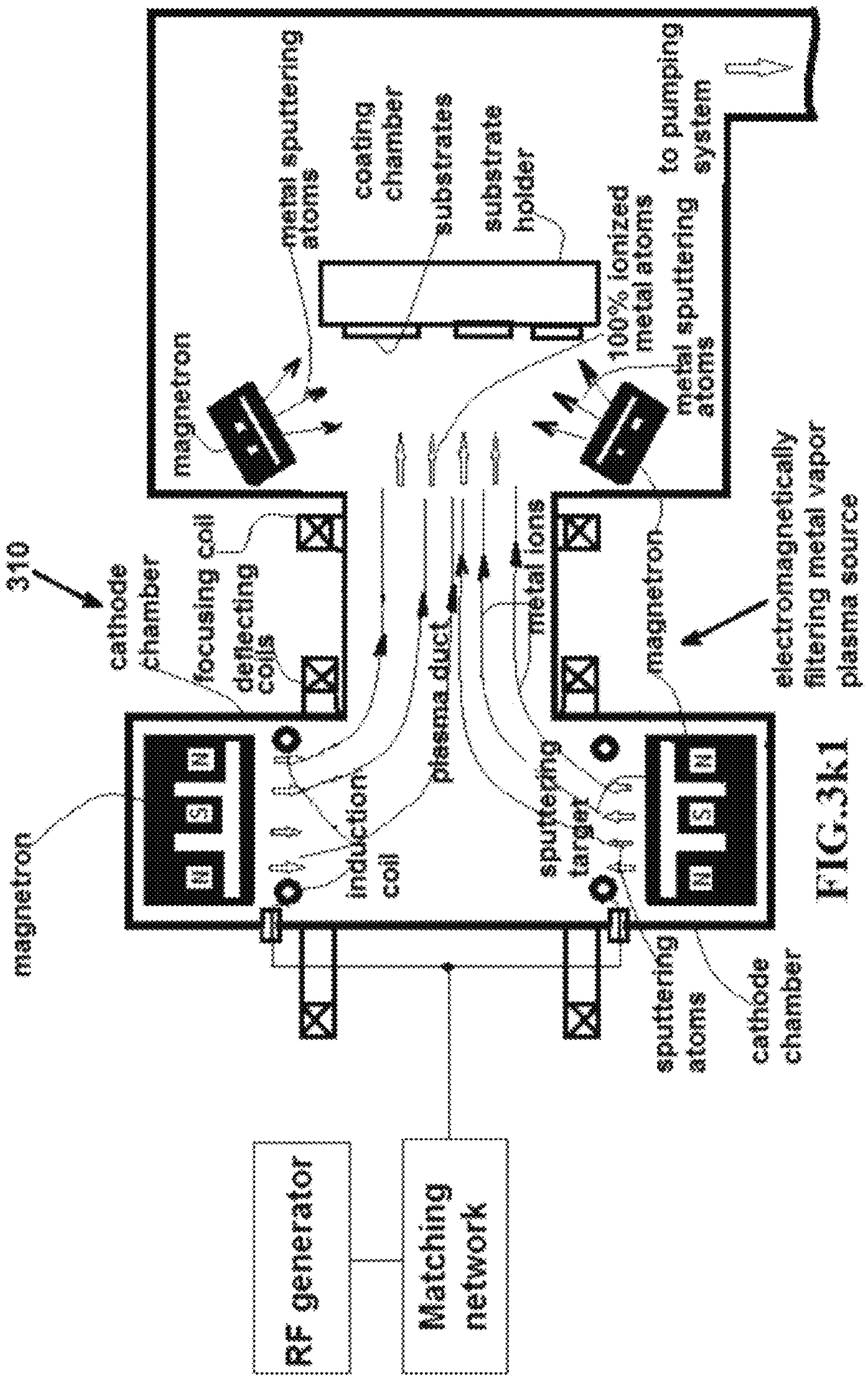
FIG.3k1

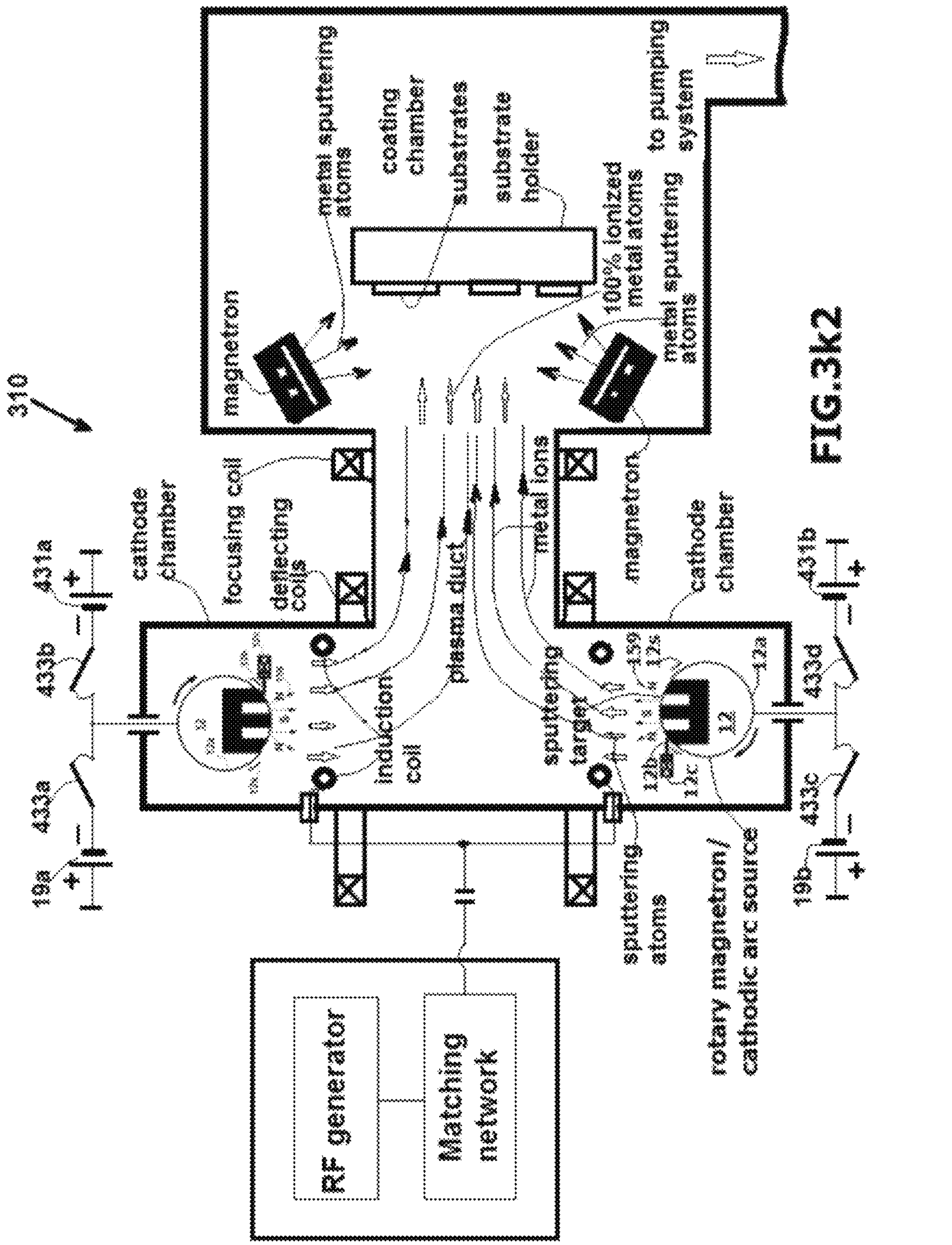
FIG.3k2

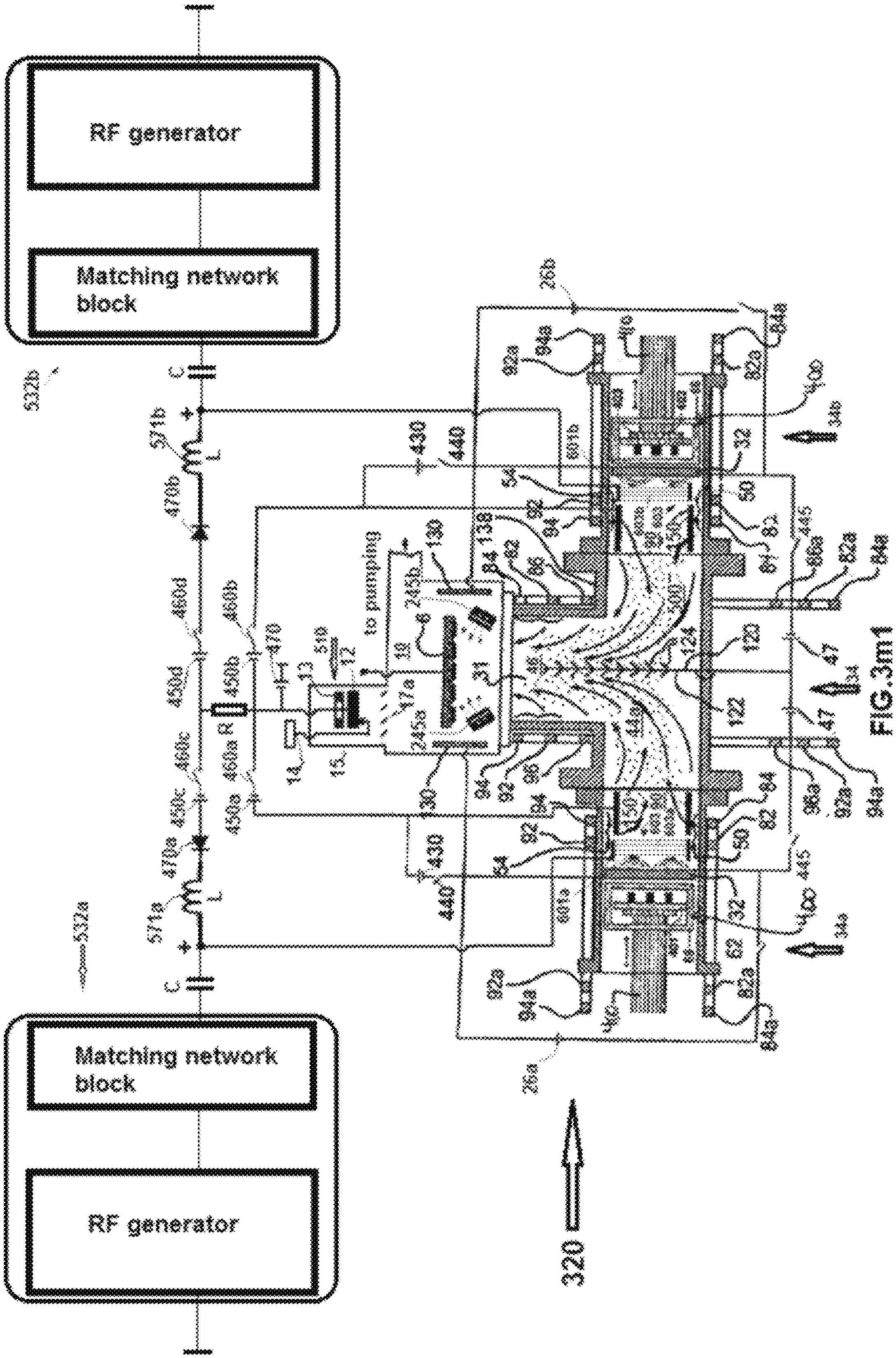
FIG.3m1

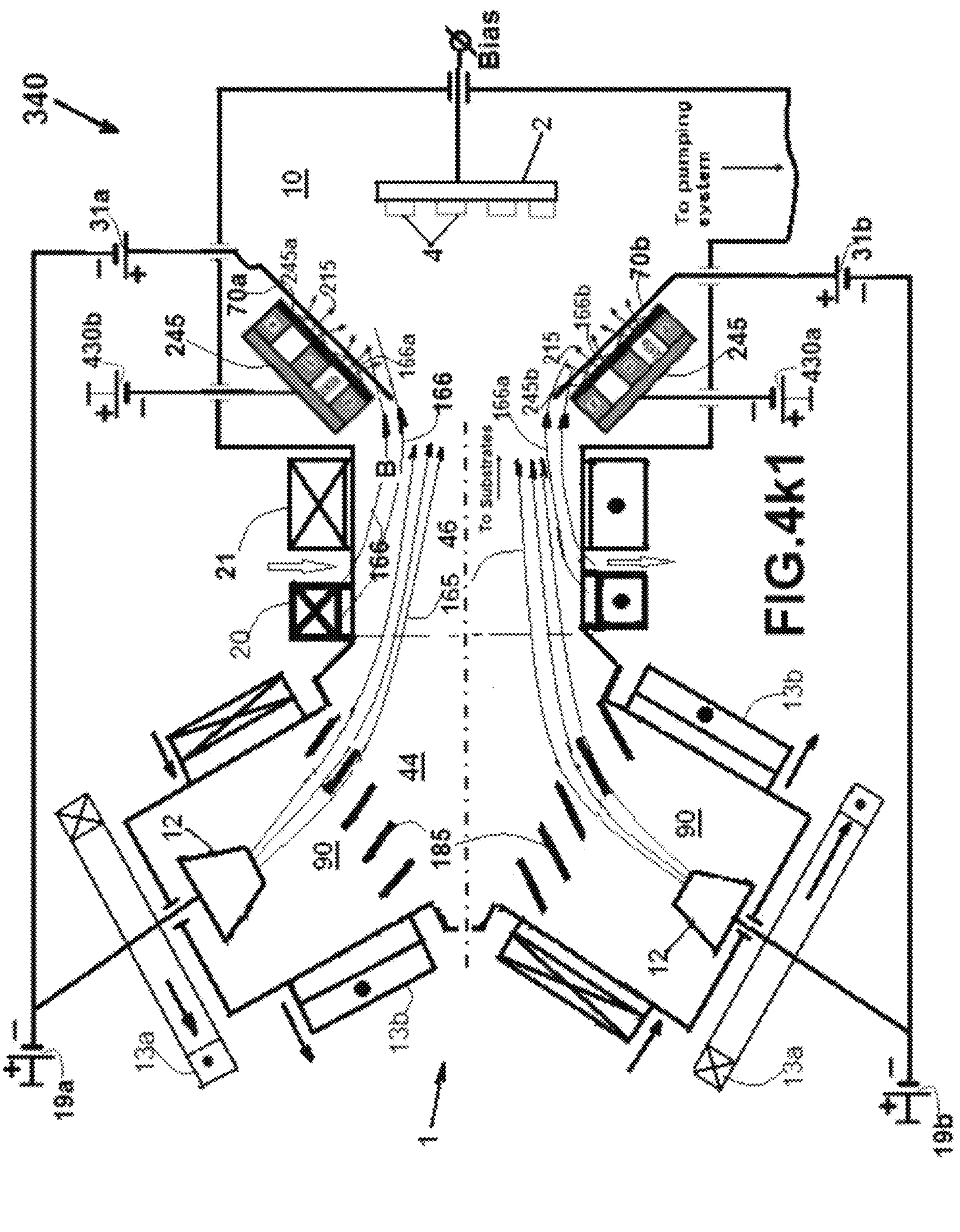
FIG.4K1

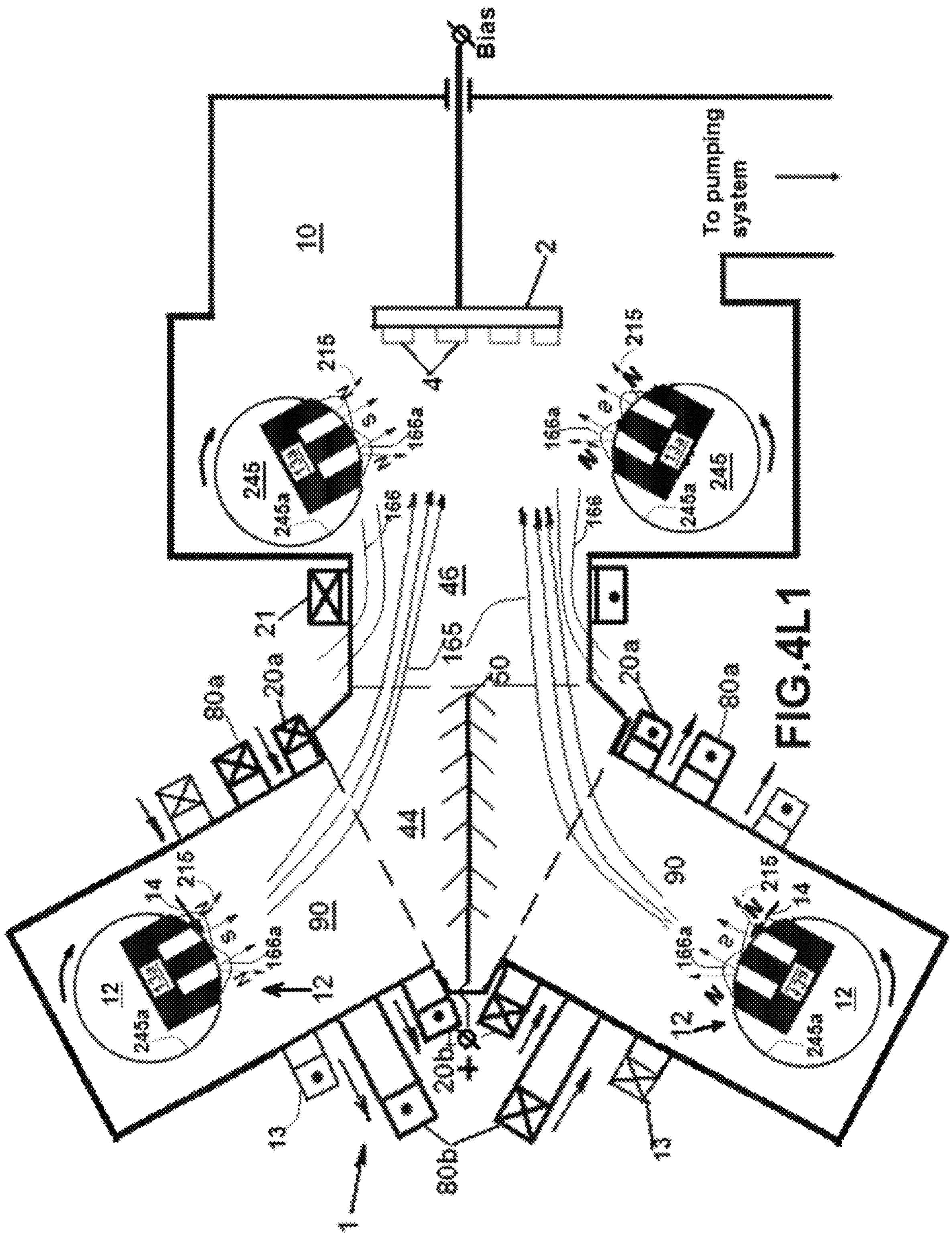
FIG.4L1

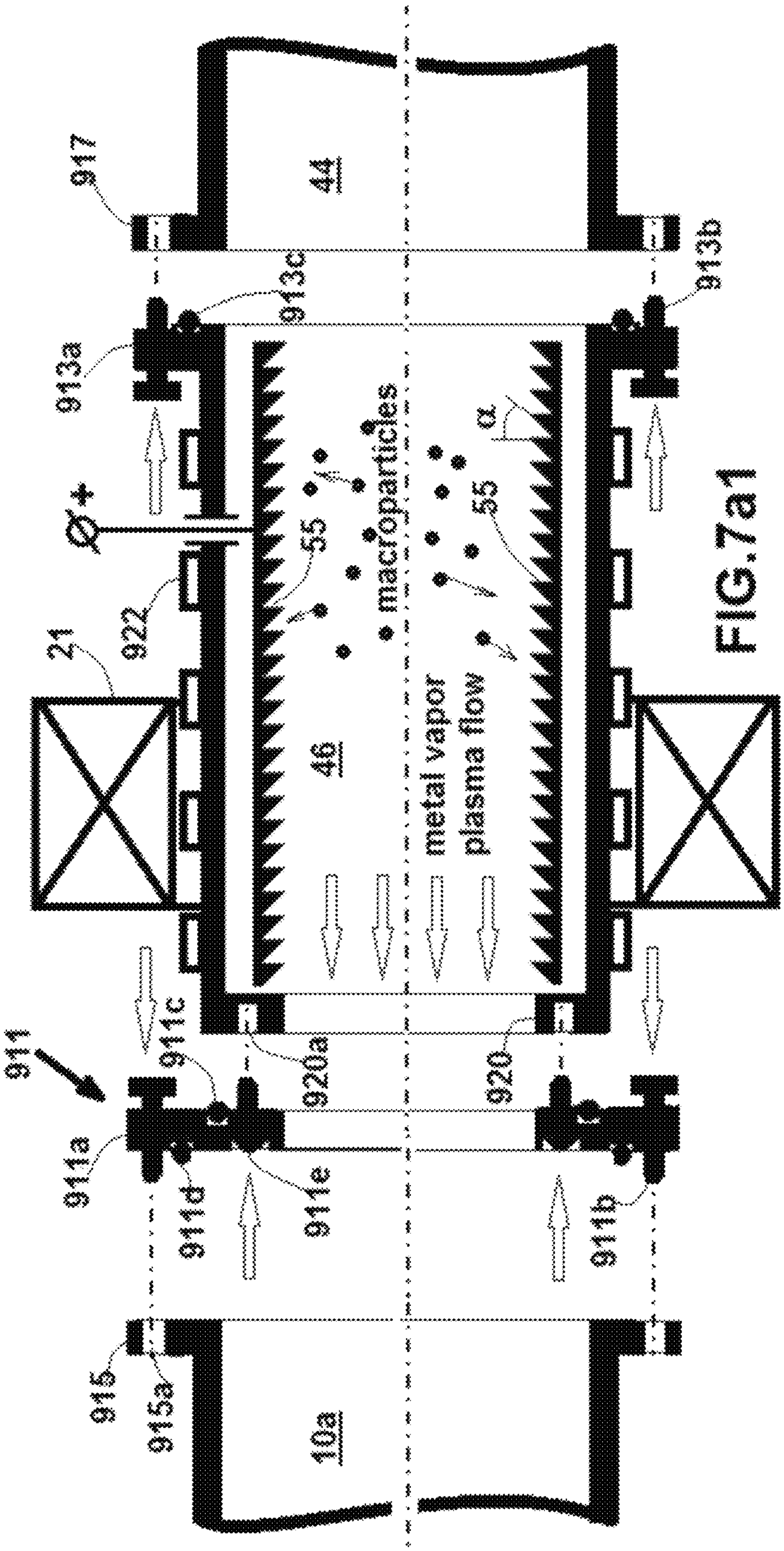
FIG.7a1

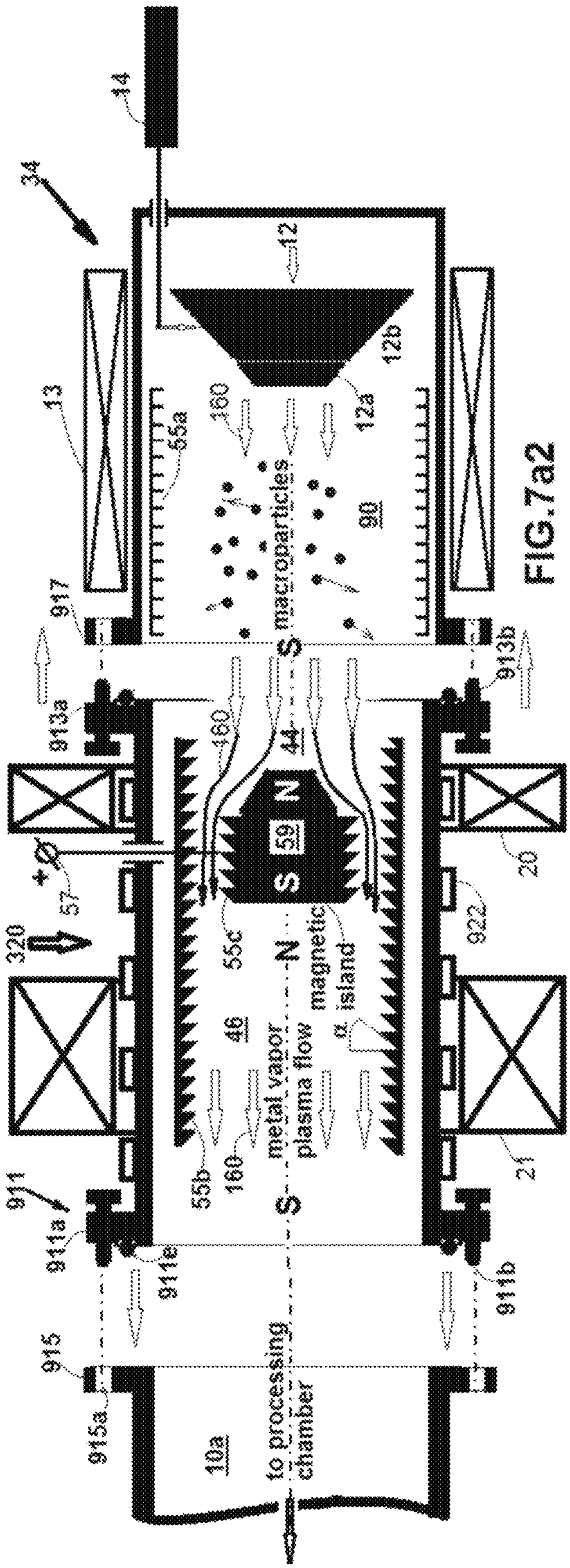
FIG.7a2

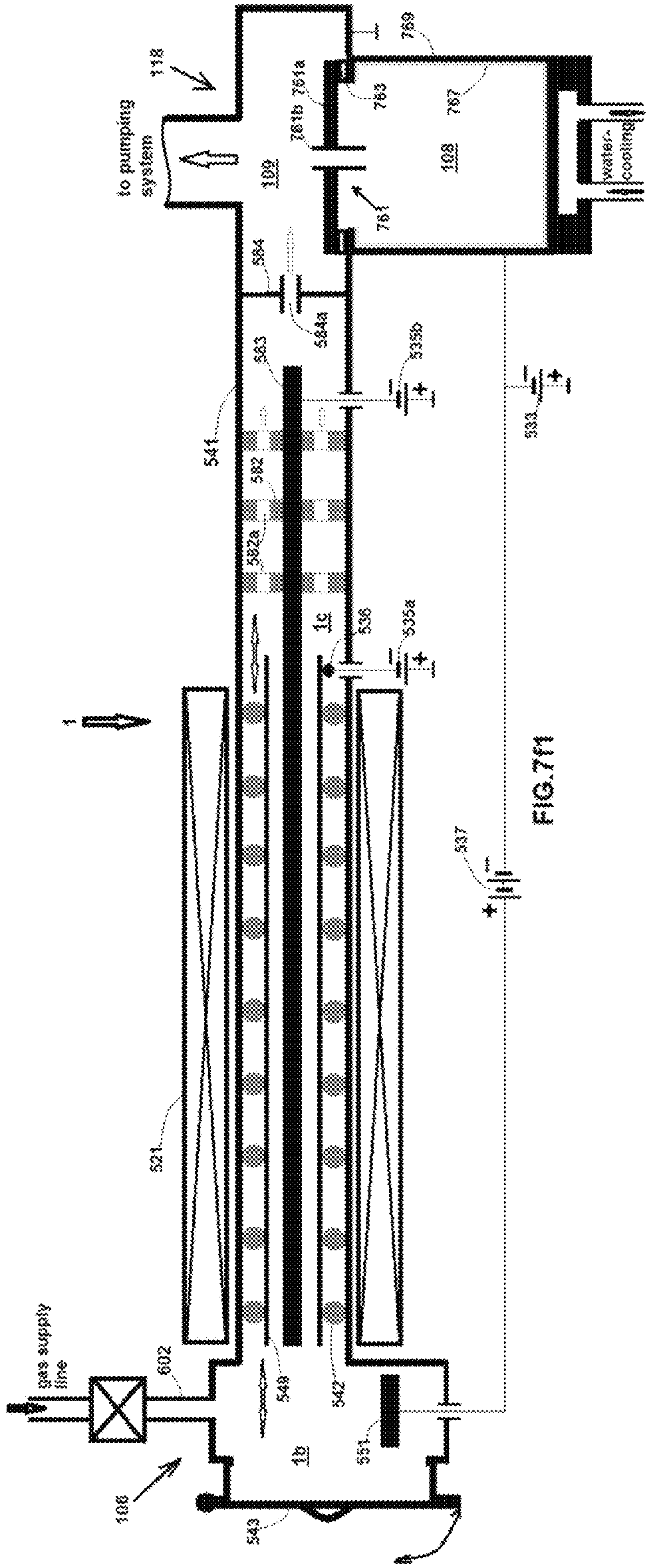
FIG.7I1

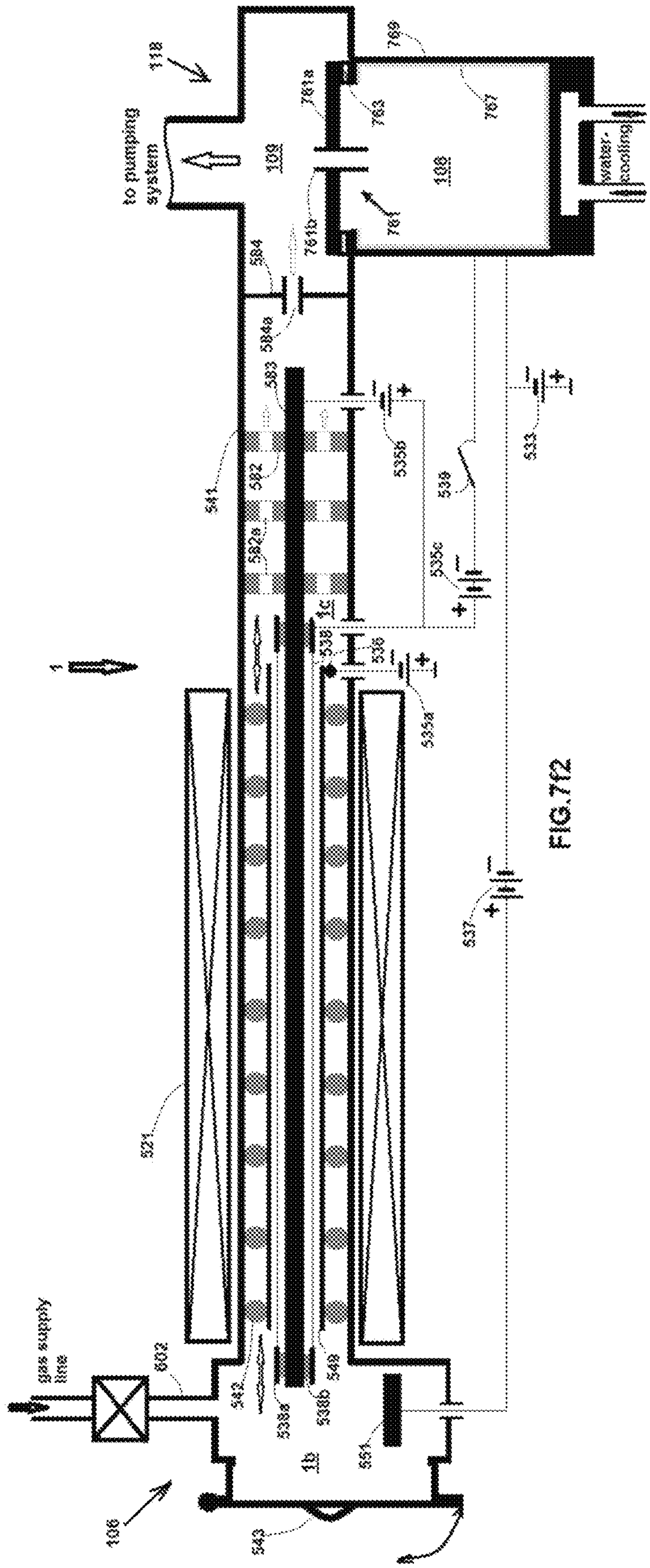
FIG.7f2

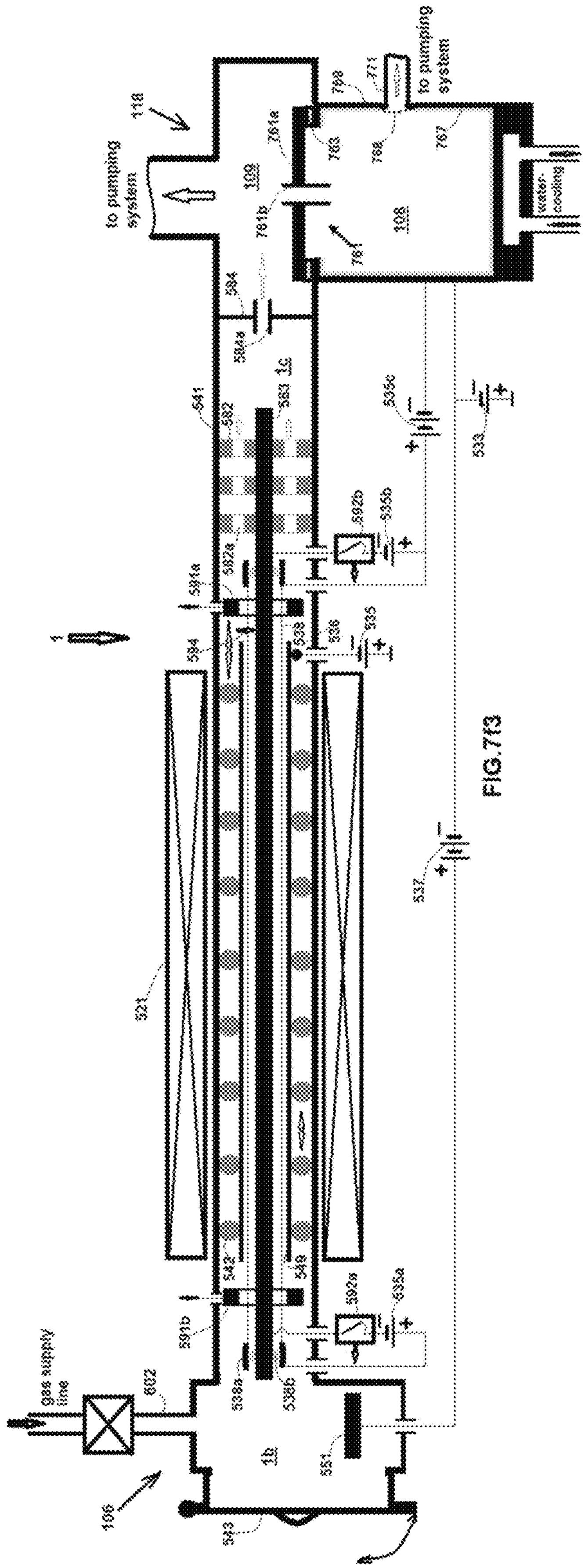
FIG.7I3

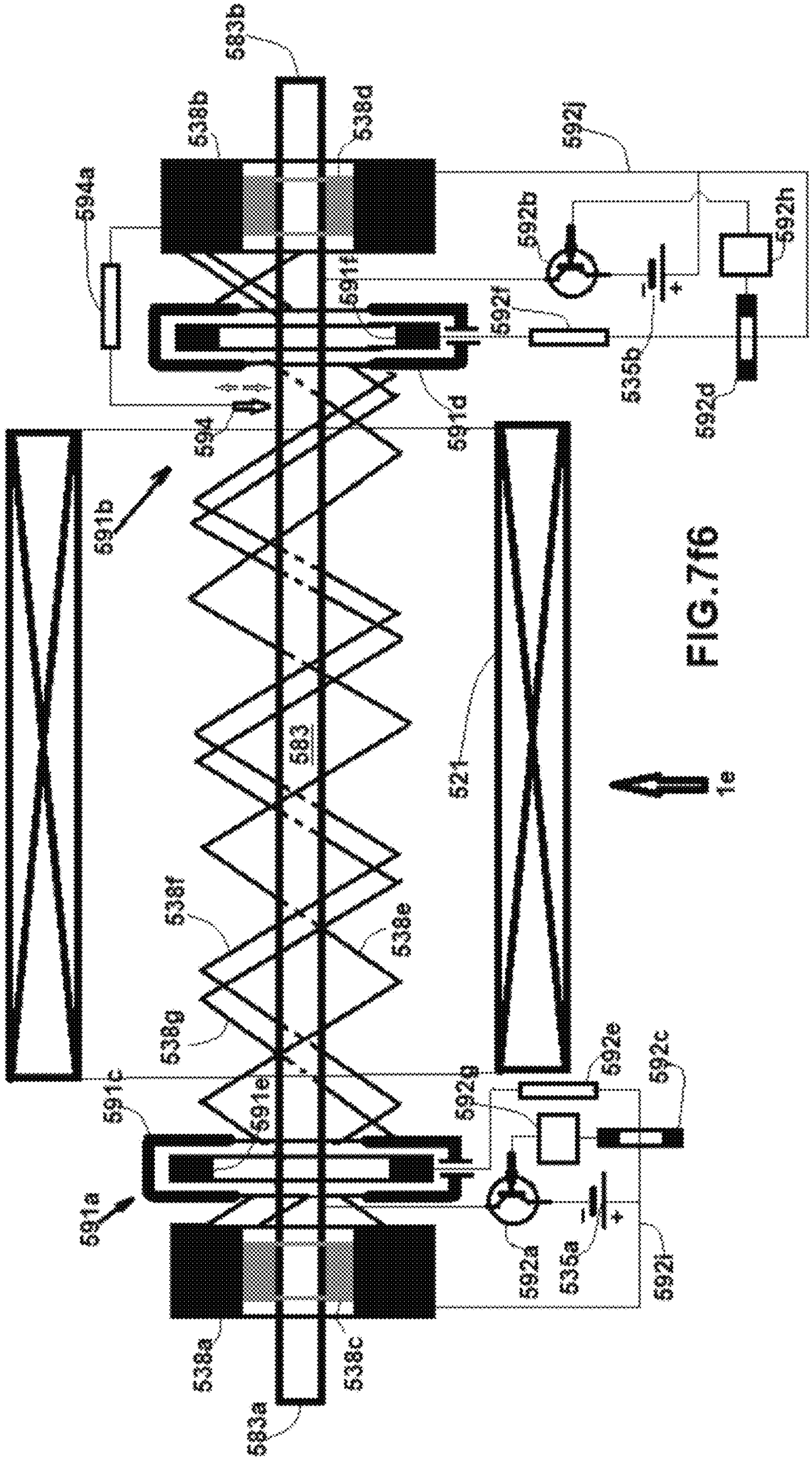
FIG.7f6

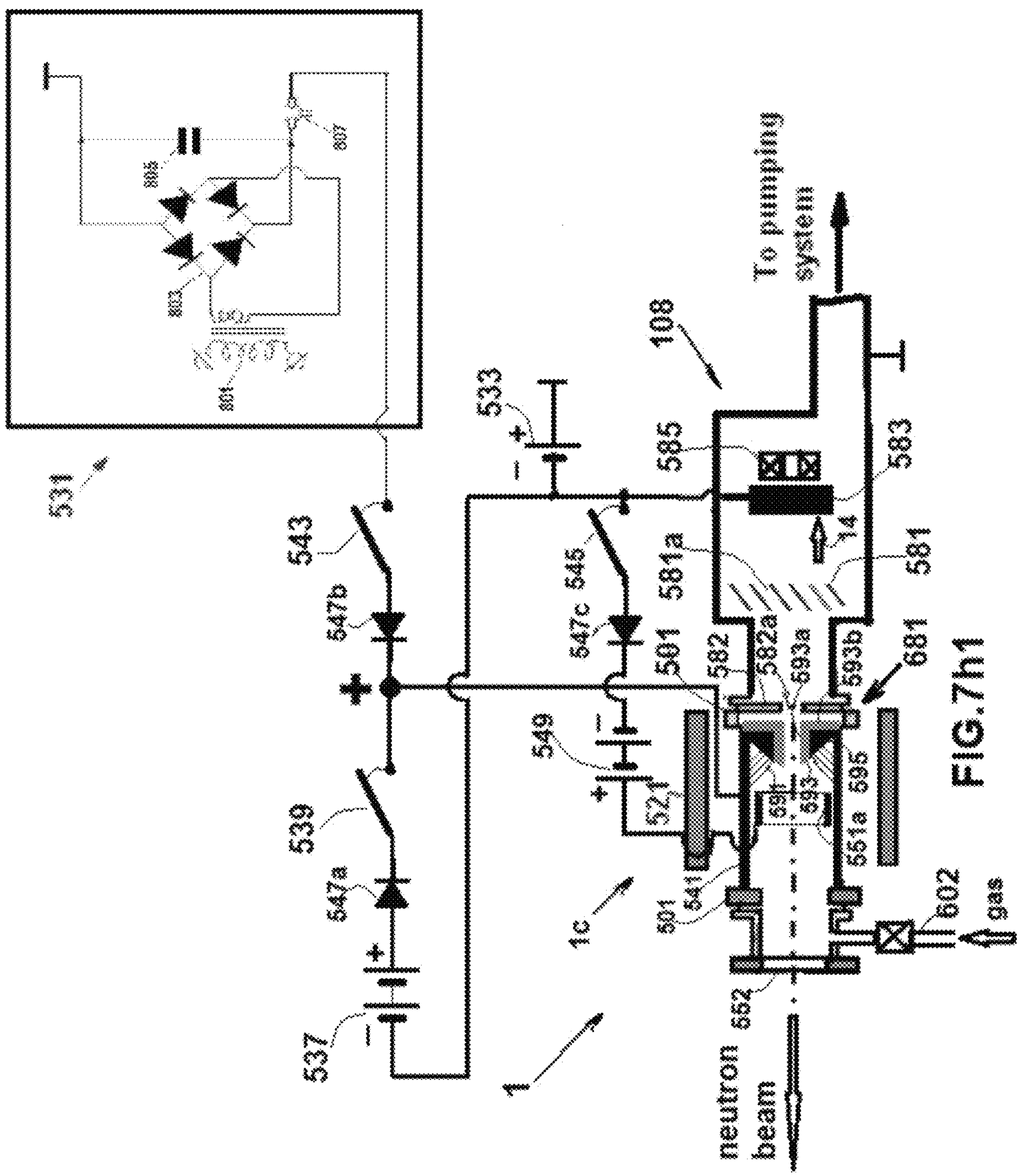
FIG.7h1

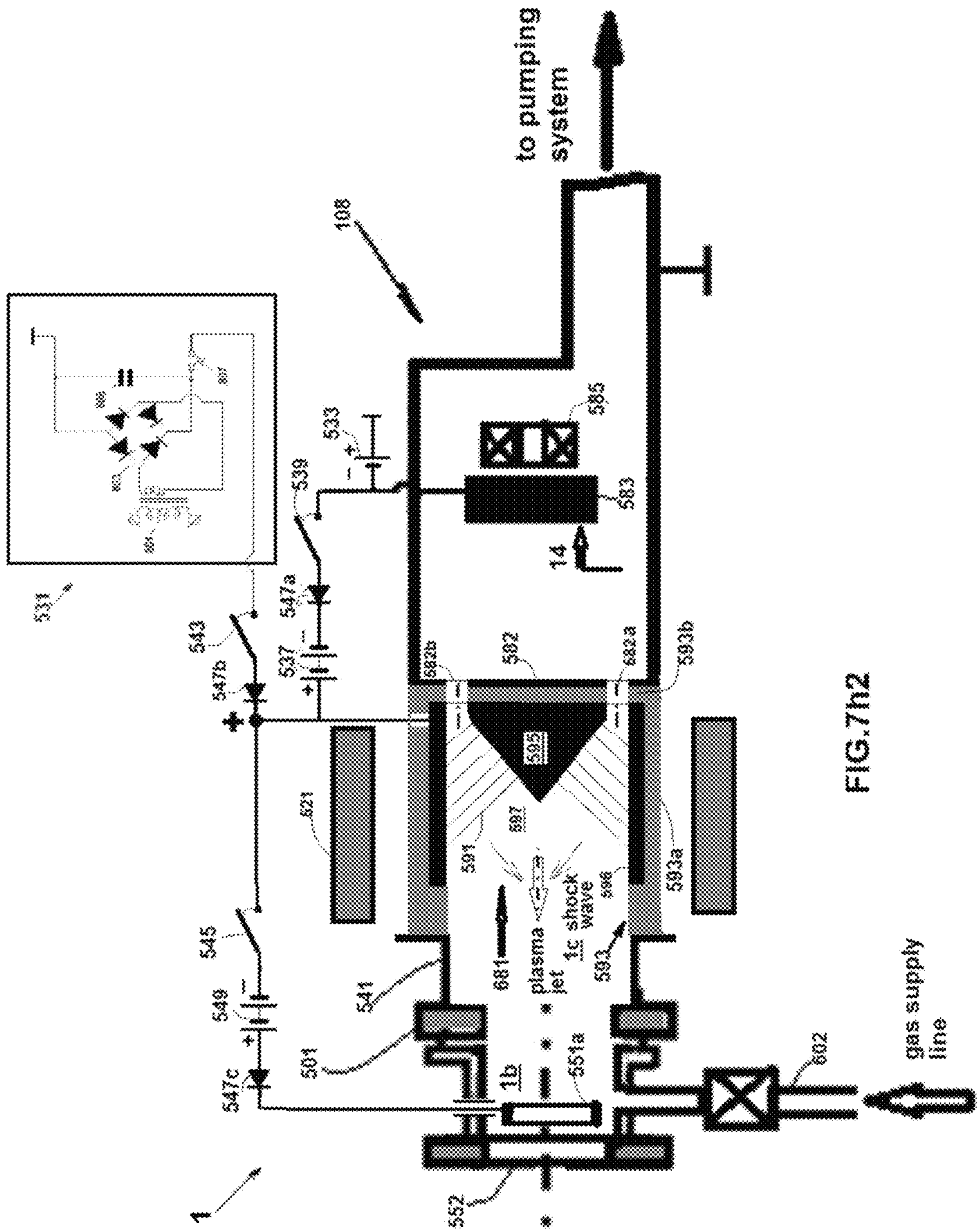
FIG.7h2

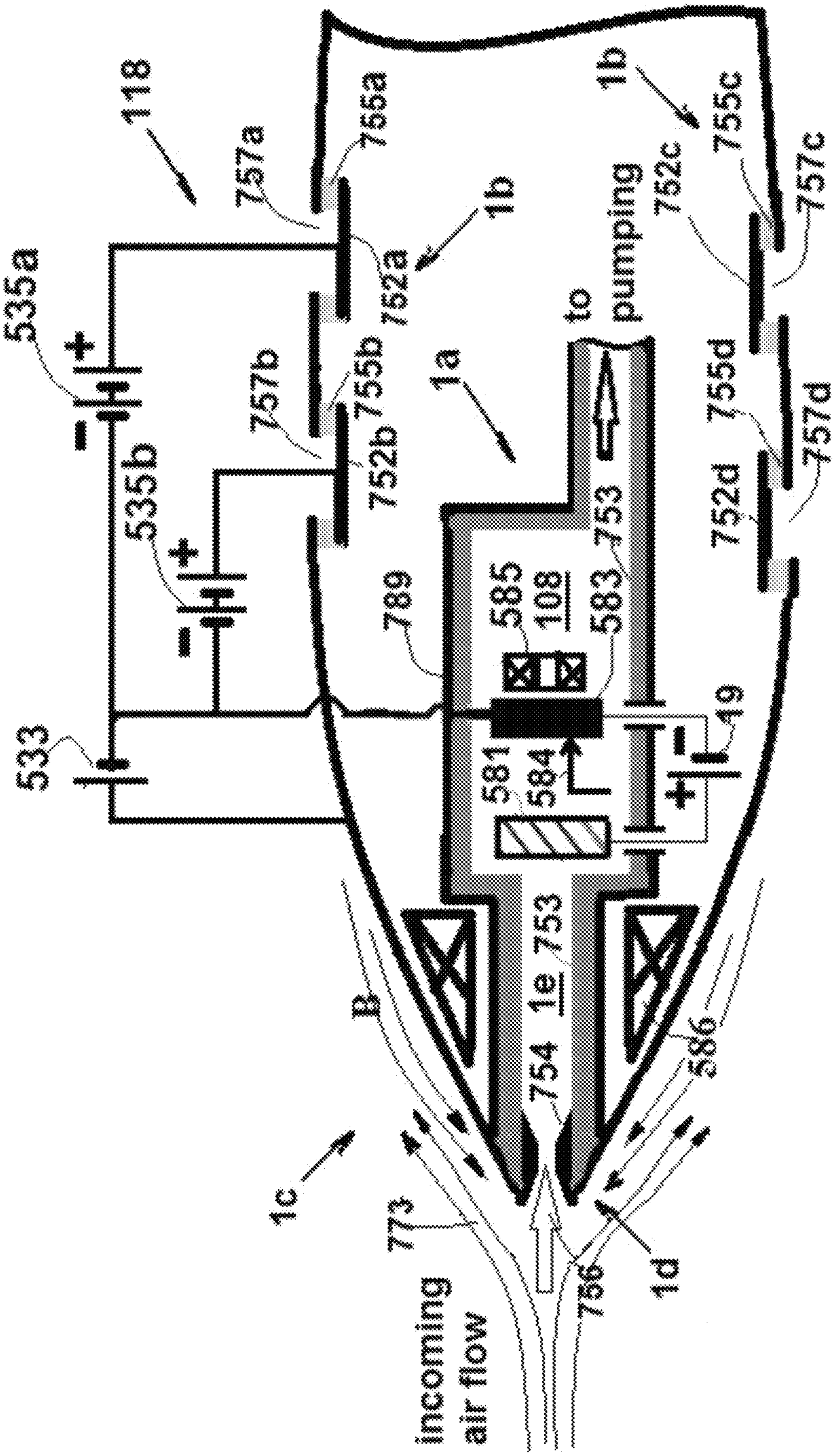
FIG. 7L1

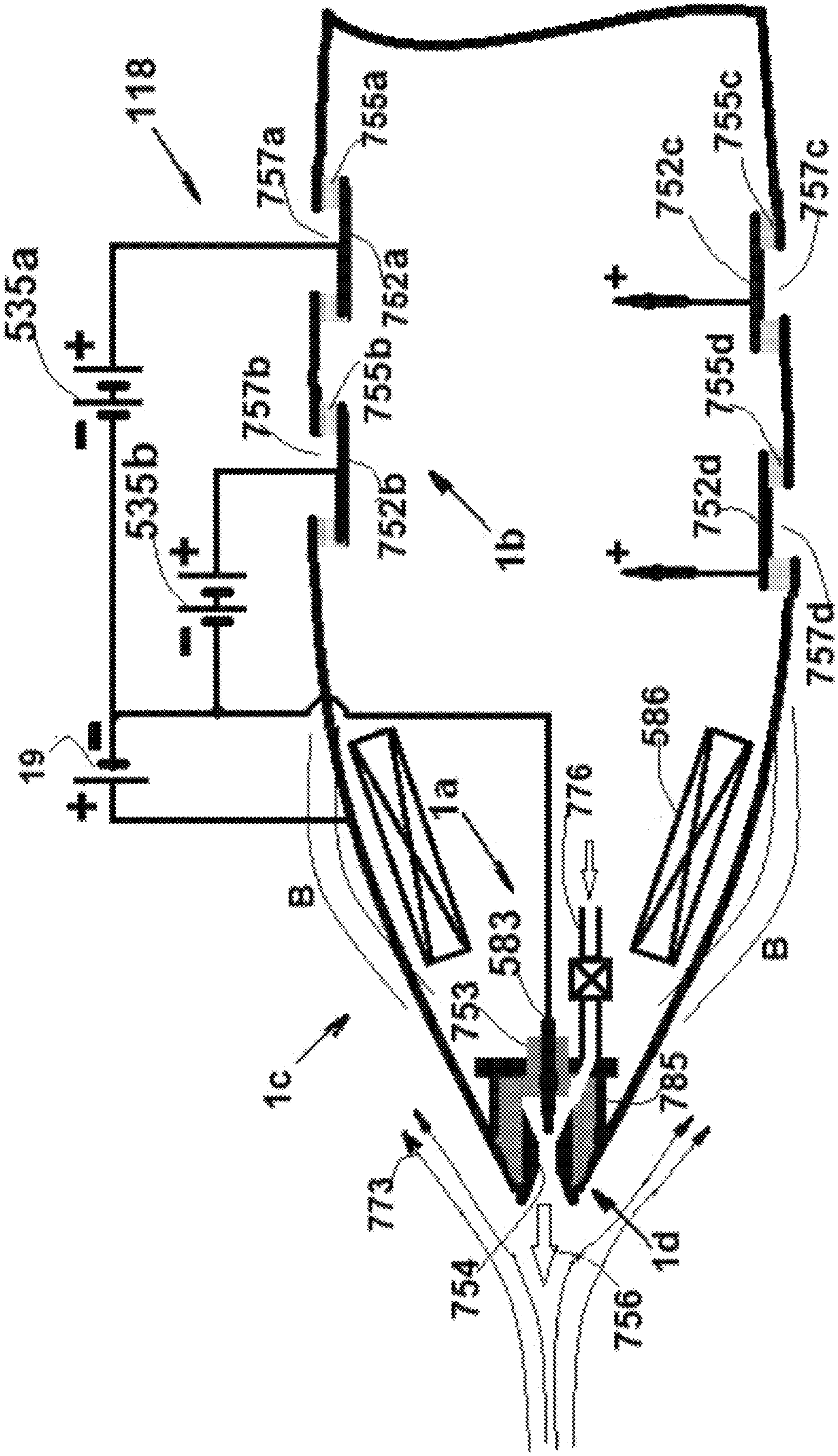
FIG.7L2

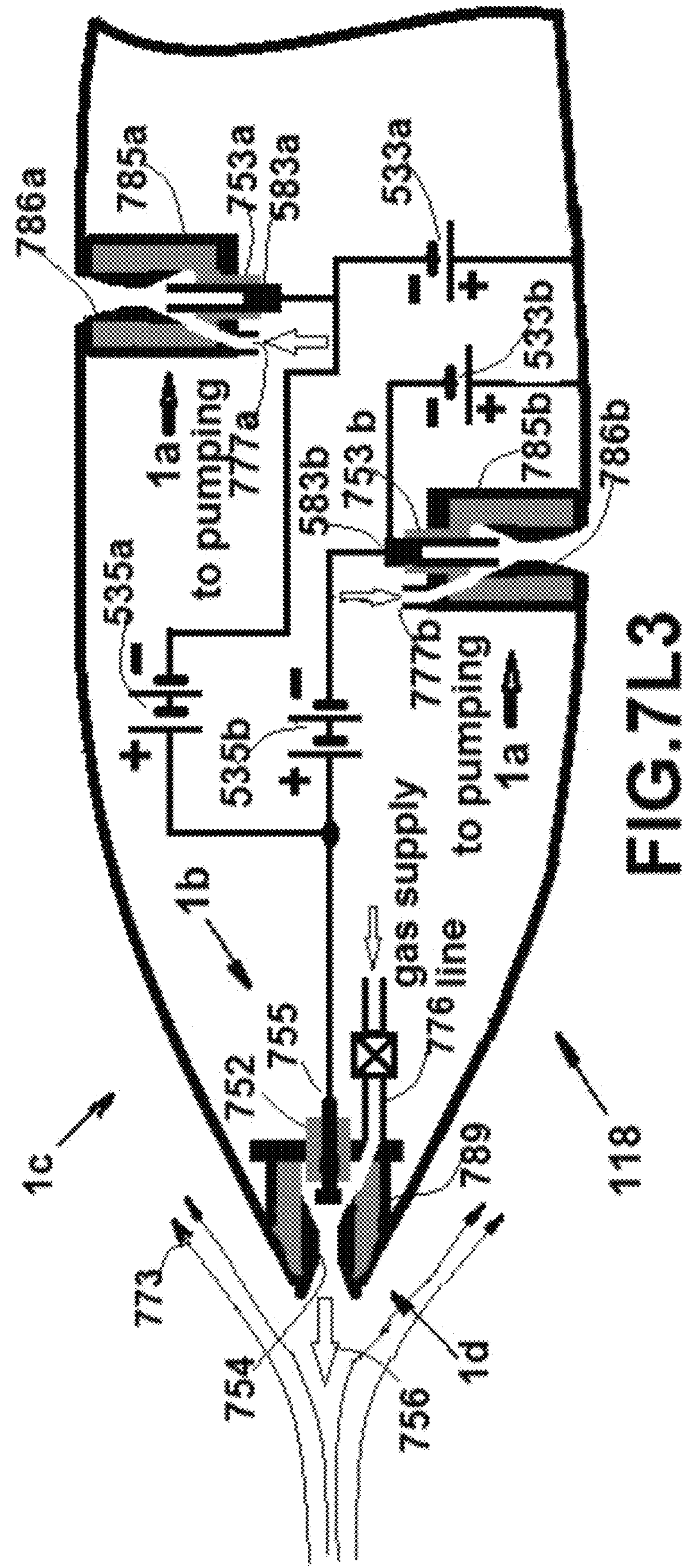
FIG.7L3

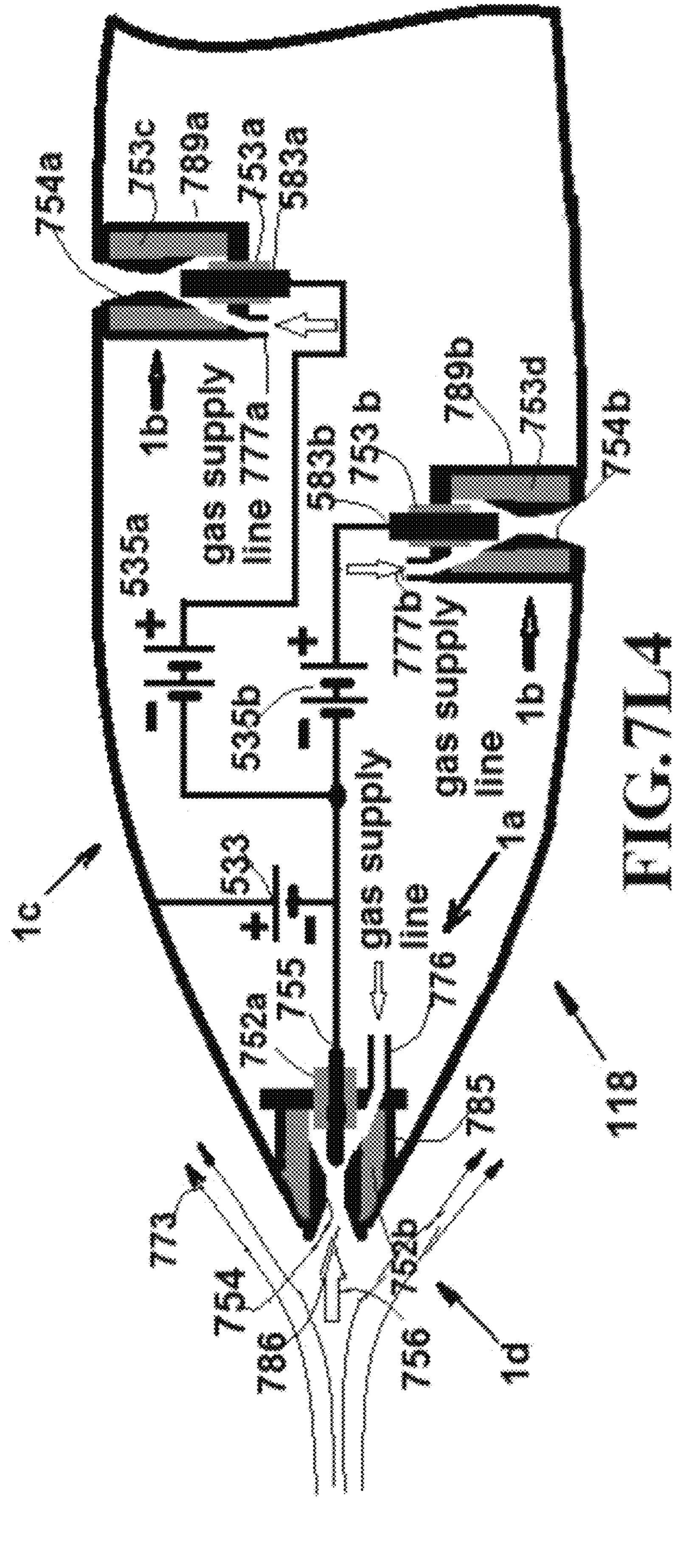
FIG. 7L4

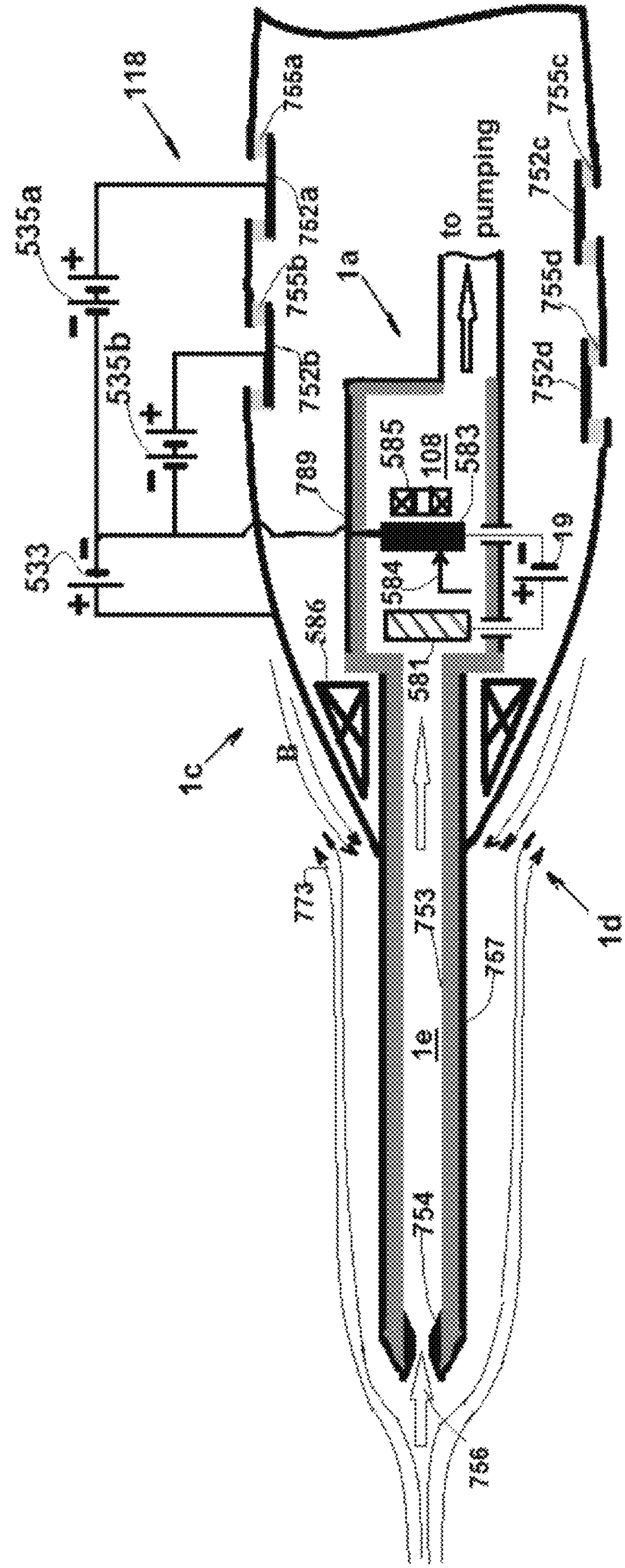
FIG.7L5

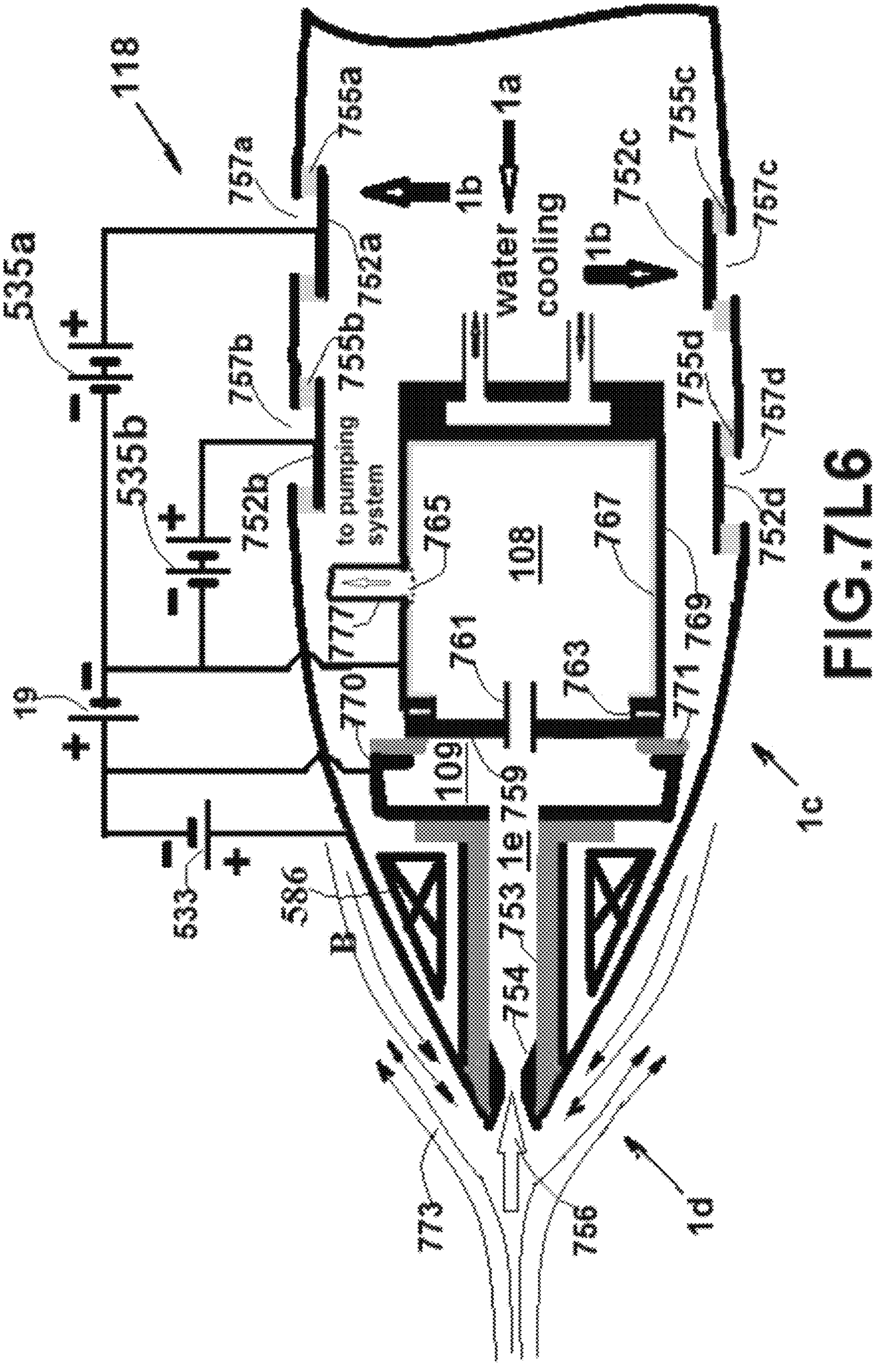
FIG.7L6

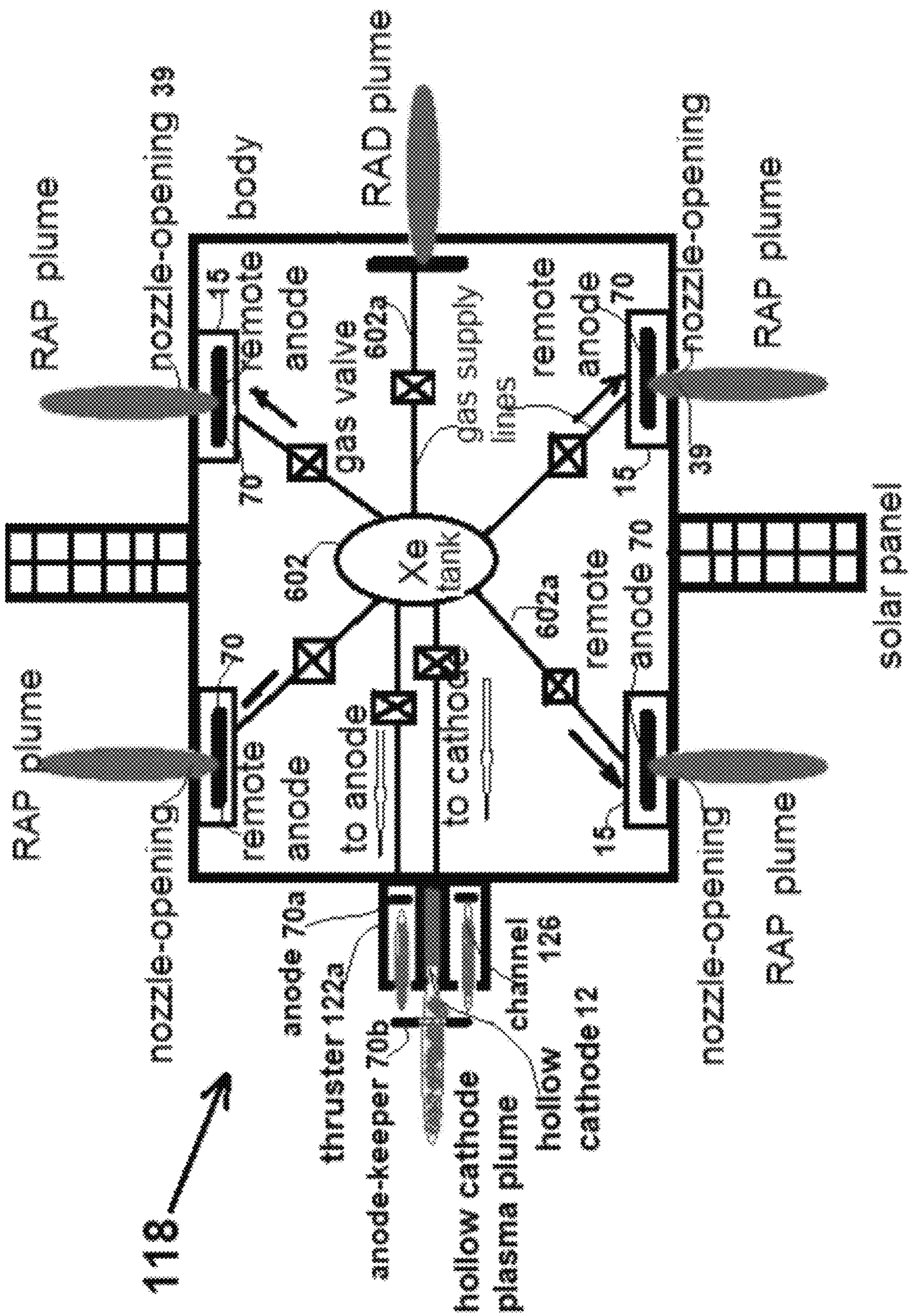
FIG.7L7

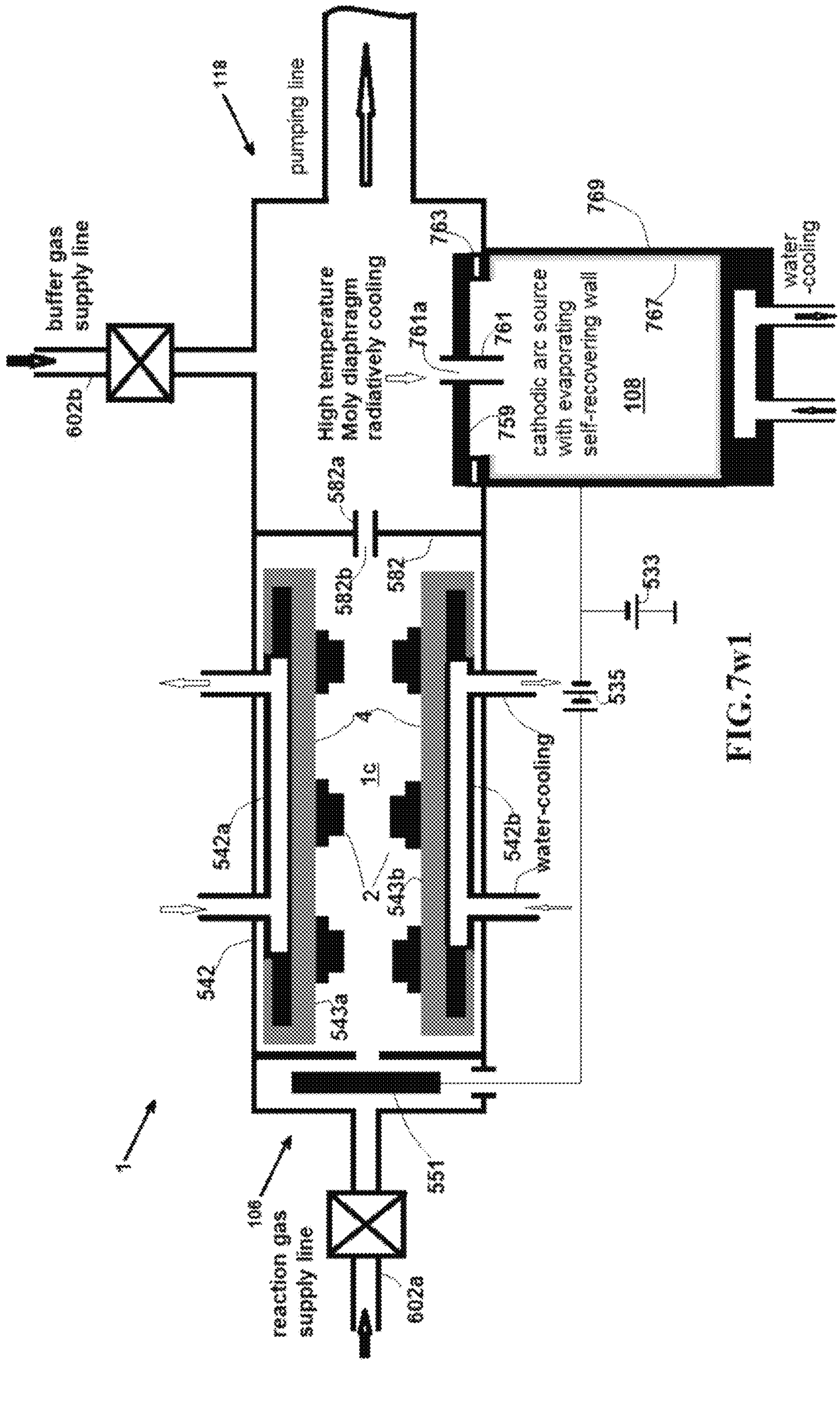
FIG.7w1

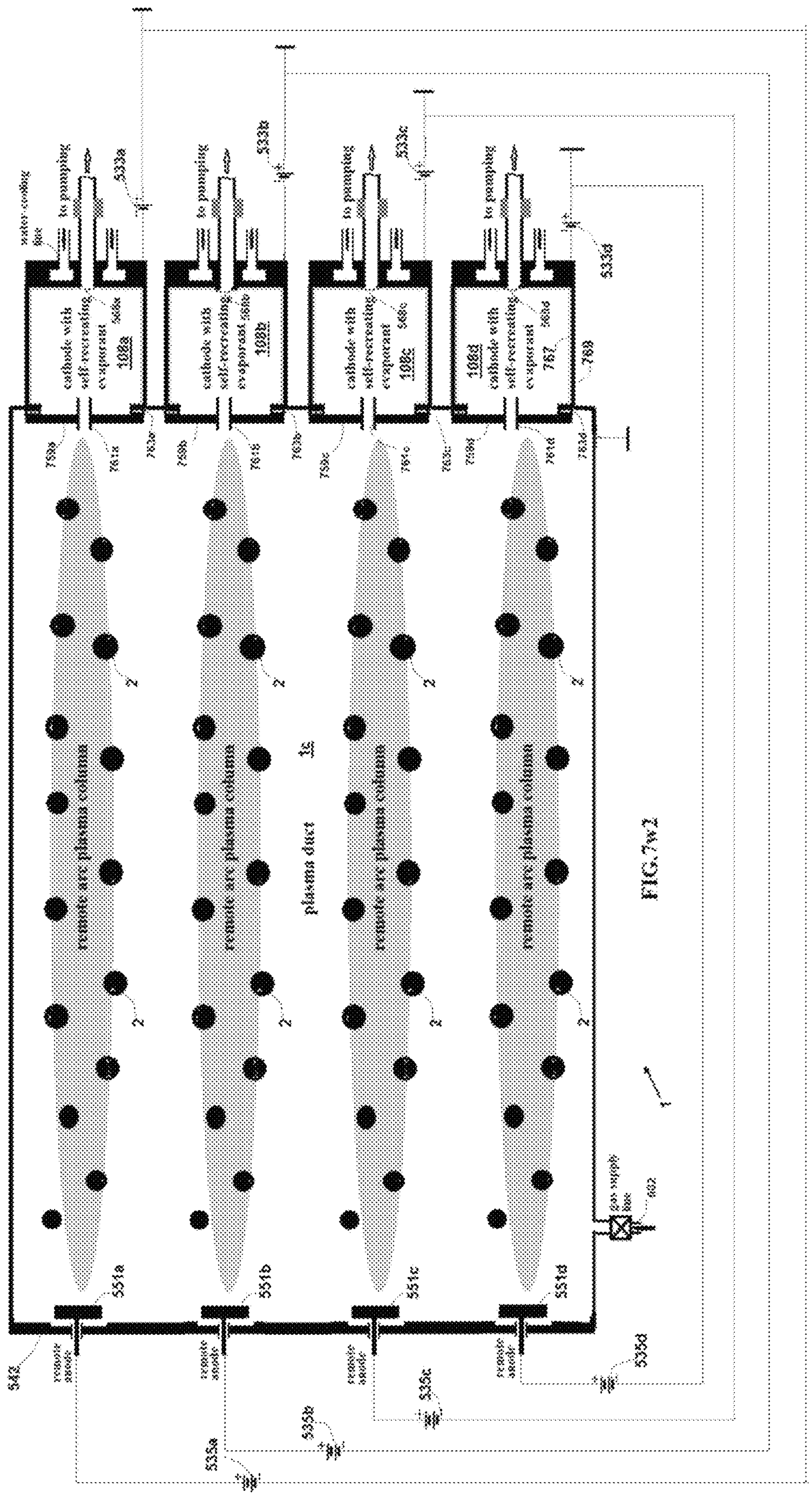
FIG.7w2

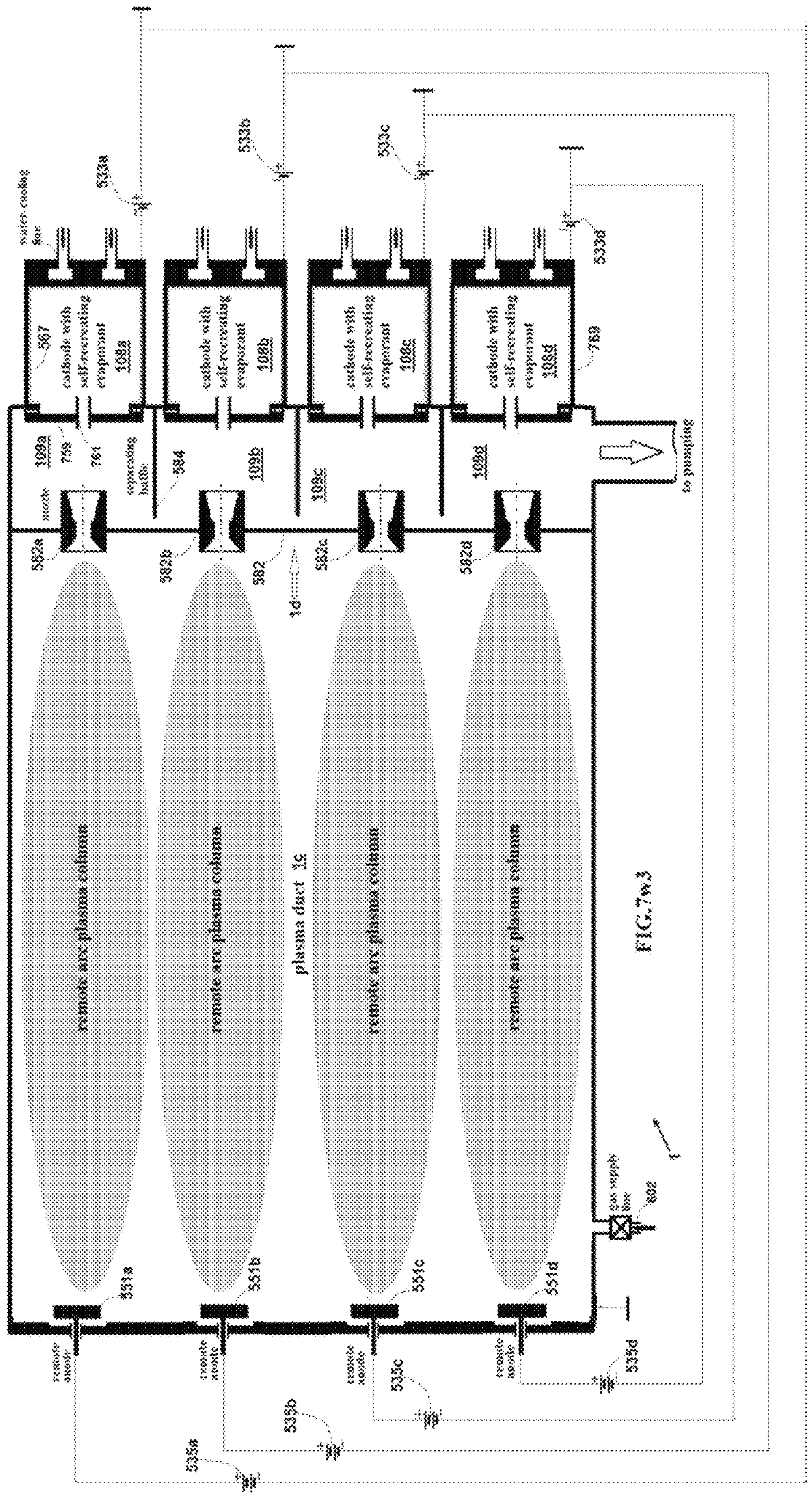
FIG.7w3

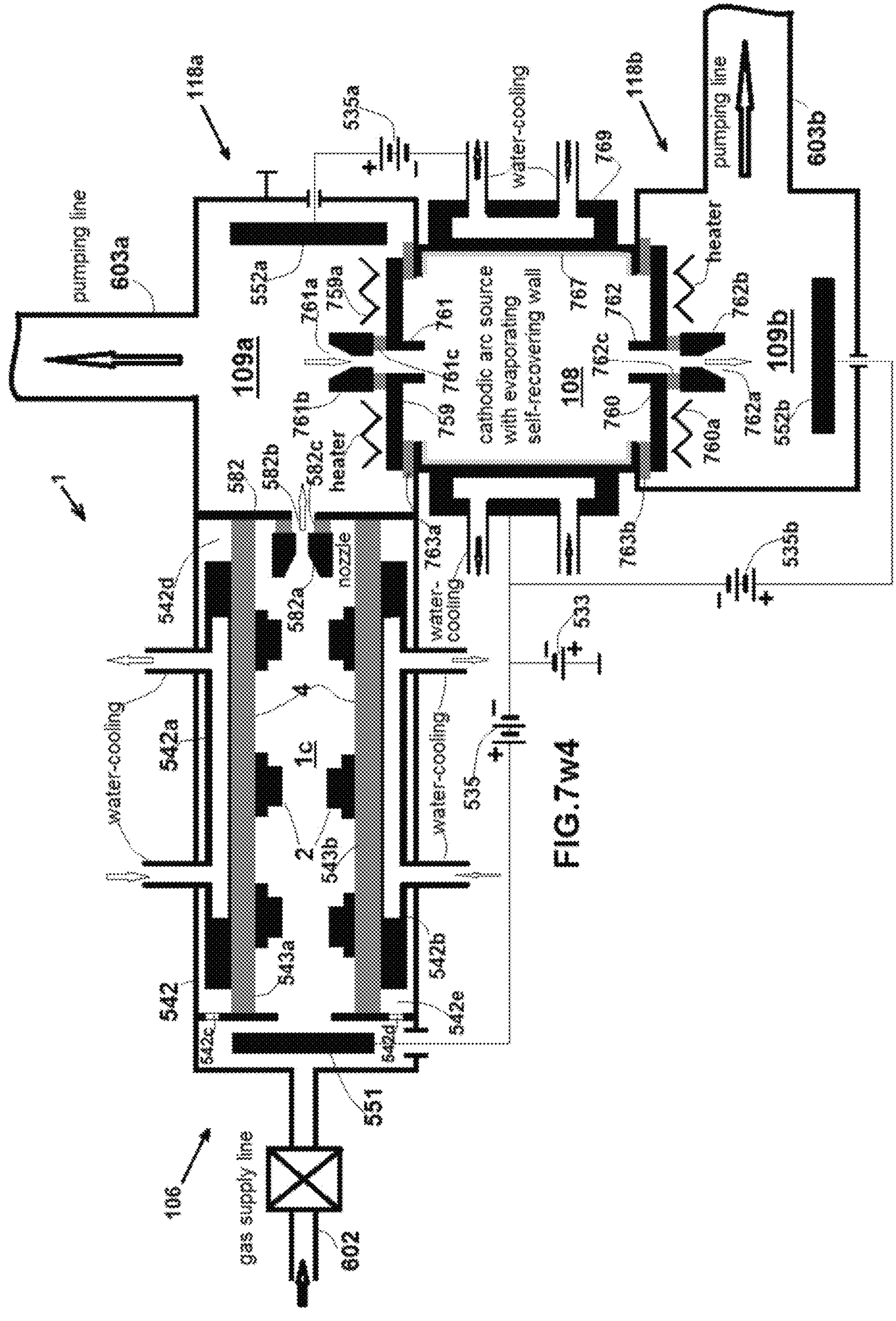
FIG.7w4

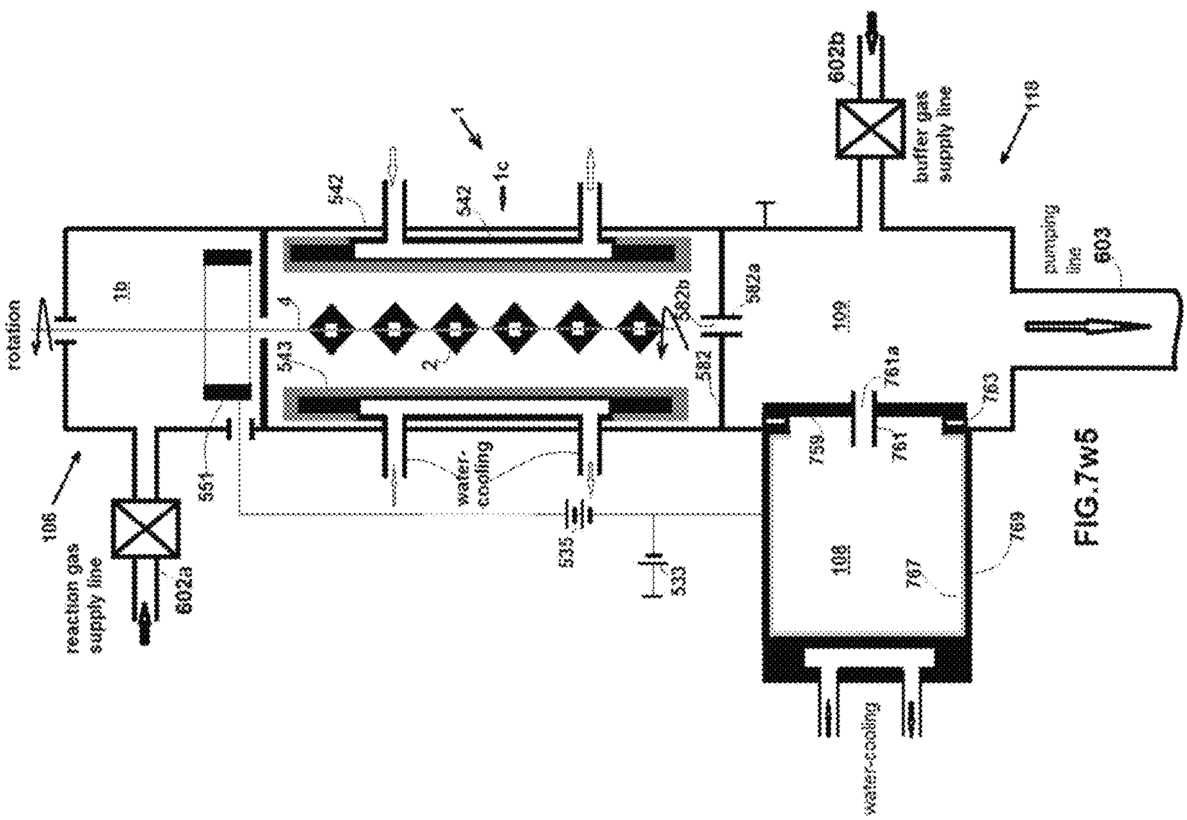
FIG.7w5

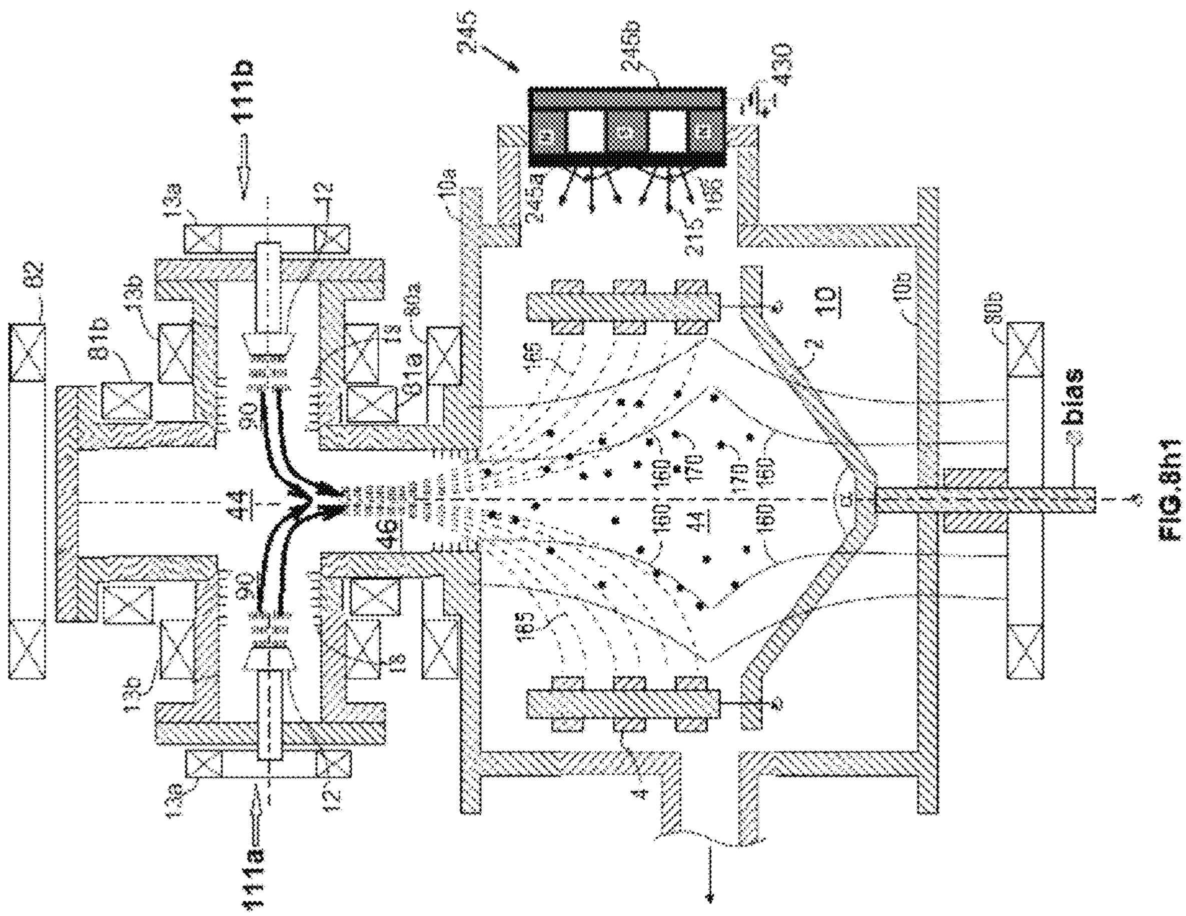
FIG.8h1

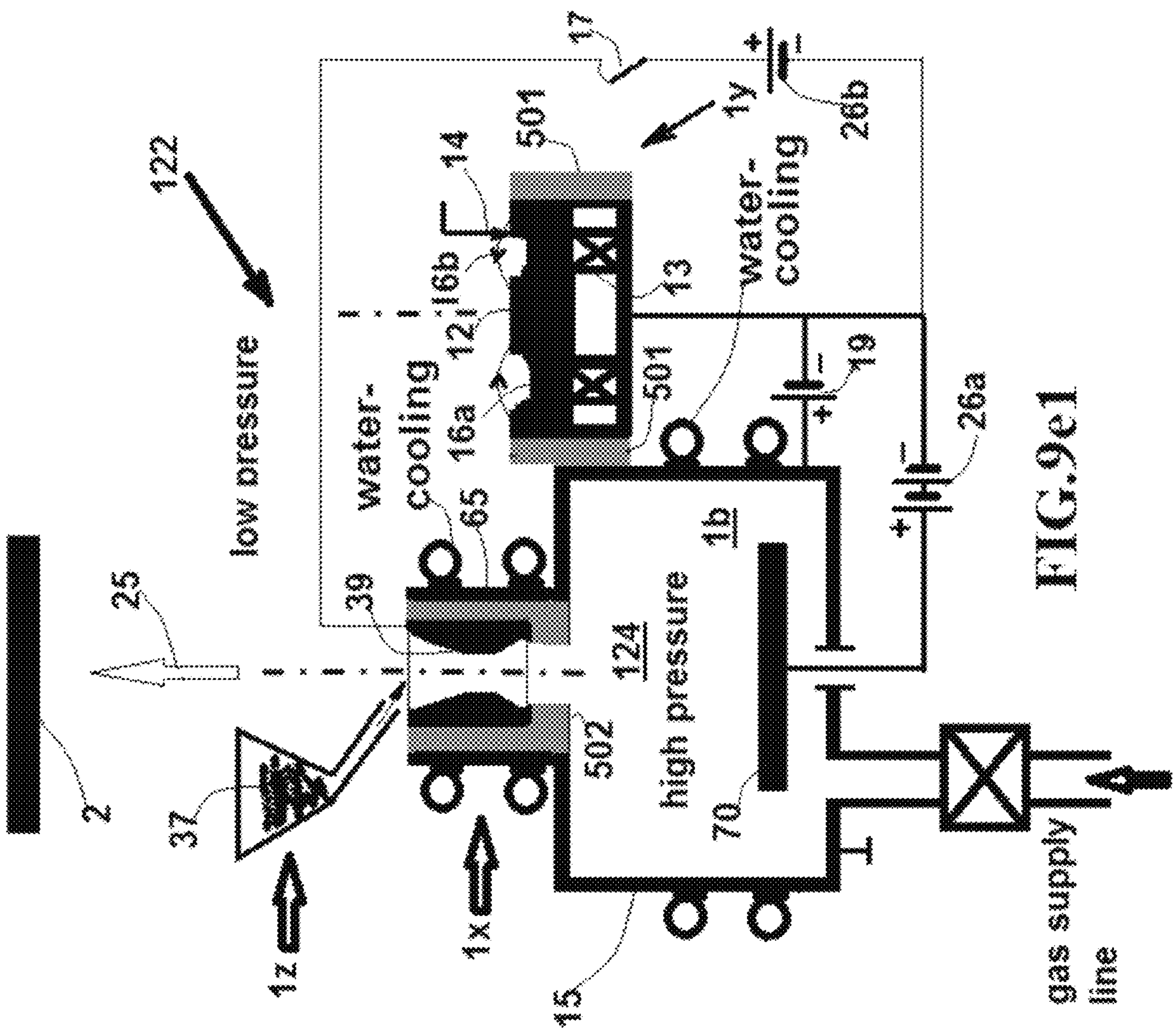
FIG.9e1

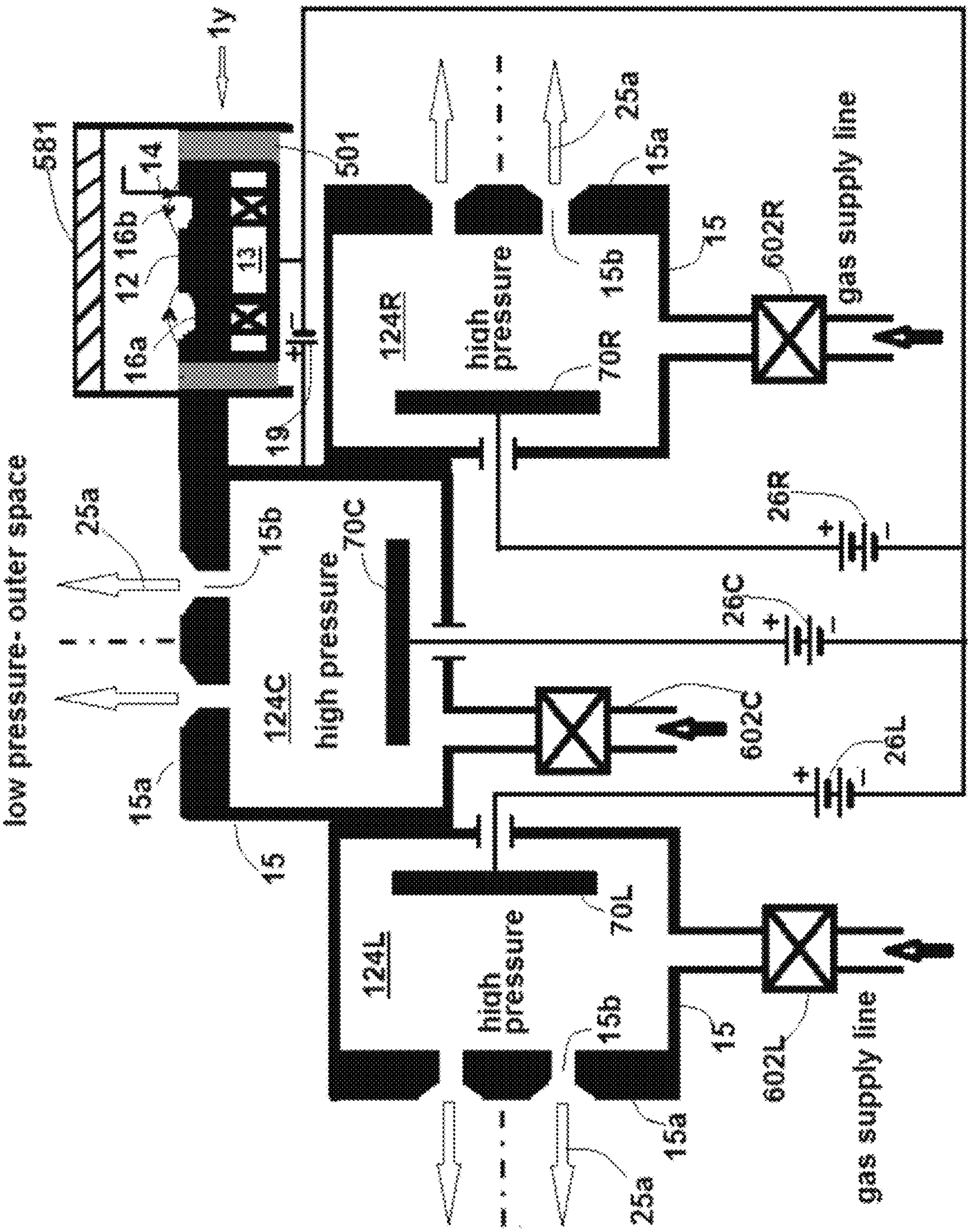
FIG.9e2

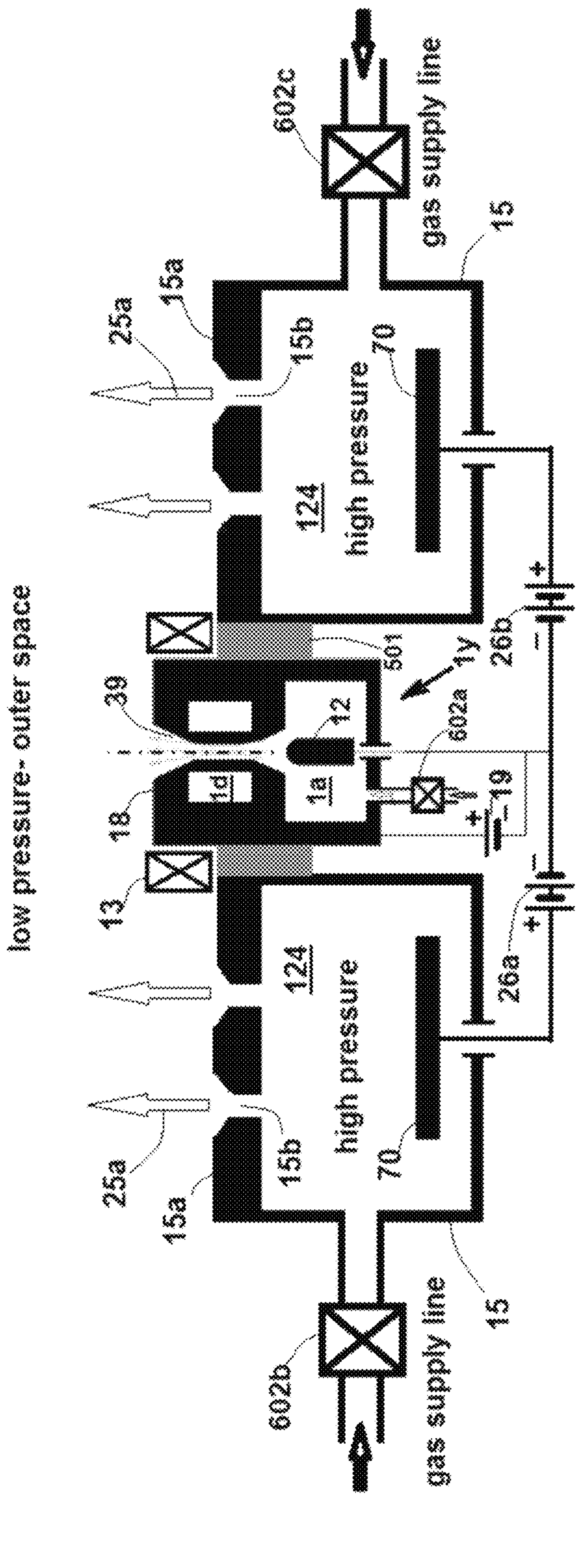
FIG.9e3

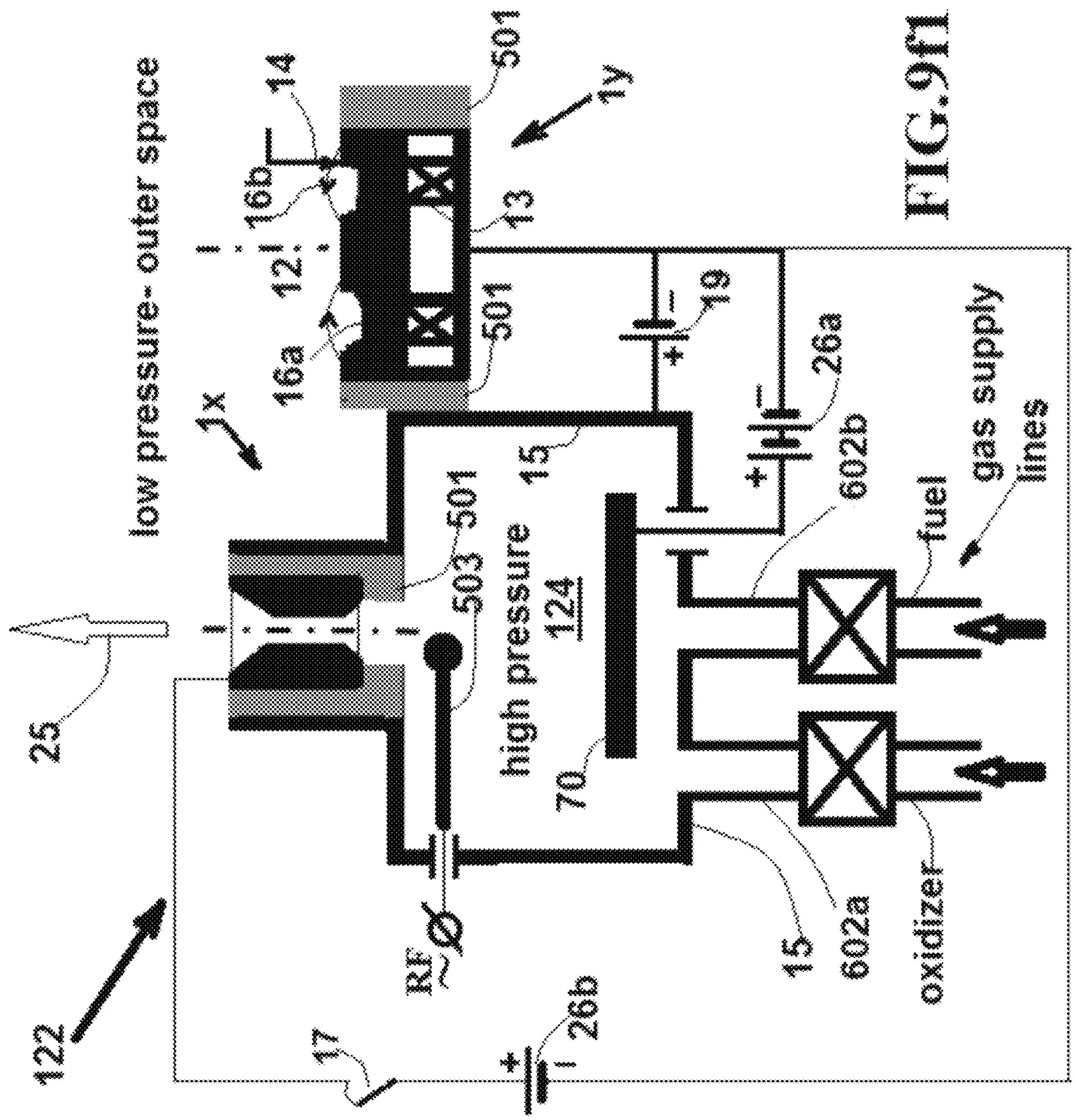
FIG.9f1

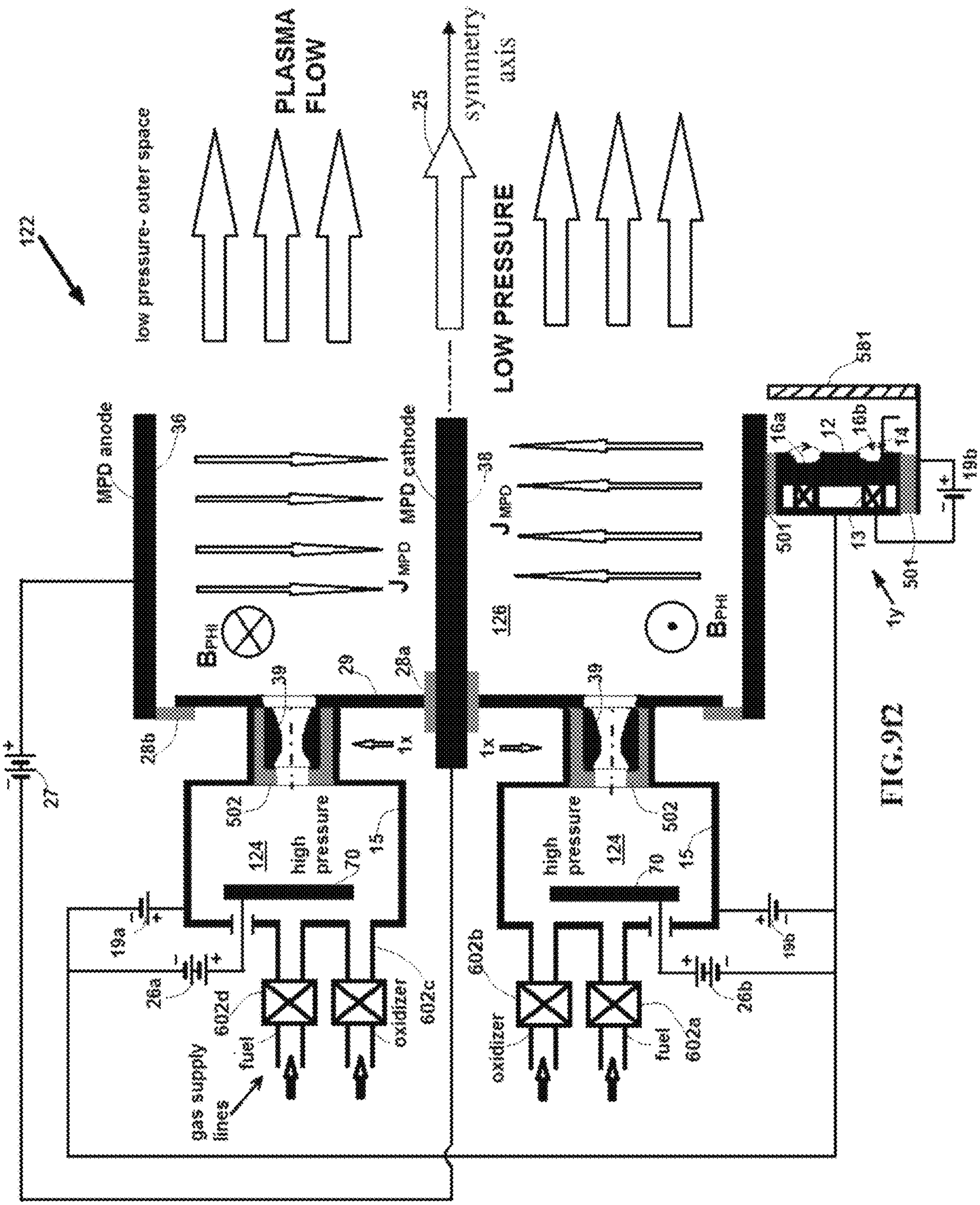
FIG.9Q2

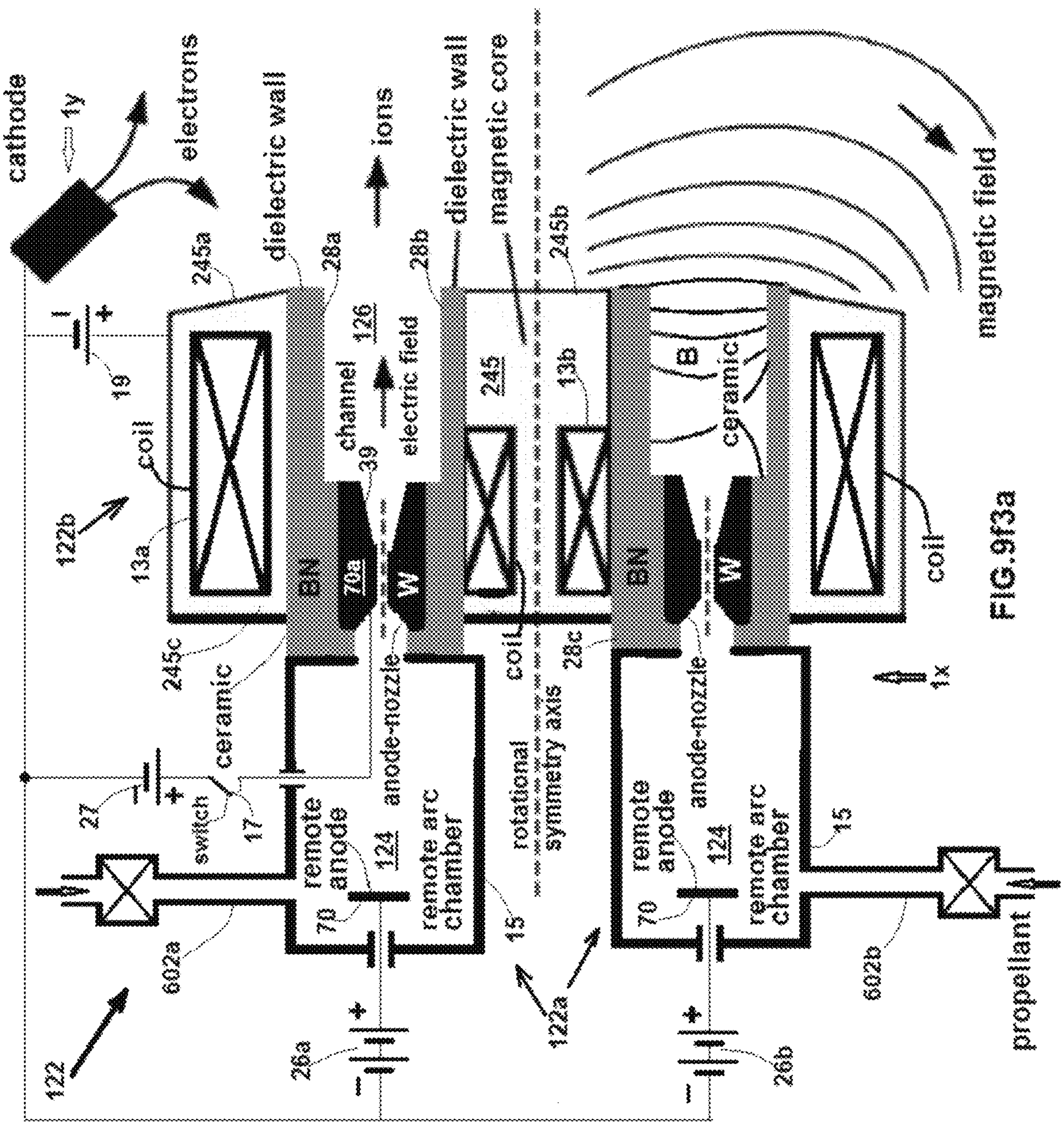
FIG.9f3a

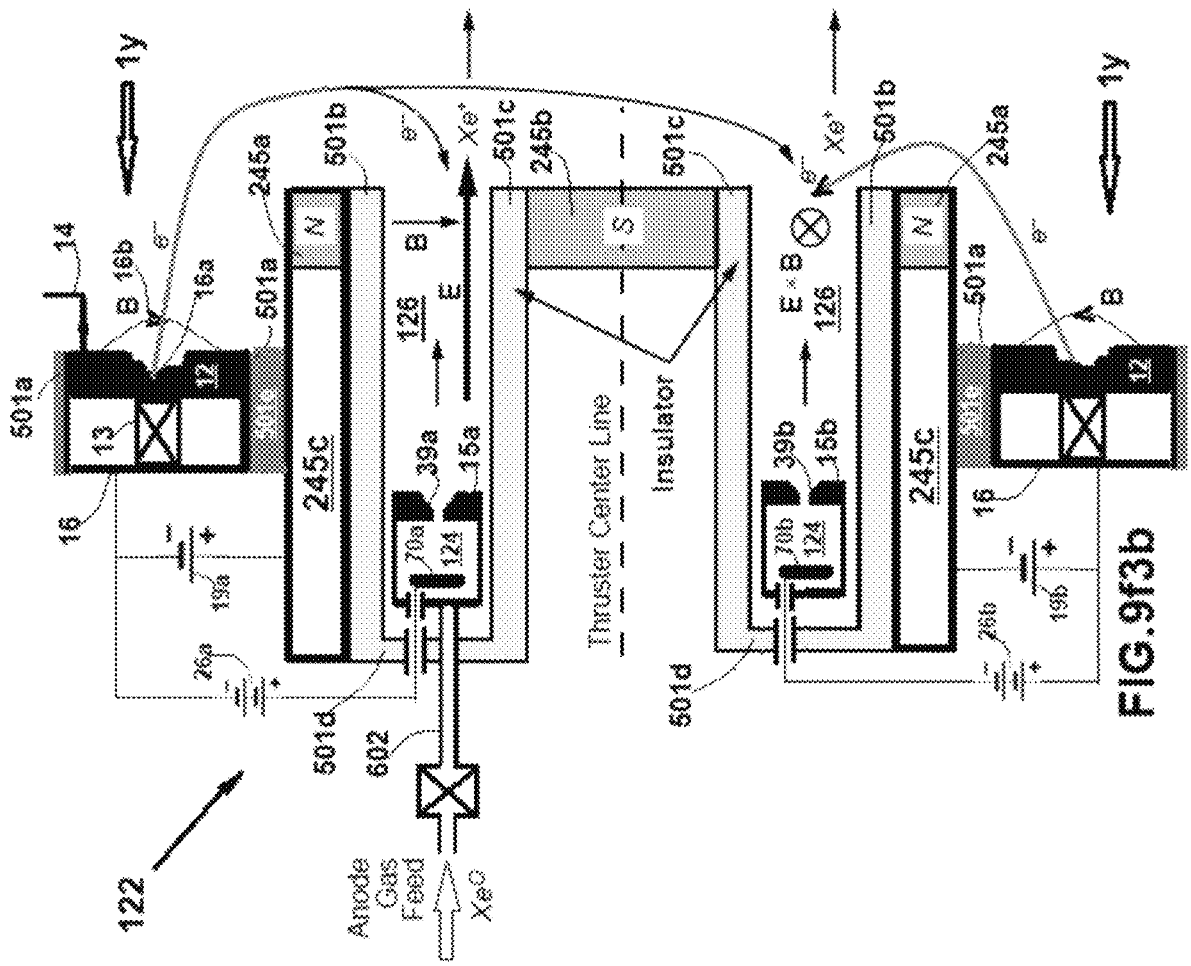
FIG.9f3b

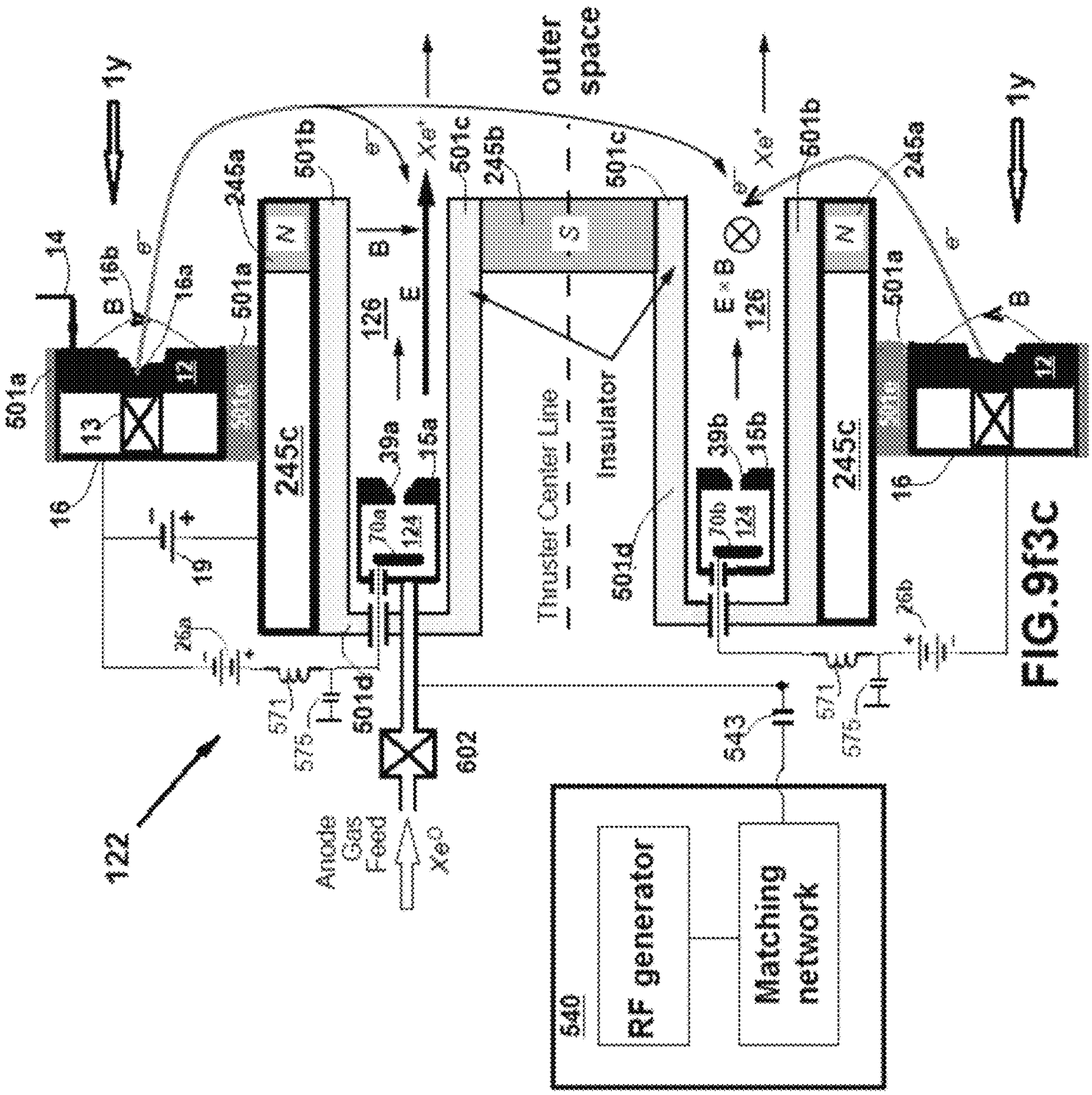
FIG.9f3c

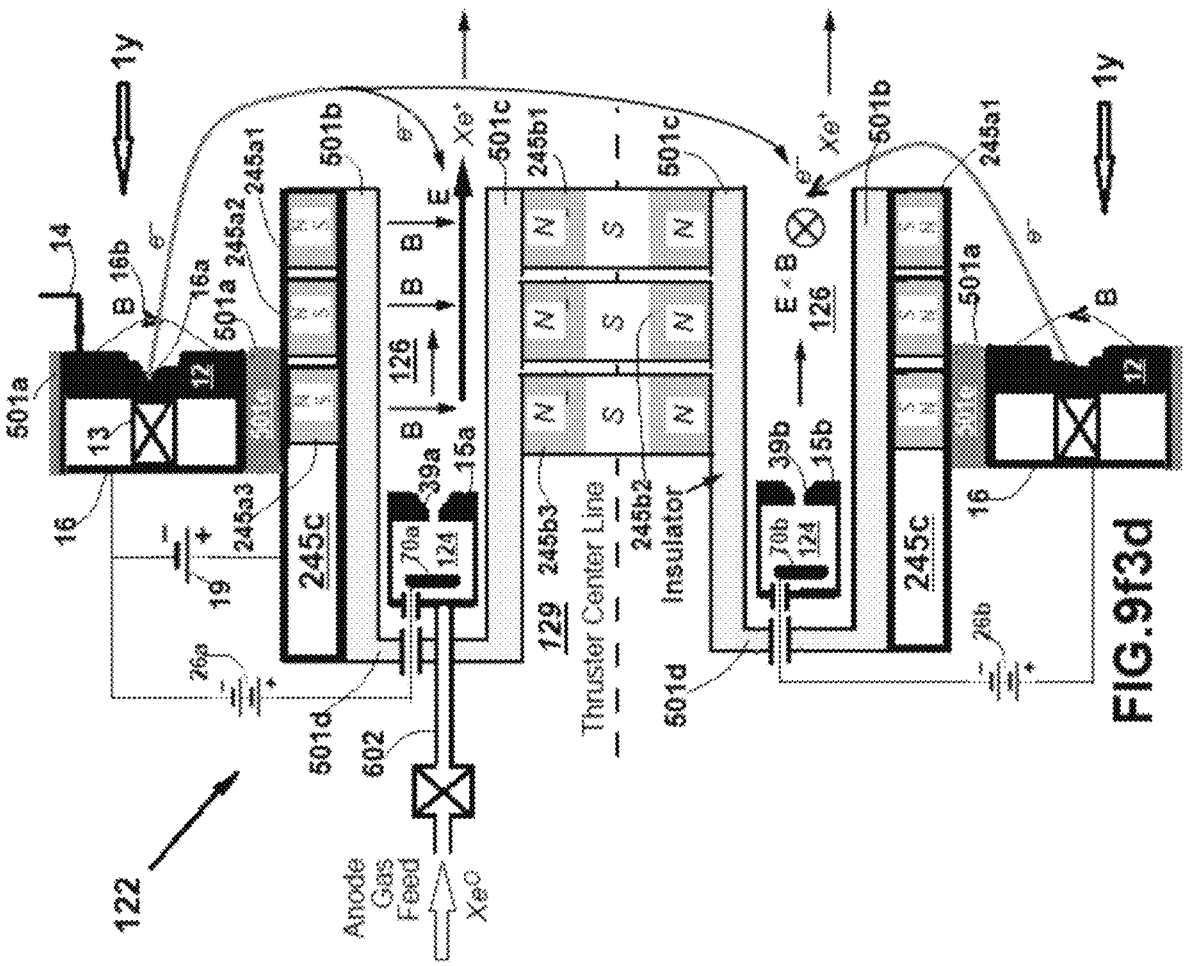
FIG.9f3d

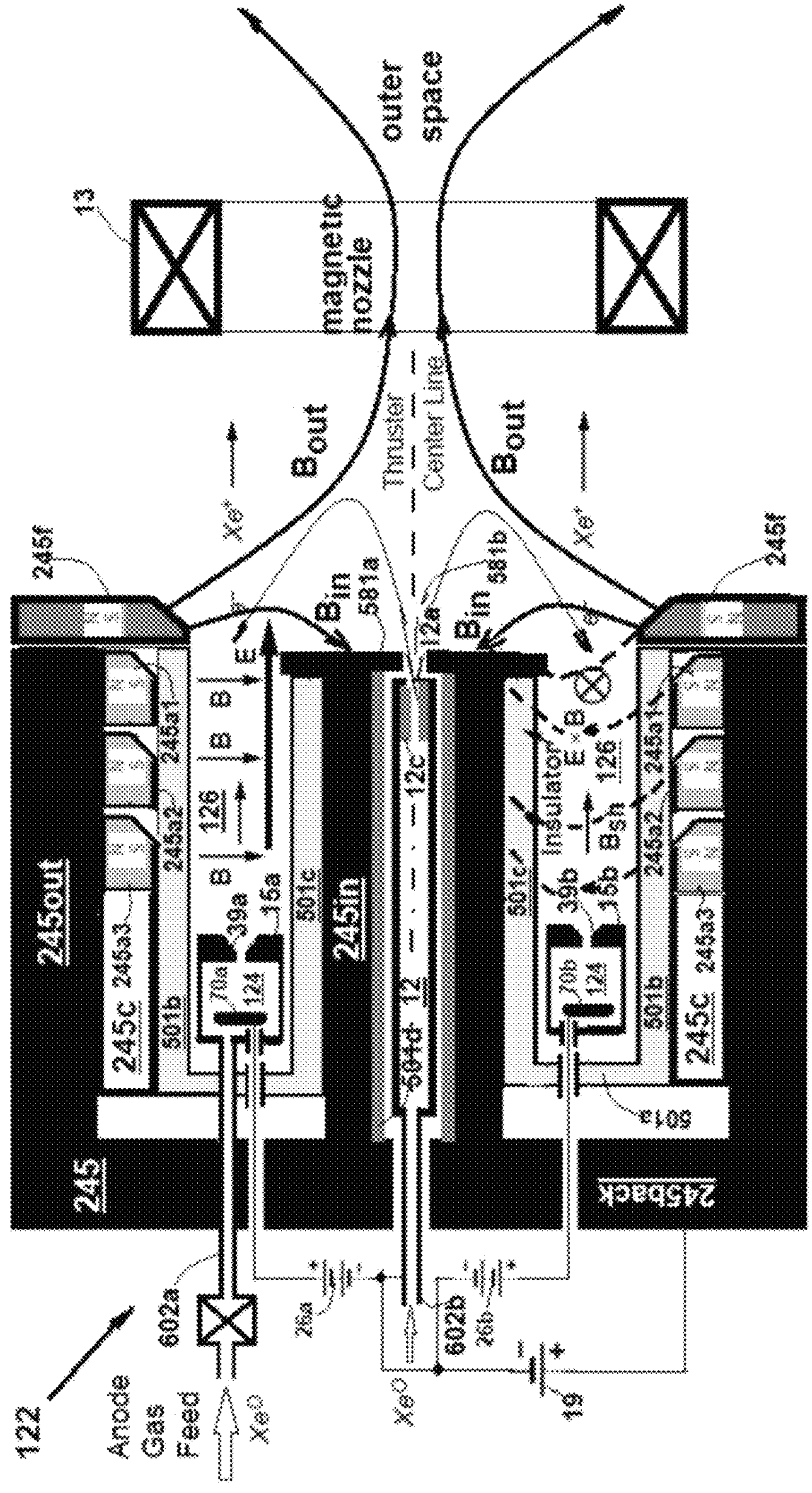
FIG.9f3e

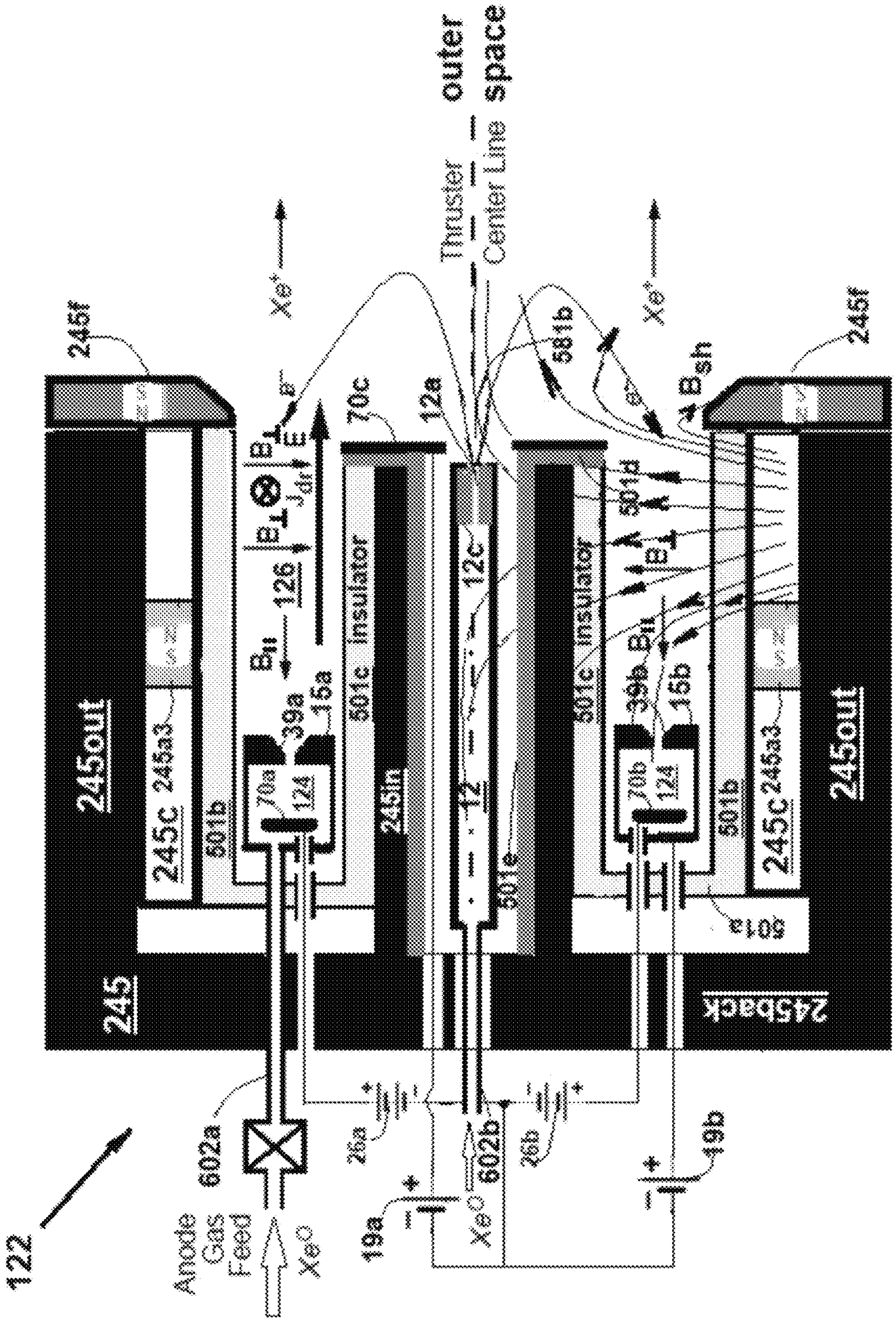
FIG.9f3e1a

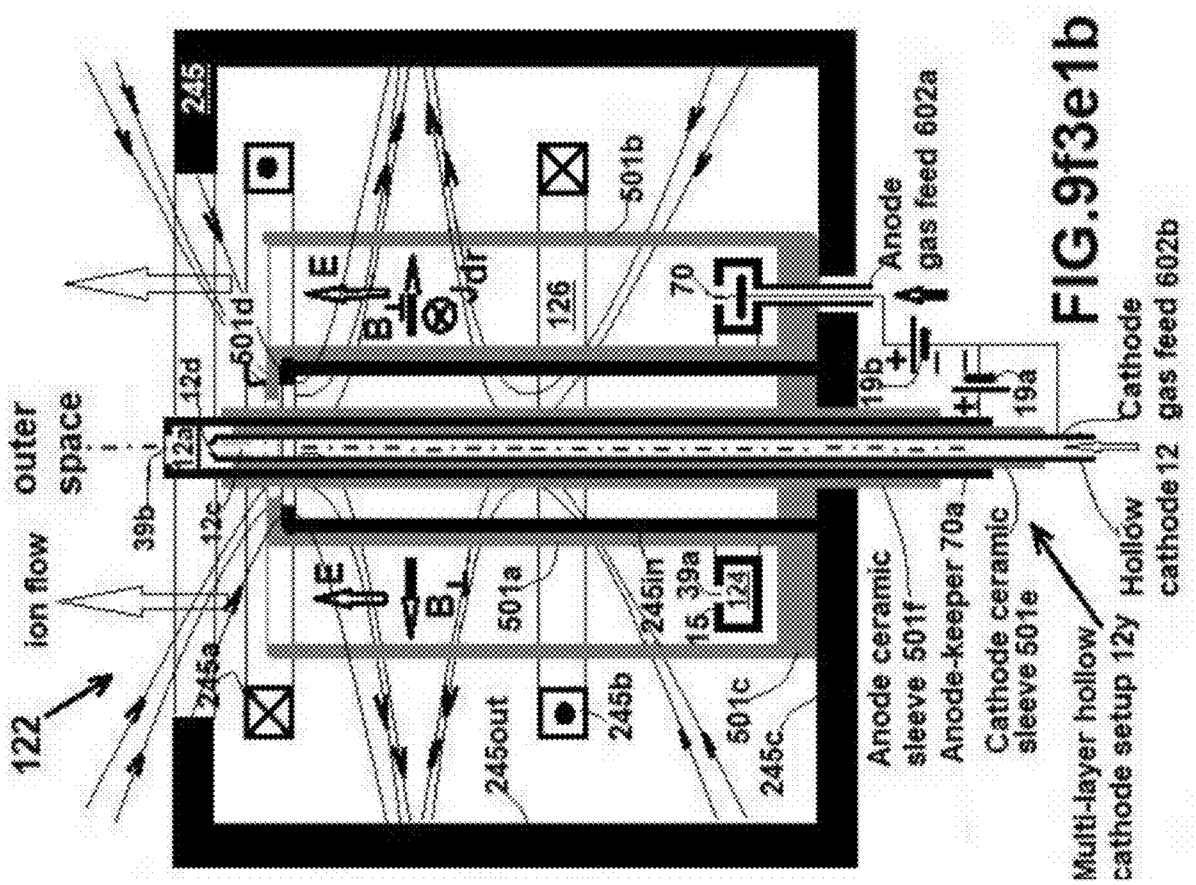
FIG.9f3e1b

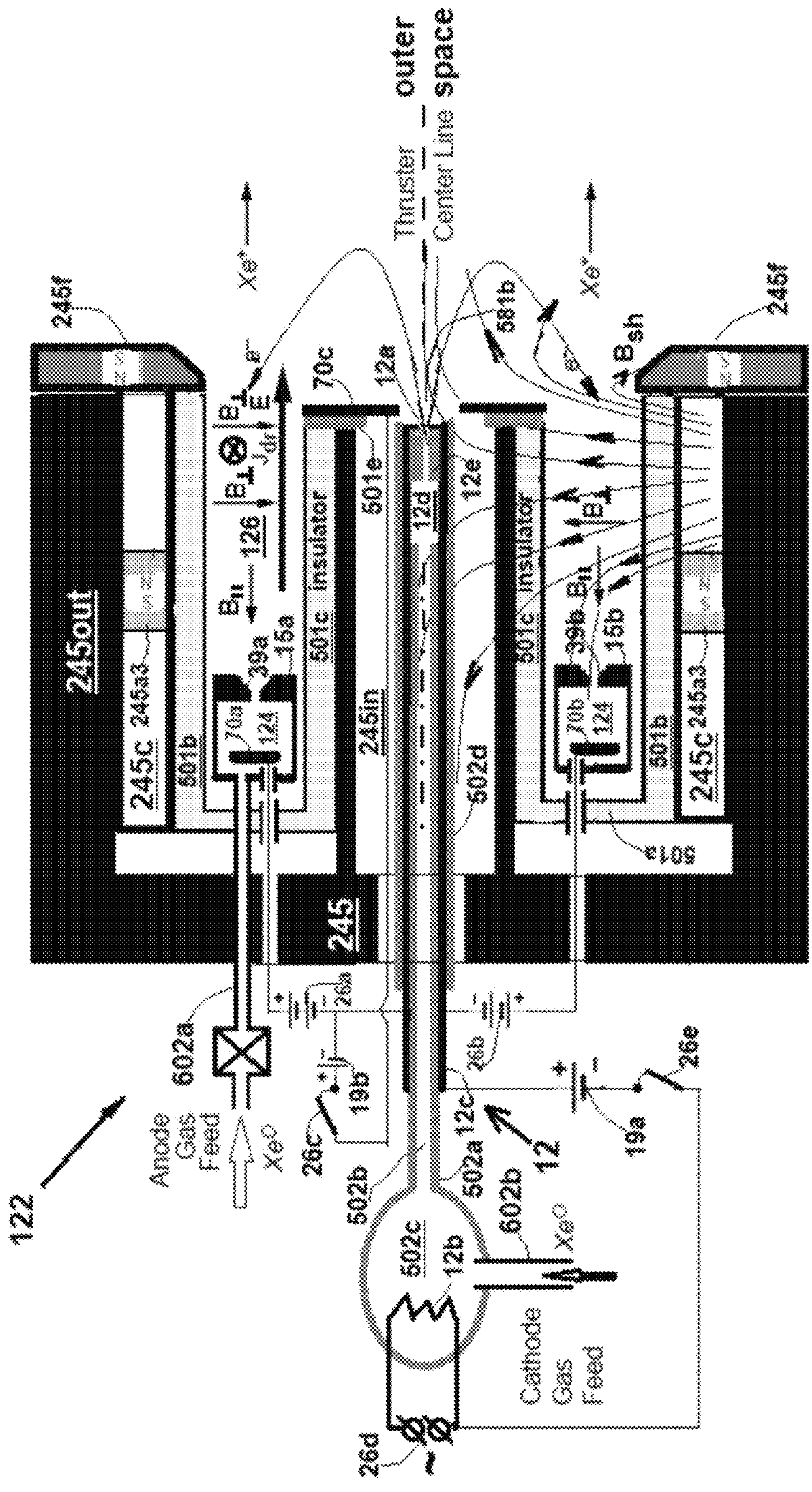
FIG.9f3e1c

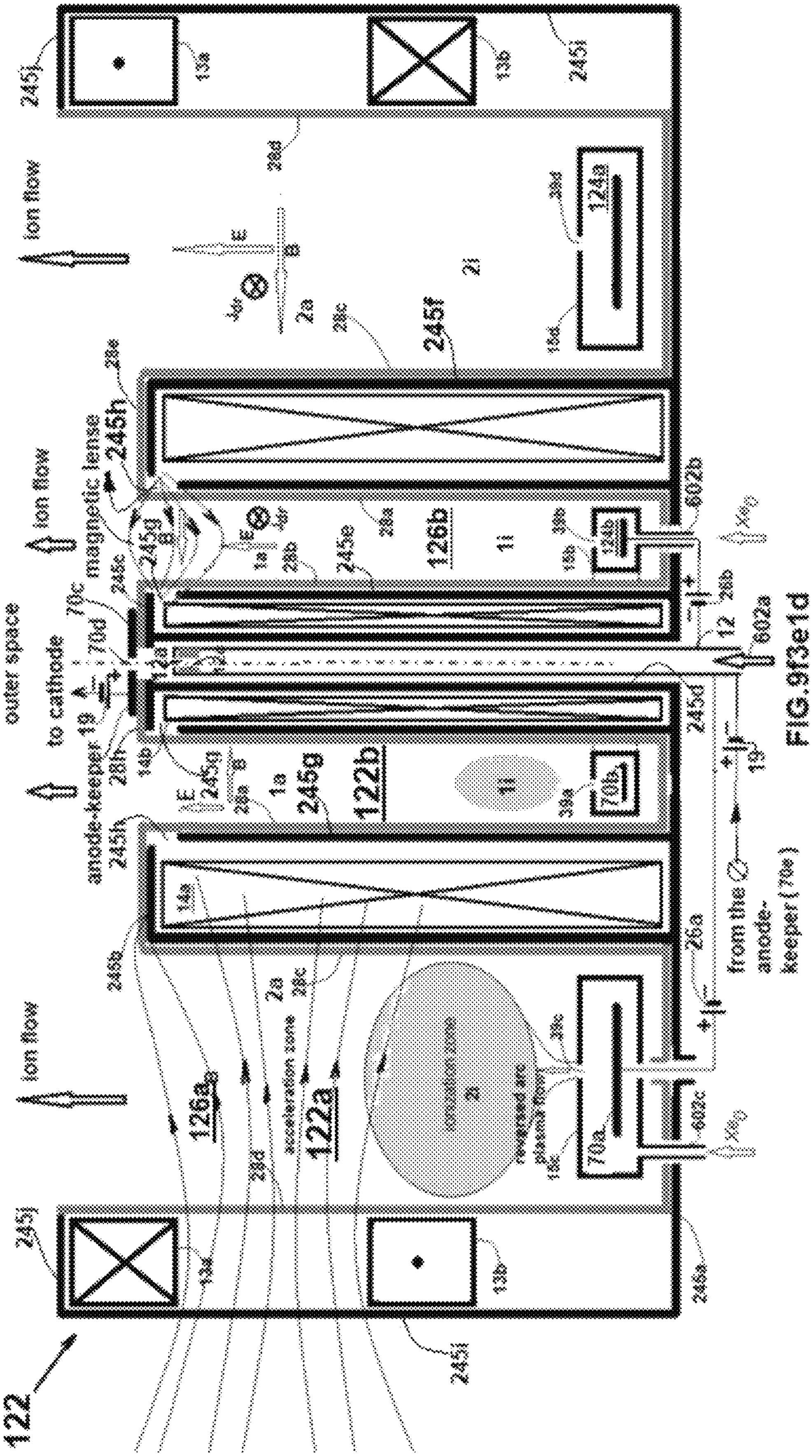
FIG.9f3e1d

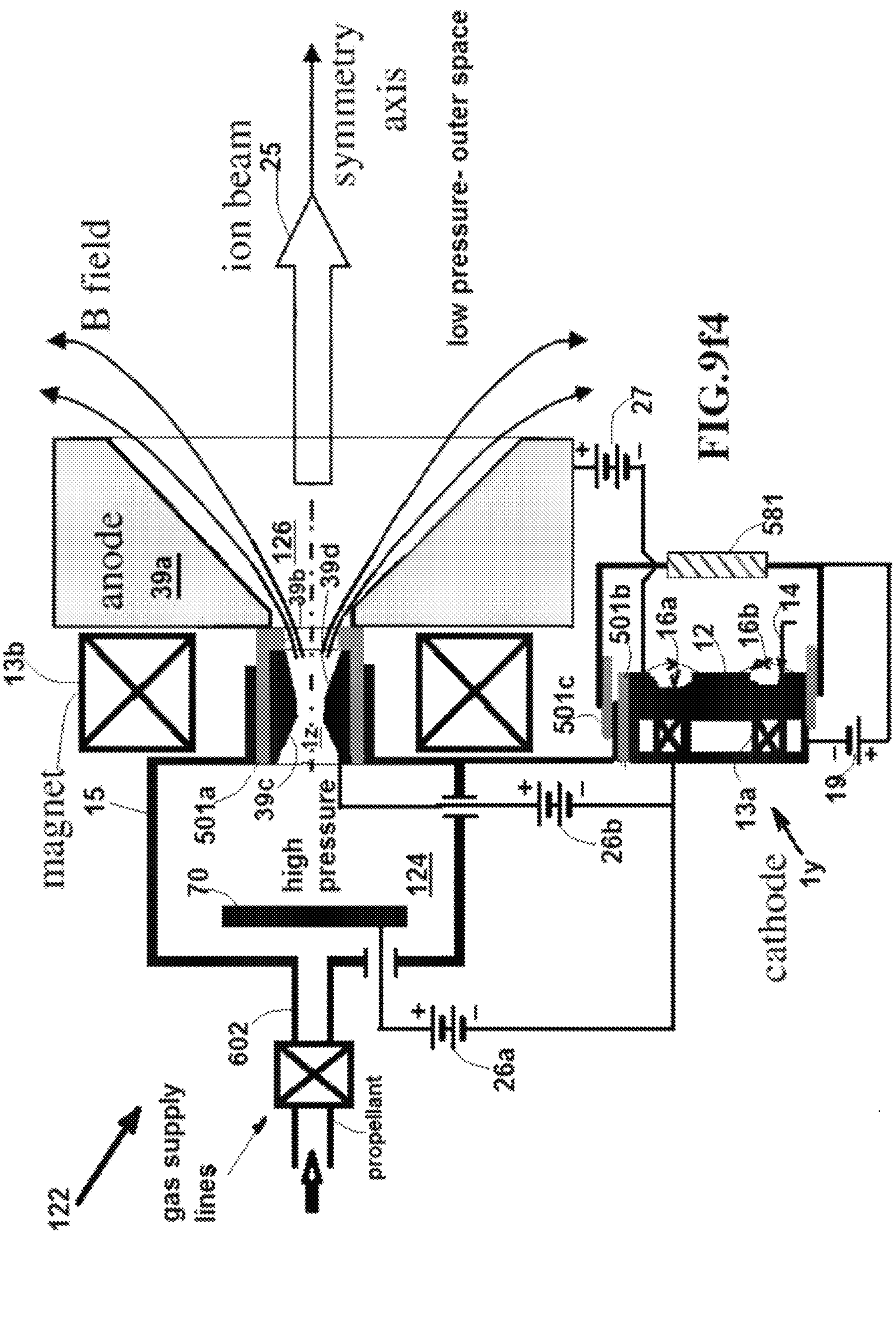
FIG.9f4

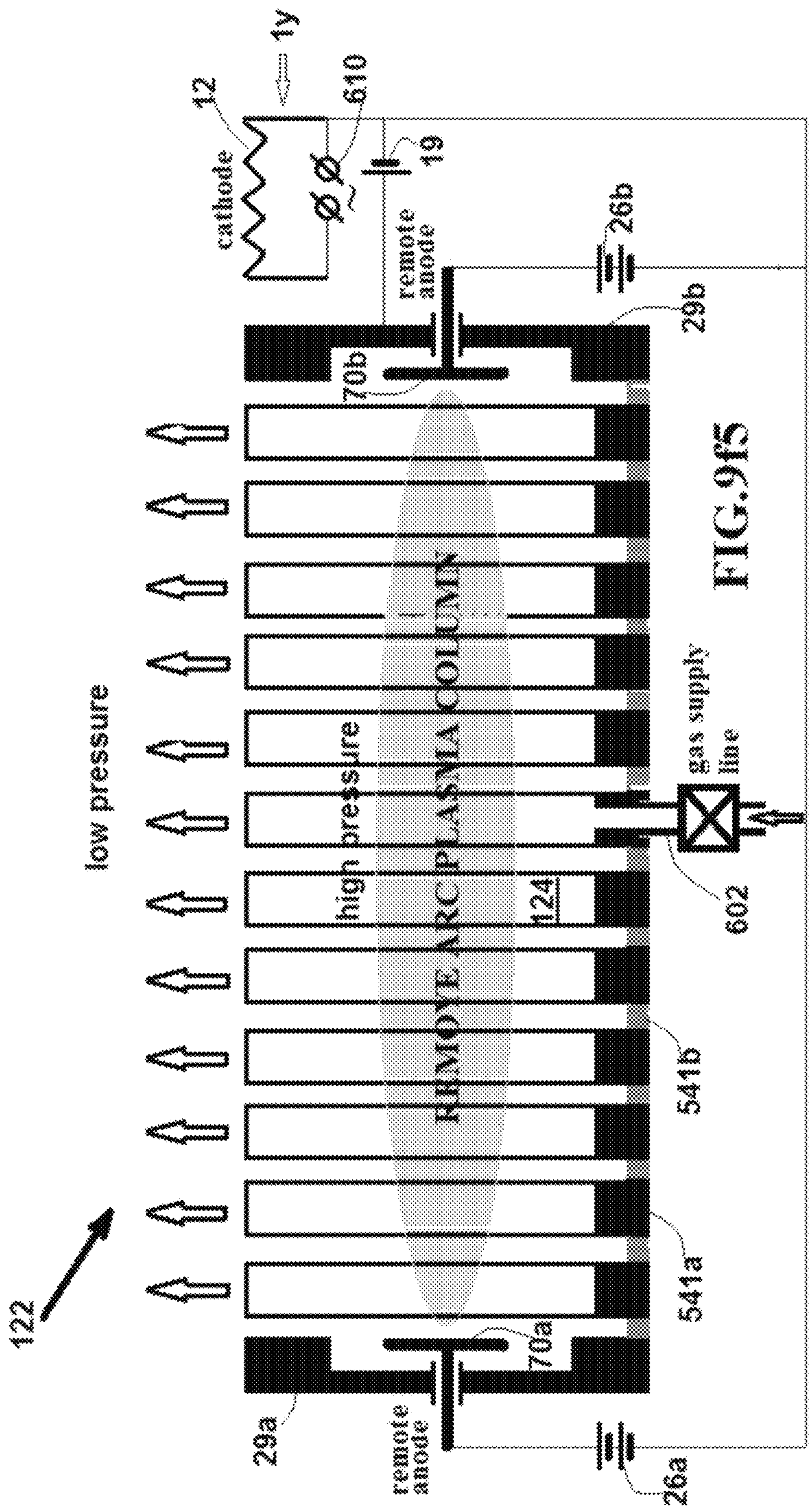
FIG.9f5

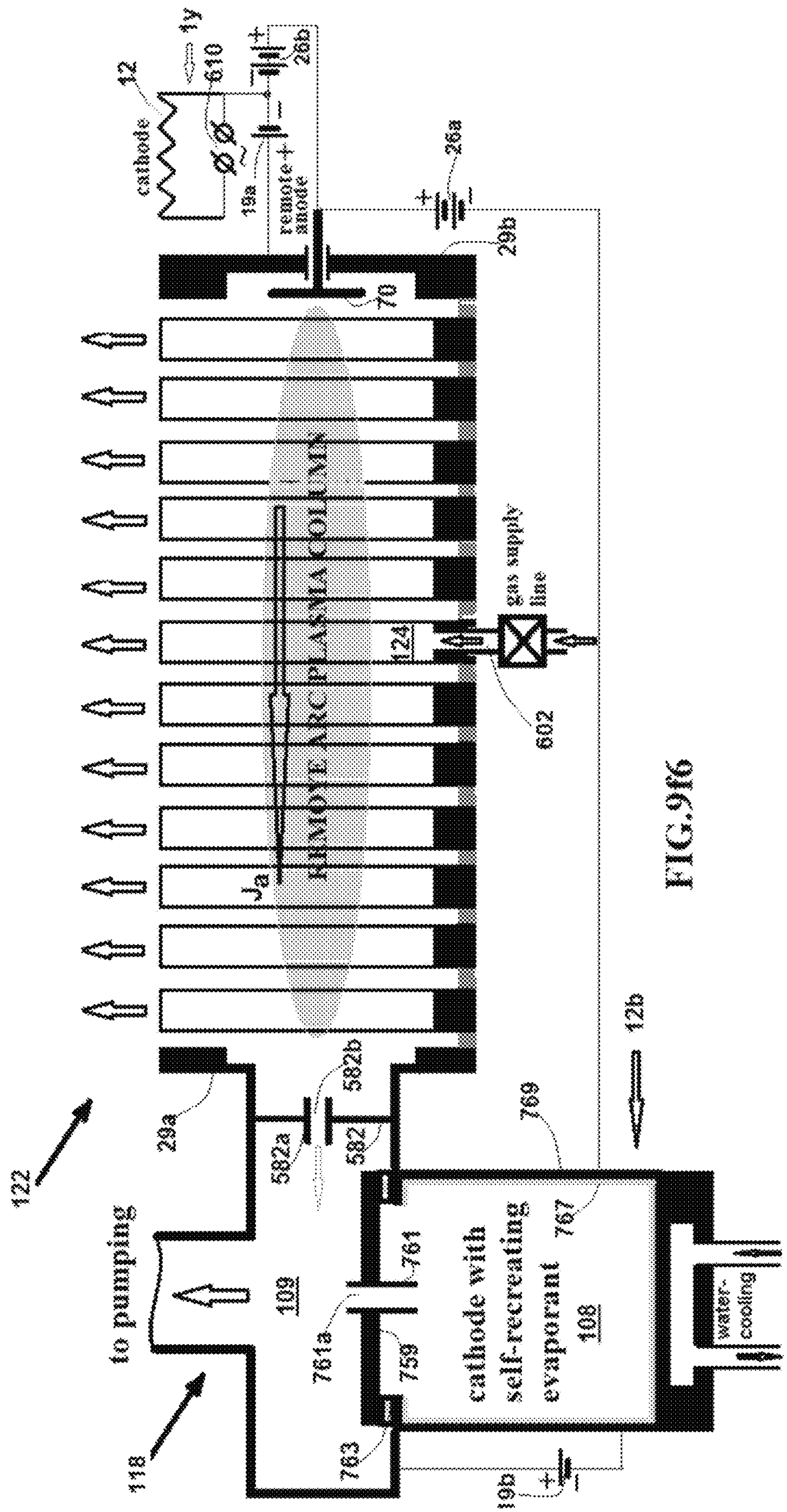
FIG.9f6

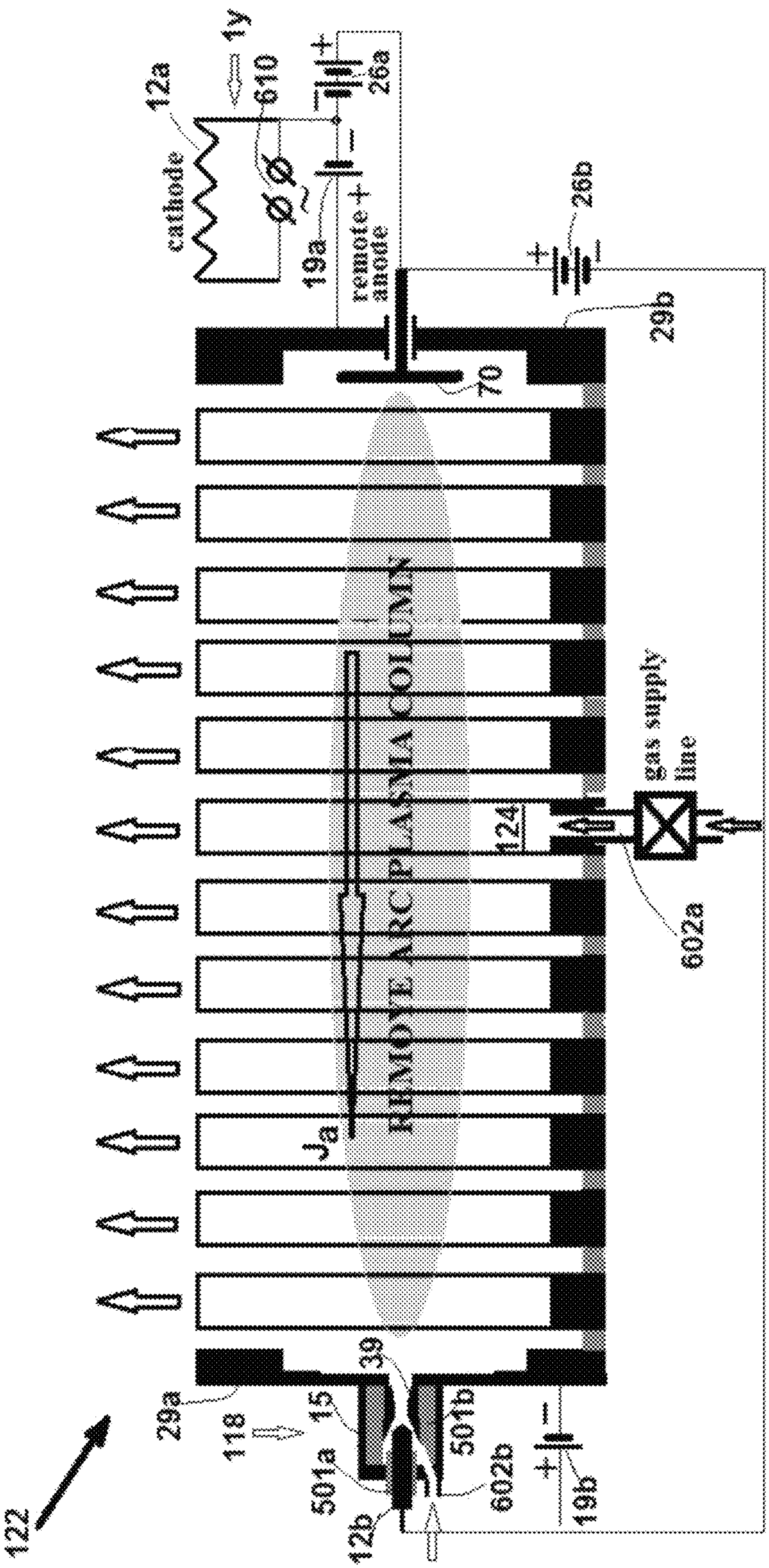
FIG.9f7

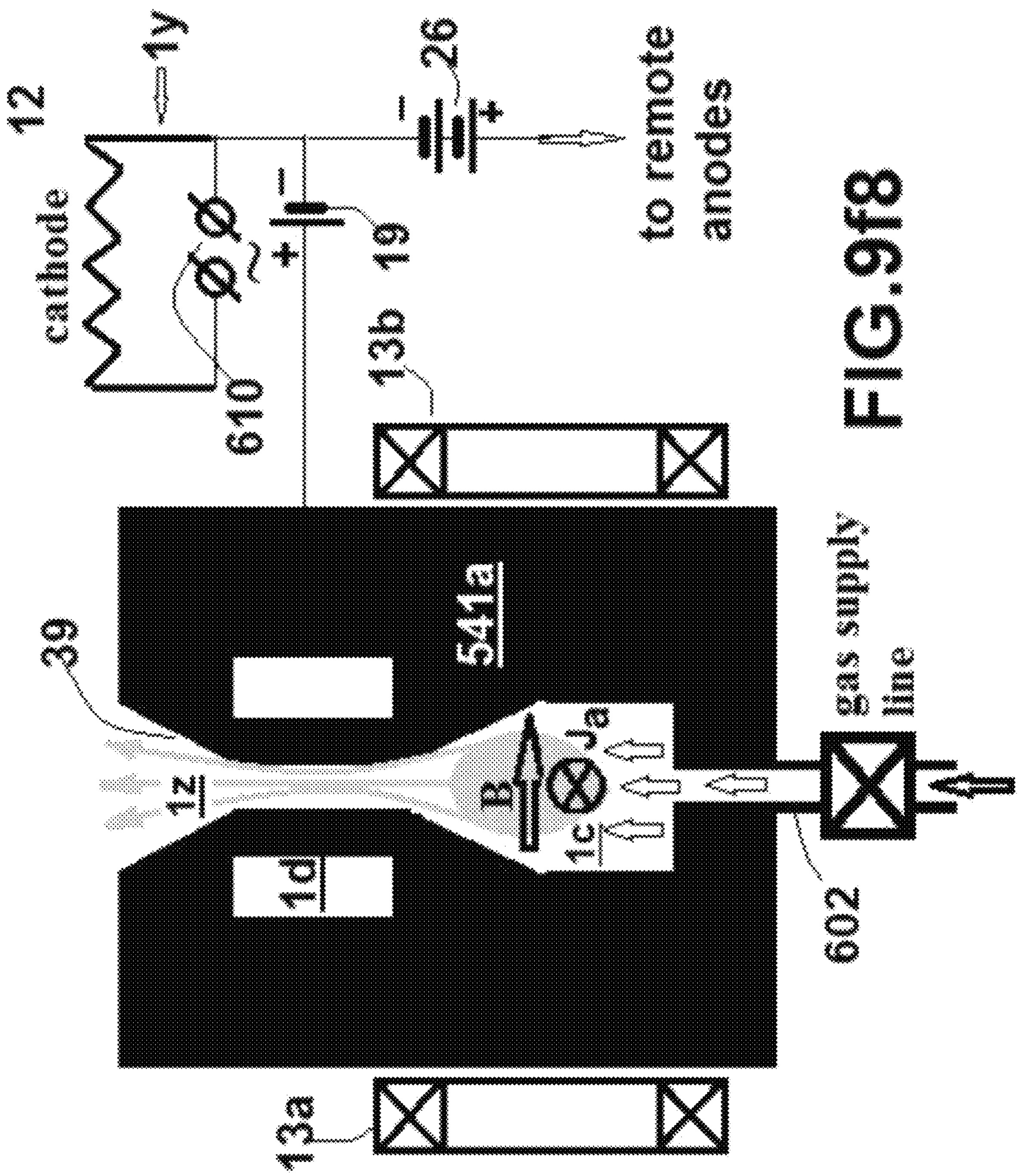
FIG.9f8

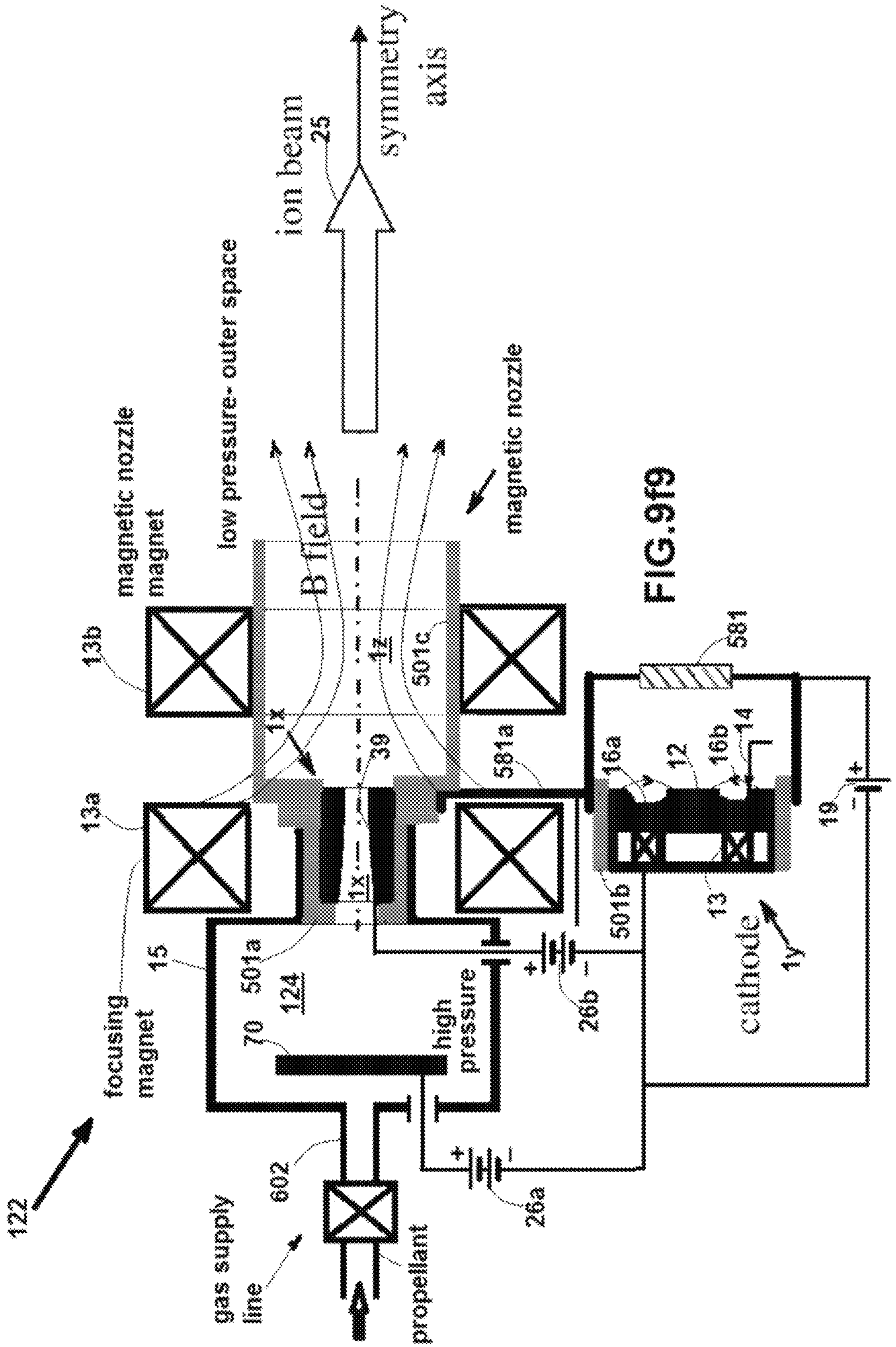
FIG.9f9

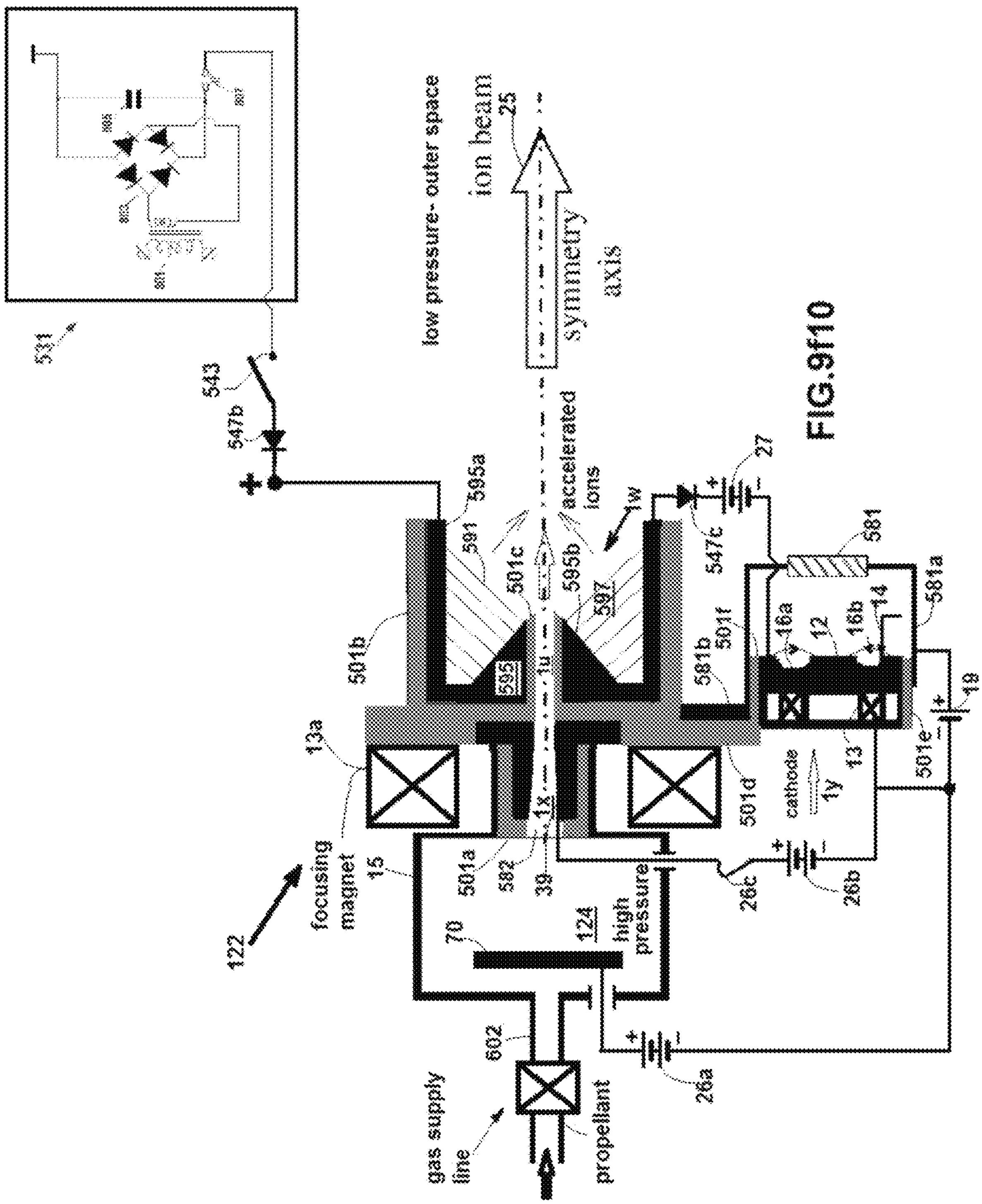
FIG.9f10

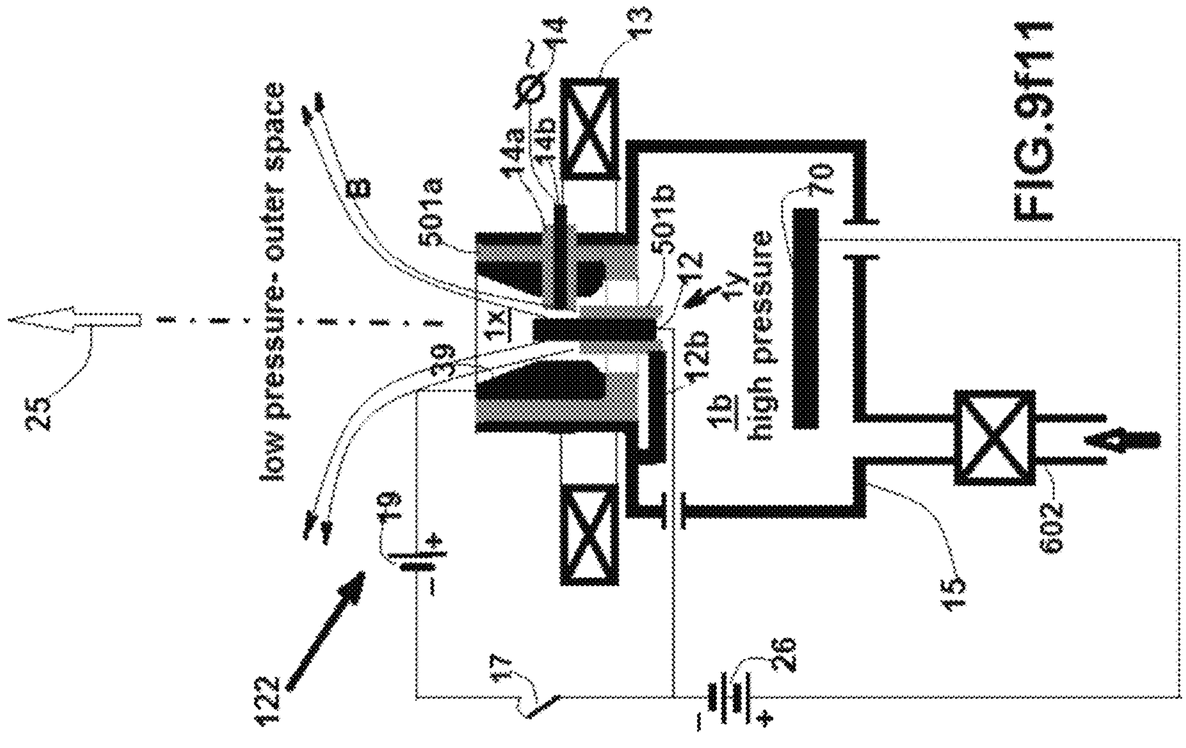
FIG.9f11

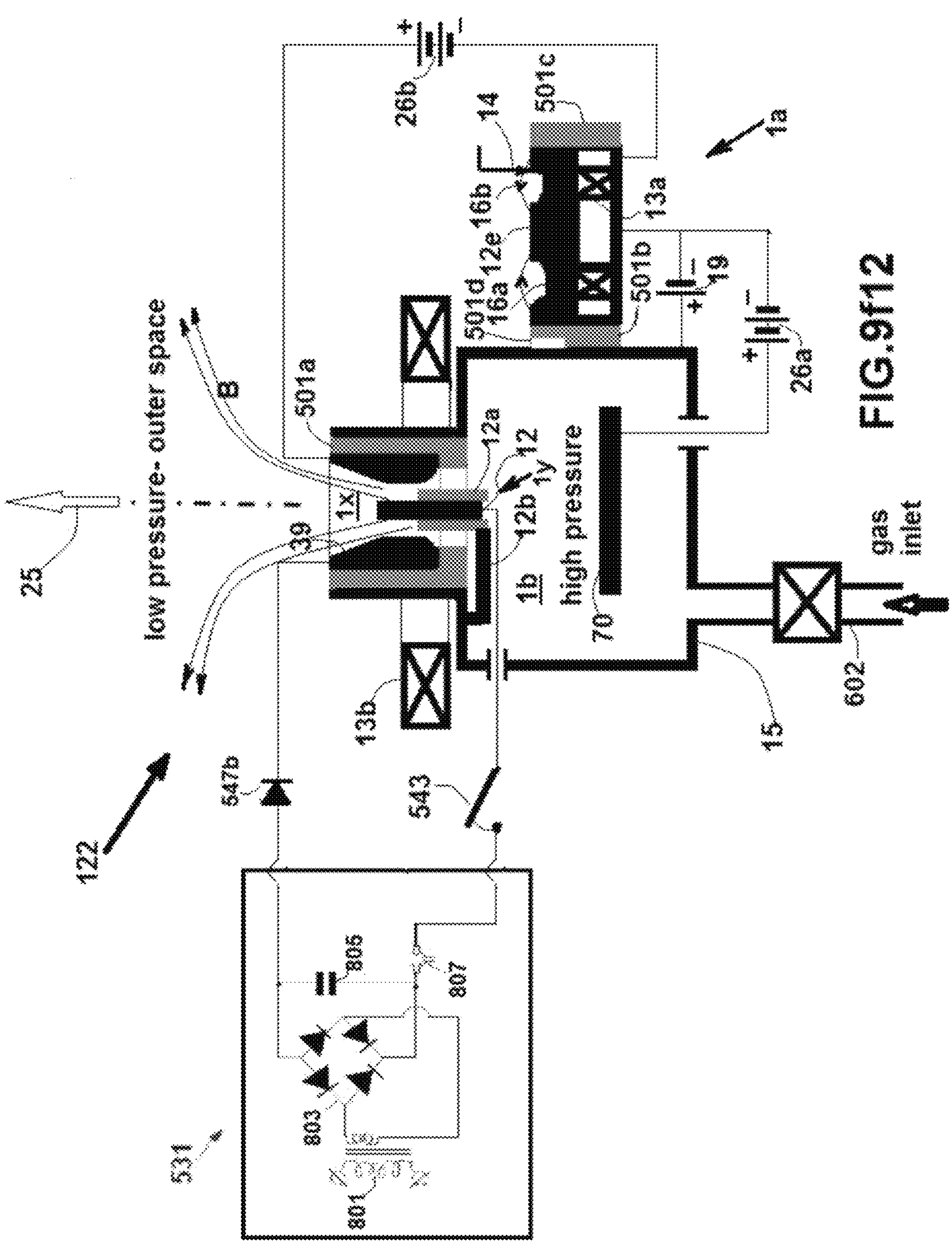
FIG.9f12

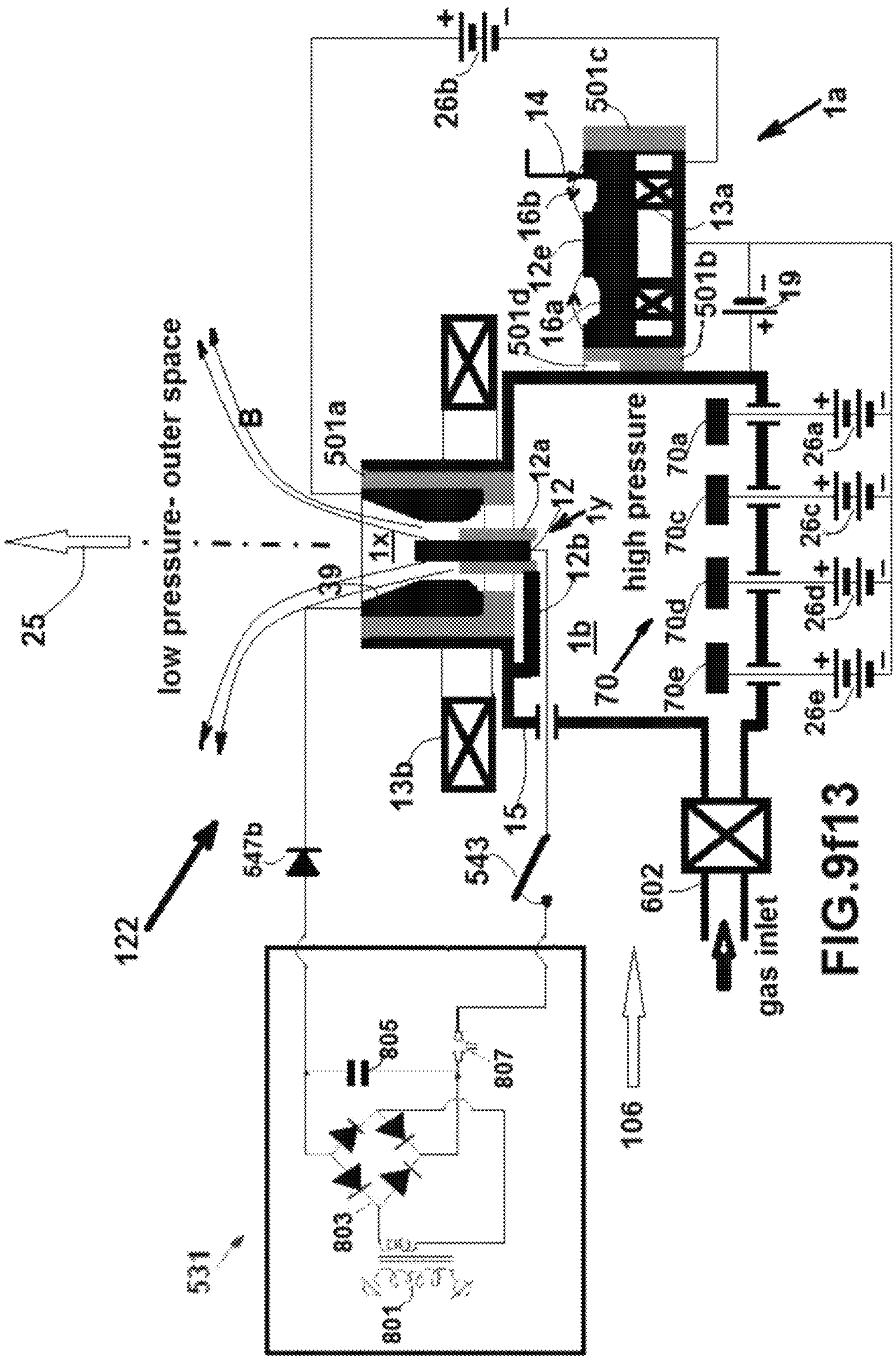
FIG.9f13

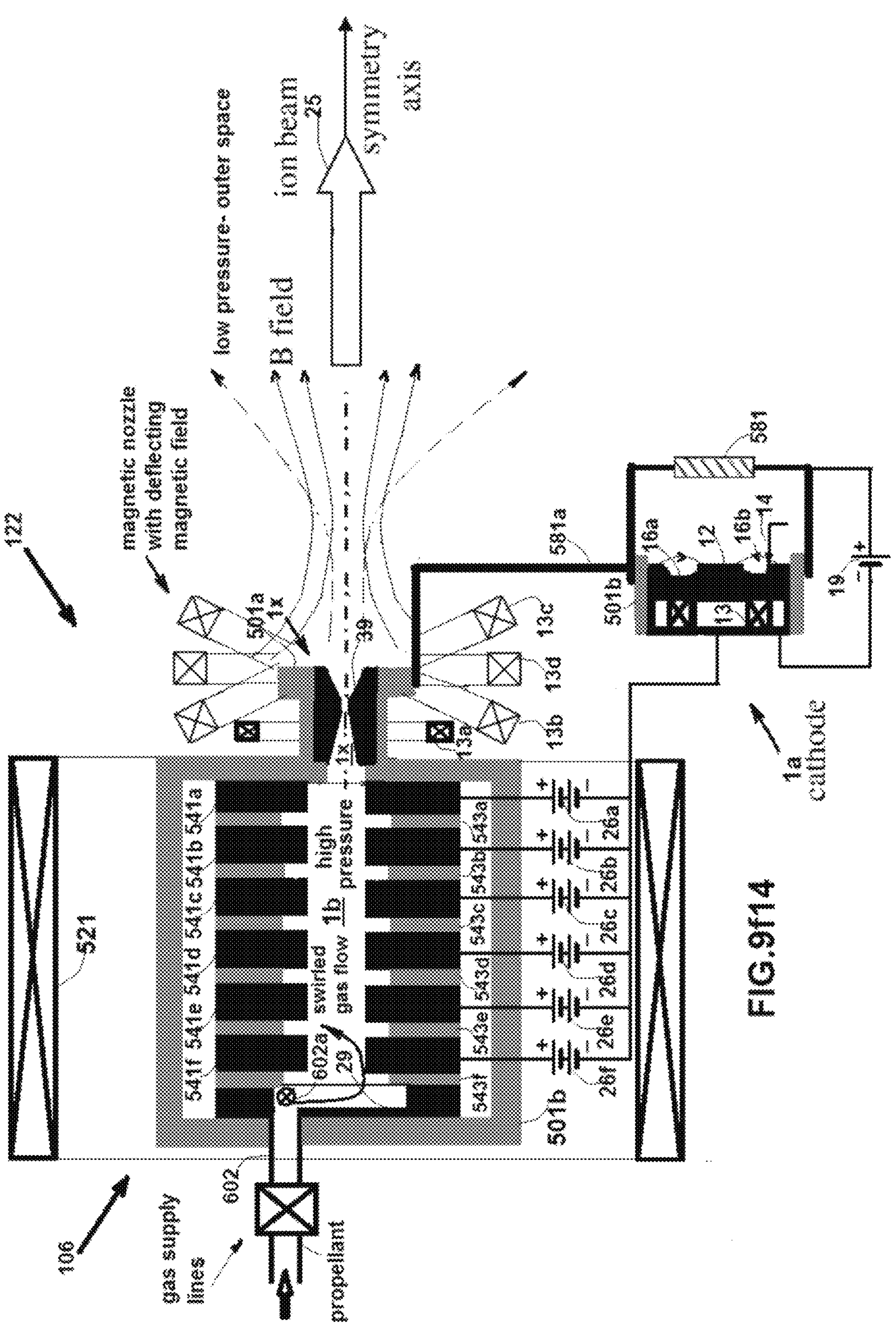
FIG.9f14

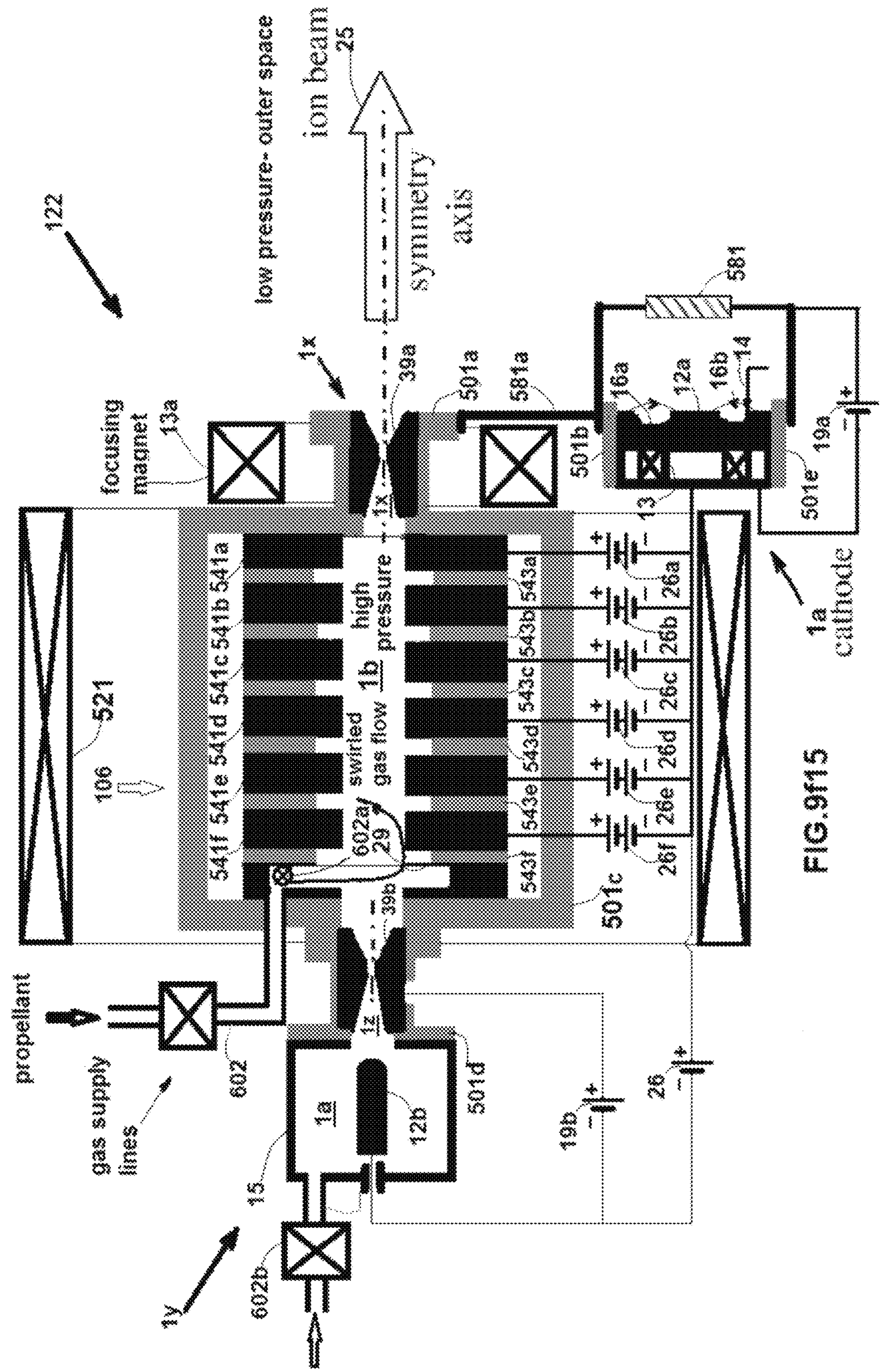
FIG.9f15

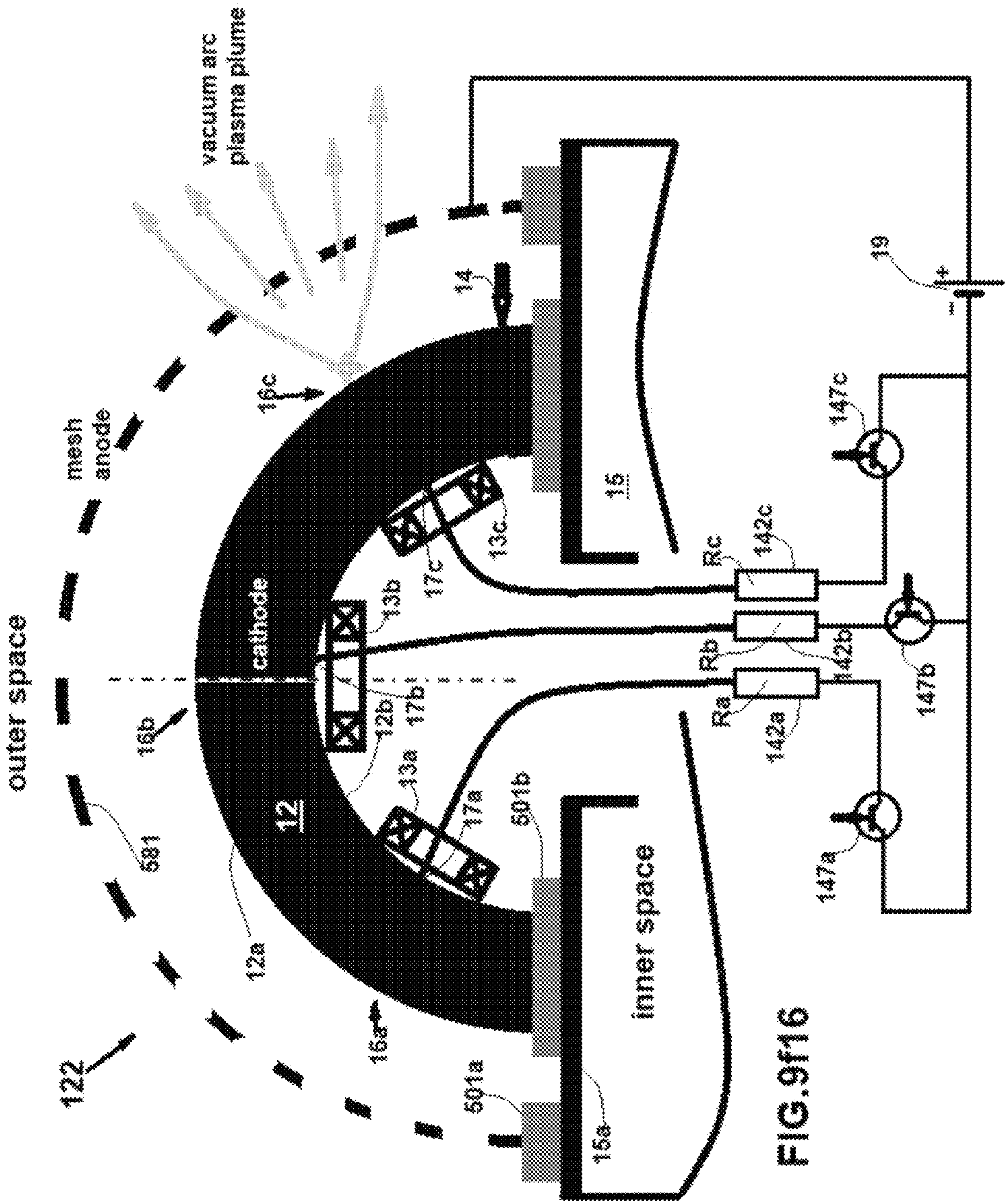
FIG.9f16

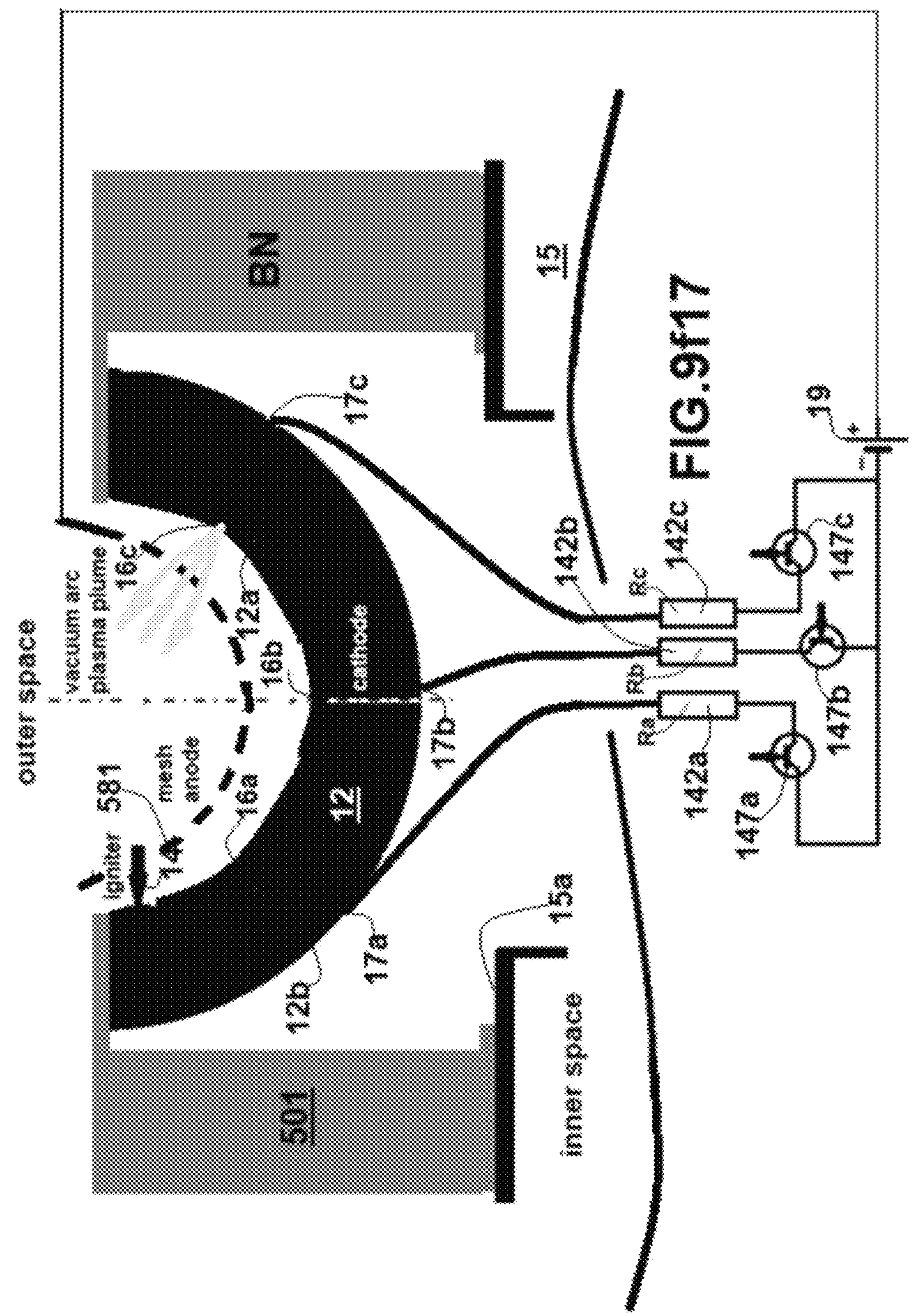
FIG.9f17

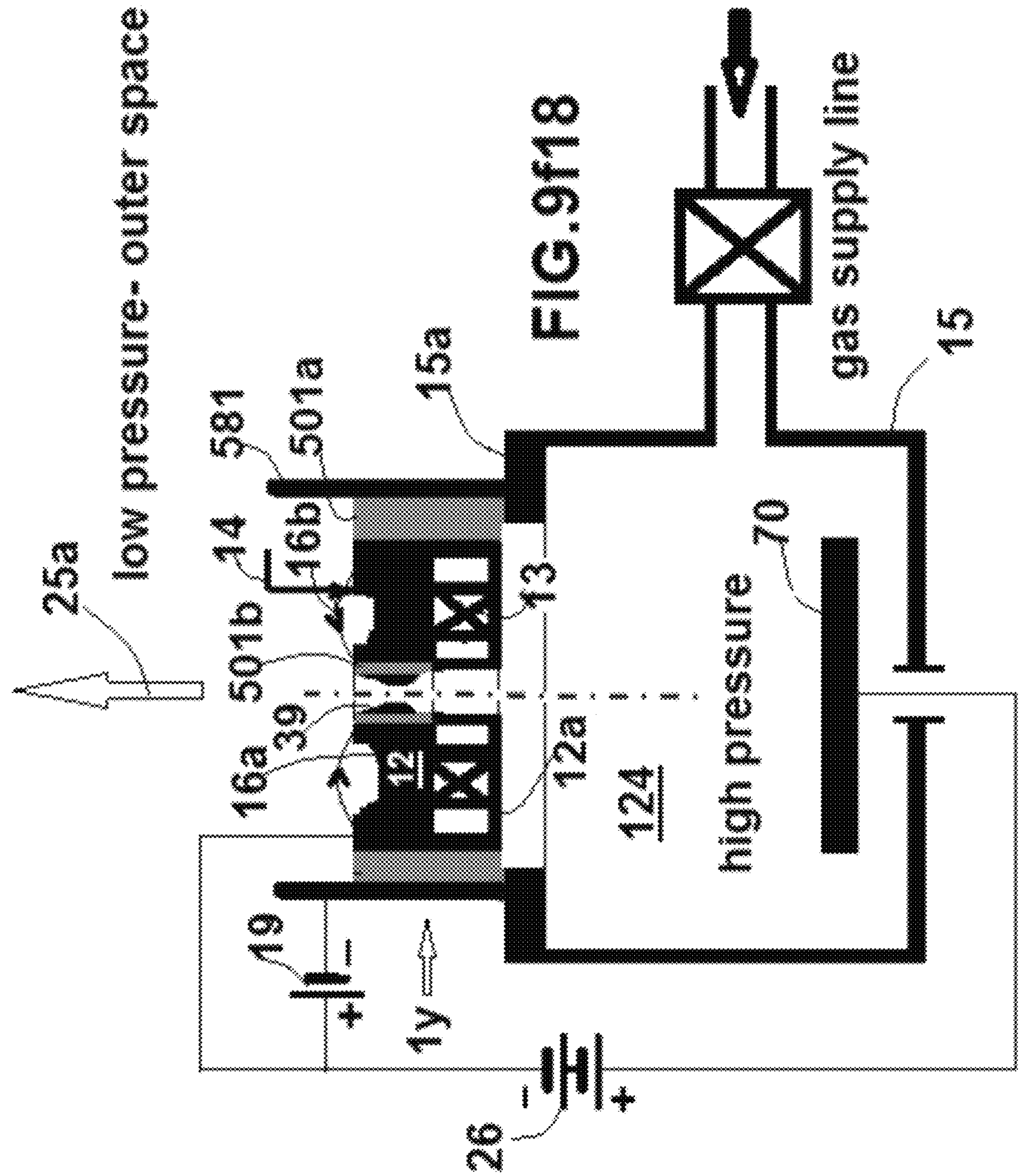
FIG.9f18

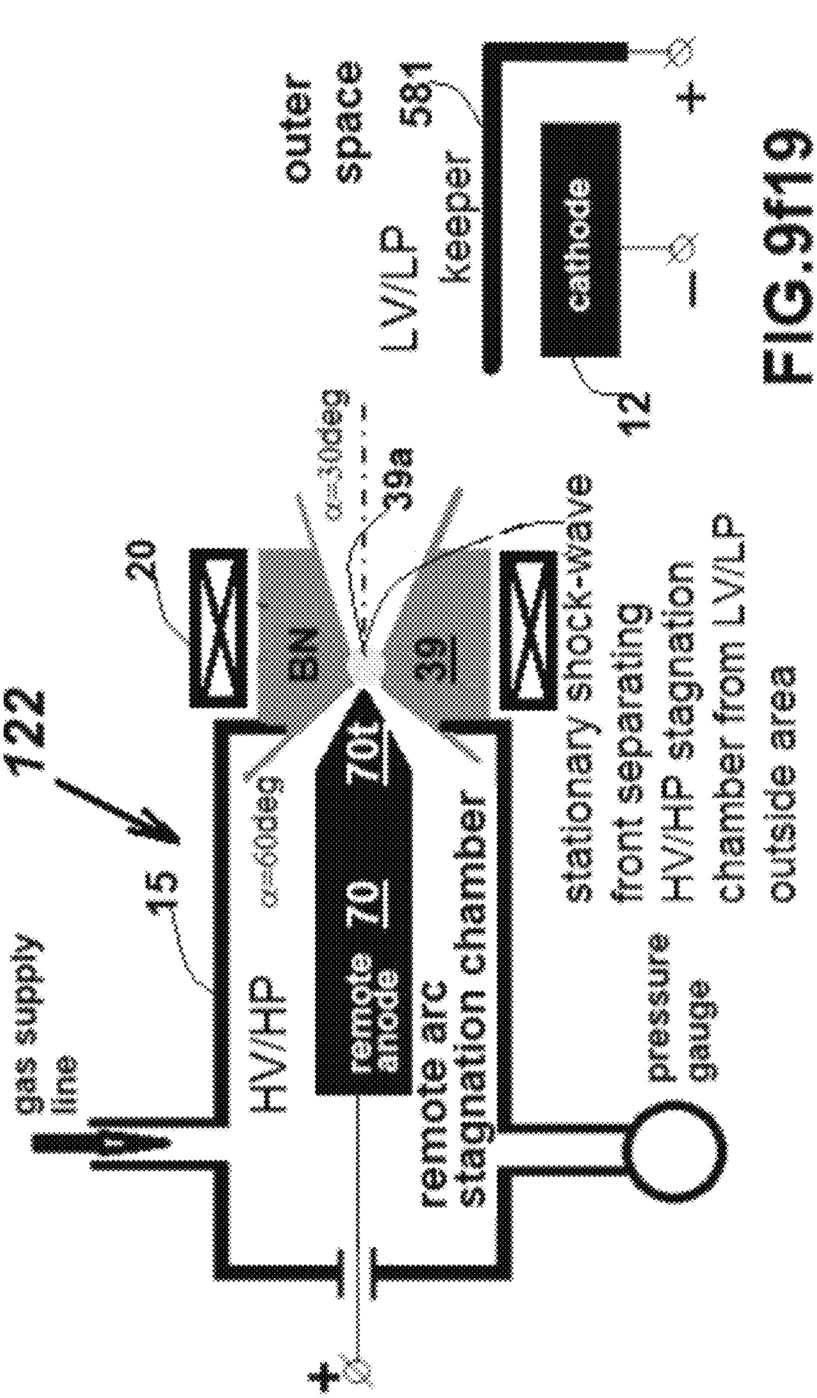
FIG.9f19

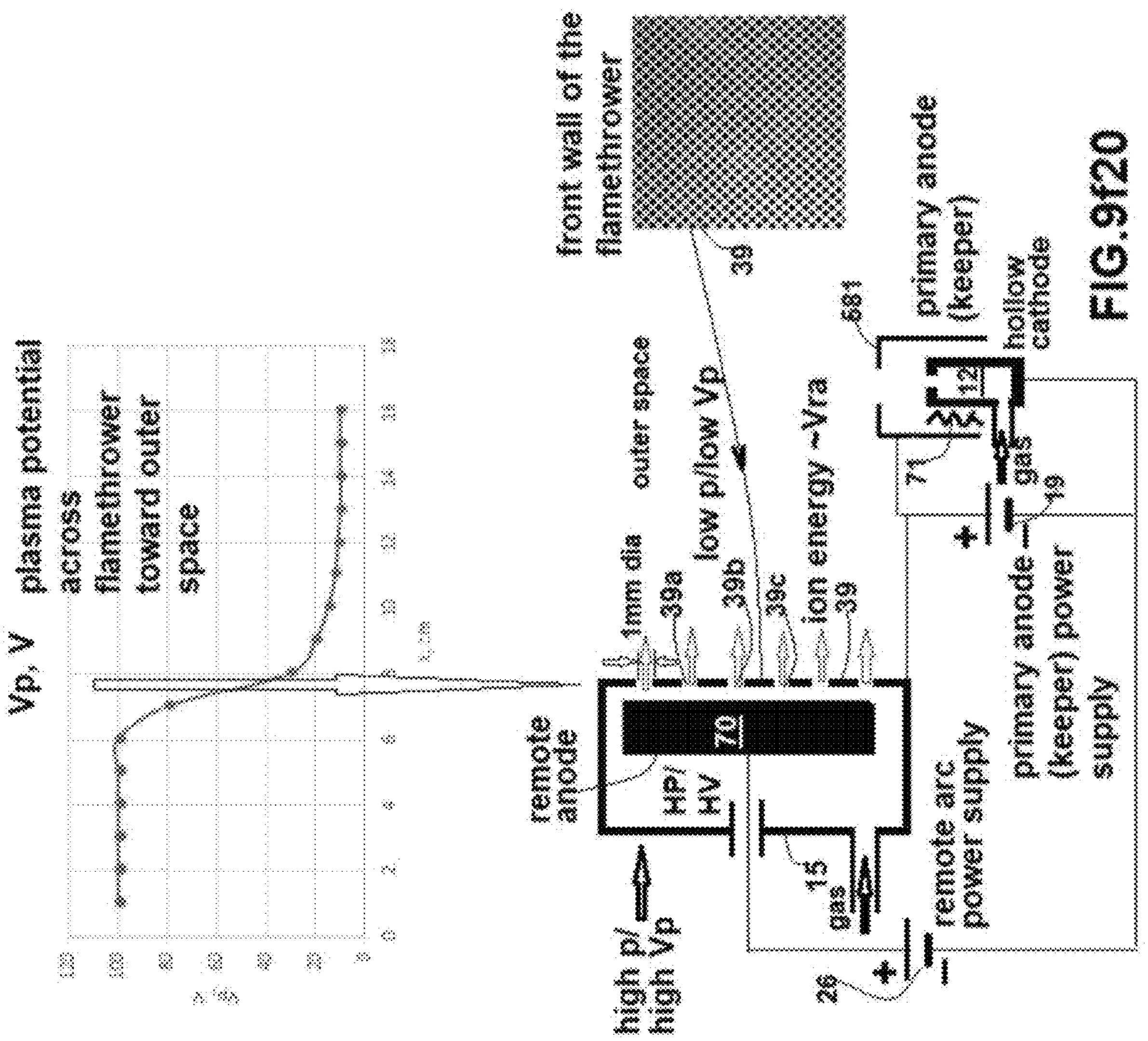
FIG.9f20

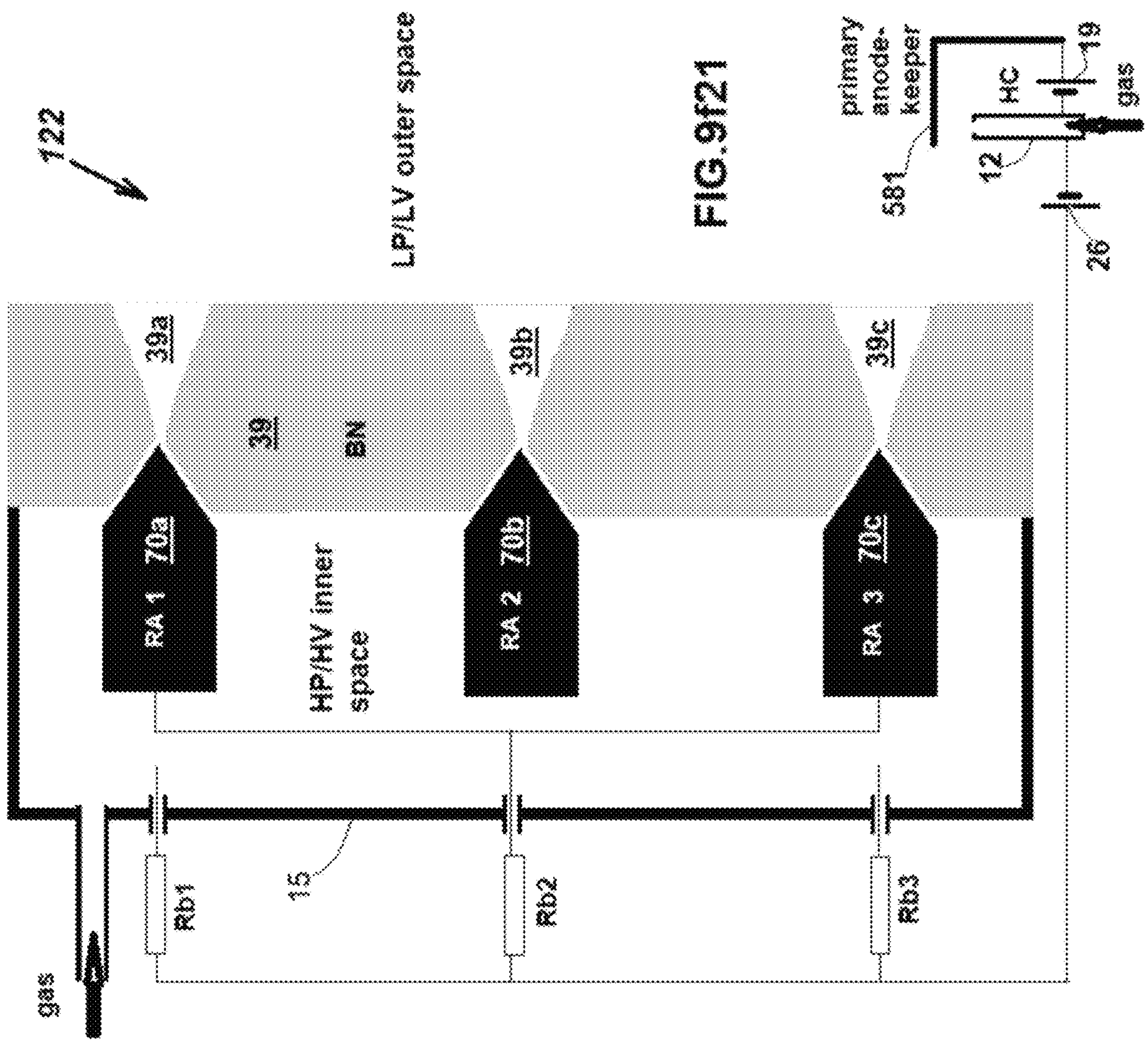
FIG.9f21

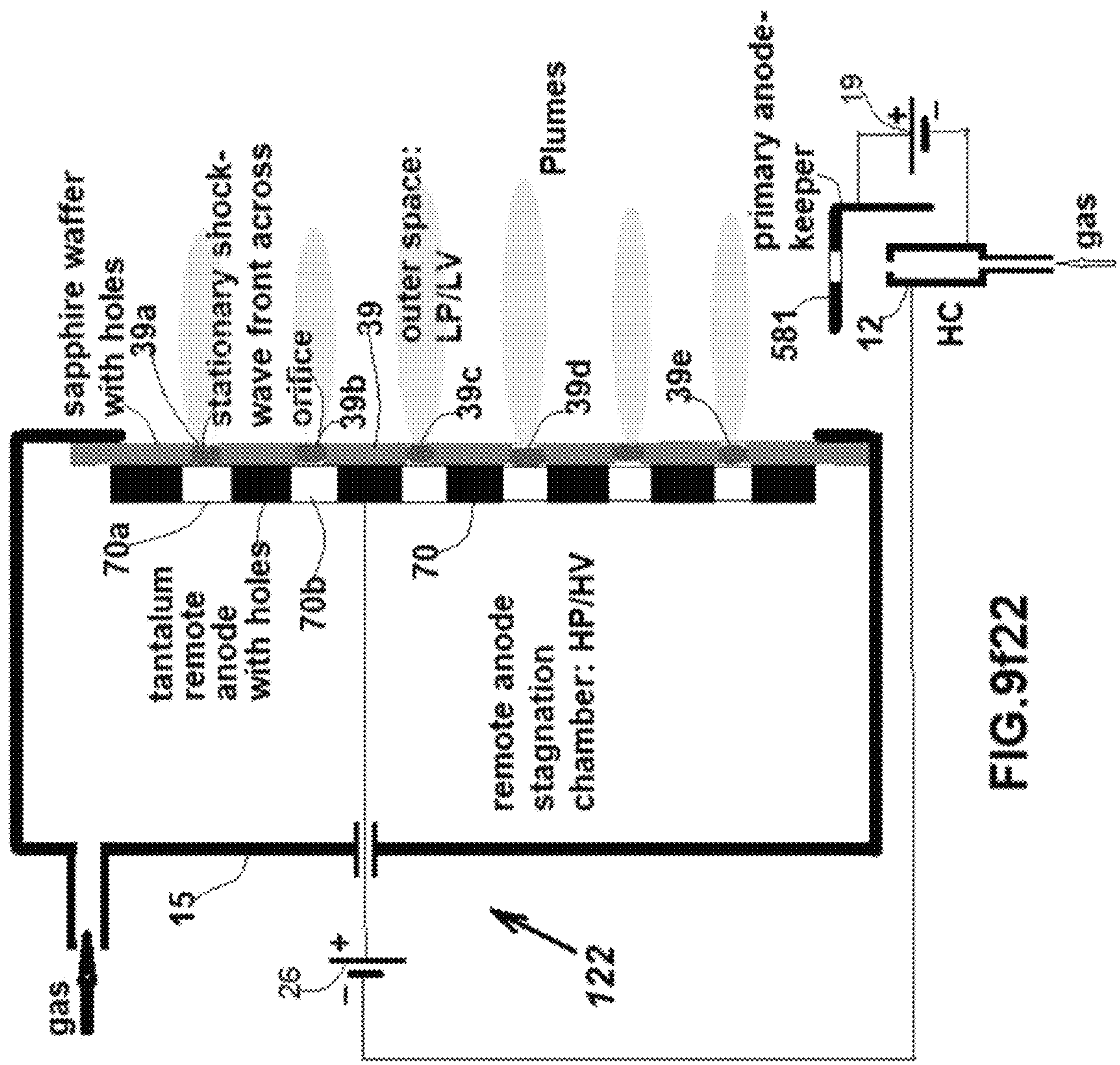
FIG.9f22

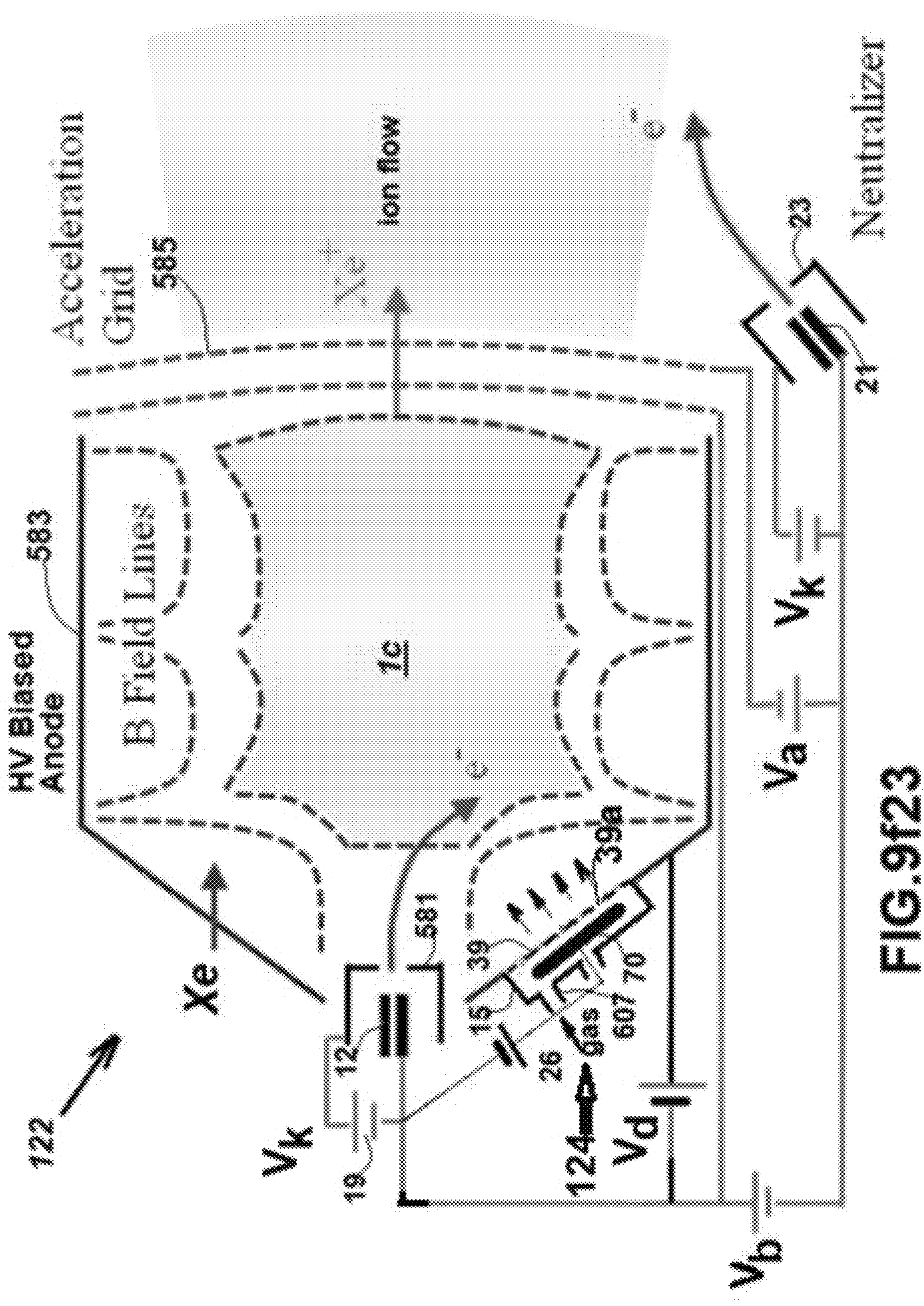
FIG.9f23

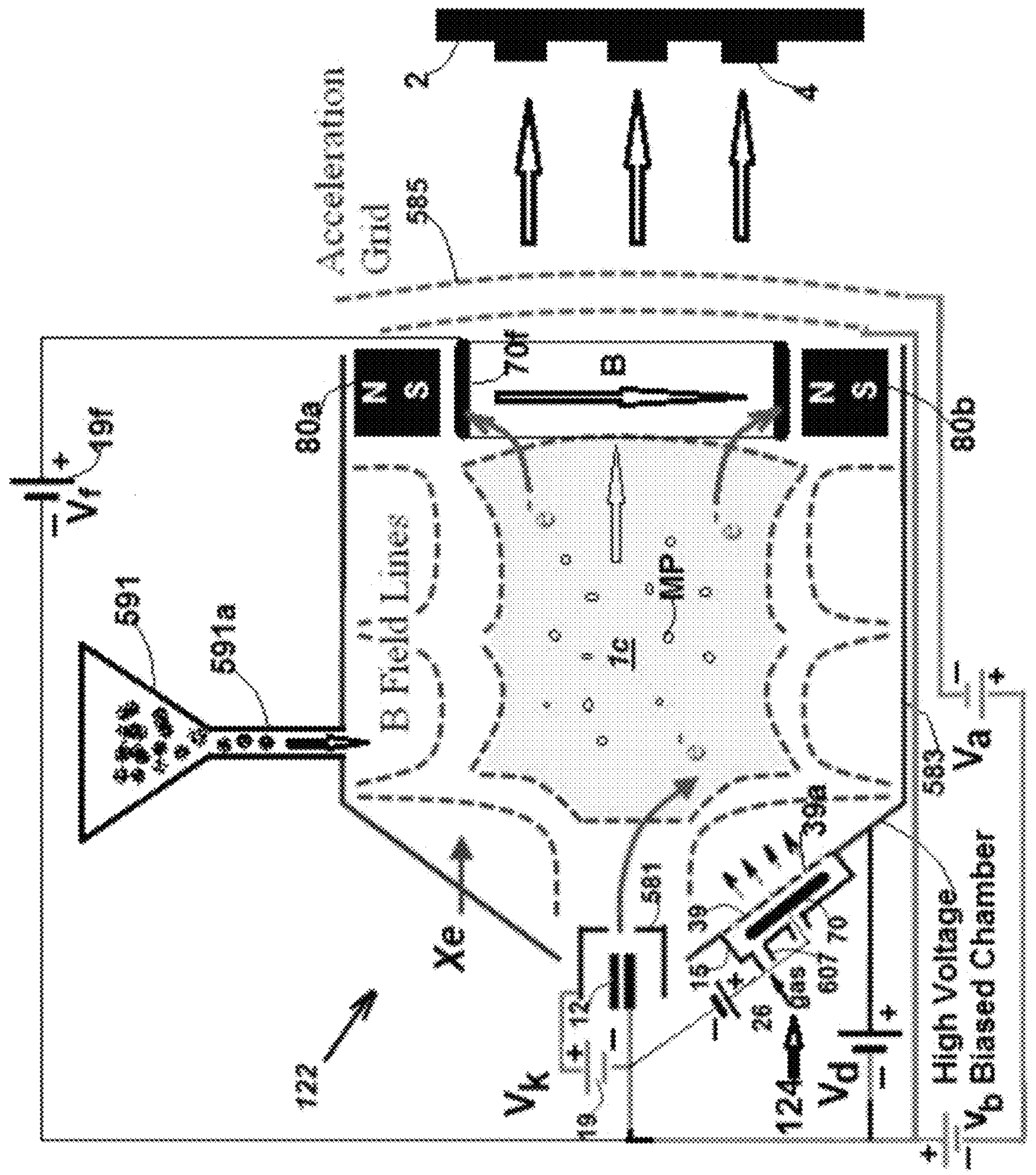
FIG.9f23a

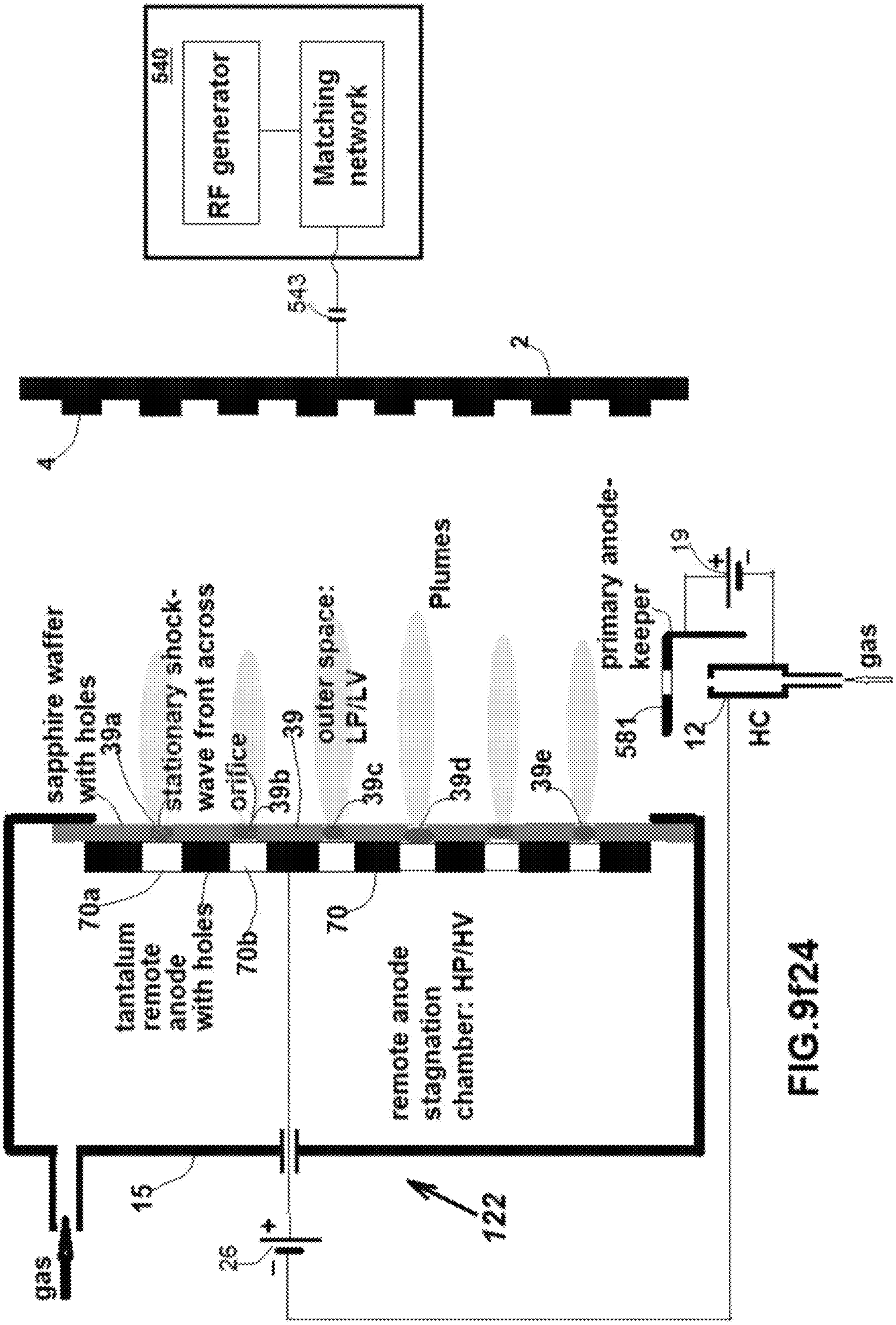
FIG.9f24

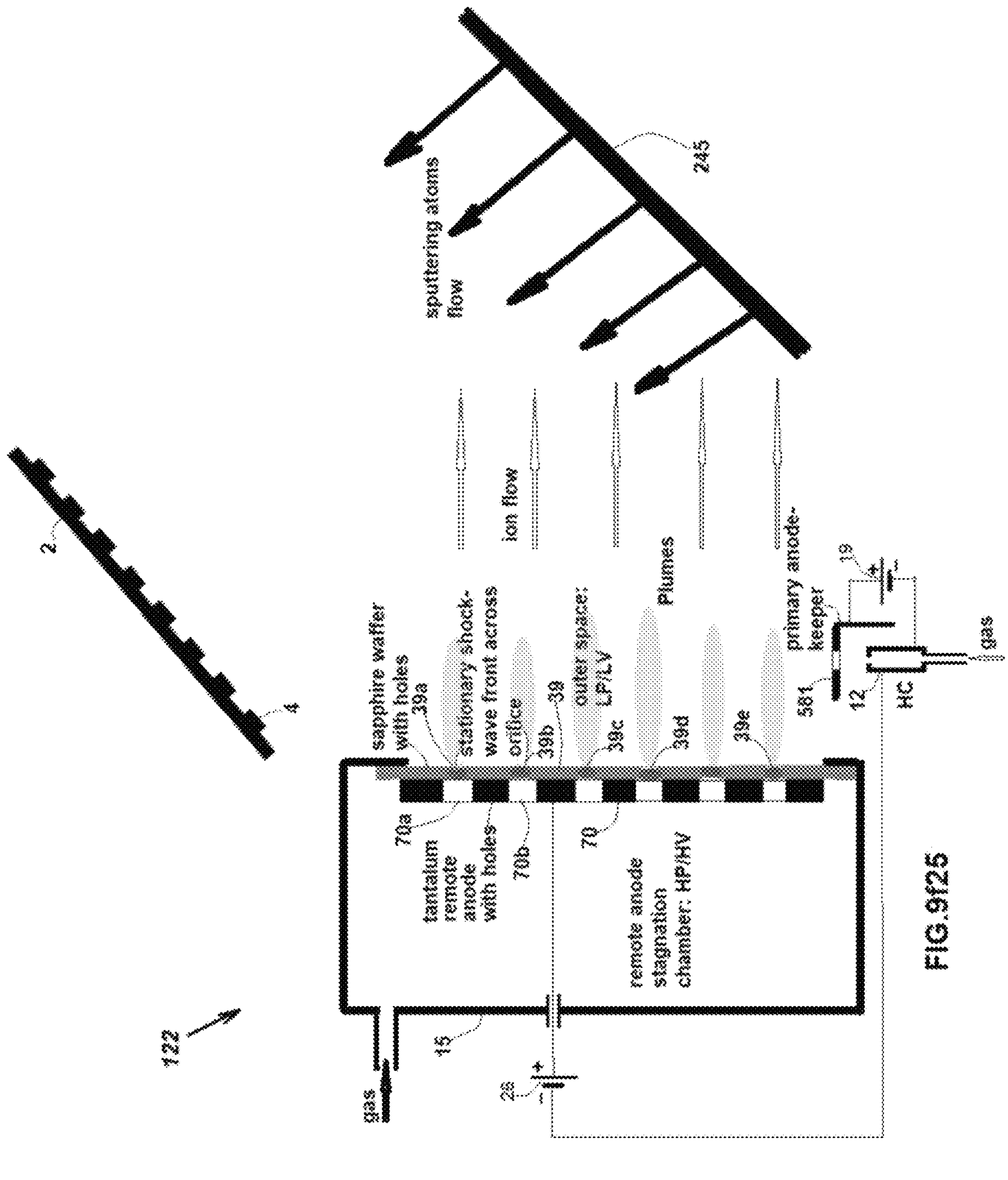
FIG.9f25

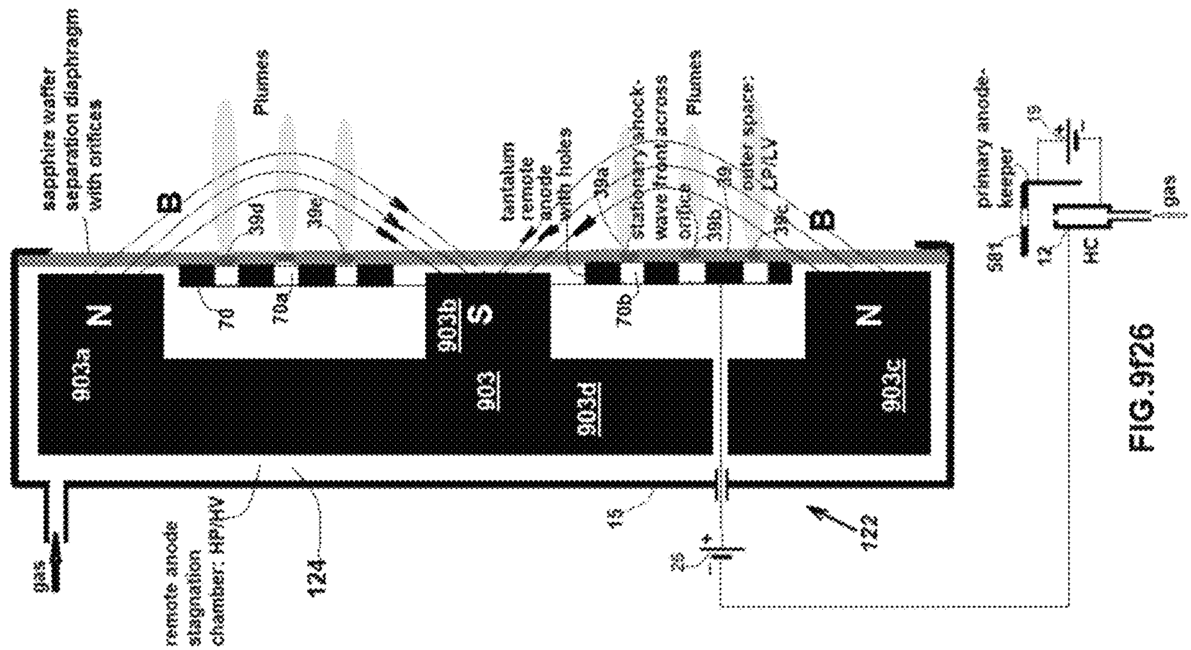
FIG.9f26

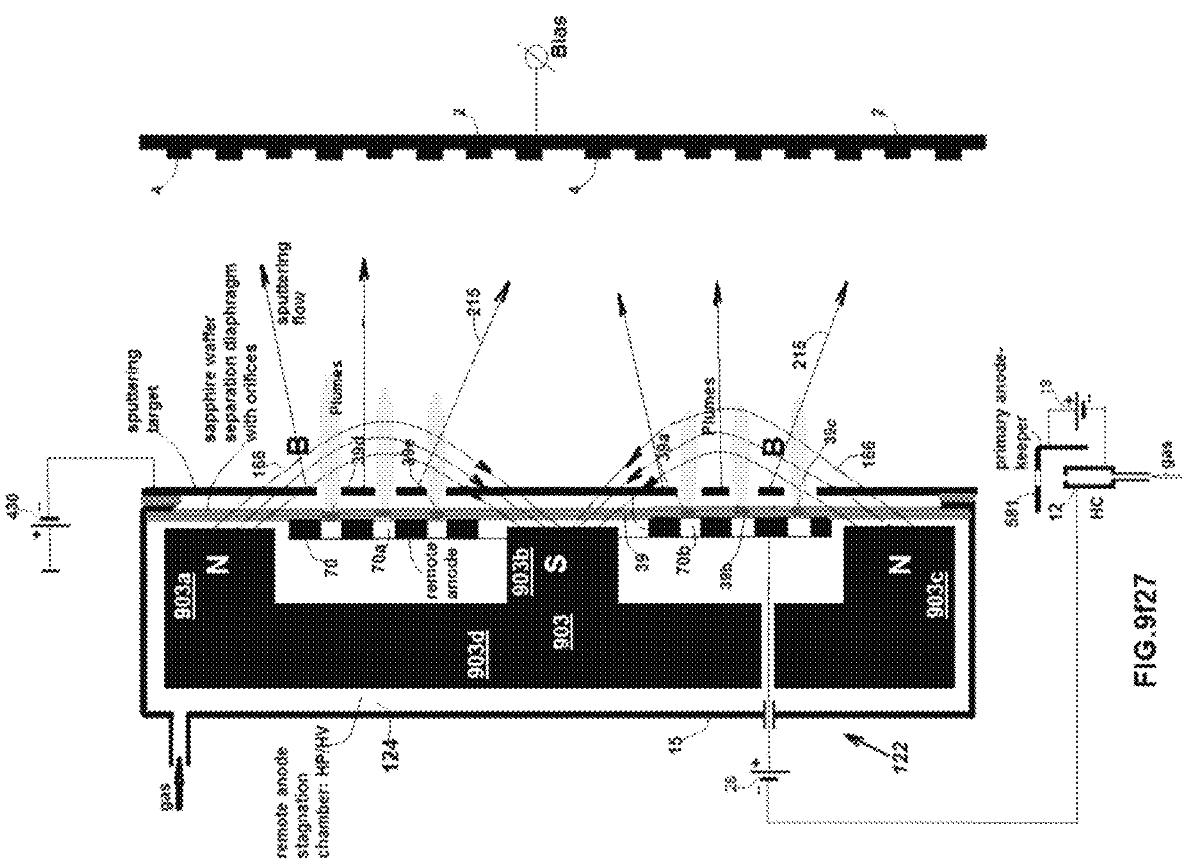
FIG.9f27

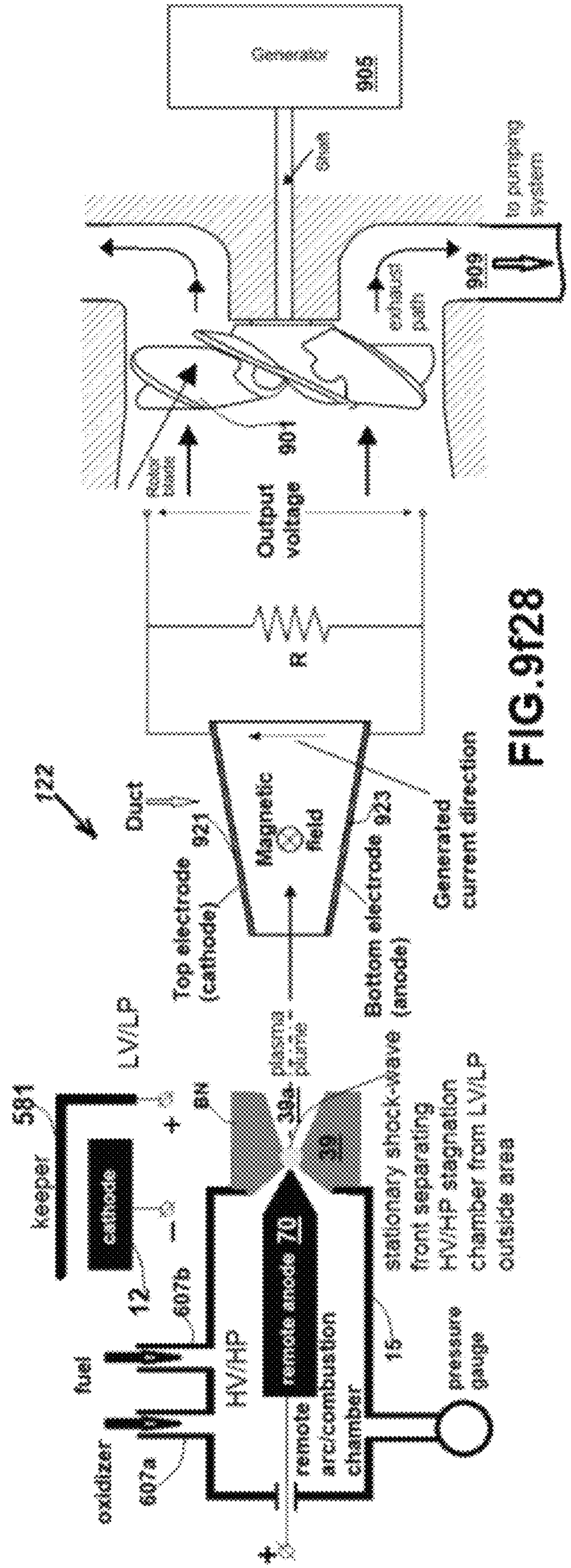
FIG.9f28

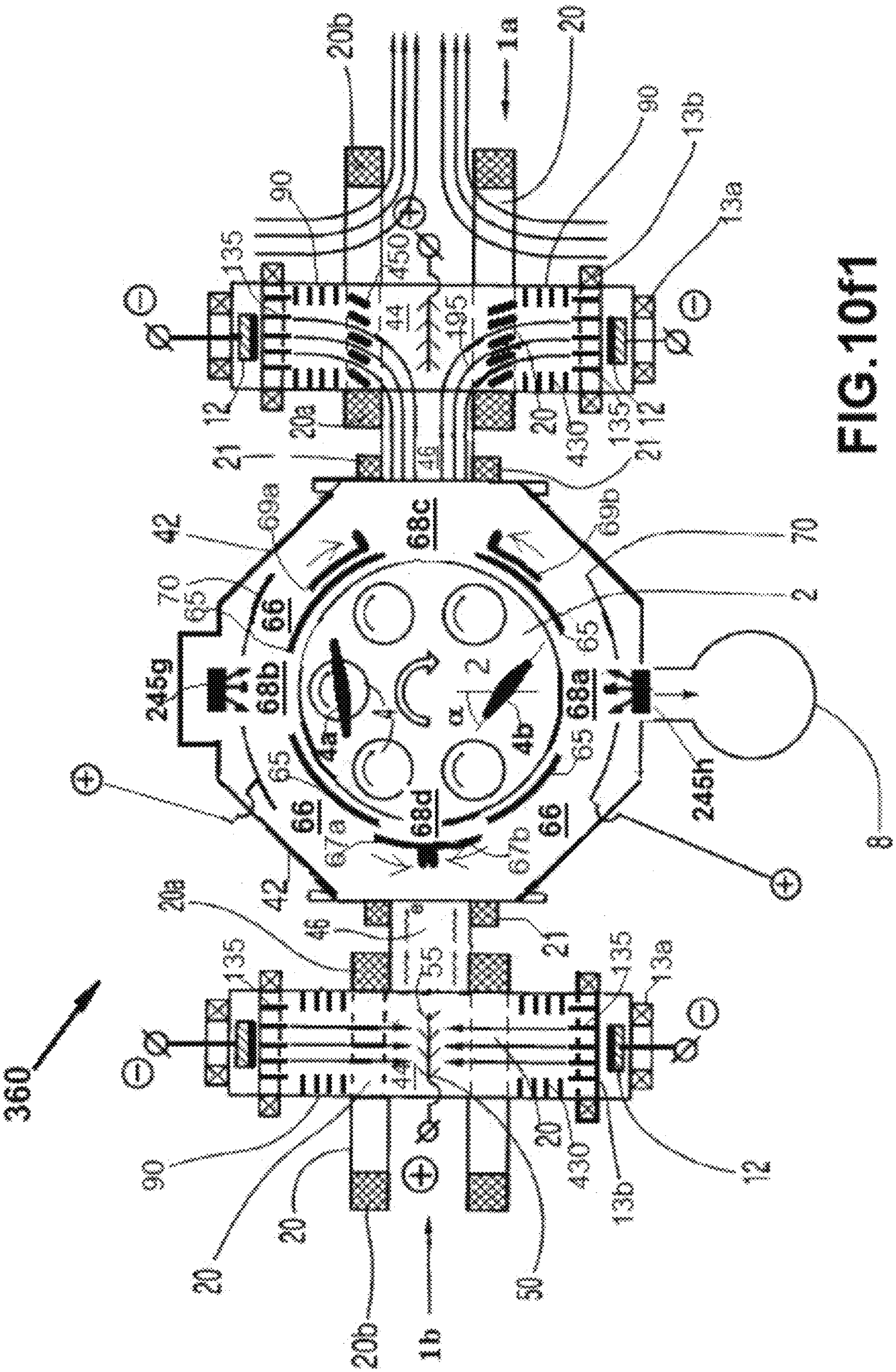
FIG.10f1

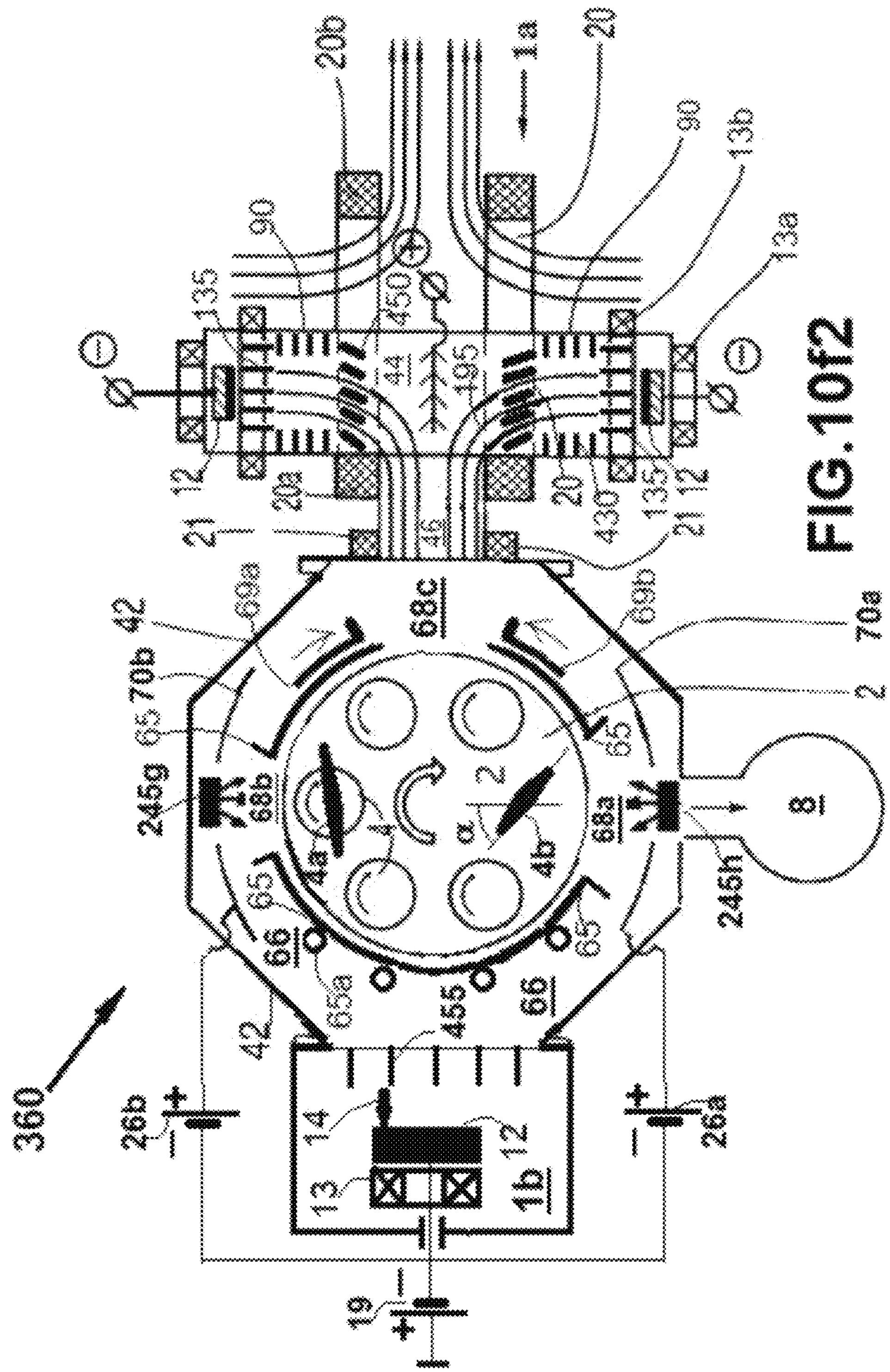
FIG.10f2

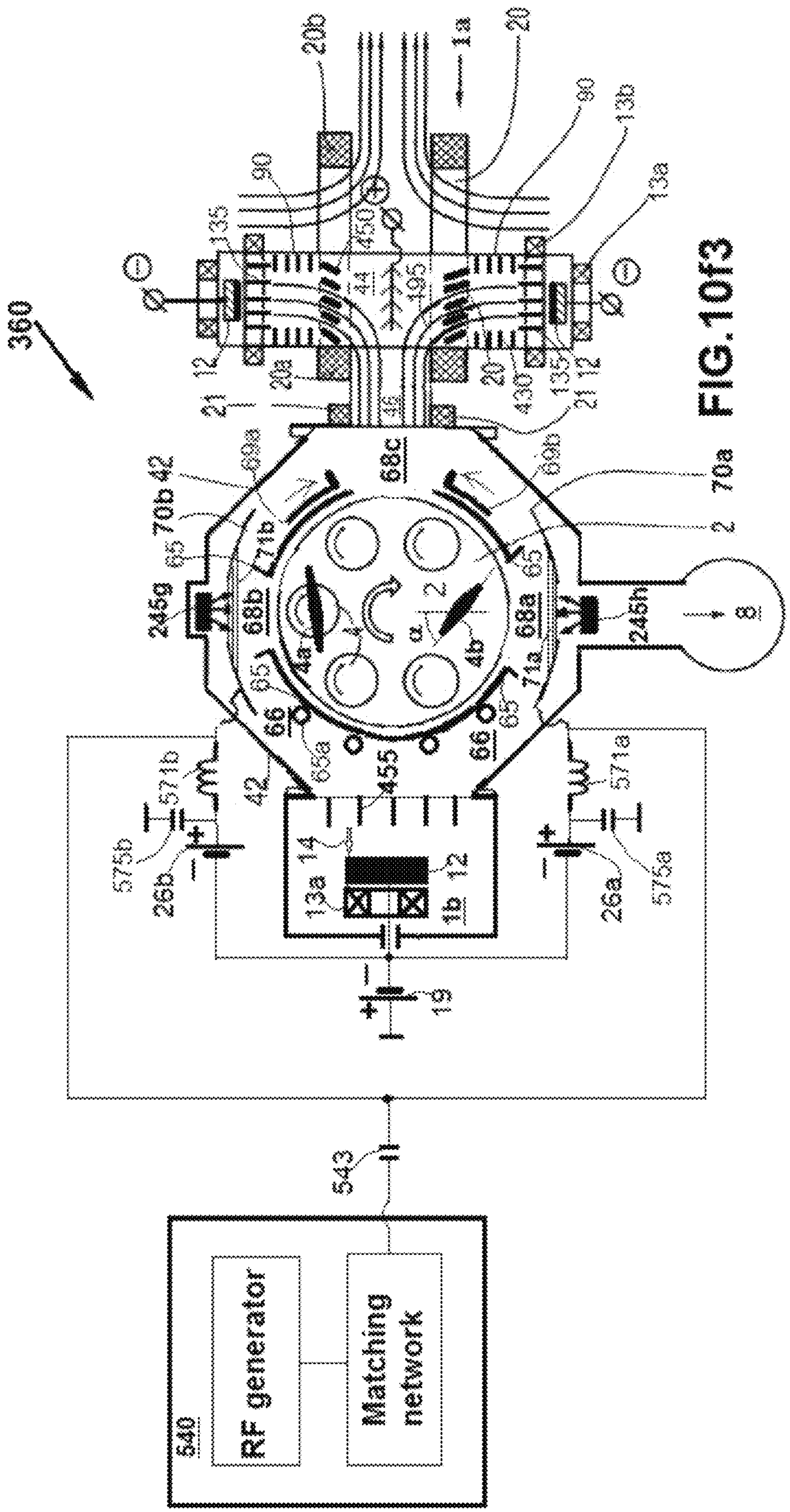
FIG.10f3

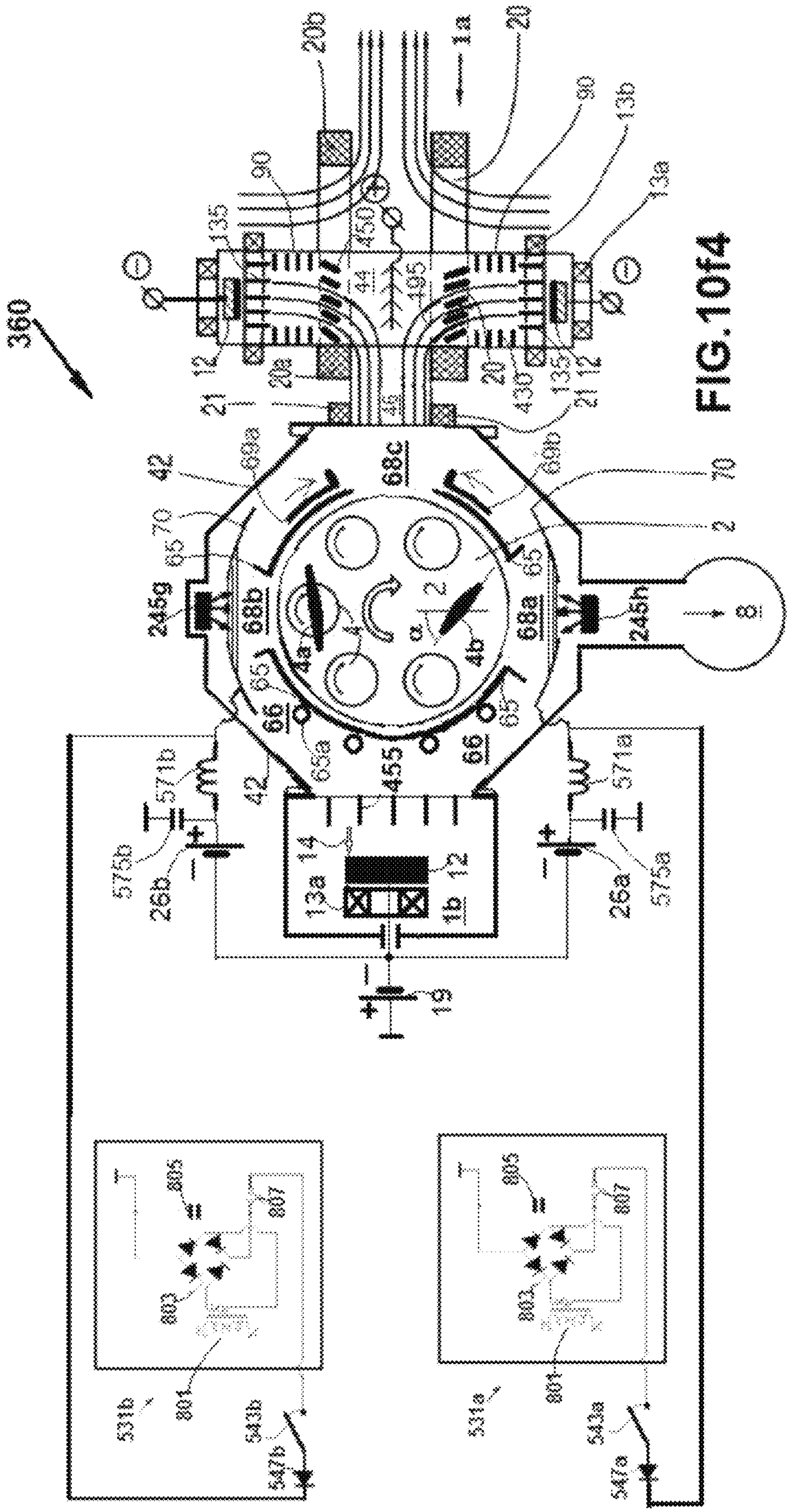
FIG.10f4

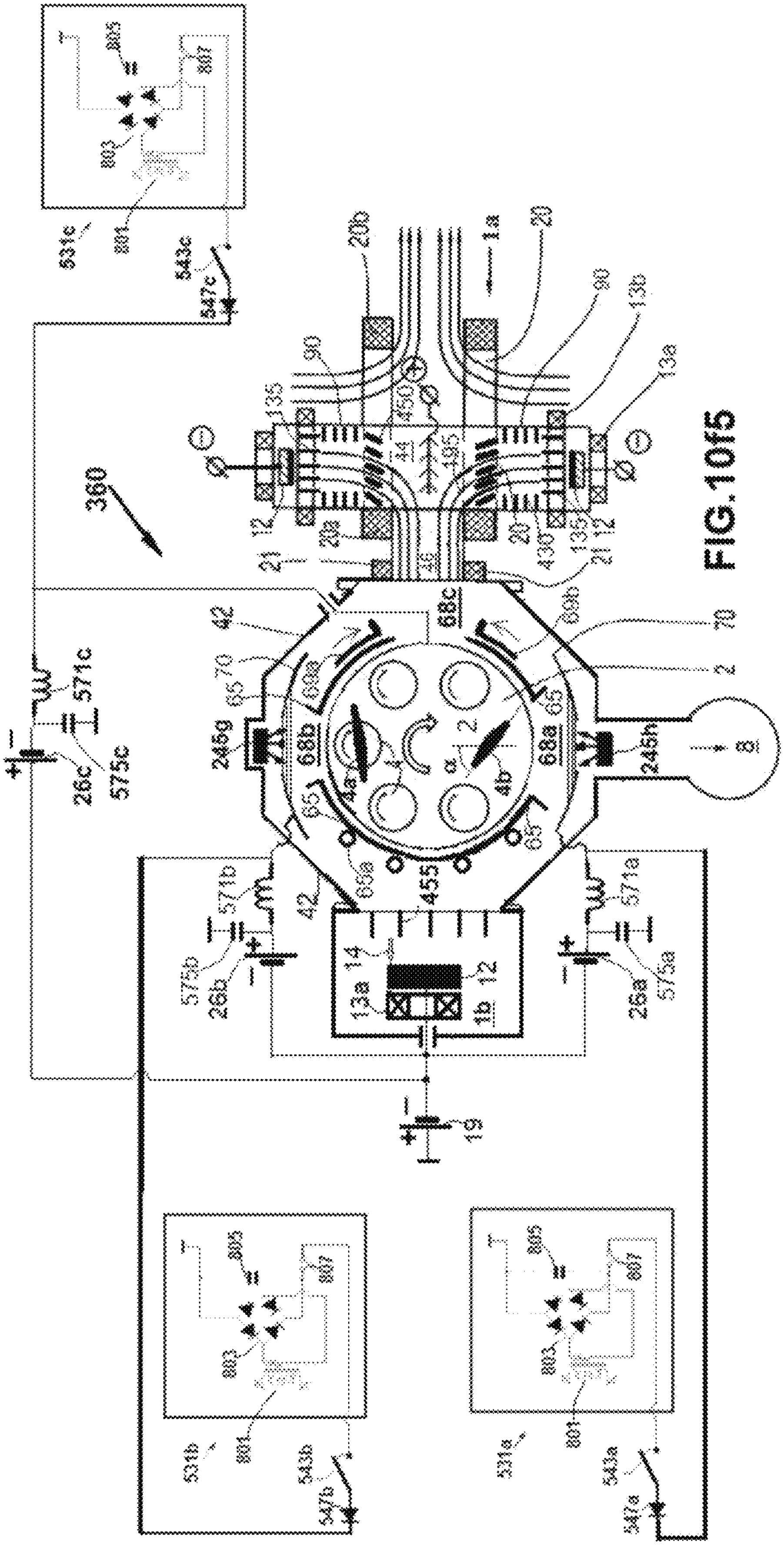
FIG.10f5

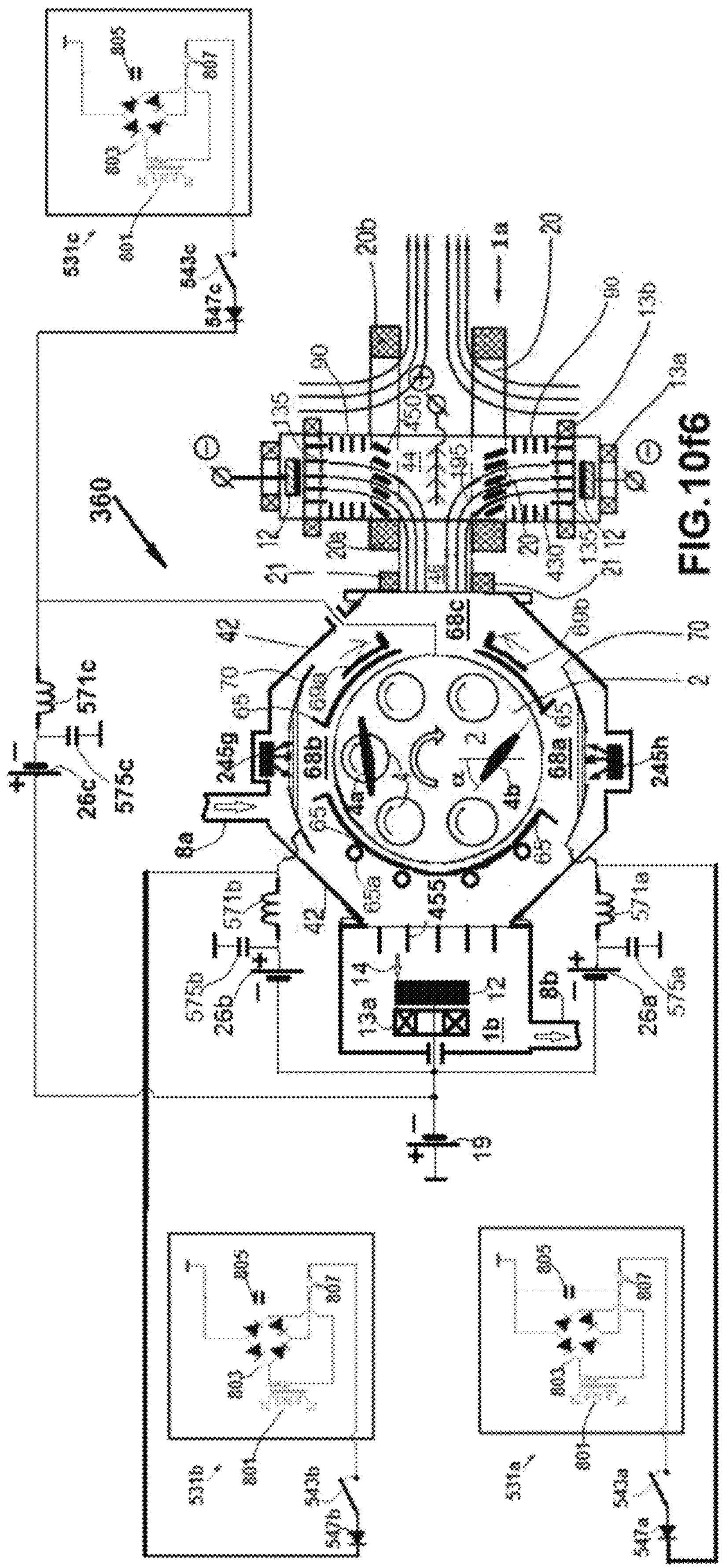
FIG.10f6

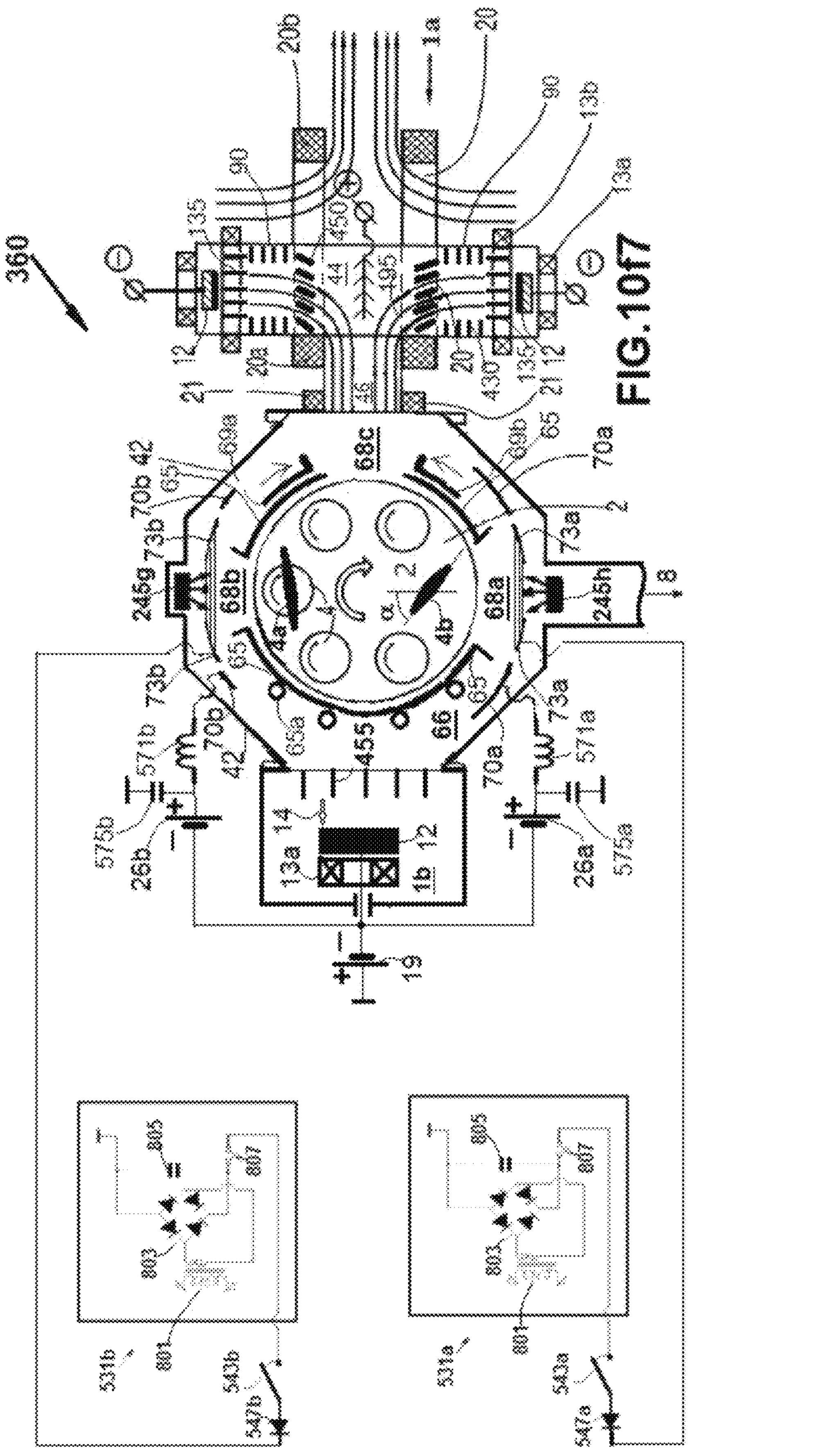
FIG. 10f7

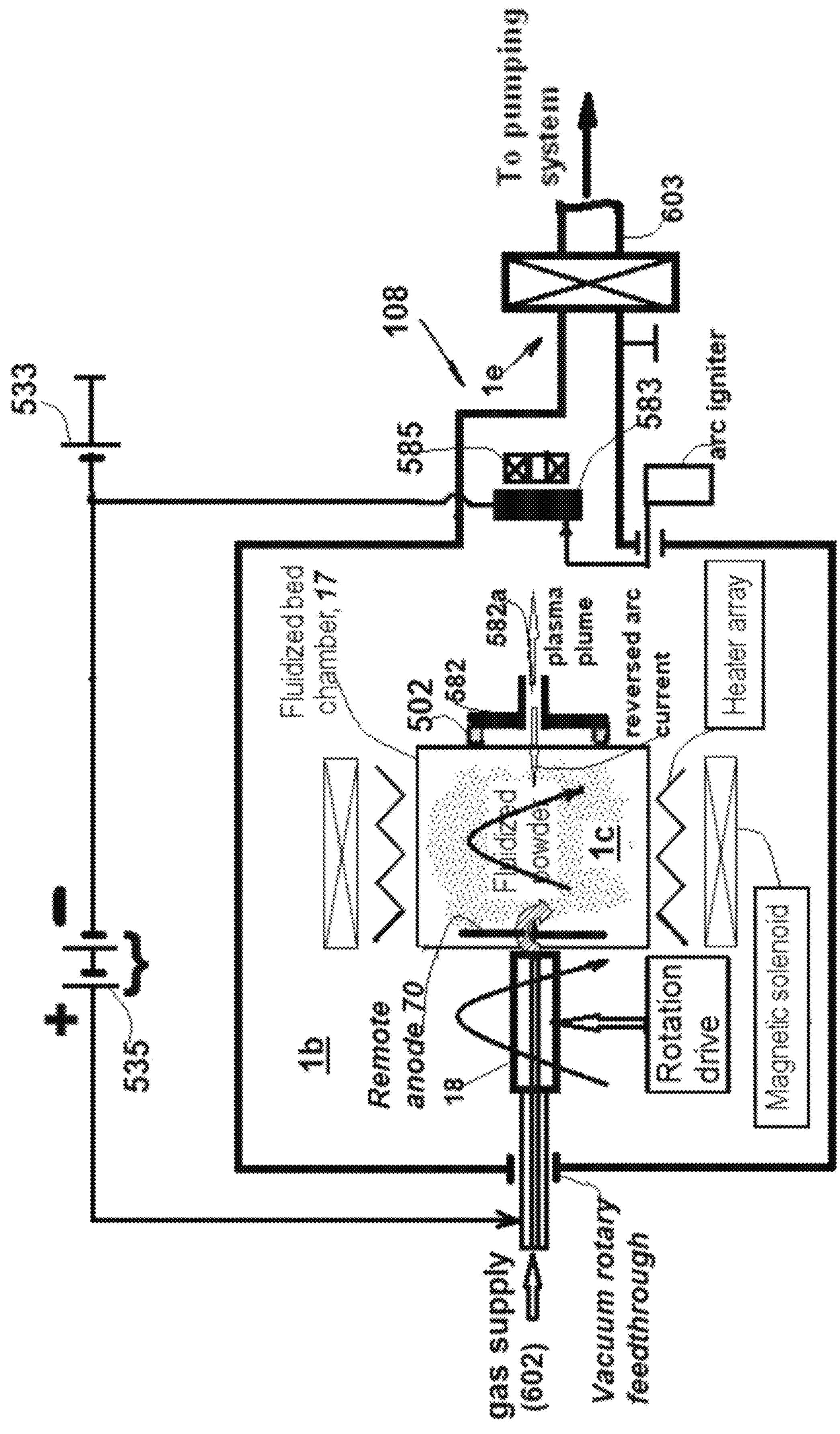
FIG.13a1

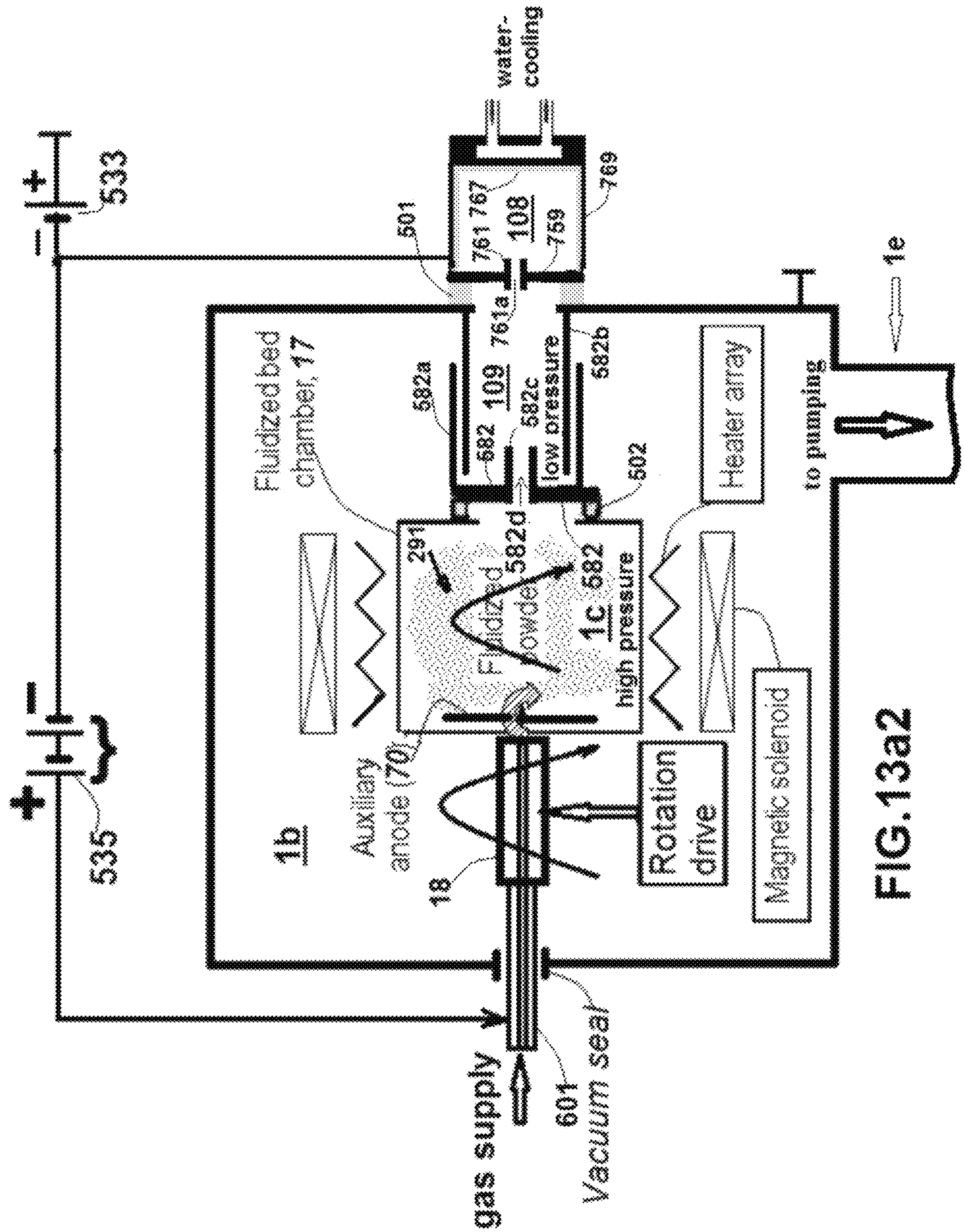
FIG.13a2

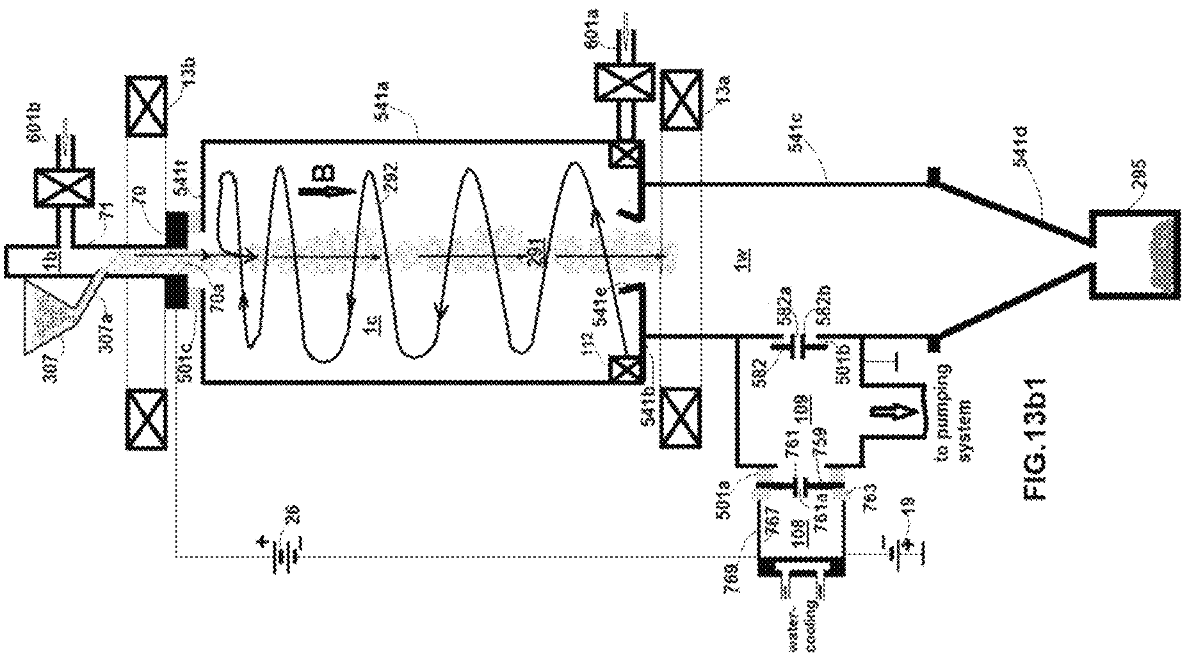
FIG.13b1

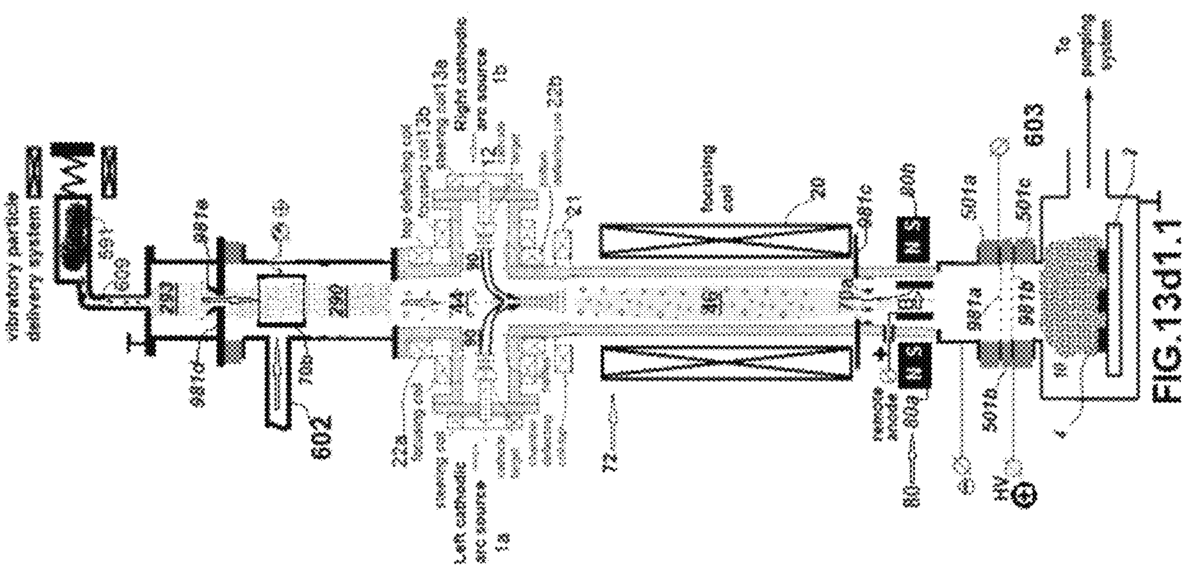
FIG.13d1.1

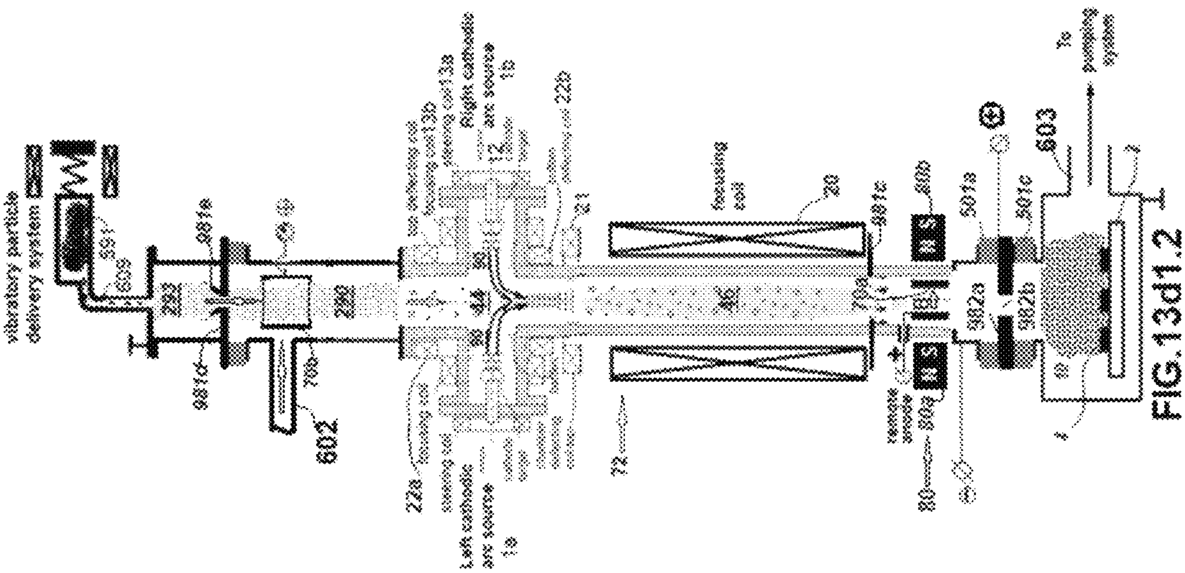
FIG.13d1.2

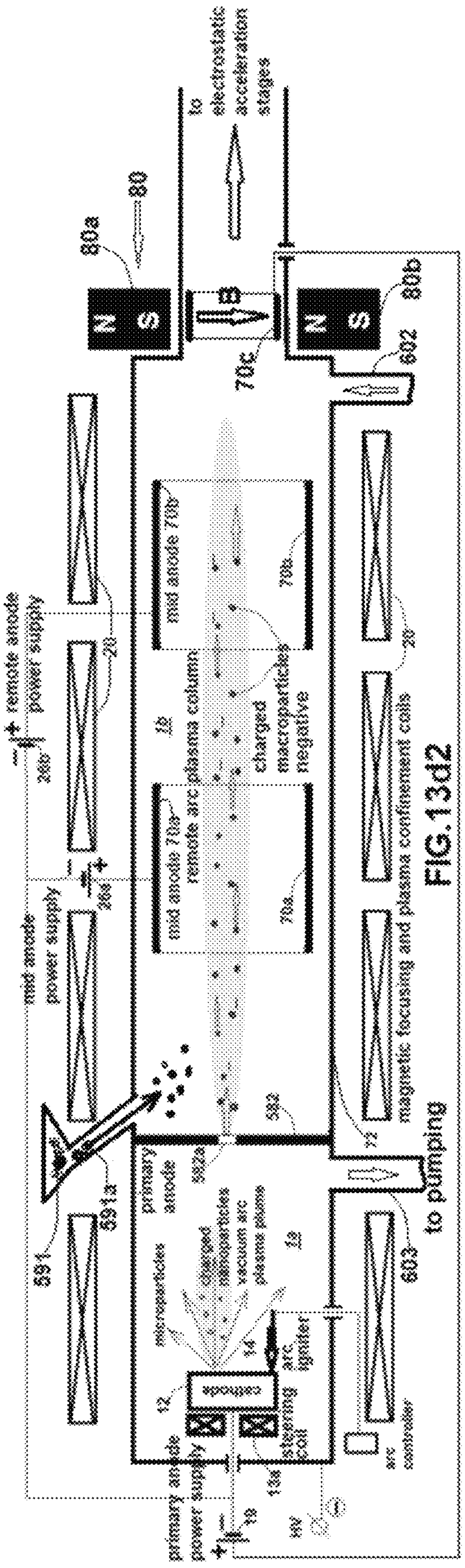
FIG.13d2

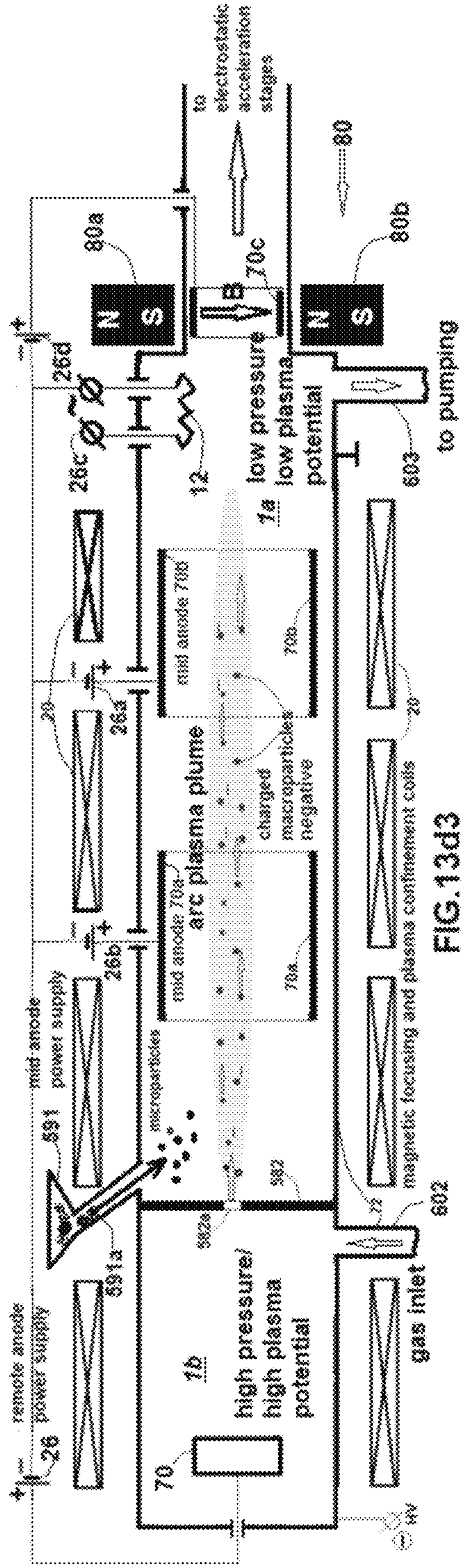
FIG.13d3

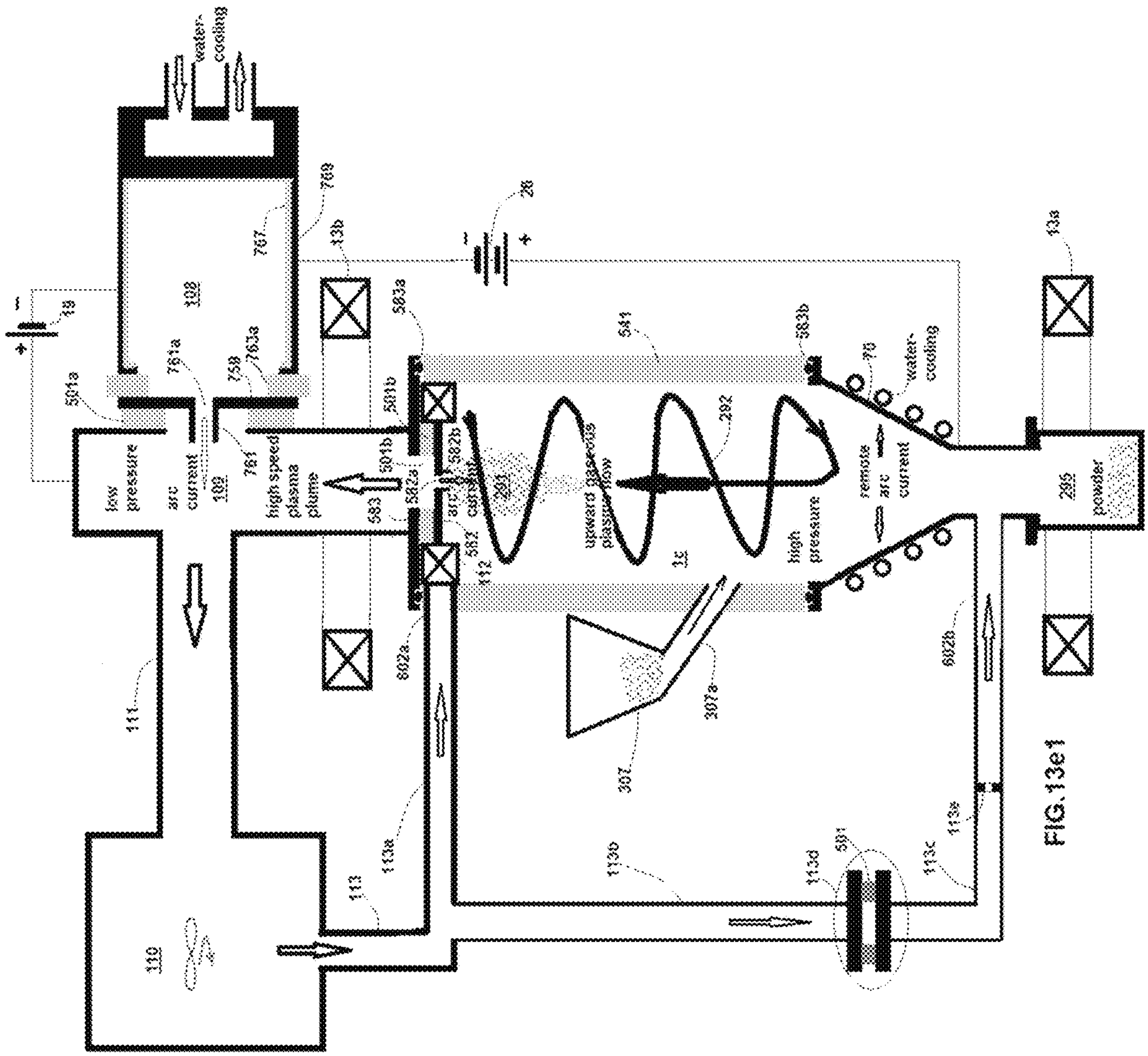
FIG.13e1

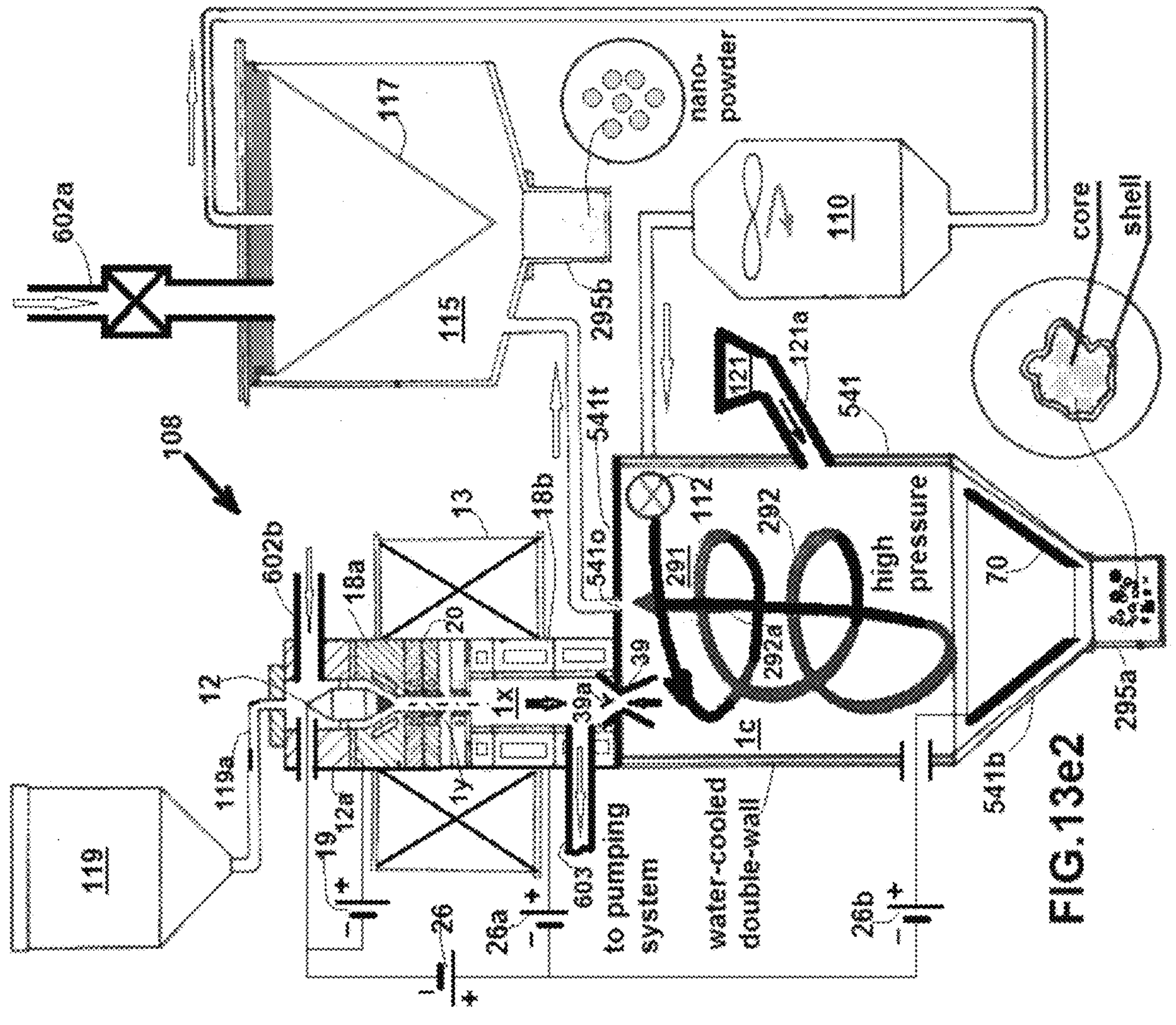
FIG.13e2

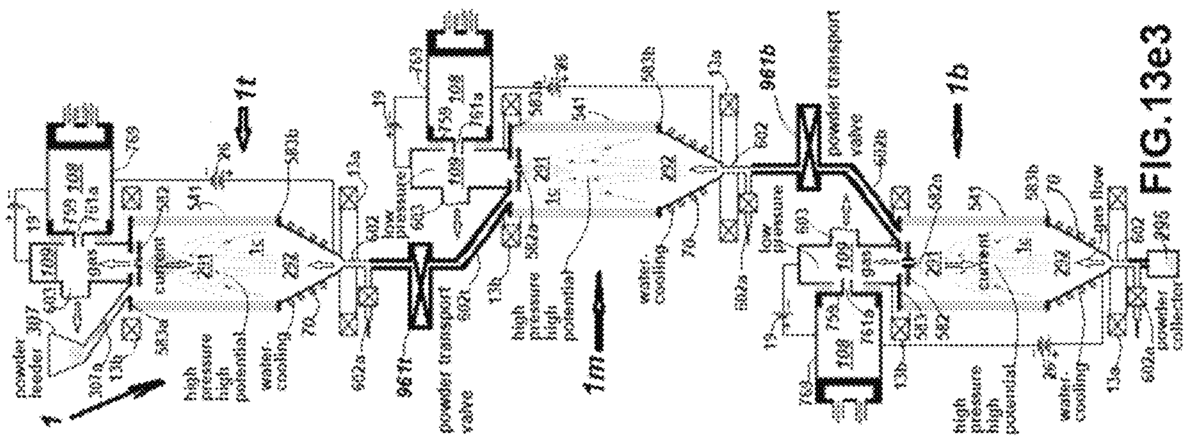
FIG.13e3

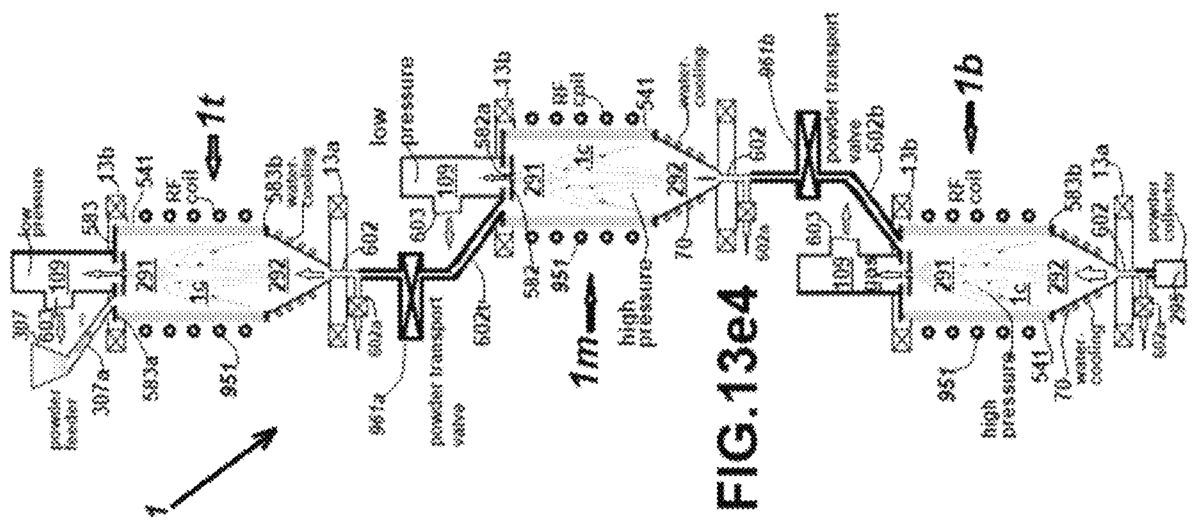
FIG. 13e4

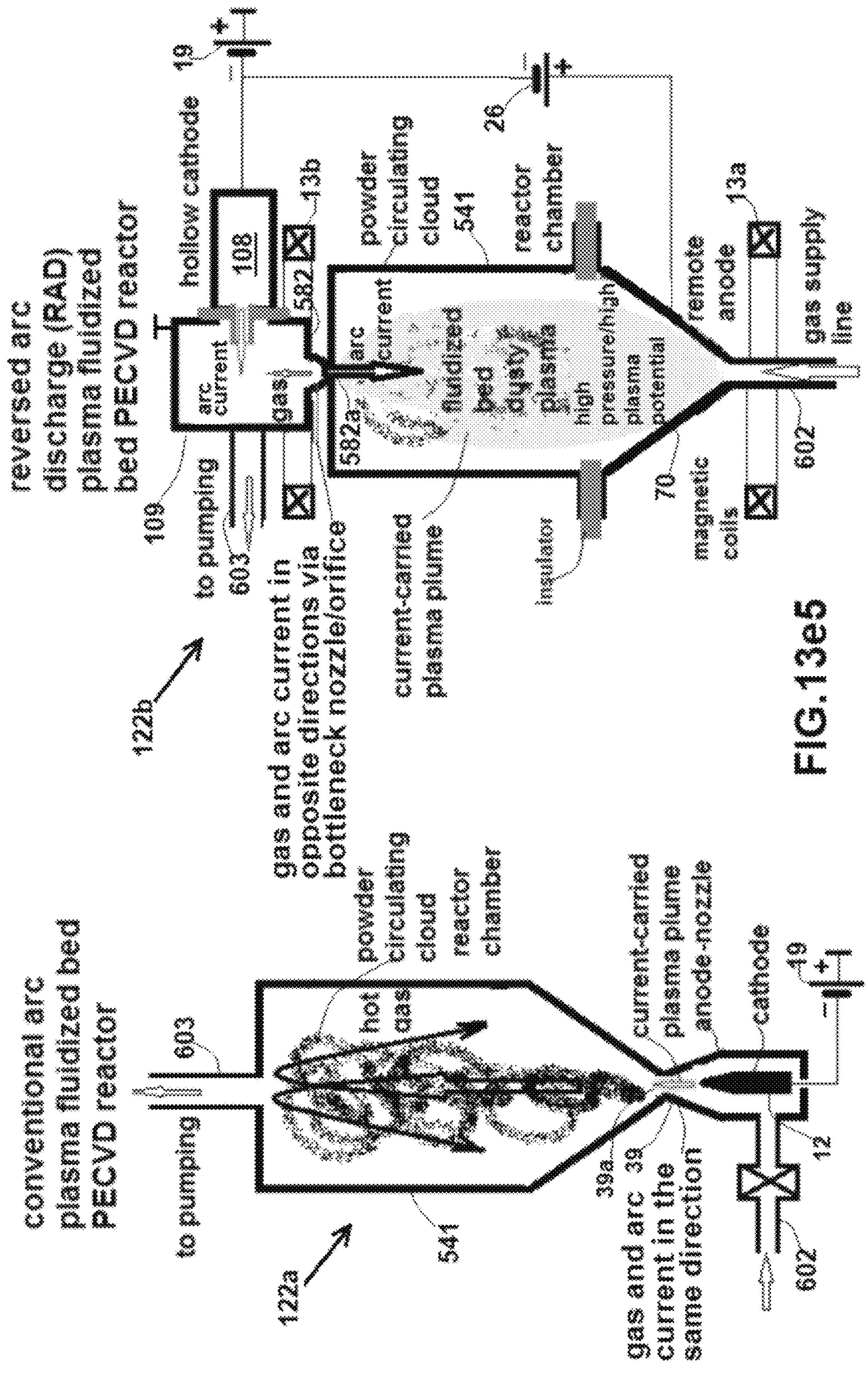
FIG.13e5

REACTORS FOR PLASMA ASSISTED TREATMENT OF POWDER

RELATED APPLICATIONS

This application is a divisional of U.S. patent application Ser. No. 16/373,378, filed on Apr. 2, 2019, which claims benefit of priority from U.S. Provisional Patent Application Ser. No. 62/726,794, filed on Sep. 4, 2018, and from U.S. Provisional Patent Application Ser. No. 62/653,505, filed on Apr. 5, 2018. Each of the aforementioned applications is incorporated herein by reference in their entireties.

FIELD OF THE INVENTION

This invention relates to the application of coatings in a vacuum apparatus and for electric propulsion.

BACKGROUND OF THE INVENTION

Many types of vacuum arc coating apparatus utilize a cathodic arc source, in which an electric arc is formed between an anode and a cathode plate in a vacuum chamber. The arc generates a cathode spot on a target surface of the cathode, which evaporates the cathode material into the chamber. The cathodic evaporate disperses as a plasma within the chamber, and upon contact with the exposed surfaces of one or more substrates, coats the substrates with the cathode material, which may be metal, ceramic, etc. An example of such an arc coating apparatus is described in U.S. Pat. No. 3,793,179 issued Feb. 19, 1974 to Sablev, which is incorporated herein by reference.

An undesirable result of vacuum arc coating techniques is the creation of macroparticles, which are formed from molten cathode material vaporized by the arc. These macroparticles are ejected from the surface of the cathode material, and can contaminate the coating as it is deposited on the substrate. The resulting coating may be pitted or irregular, which at best presents an aesthetic disadvantage, but is particularly problematic in the case of coatings on precision instruments.

A number of techniques have been employed to reduce the incidence of macroparticles contacting the substrate. Conventionally a vacuum arc coating apparatus may be constructed with a filtering mechanism that uses electromagnetic fields which direct or deflect the plasma stream. Because macroparticles are neutral, they are not influenced by these electromagnetic fields. Such an apparatus can therefore provide a plasma duct between the cathode chamber and a coating chamber, wherein the substrate holder is installed off of the optical axis of the plasma source. Focusing and deflecting electromagnets around the apparatus thus direct the plasma stream towards the substrate, while the macroparticles, uninfluenced by the electromagnets, would continue to travel in a straight line from the cathode. An example of such an apparatus is described and illustrated in U.S. Pat. No. 5,435,900 issued Jul. 25, 1995 to Gorokhovsky for an "Apparatus for Application of Coatings in Vacuum", which is incorporated herein by reference.

Another such apparatus is described in the article "Properties of Tetrahedral Amorphous Carbon Prepared by Vacuum Arc Deposition", Diamond and Related Materials published in the United States by D. R. McKenzie in 1991 (pages 51 through 59). This apparatus consists of a plasma duct made as a quarter section of a tore surrounded by a magnetic system that directs the plasma stream. The plasma duct communicates with two chambers, one chamber which accommodates a plasma source and a coating chamber which accommodates a substrate holder. The configuration of this apparatus limits the dimensions of the substrate to be coated to 200 mm, which significantly limits the range of its application. Furthermore, there is no provision in the tore-shaped plasma duct for changing the configuration of the magnetic field, other than the magnetic field intensity. Empirically, in such an apparatus the maximum value of the ionic current at the exit of the plasma duct cannot exceed one percent of the arc current. This is related to the turbulence of the plasma stream in the tore, which causes a drastic rise in the diffusion losses of ions on the tore walls.

Another method used to reduce the incidence of macroparticles reaching the substrate is a mechanical filter consisting of a baffle, or set of baffles, interposed between the plasma source and the plasma duct and/or between the plasma duct and the substrate. Filters taught by the prior art consist of simple stationary baffles of fixed dimension, such as is described in U.S. Pat. No. 5,279,723 issued Jan. 18, 1994 to Falabella et al. and in U.S. Pat. No. 5,435,900 to Gorokhovsky, which are incorporated herein by reference. In these filters the baffles are disposed along the plasma duct walls leaving substantial portion of the macroparticles which are crossing the area near the center of the plasma duct, far from the plasma duct walls, not trapped.

BRIEF DESCRIPTION OF THE DRAWINGS

In drawings which illustrate by way of example only preferred embodiments of the invention.

FIG. **3*c* is an exemplary magnetic vector diagram representing distribution of magnetic force lines generated by the deflecting coils in conjunction with a pair of deflection offset coils.

Figure 1:
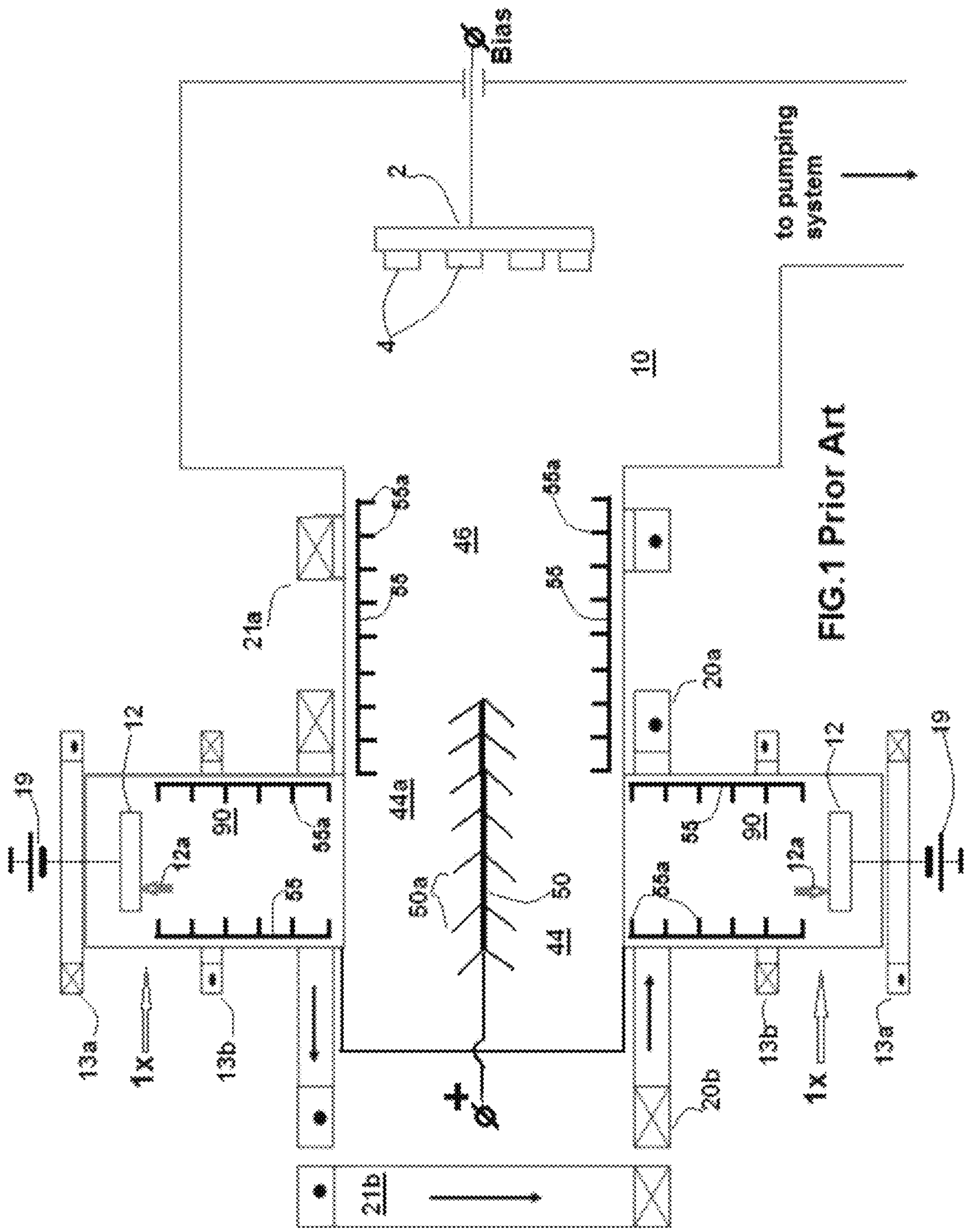
FIG. 1 is a schematic plan view of a prior art vacuum arc coating apparatus.
Figure 2:
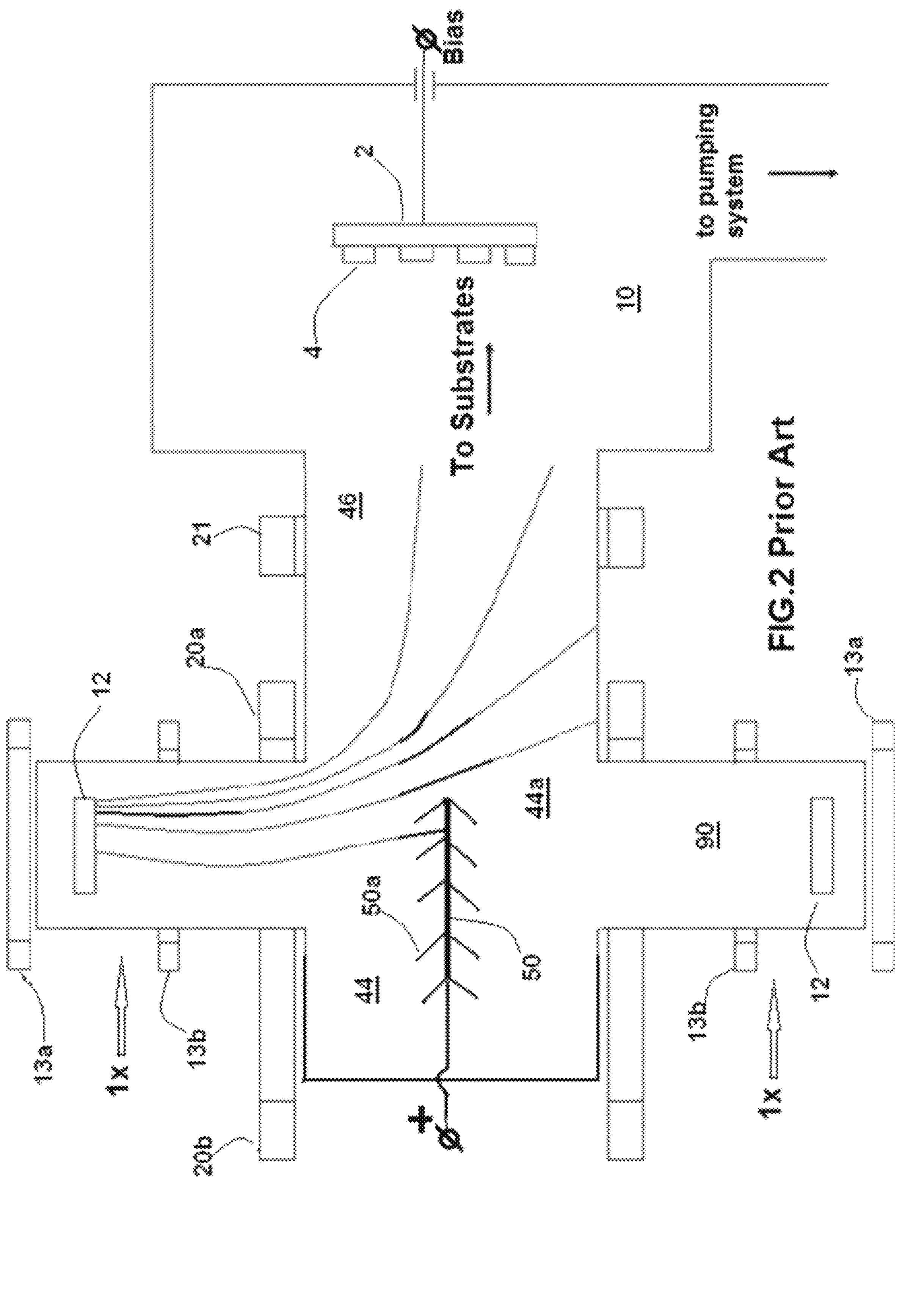
FIG. 2 is a schematic plan view of a prior art dual-cathode filtered arc source illustrating the flow of plasma resulting in metal vapor plasma losses, FIG. **3*a* is a partial schematic plan view of one filtered cathodic arc deposition apparatus in an embodiment of the invention.
Figure 3A:
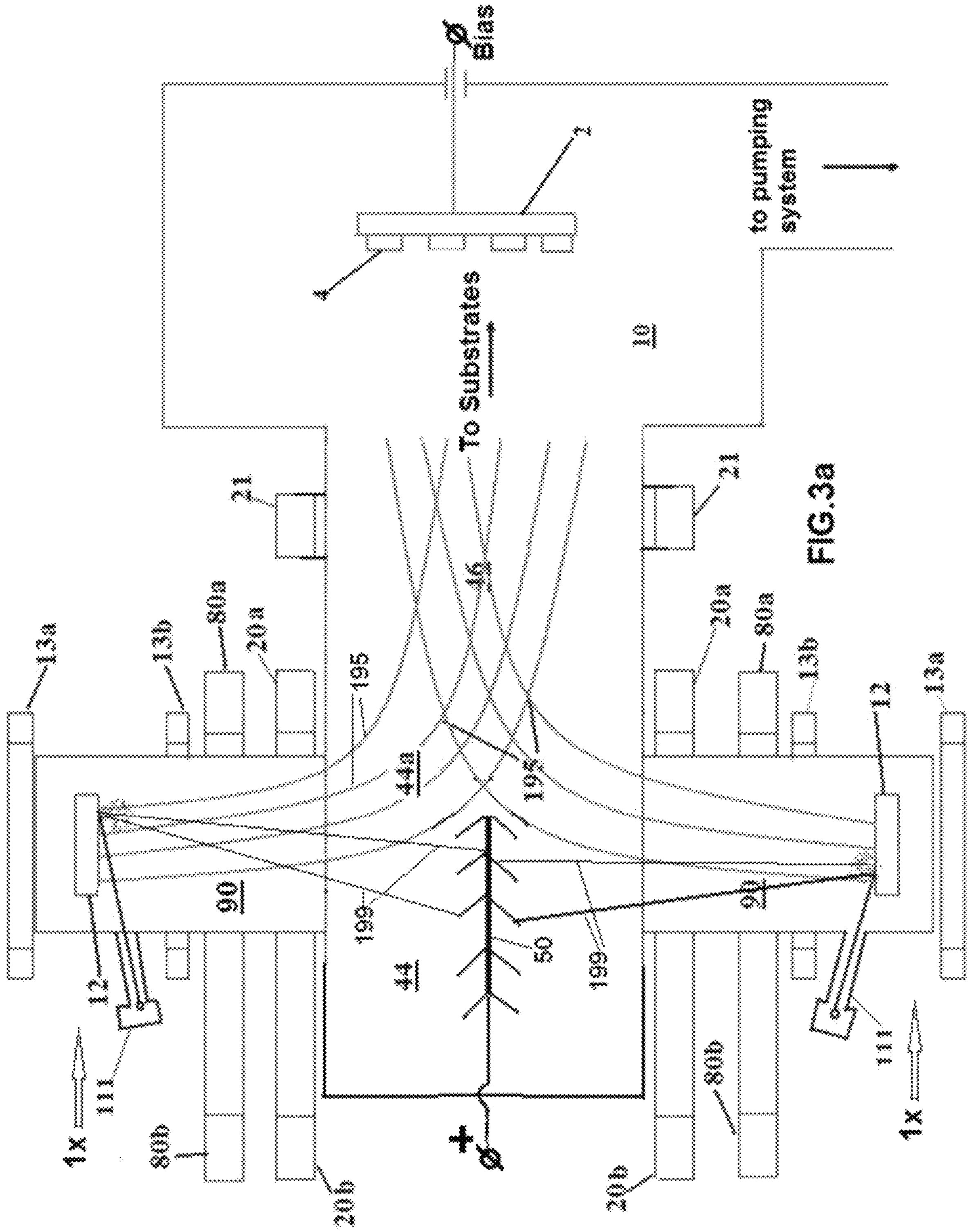
FIG. 3*b* is a magnetic vector diagram representing distribution of magnetic force lines generated by deflecting coils installed along the plasma duct as in FIG. 3*a*,**
FIG. 3*d* is an exemplary magnetic vector diagram representing distribution of magnetic force lines in a configuration of magnetic coils, with the inner plasma duct deflecting coils removed.
FIG. 3*e* is an exemplary schematic diagram showing plasma transport in a unidirectional magnetic field cusp.
FIG. 3*f* is an exemplary schematic diagram showing plasma transport in a bi-directional magnetic field cusp.
FIG. 3*g* is a variation of schematic diagram of FIG. 3*f*** showing plasma transport in a bi-directional magnetic field cusp in which deflection coils are disposed in offset position in relation to the plasma duct.
Figure 3B:
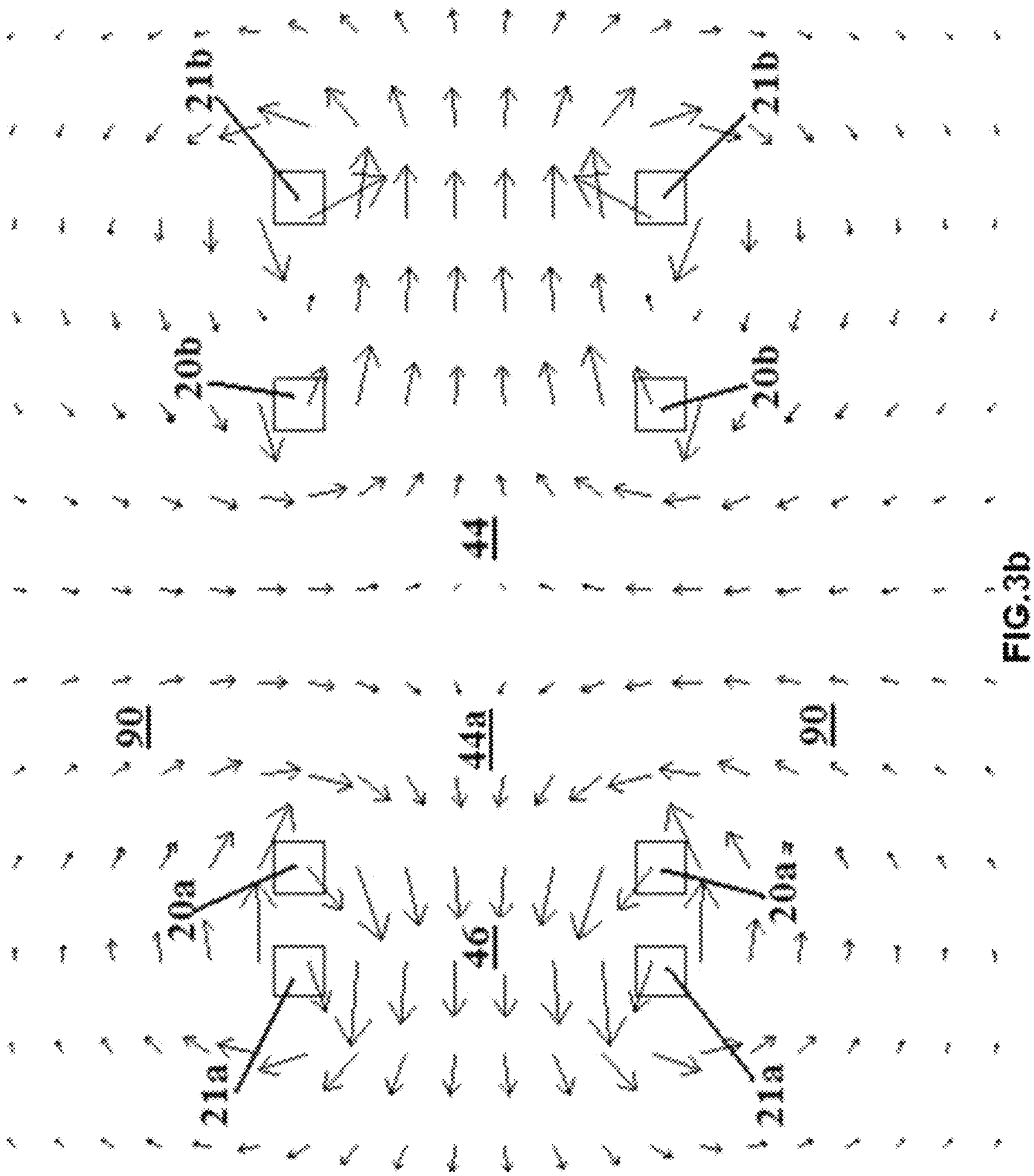
Figure 3C:
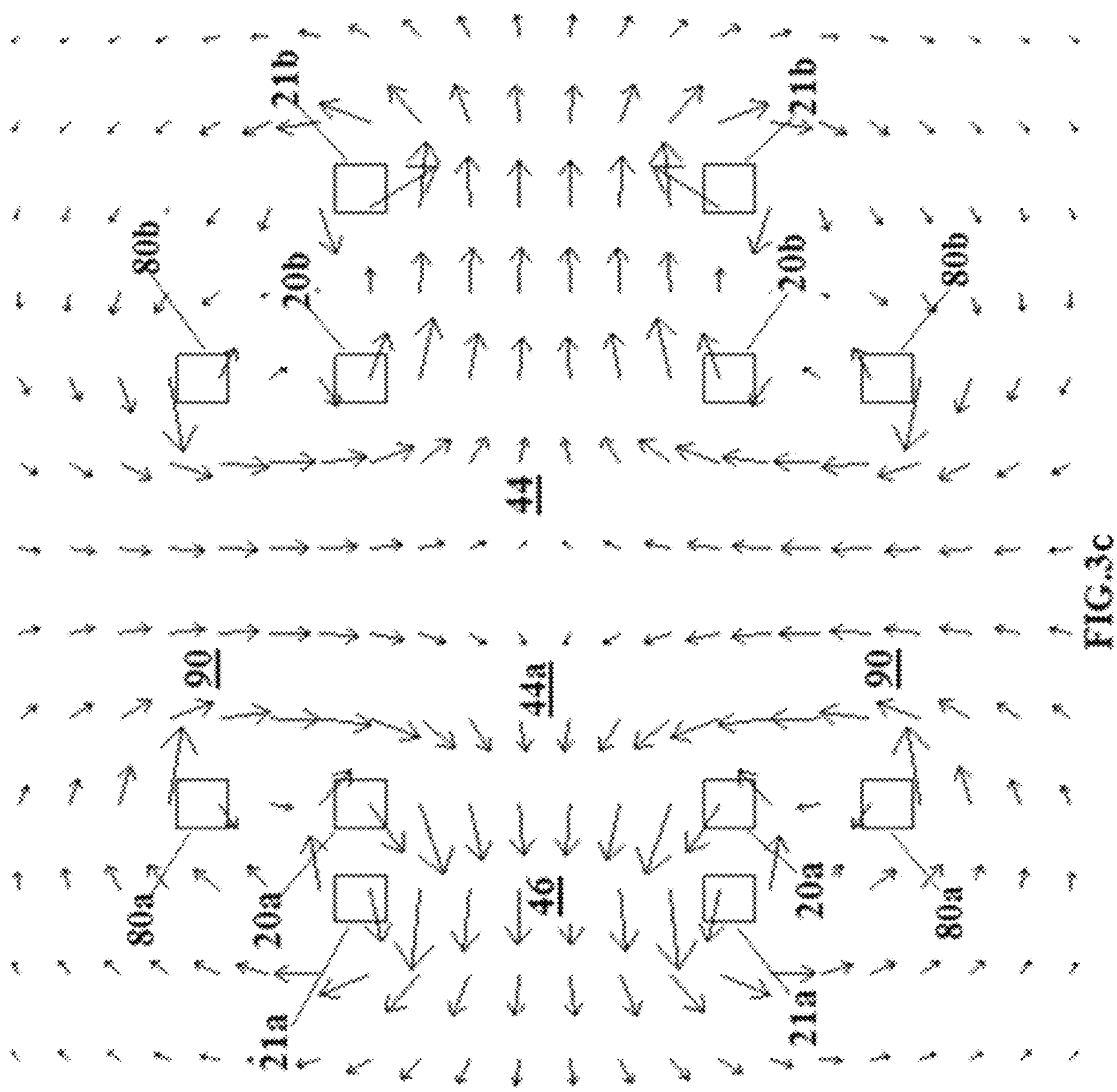
Figure 3D:
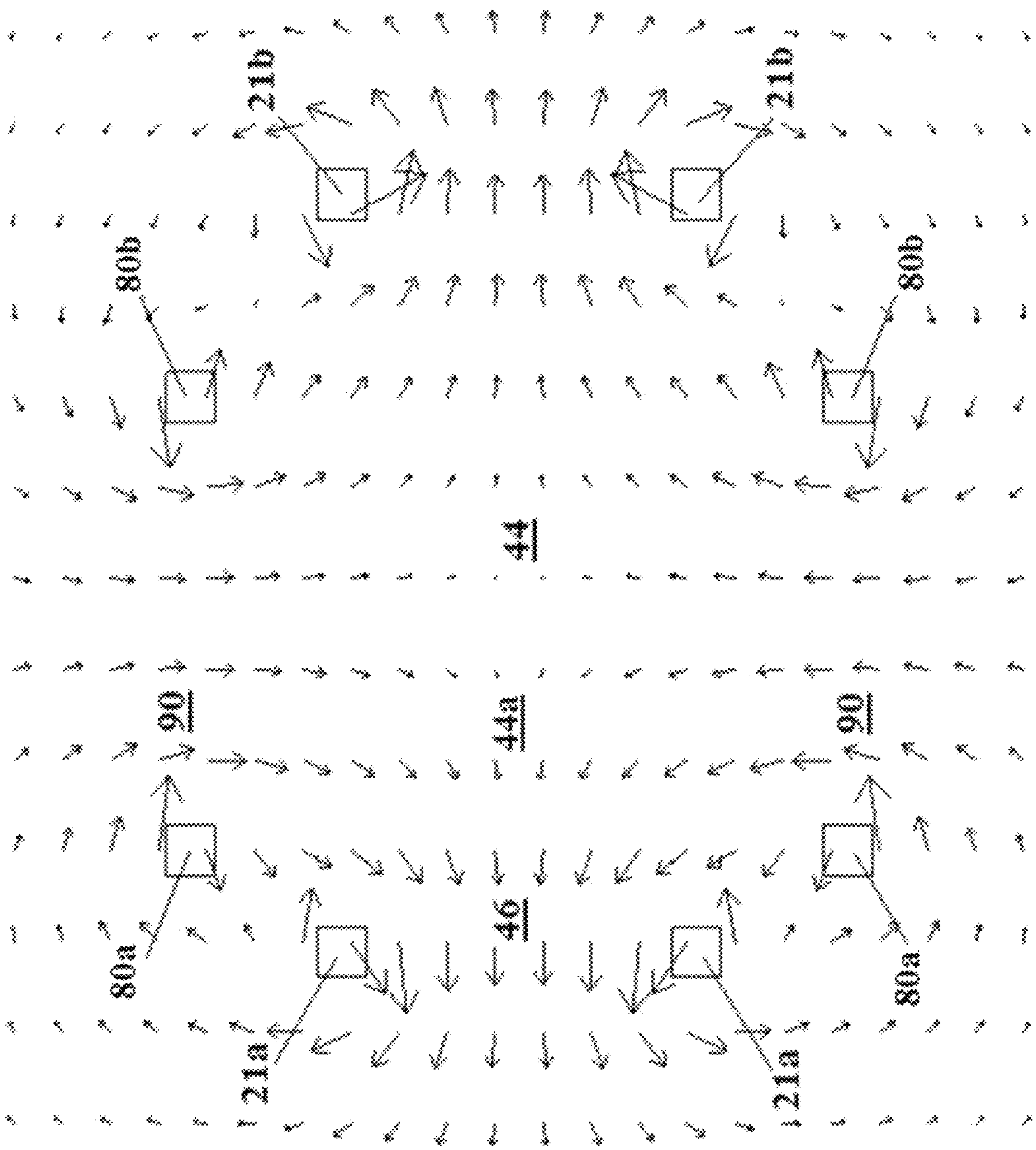
Figure 3E:
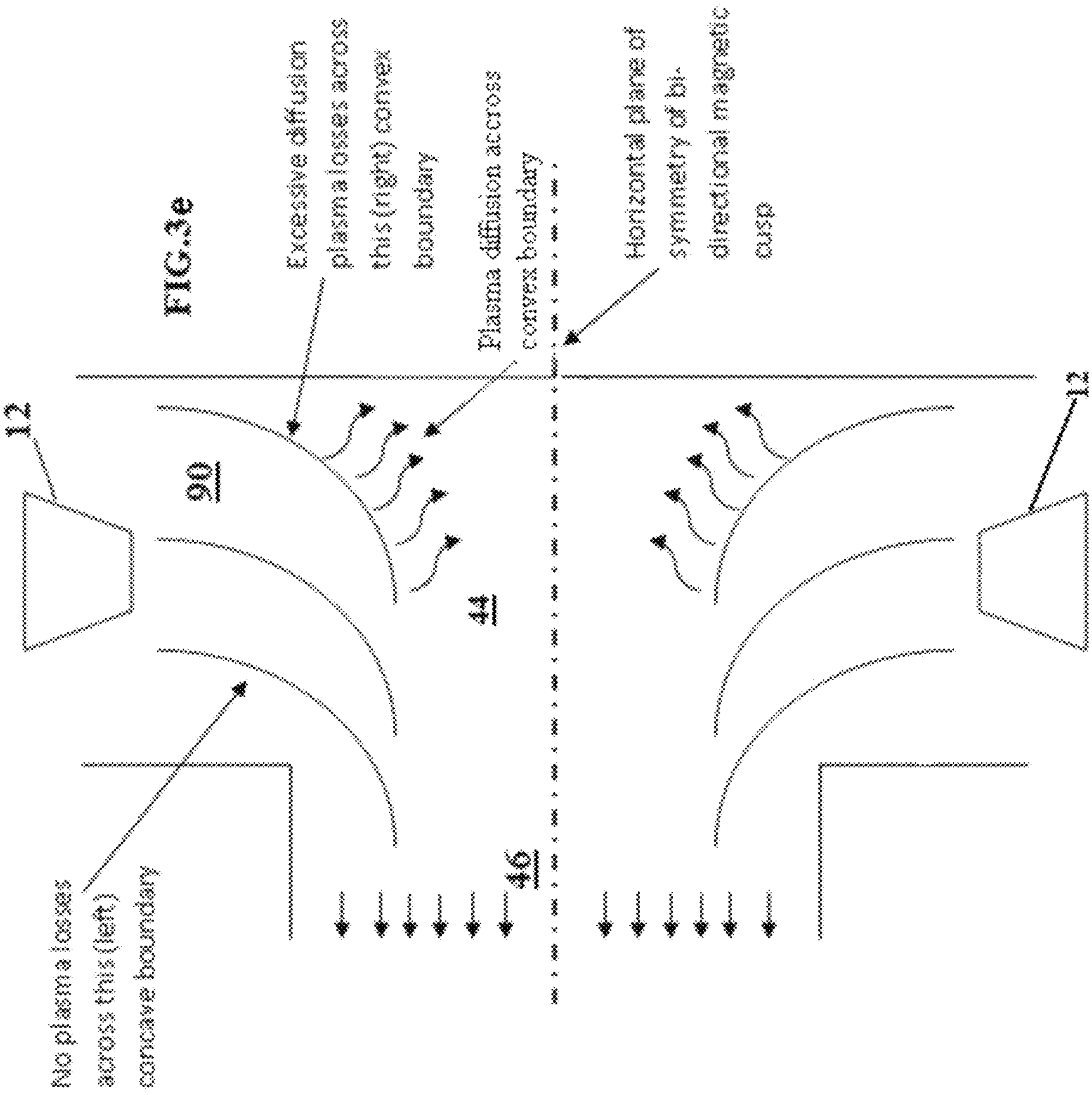
Figure 3F:
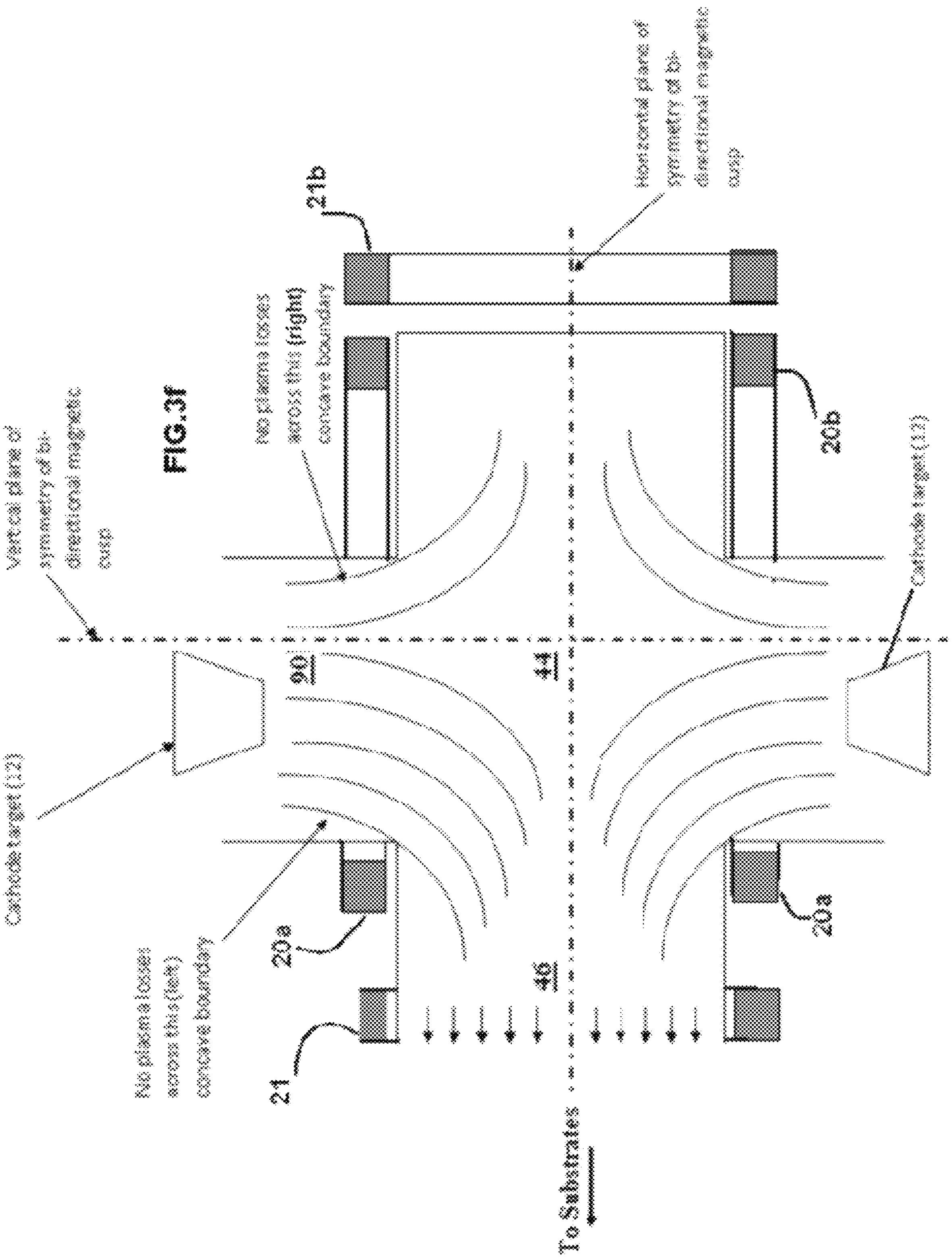
Figure 3G:
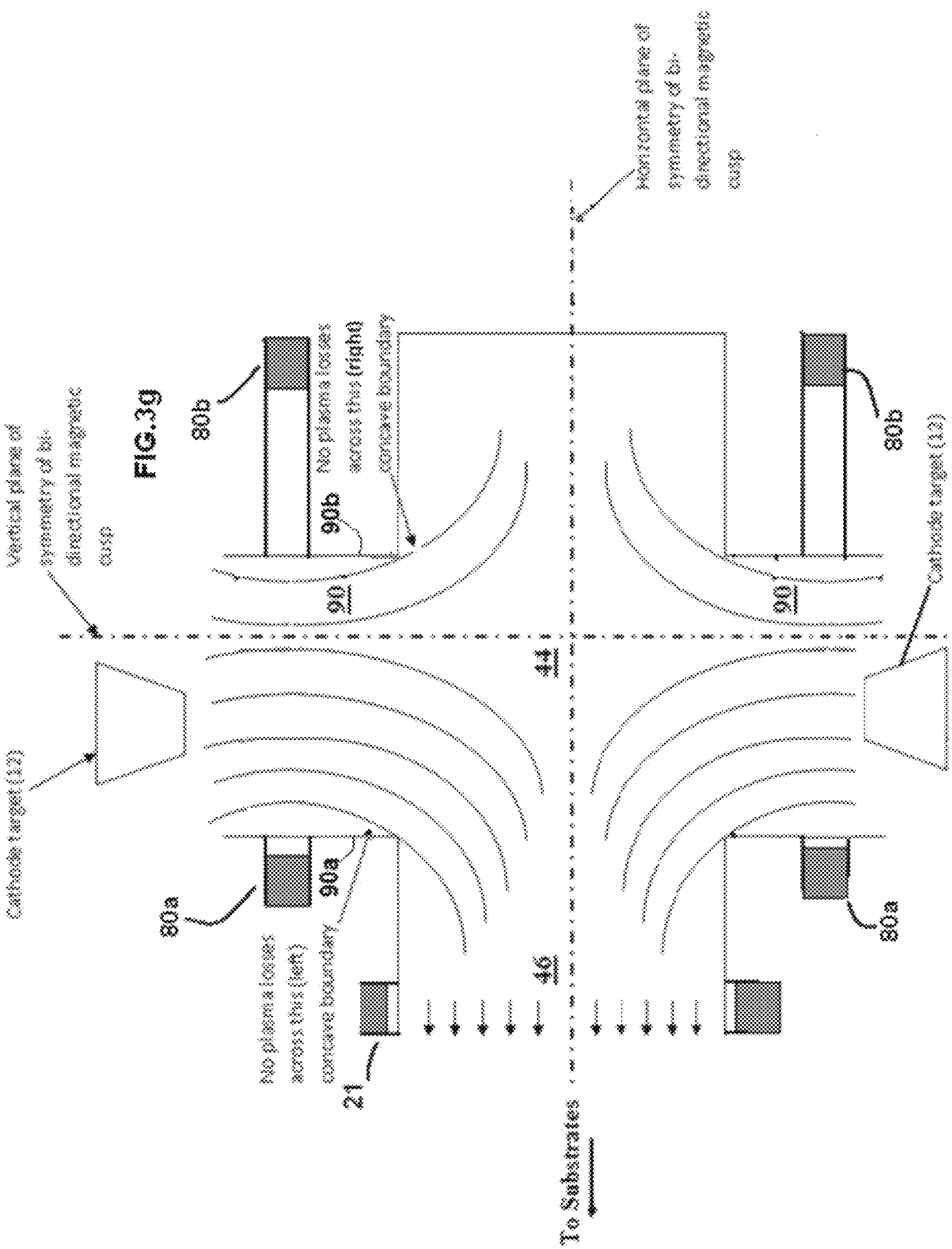
Figure 3H:
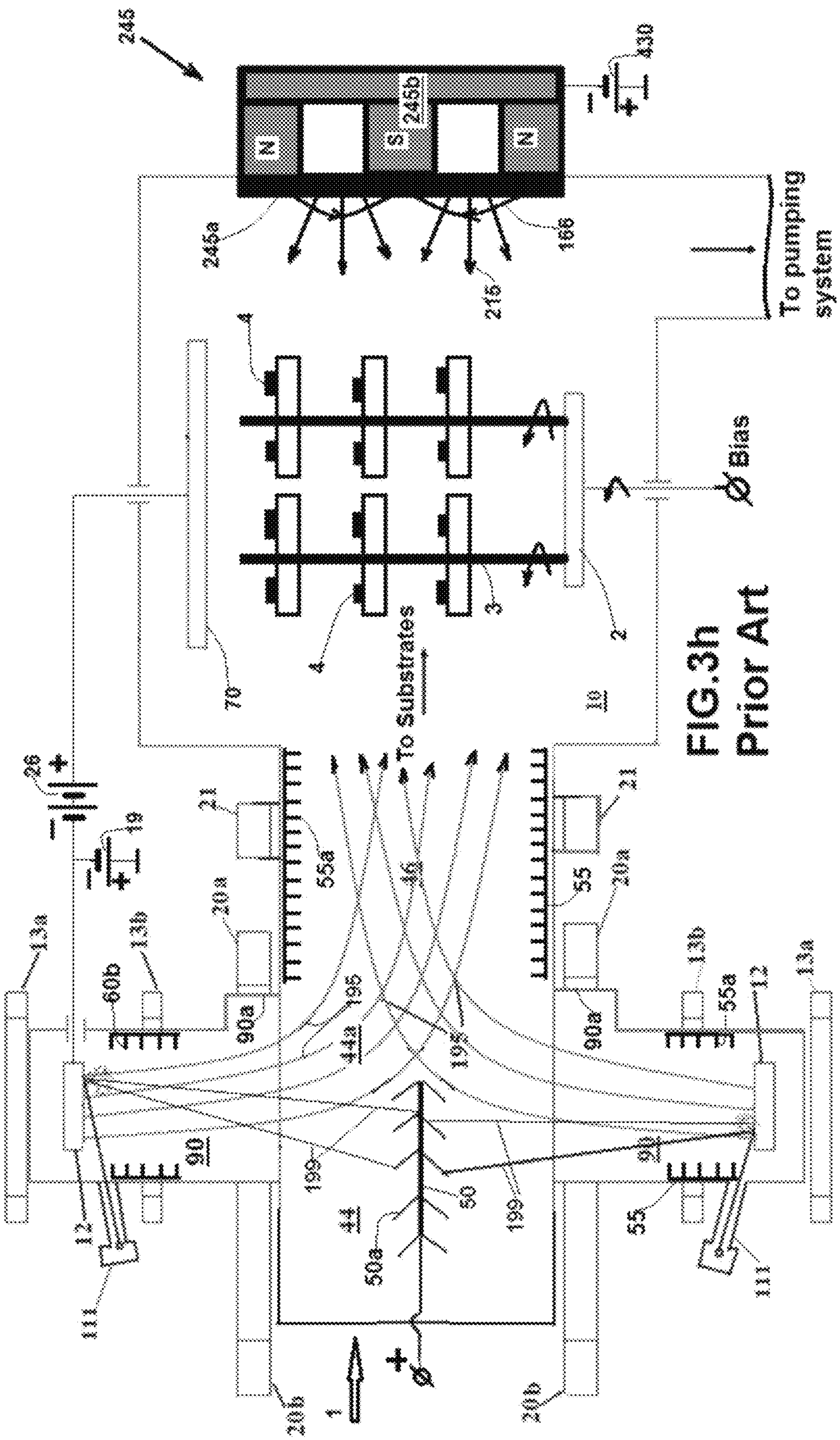
Figure 3I:
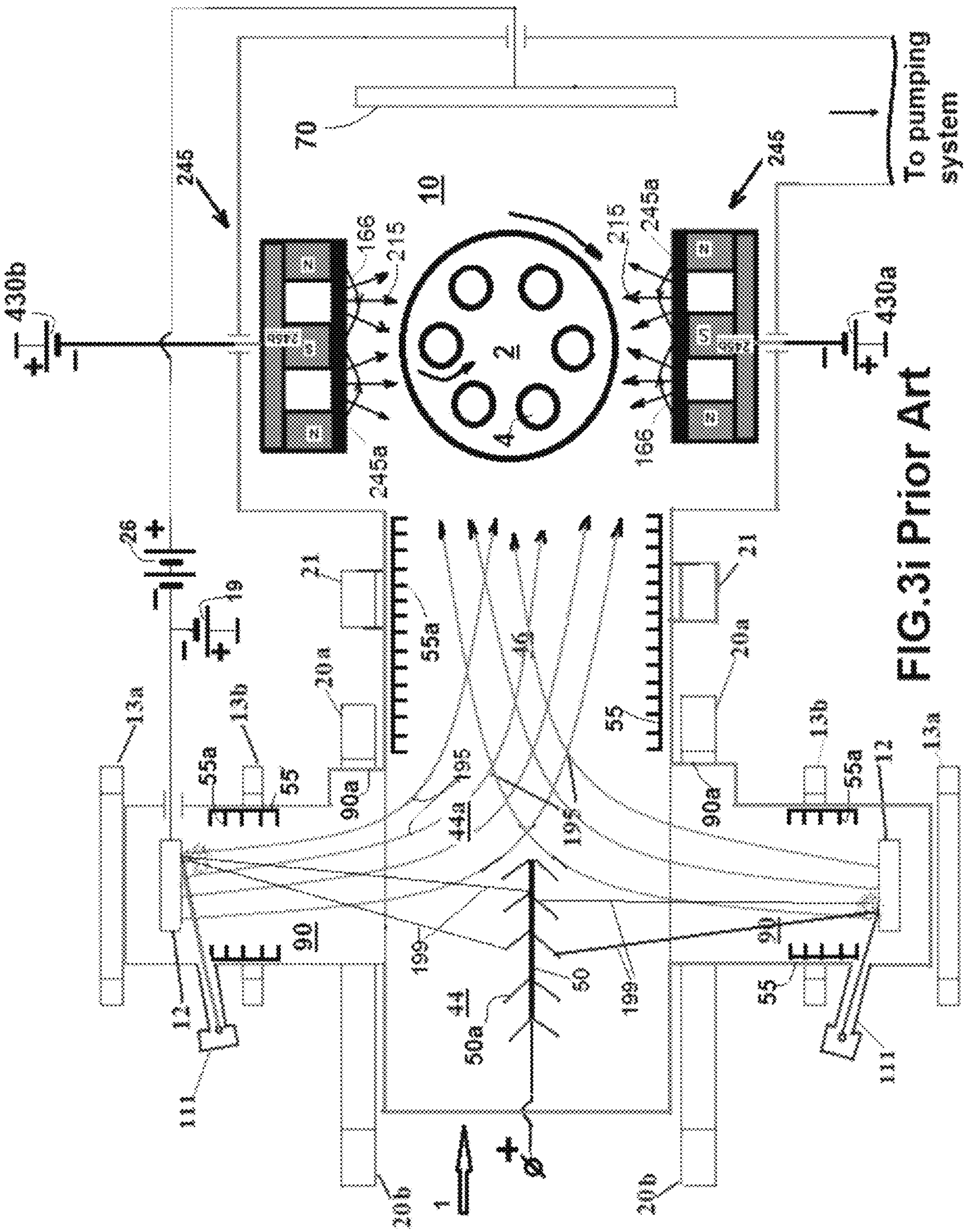
Figure 3J:
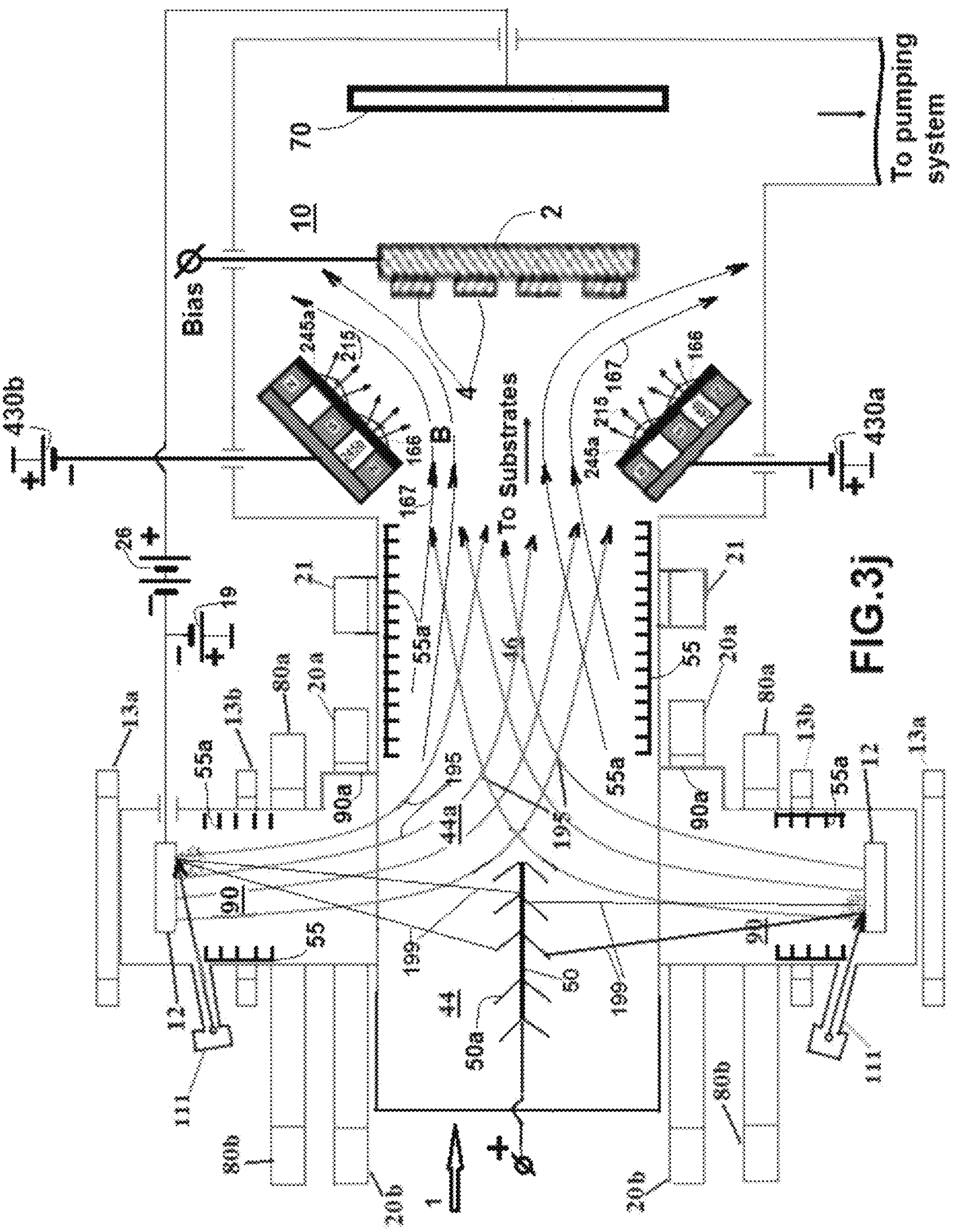
Figure 3K:
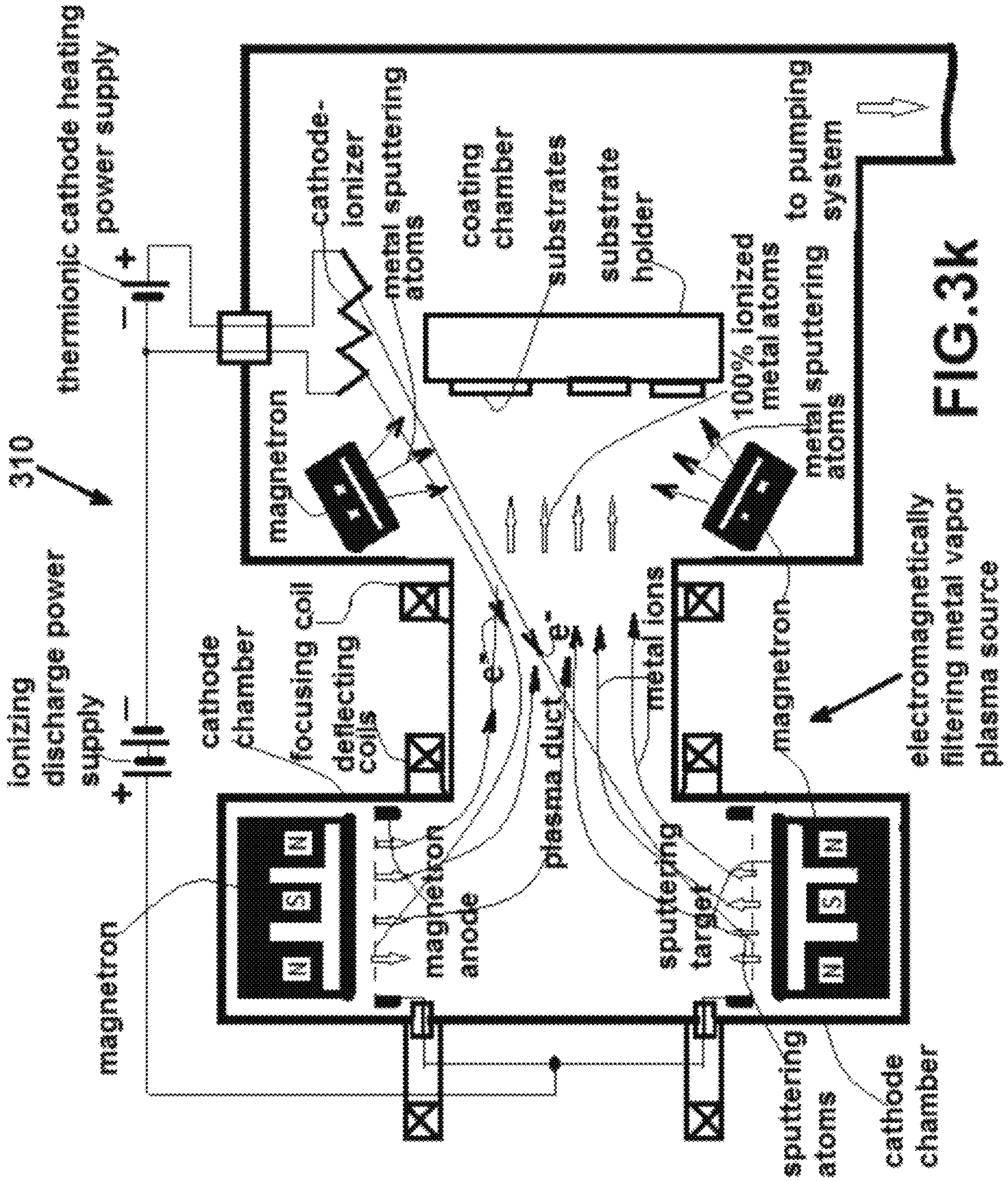
Figure 3L:
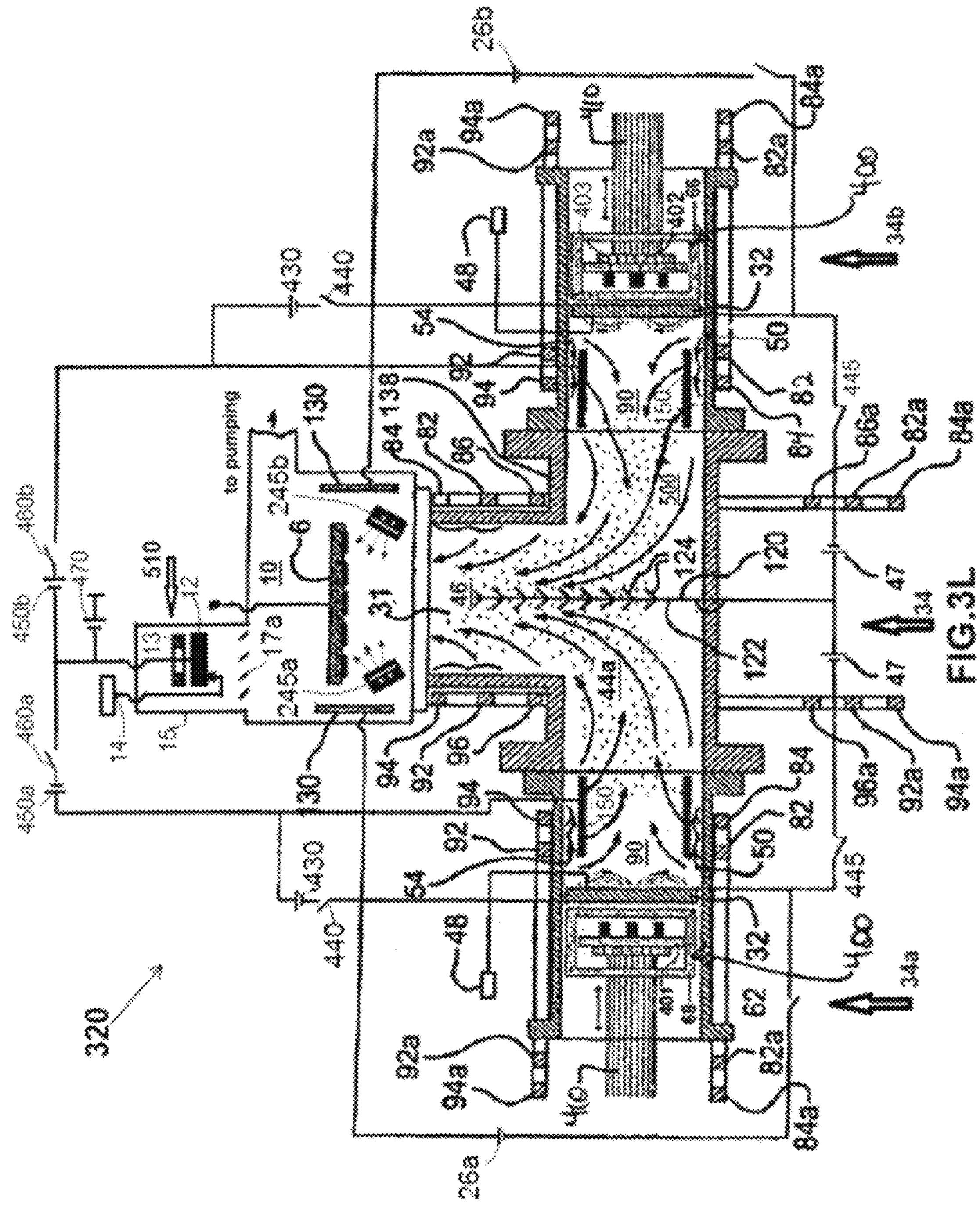
Figure 3M:
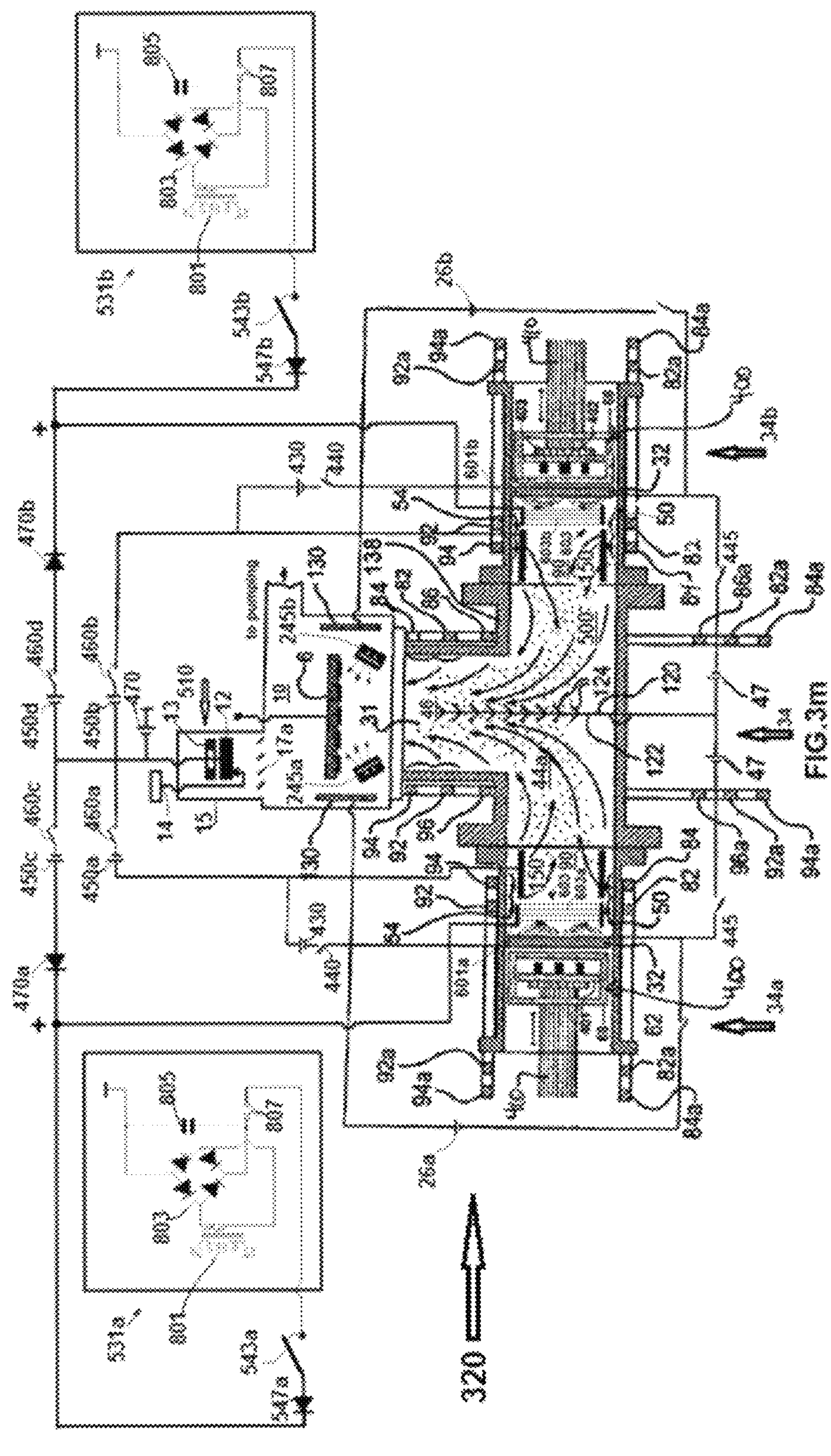
Figure 3N:
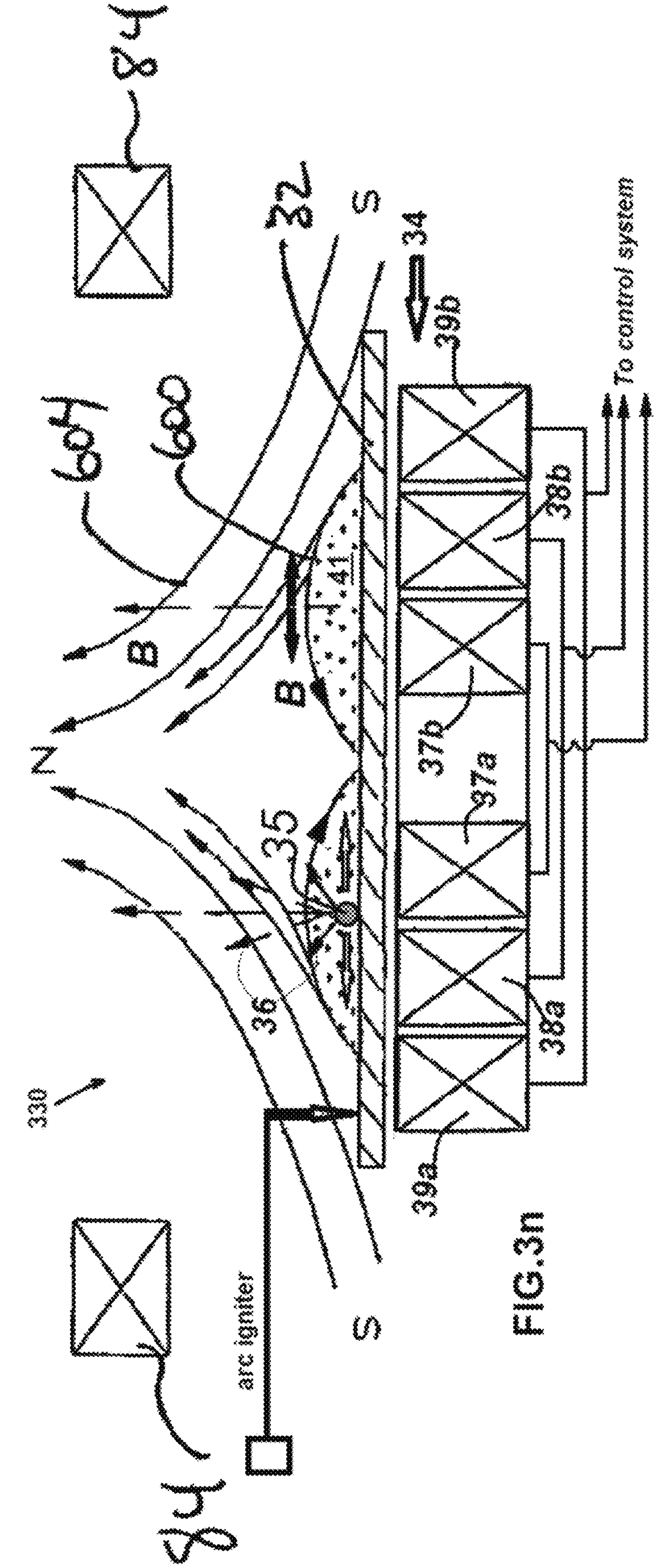
Figure 4A:
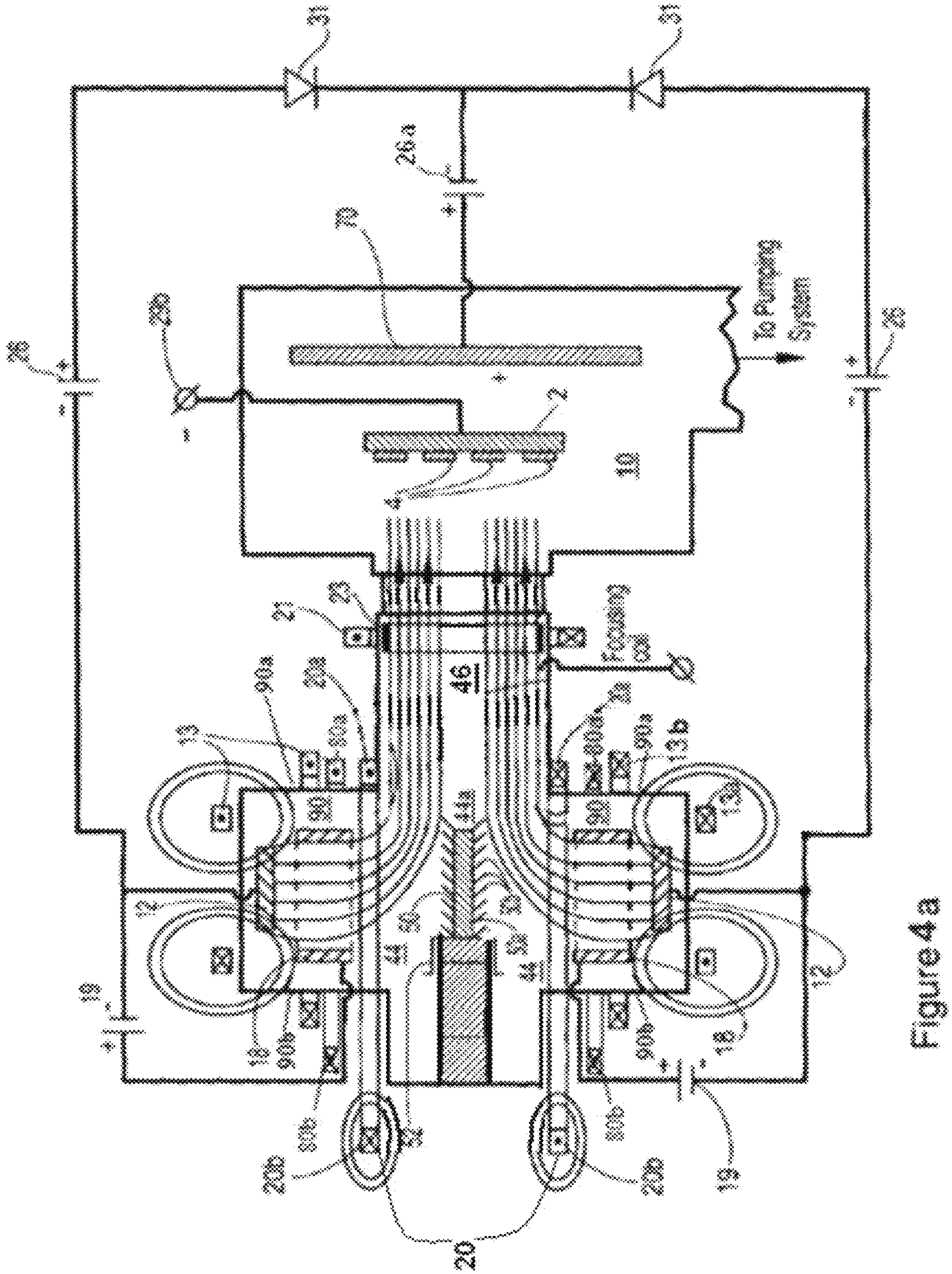
Figure 4B:
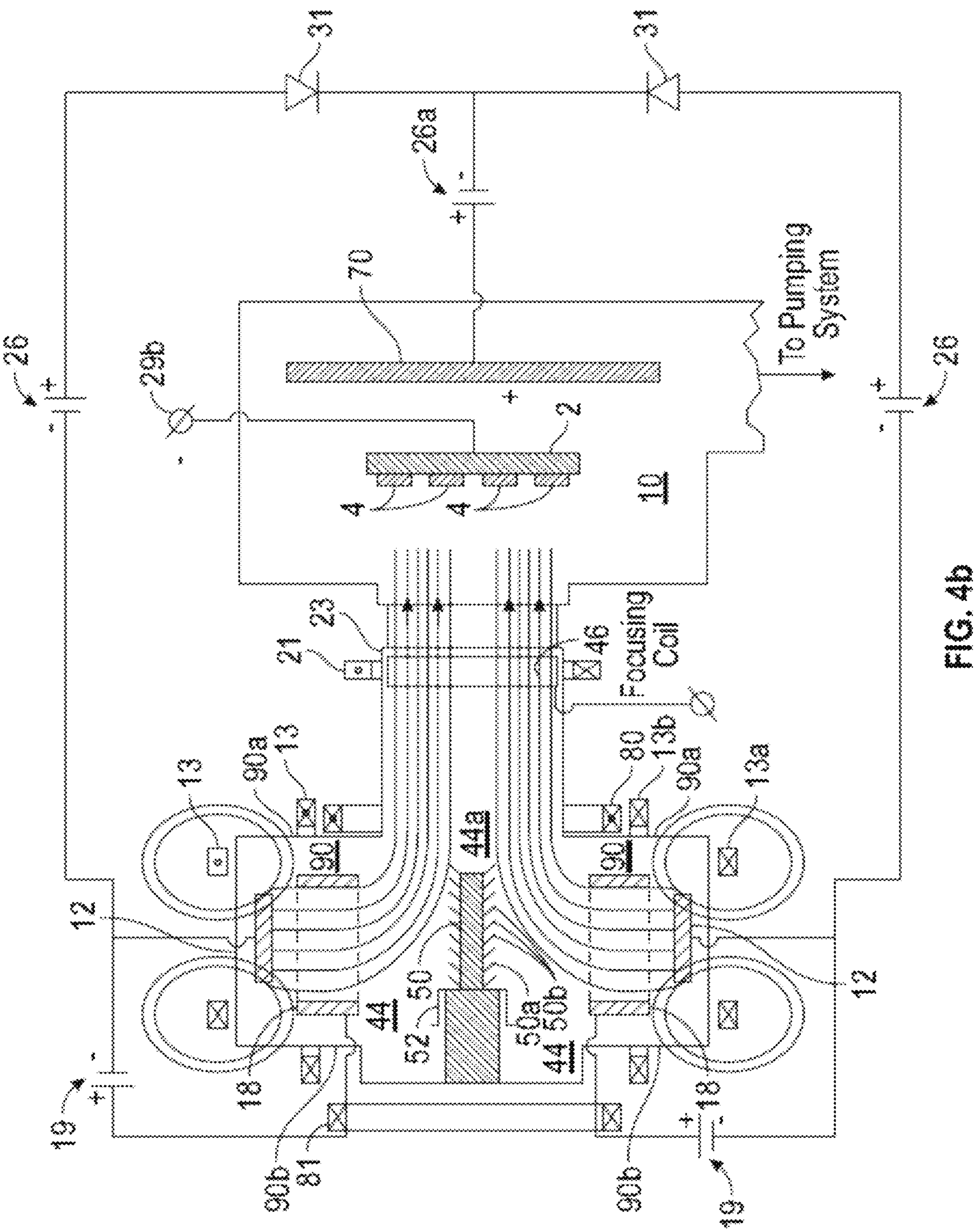
Figure 4C:
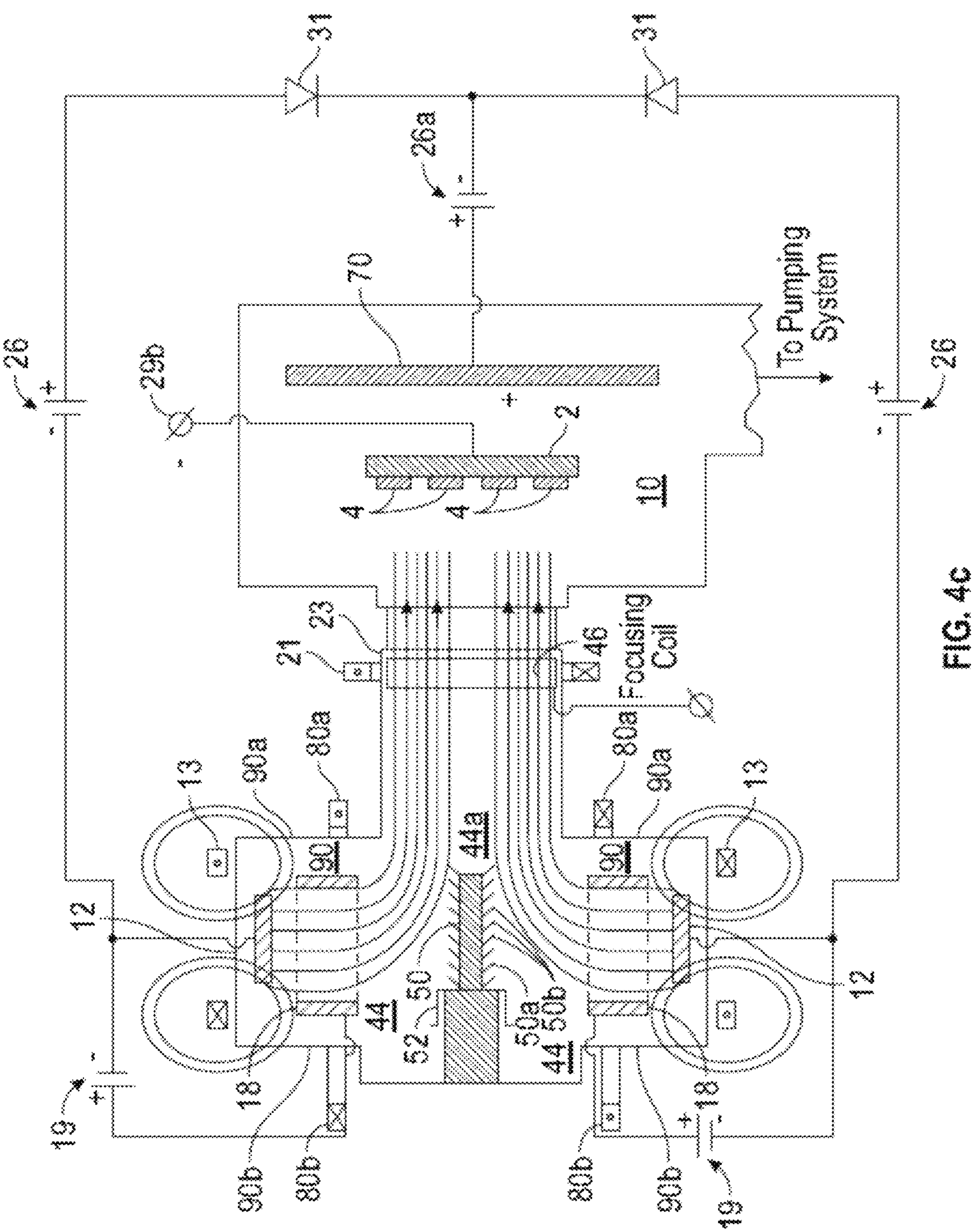
Figure 4D:
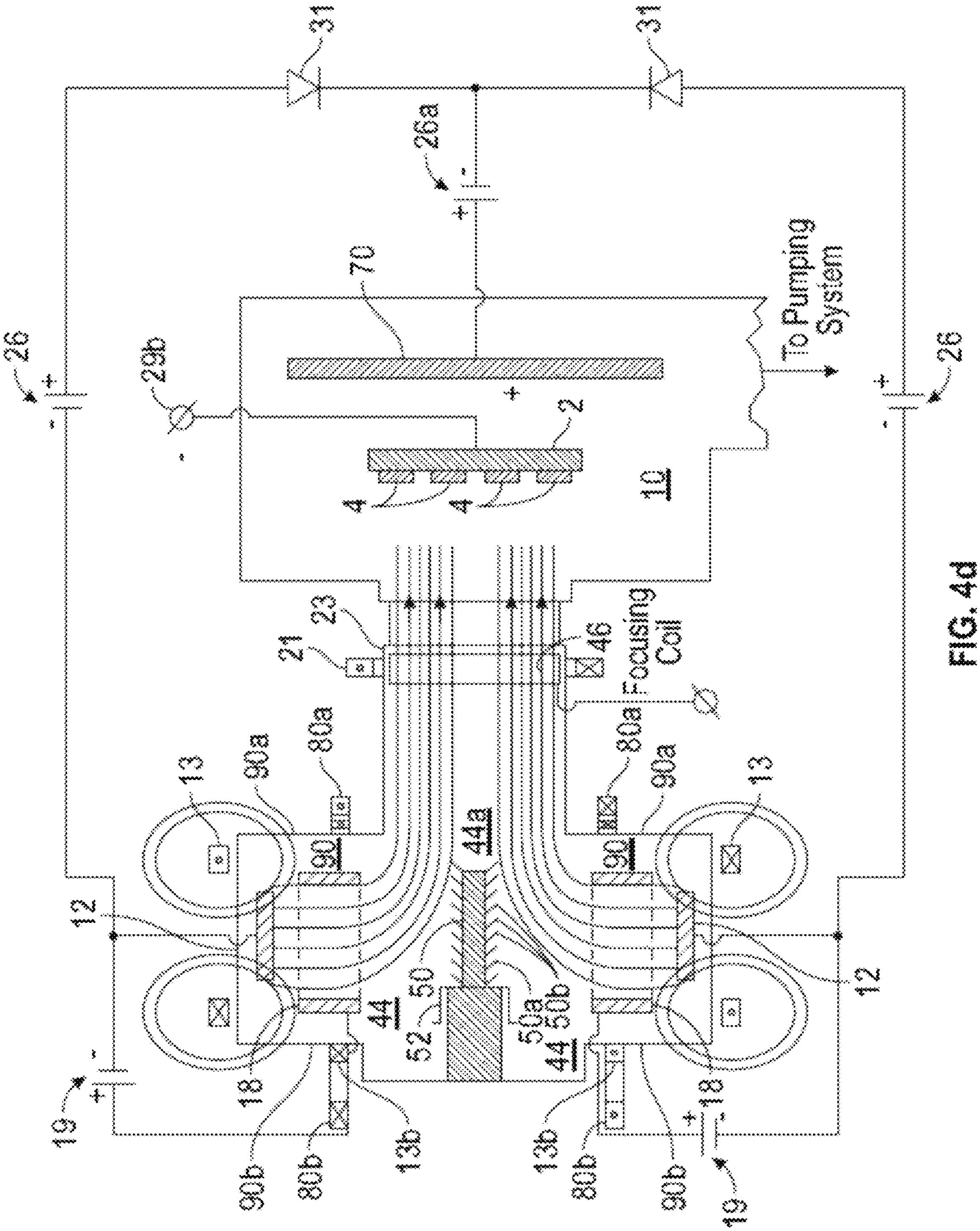
Figure 4E:
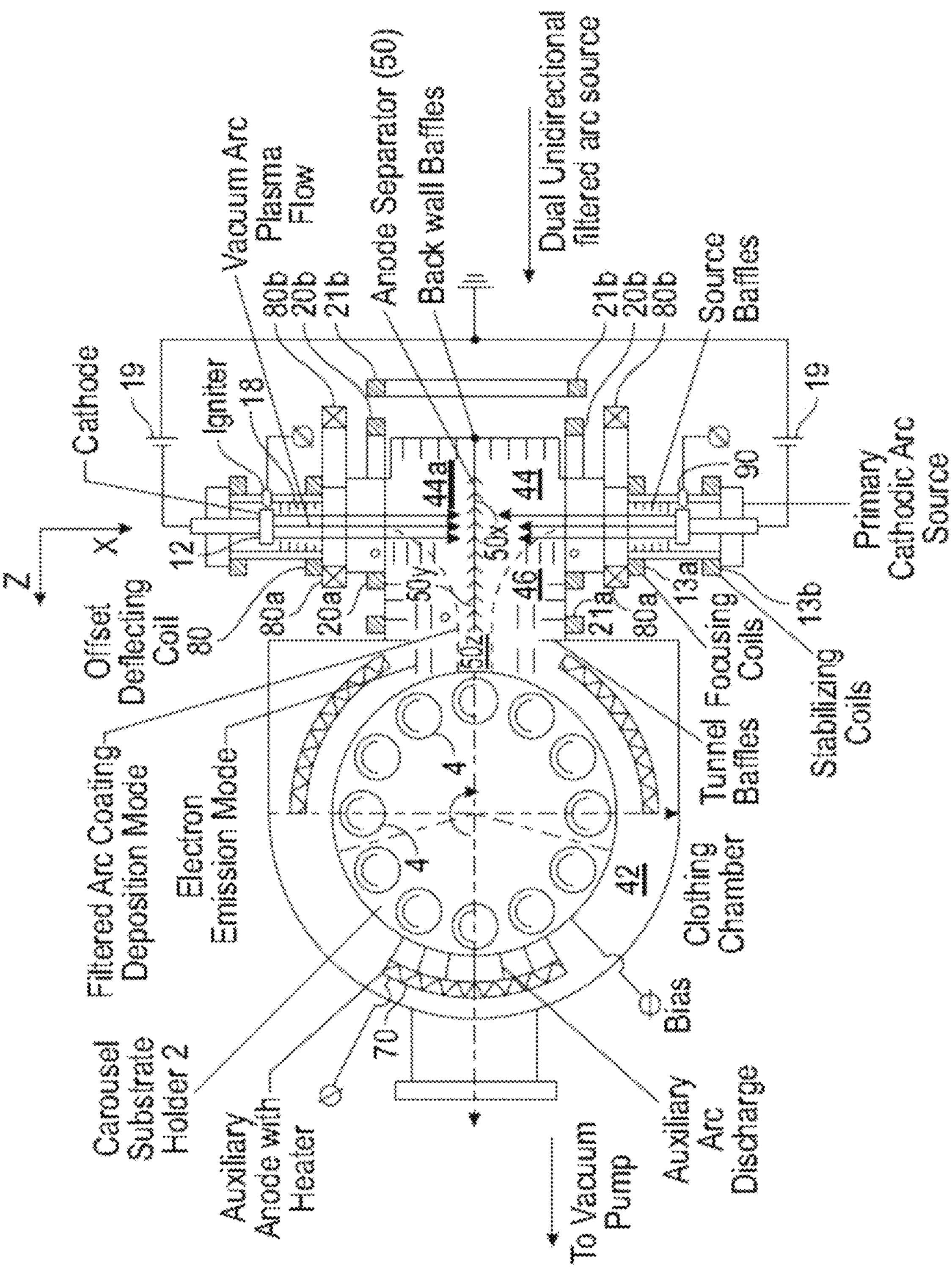
Figure 4F:
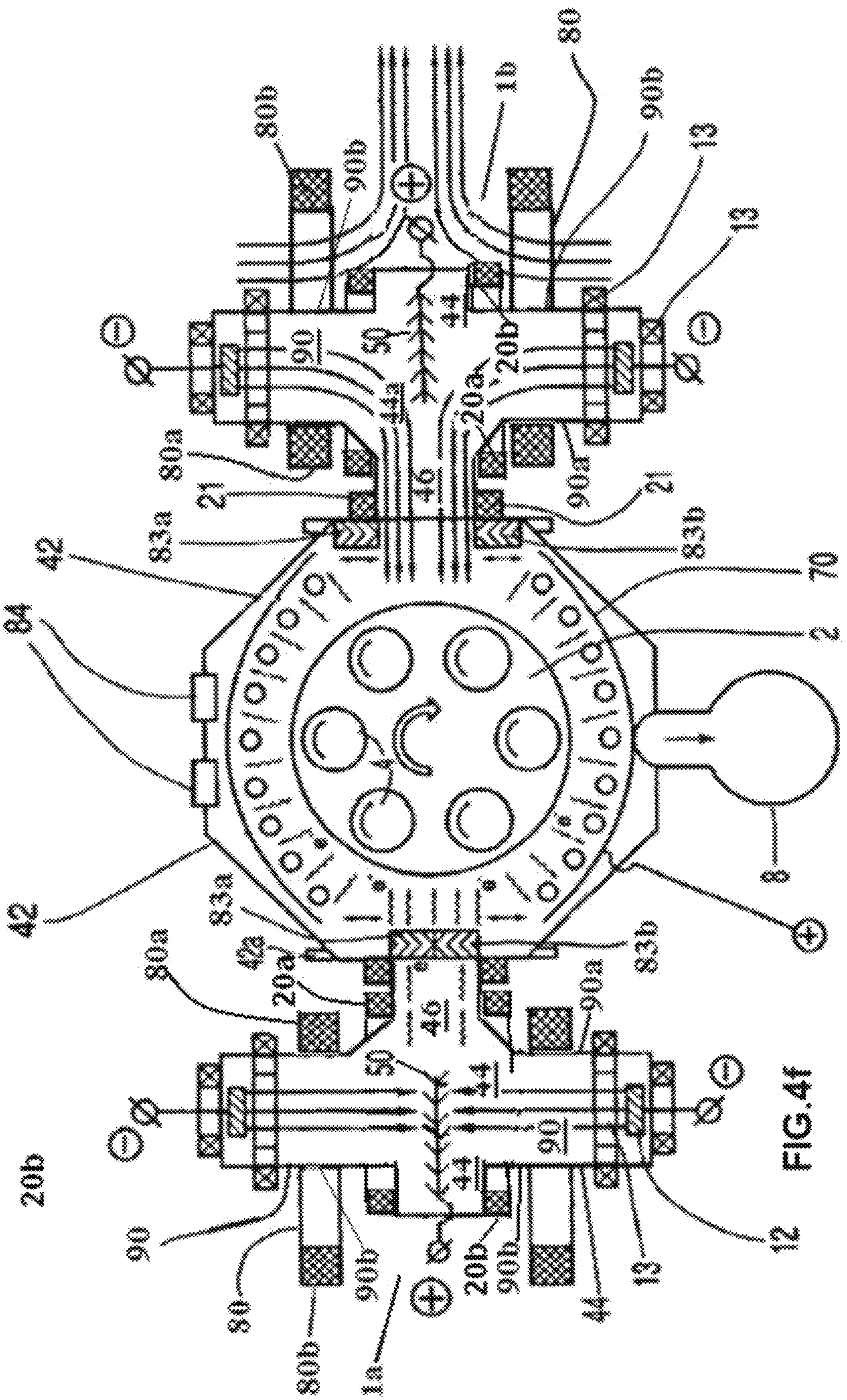
Figure 4G:
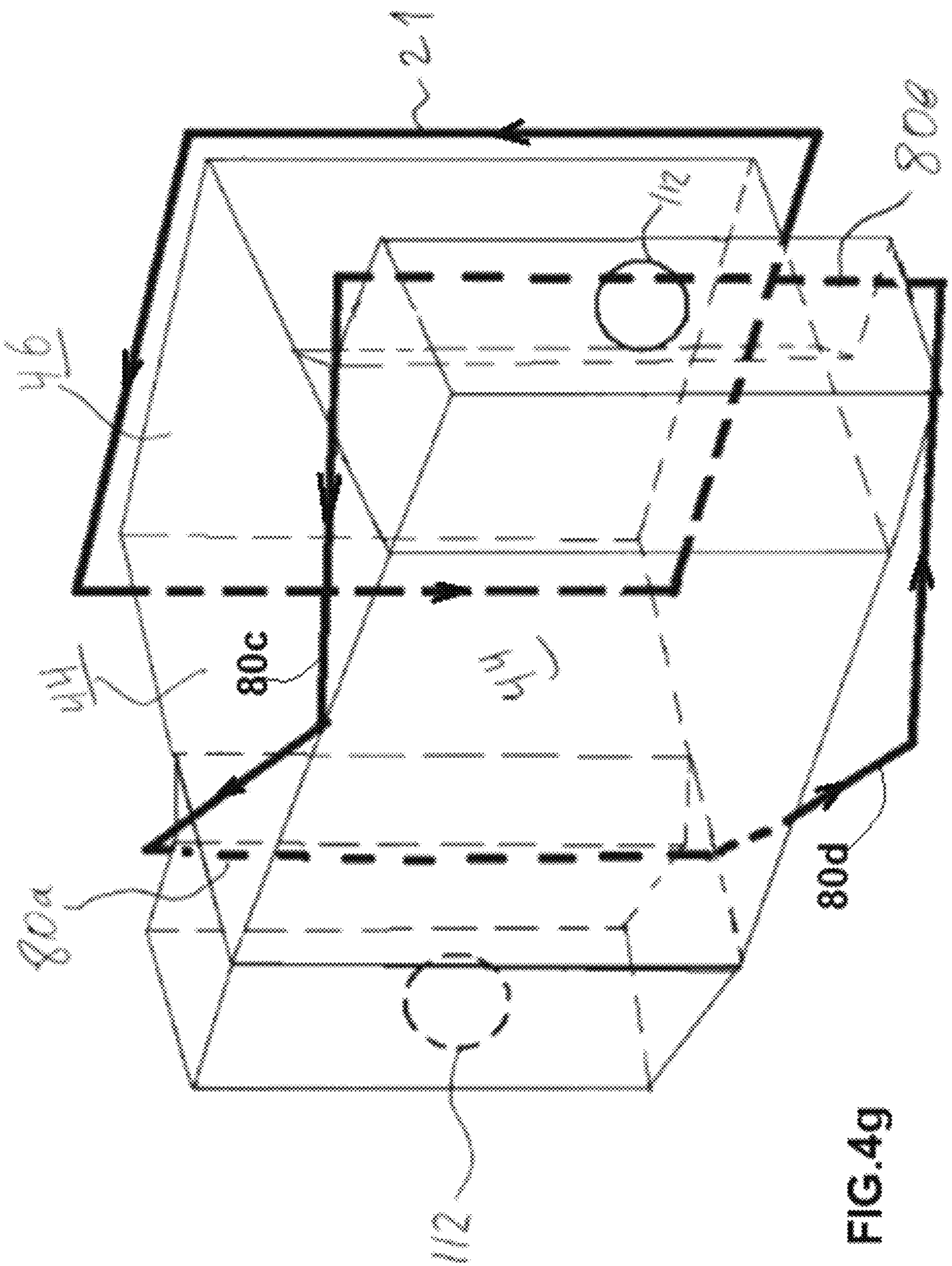
Figure 4H:
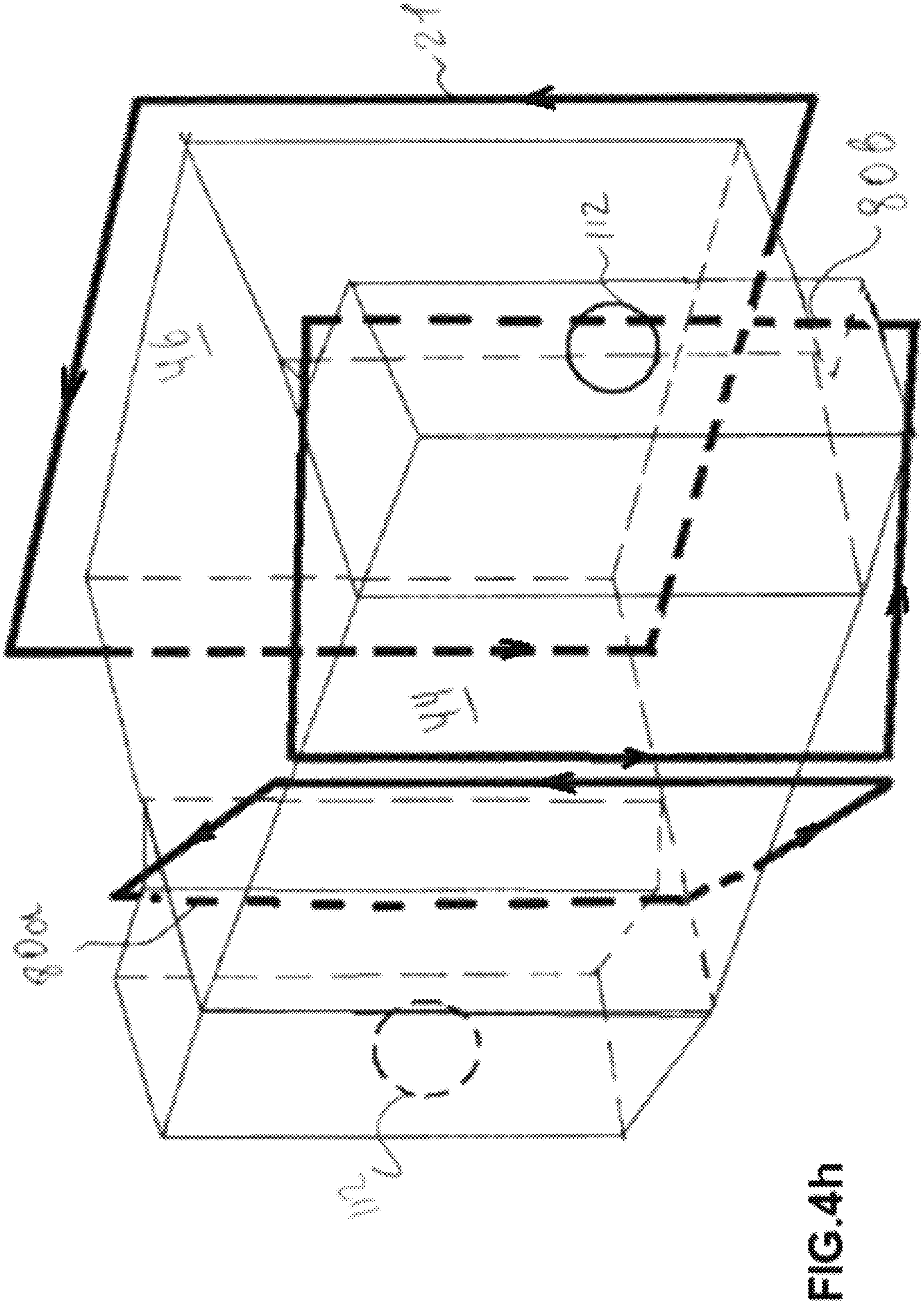
Figure 4I:
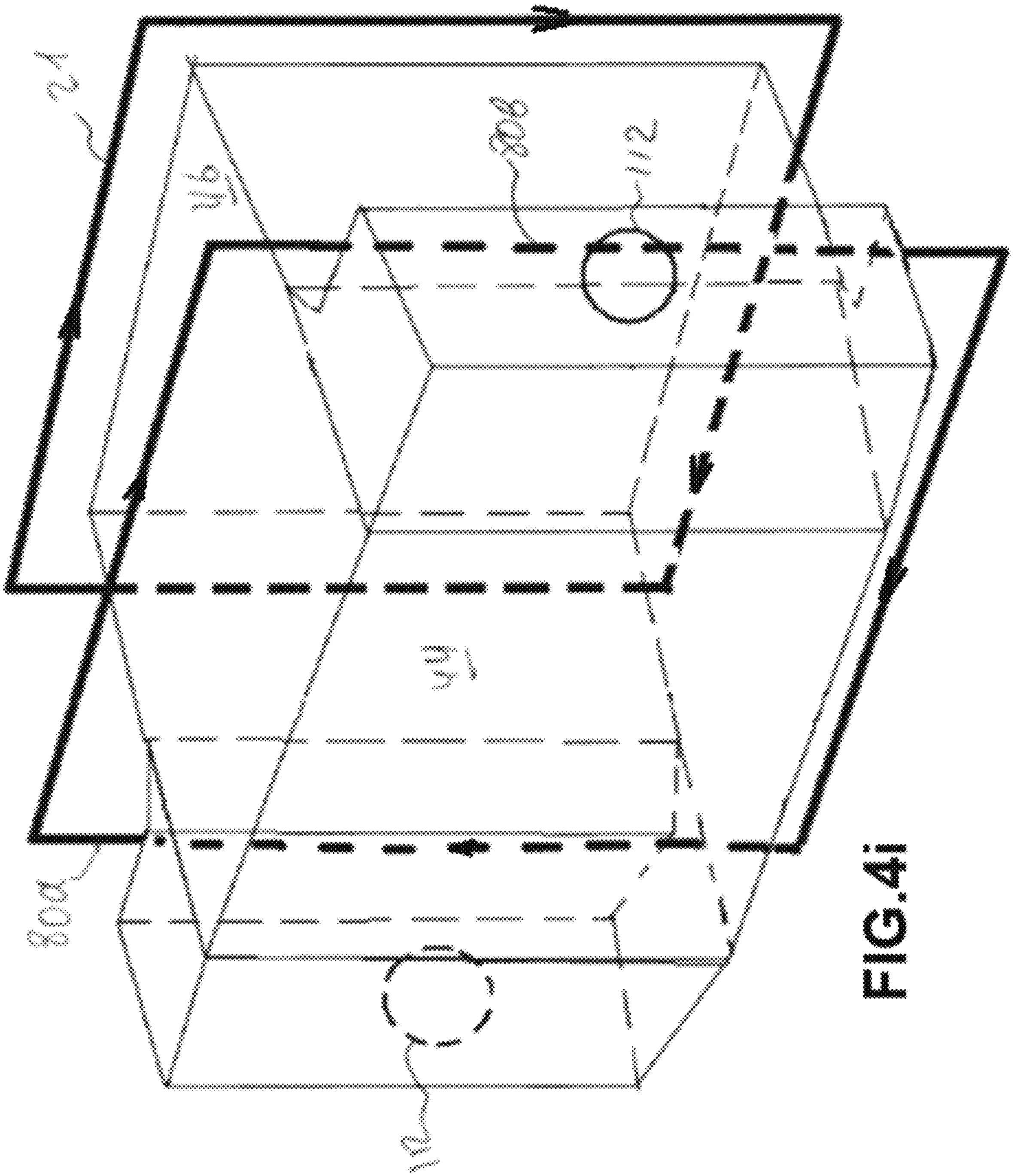
Figure 4J:
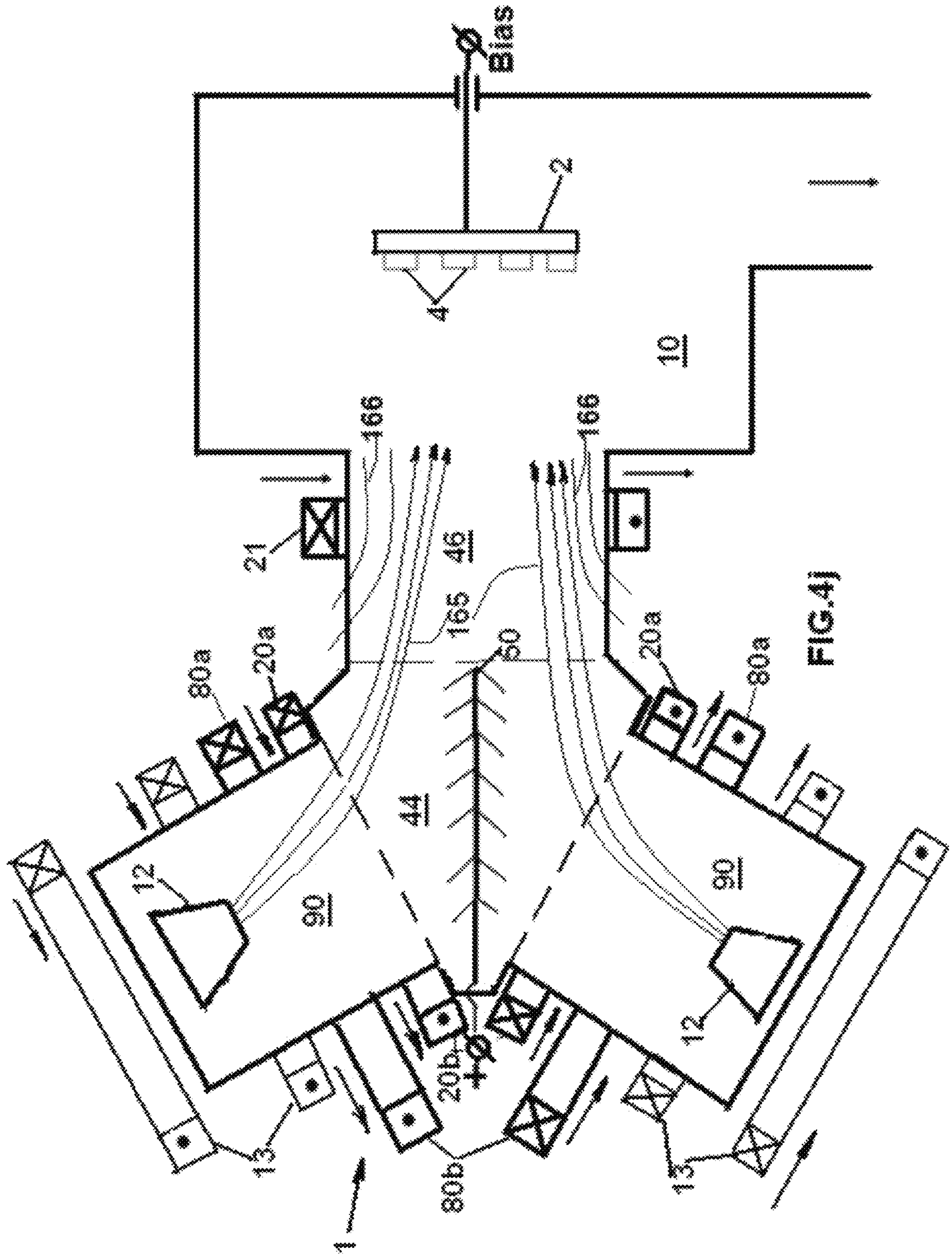
Figure 4K:
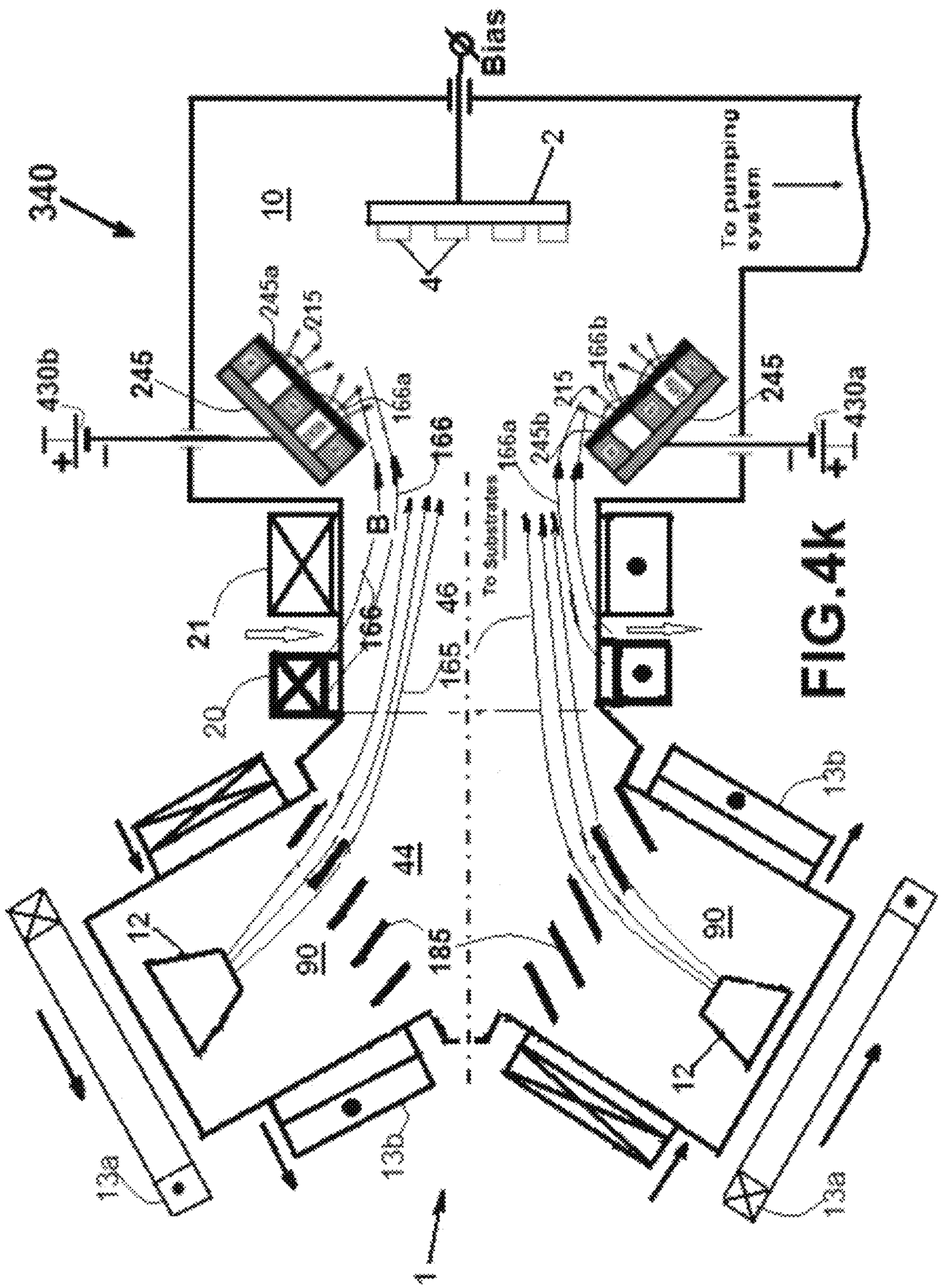
Figure 4L:
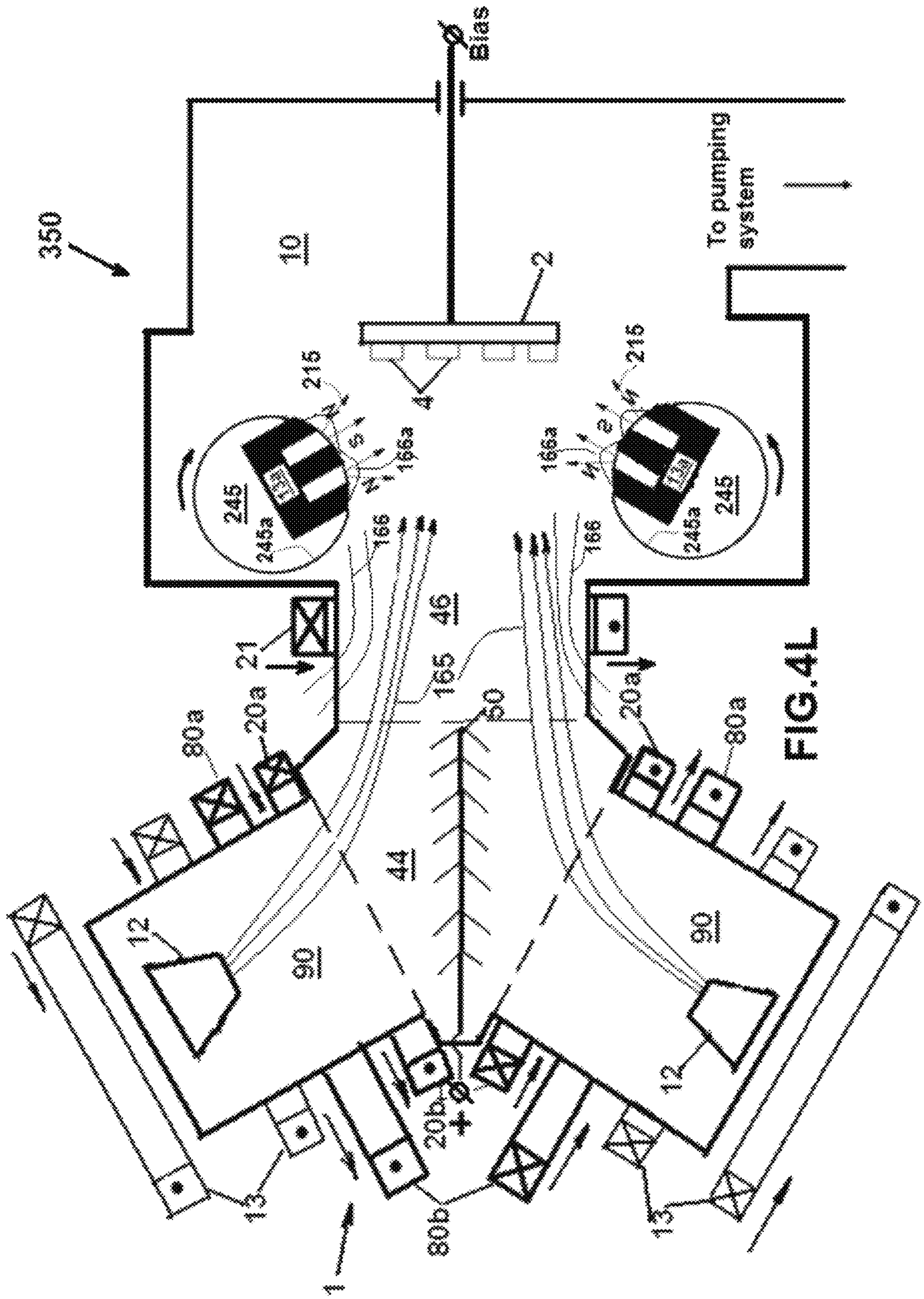
Figure 4M:
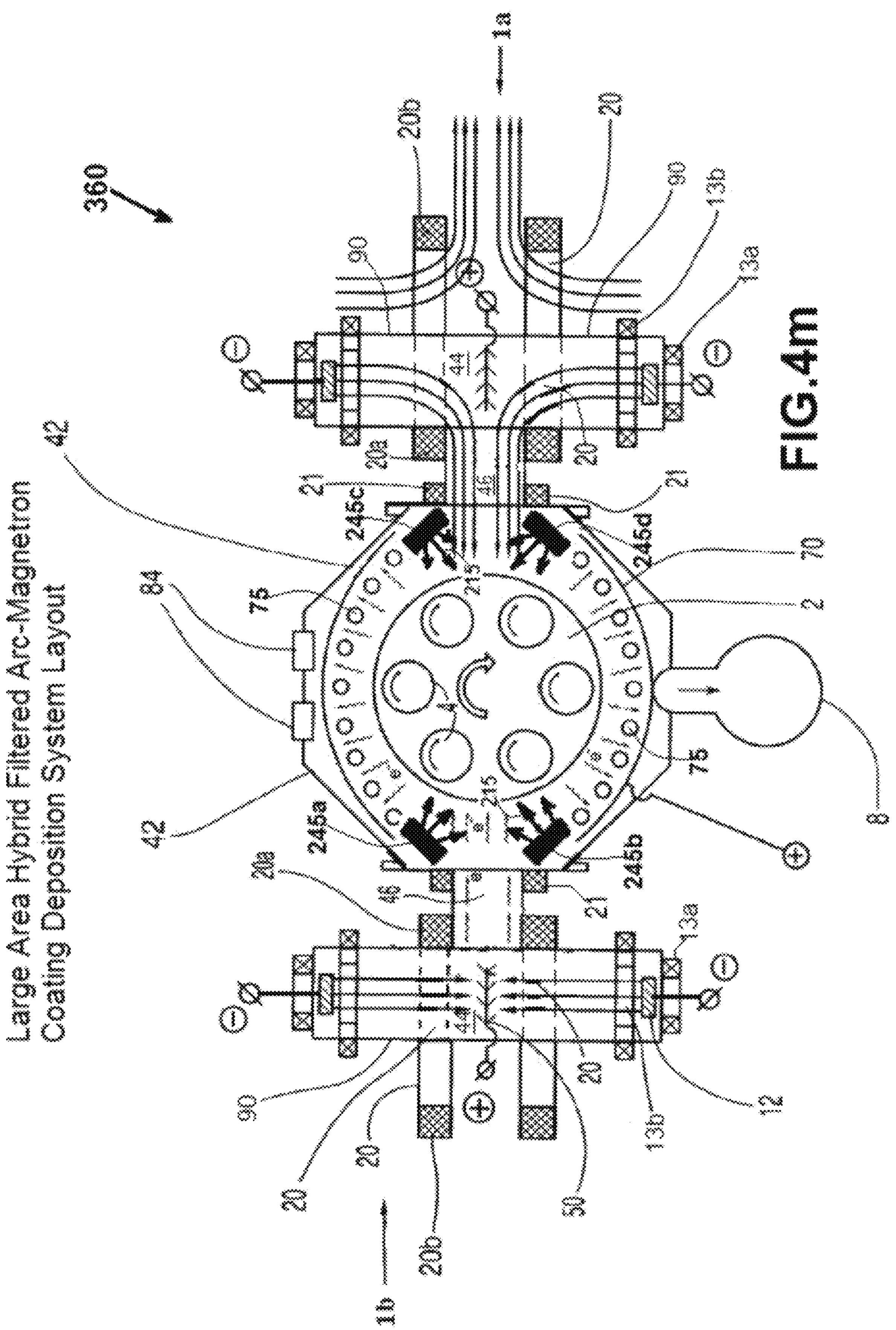
Figure 5:
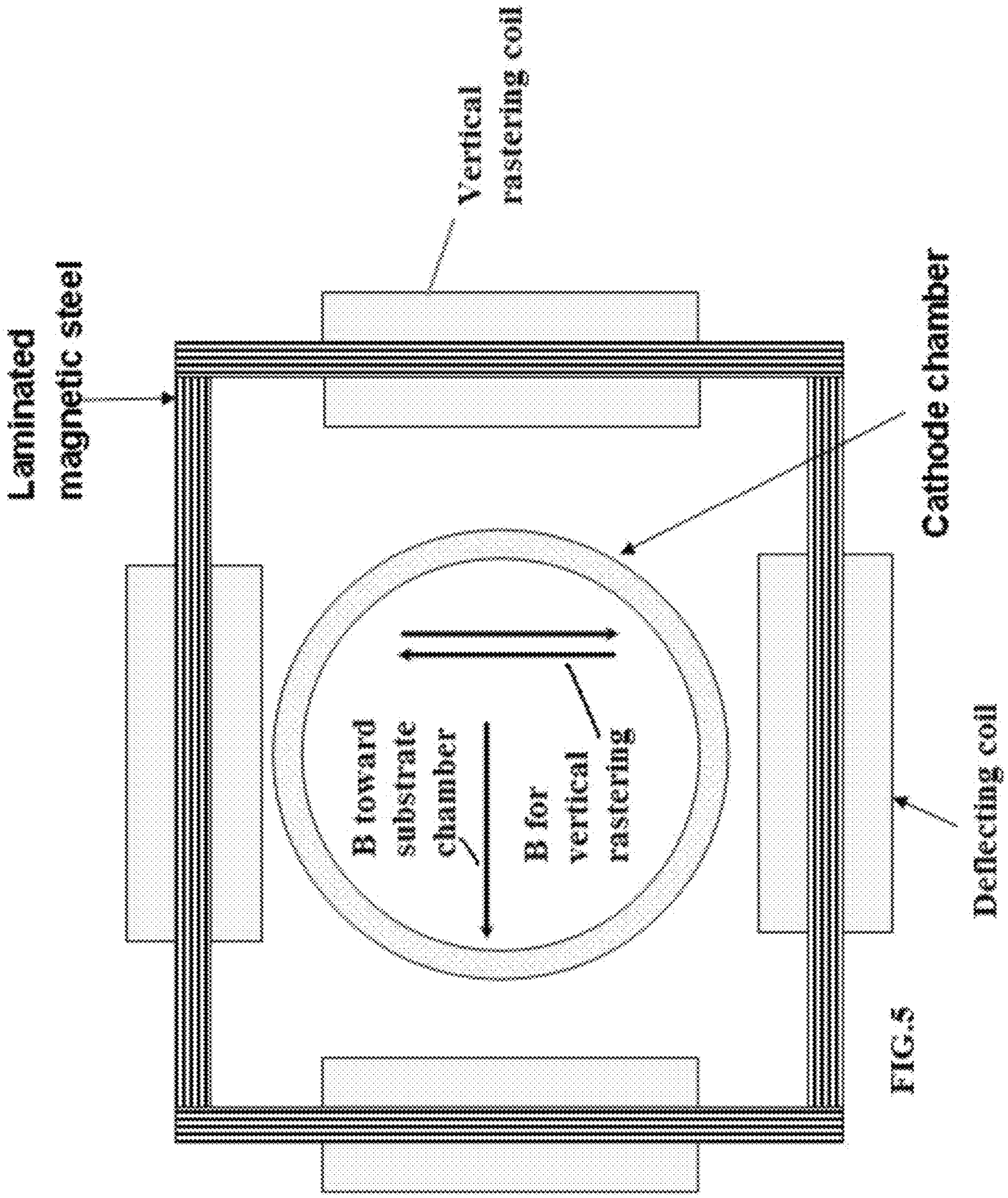
Figure 6A:
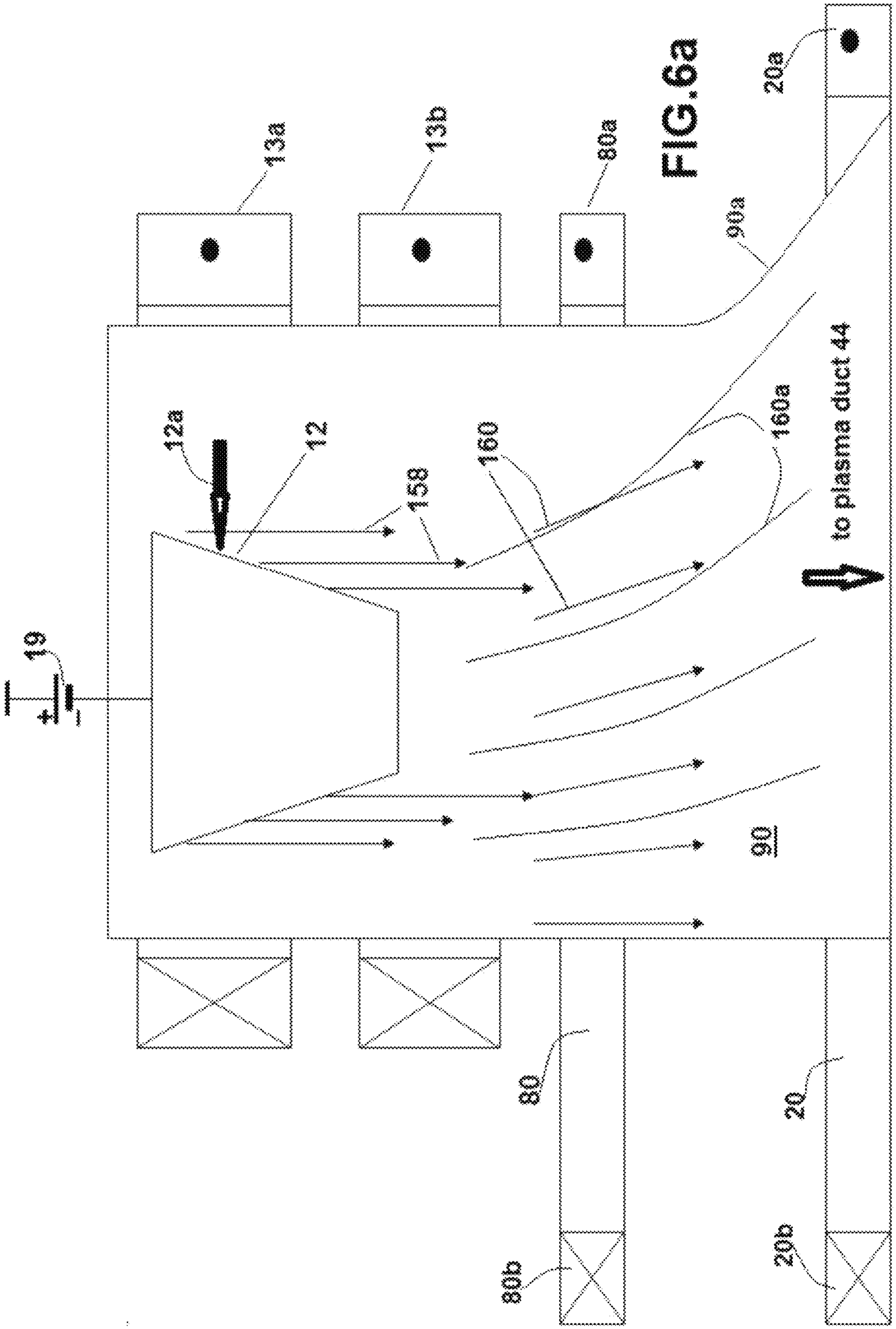
Figure 6B:
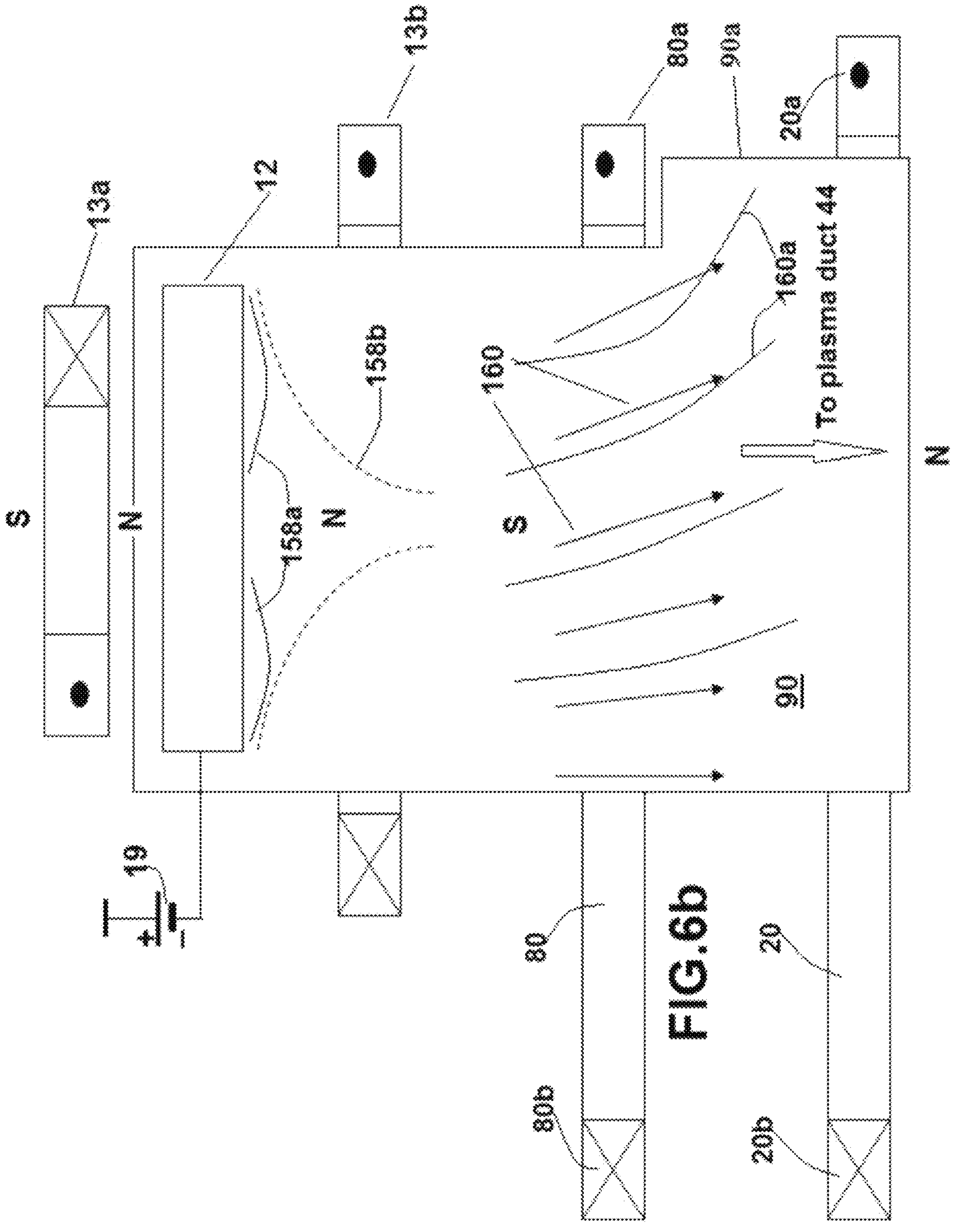
Figure 6C:
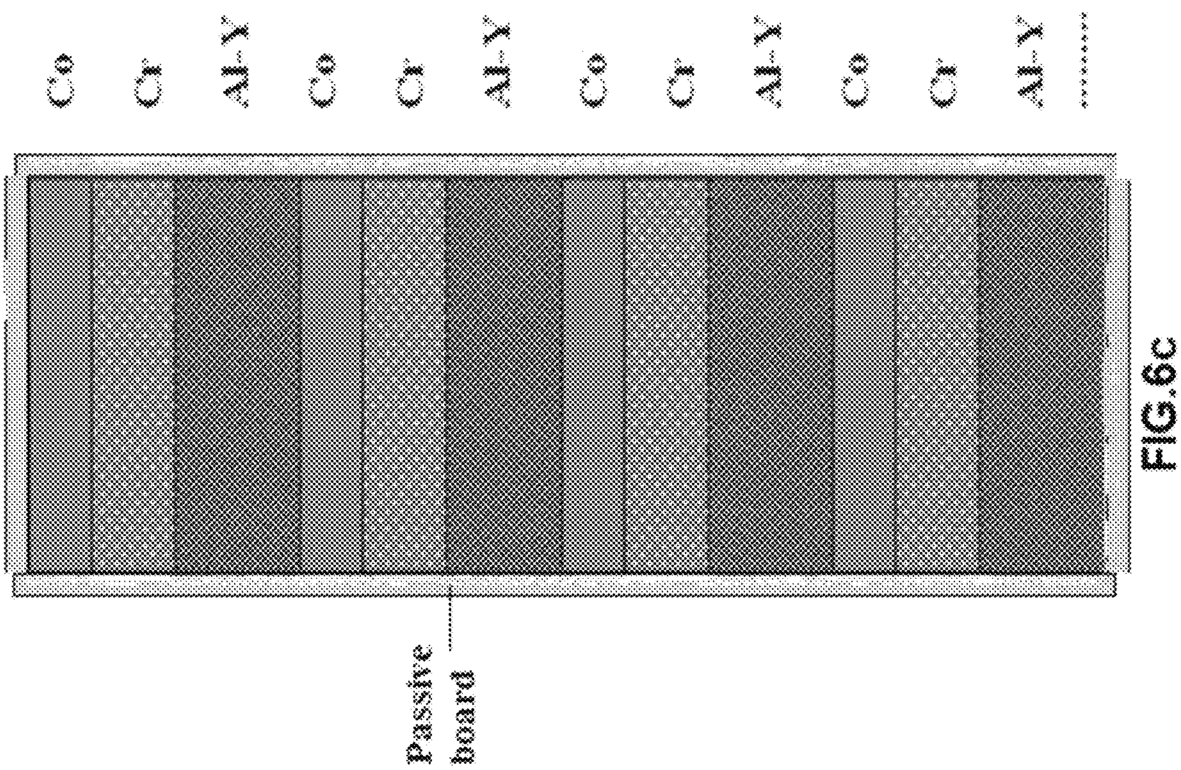
Figure 6D:
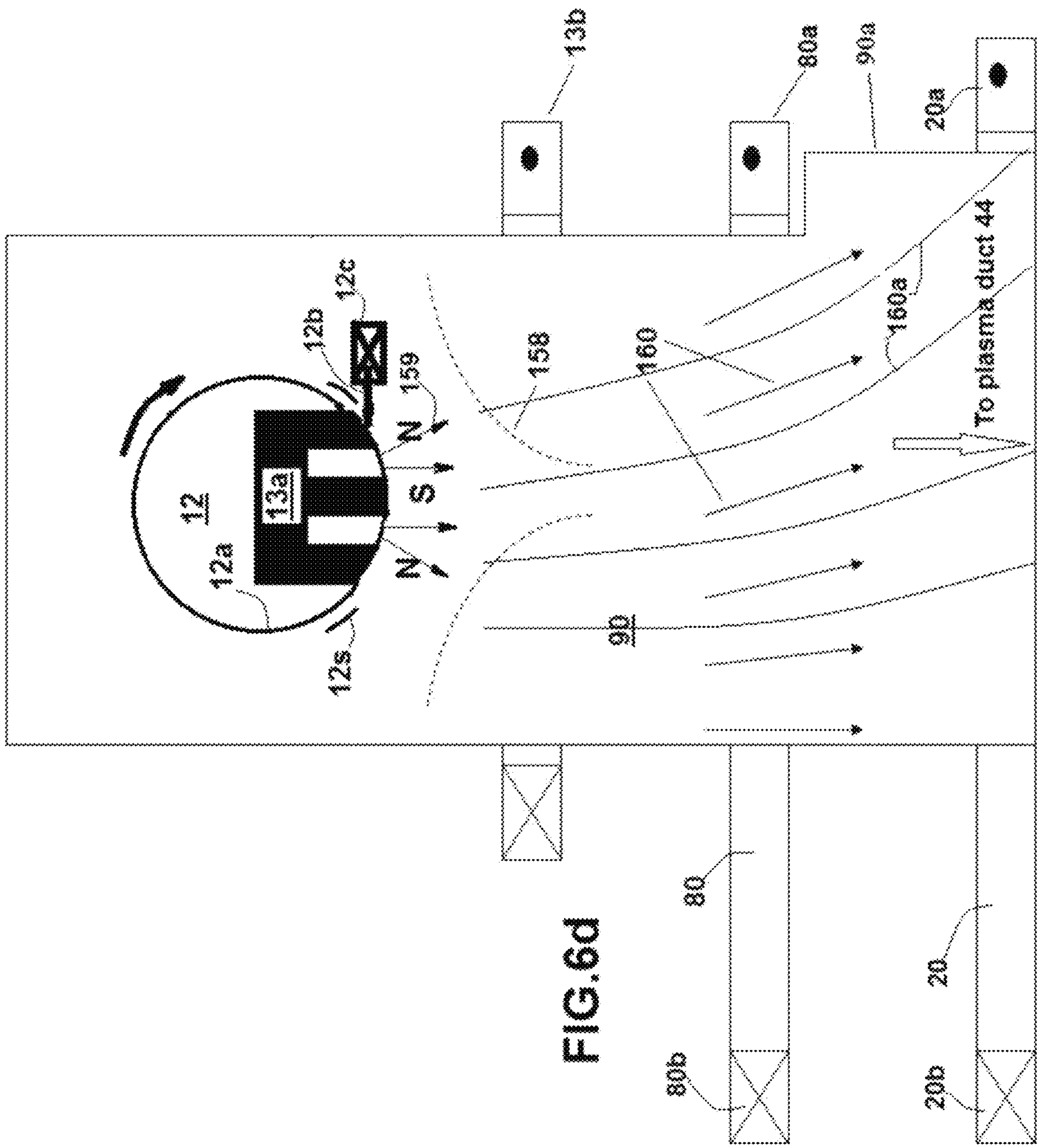
Figure 6E:
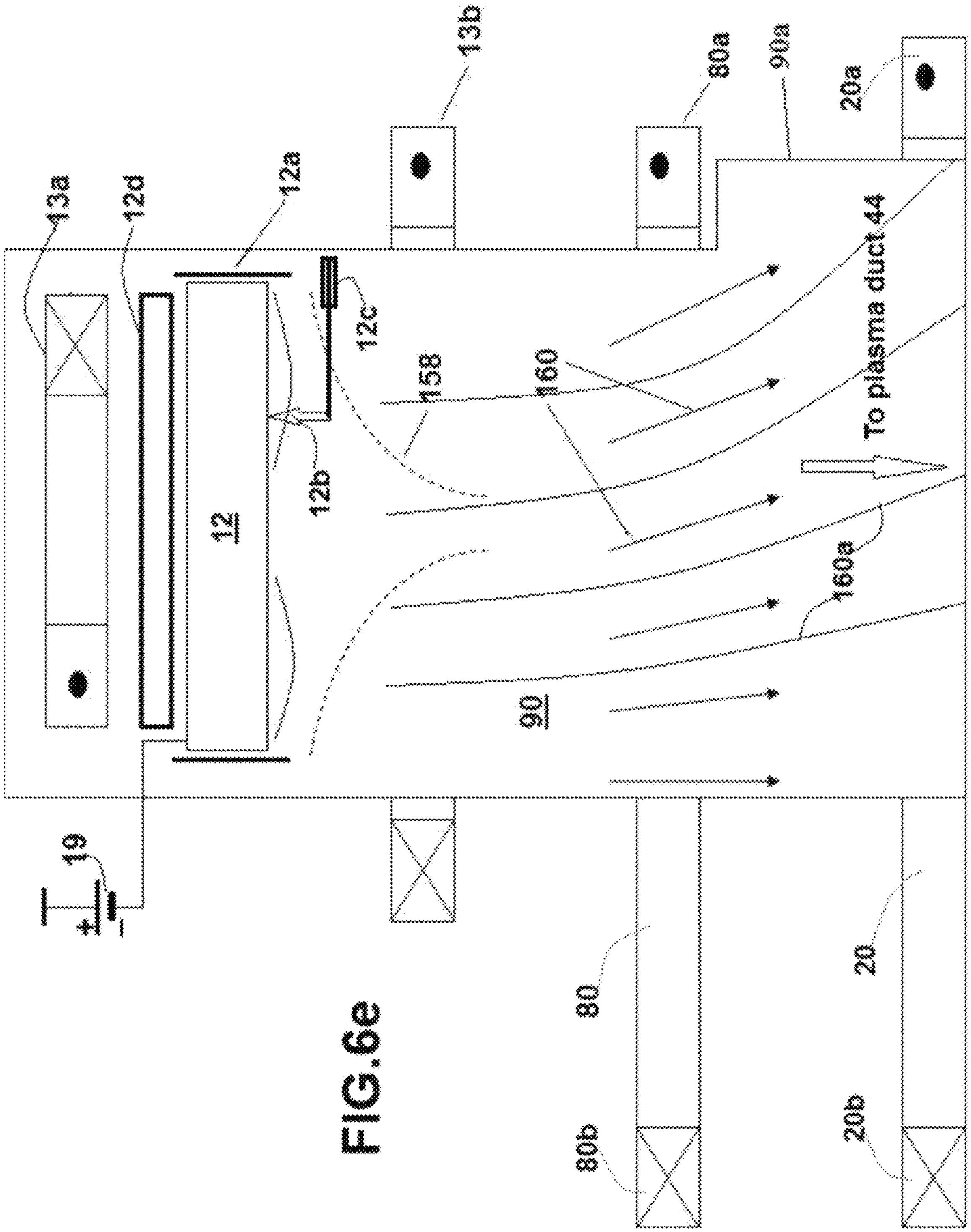
Figure 6F:
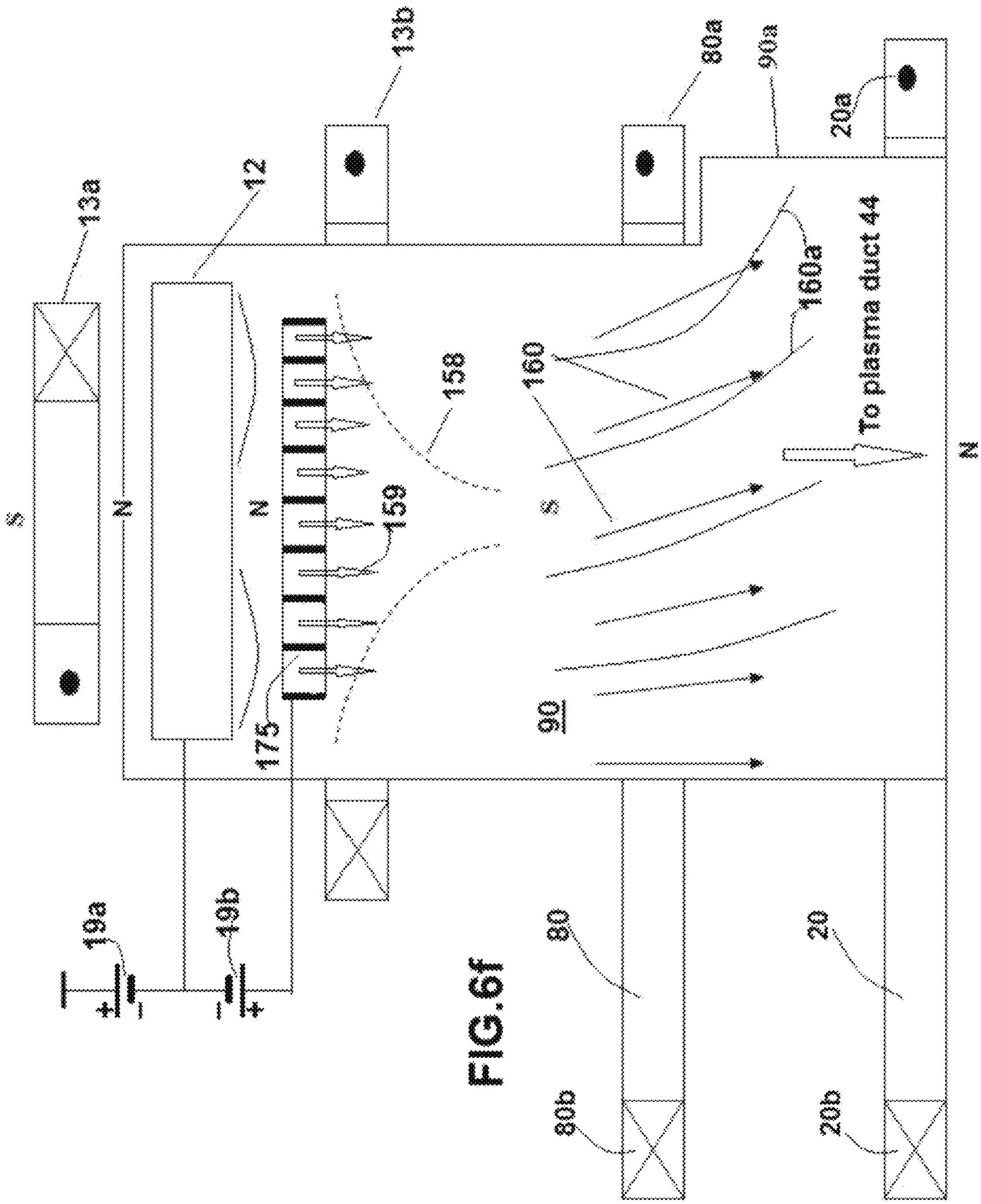
Figure 7A:
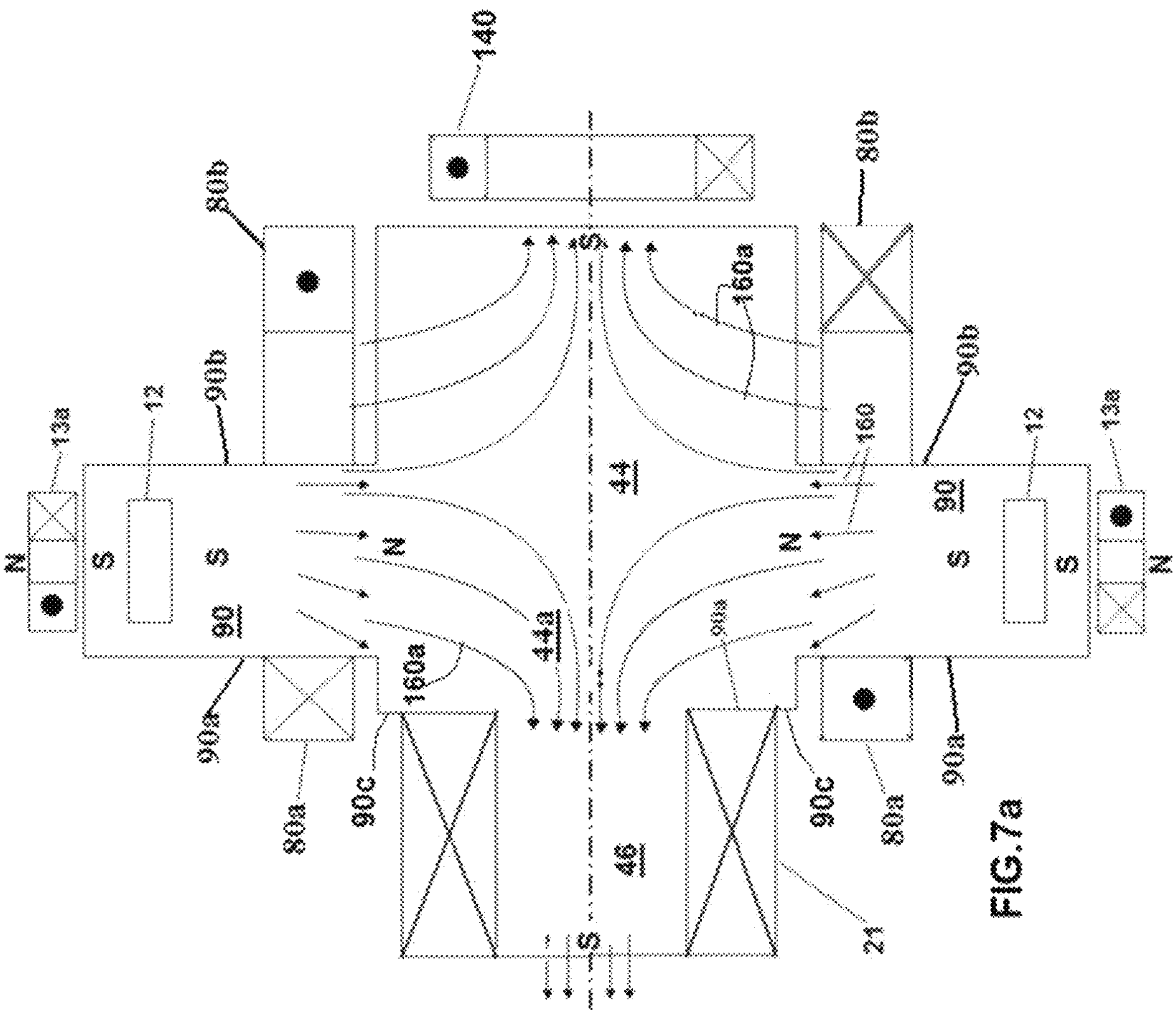
Figure 7B:
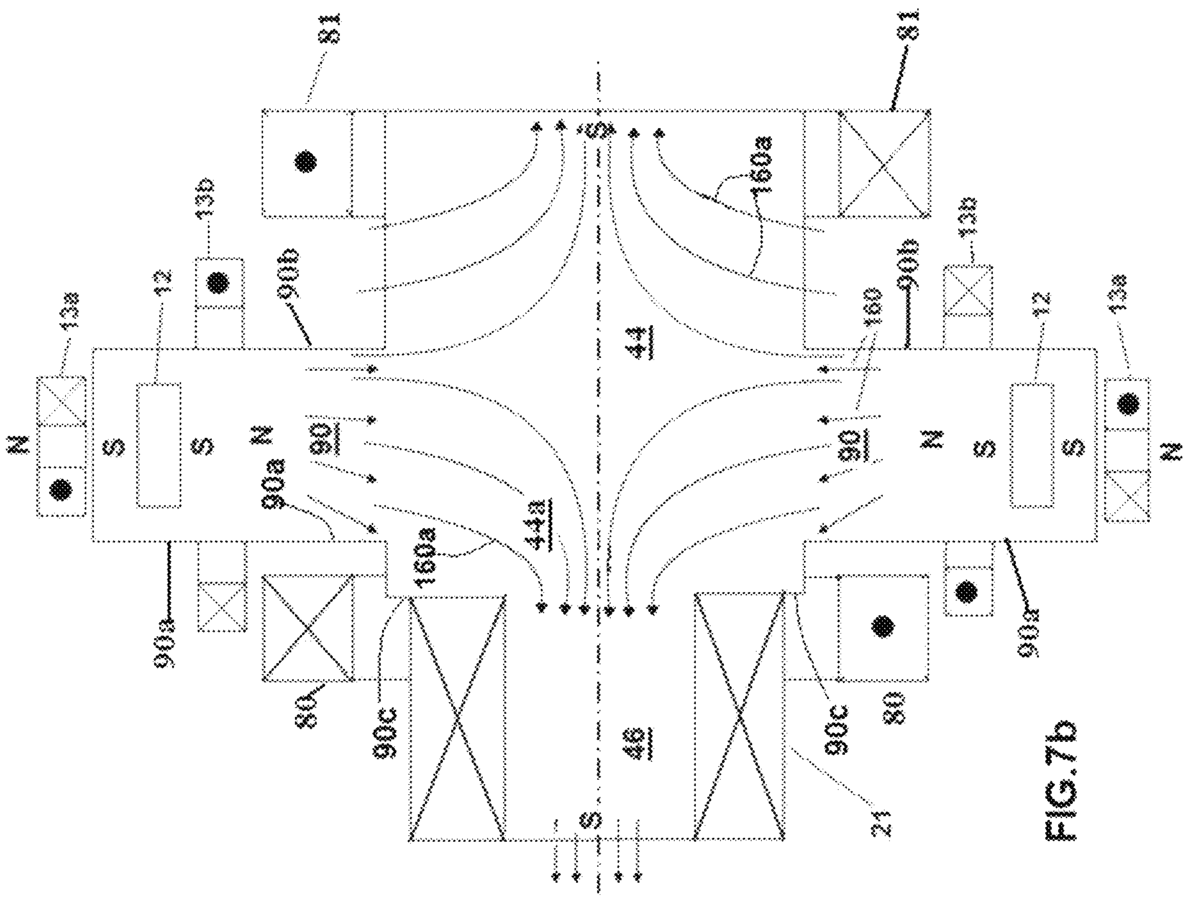
Figure 7C:
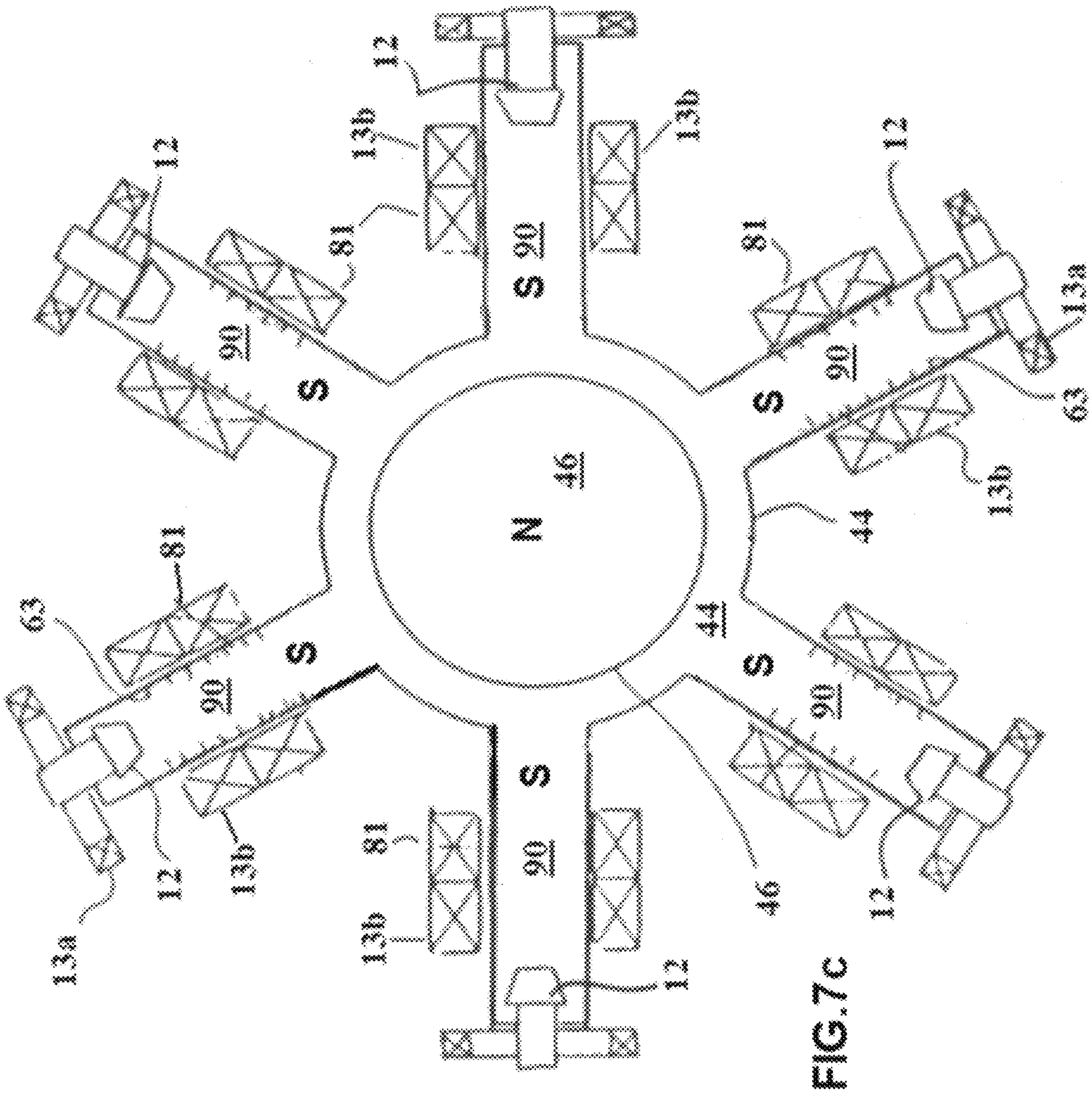
Figure 7D:
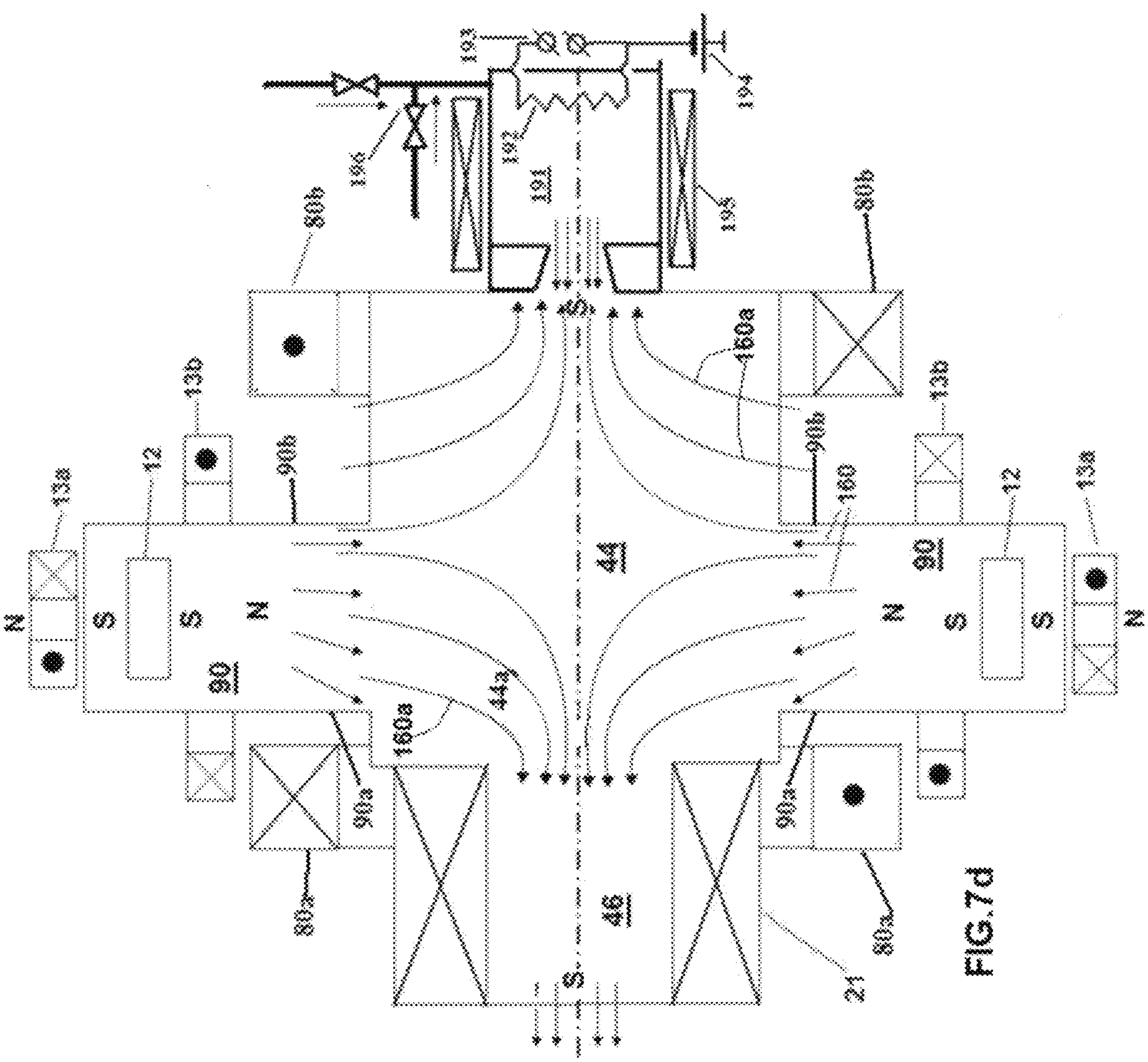
Figure 7E:
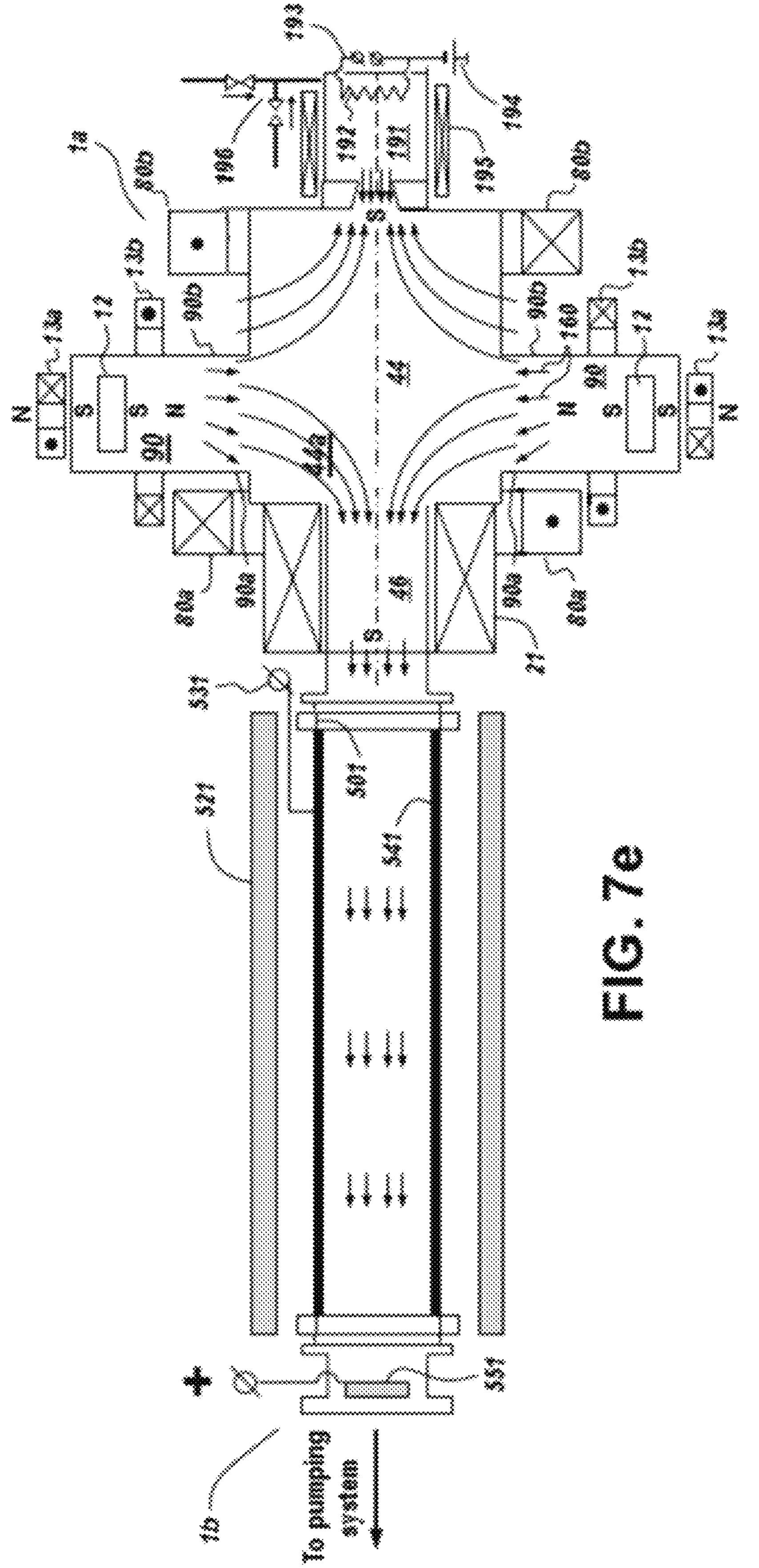
Figure 7F:
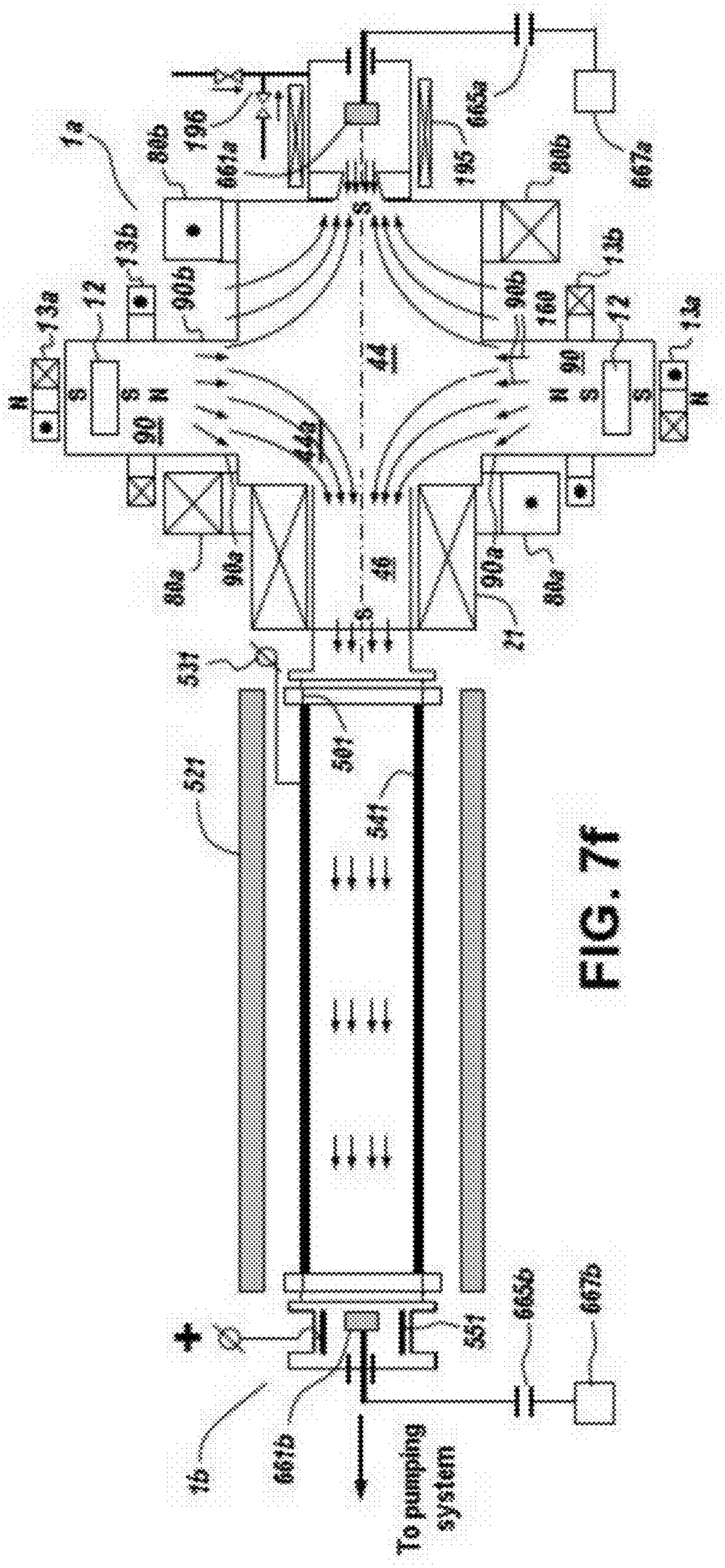
Figure 714:
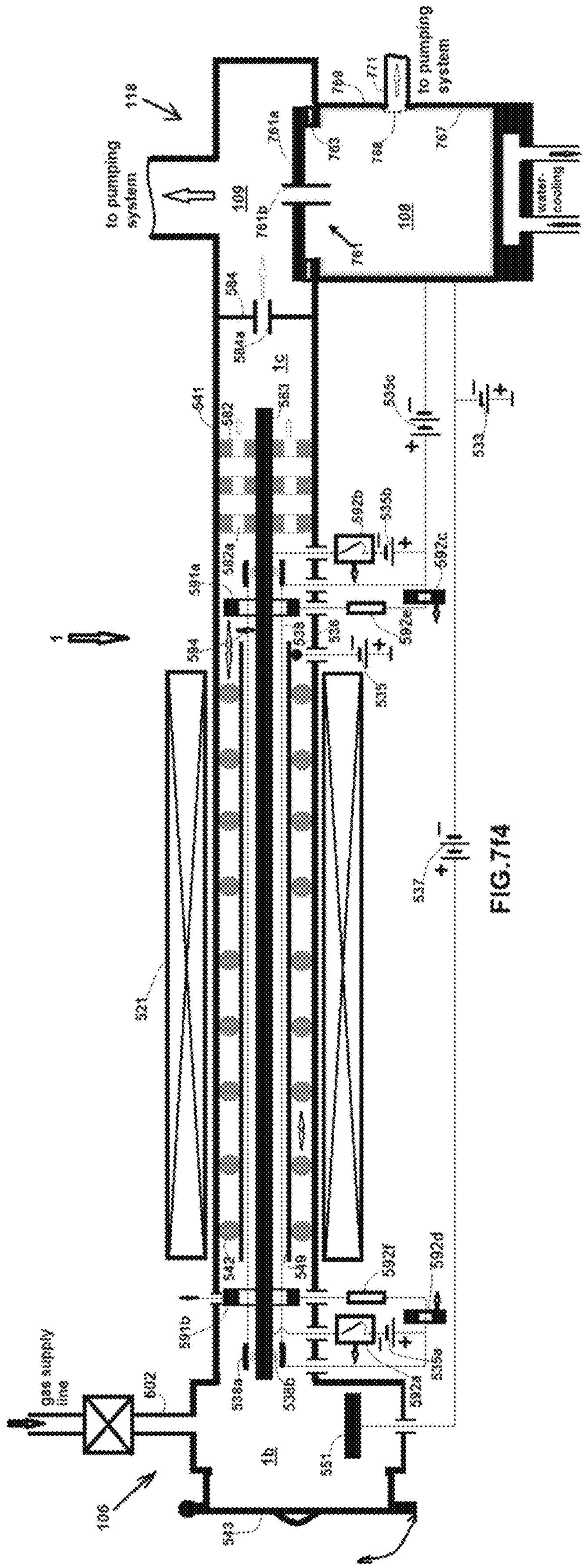
Figure 715:
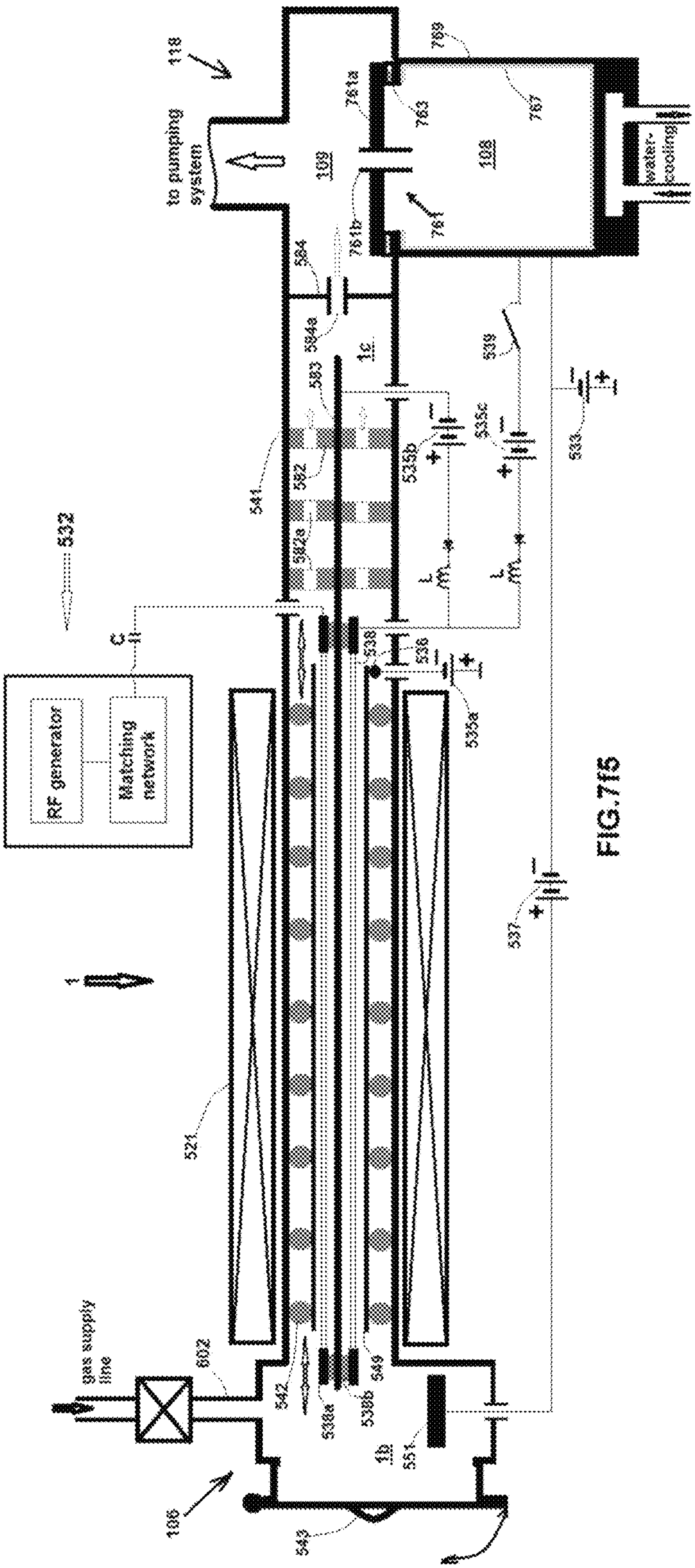
Figure 7G:
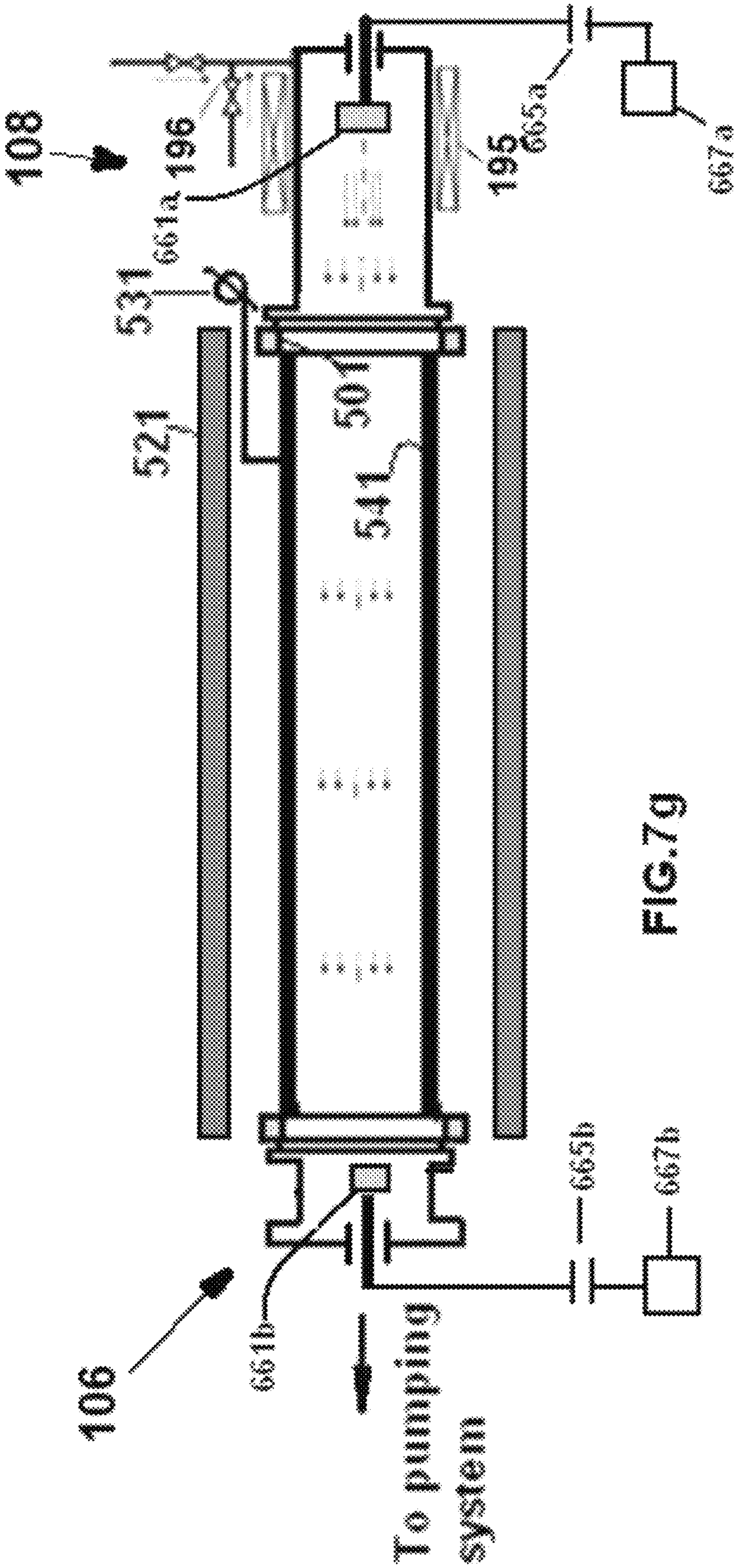
Figure 7H:
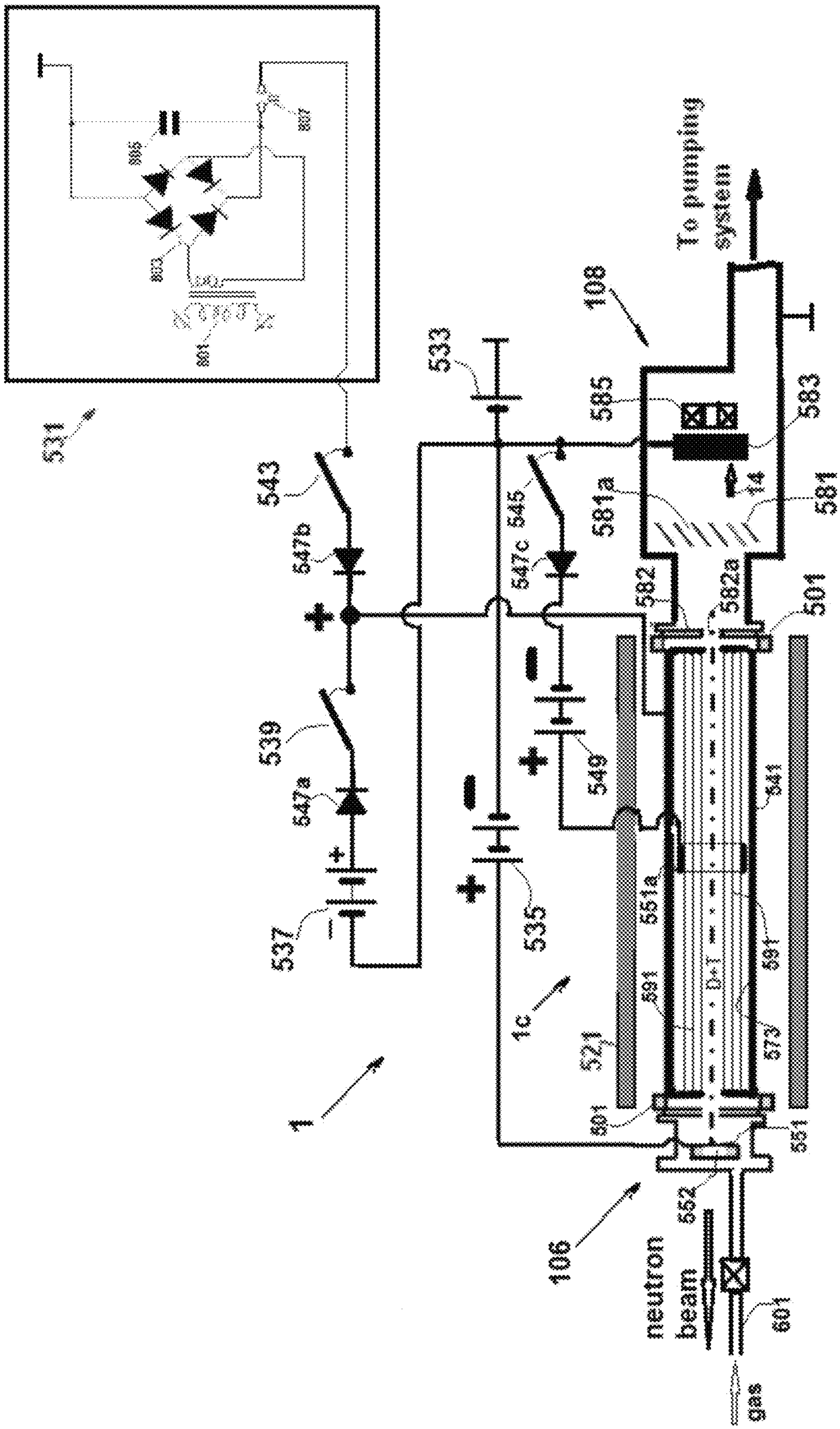
Figure 7I:
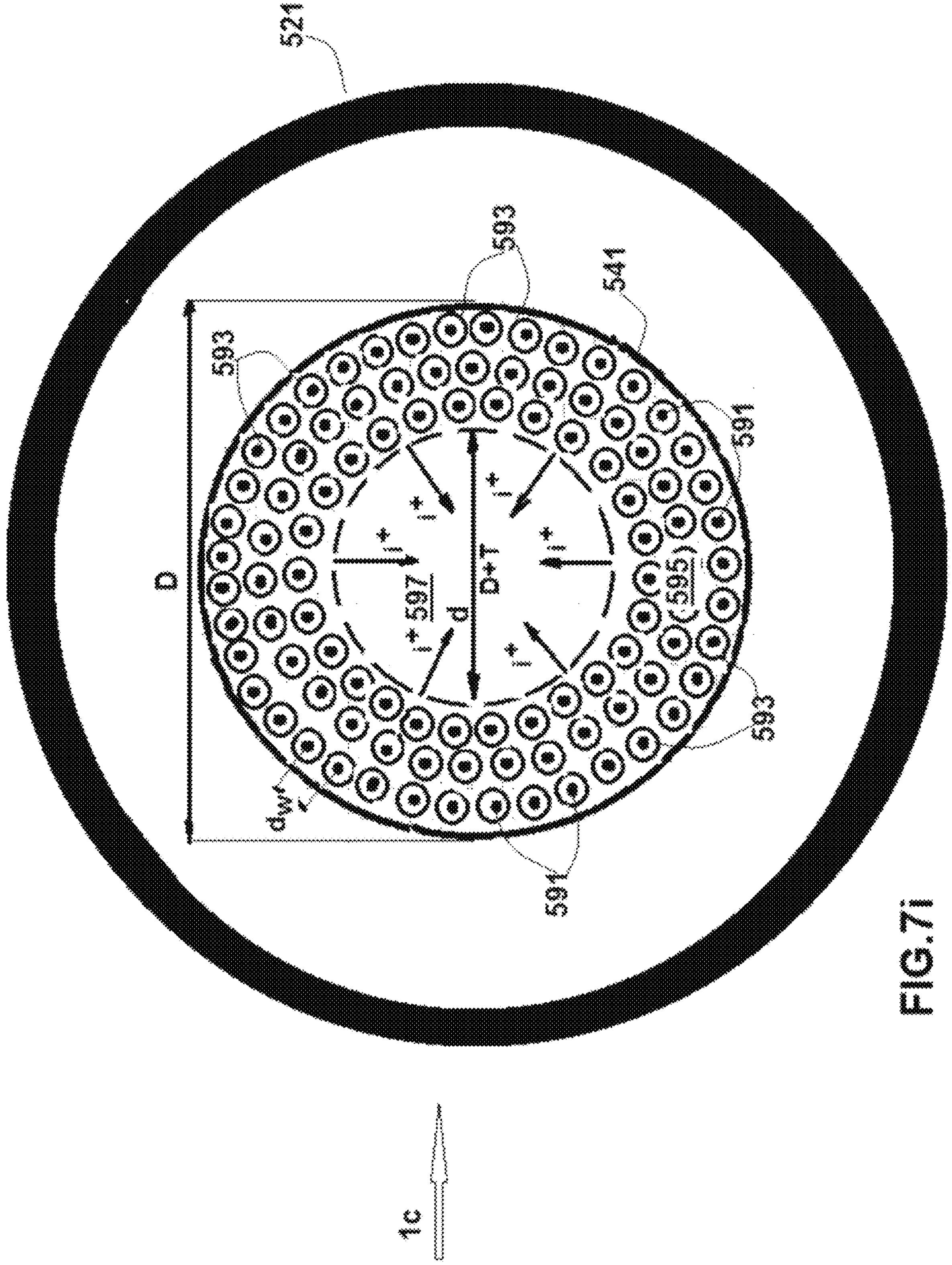
Figure 7J:
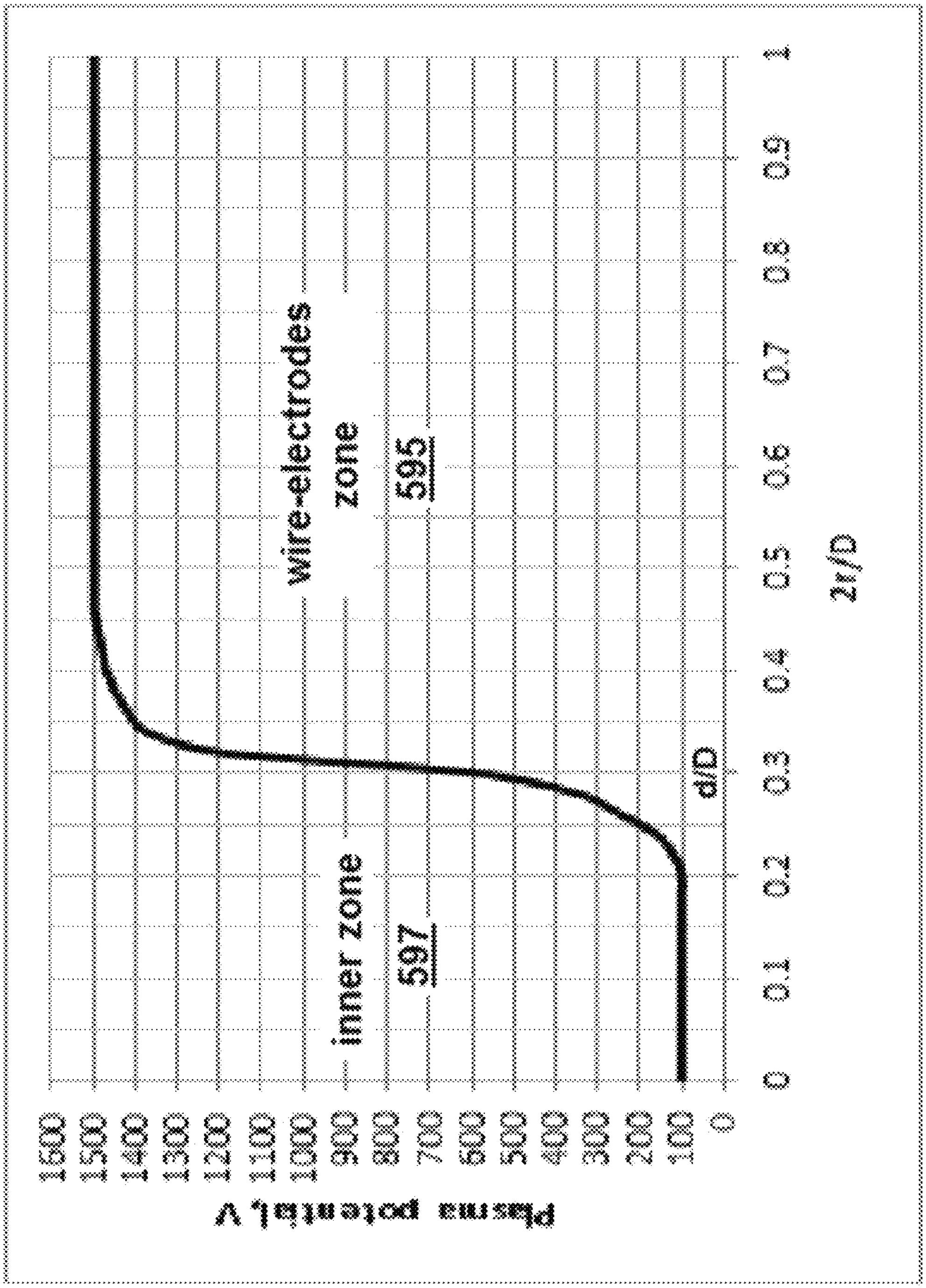
Figure 7K:
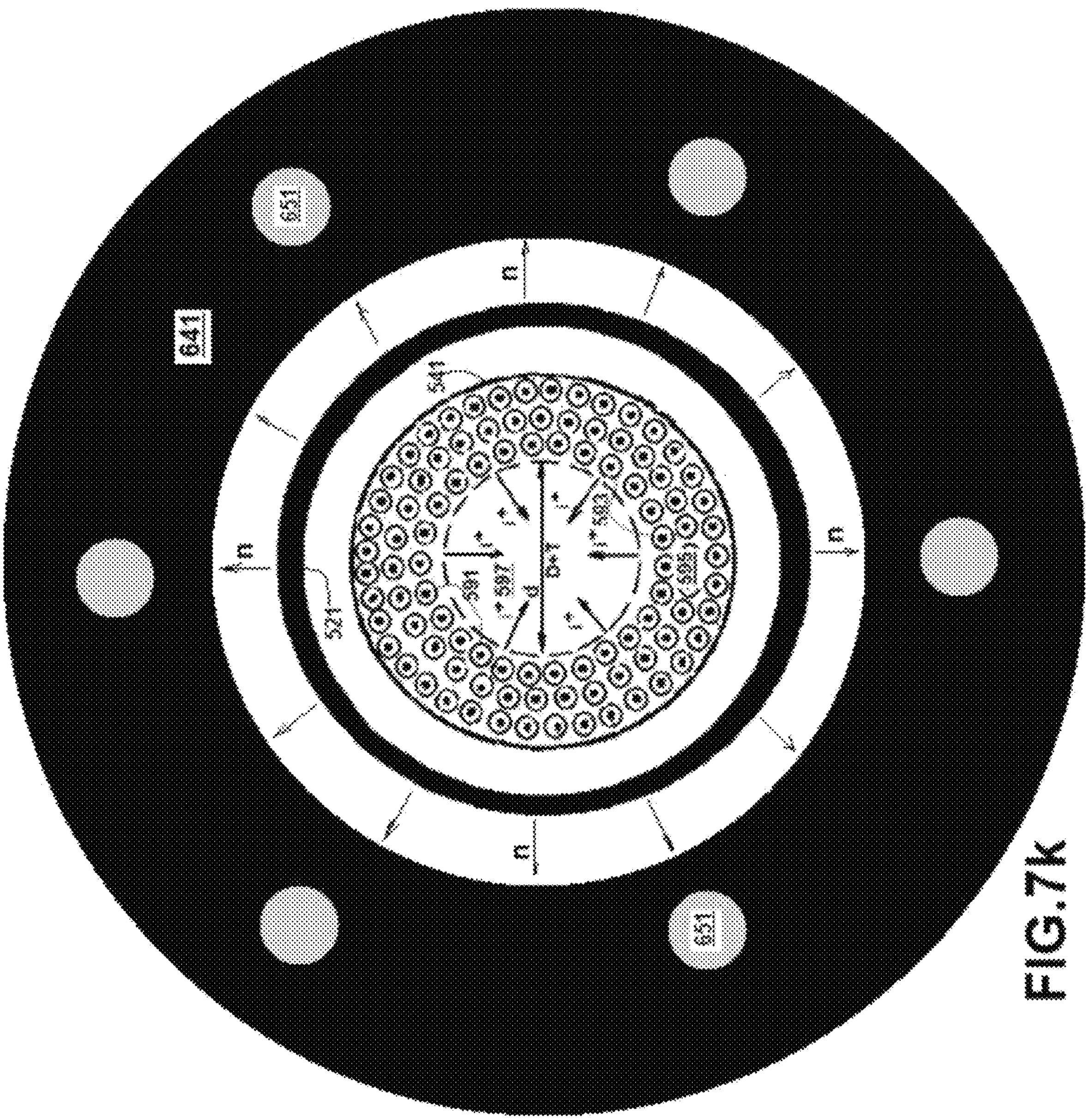
Figure 7L:
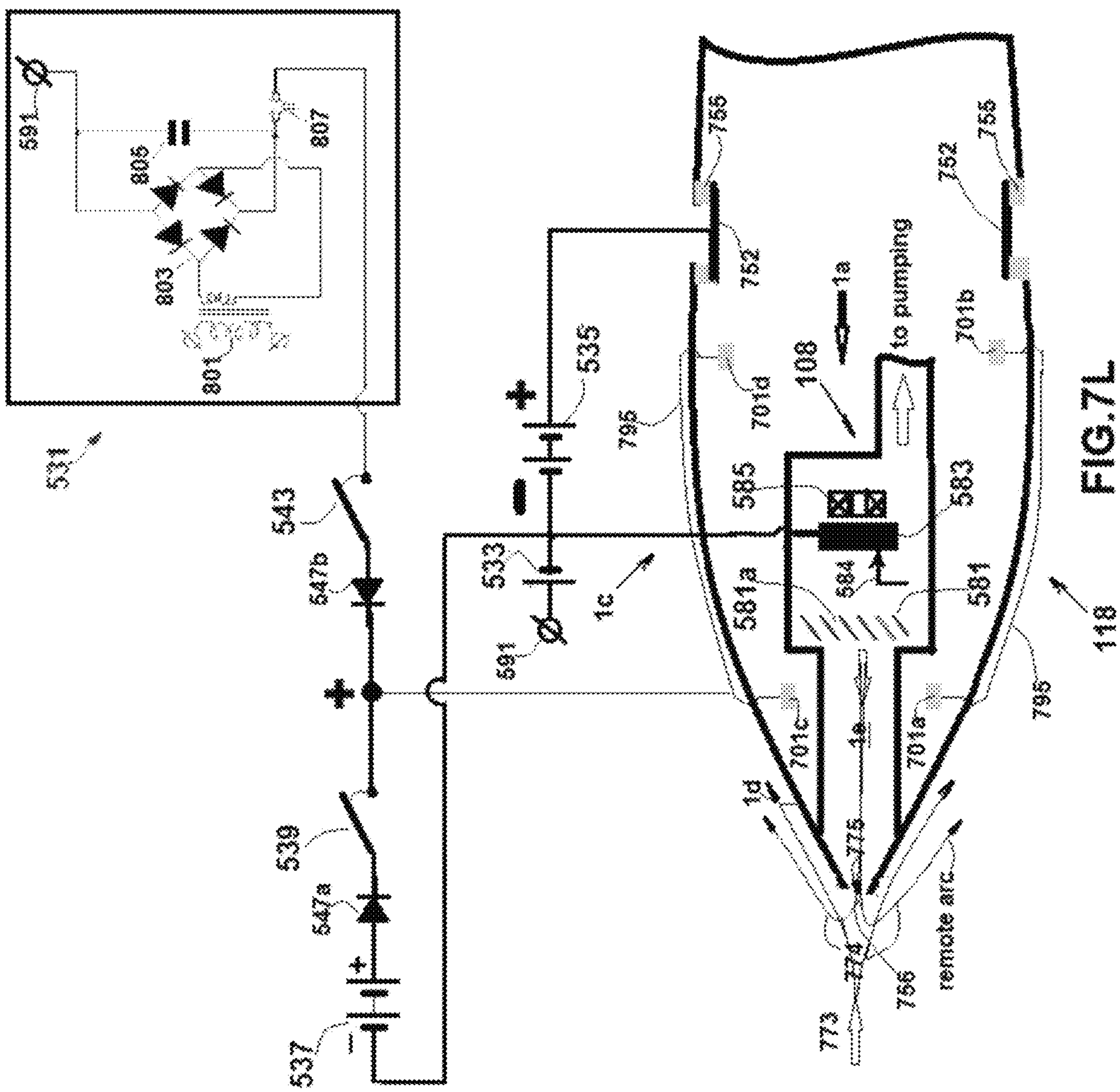
Figure 7M:
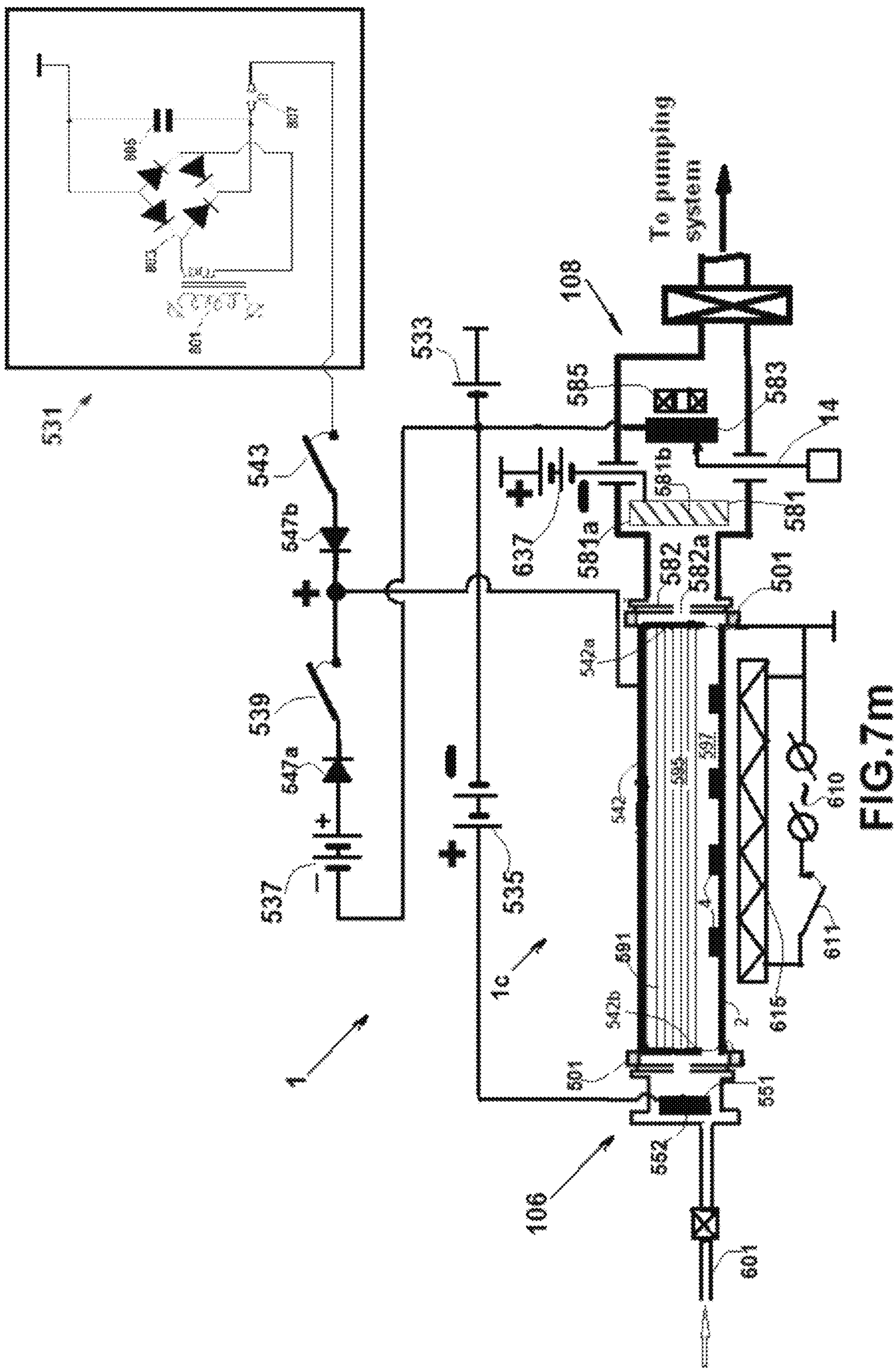
Figure 7N:
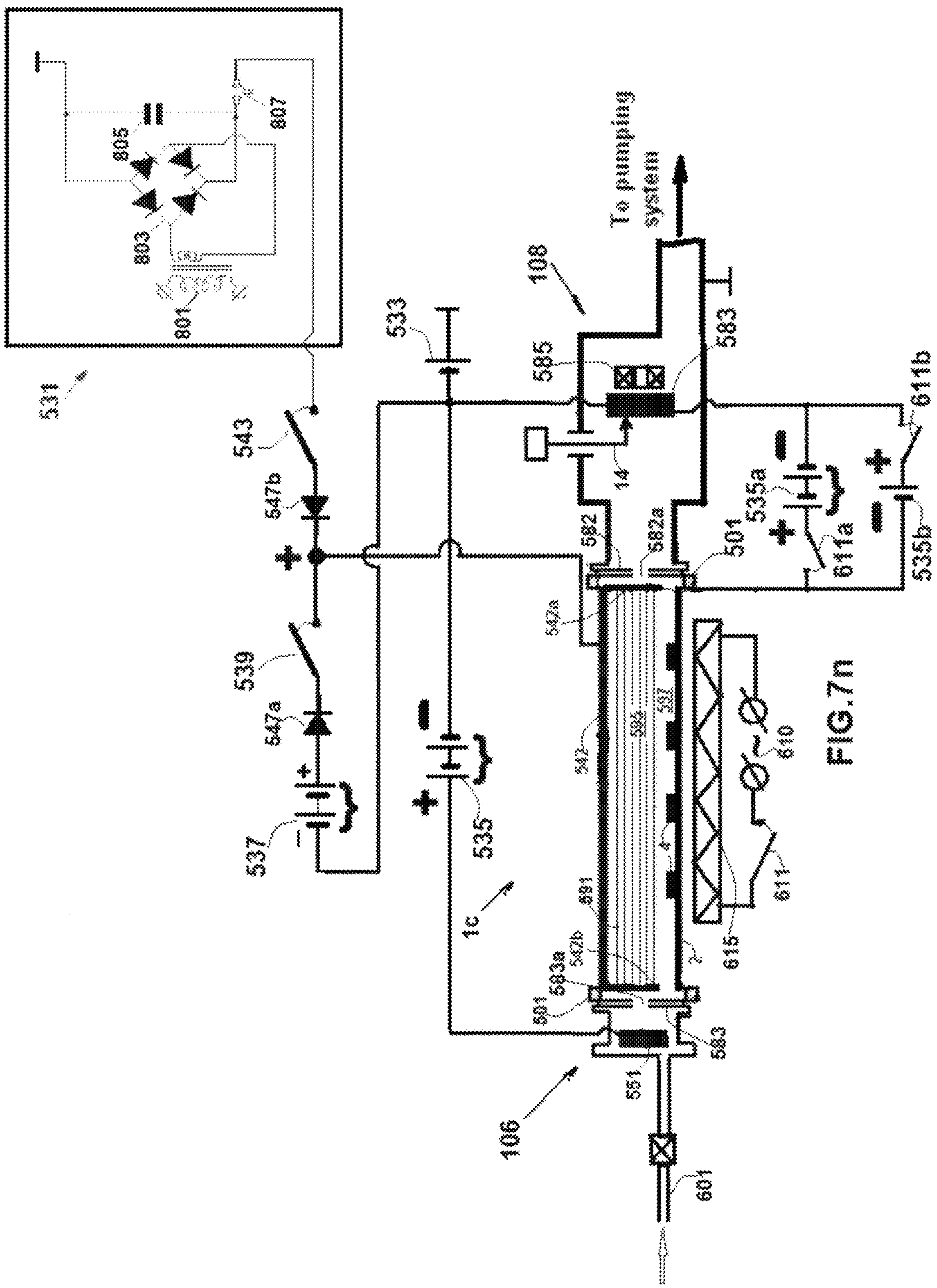
Figure 7O:
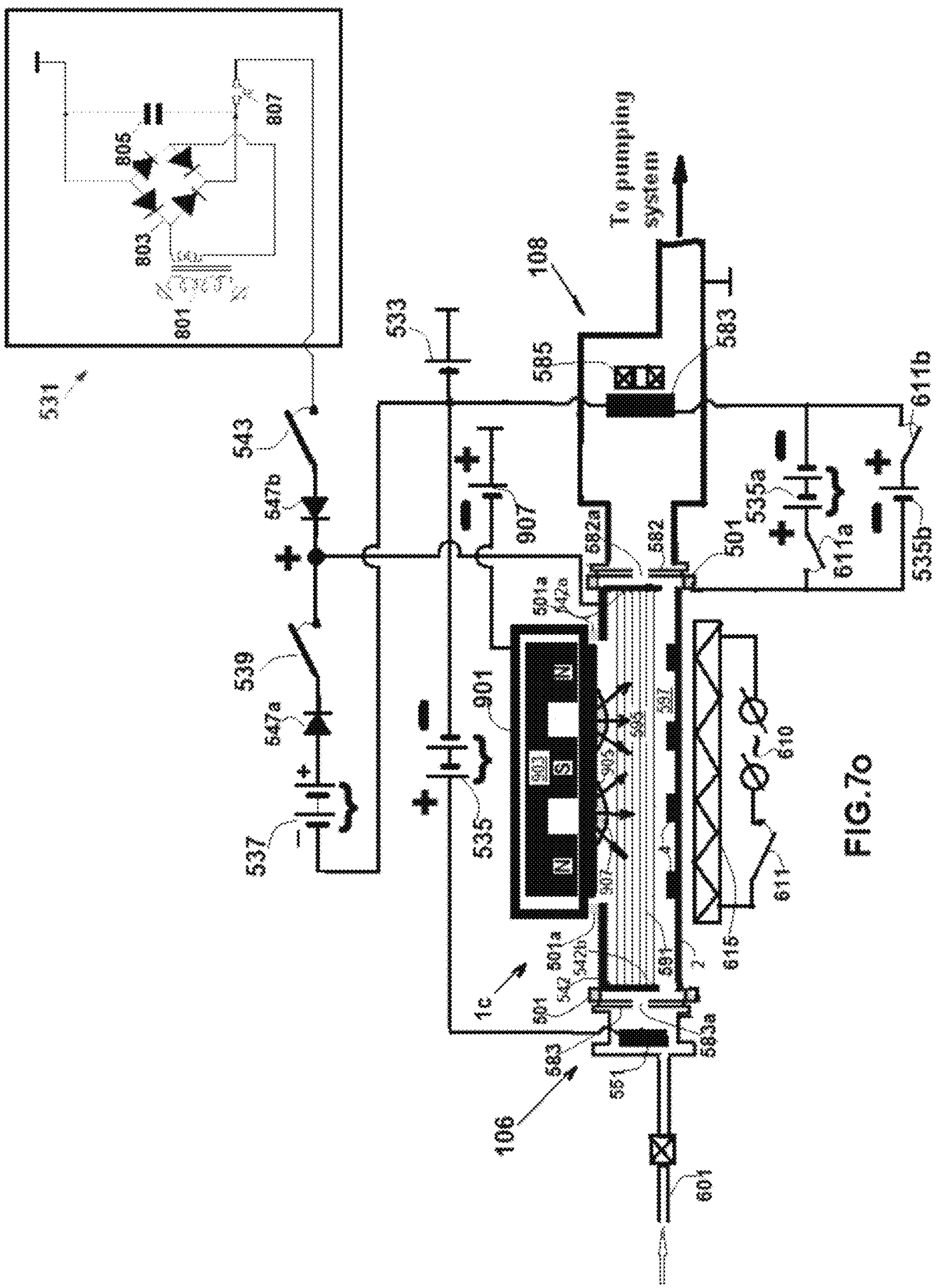
Figure 7P:
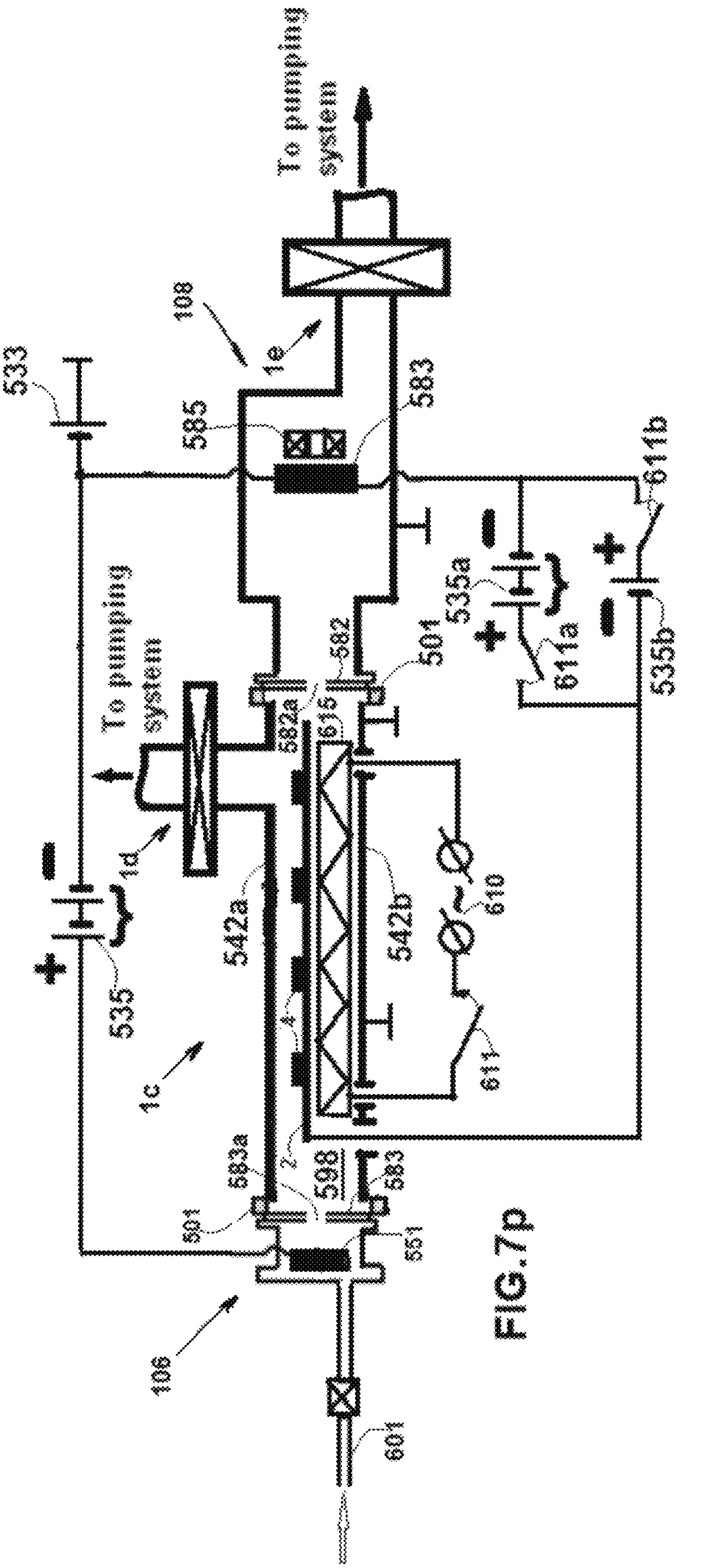
Figure 7R:
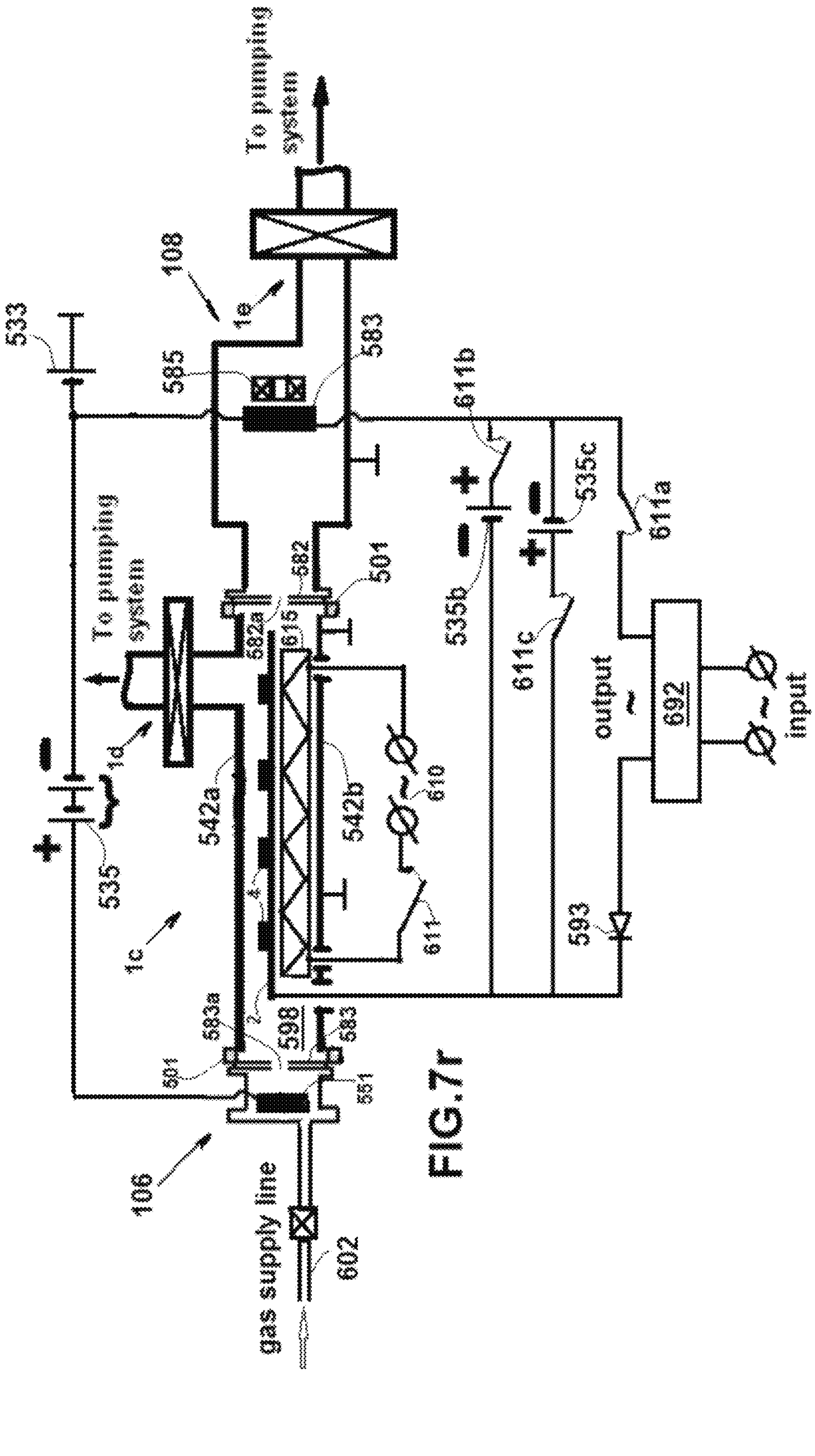
Figure 7S:
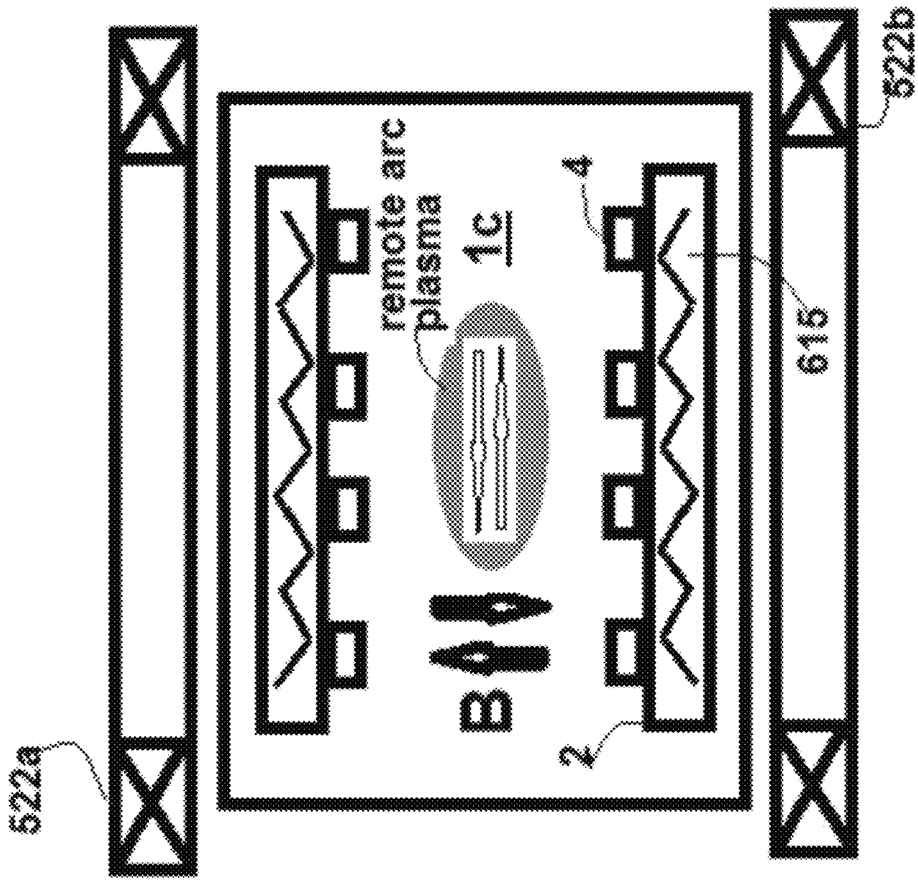
Figure 7T:
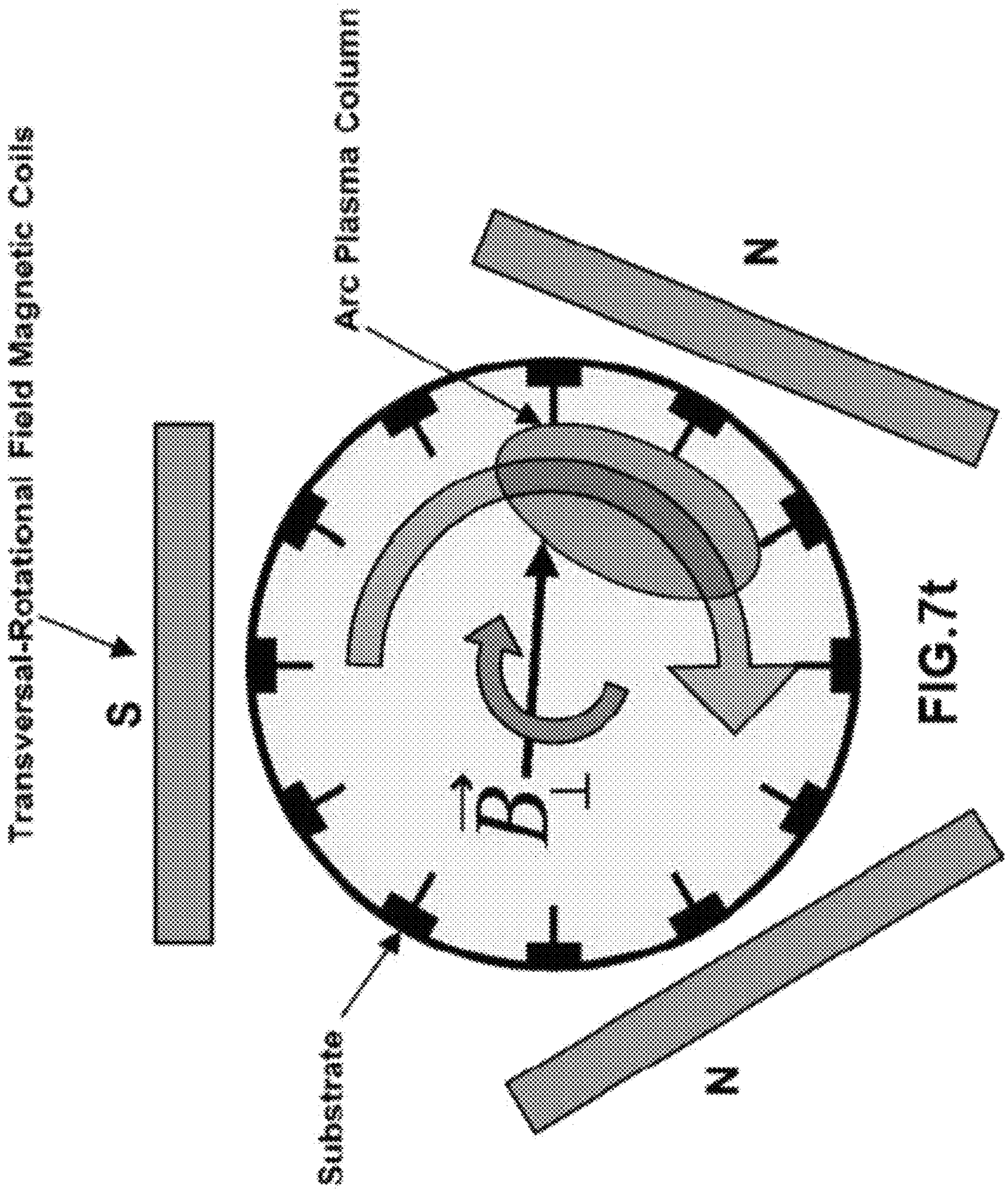
Figure 7U:
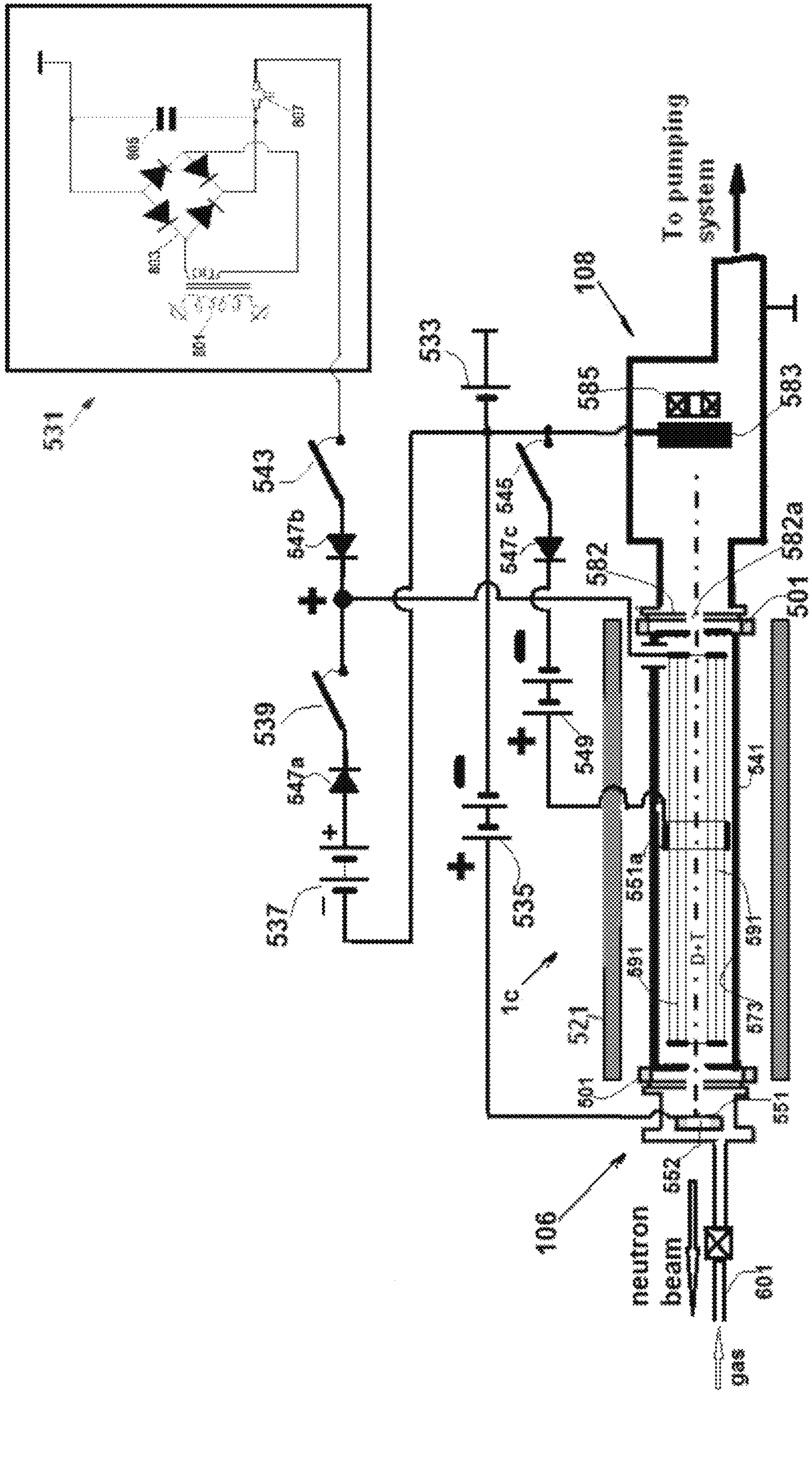
Figure 7W:
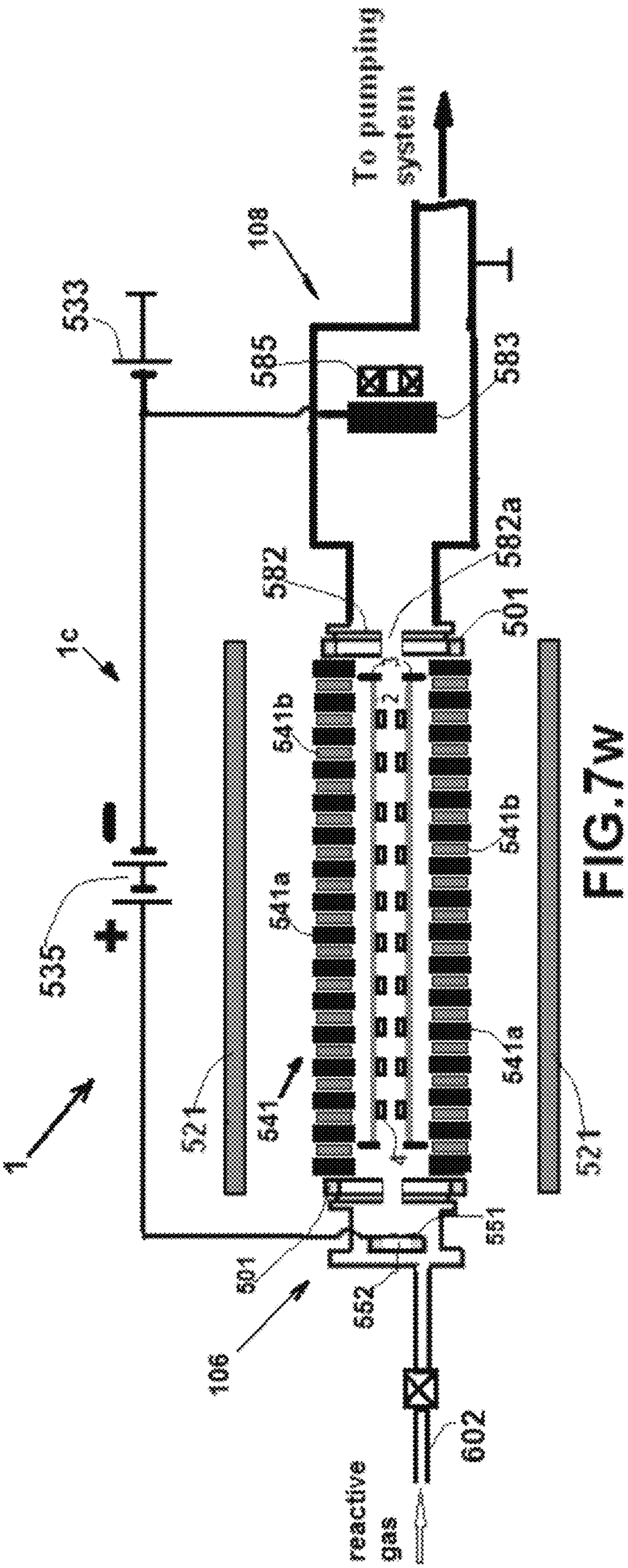
Figure 7X:
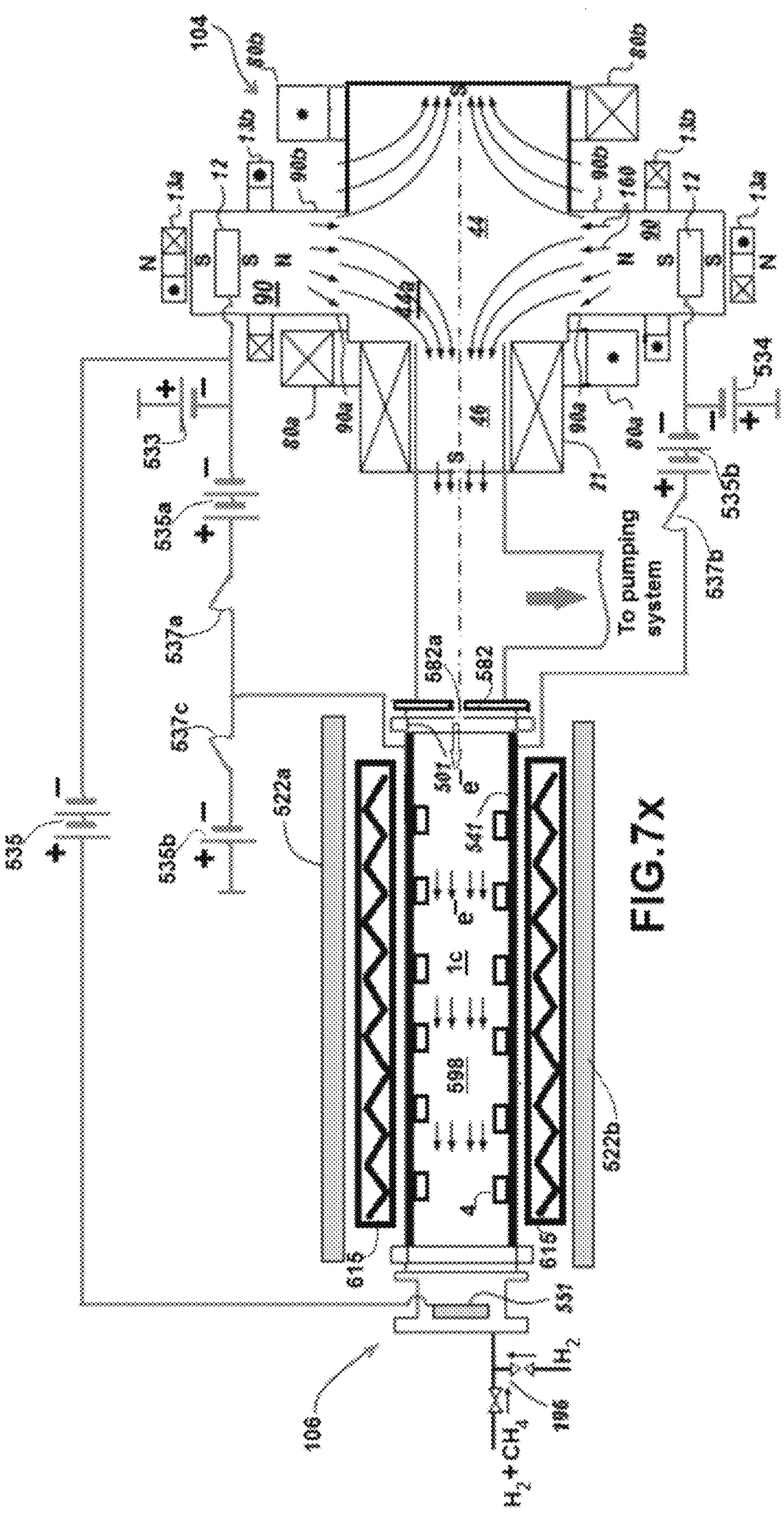
Figure 7Y:
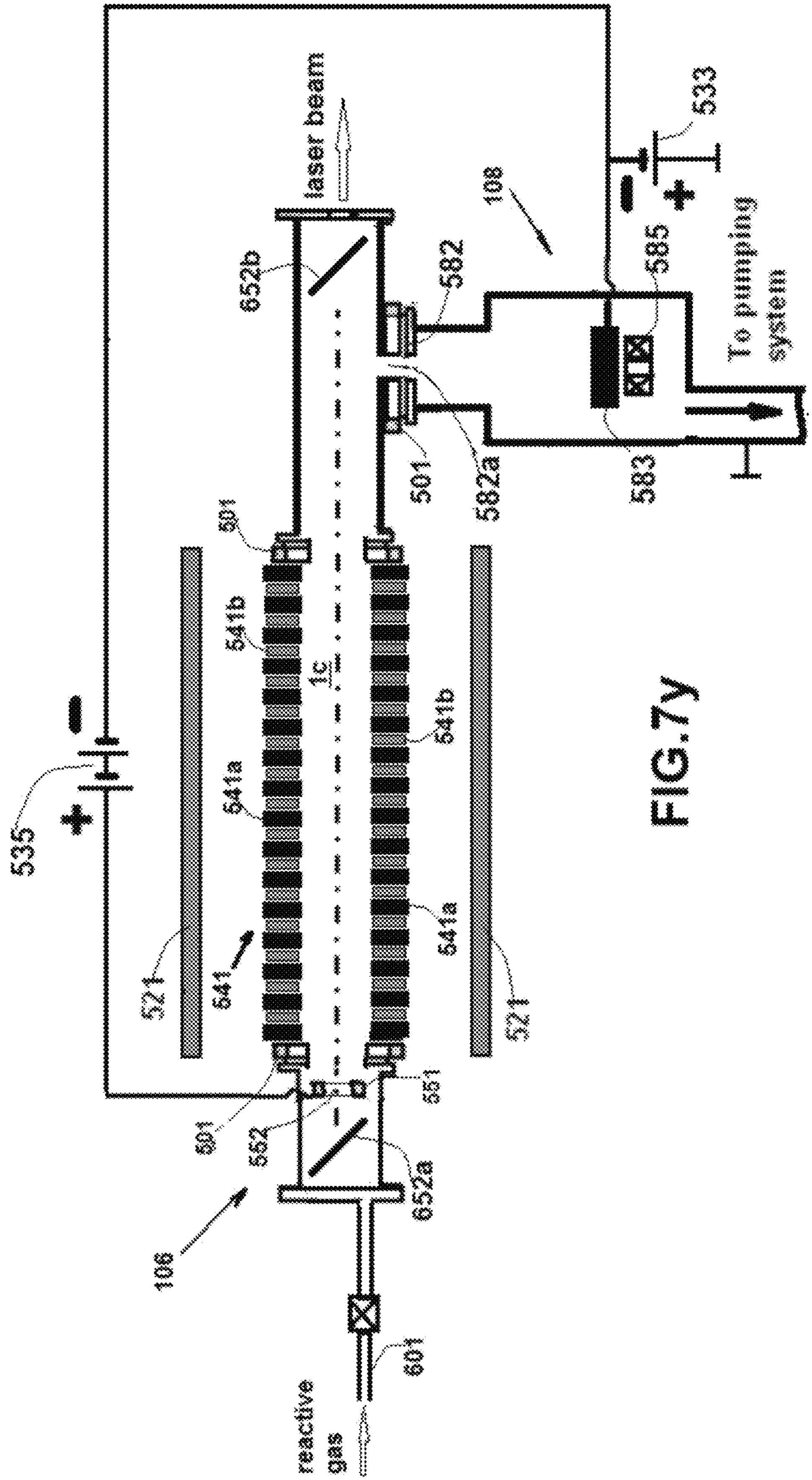
Figure 8A:
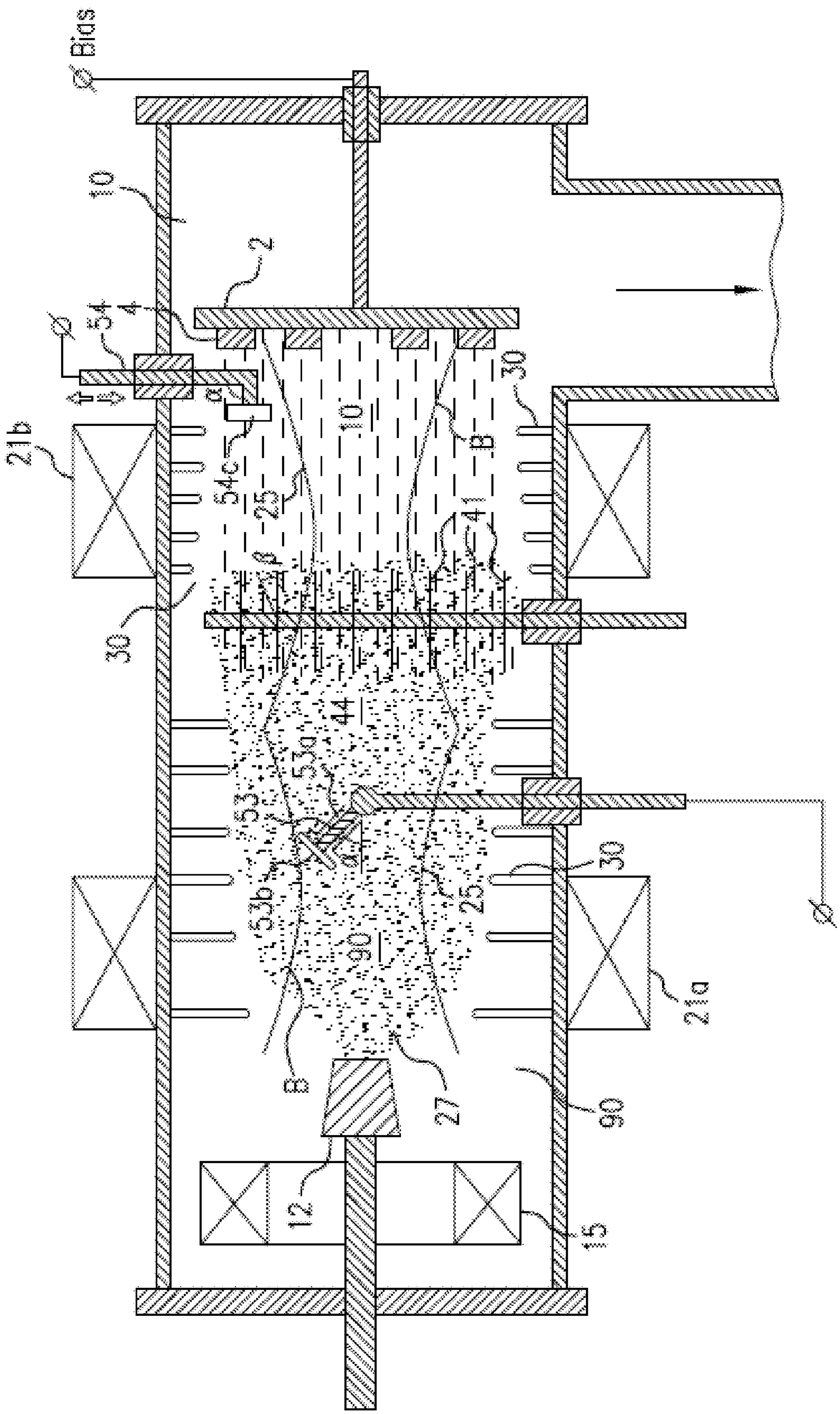
Figure 8B:
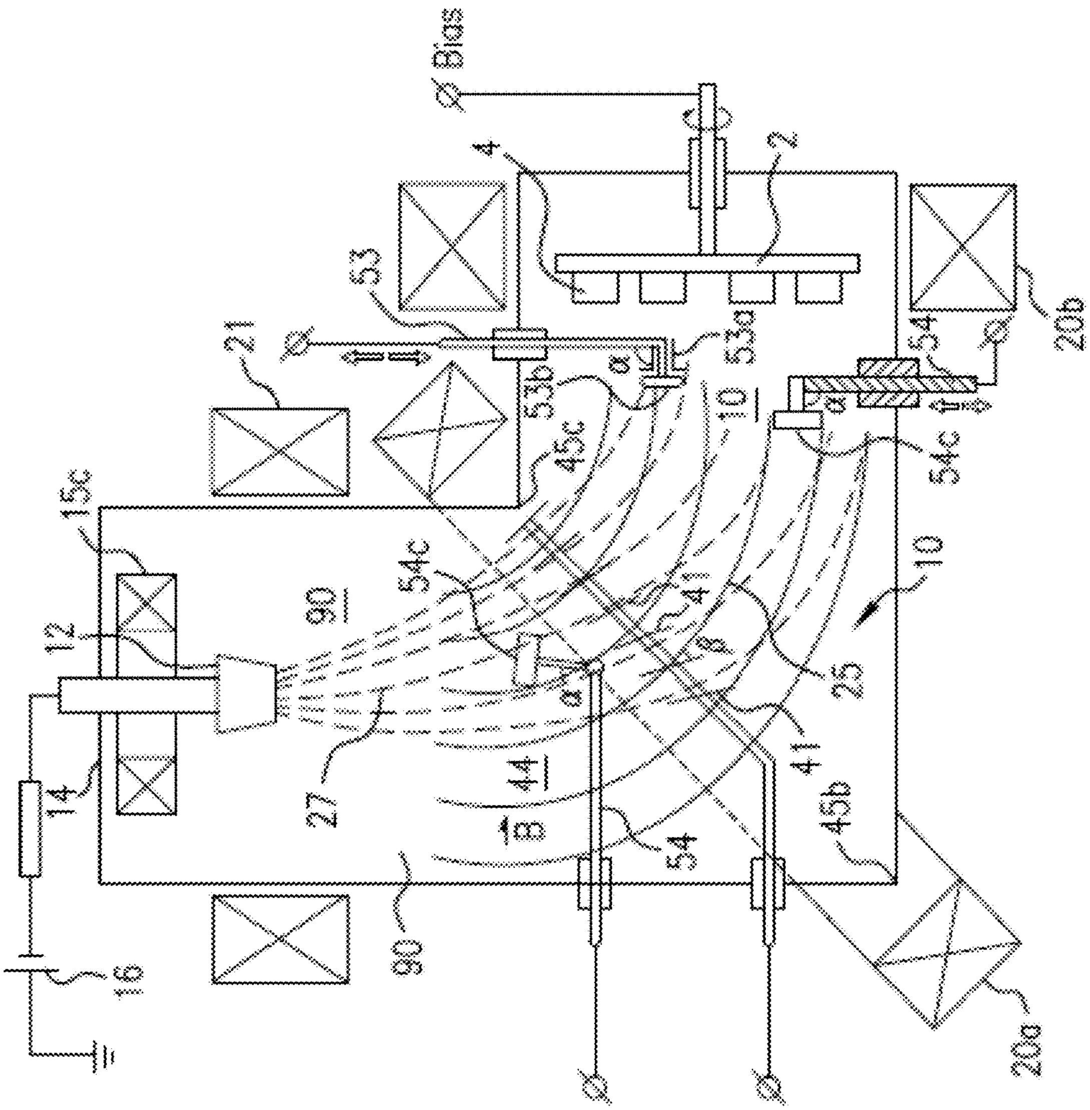
Figure 8C:
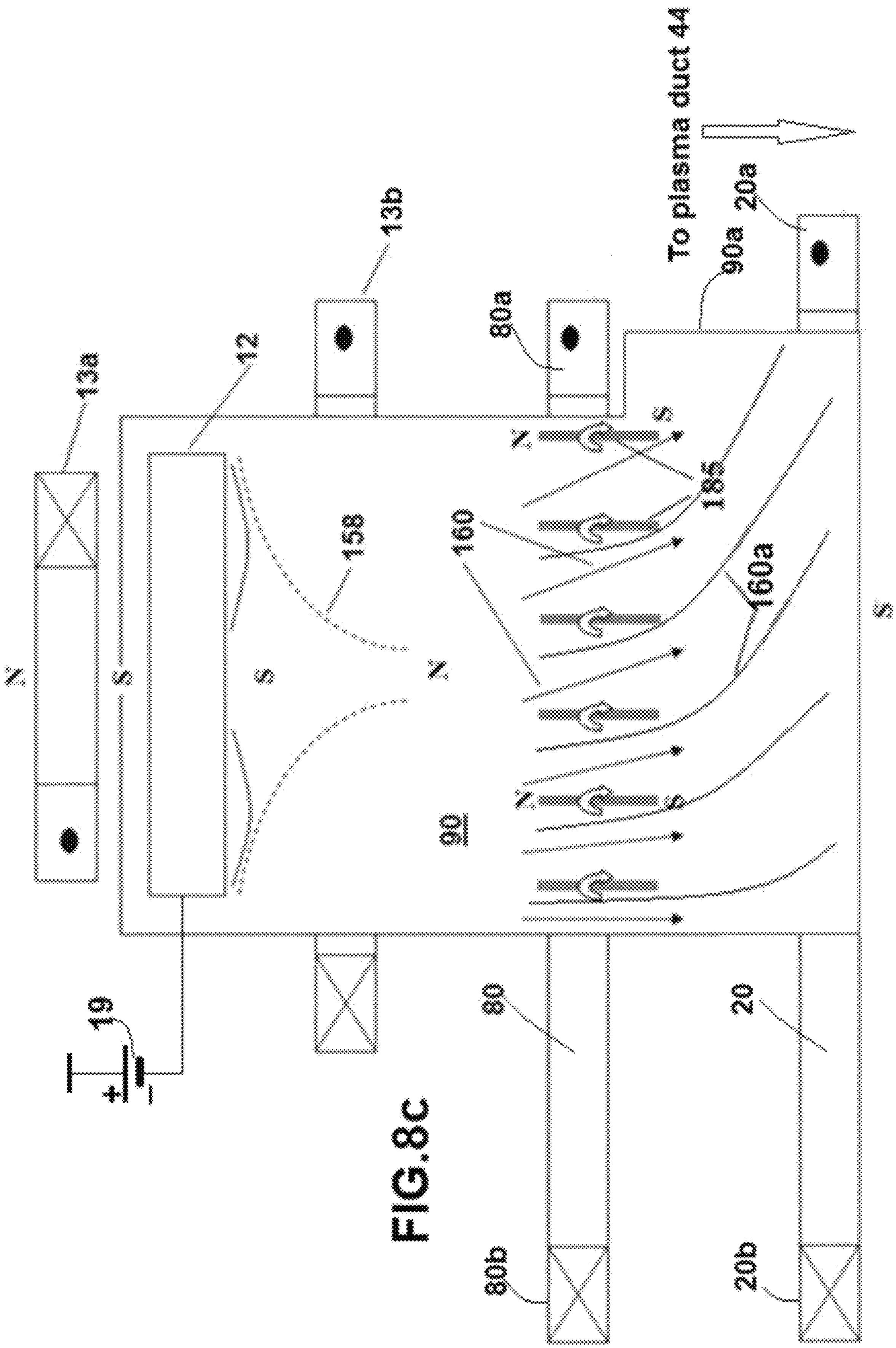
Figure 8D:
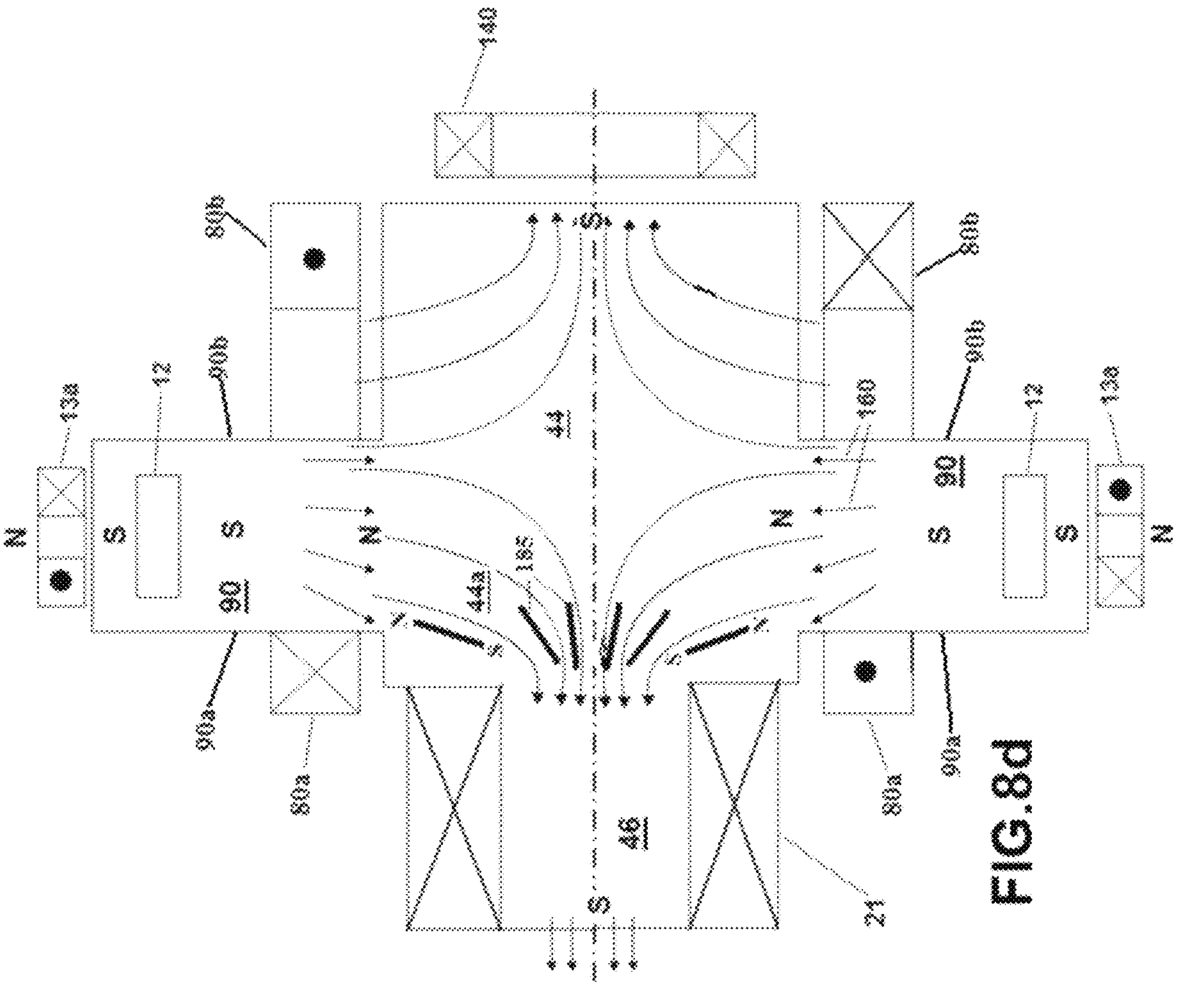
Figure 8E:
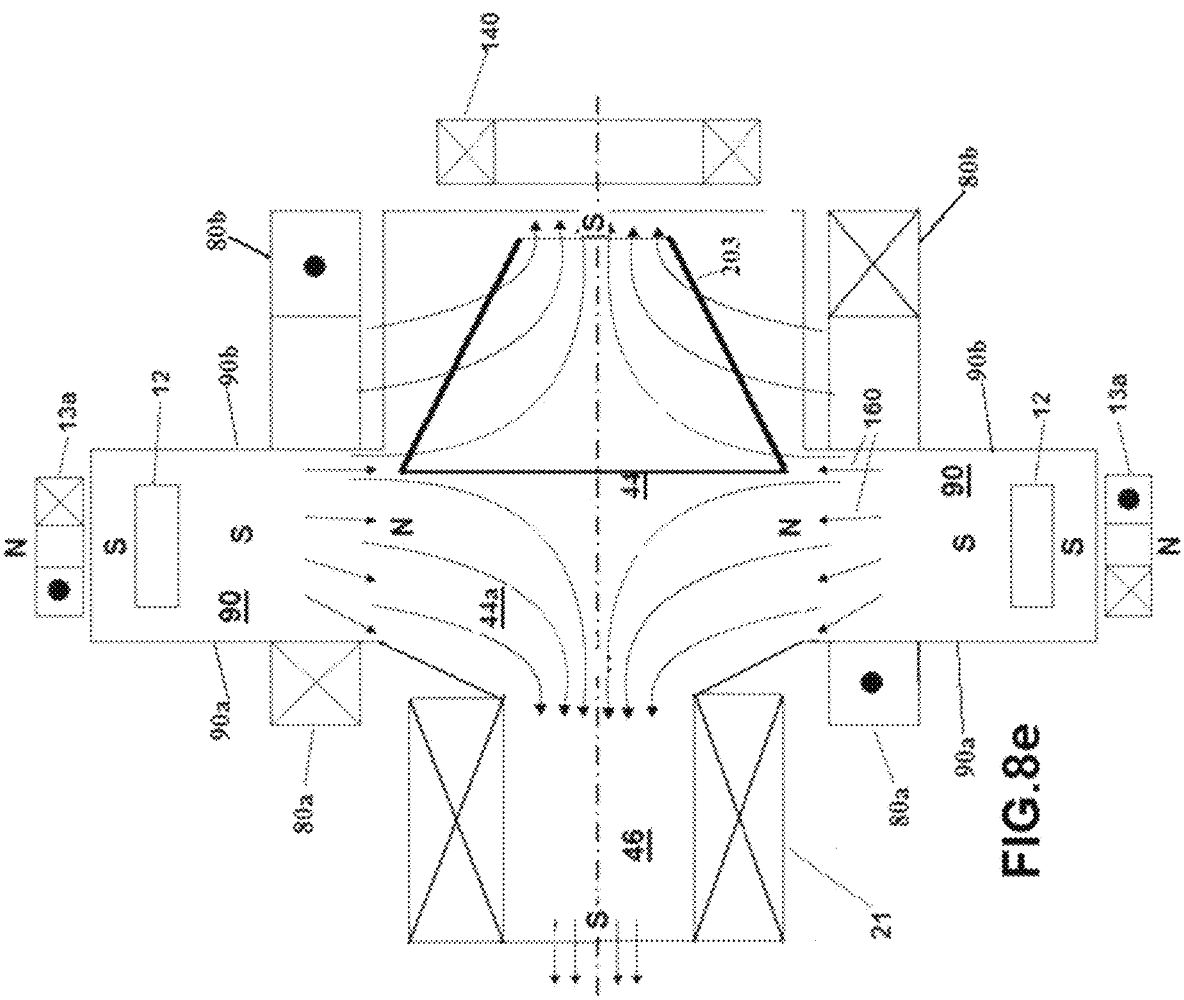
Figure 8F:
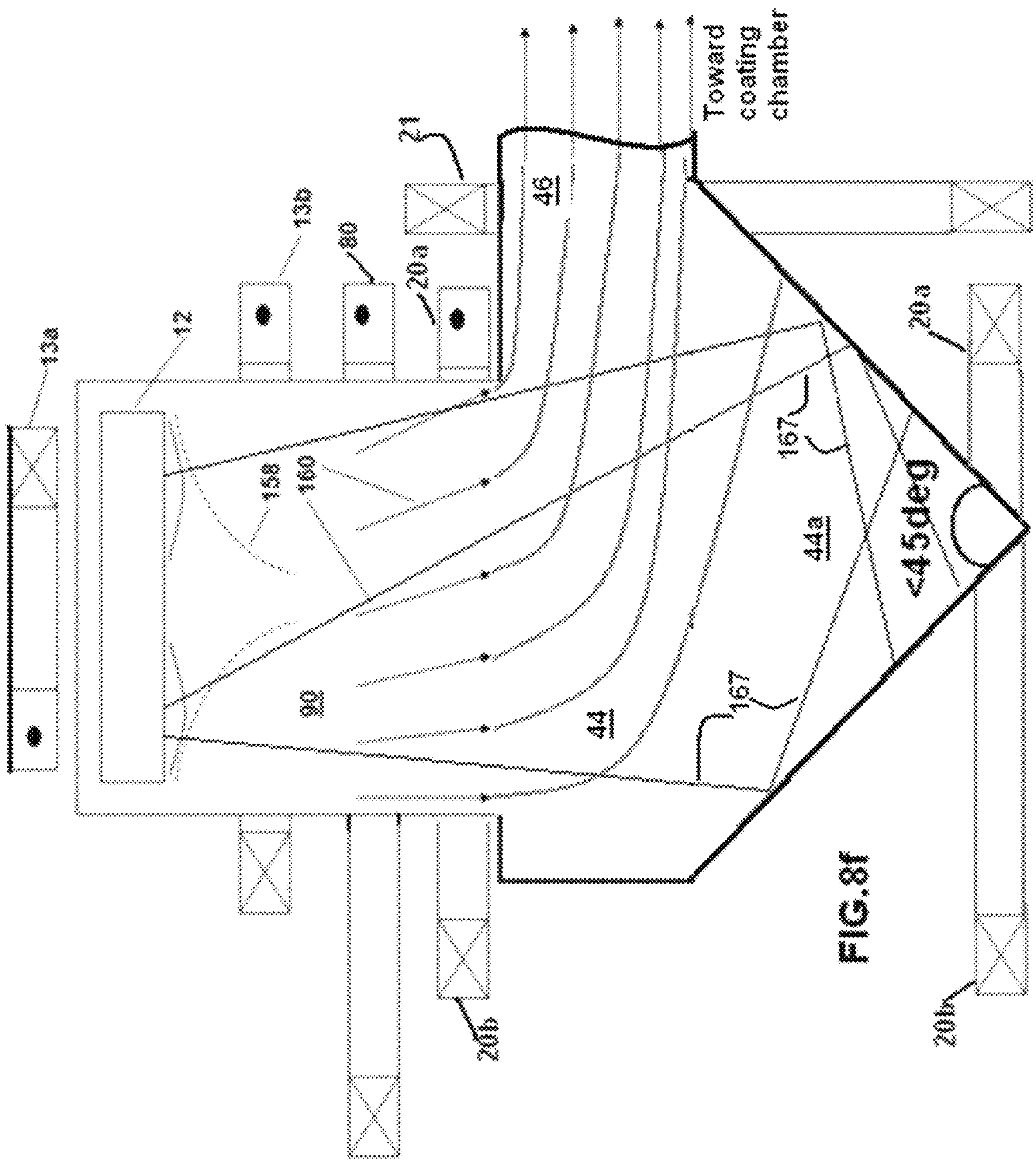
Figure 8G:
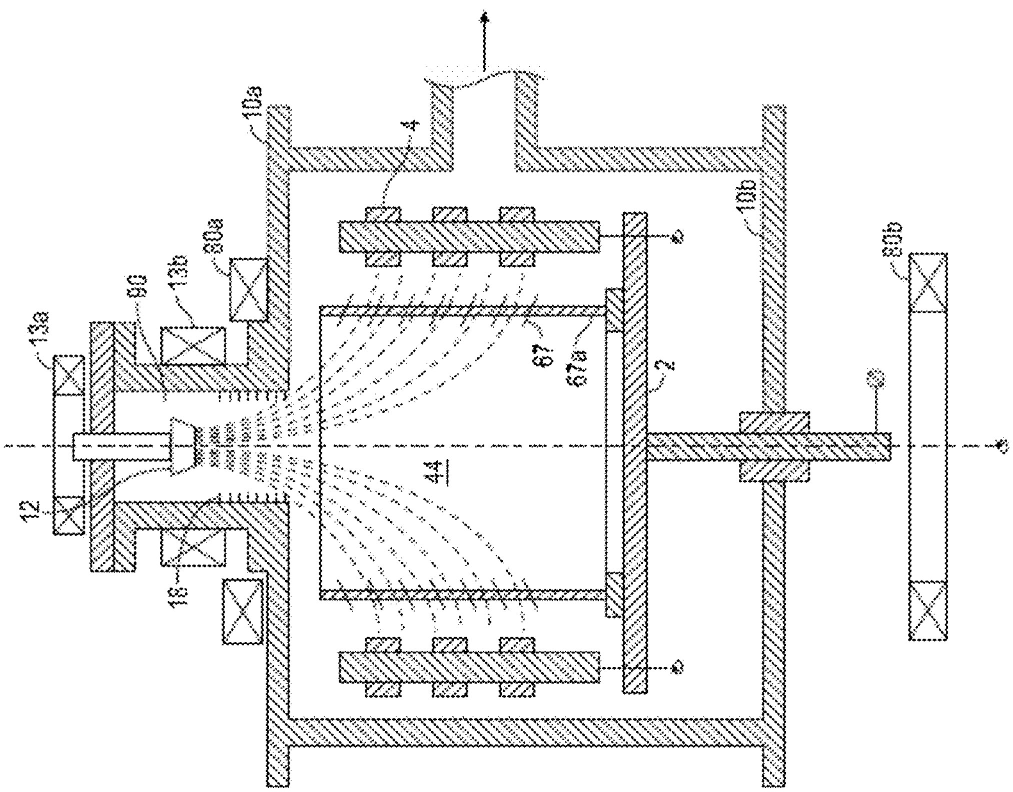
Figure 8H:
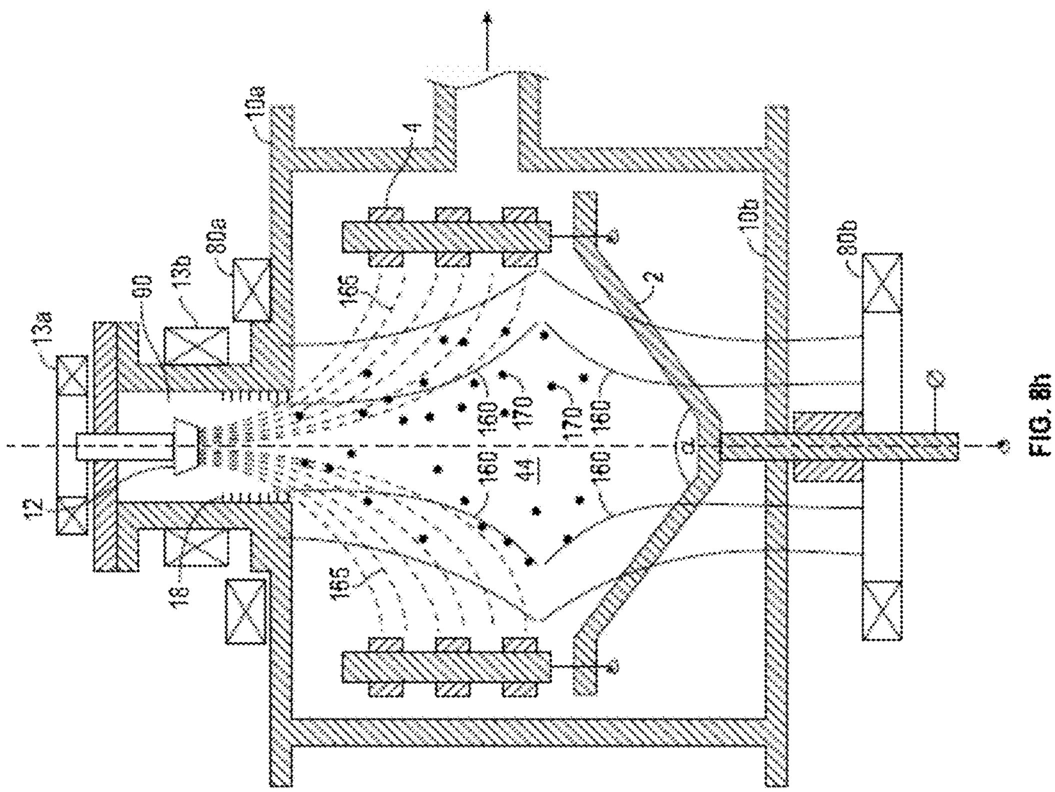
Figure 9A:
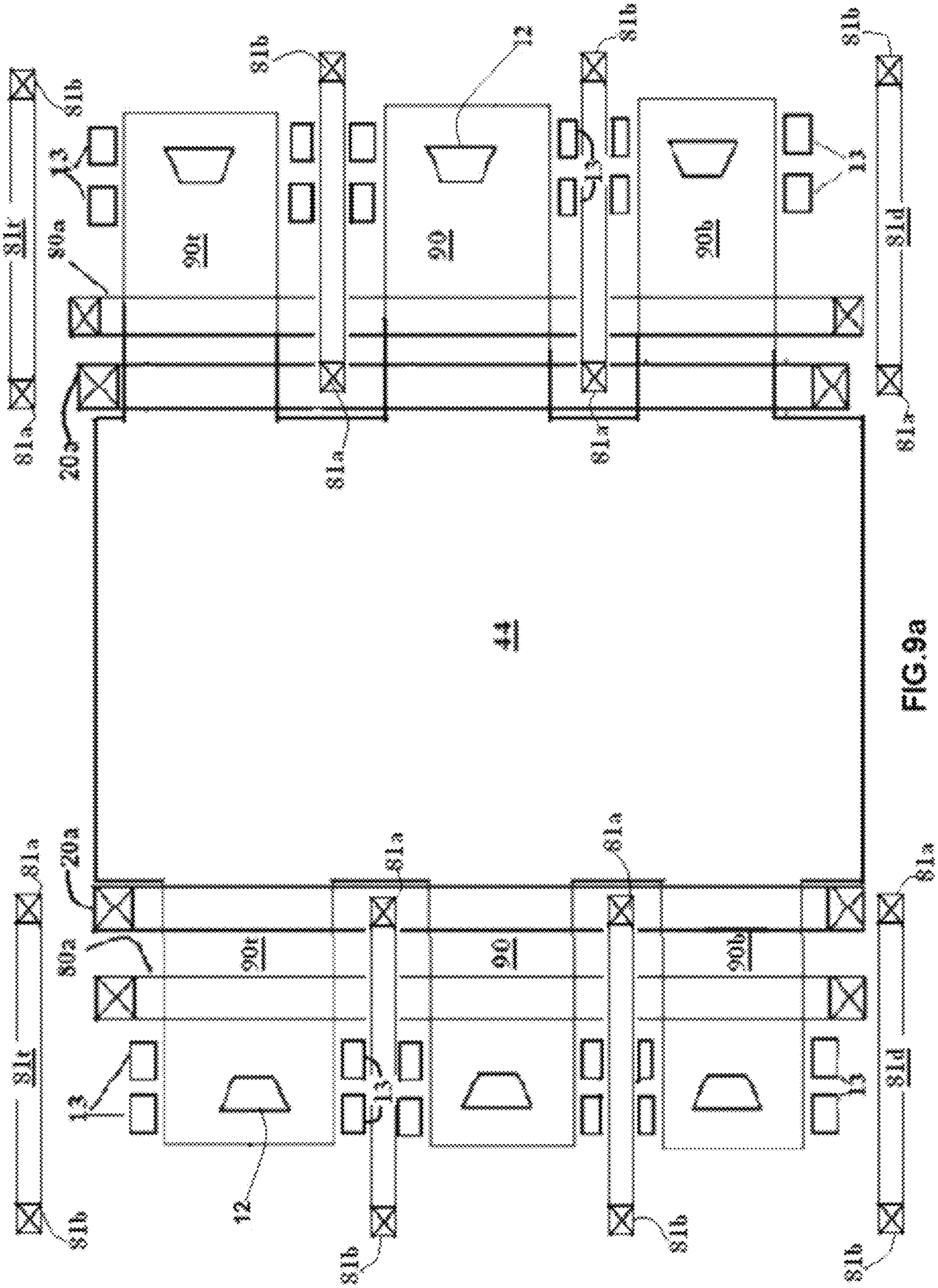
Figure 9B:
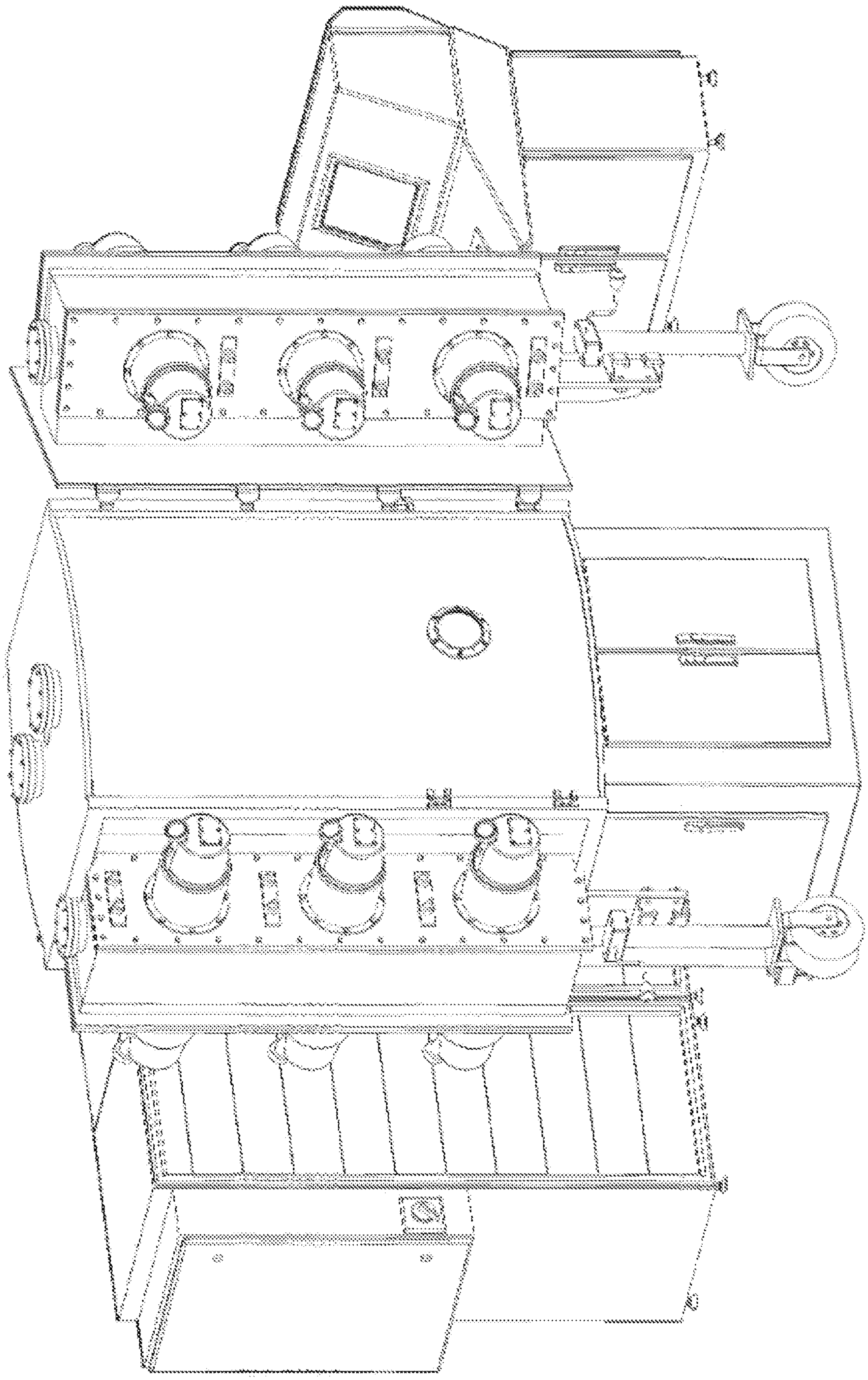
Figure 9C:
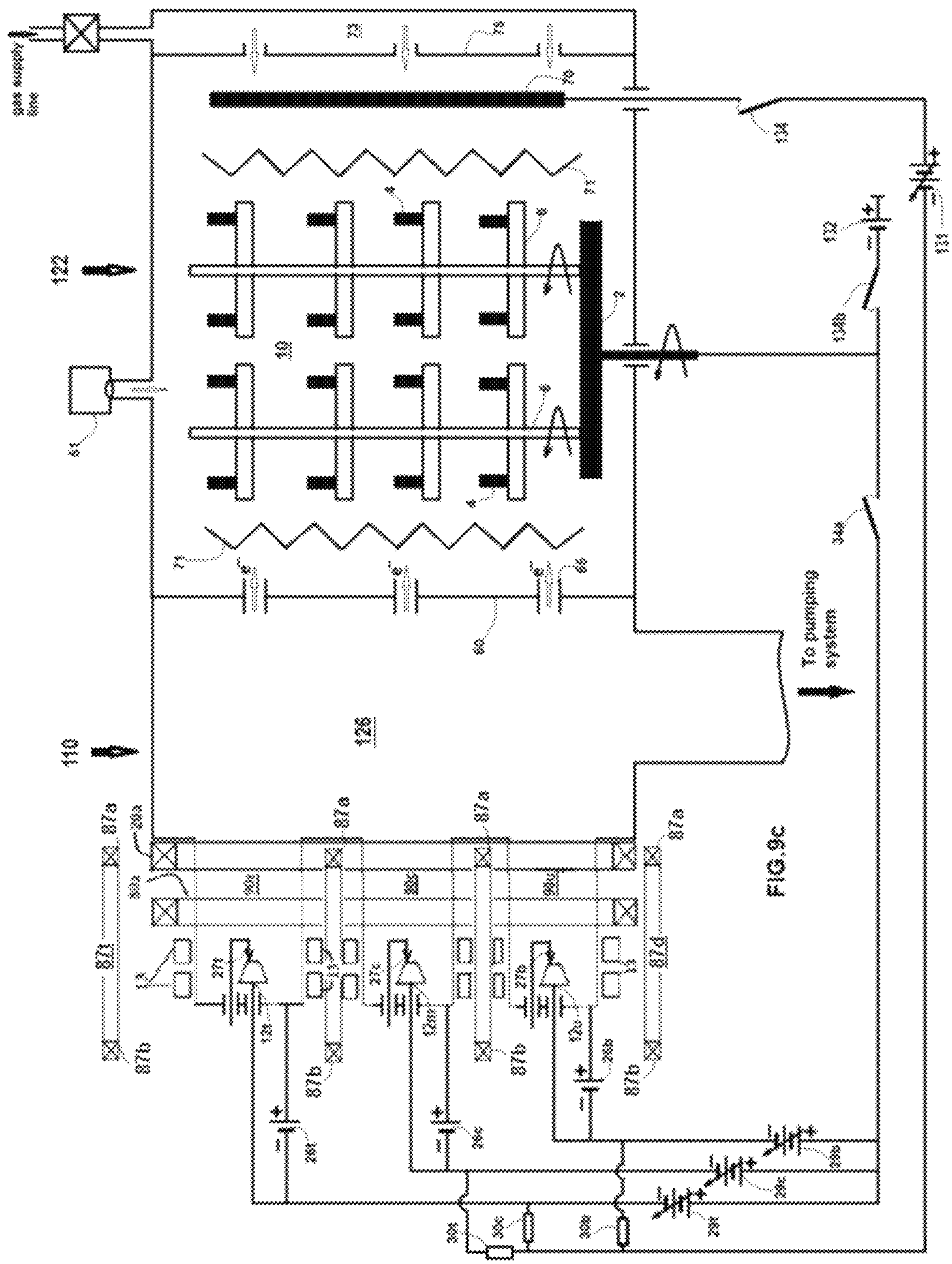
Figure 9D:
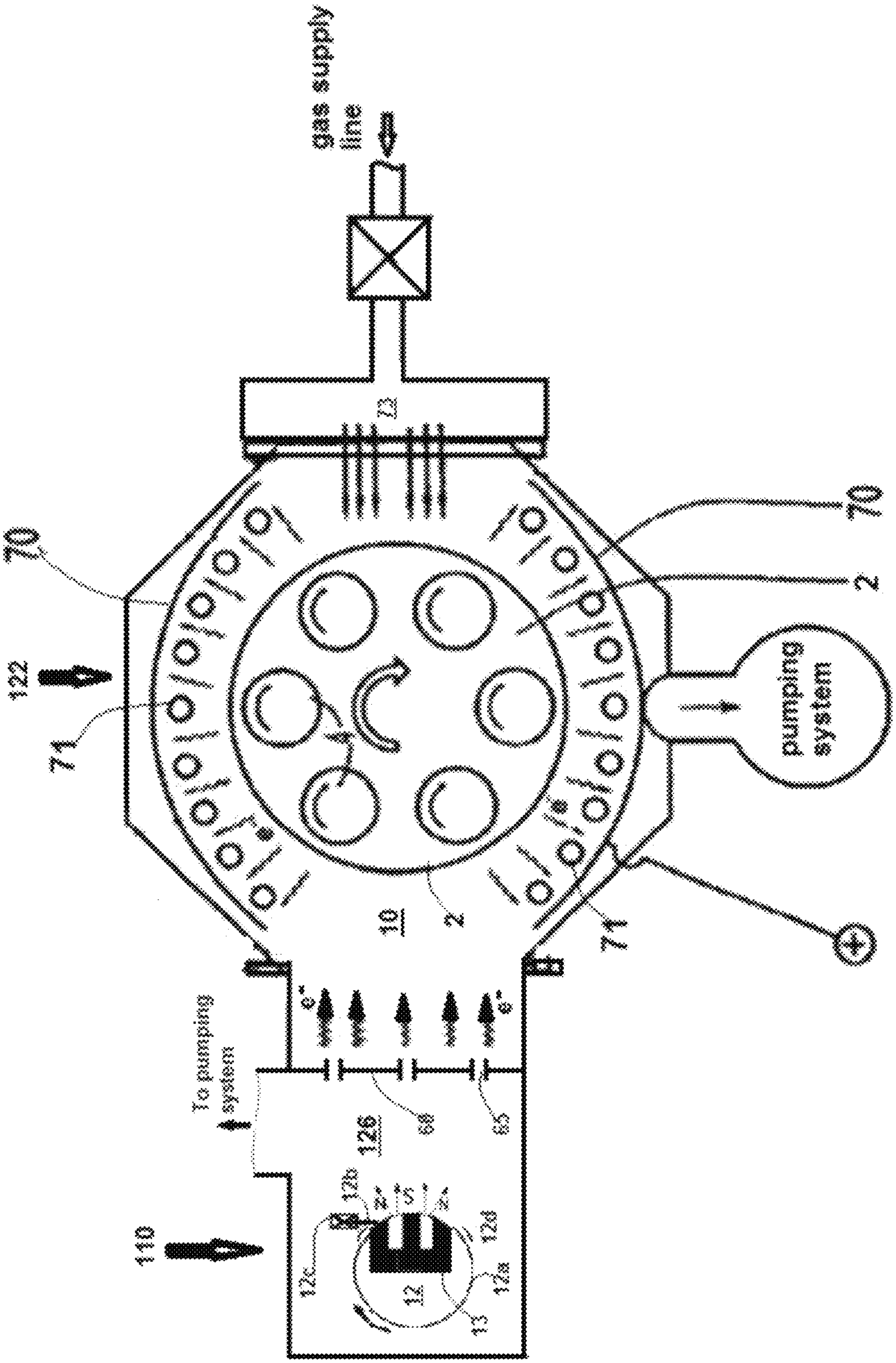
Figure 9E:
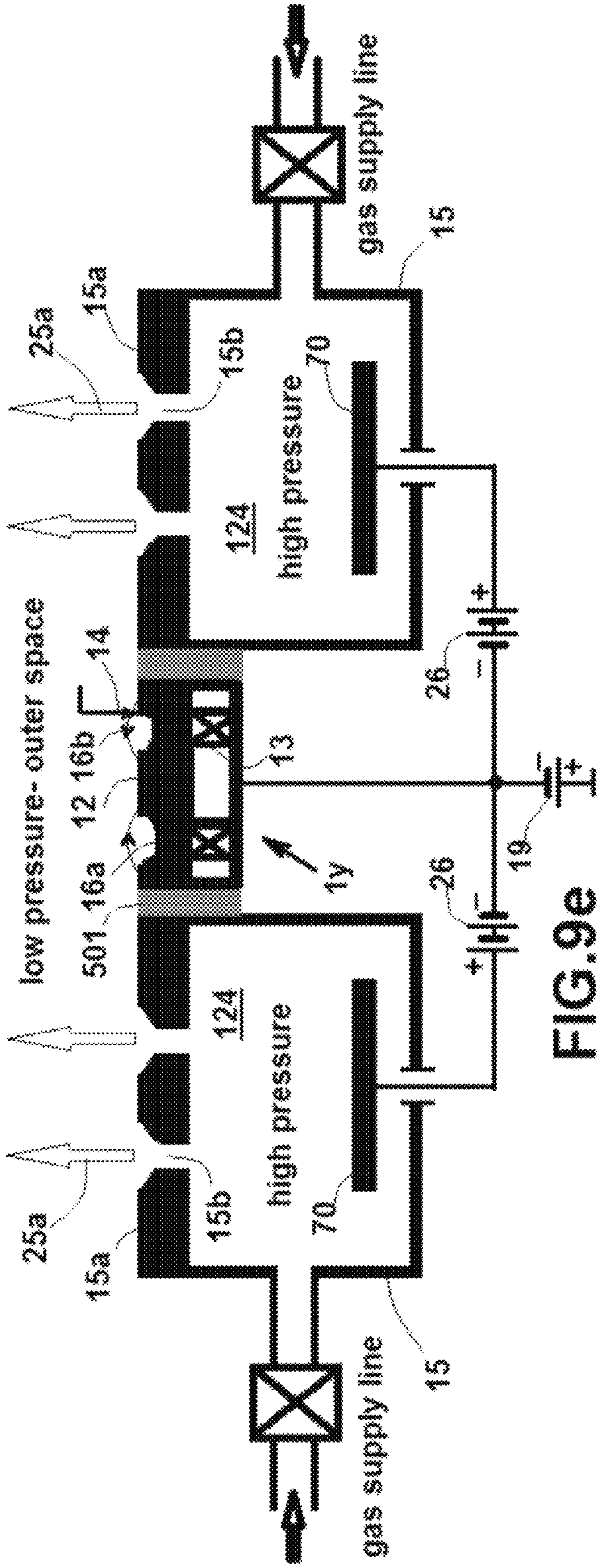
Figure 9F:
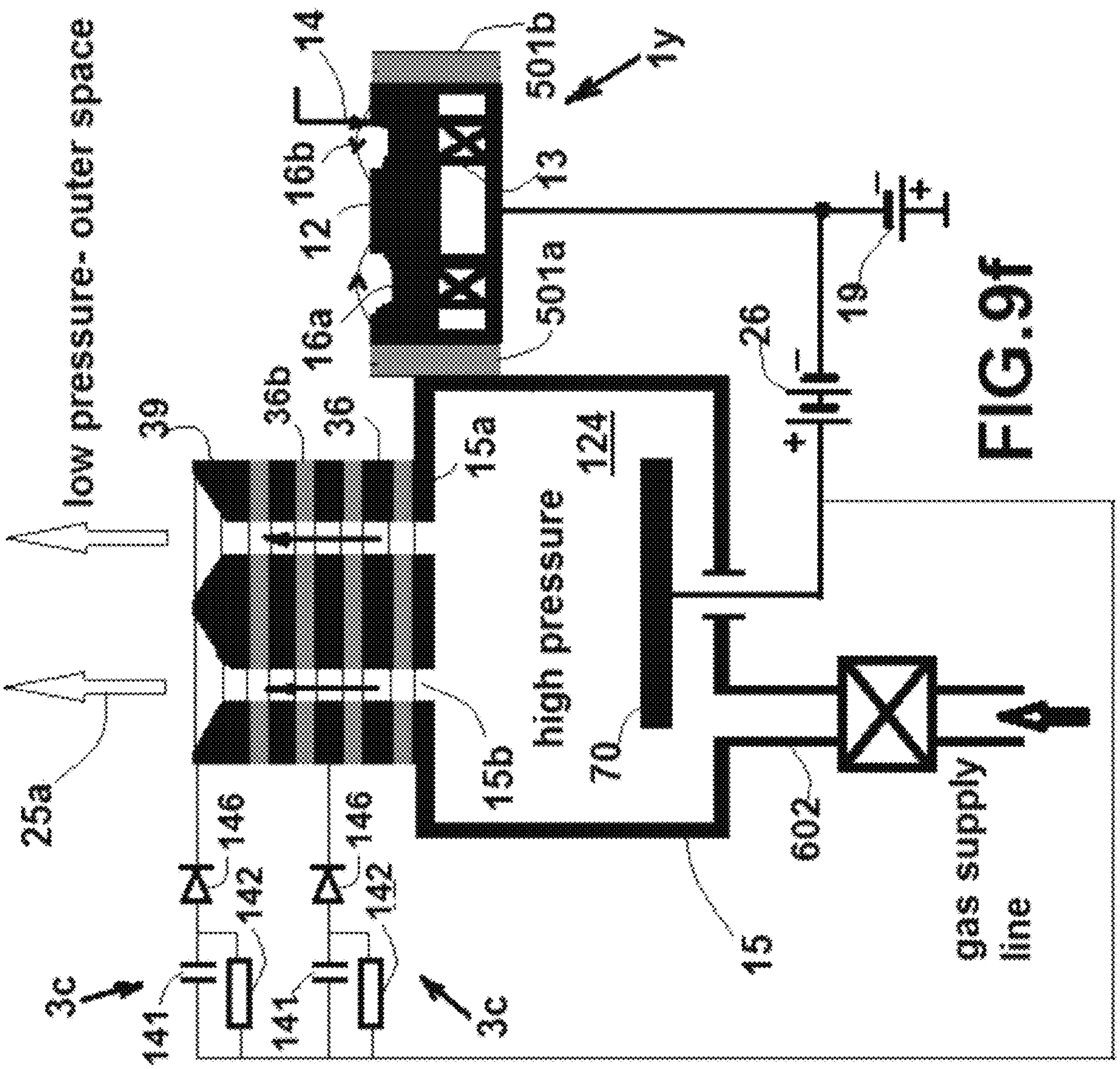
Figure 9G:
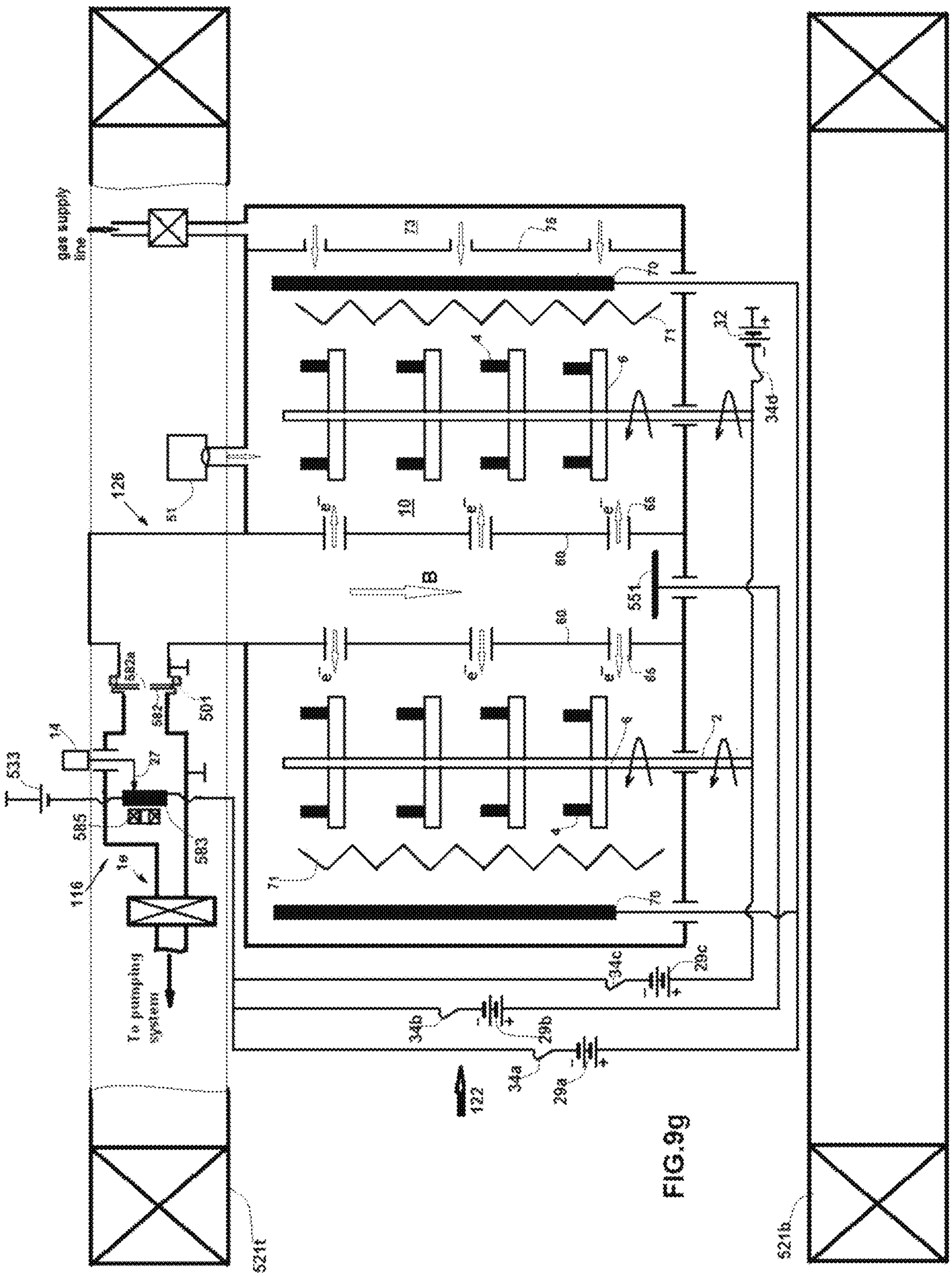
Figure 10A:
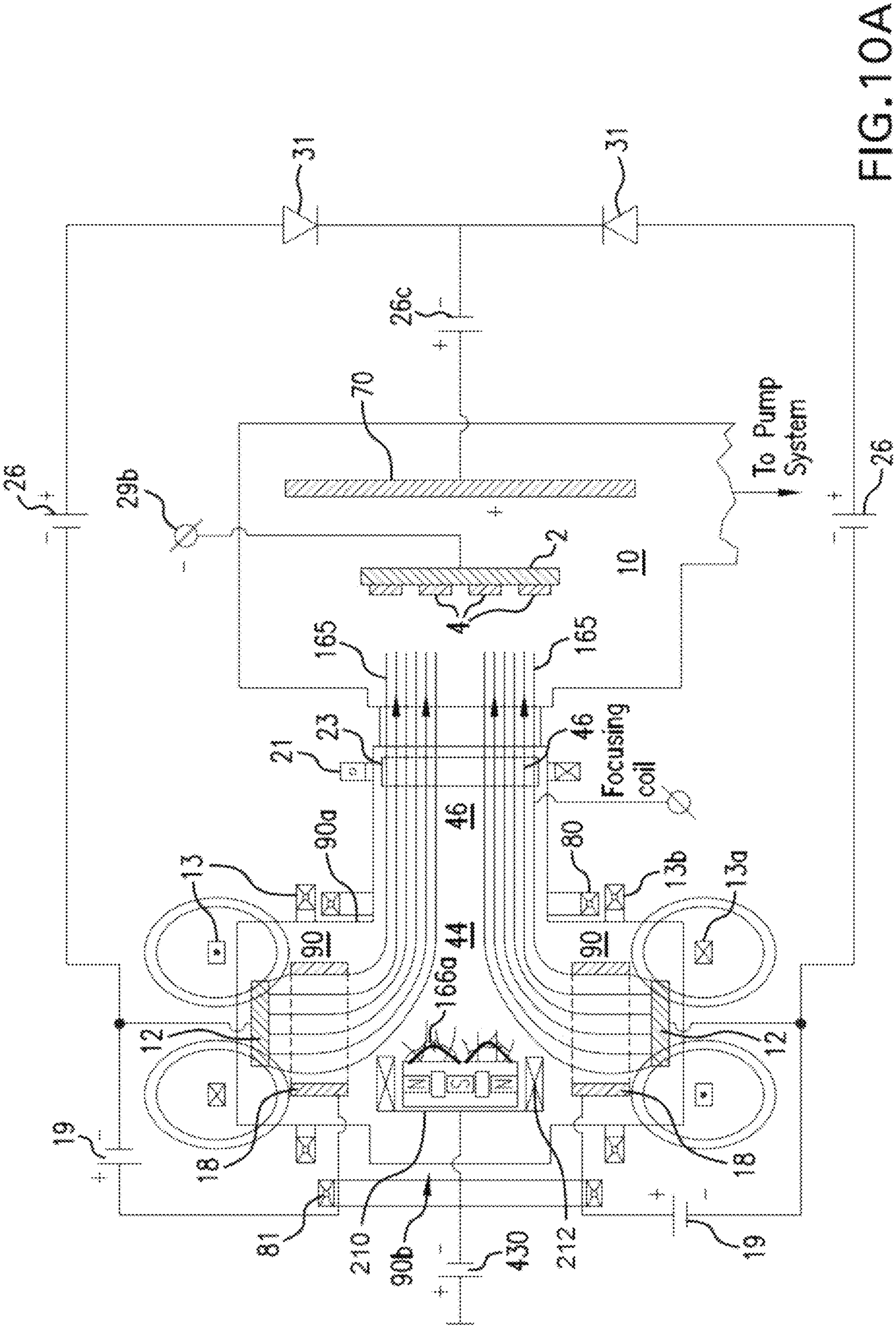
Figure 10B:
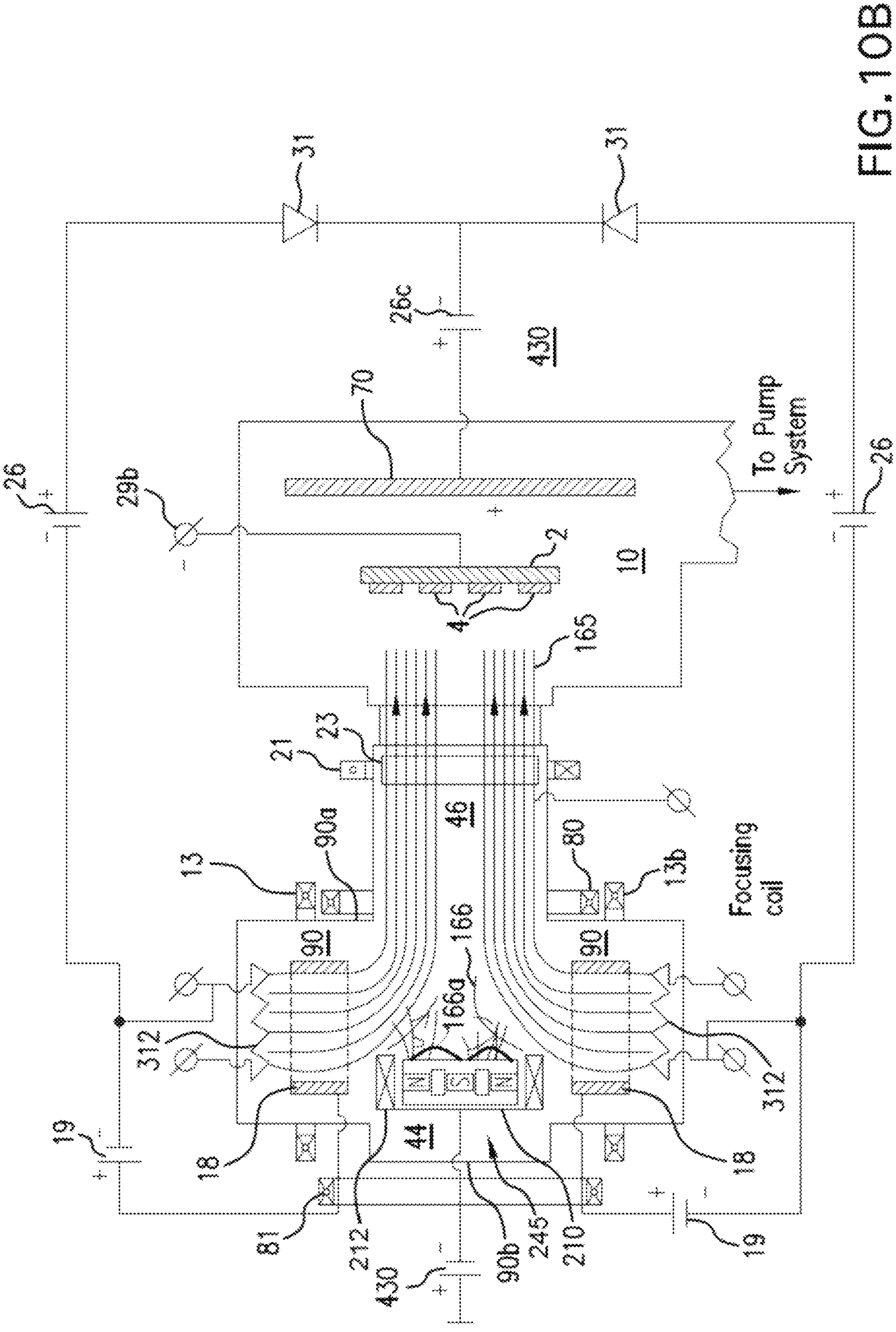
Figure 10C:
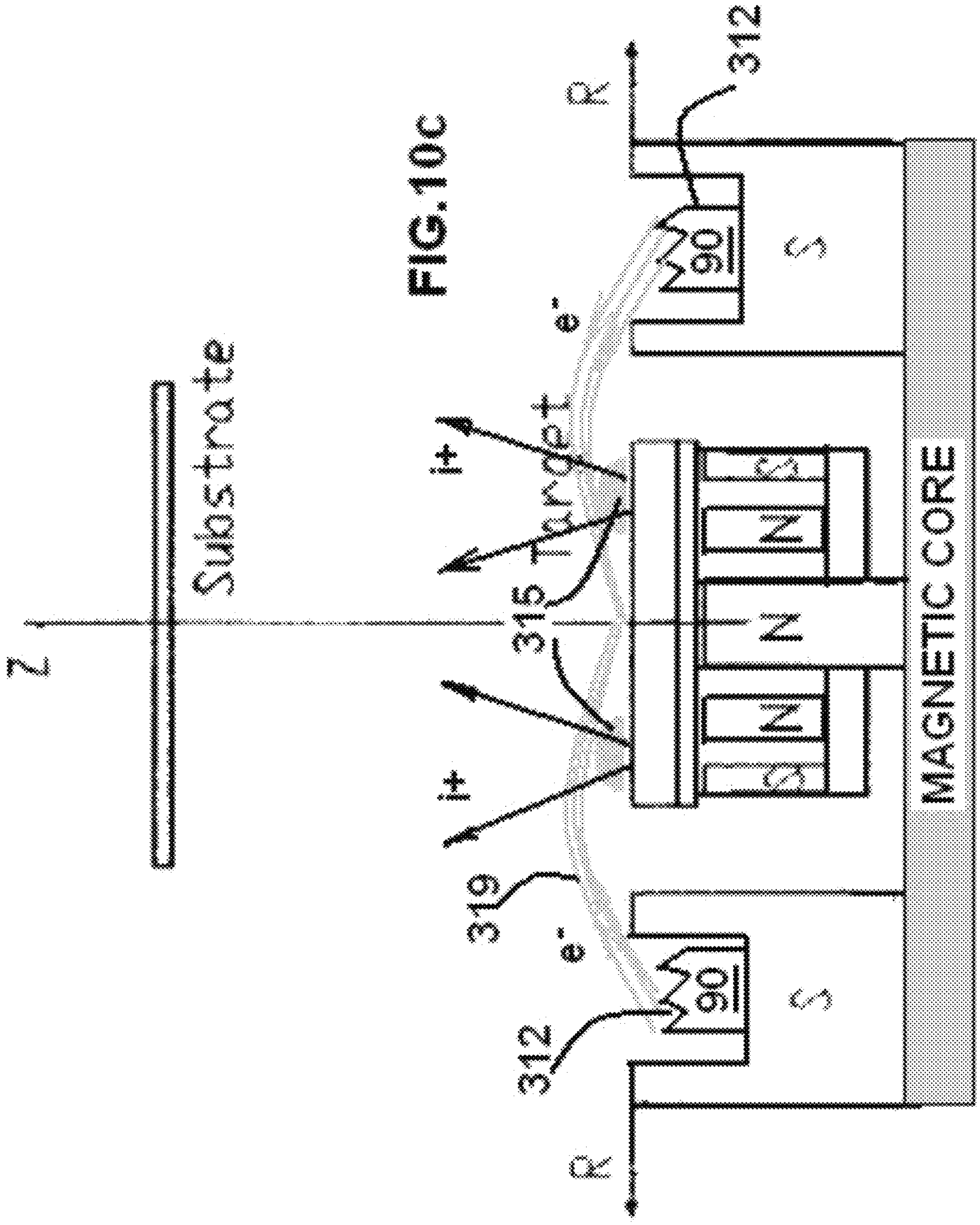
Figure 10D:
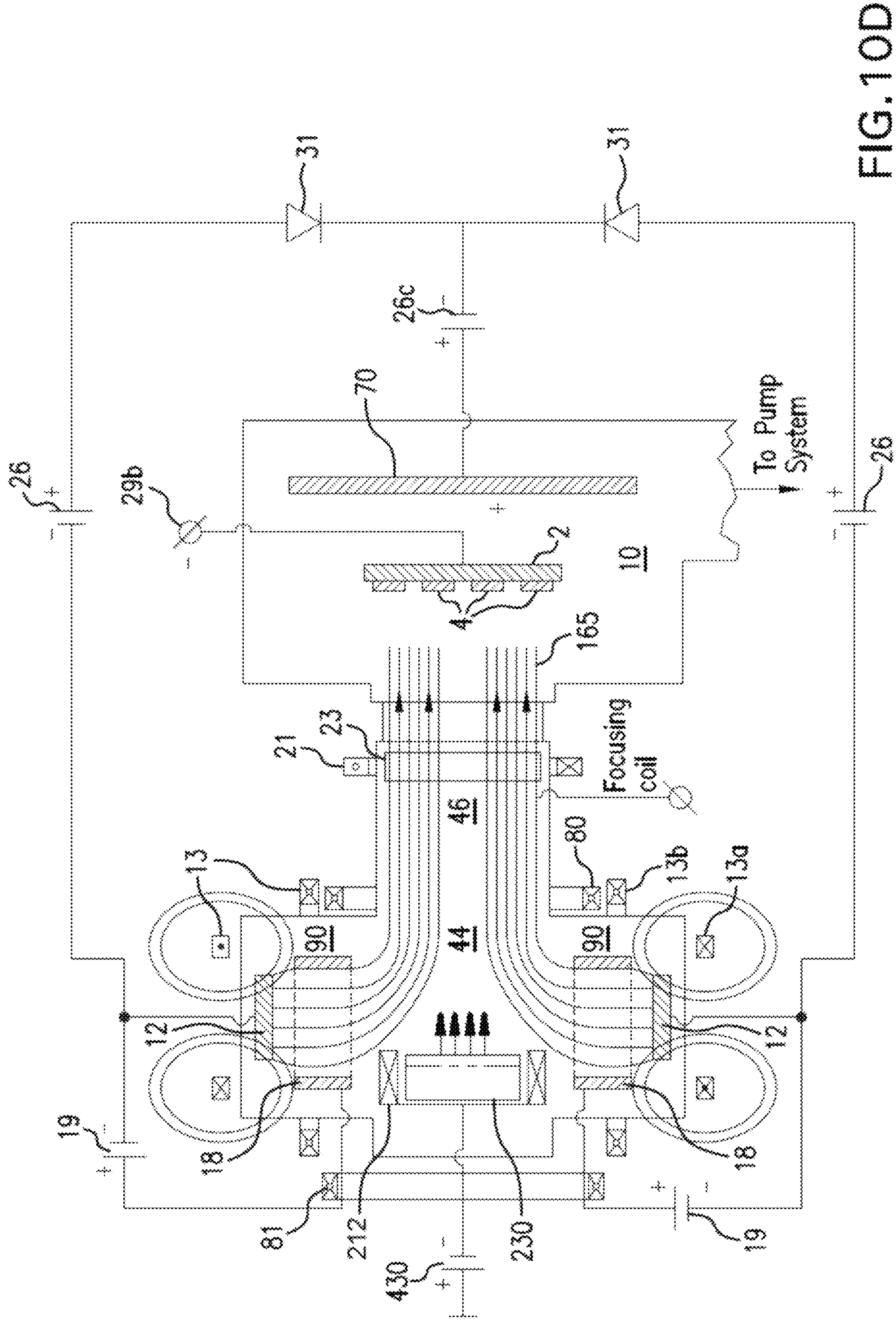
Figure 11:
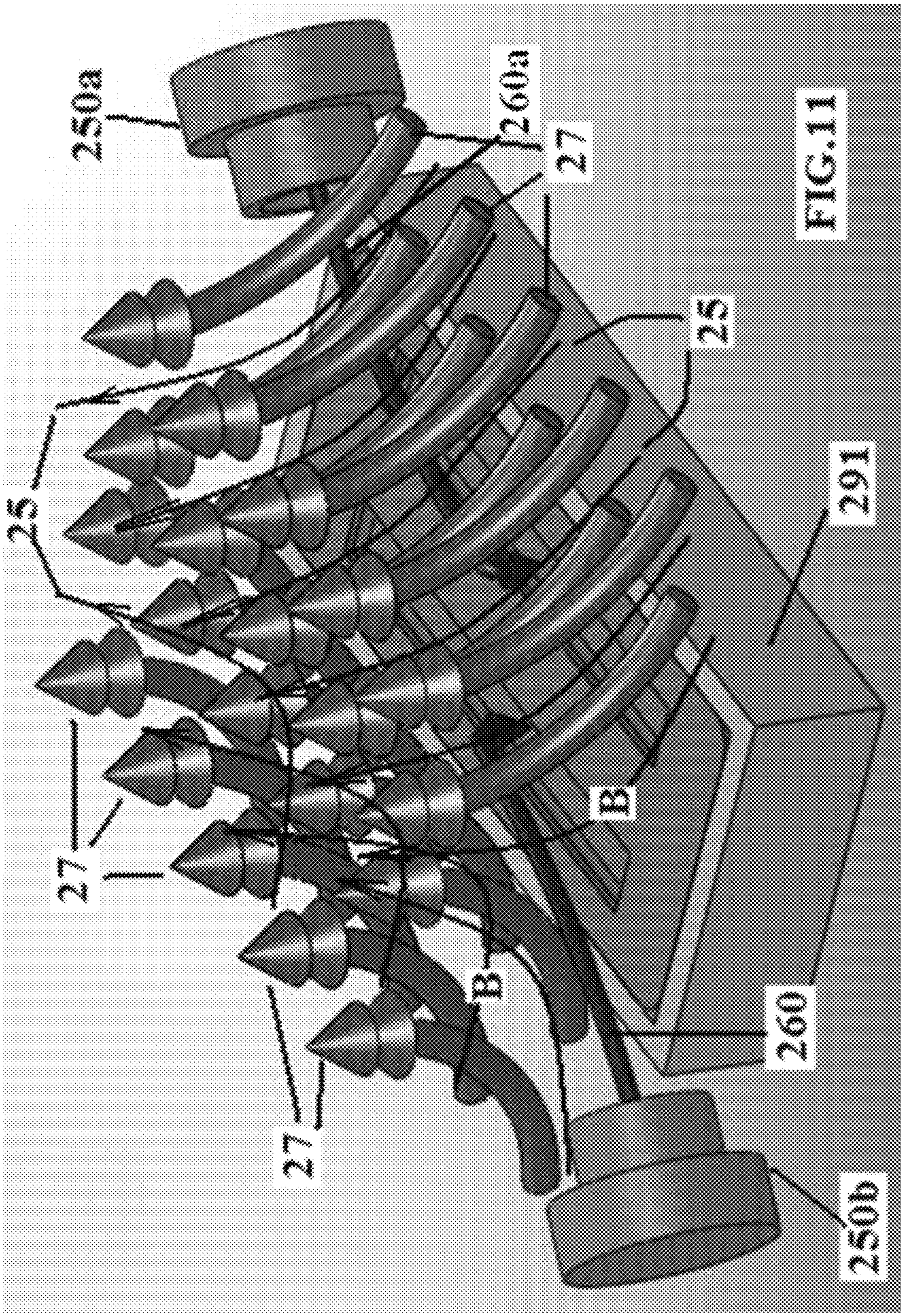
Figure 13A:
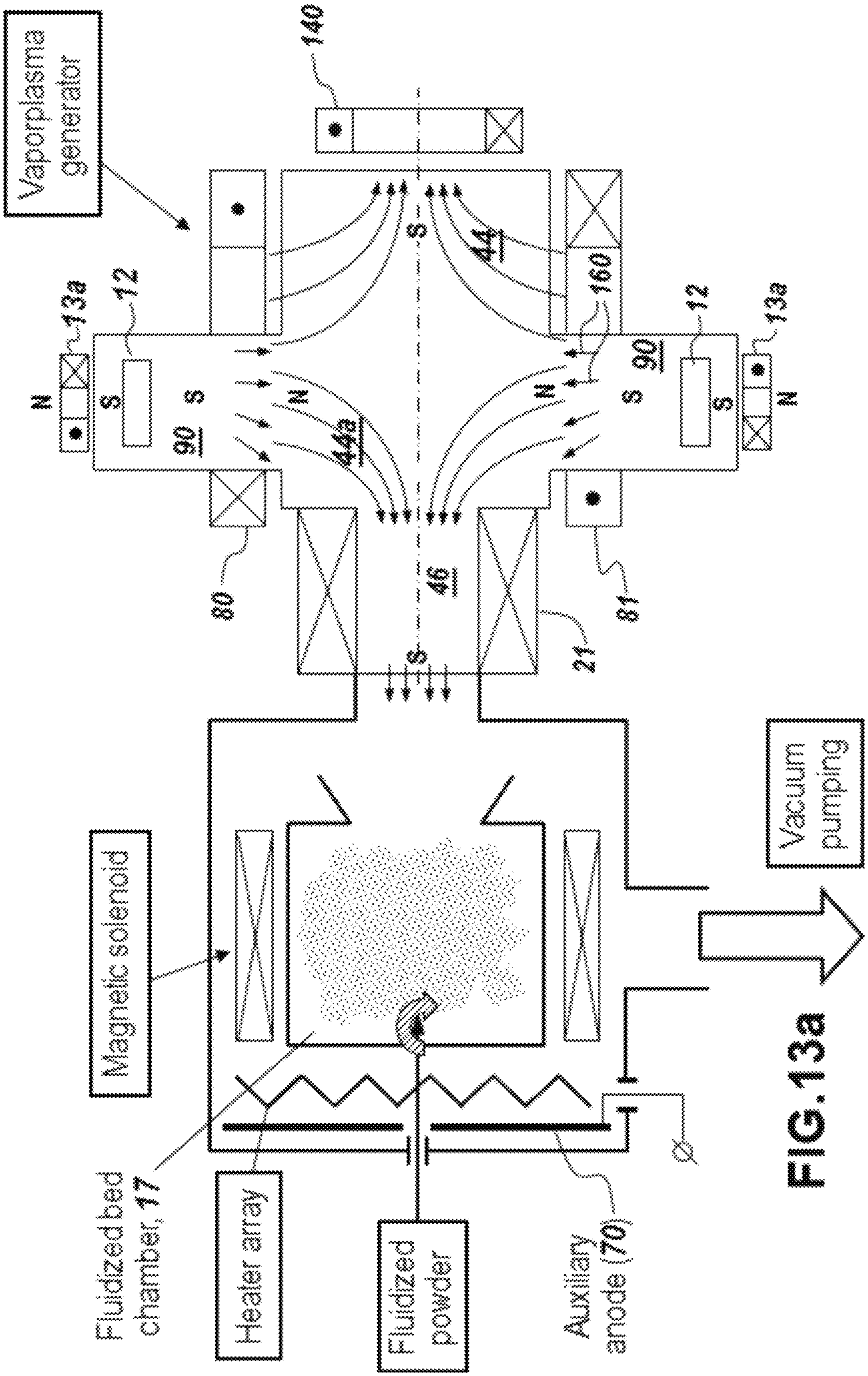
Figure 13B:
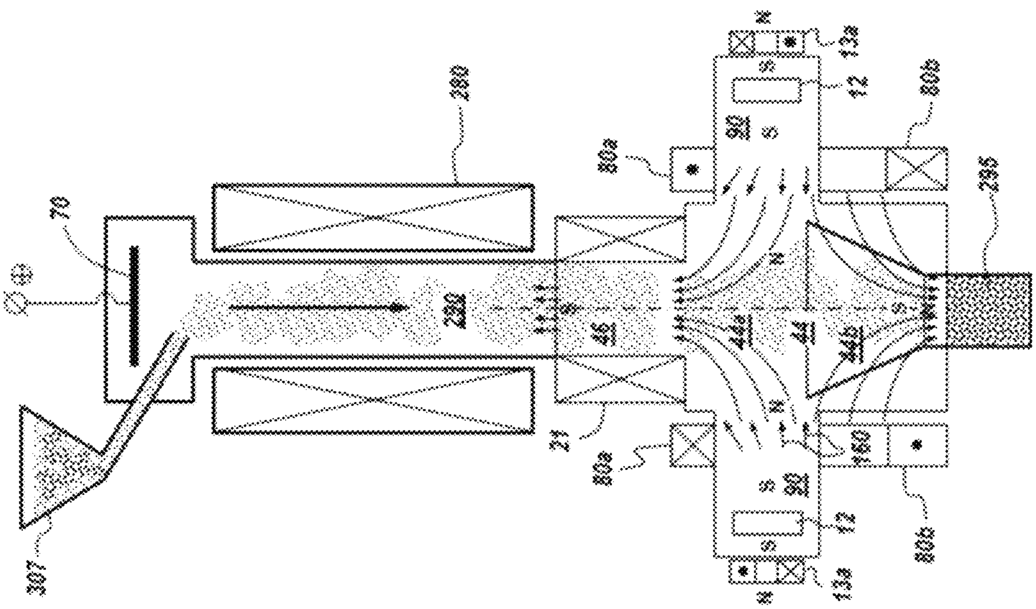

FIG. **3*h*** is a plan view of a prior art rectangular filtered cathodic arc deposition system utilizing magnetron sputtering source located in the coating chamber;

FIG. **3*i*** is a plan view of a prior art rectangular filtered cathodic arc deposition system utilizing two opposite magnetron sputtering sources located in the coating chamber;

FIG. **3*j*** is a plan view of rectangular filtered cathodic arc deposition system utilizing two opposite magnetron sputtering sources generating magnetron sputtering flow coincided with filtered arc plasma flow;

FIG. **3*k* is a variation of schematic diagram of FIG. 3*j*** utilizing filtered magnetron sputtering metal vapor plasma source magnetically coupled with two magnetron sources in the coating chamber;

FIG. **3*k*1 is a variation of schematic diagram of FIG. 3*k*** utilizing RF ionization of metal sputtering atoms generated by filtered magnetron sputtering plasma source;

FIG. **3*k*2 is another variation of schematic diagram of FIG. 3*k*** utilizing RF ionization of metal sputtering atoms generated by rotary magnetron-cathodic arc hybrid metal vapor plasma source;

FIG. 3L is a plan view of the filtered magnetron-arc coating apparatus of FIG. **3*k*** utilizing shielded cathodic arc source for ionization of magnetron sputtering flow;

FIG. **3*m* is a plan view of the filtered magnetron-arc coating apparatus of FIG. 3**L utilizing unipolar DC pulse power supplies for magnetron anodes;

FIG. **3*m*1 is a plan view of the filtered magnetron-arc coating apparatus of FIG. 3**L utilizing additional RF power source for enhancing ionization ability of magnetron anodes;

FIG. **3*n*** is schematic elevation of a planar cathodic arc source utilizing plurality of magnetic steering coils;

FIG. **4*a* is a schematic plan view of one filtered cathodic arc deposition apparatus providing a pair of deflection offset coils surrounding the cathode chambers downstream of a pair of focusing coils, in an embodiment, FIG. 4*b* is a schematic plan view of one filtered cathodic arc deposition apparatus providing a pair of deflection offset coils positioned in front of and behind the cathode chambers, in an embodiment, FIG. 4*c* is a schematic plan view of one filtered cathodic arc deposition apparatus providing a pair of deflection offset coils surrounding the cathode chambers, in an embodiment, FIG. 4*d* is a schematic plan view of one filtered cathodic arc deposition apparatus providing a pair of deflection offset coils surrounding the cathode chambers overlapping a pair of focusing coils, in an embodiment, FIG. 4*e* is a schematic plan view of one filtered cathodic arc deposition apparatus providing various baffle arrangements, in an embodiment, FIG. 4*f* is a schematic plan view of an exemplary filtered cathodic arc deposition apparatus having two unidirectional dual filtered cathodic arc sources in connection with a coating chamber, FIG. 4*g* is a schematic view of one filtered cathodic arc deposition apparatus providing a single saddle-shaped deflecting coil, in an embodiment, FIG. 4*h* is a schematic view of one filtered cathodic arc deposition apparatus providing a saddle-shaped deflecting double-coil arrangement, in an embodiment, FIG. 4*i* is a schematic view of one filtered cathodic arc deposition apparatus providing a rectangular coil with offset deflecting conductors parallel to the focusing coil, in an embodiment, FIG. 4*j* is a schematic plan view of one filtered cathodic arc deposition apparatus providing a deflection portion of a plasma duct having a triangular prism shape and a frustoconical primary cathode target, in an embodiment, FIG. 4*k*, 4*k*1 are schematic plan view of one filtered cathodic arc deposition apparatus utilizing two magnetrons installed at the exit of the plasma duct magnetically coupled to the filtered-arc source and array of stream baffles installed near the exit of the cathode chamber, in embodiments, FIG. 4L is schematic plan view of one filtered cathodic arc deposition apparatus utilizing two rotary magnetrons installed at the exit of the plasma duct magnetically coupled to the filtered-arc source, wherein the magnetrons have rotating tubular targets, in an embodiment, FIG. 4L1 is a schematic plan view of the variation of one filtered cathodic arc deposition apparatus shown in FIG. 4L, utilizing two rotary magnetrons installed at the exit of the plasma duct magnetically coupled to the filtered-arc source and two rotary primary cathodic arc sources in cathode chambers 90, wherein both the magnetrons and the primary rotary cathodic arc sources have rotating tubular targets, in an embodiment, FIG. 4*m* is a schematic plan view of an exemplary hybrid rectangular filtered cathodic arc-magnetron sputtering deposition apparatus of a variation of the apparatus of FIG. 4*f* having two unidirectional dual rectangular filtered cathodic arc sources magnetically coupled with magnetrons in connection with a coating chamber, FIG. 5 is an exemplary schematic plan view of an electromagnet suitable for deflection of the magnetic field lines in a cathode chamber, FIG. 6*a* is an exemplary schematic plan view of a cathode chamber utilizing a frustoconical primary cathode target, FIG. 6*b* is an exemplary schematic plan view of a cathode chamber utilizing a planar primary cathode target, FIG. 6*c* is an exemplary schematic plan view of a segmented planar primary cathode target, FIG. 6*d* is a schematic plan view of a variation of the apparatus of FIG. 6*b* utilizing the primary cathodic arc source with rotating tubular target, in an embodiment, FIG. 6*e* is a schematic plan view of another variation of the apparatus of FIG. 6*b* utilizing the primary cathodic arc source with heated target, in an embodiment, FIG. 6*f* is a schematic plan view of a variation of the apparatus of FIG. 6*b* utilizing stream baffles adjacent to the cathode target, FIG. 7*a* is a schematic plan view of one tubular filtered multi-cathode arc source utilizing deflecting magnetic coils surrounding each cathode chamber, in an embodiment, FIG. 7*a*1 is a schematic plan view of tubular filtered multi-cathode arc source of FIG. 7*a* utilizing readily disconnectable bolted flange assembly and saw-shaped macroparticle trapping baffles, in an embodiment, FIG. 7A2 illustrates a further variation of the embodiment of tubular filtered arc source of FIG. 7*a*1 utilizing the magnetic island positioned in front of the primary cathodic arc source, FIG. 7*b* is a schematic plan view of another tubular filtered multi-cathode arc source utilizing a pair of deflecting coils surrounding each cathode chamber, in an embodiment, FIG. 7*c* is a transverse cross-section of one tubular filtered multi-cathode arc source utilizing deflecting magnetic coils surrounding each cathode chamber, in an embodiment, FIG. 7*d* is a schematic plan view of a tubular filtered multi-cathode tubular arc source utilizing an additional coaxial gaseous plasma source, in an embodiment, FIGS. 7*e*, 7*f* and 7*g* are schematic plan views of further embodiments of filtered cathodic arc apparatuses for coating and plasma treatment of internal surfaces of long tubular objects, FIG. 7*f*1 is schematic plan view of further embodiments of filtered cathodic arc apparatuses shown in FIG. 7*f*, utilizing the primary cathodic arc source with self-recreating cold cathode and coaxial sputtering cathode for coating and plasma treatment of internal surfaces of long tubular objects, in an embodiment, FIGS. 7*f*2, 7*f*2, 7*f*3 and 7*f*4 are schematic plan views of further embodiments of filtered cathodic arc apparatuses shown in FIG. 7*f*1, utilizing coaxial sputtering or evaporating cathode target with array of wire anode electrodes within the inside area of the tubular substrate-to-be-coated for PVD and PACVD coatings and plasma treatment of internal surfaces of long tubular objects, in embodiments, FIG. 7*f*5 is schematic plan view of further embodiment of filtered cathodic arc apparatuses shown in FIG. 7*f*2 utilizing array of RF wire electrodes for providing the remote arc plasma within the inside area of the tubular substrate-to-be-coated for PVD and PACVD coating and plasma treatment of internal surfaces of long tubular objects, in an embodiment, FIG. 7*f*6 is schematic cross-sectional view of cathodic arc evaporator with cylindrical target which can be used for ID coatings, in an embodiment, FIG. 7*h* is schematic plan view of one filtered cathodic arc apparatus for generation of energetic particles, utilizing an array of wire electrodes, in an embodiment, FIGS. 7*h*1 and 7*h*2 are schematic plan view of further embodiments of filtered cathodic arc apparatuses for generation of high speed impulse plasma flow of energetic particles shown in FIG. 7*h*, utilizing a plasma focusing alignment of an array of wire electrodes, FIGS. 7*i* and 7*j* show cross sectional view of the apparatus of FIG. 7*h* and distribution of plasma potential across the discharge tube, FIG. 7*k*** shows cross-sectional view of an apparatus for generation of energetic particles for the hybrid fusion-fission reactor, in an embodiment;

FIG. 7L shows cross-sectional view of an apparatus for generation of energetic particles for drug reduction of hypersonic vehicle utilizing reversed arc plasma discharge, in an embodiment;

FIGS. 7L1, 7L2, 7L3, 7L4, 7L5 and 7L6 are variations of cross-sectional view of an apparatus for generation of energetic particles for drug reduction of hypersonic vehicle utilizing reversed arc plasma discharge shown in FIG. 7L, in embodiments;

FIG. 7L7 is a cross-sectional view of a scheme of a satellite with integrated generators of energetic particles utilizing reversed arc plasma discharge, in embodiment;

FIG. **7*m*** shows cross-sectional view of an apparatus for generation of energetic particles in coating deposition reactor, utilizing an array of wire electrodes in the reactor chamber, in an embodiment;

FIG. **7*n* shows a variation of cross-sectional view of the apparatus for generation of energetic particles in a reversed arc plasma coating deposition reactor of FIG. 7*m*, utilizing electrically biased substrate holder, in an embodiment, FIG. 7*o* shows a variation of cross-sectional view of the apparatus for generation of energetic particles in a reversed arc plasma coating deposition reactor of FIG. 7*n*, utilizing magnetron sputtering source, in an embodiment, FIG. 7*p* shows a variation cross-sectional view of the apparatus for generation of energetic particles in a reversed arc plasma coating deposition reactor of FIG. 7*n* with additional pumping port connected to the coating chamber, in an embodiment, FIG. 7*r* is a variation of a schematic plan view of a reversed arc plasma coating deposition reactor of FIG. 7*p*, utilizing single phase transformer providing AC power to the substrate holder, in an embodiment, FIG. 7*s* shows a cross-section view of a rectangular reversed arc plasma coating deposition reactor of FIG. 7*r* utilizing magnetic steering of remote arc plasma column in rectangular plasma duct, in embodiment, FIG. 7*t* shows a cross-section view of a tubular reversed arc plasma coating deposition reactor of FIG. 7*r* utilizing magnetic steering of remote arc plasma column in tubular cylindrical plasma duct, in embodiment, FIG. 7*u* shows a variation of filtered cathodic arc apparatus for generation of energetic particles of FIG. 7*h*, utilizing an array of wire electrodes independently connected to remote anode power supplies and plasma duct housing made of dielectric ceramic, in an embodiment, FIG. 7*w* is a variation of a schematic plan view of a reversed arc plasma coating deposition reactor of FIG. 7*u*, utilizing cascade channel of the plasma duct, in an embodiment, FIG. 7*w*1 is a variation of a schematic side view of coating deposition reactor of FIG. 7*w*, utilizing primary cathodic arc source with self-recreating cold cathode, in an embodiment, FIGS. 7*w*2 and 7*w*3 are variations of a schematic plan view of coating deposition reactor of FIG. 7*w*1, utilizing multiple pairs of primary cathodes coupled with remote anodes for generation of multiple remote arc plasma columns, in embodiments, FIG. 7*w*4 is a variation of a schematic side view of coating deposition reactor of FIG. 7*w*, utilizing primary cathodic arc source with self-recreating cold cathode with additional independent pumping line, in an embodiment, FIG. 7*w*5 is a variation of a schematic side view of coating deposition reactor of FIG. 7*w*, with substrates suspended along the vertical axes of the reactor, in an embodiment, FIG. 7*x* is a variation of a schematic plan view of coating deposition reactor of FIG. 7*p*, utilizing multi-cathode primary arc source, in an embodiment, FIG. 7*y* is a variation of filtered cathodic arc apparatus for generation of energetic particles of FIG. 7*w* adapted to function as an ion laser tube, in an embodiment, FIG. 8*a* is a schematic view of one filtered cathodic arc apparatus having a cathode and substrate holder in optical alignment, providing a Langmuir probe, a quartz microbalance mass flux probe and a set of stream baffles disposed in the plasma stream, in an embodiment, FIG. 8*b* is a schematic view of a variation of the filtered cathodic arc apparatus of FIG. 8*a* in which the substrate holder is offset from the optical axis of the cathodic arc source, in an embodiment, FIG. 8*c* is a schematic view of a cathode chamber of the filtered cathodic arc source shown in FIG. 3*b* utilizing a set of stream baffles installed near the entrance to the plasma duct chamber, in an embodiment, FIG. 8*d* is a schematic view of a further embodiment of the filtered multi-cathode arc source shown in FIG. 7*a* utilizing a set of stream baffles installed at the entrance into the tunnel portion of the plasma duct chamber, in an embodiment, FIG. 8*e* is a schematic view of a further embodiment of the filtered multi-cathode arc source shown in FIG. 7*a* utilizing a cone macroparticle trap attached to the back wall of the deflecting portion of the plasma duct, in an embodiment, FIG. 8*f* is a schematic view of a further embodiment of the unidirectional filtered cathodic arc source shown in FIG. 8*e* utilizing a cone macroparticle trap attached to the wall of the deflecting portion of the plasma duct opposite to the cathode chamber, in an embodiment, FIG. 8*g* is a cross-sectional plan view of a further embodiment of the apparatus of FIG. 8*a* utilizing a stream baffles with a main chamber acting as a plasma duct, in an embodiment, FIG. 8***h* is a cross-sectional plan view of a further embodiment of the apparatus of FIG. 8*g* utilizing a cone macroparticle trap opposite to the cathode chamber, in an embodiment, FIG. 8*h*1 is a variation of a cross-sectional plan view of radial filtered cathodic arc deposition system shown in FIG. 8*h*, utilizing multiple primary cathodic arc sources, in an embodiment, FIG. 9*a* is a schematic cross-section of the filtered cathodic arc source shown in FIG. 3*a* having three cathode chambers disposed at each of the opposite walls of the deflection section of the plasma duct, in an embodiment, FIG. 9*b* is a perspective view of a coating apparatus utilizing two unidirectional rectangular dual filtered cathodic arc sources having three cathode chambers with attached primary cathodic arc sources disposed at each of two opposing walls of the deflection section of the plasma duct, in an embodiment, FIG. 9*c* is a variation of schematic diagrams of FIG. 9*a* utilizing shielded cathode chambers for generating primary arc plasma in low pressure compartment and heated substrate holder in high pressure compartment of the coating chamber;

FIG. 9*d* is a variation of schematic diagram of FIG. 9*c* utilizing tubular primary cathodic arc source in a shielded low pressure compartment provided with attached pumping system;

FIG. 9*e* is a perspective view of a reversed arc plasma thruster utilizing high pressure remote anode chamber with multichannel output, in an embodiment; FIG. 9*e*1 is a perspective view of a variation of FIG. 7*e*, showing remote arc plasma for plasma spray deposition in vacuum chamber, in an embodiment;

FIG. 9*e*2 is a perspective view of a variation of a reversed arc plasma thruster shown in FIG. 9*e*, utilizing three remote anode chambers for vector maneuvering, in an embodiment;

FIG. 9*e*3 is a perspective view of a variation of a reversed arc plasma thruster shown in FIG. 9*e*, utilizing arc plasma torch as a source of electron current for remote arc discharge, in an embodiment; FIG. 9*f* is a variation of schematic diagrams of FIG. 9*e* utilizing cascade arc nozzle output, in an embodiment;

FIG. 9*f* is a variation of schematic diagrams of FIG. 9*e* utilizing cascade arc nozzle output, in an embodiment;

FIG. 9*f*1 is a variation of schematic diagrams of FIG. 9*f* utilizing additional RF electrode in anode chamber, in an embodiment;

FIG. 9*f*2 is a perspective view of a variation of FIG. 9*e*, showing hybrid 2-stage reversed arc plasma thruster utilizing 1st-stage high pressure remote anode chamber with MPD accelerator 2nd-stage, in an embodiment;

FIGS. 9*f*3*a* and 9*f*3*b* are perspective views of a variation of FIG. 9*f*, showing hybrid 2-stage reversed arc plasma thruster utilizing 1st-stage high pressure remote anode chamber for generating reversed arc plasma arcjet with Hall-effect accelerator 2nd-stage, in embodiments;

FIG. 9*f*3*c* is a perspective view of a variation of FIG. 9*f*3*b*, with RF enhanced anode discharge in the channel of the Hall effect thruster, in an embodiment;

FIG. 9*f*3*d* is a perspective view of a variation of FIG. 9*f*3*c*, utilizing the radially magnetized permanent magnets for generation of the transverse magnetic field in the channel of the Hall effect thruster, in an embodiment;

FIG. 9*f*3*e* is a perspective view of a variation of FIG. 9*f*3*a*, utilizing hollow cathode electron emission source positioned in the central pole of the magnetic core of the Hall effect thruster, in an embodiment;

FIG. 9*f*3*e*1*a* is a perspective view of a variation of FIG. 9*f*9*f*3*e*, utilizing permanent magnets with opposite direction of magnetization for generation the transverse magnetic field across the ceramic channel of the Hall effect thruster, in an embodiment;

FIG. 9*f*3*e*1*b* is a perspective view of a variation of FIG. 9*f*3*e*1*a*, utilizing pair of magnetic coils producing magnetic field of opposite directions for generation the transverse magnetic field across the channel of the Hall effect thruster and centrally positioned multi-layer hollow cathode-anode keeper assembly, in an embodiment;

FIGS. 9*f*3*e*1*c* is a perspective view of a variation of FIG. 9*f*3*e*1*a*, utilizing nested hollow cathode electron emission source having the 1$^{st}$ stage of heated thermionic cathode positioned near the entrance of the bore in the central pole of the magnetic core of the Hall effect thruster and the 2$^{nd}$ stage utilizing the electron emitting insert positioned near the exit of the bore of the central pole, in an embodiment;

FIG. 9*f*3*e*1*d* is a perspective view of a variation of FIG. 9*f*3*e*1*a*, showing hybrid 2-stage reversed arc plasma thruster utilizing 1st-stage high pressure remote anode chamber with nested double Hall-effect accelerator 2$^{nd}$ stage, in an embodiment;

FIG. 9*f*4 is a perspective view of a variation of FIG. 9*f*3*a*, showing the hybrid 2-stage reversed arc plasma thruster utilizing 1st-stage high pressure remote anode chamber and the thruster with anode layer (TAL) as a 2$^{nd}$-stage, in an embodiment;

FIGS. 9*f*5, 9*f*6 and 9*f*7 are perspective views of a variation of FIG. 9*f*, showing flat quasy-2D arcjet thruster with reversed arc discharge, in embodiments;

FIG. 9*f*8 is a perspective view of a variation of FIG. 9*f*, utilizing output magnetic nozzle, in embodiment;

FIGS. 9*f*9 and 9*f*10 are schematic plan view of further embodiments of filtered cathodic arc apparatuses for generation of high speed impulse plasma flow of energetic particles in electric thruster, utilizing plasma focus acceleration stage formed by array of anodic wires electrodes;

FIGS. 9*f*11, 9*f*12 and 9*f*13 are perspective view of a variation of arcjet thruster of FIG. 9*f*, showing hybrid 2-stage remote arc plasma thruster utilizing vacuum cathodic arc thruster as first stage followed by remote anode arc plasma generator as second stage, in embodiments;

FIG. 9*f*14 is perspective view of a further variation of arcjet thruster of FIG. 9*f*, utilizing sectional remote anode, in embodiment;

FIG. 9*f*15 is perspective view of arcjet thruster of FIG. 9*f*14, utilizing additional plasma torch to increase power dissipation in remote anode chamber, in an embodiment;

FIGS. 9*f*16 and 9*f*17 are perspective view of vacuum arc cathode thruster, utilizing convex and concave dome cathode target, in embodiments;

FIG. 9*f*18 is perspective view of the hybrid vacuum arc cathode thruster, utilizing plane vacuum arc cathode target attached to the remote anode chamber with output nozzle, in embodiment;

FIG. 9*f*19 is cross-sectional view of the reversed arc plasma arcjet thruster with dielectric ceramic nozzle, in embodiment;

FIGS. 9*f*20, 9*f*21 and 9*f*22 are cross-sectional view of the reversed arc multi-jet thruster, in embodiments;

FIG. 9*f*23 is schematic view of ion thruster utilizing reversed arc ionization stage, in embodiment;

9*f*23*a* is schematic view of ion thruster for acceleration of the particles negatively charged in reversed arc plasma, in embodiment;

FIG. **9*f*24** is cross-sectional view of the planar large area PACVD or plasma etch reactor, utilizing reversed arc remote multi-jet planar plasma source, in embodiment;

FIG. **9*f*25** is cross-sectional view of the planar large area ion beam sputtering coating deposition system, utilizing reversed remote multi jet planar plasma source, in embodiment;

FIGS. **9*f*26 and 9*f*27 are cross-sectional views of the reversed remote multi-jet planar plasma source of FIG. 9*f*25**, utilizing the arch-shaped magnetron-style magnetic field in front of the planar plasma source diaphragm, in embodiments;

FIG. **9*f*28** is schematic view of the MHD generator with optional microturbine utilizing hybrid chemical/electrical reversed remote arcjet thruster, in embodiment;

FIGS. **9*g* and 9*h* are variations of the schematic diagram of FIG. 9*c*** utilizing a cascade remote arc with coaxial first stage remote arc discharge, in embodiments;

FIG. **9*i* is a further variation of the schematic diagram of FIG. 9*g*** utilizing a cylindrical cathodic arc source positioned in the coaxial cathode chamber, in an embodiment;

FIGS. **10*a*, 10*b* and 10*c* are schematic plan view embodiments of filtered cathodic arc deposition apparatus providing a hybrid layout of the filtered cathodic arc source shown FIG. 4*b*** in combination with the magnetron sputtering source installed in the plasma duct chamber;

FIG. **10*d* is schematic plan view of one filtered cathodic arc deposition apparatus providing a hybrid layout of the filtered cathodic arc source shown FIG. 4*b*** utilizing an ion source installed in the plasma duct chamber, in an embodiment;

FIGS. **10*e* and 10*f* are variations of a hybrid of the filtered cathodic arc source shown in FIG. 10*d*** utilizing a shielded cathodic arc source installed near the back wall of the plasma duct and two magnetron sputtering sources installed at the exit of the plasma duct magnetically coupled to the filtered-arc source, in embodiments;

FIG. **10*f*1** is an exemplary schematic plan view of vacuum arc coating apparatus with substrates-to-be-coated separated from the remote arc plasma by separation barrier in an embodiment of the invention, in embodiment;

FIG. **10*f*2 is a variation of schematic diagram of FIG. 3** with primary cathodic arc sources separated from the coating chamber by set of baffles, in embodiment;

FIG. **10*f*3 is a variation of schematic diagram of FIG. 4** with remote anode grids installed in front of the magnetron targets, optionally additionally powered by RF generator, in embodiment;

FIGS. **10*f*4, 10*f*5, 10*f*6 and 10*f*7 are variation of schematic diagram of FIG. 3** with remote anode grids installed in front of the magnetron targets, optionally additionally powered by unipolar pulse generator, in embodiments;

FIG. 11 is a schematic illustration of a hybrid dual filtered cathodic arc source utilizing an electron beam evaporator with two electron beam guns installed adjacent to the cathode chambers, in an embodiment;

FIGS. **12*a* and 12*b*** are schematic plan views of embodiments of a filtered cathodic arc coating apparatus utilizing filtered cathodic arc sources with an additional filtration stage, in embodiments;

FIG. **13*a*** is a schematic view of an embodiment of a filtered cathodic arc apparatus providing substrate holders configured for coating a fluidized powder, in embodiment;

FIG. **13*a*1 illustrates a reversed remote arc plasma enhanced rotary fluidized bed PECVD reactor, FIG. 13*a*2 illustrates a further variation of the embodiment of a reversed remote arc plasma enhanced rotary fluidized bed PECVD reactor chamber of FIG. 13*a*1, utilizing the cathode with self-recreating inner coating made of metals with low melting point and high saturated vapor pressure such as Bi, Zn, Ba, Cd, Ca, FIG. 13*b*** is a schematic view of an embodiment of a filtered cathodic arc apparatus for free-fall PVD coating of powder, in embodiment;

FIG. **13*b*1 is a variation of a schematic view of the fluidized bed PACVD apparatus shown in FIG. 13*b***, in an embodiment;

FIG. **13*c* is a schematic view of the apparatus shown in FIG. 13*b*** for producing concurrent composite powder/metal vapor plasma coatings, in an embodiment, in embodiment;

FIG. **13*d* is a schematic view of the apparatus shown in FIG. 13*b*** for free-fall reversed arc plasma enhanced CVD coating of powder, in an embodiment;

FIGS. **13*d*1.1, 13*d*.1.2, 13*d*2 and 13*d*3** are schematic cross-section of vacuum cold spray apparatus utilizing vacuum cathodic arc plasma source coupled with electrostatic macroparticles acceleration stage, in embodiments;

FIG. **13*e* is a schematic view of the fluidized bed PACVD apparatus shown in FIG. 13*a*** with remote arc plasma assisted CVD rotating reaction chamber, in an embodiment.

Figure 13C:
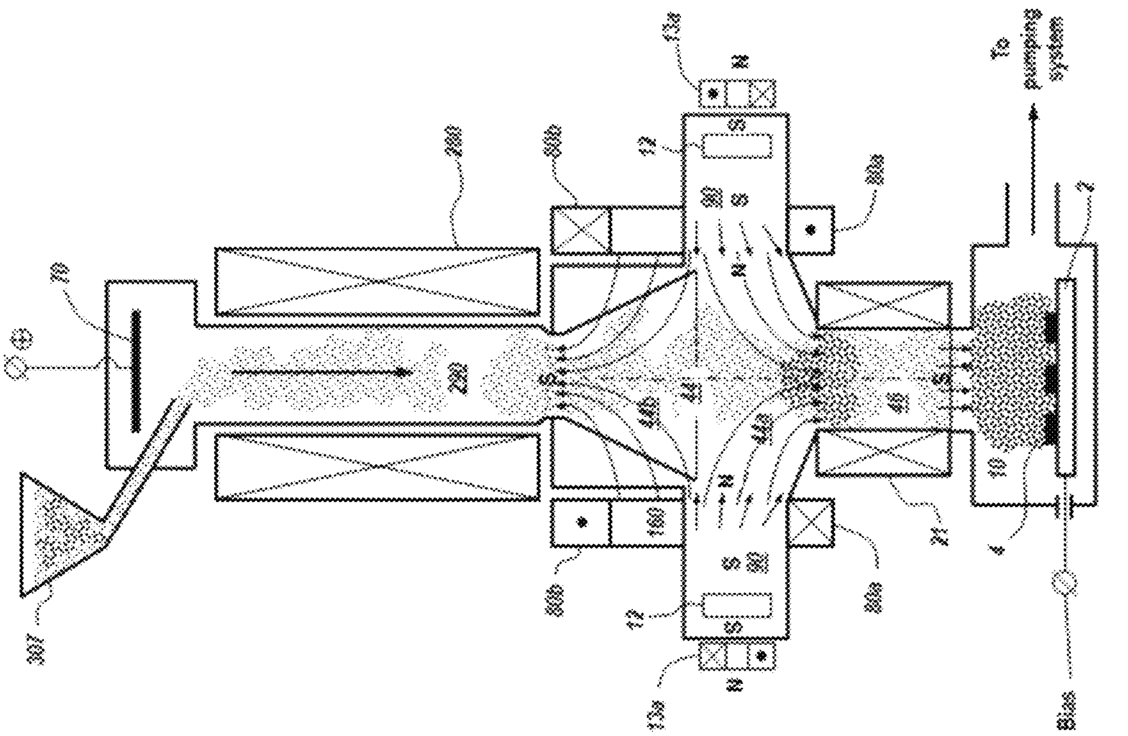
Figure 13D:
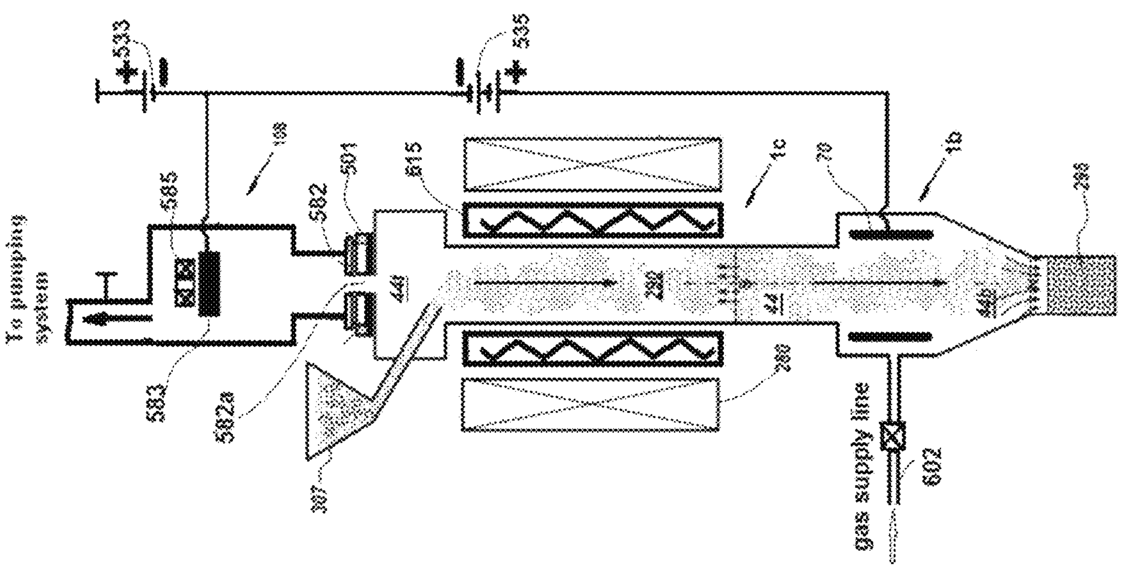
Figure 13E:
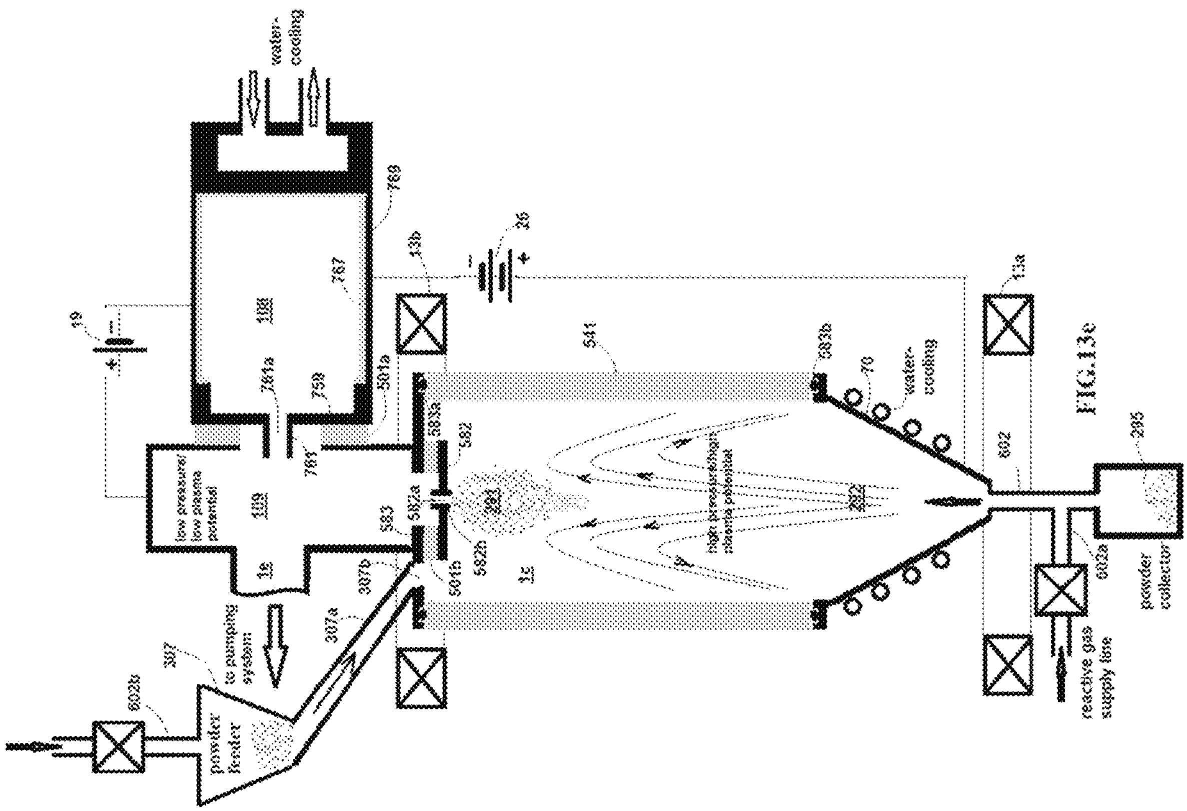

FIGS. **13*e*1 through 13*e*5 are variations of schematic view of the fluidized bed PACVD apparatus shown in FIG. 13*e***, in embodiments;

DETAILED DESCRIPTION OF THE INVENTION

This invention is an improvement of the advanced coating and surface treatment system described in D. G. Bhat, V. I. Gorokhovsky, R. Bhattacharya, R. Shivpuri, K. Kulkarni, "Development of a Coating for Wear and Cracking Prevention in Die-Casting Dies by the Filtered Cathodic Arc Process," in Transactions of the North American Die Casting Association, 20th International Die Casting Congress and Exposition, Cleveland, OH, November 1999, pp. 391-399, the entire disclosures of which are hereby incorporated by reference, the source and method of controlling vapor plasma flow taught by U.S. Pat. Application No. 2011/0100800 to Gorokhovsky and the apparatus taught by U.S. Pat. No. 5,435,900 issued Jul. 25, 1995 to Gorokhovsky which incorporates a plasma source **1*x*, utilizing the cathodic arc target 12 with arc igniter 12*a* mounted in a cathode chamber 90, a plasma duct 44 surrounded by the deflecting magnetic system, and a substrate holder 2 mounted in the coating chamber 10 off of the optical axis of cathodic arc target 12, where the steering electromagnet 13*a* is surrounded the cathode chamber 90 behind the target 12 and the focusing electromagnet 13*b* is surrounded the cathode chamber 90 in front of the target 12 as illustrated in FIG. 1. Plasma duct 44 is designed in the form of a parallelepiped with coating chamber 10 and cathode chamber 90 mounted on adjacent planes. The magnetic system that forces the plasma stream towards substrates 4 consists of linear conductors arranged along the edges of the parallelepiped. Plasma duct 44 has plates 55 with wall baffles 55*a* connected to the positive pole of the current source (not shown) or grounded and mounted on one or more planes of the plasma duct 44 and/or on the walls of the cathode chambers 90 (not occupied by the plasma source). These plates 55 with baffles 55*a*, which are charged essentially positive in relation to surrounding plasma environment, serve as deflecting electrodes to establish an electric field in a direction transverse to the magnetic field lines, to duct plasma flow toward the substrate to be coated. FIG. 1 illustrates one deflecting electrode 50 with baffles 50***a* for capturing macroparticles from the vapor plasma flow generated by the primary plasma sources 1*x*. The advantages provided by U.S. Pat. No. 5,435,900 to Gorokhovsky include increasing the range of dimensions of articles (substrates) which can be coated and providing the user with the option of changing the configuration of the magnetic field in order to increase ionic current at the exit of the plasma duct to 2 to 3 percent of the arc current. This design is also incorporates the advanced coating and surface treatment system described in D. G. Bhat, V. I. Gorokhovsky, R. Bhattacharya, R. Shivpuri, K. Kulkarni, "Development of a Coating for Wear and Cracking Prevention in Die-Casting Dies by the Filtered Cathodic Arc Process," in Transactions of the North American Die Casting Association, 20th International Die Casting Congress and Exposition, Cleveland, OH, November 1999, pp. 391-399, the entire disclosures of which are hereby incorporated by reference.

If the potential of the deflecting electrode ($V_d$) located opposite the plasma source is greater than the potential of the plasma source wall ($V_w$), an electric field occurs between them. The intensity of the electric field is given by:

$$E \propto \frac{V_d - V_w}{d} \propto \sigma\left[1 + (\omega_e \tau_e)^2\right] I_d \tag{1}$$

d is the distance between the plate and the plasma duct wall, $\omega_e$ is the gyro frequency of magnetized plasma electrons, $\tau_e$ is the characteristic time between electron collisions, $\sigma$ is the specific resistivity of the plasma in the absence of a magnetic field, and $I_d$ is the current of the deflecting electrode.

Because $\omega_e$ is proportional to the plasma-guiding magnetic field B, (i.e. $\omega_e \propto B$), the transversal electric field $E_t$ as determined by formula (1) will be proportional to $B^2$, as shown by the following equation:

$$E_t \propto \sigma\lfloor 1+(\omega_e \tau_e) I_d \propto B_t^2 \rfloor I_d \tag{2}$$

where $B_t$ is the component of the magnetic field which is tangential to the surface of the deflecting electrode.

An ion is influenced by the force:

$$F_i = Q_i \times E_i \tag{3}$$

where $Q_i$ is the ion charge. Combining formulae (2) and (3) yields:

$$F_i \propto Q_i B_t^2 I_d \tag{4}$$

This force causes an ion to turn away from the wall opposite the plasma source and directs it towards the substrate to be coated.

Another method used to reduce the incidence of macroparticles reaching the substrate is a mechanical filter consisting of a baffle, or set of baffles, interposed between the plasma source and the plasma duct and/or between the plasma duct and the substrate. Filters taught by the prior art consist of simple stationary baffles of fixed dimension, such as is described in U.S. Pat. No. 5,279,723 issued Jan. 18, 1994 to Falabella et al. and in U.S. Pat. No. 5,435,900 to Gorokhovsky, which are incorporated herein by reference. In these filters the baffles are disposed along the plasma duct walls leaving substantial portion of the macroparticles which are crossing the area near the center of the plasma duct, far from the plasma duct walls, not trapped.

Another disadvantage of U.S. Pat. No. 5,435,900 to Gorokhovsky is that the focusing coils of the primary cathodic arc sources which are installed in the cathode chambers focus the cathodic arc metal vapor plasma, having a large kinetic energy ranging from 40 eV to 200 eV, toward the center of the plasma duct chamber. The deflecting magnetic field takes this high velocity metal ion stream and starts to rotate it around the edges of the plasma duct chamber adjacent to the main chamber too late, which results in excessive losses of metal vapor plasma on the walls of the plasma duct chamber.

The present invention overcomes some or all of the above primary art disadvantages by providing mechanisms for the effective deflection of a plasma flow, simultaneously providing both high metal vapor plasma transport efficiency and high efficiency of trapping the neutral metal atoms, clusters and macroparticles.

In one embodiment the invention provides a coating chamber disposed off of the optical axis of a filtered cathodic arc source consisting of a rectangular plasma duct chamber with deflection portion of the plasma duct chamber having at least one cathode chamber attached to its side wall and an exit tunnel portion connected to the coating chamber. Baffles for trapping the macroparticles are positioned along the walls of cathode chamber and plasma duct chamber not occupied by vapor deposition sources. The tunnel portion of the plasma duct chamber is surrounded by a focusing coil, and two rectangular main deflecting coils are attached to the opposite sides of the deflecting portion of the plasma duct while an offset deflecting coil surrounds the cathode chamber upstream of the entrance into the plasma duct, allowing the deflection of the vapor plasma flow to commence prior to its entering into the plasma duct area, which effectively reduces the losses of filtered metal vapor plasma.

In a further embodiment of the invention at least two cathode chambers are attached to the opposite walls of the plasma duct of rectangular plasma duct chamber. The offset deflecting conductors are attached to the front face of the cathode chambers in the offset position in relation to the plasma duct chamber, which allows for the deflection of metal vapor plasma before it enters into the plasma duct area, substantially reducing plasma losses and increases deposition and target utilization rates.

The deflection portion of the plasma duct may have a shape of rectangular or triangular prism or a prism of other cross section having the same plane of symmetry with the exit tunnel portion of the plasma duct. The main deflecting coils may form a frame aligned along the rectangular or triangular prism or a prism of other cross-section having the same plane of symmetry with the plasma duct.

In a further embodiment the plasma duct chamber is cylindrical and cathode chambers are attached to the plasma duct portion of the plasma duct around the axis of the exit of the cathode chamber and/or at the entrance of the tunnel portion of the plasma duct chamber. The offset deflection coil is attached to the front faces of the cathode chambers on side of coating chamber.

In a further embodiment the array of thin wire anode electrodes are provided within the cylindrical plasma duct. The remote arc plasma is established within the plasma duct between the primary cathode in cathode chamber and remote anode in anode chamber. The high voltage positive voltage pulses are applied to the plasma duct and wire electrodes to increase plasma potential in the area adjacent to the plasma duct wall thereby accelerating the ions toward axes of the plasma duct, where high energy ions collide and generate high energetic particles by nuclear reaction.

In a further embodiment stream baffles are positioned at the exit of the cathode chamber and/or at the entrance to the tunnel portion of the plasma duct chamber, disposed across the metal vapor plasma flow. The stream baffles may have independent position control or, alternatively, at least a portion of them may be made of magnetic materials so they will self-align along either deflecting or focusing magnetic streamlines, which allows for an even further increase in macroparticles filtration.

The invention also provides a multiple-cathode apparatus suitable for use in plasma-immersed processes as ion implantation, ionitriding, ion cleaning and the like. In these embodiments a first filtered cathodic arc source containing one or more cathodes generates cathodic evaporate for coating the substrate, while the deflecting and focusing magnetic fields positioned to affect a second filtered cathodic arc source are deactivated so that cathodic evaporate does not flow toward the substrates. The second filtered cathodic arc source thus functions as a powerful electron emitter for plasma immersed treatment of the substrates.

Optionally in these embodiments a load lock shutter comprising a metallic grid is disposed between the plasma duct and the coating chamber, to control communication between the plasma source and the coating chamber. Where particularly contaminant-free conditions are required the load lock shutter can be closed to contain macroparticles and metal vapor within the cathode chamber(s) and plasma duct, but permit the passage of electrons into the coating chamber to thus increase the ionization level of the gaseous component within the coating chamber. The load lock shutter can further be charged with a negative potential, to thus serve as an electron accelerator and ion extractor. Optionally load lock shutters may also be provided between the filtered cathodic arc source and the plasma duct, and/or between the cathodes and the deflecting electrode within a filtered cathodic arc source.

The invention further provides an apparatus for the application of coatings in a vacuum comprising at least one filtered cathodic arc source, the apparatus comprising at least one cathode with at least one igniter contained within at least one cathode chamber, at least one anode associated with the cathode for generating an arc discharge, and a plasma duct in communication with the cathode chamber and with a substrate chamber containing a substrate holder for mounting at least one substrate to be coated, the substrate holder being positioned off of an optical axis of the cathode, the plasma duct comprising a deflection section in communication with the at least one cathode chamber, and a plurality of stream baffles disposed or movable to an orientation generally transverse to a plane parallel to a direction of plasma flow in the deflection section of the plasma duct, each stream baffle having a generally positive potential in relation to the plasma potential, whereby target ions pass through the spaces between the stream baffles while ions having a different weight or charge than the target ions follow a trajectory into the faces of the baffles, such that at least some of the ions having a different weight or charge than the target ions are blocked from reaching the substrates.

The invention further provides a filtered cathodic arc apparatus including (a) a cathodic arc source including (i) at least one cathode and at least one igniter contained within at least one cathode chamber, respectively, (ii) at least one anode associated with the cathode for generating arc discharge, and (iii) at least one stabilizing coil, disposed behind or surrounding a respective cathode, for controlling position of the arc discharge; (b) a substrate chamber containing a substrate holder for mounting at least one substrate to be coated, the substrate holder being positioned non-coincidental with an optical axis of the at least one cathode; (c) a plasma duct, in communication with each cathode chamber and the substrate chamber and comprising (i) at least one focusing coil surrounding a focusing tunnel section of the plasma duct for generating a focusing magnetic field and (ii) at least one deflecting coil generating a deflecting magnetic field for deflecting the plasma along a path toward the substrate chamber; and (d) at least one magnetron facing the substrate holder, the magnetron being positioned such that at least a portion of magnetic force lines of the focusing magnetic field overlap and are substantially parallel with at least a portion of magnetic force lines generated by the magnetron, wherein each arc source couples with a magnetron source to increase an ionization rate of a magnetron sputtering flow.

The invention further provides a method of coating a substrate in an apparatus for the application of coatings in a vacuum comprising at least one filtered cathodic arc source, the apparatus comprising at least one cathode contained within at least one cathode chamber, at least one anode associated with the cathode, and a plasma duct in communication with the cathode chamber and with a substrate chamber containing a substrate holder for mounting at least one substrate to be coated, the substrate holder being positioned off of an optical axis of the cathode, the method comprising: a. generating an arc discharge, and b. generating a deflecting magnetic field in the cathode chamber for deflecting a plasma flow from the arc source into the plasma duct, the deflecting magnetic field deflecting plasma toward the substrate chamber before the plasma has exited the cathode chamber.

The invention further provides a method of coating a substrate in an apparatus for the application of coatings in a vacuum comprising at least one filtered cathodic arc source, the apparatus comprising at least one cathode contained within at least one cathode chamber, at least one anode associated with the cathode, and a plasma duct in communication with the cathode chamber and with a substrate chamber containing a substrate holder for mounting at least one substrate to be coated, the substrate holder being positioned off of an optical axis of the cathode, the method comprising, in any order:

a. generating an arc discharge, b. applying to a plurality of stream baffles a generally positive potential in relation to the plasma potential, and c. orienting the plurality of stream baffles in an orientation generally transverse to a plane parallel to a direction of plasma flow in the deflection section of the plasma duct, whereby target ions pass through the spaces between the stream baffles while ions having a different weight or charge than the target ions follow a trajectory into the faces of the baffles, such that at least some of the ions having a different weight or charge than the target ions are blocked from reaching the substrates.

The invention further provides a filtered cathodic arc method of generation of energetic particles comprising the apparatus comprising at least one cathode contained within at least one cathode chamber at least one proximal anode associated with the cathode for generating a primary arc discharge, at least one primary arc power supply having negative output connected to the cathode and positive output connected to the primary proximal anode or grounded generating a voltage drop between the cathode and the primary anode, at least one distal anode contained within distal anode chamber associated with the cathode for generating a remote arc discharge, a tubular plasma duct disposed between the cathode chamber and the distal anode, at least one remote arc power supply having negative output connected to the cathode and positive output connected to the distal anode for generating remote arc discharge along the plasma duct, an array of wire electrodes disposed coaxially within the plasma duct and electrically connected to the plasma duct, at least one low voltage high current plasma duct power supply having negative output connected to the cathode and positive output connected to the plasma duct, at least one unipolar power supply having positive output connected to the plasma duct and negative output connected to the cathode, at least one solenoid surrounding the plasma duct, the method comprising:

a. injecting the plasma creating gas into the apparatus, the gas pressure is ranging from 1E-6 to 1000 torr;
b. generating a primary arc discharge in a cathode chamber, the primary arc current and voltage are ranging from 50 A to 500 A and from 20 V to 50V respectively;
c. generating the remote arc discharge plasma between the cathode in cathode chamber and the distal anode in distal anode chamber;
d. generating a remote arc discharge within the plasma duct between the cathode and the plasma duct, the remote arc plasma is filling the space within the array of wire electrodes, the discharge current and voltage are ranging from 50 A to 10,000 A and from 30V to 500V respectively;
e. generating longitudinal magnetic field along the plasma duct for confinement of the remote arc plasma and accelerated ions, the magnetic field ranges from 0.01 T to 20 T;
f. applying positive pulse voltage to the plasma duct, the voltage amplitude is ranging from 0.1 kV to 10,000 kV, for generating high positive potential within array of wire electrodes wherein ions generated by the remote arc discharge are accelerating from the high positive potential area occupied by wire electrodes toward axes of the plasma duct where energetic particles are produced by collision of ions.

FIG. 1 illustrates a prior art apparatus for the application of coatings in a vacuum as shown in U.S. Pat. No. 5,435,900 to Gorokhovsky. The apparatus comprises two cathode chambers 90 disposed opposite to each other and symmetrical in relationship to the plane of symmetry of the rectangular plasma duct 44. The cathodic arc plasma sources 1*x* are positioned at the entrance of the cathode chambers 90. Each of the plasma sources comprises a cathode target 12 with arc igniter 12*a* disposed in a cathode chamber 90 in communication with a plasma duct 44 in the form of a parallelepiped. The cathode target 12 is surrounded by a steering coil 13*a* located upstream of (i.e. behind) or surrounding the cathode target and a focusing coil 13*b* located downstream (i.e. in front) of the cathode, and the anodes (not shown) are positioned on planes of the cathode chamber adjacent to the cathode 12 to create an electric arc discharge when an arc current power supply 19 is activated. The plasma duct 44 is in communication with a substrate chamber 10, in which a substrate holder 2 supporting the substrates 4 is positioned. The substrate holder 2 is thus located off of the optical axis of the cathode 12, preferably at approximately a right angle, to minimize the exposure of the substrates 4 to the flow of neutral particles.

In FIG. 1 a deflecting magnetic system comprises four rectangular deflecting coils: two deflecting coils 20 are positioned at the side walls of the rectangular plasma duct chamber 44 opposite to each other, a third deflecting coil 21*b* is positioned around the back wall of the plasma duct chamber 44, and a fourth coil, a focusing coil 21, is positioned around the exit tunnel portion 46 of the plasma duct 44 adjacent to the substrate chamber 10. A deflecting magnetic field is generated by deflecting conductors 20*a* of the deflecting coils, which are positioned perpendicular to the plane of rotation of the vapor plasma flow emitted from the cathode targets 12, so that the deflecting magnetic field has the general shape of circles concentric to the deflecting conductors 20*a*. The deflecting magnetic fields created by linear conductors 20*a* of the side deflecting coils located along the edges of the plasma duct adjacent to the substrate chamber are of unidirectional magnetic field cusp geometry. The back coil 21*b* allows for the control of the deflecting magnetic field by changing the magnetic field generated by closing conductors 20*b* of the side coils parallel to the deflecting conductors 20*a*. The magnetic field created by the back coil 21*b* can be used to reduce or completely eliminate the magnetic field created by the closing conductors 20*b* of the two side deflecting coils 20 parallel to the front focusing conductors of the focusing coil 21. The preferable direction of electric current in the side coils 20 and back coil 21*b* arrangement is shown by the arrows in FIG. 1. The front focusing coil 21 focuses the metal vapor plasma toward the substrates to be coated 10.

On the walls of plasma duct 44 are mounted plate electrodes 55 provided with diaphragm filters or baffles 55*a*, spaced from the walls of the plasma duct and optionally electrically insulated therefrom, for deflecting the flow of plasma away from the optical axis of the cathode 12 and through the plasma duct 44. In the embodiment shown a positively charged deflecting and dividing electrode 50 with attached baffles 50*a* is located along a plane of symmetry of the plasma duct. This dividing electrode effectively separates two opposite parts of the deflection section 44*a* of the plasma duct 44. The deflecting electrodes 55 may be located on any wall adjoining the wall on which the cathode target 12 is positioned. In these positions, the deflecting electrodes 55 with baffles 55*a* serve both as baffles which trap macroparticles and as a deflecting element which redirects the plasma stream toward the substrates by repelling the positively charged ions. The deflecting electrodes may be at floating potential, which is positive relative to the surrounding magnetically insulated plasma or positively biased by connecting it to the positive pole of an auxiliary current source (not shown). In any case they are biased positively in relation to the cathodes 12. It can be seen from the schematic illustration of plasma flows in this prior art apparatus shown in FIG. 2 that in this case a substantial amount of metal vapor plasma will flow in a direction along the axis of the cathode chamber 90 and will eventually be lost to the walls of the plasma duct 44. The reason for this is that the metal vapor plasma generated on the evaporating surface of the cathode targets 12 has a large kinetic energy (ranging from 40 eV to 200 eV) and continues its propagation along the axis of the cathode chamber by inertia. The deflection of this plasma flow toward the substrate chamber 10 by the deflecting coils 20 positioned around the plasma duct is occurring too late, so only small fraction of the metal plasma is deflected toward the substrate chamber 10 and used in a coating deposition process.

Although the magnetic field does not influence ions directly, a strong tangential magnetic field confines electron clouds, which in turn creates an electric field that repels ions. Thus, in the deflecting region the electric field generated by deflecting electrodes has little influence on ions entrained in the plasma stream, so ions tend to accumulate on the deflecting electrode 50 disposed along the plane of symmetry of the plasma duct 44 or on surrounding walls of the deflection section 44*a* of the plasma duct 44 and its exit tunnel section 46 because the residual component of their momentum along the optical axis of the cathode 12 exceeds the deflecting force of the deflecting field generated by deflecting linear conductor 20*a* of the deflecting coil 20 which is positioned adjacent to the cathode chamber 90 and the exit tunnel section 46 of the plasma duct 44.

The main disadvantage of the prior art apparatus shown in FIG. 1 is that the deflection of the focused vapor plasma generated by the primary cathodic arc sources only begins when the focused plasma flow enters the plasma duct. Since metal ions of the cathodic arc vapor plasma have a large kinetic energy, this late start of the deflection leads to large metal ion losses from the large portion of the metal vapor ion flow which proceeds along the axis of the cathode chamber by inertia and is largely unaffected by the deflecting magnetic field in the deflection section 44*a* of the plasma duct 44. This is illustrated in FIG. 2 which shows the distribution of the vapor plasma flow lines within the cathode chamber 90 and within the deflection portion of the plasma duct 44*a*. It can be seen that substantial deflection from the direction along the cathode chamber 90 axes toward the substrate holder 2 in the coating chamber 10 occurs well beyond the exit of the cathode chamber 90. This results in insufficient time to deflect the metal vapor plasma stream generated by the cathodes 12 in the cathode chambers 90 to avoid large losses against the walls of the plasma duct chamber 44. Where the metal vapor plasma stream is not deflected 90° toward substrate chamber 10, a large portion of the metal vapor plasma will be lost to the walls of the plasma duct chamber 44 or dividing baffle 50 even before entering into the focusing exit tunnel section 46, while large amount of vapor plasma will be also lost to the walls of the exit tunnel section 46 of the plasma duct 44.

According to the invention the filtered cathodic arc apparatus is provided with an electromagnetic system for beginning the deflection of the metal vapor plasma stream generated by a vacuum arc cathode in the cathode chamber, before it enters into plasma duct. This is accomplished by deflecting the magnetic field streamlines in the exit portion of the cathode chamber before it enters the plasma duct 44 as illustrated in FIG. 3*a* which shows an embodiment of the sources for plasma assisted electric propulsion of present invention. In this embodiment of the invention the cathode target 12 is positioned at the top of cathode chamber 90 between a steering coil 13*a* and a focusing coil 13*b*. A pair of main deflecting coils 20 and focusing coil 21 can be positioned along the edges of the rectangular plasma duct 44 and its tunnel portion 46 as shown in FIG. 2 and described in a prior art U.S. Pat. No. 5,435,900 issued Jul. 25, 1995 to Gorokhovsky, which is incorporated herein by reference. This design is also incorporates the advanced coating and surface treatment system described in D. G. Bhat, V. I. Gorokhovsky, R. Bhattacharya, R. Shivpuri, K. Kulkarni, "Development of a Coating for Wear and Cracking Prevention in Die-Casting Dies by the Filtered Cathodic Arc Process," in Transactions of the North American Die Casting Association, 20th International Die Casting Congress and Exposition, Cleveland, OH, November 1999, pp. 391-399, the entire disclosures of which are hereby incorporated by reference. Optionally, additional deflecting coil is positioned around the back wall of the plasma duct chamber 44 (not shown). A laser arc ignition 111 is used to initiate the arc discharge at the face surface of the target 12. The additional offset deflecting coils 80 surrounding the cathode chamber comprise the proximate offset front deflecting conductors 80*a* facing the substrate chamber 10 and positioned next to the cathode chamber wall, and distal offset closing conductors 80*b* positioned remote from the cathode chamber. The offset deflecting coil 80 allows for the deflection of the cathodic arc plasma flow to start at an earlier stage, inside the cathode chamber 90, which results in a dramatic increase of the filtered vapor plasma 195 which passes the deflecting section of the plasma duct 44*a* and the tunnel exit portion 46 of the plasma duct chamber 44 without striking its walls. At the same time the macroparticles having straight trajectories 199 not affected by electrical and/or magnetic field are trapped on walls of the cathode chambers 90, plasma duct 40 and baffles. This design has demonstrated substantial increase in vapor plasma transport efficiency of the macroparticle filter.

FIGS. 3*b* through 3*d* illustrate the magnetic field distribution in the apparatus shown in FIG. 3*a*, which was prepared by 2D finite element calculation. In FIG. 3*b* both the main deflecting conductors 20 and focusing conductors 21 had a current of 2400 amperes, while the offset conductors 80 were turned OFF. It can be seen that in this case the magnetic field starts turning toward the coating chamber (not shown) only downstream of deflecting conductors 20 adjacent to the plasma duct 40.

When the offset deflecting conductors 80 are turned ON with the offset coil current of 1800 amperes, the turning of the magnetic force lines starts near the offset deflecting conductors 80*a* adjacent to the cathode chambers 90 as illustrated in FIG. 3*c*. The early turning of the magnetic force lines is can be seen even when the deflecting conductors 20*a* are turned OFF but offset proximate deflecting conductors 80*a* are turned ON with current of 1800 amperes as shown in FIG. 3*d*.

FIGS. 3*e* through 3*g* illustrate the plasma transport efficiency in unidirectional vs. bidirectional plasma duct. The convex plasma boundary in an unidirectional plasma duct shown in FIG. 3*e* results in excessive plasma losses by diffusion across the convex plasma boundary toward back walls of the cathode chamber 90 and plasma duct 44. The plasma losses across the concave plasma boundaries forming in bi-directional cusp configuration shown in FIG. 3*f* are substantially reduced. The efficiency of plasma transport can be further improved by creating the concave boundaries of the vapor plasma stream and bending the plasma stream already in a cathode chamber 90 as illustrated in FIG. 3*g*. To keep the concave shape of both downstream and upstream magnetic force lines both in the cathode chamber 90 and within the plasma duct 44 the midpoint between the offset proximate deflecting conductor 80*a* and the offset distal closing deflecting conductor 80*b* of the offset deflecting coil 80 must be disposed within the cathode chamber 90. In case if the proximate and distal deflecting conductors belong to different deflecting coils their respective currents can be adjusted independently from each other hence they can provide concave magnetic field topology on both sides 90*a* nearest to the substrate chamber and 90*b* farthest from the substrate chamber of the cathode chamber 90 even when the distance between these conductors greater than two times the width of the cathode chamber 90. For example, the distance between closing linear conductors 80*b* and the center of the cathode target 12 may be chosen to be between 1.2 and 10 times the distance between the center of the cathode target 12 and the back walls 90*b* of the cathode chamber 90. When the distance between the closing linear conductors 80*b* and the center of the cathode target 12 is outside of the range defined from 1.2 to 10 times the effect of concave deflecting magnetic field within cathode chamber 90 for suppressing plasma diffusion losses is nearly disappearing.

The critical issue for improving the efficiency of vapor plasma transport in curvilinear magnetic field is a necessity to avoid the magnetic field crossing the walls of cathode chambers and plasma duct. The vapor plasma stream generated at the evaporating surface of the primary cathode targets 12 is transported largely along the magnetic field lines. Any vapor plasma flow which is confined to the portion of the magnetic field lines that are crossing the walls at the turning point between cathode chambers 90 and the plasma duct 44 is condensing on the walls and contributing to the losses of the plasma vapor from the useful coating deposition process. According to the present invention, the walls 90*a* of the cathode chambers 90 adjacent to the plasma duct on the side facing the substrate chamber where the plasma flow is turning toward the substrate chamber may be either moved forward (downstream toward the substrate chamber), as shown for example in FIGS. 6*b*, 7*a* and 7*b*, or bent to follow the peripheral magnetic force lines as shown in FIG. 6*a* so the magnetic force lines 160*a* will not cross the walls of the cathode chambers. The cathode target 12 can be positioned eccentrically in substrate chamber to leave more space for plasma to turn toward substrate holder in the substrate chamber without crossing the cathode chamber 90 walls as illustrated in FIG. 6*a*. This design of the cathode chambers 90 is especially favorable for the present invention since it forms a starting point for deflection of the magnetic force lines already in the cathode chamber 90 prior to entering the plasma duct 44.

The combination of filtered cathodic arc source with magnetron sputtering source in one hybrid coating deposition chamber layout allows producing metal vapor plasma with controlled ion-to-atoms ratio, which is advantageous for deposition of coatings with superior functional properties for various applications. The prior art design of the variation of filtered vapor plasma apparatus shown in FIG. 1, representing a hybrid filtered cathodic arc-magnetron sputtering apparatus combining unidirectional dual filtered cathodic arc source magnetically coupled with magnetron sputtering coating deposition sources in one coating system layout are shown illustratively in FIG. 3*h, i*. The design of this variation incorporates the advanced coating and surface treatment system described in D. G. Bhat, V. I. Gorokhovsky, R. Bhattacharya, R. Shivpuri, K. Kulkarni, "Development of a Coating for Wear and Cracking Prevention in Die-Casting Dies by the Filtered Cathodic Arc Process," in Transactions of the North American Die Casting Association, 20th International Die Casting Congress and Exposition, Cleveland, OH, November 1999, pp. 391-399, the entire disclosures of which is hereby incorporated by reference and also presented in the source and method of controlling vapor plasma flow taught by U.S. Pat. Application No. 2011/0100800 to Gorokhovsky which is incorporated by reference.

In reference to FIG. 3*h*, a magnetron sputtering source 245 includes sputtering target 245*a* and magnetic yoke 245*b*. Magnetron sputtering source 245 is attached to the wall of coating chamber 10 opposite to the unidirectional dual filtered cathodic arc source 1. Magnetron sputtering source 245 is powered by the magnetron power supply 430. A rotational substrate-holding turntable 2 with substrates 4 to be coated positioned on rotating satellites-shafts 3 is positioned between the magnetron source 245 and filtered cathodic arc source 1. Optionally, a remote anode 70 is provided in coating chamber 10 to increase ionization of the metal vapor-gaseous plasma environment by establishing a remote arc discharge between the at least one cathode 12 in cathode chamber 90 of the filtered cathodic arc source 1, connected to the negative pole of remote arc power supply 26, and remote anode 70 connected to the positive pole of the power supply 26. In this design, substrates 4 are subjected to (a) nearly 100% ionized metal vapor plasma flow 195 generated by filtered cathodic arc source 1 and (b) nearly neutral metal atom sputtering flow 215 generated by magnetron sputtering source 245.

FIG. 3*i* illustrates a design similar to that shown in FIG. 3*h* except for including two magnetron sputtering sources 245 attached to opposing side walls of coating chamber 10 and magnetically coupled to the unidirectional filtered cathodic arc metal vapor plasma source. A disadvantage of the designs shown in FIGS. 3*h* and 3*i* is that each substrate 4 is only alternatingly subjected to vapor plasma flow 195 and metal atomic sputtering flow 215. Any given individual substrate 4 is not simultaneously subjected to both vapor plasma flow 195 and metal atomic sputtering flow 215. Consequently, when, during the coating deposition cycle, a substrate 4 is subjected only to the non-ionized nearly neutral magnetron sputtering atom metal flow 215, the resulting magnetron sputtering layer has low density, high level of defects and low functional properties due to the lack of metal ion bombardment from ionized metal vapor plasma flow 195 during the magnetron sputtering deposition stage.

FIG. 3*j* schematically illustrates one exemplary hybrid coincided filtered arc-magnetron sputtering deposition apparatus 300. Deposition apparatus 300 represents an improvement over the prior art apparatus of FIG. 3*h,i*. Deposition apparatus 300 overcomes the above mentioned disadvantage of the prior art coating apparatus by spatially overlapping metal atom sputtering flow 215 with vapor plasma flow 195 such that substrate 4 may be subjected to metal atom sputtering flow 215 and metal vapor plasma flow 195 at the same time. In deposition apparatus 300, at least one magnetron source 245 is positioned such that non-ionized metal atomic magnetron sputtering flow 215 generated by magnetron targets 245*a* coincides with nearly 100% ionized metal vapor plasma flow 195 generated by dual filtered cathodic arc source 1. In this case, the ion-to-(atom+ion) ratio in the metal vapor plasma generating by this hybrid coincided filtered arc-magnetron sputtering process can be independently regulated from 0 to 100% by adjusting (a) the flux of metal vapor plasma flow 195 generated by filtered cathodic arc source 1 and/or (b) the flux of metal atom sputtering flow 215 generated by magnetron sputtering source 245. The hybrid coincided filtered arc metal vapor plasma assisted magnetron sputtering deposition process provides an unexpected effect of dramatically improving morphology, microstructure and functional properties of magnetron sputtering coatings by hammering them by bombardment of metal ions of the same nature as magnetron sputtering metal atoms when the targets of the filtered arc source and adjacent magnetron sputtering targets are made of the same metal. Another unexpected result of the hybrid co-directed, coincided metal vapor plasma assisted magnetron sputtering process illustrated in FIG. 3*j*, which is in contrast to the prior art combinatorial process with separate deposition of metal vapor plasma and magnetron sputtering flow illustrated in FIG. 3*i*, is that when the filtered arc source targets and adjacent magnetron targets are made of different metals the hybrid coincided filtered arc assisted magnetron sputtering deposition process is able to deposit nanostructured nanocomposite coatings utilizing the composition of mixed metal vapor plasma atoms generated by the filtered arc source and metal atoms generated by the adjacent magnetron sputtering sources. Without departing from the scope hereof, deposition apparatus 300 may include only one filtered cathodic arc source 1 or more than two filtered cathodic arc sources 1.

In the particular embodiment shown in FIG. 3*j*, two magnetron sputtering sources 245 are positioned adjacent to both exit tunnel section 46 of plasma guide 44 and coating chamber 10 while targets 245*a* of both magnetron sputtering sources 245 face the same spot on substrate holder 2. Thus, metal atom sputtering flow 215 from both magnetron sputtering sources 245 onto substrate holder 2 and substrates 4 coincides with deposition of metal ions of metal vapor plasma flow 195 generated by filtered cathodic arc source 1.

Without departing from the scope hereof, deposition apparatus 300 may include only one magnetron sputtering source 245 or more than two magnetron sputtering source 245, wherein each magnetron sputtering source 245 is positioned to coincide deposition of the associated metal atom sputtering flow 215 onto substrate(s) 4 with deposition of metal vapor plasma flow 195 generated by filtered cathodic arc source 1. Also, without departing from the scope hereof, magnetron sputtering source(s) 245 may be placed in plasma guide 44, see for example FIGS. 10*a* and 10*b*.

In deposition apparatus 300, each magnetron sputtering source 245 is magnetically coupled with the magnetic field of filtered cathodic arc source 1 within exit section 46 of plasma duct 44 and into coating chamber 10. In on implementation, the focusing magnetic force lines 167 generated by focusing magnetic coil 21 near exit tunnel section 46 overlap and are codirectional with magnetron magnetic force lines 166 of each magnetron sputtering source 245 on the side of the surface of magnetron target 245*a* facing substrate holder 2. Herein, "codirectional" magnetic field lines refers to magnetic field lines that generally point in the same direction, as opposed to in opposite directions. Codirectional magnetic field lines need not be parallel and may have directions that deviate from each other, as long as this angular deviation is insufficient to magnetically misdirect the vapor plasma flow from filtered cathodic arc source 1 to miss substrates 4.

In deposition apparatus 300, unidirectional dual filtered cathodic arc source 1 is optionally provided with a pair of offset deflection coils 80. Each offset coil 80 surrounds cathode chamber 90 having deflecting conductor 80*a* proximate to the wall 90*a* of the cathode chamber 90 facing coating chamber 10, while its closing conductor 80*b* is positioned distant from the opposite wall of the cathode chamber 90 facing away from the coating chamber 10. In this design, the deflection of metal vapor plasma flow 195 generated by the cathodic arc evaporation process on the surface of cathode target 12 starts already in cathode chamber 90 prior to entering the deflection section 44*a* of the plasma duct 44, which results in increased efficiency of transport of metal vapor plasma toward coating chamber 10, thereby increasing the productivity of the filtered cathodic arc coating deposition process.

FIG. 3*k* schematically illustrates one exemplary hybrid coincided filtered vapor plasma-magnetron sputtering deposition apparatus 310 with a remote arc discharge. Deposition apparatus 310 utilizes the dual unidirectional rectangular electromagnetic filter for extracting the metal ions from the primary metal vapor plasma sources and transporting them toward the coating chamber. Each primary metal plasma source may be either a magnetron sputtering source or a cathodic arc evaporating source. The primary metal plasma sources are positioned in two opposing cathode chambers attached to opposing walls of the rectangular plasma duct.

In the particular embodiment of filtered magnetron sputtering (FMS) deposition system shown in FIG. 3*k*, the primary metal vapor plasma sources in the cathode chambers are magnetron sputtering sources having anodes spaced from the magnetron targets. The substrates to be coated are located on substrate holder in the coating chamber out of the direct line-in-sight of the magnetron targets positioned in the cathode chambers.

Deposition apparatus 310 includes an electron emitting cathode-ionizer source, which can be for example thermionic cathode source, hollow cathode source or vacuum arc cathode source. The cathode-ionizer source is located in the coating chamber. However, without departing from the scope hereof, the cathode-ionizer source may be located elsewhere in the coating chamber or within the plasma duct. The cathode ionizer is connected to the negative pole of the ionizing power supply while its positive pole is connected to the magnetron anodes of the primary metal plasma sources. The remote arc discharge, thus generated between the cathode-ionizer and the magnetron anodes positioned in front of the magnetron targets in the cathode chambers, increases the ionization rate of the magnetron sputtering metal atomic flow which is otherwise typically below 0.1%. The metal ions are transported along the curvilinear deflecting magnetic field generated by a pair of deflecting coils and turned around the corner of the cathode chamber by the magnetic field generated by the deflecting linear conductor facing the coating chamber toward the exit tunnel section of the plasma duct. In the exit tunnel section of the plasma duct, the flow of metal ions is focused by the focusing coil toward the substrates to be coated in the coating chamber.

Deposition apparatus 310 includes an additional pair of the magnetron sputtering sources located in the coating chamber near the exit of the plasma duct into the coating chamber. The additional magnetron sputtering sources are magnetically coupled with the focusing magnetic field generated by the focusing coil. The magnetron targets of the additional magnetron sputtering sources face the substrates to be coated, on the substrate holder in the coating chamber, in such a manner that the generally neutral flow of sputtering metal atoms generating by the additional magnetron sputtering sources is focused to the same spot on the substrate holder as the nearly 100% ionized metal vapor plasma flow generated by the filtered metal vapor plasma source. Thus, deposition apparatus 310 coincides the deposition of the 100% ionized metal vapor plasma flow with neutral metal atomic sputtering flow, resulting in the advantages discussed above in reference to FIG. 3. Deposition apparatus 310 allows controlling the ionization rate of the spatially overlapping deposited metal atom plasma with ion-to-(ion+atom) ratio ranging from 0 to 100% depending on intensity of the metal vapor plasma flux generated by the filtered metal vapor source vs. metal atomic sputtering flux generated by the additional magnetron sputtering sources located in the coating chamber.

In a variation of the FMS embodiment of FIG. 3*k* illustrated in FIG. 3*k*1 ionization of the metal atoms sputtered from the magnetron targets positioned within vapor plasma cathode chambers of the electromagnetically filtering metal vapor plasma source is achieved by Inductively Coupled Plasma (ICP) ionization produced by RF radiation generated by induction coil surrounding the magnetron sputtering metal atoms flow. The efficiency of ICP ionization of the metal sputtering atoms is typically ranging from 20% to 50% or more depending on power dissipated via RF induction coil vs. magnetron sputtering power.

In a refinement, the pair of rotary magnetron-arc sources 12 can be installed in cathode chambers 90 as a primary sources of metal vapor plasma as illustrated in FIG. 3*k*2. The plasma source 12 can work as a magnetron sputtering source when it is powered by magnetron voltage power supply keeping the output of high voltage, required for magnetron discharge fixed, while typically yield low current. The operation of the source 12 in cathodic arc mode will require switching to arc power supply keeping high current required for arc discharge fixed while typically yield low voltage. The arc discharge is ignited by the mechanical igniter 12*b*, driving by spring-coil 12*c*, while arc spot confinement corridor defined by magnetic yoke, is restricted by the floated shield 12*s*. In magnetron sputtering mode, the ionization of metal sputtering flow via ICP process is produced by the induction coils positioned in front of the magnetron targets 12*a*.

FIG. 3L illustrates one exemplary hybrid coincided filtered vapor plasma-magnetron sputtering deposition apparatus 320 for combined deposition of a filtered vapor plasma and metal atom sputtering flow 215. Deposition apparatus 320 includes convertible magnetron-arc sources that may operate both in magnetron sputtering mode and in cathodic arc evaporation mode to produce the filtered vapor plasma. The filtered vapor plasma is at least partly ionized. In certain embodiments, the filtered vapor plasma is fully or nearly fully ionized. Deposition apparatus 320 is an embodiment of deposition apparatus 310.

Deposition apparatus 320 includes a dual rectangular metal vapor plasma source 34 that has two primary vapor sources 34*a* and 34*b*. Each primary vapor plasma source includes a target 32. Each target 32 is a cathode plate and is provided with an additional high current low voltage power supplies 47 connected to the cathode target plate 32 via switches 445 and an arc igniter 48. Cathode plates 32 are positioned in cathode chambers 90 at opposite ends of the housing 138. Cathode plates 32 are in communication, through a parallelepipedal plasma duct 31, with a substrate holder 6 in coating chamber 10. Plasma duct 31 includes deflecting section 44*a* and the exit tunnel section 46. On each side, a magnetron high voltage low current power supply 430 is connected to the target plate 32 via a switch 440. The magnetron magnet set can preferably be moved away from the target 32 by using a shaft 410 attached to a magnet holding plate 401.

In an embodiment of deposition apparatus 320, each cathode chamber 90 includes proximate internal grid anodes 603 (shown in FIG. 3*m*). Internal grid anodes 603 are configured as an array of wires 603*a* and 603*b* supported by the grid anode holders 601*a* and 601*b* are spaced from the sputtering front surface of each of the opposite targets 32.

Deposition apparatus 320 includes a distant internal anode (deflecting electrode) 120 and additional tubular internal anodes 150. Anodes 120 and 150 (and anodes 603 shown in FIG. 3*m*) are defined herein as "internal" because they are disposed within the plasma duct/coating chambers between the cathode plates 32 and the substrate holder 6. Additional tubular internal anodes 150 may be installed along the walls of the cathode chambers 90 downstream from the targets 32 surrounding the discharge area near the targets 32 spaced from the walls of the cathode chambers 90. Anodes 150 serve as anodes to the cathode targets 32. Optionally, one or more of internal anodes 120, the grid anodes 603 and the tubular anodes 150, are electrically coupled with one or more cathode ionizers installed elsewhere in coating chamber 10 or in plasma duct 31.

Distant internal anode (deflecting electrode) 120 includes a linear plate 122 having baffles 124, and is disposed along plasma duct 31 at the approximate center between the two cathode plates 32. Baffles 124 increase the anodic surface area, effectively functioning as a chain of internal anodes, which provides better stabilization and steering of arc spots. Baffles 124 also serve to trap macroparticles emitted from the evaporation surface of primary vapor sources 34*a* and 34*b*. This "dividing" anode 120 also serves to repel ions and thus deflect the plasma streams toward substrate holder 6.

The primary metal vapor plasma sources 34*a* and 34*b* include cathode assemblies 400 installed in the cathode chambers 90 (shown in FIG. 3L and FIG. 3*m*). Each primary metal vapor plasma source 34*a*, 34*b* is a convertible magnetron-arc source capable of operating both in magnetron sputtering mode and in cathodic vacuum arc evaporation mode depending on the position of a magnetic steering and plasma confinement system. This magnetic steering and plasma confinement system includes a set of central magnets 402 and peripheral magnets 403 attached to a magnet holding plate 401 disposed behind the cathode target plate 32 within enclosures 66, 68. Each enclosure 66 and 68 is installed on a movable shaft 410 behind target 32. The magnetic steering and plasma confinement system creates an arch-shaped closed loop magnetic field configuration in front of targets 32. In magnetron sputtering mode, the confining and steering magnets are moved close to target 32 to increase the strength of the closed loop confining magnetic field in front of the target 32 and consequently the plasma density of the magnetron discharge. In cathodic arc evaporation mode, the confining and steering magnets are moved further from target 32 to reduce the strength of the steering magnetic field in front of target 32. The ignition of the vacuum arc discharge on evaporating surface of the target 32 is provided by mechanical igniter 48. The closed loop confining and steering magnetic field lines in front of targets 32 overlaps and are co-directional with the focusing magnetic field 50, 54 created by magnetic conductors 82, 84, and 92, 94. This allows for the extraction of an increased amount of magnetron metal sputtering plasma or cathodic arc vapor plasma from the area near target 32 toward exit tunnel section 46 via deflection section 44*a* of the plasma-guide portion of the electro-magnetic vapor plasma filter chamber 31. The mixed vapor-gaseous plasma flow is confined in a curvilinear magnetic field created by focusing conductors 82, 84 and 92, 94 and deflecting conductors 86, 96, while the corresponding closing linear conductors 82*a*, 84*a*, 86*a*, 92*a*, 94*a*, 96*a* are positioned distant from the targets 32 and back side 500 of the plasma duct chamber 31 to minimize their influence plasma transportation along the cathode chambers 90 and deflecting section 44*a* of the plasma duct 31 toward coating chamber 10. In this embodiment targets 32 are positioned in a magnetic half-cusp area on a side 500 of the deflecting section 44*a* of the plasma guide chamber 31 where the magnetic force lines converge toward dividing anode 120. This ensures that all vapor-gaseous plasma extracted from the magnetron discharge generated in cathode chambers 90 will be focused and directed toward the substrates to be coated on substrate holder 6, while neutral droplets and macroparticles are removed from the plasma flow and trapped by baffles 124 and/or other baffles optionally disposed on walls of the cathode chambers 90 and/or on walls of the deflecting section 44*a* of the plasma duct 31 not occupied by plasma sources 34*a* and 34*b*.

Auxiliary arc cathodes may be installed elsewhere in the coating apparatus, out of optical alignment from the magnetron-arc cathode targets 32 as illustrated in FIGS. 3*k*, 3L, and 3*m*. For example, FIG. 3*k* shows a thermionic cathode-ionizer (hot filament or hollow cathode) installed in the coating chamber, to establish an auxiliary arc discharge between the auxiliary cathode-ionizer and the tubular magnetron anodes in a coating chamber. In an embodiment, deposition apparatus 320 includes a shielded cathodic vacuum arc source 510 coupled with magnetron anodes 150 in cathode chambers 90 for ionization of metal vapor flow in cathode chambers 90. Vacuum arc cathode-ionizer 510 may be installed in the coating chamber 10, to establish an auxiliary arc discharge between the cathode target 12 and the internal tubular anodes 150 as illustrated in FIG. 3L (and optionally wire anodes 603 shown in FIG. 3*m*). This results in an increase of the ionization rate of the magnetron discharge plasma while also increasing the ionization rate of the gaseous component of the plasma environment in the coating chamber, allowing magnetron sputtering at lower operating pressures, and improving coating quality by increasing ionization and activation of the vapor-gaseous plasma environment, while eliminating droplets, macroparticles and neutral clusters from metal-gaseous vapor plasma flow.

The embodiments of FIGS. 3L and 3*m* may further include one or more external anodes 130 surrounding the substrate holder 6. Anodes 130 are defined herein as "external" because they are disposed outside of the plasma duct 31. Thus, the external anodes 130 do not deflect the plasma, but instead repel ions to prevent diffusion losses on the walls of the housing 138 and to prolong ionization of the gaseous plasma, thus improving coating efficiency. Such external anodes 130 can also be provided along any desired portion of the housing 138. The external anode 130 which is installed in the coating chamber 10 may serve as remote anode to establish a remote arc discharge between the cathode targets 32 in the cathode chambers 90 and remote anode 130 which is powered by remote arc power supplies 26*a* and 26*b*. The remote arc plasma associated with this remote arc discharge allows for increased ionization and activation of the metal vapor-gaseous plasma environment in coating chamber 10, hence improving qualities of deposited coatings. Additionally, coating chamber 10 itself, or some portion thereof, may be grounded to serve as an anode. Optionally, the remote arc discharge for ionization and activation of the plasma environment in the coating chamber 10 may be established between (a) a cathode target 12 of the cathode ionizer source 510 and (b) the remote anode 130. The internal anodes 603, 150, 120 and external anode 130 are preferably electrically isolated and, for this purpose, each may be provided with an independent power supply, which allows for better control over their independent functions.

In exemplary operation of this embodiment in a filtered magnetron sputtering mode, a sputtering gas such as argon is injected through sputtering gas inlets (not shown) in the vicinity of both magnetron target plates 32 installed at opposite sides of the filtered plasma arc source apparatus. A reactive gas (for example nitrogen and/or acetylene) may optionally be supplied into the coating chamber, for deposition of cermet coatings (TiN, TiC, TiCN etc.). Switch 445 is disconnected and the arc power supply 47 is turned off. Switch 440 is activated to connect the negative pole of the magnetron power supply 430 to the target plate 32. The magnetron plasma discharge is largely confined by the arch-shaped magnetron magnetic field in the vicinity of the magnetron target cathode plate 32, forming a generally rectangular plasma ring along the gap between the edge magnet set 403 and the central magnet set 402. An erosion zone is formed by plasma sputtering on the evaporation surface of the magnetron target 32 along the path of the magnetron closed loop discharge, where the plasma density is strongest. The focusing magnetic field created by focusing conductors 82, 84 and 92, 94 creates converging magnetic field lines in front of the magnetron targets 32, i.e. over the target surface, which extracts vapor plasma flux from the magnetron discharge and focuses it toward the exit tunnel section 46 of the plasma-guide portion of the electromagnetic vapor plasma filter chamber 31. This vapor plasma flux is further confined into the converging magnetic half-cusp field near back-side section 500 of the deflecting section 44*a* of the plasma guide chamber 31, which deflects it toward the coating chamber where substrates to be coated are installed on substrate holder 6. Focusing conductors 82, 84 and 92, 94 installed at the exit of the plasma-guide focus the vapor plasma toward the substrates to be coated. The dividing anode 122 repels metal ions, effectively diverting the ion trajectories toward the coating chamber. Macroparticles and neutral vapor atoms are trapped by baffles 124, installed at the dividing anode plate 120. When the auxiliary arc discharge is activated between the cathode target 12 of the vacuum arc source 510 and magnetron anodes 150, the ionization rate increases in the vicinity of the magnetron targets 32. That increases the productivity of magnetron sputtering, as well as allows for operating the magnetron discharge at a lower operating pressure. This reduced operating pressure in turn results in higher conductance of the ionized vapor plasma out of cathode chamber 90 through plasma duct to coating chamber 10 due to a reduced frequency of collisions between ions and other atomic particles. This results in a higher ion flux at the entry to coating chamber 10, and thus higher productivity of the filtered magnetron sputtering process.

In exemplary operation of this embodiment in filtered cathodic arc evaporation mode, switch 440 is opened to disconnect the magnetron power supply 430, and instead switch 445 connecting the arc power supply 47 to cathode target plate 32 is closed. When arc power supply 47 is turned on, arc igniter 48 will ignite the cathodic arc discharge at the evaporation surface of cathode target plate 32. Optionally, a reactive gas is supplied to cathode chamber 90 for deposition cermet coatings. Magnetron magnets 402, 403 are moved away from target plate 32 area by shaft 410 supporting magnet holding plate 401. Cathodic arc spots are magnetically steered by magnetic conductors 82, 84 and 92, 94 that are parallel to the long side of the targets 32 and, independently of the set of permanent magnets 402, 403, create an arch-shaped magnetic field in front of cathode target 32. This provides the maximum target utilization rate and arc spot confinement to the wide erosion corridor area on the evaporation surface of the target plate 32. At the same time, steering/focusing conductors 82, 84 and 92, 94 focus the arc vapor plasma toward the magnetic half-cusp area created by deflecting conductors 86, 96. The deflected plasma flow are further focused, by focusing conductors 82, 84 and 92, 94 installed at the exit of the plasma-guide chamber, toward substrates installed on substrate holder 6, which are to be coated. An auxiliary anode 130 may be used to improve the ionization and activation rate of the gaseous component of the vapor-gaseous flow.

In reference to FIG. 3L, cathode ionizer 510 includes vacuum arc cathode target 12 with steering coil 13 providing magnetically steering vacuum arc spots on an evaporating and electron emitting surface of the target 12. The vacuum arc discharge is ignited by mechanical igniter 14. The primary vacuum arc on cathode target 12 is powered by a primary cathodic arc power supply 470. The cathode target assembly is enclosed in a cathode ionizer chamber 15 which is separated from coating chamber 10 by a shield 17*a*. Shield 17*a* has chevron baffles that are impermeable for heavy particles (metal atoms, ions and macroparticles), but allow electrons freely flow to coating chamber 10. The remote arc discharge is established between cathode target 12 in cathode ionizer's chamber 15 and magnetron anodes 150 in cathode chambers 90. The remote discharge is powered by remote arc power supplies 450*a* and 450*b* when switches 460*a* and 460*b* are closed. In one embodiment, magnetron grid-anodes 603 are installed in front of magnetron sputtering targets 32 as illustrated in FIG. 3*m*. Grid anodes 603 include a set of thin wires 603*a* and 603*b* that are attached to the wire anode holders 601 and form an array of wire anodic electrodes, parallel to the surface of the magnetron targets 32, in which the distance between the neighbor wire electrodes exceeds the anodic plasma sheath formed around the wire electrode when a positive potential is applied to each of wire electrodes 603*a* and 603*b*. Both anodic DC and DC pulse remote arc discharge can be conducted between cathode target 12 in cathode ionizer chamber 15 and wire anodes 603*a* and 603*b* powered by DC arc power supplies 450*c*, 450*d* and unipolar DC pulse power supplies 531*a* and 531*b*. In this embodiment of the invention, the grid magnetron anode holders 601*a, b*, with attached array of anodic wire electrodes 603*a* and 603*b*, are charged positively in reference to the primary cathode 12 in the cathode ionizer chamber 15 by connecting grid anodes 603*a* and 603*b* to the positive terminals of the DC power supplies 450*c* and 450*d* when (a) switches 460*c* and 460*d* are closed, but (b) switches 543*a* and 543*b* connecting the magnetron grid-anodes 603*a* and 603*b* to the unipolar switching positive DC pulse power supplies 531*a* and 531*b* are opened. In this mode, a remote DC arc discharge is generated between the array of wire-anodes 603 and cathode target 12. Magnetron grid-anodes 603*a* and 603*b* may be powered by unipolar high positive pulse voltage via unipolar switching pulse DC generators 531*a* and 531*b* when (a) switches 460*c* and 460*d* are opened, (b) power supplies 450*c* and 450*d* are turned off, (c) and switches 543*a* and 543*b* are closed to conduct high voltage positive pulses generated by unipolar switching pulse DC generators 531*a* and 531*b* to magnetron grid-anodes 603*a* and 603*b* in cathode chambers 90. In this mode, a remote DC pulse arc discharge is generated between the array of wire-anodes 603 and cathode target 12. Alternatively, this design also allows for providing high voltage positive pulses from unipolar DC pulse high voltage switching generators 531*a* and 531*b* while at the same time providing a DC positive voltage from DC power supplies 450*c* and 450*d*, when all switches 460*c*, 460*d*, 543*a* and 543*b* are closed and power supplies 450*c* and 45*d* are turned ON. In this case, the power supplies are protected by diodes 470*a*, 470*d*, 547*a* and 547*b*. The positive poles of the DC power supplies 450*c* and 450*d* and unipolar switching DC pulse power supplies 531*a* and 531*b* are connected to respective magnetron grid-anodes 601*a* and 601*b*, while their negative poles are connected to electron emitting cathode target 12 or are grounded. In this mode, the high voltage positive DC pulses are superimposed over positive anodic DC voltage continuously applied to the magnetron grid-anodes 601. Each unipolar switching pulse DC power supply 531*a* and 531*b* may, as shown schematically as an example in FIG. 3*m*, include a transformer 801, a rectifier 803, a capacitor 805, and a high voltage ignitron trigger-switch 807. When switch 543 is closed, trigger-switch 807 discharges capacitor 805, generating the unipolar positive voltage DC pulses applied to magnetron grid-anodes 603*a* and 603*b* while the pulse arc current is conducted via remote arc discharge between the array of anodic wires 603 and primary cathode target 12.

During the stationary remote arc discharge mode, the plasma potential within the cathode chambers 90 in the vicinity of the magnetron targets 32 is defined by the positive voltage applied to grid-anodes 601 by DC power supplies 450, which is typically ranging from 30 to 500 volts. When the high voltage positive pulses are applied to the wire-electrodes 603*a* and 603*b* of the magnetron grid-anodes 603, the plasma potential in front of magnetron target 32 may increase by orders of magnitude, thereby increasing the ionization rate of the magnetron sputtering metal atom flow in the cathode chamber 90. The voltage amplitude of the positive high voltage pulses generated by switching DC pulse power supply 531 typically ranges from 0.1 kV to 1 MV. Pulse voltage amplitude below 0.1 kV does not produce ions with sufficiently high energy. It is impractical to produce unipolar pulses with voltage amplitude exceeding 1 MV due to the associated complexity of switching DC pulse power generator 531 and insulation of the magnetron's components. In one embodiment, as shown in FIG. 3*m*, the remote arc discharge may, when the switches 460*a* and 460*b* are closed, be ignited between magnetron anodes 150 and cathode target 12 in parallel with ignition of the remote arc discharge between cathode target 12 and magnetron grid-anodes 601, with wire electrodes 603 providing dense plasma in the area of magnetron sputtering discharge adjacent to magnetron target 32. The current of the remote arc discharge is typically in the range from 50 A to 500 A but may be increased up to 10 kA. When the high voltage positive pulses are applied to wire electrodes 603 immersed in the continuous remote arc discharge plasma, plasma sheaths are created around each of the wire electrodes. The value of the plasma potential within the plasma sheath areas surrounding wire electrodes 603*a* and 603*b* is almost equal to the high voltage potential applied to the wire electrode by pulse power supply 531. When the distance between the neighboring wire electrodes 603*a* and 603*b* in a wire anode electrode array 603 is comparable to the plasma sheath thickness, the plasma sheath areas surrounding the wire electrodes 603 overlap. This overlap results in a continuous uniform distribution of the high positive plasma potential within the wire electrode array zone adjacent to the magnetron target 32, thus providing high ionization rate of the metal sputtering atoms generating by magnetron sputtering of magnetron target 32.

The diameter of wire electrodes 603 is typically in the range from 0.01 mm to 1 mm. A wire electrode 603 diameter less than 0.01 mm may not be practical due to insufficient mechanical strength, whilst wire electrodes 603 having diameters greater than 1 mm may capture high fluxes of electrons influencing plasma properties in the wire electrodes array zone near the magnetron target 32. The distance $d_w$ between neighboring wire electrodes 603 in the wire electrode array is typically in the range from 0.1 mm to 5 cm, while the operating pressure of the remote arc discharge plasma is in the range from 0.001 mTorr to 300 Torr. An operating pressure less than 0.001 mTorr is insufficient to ignite the remote arc discharge. An operating pressure above 100 Torr constricts the remote arc and results in the formation of narrow channels or filaments which produce non-uniform plasma distribution not suitable for assistance of the magnetron sputtering ionization process. Distances between the wire electrodes less than 0.1 mm are not practical and will inflict large ion losses due to collisions of high energy ions with wire electrodes. Distances between the neighboring wire electrodes exceeding 5 cm may require applying more than 1 MV voltage for overlapping the plasma sheaths between the neighboring wire electrodes, which, in most cases, will be impractical. The preferable range of the distances between the wire electrodes 603 is from 1 mm to 1 cm. Keeping such distances between the neighboring wire electrodes 603 facilitates overlapping the plasma sheath areas between the wire electrodes 603 at high voltage DC pulse discharge mode to provide uniform distribution of high positive plasma potential within the area occupied by wire electrode array 603. At the same time, distances between neighboring wire electrodes 603 exceeding 0.1 mm are greater than the plasma sheath length surrounding the positively charged wire electrodes 603 during the low voltage continuous remote arc discharge mode. This allows the remote arc discharge plasma to expand from cathode target 12, in chamber of cathode ionizer 510, along deflecting section 44*a* of the plasma duct 31 toward the magnetron grid-anode 601 to provide uniform distribution of the high plasma density across the magnetron discharge area adjacent to magnetron sputtering target 32 during the period of time between high voltage impulses generated by high voltage power supply 531 when magnetron grid-anode 601 serves as a remote anode for the remote arc discharge with target 12, in the chamber of cathode ionizer 510, as electron emitting cathode. When this high plasma potential is established within the area occupied by the array of wire anodes 603, the positive ions from the high voltage zone are accelerated downstream of grid-anode 601 along cathode chamber 90 toward deflecting section 44*a* of the plasma duct 31 and, at the same time, upstream toward magnetron target 32, enhancing magnetron sputtering process, while energetic electrons generated within the plasma sheath area surrounding wire electrodes 603 contribute to an increase of the ionization rate of the magnetron sputtering metal atoms flow.

In refinement, the RF generators 532 can be used for enhancing metal vapor ionization rate by the anode grids 603 positioned in front of the magnetron targets 32, as illustrated in FIG. 3*m*1. In this case the inductance 571 must be included on side of grid-anode circuit, connecting grid-anode 603 to the positive pole of the remote arc power supply 450, while its negative pole is connected to the cathode 12 of the cathode ionizer 510. Inductance 571 prevents the cathode ionizer and its power circuit from being affected by RF signal generating by RF generators 532. The RF generator is typically connecting to the anode grid 603 via low-inductance cable with separating capacitor. It should be appreciated that even when the remote arc power supply 532 is disconnected by the open switch 460, the grid 603 powered by RF signal along can produce up to 50% ionization of the magnetron sputtering metal atoms flow. The grid-anode 603 can be also made in a form of serpentine-shape resonant RF antenna for further increase of the efficiency of metal atoms ionization.

FIG. 3*n* illustrates one exemplary planar cathodic vacuum arc source 330 which is an embodiment of primary vapor sources 34*a*, 34*b* shown in FIGS. 3L, 3*m* and 3*m*1. The magnetic steering system of planar cathodic vacuum arc source 330 improves the target utilization rate and, at the same time, is compatible with electromagnetic focusing and deflection of the metal vapor plasma flow. Planar cathodic vacuum arc source 330 utilizes a plurality of rectangular steering coils 37, 38 and 39 positioned behind cathode target 32 for moving the arc erosion corridor from the periphery toward the center of the target 32. An arch-shaped magnetic field formation 43 above cathode target 32 may be moved toward the target border and back toward target center by smoothly switching the current in steering coils 37, 38 and 39 using the steering coils control system. The cathodic arc spot 35, the source of cathodic vacuum arc vapor plasma 136, is positioned under the top point of the magnetic arch lines 600 (shown by the arrow 606 perpendicular to the target 32) where the steering magnetic field lines are generally parallel to the target 32 surface. When steering coils 37, 38 and 39, as controlled by the steering coils control system, moves the position of the top point of the steering magnetic field arch-shaped lines 600 toward the border of target 32 and back toward the center of target 32, the position of the cathodic arc spot 35 follows by keeping its location under the top point of magnetic arch 600. At the same time, the focusing coil 84 positioned in front of the cathode target 32 generates a focusing magnetic field 604 which focuses the metal vapor plasma generated by cathodic arc spot 35 toward the plasma duct of the filtered arc source (shown in FIGS. 3L and 3*m*). This approach allows widening the erosion racetrack on the surface of target 32, hence increasing the utilization of cathodic arc target 32.

FIG. 4*a* illustrates an embodiment of the sources for plasma assisted electric propulsion of present invention embodying a filtered cathodic arc source containing two primary cathodic arc sources with cathode targets 12 disposed in two opposite cathode chambers 90 in communication with a plasma duct 44, which has a form of parallelepiped. The cathode chambers 90 are surrounded by focusing and stabilizing coils 13. Anodes 18, optionally provided with baffles to trap macroparticles, may be disposed on planes of the cathode chambers 90 adjacent to the cathodes 12 and either connected to DC power source 19 or grounded, as in the prior art.

In the preferred embodiment, the deflecting magnetic system comprises a pair of rectangular coils 20 surrounding opposite side walls along the edges of the deflection section 44*a* of the plasma duct 44, and a focusing coil 21 surrounding the focusing exit tunnel portion 46 of the plasma duct connected to the substrate chamber 10 downstream of the deflecting coil 20. As in the prior art the deflection portion of the plasma duct 44 is in communication with a substrate chamber 10 via its focusing exit tunnel portion 46. The substrate chamber 10 contains the substrate holder 2 with substrates to be coated 4, positioned off of the optical axis of the cathodes 12 of the primary cathodic arc sources positioned at the entrance of the cathode chambers 90 on both opposite sides of the deflection section of the plasma duct 44. The baffles to trap macroparticles are optionally provided on walls of the plasma duct 44 and its focusing exit tunnel portion 46 as in the prior art (as shown in FIG. 1). Dividing electrode 50, connected to the positive pole of the arc power supply, grounded or insulated from the plasma duct, having a positive in respect to plasma floating potential can be optionally provided along the plane of symmetry of the plasma duct separating its two sides with two opposite cathode chambers 90. The dividing electrode 50 is provided with baffle plates 50*b* to trap the macroparticles. If used, the dividing baffle 50 is installed in the deflection portion 44*a* of the plasma duct 44 between two cathode chambers 90.

According to the invention, the filtered cathodic arc apparatus is additionally provided with offset deflecting coils 80 installed around the exit portions of the cathode chambers 90 in an offset position with respect to the plasma duct. For example, in the embodiment shown in FIG. 4*a* the offset proximate front linear conductors 80*a* of offset deflecting coils 80 are positioned next to the walls of the cathode chambers 90 on the side of the substrate chamber 10, while their respective offset distal closing linear conductors 80*b* are positioned at a substantial distance behind the back walls of the cathode chambers 90 so as to have a lesser magnetic influence on the plasma stream within the cathode chamber 90 than their associated deflecting conductors 80*a*. For example, the distance between closing linear conductors 80*b* and the center of the cathode target 12 may be chosen to be between 1.25 and 10 times the distance between the center of the cathode target 12 and the back wall 90*b* of cathode chamber 90. If this distance is less than 1.25 times the distance from the center of the cathode target 12 and the back wall 90*b* of the cathode chamber 90 the asymmetry of the magnetic field is not enough to create a necessary high driving force for bending the plasma flow toward deflection portion 44*a* of the plasma duct 44. If this distance is more than 10 times the distance from the center of the cathode target 12 and the back wall 90*b* of cathode chamber 90 the influence of the distal offset conductor 80*b* on deflecting field in cathode chamber 90 becomes negligible. This creates a substantial increase of the magnetic field intensity near the side 90*a* of cathode chamber 90 nearest to the substrate chamber 10. The increase of the magnetic field on the side 90*a* of cathode chamber 90 nearest to the substrate chamber 10 results in deflecting the magnetic field streamlines generated by the deflecting coils 80 in a direction toward substrate chamber 10. In addition, this increases the magnetic pressure $p_B = B^2/8\pi$ on side 90*a* of the cathode chamber 90 nearest to the substrate chamber 10, which in turn leads to an increase of the electron pressure $p_e$ and accordingly the electron density in the plasma stream on side 90*a* of the cathode chamber 90 nearest to the substrate chamber 10 according to the well-known relationship:

$$p_e \propto B^2/8\pi \tag{5}$$

This increase in electron density leads to increase in metal vapor ion density to satisfy the quasineutrality of the plasma. Both of these factors—deflecting the magnetic field streamlines toward substrate chamber and the increase in metal vapor ion density on side 90*a* of the cathode chamber 90 nearest to the substrate chamber 10—contribute to the earlier deflection of the metal vapor plasma flow toward the substrate chamber 10 because deflection of the plasma begins in the cathode chamber 90 prior to the plasma entering the plasma duct 44. This results in dramatic increase of the deflected metal ion flow which can be used in the coating deposition process as illustrated in FIG. 3*a*. To suppress the losses of vapor plasma by diffusion in transversal direction toward walls of the cathode chambers 90 the concave magnetic force lines should be maintained both on side 90*a* of the cathode chamber 90 nearest to the substrate chamber 10 and on side 90*b* of the cathode chamber 90 farthest from the substrate chamber 10. This can be accomplished by maintaining the position of the midpoint between the offset proximate front linear conductor 80*a* and offset distal closing linear conductor 80*b* of the offset deflecting coil 80 within the cathode chamber 90.

The offset deflecting coils 80 can also serve as focusing coils when the focusing coil 21 is turned OFF. In this case the deflection capability of the offset deflecting coils 80 alone is not enough to deflect the metal vapor plasma flow toward substrate chamber 10. Although the offset deflecting coils 80 can shift the plasma stream generated by the primary cathodic arc sources toward substrate chamber 10, most of the plasma flow will end on the opposite walls of the plasma duct 44 and its exit tunnel section 46. In this mode the power supplies 26 can be turned ON to establish an auxiliary arc discharge between the primary cathodic arc sources in the cathode chambers 90 and an auxiliary arc anode 70 in the substrate chamber 10. This discharge typically provides more than 3% ionized gaseous plasma assisting in ion cleaning, ion etching, ion implantation, ionitriding and low pressure CVD processes.

The offset deflecting coils 80 can be used as the only deflecting coils of the unidirectional dual filtered cathodic arc apparatus without deflecting coils 20 as illustrated in FIG. 4*c*. In this case the deflection field produced by offset deflecting coils 80 is coupled with the focusing field produced by focusing coil 21 surrounding the exit portion of the plasma duct tunnel 46. The distribution of the magnetic field lines in plasma duct in a case presented in FIG. 4*c* is similar to that shown in FIG. 3*d*. It can be seen that using the offset deflecting coils 80 surrounding the cathode chambers 90 instead of deflection coils 20 allows to move the turning point of the magnetic field streamlines upstream which results in a turning of the vapor plasma flow at earlier stage than in a prior art apparatus shown in FIG. 2.

In a further embodiment of the invention shown in FIG. 4*b* at least two offset deflecting coils 80 and 81 are installed around the cathode chambers 90. A proximal offset deflecting coil 80 is installed next to the cathode chambers 90 on the side 90*a* nearest to the substrate chamber 10. The proximal offset deflecting conductors of the proximal offset deflecting coil 80 are positioned between the focusing coils 13*b* and the entrance to the plasma duct 44. A distal offset deflecting coil 81 is positioned behind the plasma duct 44, at a larger distance from the back side of the cathode chambers 90, which distance exceeds the distance between the coil 80 and the side 90*a* of the cathode chambers 90 nearest to the substrate chamber 10. The polarity of the proximal offset deflecting coil 80 is the same as that of the focusing coil 21, while the polarity of the distal offset deflecting coil 81 is opposite to the coil 80.

In the operation of these embodiments, the substrates 4 are mounted on the substrate holder 2 in the substrate chamber 10. The apparatus is evacuated to the desired pressure using conventional techniques and vacuum pumping apparatus well known to those skilled in the art. The primary current source 19 is activated, creating an arc discharge between the cathode 12 and anodes 18 which begins to evaporate the cathodic material into the cathode chamber 90. At the same time, or after a selected time interval as desired, the auxiliary current source (not shown) is energized to bias the optional focusing electrode 23, creating a focusing electric field in the exit tunnel portion 46 of the plasma duct 44. The substrates 4 to be coated are connected to the negative terminal 29*b* of the bias power supply (not shown), while the positive pole of the bias power supply is either grounded or connected to the cathode target 12 of the primary cathodic arc source installed in the cathode chamber 90. In a magnetized filtered arc metal vapor plasma propagating along magnetic force lines of the deflecting and focusing magnetic fields of the filtered cathodic arc apparatus of the present invention, the potential of the substrates 4 to be coated is typically defined by reference to the primary cathode targets 12 emitting the electrons and generating a metal vapor plasma stream.

One of the problems that appear during deposition of coating in dense strongly ionized plasma is micro-arcing on substrates 4. When the substrate bias voltage exceeds the voltage drop associated with the vacuum arc discharge, arc breakdown can result in creating arc spots that damage the surface of the substrates 4 to be coated. To eliminate this problem, the direction of the current conveyed by the plasma environment to the substrate surface may be reversed with repetition frequency exceeding the characteristic frequency of vacuum arc breakdown. To perform this bi-pulse bias operation a DC bias power supply having positive and negative poles (not shown) can be connected to the substrate holder 2 via a switching arrangement utilizing fast switching solid state elements such as IGBTs or the like. The switching cycle is controlled by a low voltage control device (not shown). This connects the substrate holder 2 alternately to the positive and negative poles of the bias power supply while a primary cathode target remains as a permanent reference electrode.

Cathodic evaporate is ejected from cathode 12 in an ionized plasma containing both ionized coating particles and neutral contaminate or macroparticles. The plasma is focused by the magnetic focusing coils 13 and flows past the anodes 18. The plasma stream, with entrained macroparticles vaporized from the evaporation surface of the cathode 12, is thus ejected toward the optional deflecting electrode 50. The pair of offset deflecting coils 80 (or proximate offset deflecting coil 80 and distal offset deflecting 81 in FIG. 4*b*) generates a concave deflecting magnetic field already within the cathode chamber 90 which directs the plasma stream along with ions of coating material suspended therein through the exit portion of the cathode chamber 90 following by the deflecting portion 44*a* of the plasma duct 44 and the tunneling exit section 46 of the plasma duct 44 toward the substrate chamber 10, as shown by the arrows in FIGS. 4*a* to 4*d*. Neutral macroparticles remain unaffected by the deflecting magnetic field and the electric fields generated around deflecting electrode 50 are trapped by the sets of baffles 50*a*, 50*b* which may be installed along the deflecting electrode 50, or the baffles which may be installed along the walls of cathode chambers 90 and plasma duct 44 (as shown in FIG. 1). Neutral particles continue their movement in a path generally along the optical axis of the cathode 12, striking the deflecting electrode 50 and walls of the cathode chambers and plasma duct and either adhering to the electrode 50 and the walls and baffles or falling to the bottom of the apparatus.

In the embodiment of FIG. 4*b*, which illustrates a variation of an embodiment of filtered cathodic arc deposition method and apparatus shown in FIG. 4*a*, since the polarity of the proximate offset deflecting coil 80 is the same as that of the focusing coil 21, while the polarity of the distal offset deflecting coil 81 is opposite to the proximate offset deflecting coil 80, a bidirectional magnetic cusp configuration is created with an upstream cusp directed away from the substrate chamber 10 and a downstream cusp directed toward the substrate chamber 10. The upstream cusp covers the part of the exit portion of the cathode chamber 90 farthest from the substrate chamber 10, while the downstream cusp covers the part of the exit portion of the cathode chamber 90 nearest to the substrate chamber 10. The proximate offset deflecting coil 80 creates the concave deflecting magnetic field within the part of the exit portion of the cathode chamber 90 nearest to the substrate chamber 10, while the distal offset deflecting coil 81 creates the concave deflecting magnetic field within the part of the exit portion of cathode chamber 90 farthest from the substrate chamber 10. The metal vapor plasma flow generated by cathodes 12 is deflected toward the substrate chamber 10 starting from the area within the cathode chambers 90 where the deflection of the magnetic streamlines toward substrate chamber 10 starts, followed by the deflection section 44*a* of the plasma duct 44 and continuing into the exit tunnel section 46 of the plasma duct 44. The currents of the offset deflecting coils 80 and 81 should be adjusted to keep concave shape of the deflecting magnetic force lines on both sides of the cathode chamber 90: on the side 90*a* nearest to the substrate chamber 10 and on opposite side 90*b* farthest from the substrate chamber 10. If the total currents in the offset coils 80 and 81 are equal to each other, the coils are parallel to each other and perpendicular to the plane of symmetry of the plasma duct 44 and the distance between their offset deflecting linear conductors and the plane of symmetry of the plasma duct 44 are also equal, then the midpoints between their respective deflecting conductors should be disposed within the corresponding cathode chambers 90. This condition will secure the concave shape of the deflecting magnetic field within the cathode chambers 90. During the process stages which do not require metal vapor deposition process such as ion cleaning, ionitriding, ion implantation and low pressure plasma assisted CVD, the offset deflecting coils 80, 81 are not activated while the stabilizing and focusing coils are turned ON, supporting the continued operation of the primary cathodic arc sources respectively associated with cathode targets 12. The power supplies 26 are turned ON and an auxiliary arc discharge is established between the cathode targets 12 of the primary cathodic arc sources and the auxiliary anode 70 positioned in the substrate chamber 10. In this case the highly ionized (more than 3% ionization rate) gaseous plasma fills the substrate chamber 10 to support all plasma immersion surface treatment processes excluding filtered arc metal vapor deposition.

In the further embodiment of the sources for plasma assisted electric propulsion of present invention shown in FIG. 4*d* a pair of offset deflecting coils 80 overlap the focusing coils 13*b*. The deflecting conductors 80*a* of the offset deflecting coils 80 are positioned over top of the conductors of the focusing coils 13*b* on a side 90*a* of the cathode chamber 90 nearest to the substrate chamber 10. In this embodiment the focusing coils 13*b* can be activated independently from the deflection coils 80 to support the primary cathodic arcs generated by the cathodes 12 in a cathode chambers 90 during a plasma immersion process stages which do not involve filtered cathodic arc coating deposition, such as ion cleaning, ionitriding, ion implantation and low pressure plasma assisted CVD. When the coils 80 are turned ON, with or without focusing coils 13*b*, but with plasma duct tunnel focusing coil 21 ON, the filtered cathodic arc coating deposition process will start, and a large amount of metal vapor plasma generated by the primary cathodic arc targets 12 will be deflected toward the substrate chamber 10.

FIG. 4*e* illustrates an embodiment of the sources for plasma assisted electric propulsion of present invention which shows the batch coating system layout utilizing a vacuum plasma processing chamber 42, equipped with a unidirectional dual filtered cathodic arc plasma source 1 of present invention. The rotatable substrate turntable 2, is installed in the center of the coating chamber 42 and allows for single or double rotation of the substrates 4 to be coated. The coating chamber 42 is equipped with an array of radiant heaters and with diagnostic equipment including optical pyrometers and thermocouples to measure substrate temperature (not shown). The unidirectional dual filtered cathodic arc plasma source 1 consists of the plasma duct chamber 44 with baffles installed along its walls and the exit tunnel 46. A pair of deflecting coils 20 is located on the opposite walls of the plasma duct chamber along the edges of the plasma duct. A pair of offset deflecting coils 80 is located around the cathode chambers 90 along the opposite walls of the plasma duct chamber 44 in off-set position in relation to the plasma duct chamber 44. The midpoint of the distance between the offset proximal deflecting linear conductors and offset distal closing deflecting conductors of the offset deflecting coils 80 should be positioned with the cathode chamber 90 to maintain the concave saddle-shape magnetic field within both parts of the cathode chamber 90: the part nearest to the coating chamber 42 and the opposite part, farthest from the coating chamber 42. A focusing coil 21 is surrounding the exit tunnel portion 46 of the plasma duct while the additional deflecting coil 21*b* is positioned around the back wall of the plasma duct chamber. The primary direct cathodic arc deposition sources, consisting of the cathode target 12, surrounded by tubular anodes 18 with steering and focusing coils 13*a*,13*b*, are positioned on top of the cathode chambers 90 attached to opposite walls of the plasma duct chamber 44 adjacent to the exit tunnel portion 46. In addition, two vertical rastering coils (shown in FIG. 9*a*) can be optionally positioned on the top and bottom flanges of the plasma duct chamber for rastering the filtered arc flow (not shown). This provides high uniformity of the coating thickness distribution over large deposition areas.

In operation, when the deflecting coils 20, offset deflecting coils 80 and focusing coil 21 of the filter chamber are turned on, the vapor plasma generated by the primary cathodic arc sources flows into the plasma duct chamber from opposite directions and turns around the corner of the plasma duct exit tunnel 46 toward the coating chamber 42. The optional deflecting coil 21*b* can be also activated to tune the direction of the metal vapor plasma flow. When the deflecting coils 20 and focusing coil 21 of the filter chamber are turned off, an auxiliary arc discharge can be established between the primary arc cathodes 12 of the cathode arc source and the auxiliary arc anode 70 located in a coating chamber behind the turntable 2 as illustrated in FIG. 4*e*. This discharge provides ionization and activation of the gaseous atmosphere in the main chamber, producing highly ionized gaseous plasma during such technological stages as plasma immersion ion cleaning/etching, gaseous ion implantation, ionitriding/oxynitriding/carburizing and low pressure plasma assisted CVD.

The deflecting electrode-baffle 50 dividing two opposite vapor plasma flow generating by the primary cathodic arc sources respectively associated with cathode targets 12 can optionally be installed into the plasma duct 44 to separate the two vapor plasma flows generated by the two primary cathodic arc sources. The deflecting electrode 50 can be either connected to the positive end of the arc power supply, or grounded, or set up at floating potential which would be also positive with respect to the arc cathodes due to the higher mobility of the positive ions across the magnetized plasma confined in a longitudinal magnetic field. Three types of baffle 50 with different lengths can be used depending on processing requirements: a short baffle 50*x*, a medium length baffle 50*y* and a long baffle 50*z*. The short baffle 50*x* can be installed between the back wall of the plasma duct chamber and a point between the center of plasma duct 44 and the entrance of the tunnel section. The medium length baffle 50*y* ends within the tunnel section of the plasma duct chamber. The long baffle 50*z* ends flush with the exit window of the tunnel portion 46 of the filtered cathodic arc source 1. A separation of the opposite vapor plasma flows generated by the two primary cathodic arc sources of the unidirectional dual filtered cathodic arc plasma source allows the production of nanolaminated coatings by exposing the rotating substrates 4 in turn to the plasma flows generated by opposite primary cathodic arc sources equipped with different targets 12 (e.g. Ti and Cr, Ti and Al etc.). When the dividing baffles 50 are removed, the two opposite plasma flows generated by the primary DCAD sources with cathode targets of the same or different composition are mixed in the exit tunnel area, forming a uniform unidirectional plasma stream for deposition of a wide variety of single component or multi-elemental nanocomposite coatings.

The embodiment of FIG. 4*e*, which provides the unidirectional dual filtered cathodic arc source 1 installed at the coating chamber 42, thus provides a chain of anodes: proximal anodes 18 local to the cathodes 12; medial anodes such as anode separators 50*x*, 50*y*, or 50*z*; a focusing electrode 23 (shown in FIGS. 4*a*-4*d*) contained within the exit tunnel portion 46 of the plasma duct; and distal anodes such as the anode 70, which may be disposed anywhere within the coating chamber 42. These anodes combine to create a desired dispersion of electrons and a uniform plasma cloud in the vicinity of the substrates 4. The anodes could be connected to independent power supplies; however, this would result in high power consumption. The chain of anodes can alternatively be connected to the same power supply and rastered. Ionization of the plasma is maximized in the vicinity of an active anode, and rastering through the chain of anodes in this fashion allows for considerable conservation of power while maintaining a high plasma ionization level and mixing the plasma throughout the apparatus to create uniform plasma immersed environment.

In filtered cathodic arc apparatus shown in FIG. 4*e* the pair of rectangular deflecting coils 20 are mounted on opposite sides of the rectangular plasma duct, each of the coils 20 is positioned in front of the cathode chambers 90, while the focusing coil 21*a* surrounds the exit portion of the plasma duct adjacent to the coating chamber 42. Optionally additional deflecting coil 21*b* is mounted behind the plasma duct. The current conductors of the deflecting coils 20 are aligned along the edges of the rectangular plasma duct. It can be seen that the pair of offset deflecting coils 80 are installed around the cathode chambers 90 in off-set position in relation to the plasma duct chamber 44. The deflecting magnetic field created by offset deflecting conductors 80 is coupled with the deflecting magnetic field created by the deflecting coils 20 and focusing magnetic field created by focusing coil 21*a* surrounding the exit tunnel portion 46 of the plasma duct chamber, which can advantageously work together to deflect the metal vapor plasma flow from the primary cathode targets 12 toward substrates 4 to be coated installed on carousel substrate holder 2 in a coating chamber 42 with minimal vapor plasma transport losses. The additional deflecting coil 21*b* can be also used to tune the deflecting magnetic field lines and increase the outcome of the vapor plasma flow toward substrates to be coated 4 installed in a coating chamber 42.

FIG. 4*f* illustrates a variation of the embodiment of FIG. 4*e*, in which two filtered cathodic arc sources 1*a* and 1*b*, each containing a pair of cathodes 12, positioned at the entrance of the opposite cathode chambers 90, are provided on both sides of the coating chamber 42. This embodiment can be used for plasma immersed treatment of substrates 4, by selectively deactivating the deflecting coils 20, the offset deflecting coils 80, and focusing coil 21 of the filtered cathodic arc source 1*a* on one side of the coating chamber 42. When all plasma sources respectively associated with cathodes 12 are active, plasma streams are generated in both filtered cathodic arc sources 1*a* and 1*b*. However, while the vapor plasma stream generated on the side of active coils 80, 20, and 21 of filtered cathodic arc source 1*b* is directed into the coating chamber 42 by the deflecting and focusing magnetic fields generated by the deflecting coils 20, offset deflecting coils 80, and focusing coils 21, the particulate (metal vapor plasma) component of the plasma stream on the side of the inactive deflective coils 20, offset deflecting and focusing coils 80, 21 of filtered cathodic arc source 1*a* remains largely confined within the cathode chambers 90 optionally using load lock shutters 83 to close off filtered cathodic arc source 1*a* from the coating chamber 42, there being no magnetic driving influence for metal vapor plasma on that side of the coating chamber 42. The load lock shutters can be provided with openings which are impermeable for the heavy particles such as ions and neutrals to enter into plasma coating chamber 42 but permit electrons to flow into coating chamber 42. The cathodes 12 on the side of the inactive coils 20, 80, and 21 thus serve as powerful electron emitters, improving ionization of the gaseous component of the plasma flowing past shutter 83 and into the coating chamber 42, and significantly improving the properties of the resulting coating. The offset positions of the offset deflecting coils 80 of the filtered cathodic arc source 1 allow for minimization of the plasma transport losses and securing the maximum deposition rates of the filtered cathodic arc coating deposition process.

FIG. 4*g* illustrates another variation of the embodiment of the sources for plasma assisted electric propulsion of present invention shown in FIG. 4*e*, utilizing a single 3D saddle-shaped deflecting coil 80 embracing the deflecting section of the plasma duct 44 of the filtered cathodic arc source assembly, generally having a shape of symmetrical rectangular prism, having two opposite sides, a back side farthest from the substrate chamber and a front side nearest to the substrate chamber, a top and a bottom sides parallel to the plane of rotation of the plasma flow, the exit tunnel section 46 being rectangular and attached to the front side of the plasma duct along a plane of symmetry of the plasma duct, and at least one cathode chamber 90 being attached to one of the opposite sides of the plasma duct 44. In this case the deflecting conductors 80*a* and 80*b* are parallel to the edges of the deflecting section of the plasma duct 44 adjacent to the cathode chambers 90 and the exit tunnel section 46 of the plasma duct 44. In one variation of the embodiment of the invention shown in FIG. 4*g*, the deflecting conductors 80*a* and 80*b* are align along the front walls of the cathode chambers 90 facing the deposition chamber (not shown) adjacent to the cathode sources flanges 112 where the cathode arc sources are attached (not shown) in off-set position relative to the plasma duct chamber 44. Alternatively, the deflecting conductors 80*a* and 80*b* can be aligned generally along the edges of the deflecting section of the plasma duct 44 adjacent to the cathode chambers 90 and the exit tunnel section 46 of the plasma duct 44. The closing conductors 80*c* and 80*d* are align generally parallel to the top and the bottom flanges of the deflection section of the plasma duct 44 which are parallel to the plane of rotation of the plasma flow generating in cathode chambers 90. The saddle-shape deflecting coil, similar to one which was previously described in (former) Soviet Union invention SU1240325 issued Nov. 30, 1984 to Gorokhovsky et al., which is incorporated herein by reference, generate both a toroidal and a poloidal deflecting magnetic fields which can further reduce the diffusional plasma losses in the direction transversal to the direction of the plasma flow and increase the efficiency of plasma transport toward substrates to be coated in a substrate chamber (not shown). The toroidal magnetic field is generating by the deflecting conductors 80*a* and 80*b* to direct the plasma flow from the cathode chambers 90 into the plasma duct 44 whilst the closing conductors 80*c* and 80*d* are generating the poloidal magnetic field to suppress the diffusional plasma losses in the direction transversal to the plane of rotation of the plasma flow. The focusing coil 21 is positioned around the tunnel portion 46 facing the substrate chamber (not shown). The preferable directions of electric current in the offset saddle-shaped deflecting coil 80 and the focusing coil 21 are shown by the arrows in FIG. 4*g*. FIG. 4*h* illustrates a variation of the embodiment shown in FIG. 4*g* in which the 3D saddle-shape offset deflection magnetic system is formed by a double-coil arrangement 80 comprising the proximate deflecting linear conductors 80*a* aligned in off-set position along the front walls of the cathode chambers 90 facing the substrate chamber (not shown). The offset distal closing linear conductors 80*b* of the offset deflecting coils 80 are disposed behind the plasma duct chamber 44 close to each other so that the magnetic fields generating by the linear conductors 80*b* are annihilating and the topology of the resulting deflecting magnetic field generating by the pair of the offset deflecting coils 80 in the filtered cathodic arc source of FIG. 4*h* is almost identical to the deflecting field generating by the single 3D offset deflecting coil of FIG. 3*g*.

FIG. 4*i* illustrates another variation of the embodiment of the sources for plasma assisted electric propulsion of present invention shown in FIG. 4*g* comprising of rectangular proximate offset deflecting coil 80 disposed in front of the cathode chambers 90 parallel to the focusing coil 21. In this arrangement the proximate deflecting linear conductors 80*a* and 80*b* are aligned in off-set position in relation to the plasma duct 44 along the front walls of the cathode chambers 90 facing the substrate chamber (not shown). Optionally, a distal offset deflecting coil (not shown) can be provided behind the plasma duct 44 parallel to the proximate deflecting coil 80. The distal deflecting coil should be disposed at a larger distance from the back side of the cathode chambers 90, which distance exceeds the distance between the coil 80 and the side 90*a* of the cathode chambers 90 nearest to the substrate chamber 10. The polarity of the proximal offset deflecting coil 80 is the same as that of the focusing coil 21, while the polarity of the distal offset deflecting coil is opposite to the coil 80.

In the further preferred embodiment of the sources for plasma assisted electric propulsion of present invention shown in FIG. 4*j* the deflection portion 44*a* of the plasma duct 44 may have a shape of a symmetrical rectangular prism. FIG. 4*j* illustrates a variation of the embodiment shown in FIG. 4*h* comprising a pair of deflecting coils 20 which linear conductors are aligned along the ribs of the prism-shaped deflection portion 44*a* of the plasma duct 44 forming a 3D saddle-shape deflecting magnetic system generally geometrically similar to the form of the prism-shaped deflection portion of the plasma duct 44*a*. In addition, there is a pair of offset deflecting coils 80 surrounding the exit portions of the cathode chambers 90, with a proximate deflecting linear conductors 80*a* adjacent to the side of the cathode chamber 90 nearest to the substrate chamber (not shown) and the distal closing deflecting conductors 80*b* adjacent to the side of the cathode chamber 90 farthest from the substrate chamber (not shown), which allow to start bending the vapor plasma flow generating by the cathodes 12 within the cathode chambers 90 yet contributing to suppressing the diffusional plasma losses in a transversal direction to the plasma flow toward walls of the cathode chambers 90 and plasma duct 44. The proximate deflecting linear conductors 80*a* are aligned in off-set position along the front walls of the cathode chambers facing the substrate chamber 10, parallel to the deflecting conductors 20*a* and to the focusing coil 21, while their respective offset distal closing linear conductors 80*b* are positioned at a substantial distance behind the back walls of the cathode chambers 90 farthest from the substrate chamber 10 so as to have a lesser magnetic influence on the plasma stream within the cathode chamber 90 than their associated deflecting conductors 80*a*. To maximize the suppression of the transversal diffusional losses of plasma the distance between the offset proximate deflecting conductor 80*a* and offset distal closing deflecting conductor 80*b* should be chosen from the condition that the midpoint between linear conductors 80*a* and 80*b* is disposed within the cathode chamber 90. In this case a saddle-shaped concave magnetic field will be generated both in the downstream portion of the cathode chamber 90 nearest to the substrate chamber 10 and in the upstream portion of the cathode chamber 90 farthest from the substrate chamber 10. The frustoconical targets 12 are surrounded by magnetic steering and focusing coils 13. The deflection section 44*a* having a triangular prism shape is positioned between the dashed lines within the plasma duct 44. In this embodiment the cathode chambers 90 are attached to the side walls of the deflecting section 44*a* of the plasma duct 44; the axes of the cathode chambers 90 are forming an acute angle with the plane of symmetry of the plasma duct 44. The said angle is typically ranging from 20 to 90 deg, but most likely from 30 to 90 deg and even more precisely from 45 to 90 deg. When the angle between axes of the cathode chambers 90 and the plane of symmetry of the plasma duct 44 is reducing the closing conductors 20*b* and 80*b* are becoming close to each other which results in a reduction of the closing deflecting magnetic field generating by the distal closing linear conductors 20*b* and 80*b*.

In the embodiments of the invention utilizing the rectangular filtered cathodic arc source, the deflecting portion 44*a* of the plasma duct 44 has a shape of a rectangular prism. The prism can be of rectangular cross-section as a parallelepiped or having a trapezoidal cross-section. The deflecting portion 44*a* of the plasma duct with prismatic geometry may have different cross-sections, but they should be symmetrical in relation to the plane of symmetry of the plasma duct. The deflection coils 20 have their linear conductors aligned generally parallel to the edges of the prism-shaped volume of the deflecting section 44*a* of the plasma duct 44 surrounding the deflection portion of the plasma duct 44*a* creating a 3D frame generally geometrically similar to the shape of the prism-shape deflection portion of the plasma duct 44*a* while the focusing coil 21 is surrounding the exit tunnel portion 46 of the plasma duct adjacent to the substrate chamber 10 produces the focusing magnetic field 166. The linear current conductors of the deflecting coils 20 are forming a 3D saddle-shape frame with a shape of a rectangular prism or a prism having different cross-sections geometrically similar to the shape of a prism-shaped deflection portion 44*a* of the plasma duct 44, retaining a mutual plane of symmetry with the plasma duct 44. Therefore, the prism-shape 3D frame defined by the linear current conductors of deflecting coils 20 is generally geometrically similar to the shape of the deflecting portion 44 of the plasma duct. Up to 50% deviation of the geometrical similarity between the 3D frame shape formed by the linear conductors of the deflecting coils 20 and the shape formed by the edges of the deflecting portion 44*a* of the plasma duct 44 is still acceptable, but it is preferable that this deviation does not exceed 30%. The proximate linear deflecting conductors 80*a* of the saddle-shape deflecting coil are adjacent to the front side of the cathode chambers 90 facing the substrate chamber or they are adjacent to the cathode chamber 90 and plasma duct 44, whilst the distal linear deflecting conductors 80*b* are aligned either adjacent to the back sides of the cathode chambers farthest from the substrate chamber or adjacent to the back side of the plasma duct. The distance between the distal linear deflecting conductors 80*b* and the back sides of the cathode chambers 90 or the back side of the plasma duct 44 is greater than the distance from the proximate deflecting conductors 80*a* and the front side of the cathode chamber 90.

FIG. 4*k* illustrates one exemplary hybrid coincided filtered arc-magnetron sputtering deposition apparatus 340 that is a further variation of the embodiment of the system shown in FIG. 4*j*. In deposition apparatus 340, the primary metal vapor plasma sources in dual filtered cathodic arc plasma source 1 are cathodic arc sources with cathode targets 12 installed in two opposite cathode chambers 90. Deposition apparatus 340 further includes magnetron sputtering sources 245 that are magnetically coupled with dual filtered cathodic arc source 1 and are positioned by the exit of tunnel portion 46 of plasma duct 44 in substrate chamber 10 such that magnetron sputtering flow 215 is focused to the same spot on substrate holder 2 as vapor plasma flow 165. Metal vapor plasma 165 generated by filtered arc source 1 is focused by focusing coil 21, resulting in coincided deposition of a mixture of 100% (or nearly 100%) ionized metal vapor plasma flow 165 together with generally neutral metal atomic magnetron sputtering flow 215. In deposition apparatus 340, the steering of cathodic arc spots at the surface of the frustoconical cathode target 12 is provided by a pair of steering and focusing coils 13 consisting of one steering coil 13*a* upstream of the target 12 and one focusing coil 13*b* downstream of the target 12. Without departing from the scope hereof, deposition apparatus 340 may include additional coils to steer and/or focus the cathodic arc spots. A deflecting coil 20 is installed adjacent to cathode chamber 90 and plasma duct deflecting section 44 to deflect metal vapor plasma flow 165 within deflection section 44 from the cathode chamber 90 toward tunneling exit section 46 where it is focused by focusing coil 21 toward substrates 4 on substrate holder 2 in coating chamber 10. Focusing coil 21 is installed adjacent to coating chamber 10 and exit tunnel section 46. The directions of currents in magnetic coils 13*a*, 13*b*, 20, and 21 are indicated by arrows.

Sputtering cathode targets 245*a* of the magnetrons 245 face substrates 4 in such a manner that metal sputtering flow 215 generated by the magnetrons 245 is directed toward substrates 4 effectively overlapping the metal vapor plasma flow 165 generated by dual filtered cathodic arc source 1. Accordingly, deposition of metal sputtering flow 215 and metal vapor plasma flow 165 onto substrates 4 may coincide both spatially and temporally. The focusing magnetic field force lines 166, generated by the focusing coil 21, overlap a portion of magnetron magnetic field 166*a* nearest to focusing coil 21. Focusing magnetic field lines 166 and magnetron magnetic field lines 166*a* overlap and are co-directional. In refinement, the anode grids 70*a, b* can be installed in front of the magnetron targets 245*a, b* of the coincided magnetrons 245 adjacent to the opposite sides of the plasma duct exit tunnel 46 to further enhance the ionization and activation of the magnetron sputtering flow as illustrated in FIG. 4*k*1. The anode grids 70*a, b* can be in a form of wire array or set of ribs as was previously considered in embodiments shown in FIGS. 3*m*, 3*m*1. The anodes 70*a, b* can be powered by the power supplies 31*a, b* which negative pole is connected to the proximate cathode target 12. Vapor plasma flow 165 overlaps sputtering metal atomic flow 215 of the magnetron sputtering sources 245 to enabling coinciding deposition of (a) a fully ionized metal vapor plasma generated by filtered arc source 1 and (b) generally neutral metal sputtering flow generated by magnetron sources 245, with controlled ionization of the resulting hybrid filtered arc-magnetron sputtering flow at the surface of substrates 4. The controlled ion-to-(ion+atom) ratio may range from 0 to 100% by independently controlling the ion flux of metal vapor plasma 165 generated by filtered cathodic arc source 1 and metal atomic sputtering flux 215 generated by magnetrons 245. The ionization rate of the metal sputtering atoms in conventional DC magnetron sputtering flow is very low, generally below 0.1% of the sputtering atoms. The hybrid filtered cathodic arc-magnetron sputtering flow generated by deposition apparatus 340 overcomes this drawback of the conventional magnetron sputtering by providing a controllable ionization rate of metal vapor plasma ranging from 0% to 100%. Deposition apparatus 340 may accomplish this controllable ionization rate by adjusting vapor plasma flow 165 and/or sputtering metal atomic flow 215. Deposition apparatus 340 may adjust vapor plasma flow 165 by balancing the ion current output of the filtered cathodic arc source 1 by changing the cathodic arc currents or by operating the deflecting system of filtered cathodic arc source 1 in a pulse mode (magnetic shutter mode) with duty cycle ranging from 0% to 100%. Deposition apparatus 340 may adjust sputtering metal atomic flow 215 by varying the power applied to magnetron source 245 to control the output of the generally neutral sputtering metal atomic flow 215. Alternatively, or in combination therewith, deposition apparatus 340 may adjust sputtering metal atomic flow 215 through use of optional mechanical shutters (not shown) to periodically close off sputtering targets 245*a*. These mechanical shutters (not shown) may also function to protect magnetron target 245*a* from coatings deposited from vapor plasma flow 165 when cathode targets 12 and targets of magnetrons 245 are made of different materials. The ionized metal vapor flow is known to be beneficial for the coating quality by increasing the density of the coatings, improving adhesion of the coatings to the substrates, reducing the roughness of the coatings and reducing the density of the coating defects via intense ion bombardment of the substrate surface during coating deposition process.

In one embodiment, schematically shown in FIG. 4*k*, filtered vapor plasma source 1 additionally includes an array of stream baffles 185 positioned at the exit of the cathode chamber 90 adjacent to the entrance of the deflecting section of the plasma duct 44 where the metal vapor plasma flow 165 is deflected toward coating chamber 10. Stream baffles 185 trap macroparticles to further improve the macroparticles trapping capability of deposition apparatus 340, especially for trapping charged nanoparticles electromagnetically confined within filtered vapor plasma flow and not trapped by walls baffles. Although not shown in FIG. 4*k*, the apparatus of FIG. 4*k* may include wall baffles such as those shown in FIGS. 1*a*, 3*h-j*, and 4*e*, without departing from the scope hereof. In another embodiment, deposition apparatus 340 includes separating anode 50 (as shown in FIG. 4*j*) for trapping macroparticles. In yet another embodiment, deposition apparatus includes both stream baffles 185 and separating anode 50. Without departing from the scope hereof, each of the embodiments shown in FIGS. 4*j*, 4*k*, 4L may include stream baffles 185, wall baffles 55, and/or separating anode 50.

FIG. 4L illustrates, in schematic plan view, one exemplary hybrid coincided filtered arc-magnetron sputtering deposition apparatus 350 that utilizes rotating tubular magnetron targets. Deposition apparatus 350 is an embodiment of deposition apparatus 340. Deposition apparatus 350 implements each magnetron sources 245 with a stationary magnetic yoke 13*a* and rotating tubular targets 245*a* that are magnetically coupled to the filtered arc source 1. In deposition apparatus 350, rotating cylindrical magnetron targets 245*a* envelop stationary magnetic yoke 13*a* oriented toward substrates 4. The direction of rotation of cylindrical targets 245*a* is shown by arrows. Such tubular magnetrons with rotating cylindrical targets have substantially greater utilization rate than that of the planar magnetron targets. The direction of the sputtering metal atomic flow 215 generated by the tubular magnetrons 245 of deposition apparatus 350 coincides with the direction of metal vapor plasma flow 165 generated by dual filtered cathodic arc source 1.

In refinement, the primary cathodic arc sources 12 installed in the cathode chambers 90 of the dual filtered arc deposition source 1, can be rotary cathodic arc sources 12 utilizing rotating tubular targets 245*a* with arc trigger 14 as illustrated in FIG. 4L1.

FIG. 4*m* illustrates one exemplary hybrid coincided filtered arc-magnetron sputtering deposition apparatus 360 that is a variation of the embodiment of FIG. 4*f* further including magnetrons in coating chamber 42. In deposition apparatus 360, two filtered cathodic arc sources, 1*a* and 1*b*, are provided on opposite sides of coating chamber 42. Each filtered arc source contains (a) a pair of cathode targets 12, positioned by the entrance of opposite cathode chambers 90, (b) magnetic steering coils 13*a* located upstream of cathode target 12, (c) focusing coil 13*b* located downstream of the cathode target 12, (d) deflecting coil 20 located at the entrance of plasma duct deflection section 44, (e) and focusing coil 21 surrounding exit tunnel section 46 of the plasma duct. Deflecting coil 20 includes (a) linear deflecting conductor 20*a* adjacent to cathode chamber 90 and to plasma duct 44 proximate to the wall of cathode chamber 90 that faces coating chamber 42 and (b) closing conductor 20*b* positioned distant from the wall of the cathode chamber 90 that faces away from the coating chamber 42.

Deposition apparatus 360 may be used for plasma immersed treatment of substrates 4, by selectively deactivating deflecting coils 20 and focusing coil 21 of filtered cathodic arc source 1*b* on one side of the coating chamber 42. When all plasma sources associated with cathode targets 12 are active, metal vapor plasma streams are generated in both filtered cathodic arc sources 1*a* and 1*b*. However, while the metal vapor plasma stream generated on the side of active coils 20 and 21 of the filtered cathodic arc source 1*a* is directed toward the coating chamber 42 by deflecting and focusing magnetic fields generated by deflecting coils 20 and focusing coils 21, the metal vapor plasma component of the plasma stream on the side of the inactive deflective coil 20 and focusing coil 21 of the other filtered cathodic arc source 1*b* remains largely confined within the cathode chambers 90. This selective deactivation of deflecting coils 20 and focusing coil 21 of filtered cathodic arc source 1*b* represents a magnetic shutter mode that cuts off the metal vapor plasma output of the filtered cathodic arc source 1*b* from the coating chamber 42 since there is no magnetic driving influence for metal vapor plasma on that side of coating chamber 42. The cathodes 12 on the side of the inactive coils 20 and 21 thus serve as powerful electron emitters for remote arc discharges between cathode targets 12 and remote anode 70 in coating chamber 42. This remote arc discharge improves ionization of the gaseous component of the plasma flowing past the exit tunnel section 46 and into coating chamber 42, and significantly improves the properties of the resulting coating.

Coating chamber 42 includes radiation heater 75. An electrostatic probe for measuring plasma density and IR pyrometer for measuring substrate temperature during coating deposition process are installed to flanges 85 at coating chamber 42. Substrates 4 are installed at the satellites of the rotational substrate holding turntable connected to the bias power supply (not shown) for negatively biasing substrates to be coated during coating deposition process.

Deposition apparatus 360 includes two pairs of magnetron sputtering sources 245 installed in coating chamber 42 at the exit of tunnel portion 46 of each opposite dual filtered cathodic arc sources 1*a* and 1*b*. Each magnetron source 245 is magnetically coupled with the focusing magnetic field generating by the focusing coil 21 at the exit of the tunnel portion of the filtered arc source. The pair of magnetron sources 245*c* and 245*d* is magnetically coupled with dual filtered cathodic arc source 1*a* while the pair of magnetron sources 245*e* and 245*f* is magnetically coupled with rectangular dual filtered cathodic arc source 1*b*. As shown in FIG. 4*m*, the metal atomic sputtering flows 215 generated by the pair of magnetron sources 245*c* and 245*d* coincides with the metal vapor plasma flow generating by the adjacent dual filtered cathodic arc source 1*a* having its deflected magnetic coils activated (when the magnetic shutter is open). At the opposite side of the chamber 42 the metal atomic sputtering flows 215 generating by the pair of magnetron sources 245*e* and 245*f* coincides with the electron current of the remote arc discharge generating by the adjacent dual filtered cathodic arc source 1*b* having its deflected magnetic coils not activated (when the magnetic shutter is closed). In both cases the magnetron sputtering deposition process is enhanced either by metal ion flux or by electron flow resulting in improved density and other functional properties of the coatings.

The deflection of the magnetic force lines inside of the cathode chamber 90 can be also achieved, for example, by using the offset deflecting electromagnet shown in FIG. 5 as an offset deflecting coil 80 (or 81). In this case the ferromagnetic core made of laminated magnetic steel surrounds the tubular cathode chamber 90 downstream of the cathode 12. The magnetic coils 80 (or 80 and 81) provide a magnetic field directed toward the substrate chamber 10 inside of the cathode chamber 90. This magnetic field, together with the focusing magnetic field generating by the focusing coil 13*b* of the primary cathodic arc source, provide a resultant magnetic field which directs the metal vapor plasma stream toward substrate chamber 10 even before it leaves the cathode chamber 90. In addition, this electromagnet surrounding the exit portion of the cathode chamber can provide magnetic rastering of the filtered arc vapor plasma flow by superimposing an alternating magnetic field transversal to the deflecting magnetic field. This can be accomplished by applying an alternating current to the rastering magnetic coils as shown in FIG. 5.

The group of FIGS. 6*a-f* illustrate different designs of the cathodic arc sources which may be installed as a primary metal vapor sources in the cathode chambers of the unidirectional dual filtered cathodic arc source shown in the group of FIGS. 4*a-m*. The primary cathodic arc source installed in the cathode chamber 90 may be similar to the plasma source described in U.S. Pat. No. 3,793,179 issued Feb. 19, 1974 to Sablev, which is incorporated herein by reference. This plasma source utilizes a circular cylinder or frustoconical target 12. To cover a large area coating zone, several cathodic arc chambers 90 which are enveloping cylindrical or conical targets 12 may be installed in opposing walls of the plasma duct 44 as shown schematically in FIG. 9*a*. In a preferable embodiment of this design, the primary cathodic arc source target 12, powered by the primary arc power supply 19, is frustoconical as illustrated in FIG. 6*a*. In reference to FIG. 6*a*, the stabilizing or steering coil 13*a* is installed surrounding the conical cathode target 12 and has the same polarity as the focusing coil 13*b* positioned downstream of a cathode target 12 and the optional offset deflecting coil 80 surrounding the cathode chamber 90 downstream of the focusing coil 13*b* near the exit section of the cathode chamber 90 where the cathode chamber 90 is connected to the plasma duct 44 (shown in FIGS. 4*a* through 4*f*). The magnetic field streamlines 158 in the vicinity of the cathode target 12 have an acute angle relative to the side surface of the primary cathode target 12, which results in a moving of cathodic arc spots along helical trajectories from the back side of the frustoconical target 12, where an igniter 12*a* is striking the cathode target 12 to ignite the arc creating arc spots toward the front evaporation surface of the target 12. The metal vapor plasma stream 160 generated at the evaporating butt-end surface of the conical target 12 is deflecting toward plasma duct 44 (shown in FIG. 3*a*) by the magnetic field streamlines 160*a* generated by the deflecting linear conductor 20*a* of the deflecting magnetic coil 20 of the plasma duct 44 and optionally by the deflecting conductor 80*a* of the offset deflecting coil 80 around the corner 90*a* of the cathode chamber 90 facing the coating chamber (shown in FIG. 3*a*) followed by further propagating throughout the deflecting section 44*a* of the plasma duct toward the coating chamber.

FIG. 9*a* illustrates a perspective view of embodiment of the sources for plasma assisted electric propulsion of present invention utilizing several pairs of primary cathodic arc sources with cylindrical or conical cathode targets 12 and steering and focusing coils 13, which are installed in the several cathode chambers 90 in the opposing side walls of the deflecting portion of the plasma duct chamber 44. The deflecting portion 44*a* of the plasma duct chamber 44 may have a shape of parallelepiped, rectangular or triangular prism or a prism of a different cross-section, symmetrical in relation to the plane of symmetry of the plasma duct 44. A pair of offset deflection coils 80 adjacent to the cathode chambers 90 along or in combination with deflection coils 20 surrounding the deflection portion of the plasma duct 44 (not shown) can be used for deflecting the metal vapor plasma flow generated by multiple primary cathodic arc cathodes 12 surrounded by steering and focusing coils 13. The resulting plasma flow will be deflected in a deflecting portion 44*a* of the plasma duct 44 and continue flow toward substrate chamber (not shown) throughout exit tunnel section 46 (shown in FIG. 3*a*), where it will focus toward substrates to be coated (shown in FIG. 3*a*) by the focusing coil 21 (shown in FIG. 3*a*). The positions of the cathode targets 12 disposed at the opposite walls of the deflection section 44*a* of the plasma guide 44 can be displaced to each other by the distance between the center of the corresponding cathode targets 12 ranging from 50 mm to 200 mm in the direction transversal to the plane of rotation of the plasma flow in deflection section 44*a* of the plasma duct 44 to compensate for the centrifugal drift of the vacuum arc plasma jets in a curvilinear magnetic field. The optional rastering coils can be also attached to each of the cathode chamber 90 to raster a vapor plasma flow in a direction transversal to the plane of rotation of the vapor plasma flow, which allows to improve the uniformity of plasma distribution across the plasma duct 44 when plurality of cathode chambers with relatively small frustoconical or disc-shaped cathode targets 12 are used as a primary sources of metal vapor plasma. The electromagnetic rastering coils similar to one shown in FIG. 5 can be installed near the end of the cathode chambers 90 for rastering the vapor plasma flow. Alternatively, a chain of rastering coils 87 can be installed, which include a top rastering coil 87*t* disposed above the top cathode chamber 90*t* and a bottom rastering coil 87*d* disposed under the bottom cathode chamber 90*u* as well as a number of intermediate coils 87 positioned between the neighbor cathode chambers 90 parallel to the plane of rotation of the plasma flow, wherein the front rastering conductors 87*a* are positioned near the end of the cathode chamber 90 adjacent to the plasma duct and the closing conductors 87*b* are positioned away from the plasma duct, and preferably behind the cathode target 12, such that the magnetic field generated by closing conductor 87*b* will not disrupt the magnetic steering of the cathodic arc spots on evaporating surface of the cathode targets 12, as shown schematically in FIG. 9*a*. When the coils 87 are activated in sequence, one after another, a neighbor one, the rastering magnetic field directed transversal to the plane of rotation of the metal vapor plasma flows will be created in cathode chambers 90 for rastering the multi-jet plasma flows in the plasma duct 44. The global view of the large area coating deposition system which incorporates the design of embodiment of the sources for plasma assisted electric propulsion of present invention shown in FIG. 9*a* is presented illustratively as an example in FIG. 9*b*.

Referring again to the group of FIGS. 6*a-f*, the primary cathodic arc source can be of rectangular design, as was described in U.S. Pat. No. 4,724,058 issued Feb. 9, 1988 to Morrison, which is incorporated herein by reference. In reference to FIG. 6*b*, the cathode target 12 can be rectangular plate or disc covering the coating zone, in part or entirely. A stabilizing coil 13*a* is positioned upstream of the cathode target plate 12, while a focusing coil 13*b* is positioned downstream of the cathode target plate 12 spaced from the surface of the target 12. The polarity of the stabilizing coil 13*a* is opposite to the polarity of the focusing coil 13*b* which is the same as the polarity of the optional offset deflecting coil 80 surrounding the cathode chamber 90 downstream of the focusing coil 13*b* and deflecting coil 20 adjacent to the cathode chamber 90 and deflecting section 44*a* of the plasma duct 44 (shown in FIG. 3*a*). The steering coil 13*a* creates arch-shape magnetic field 158*a* above the target 12, while the focusing coil 13*b* creates focusing magnetic force lines 158*b* forming a focusing magnetic cusp directed downstream of the cathode target 12 toward exit of the cathode chamber 90. Under the influence of the steering magnetic field which has streamlines 158*a* forming an acute angle at the periphery of the target plate 12, the cathodic arc spots move from the periphery of the target plate 12 toward its central area while at the same time moving along the border of the plate due to retrograde movement effect of the cathodic arc spots in a cross j×B field, where current density j has a direction of the vacuum arc current, which is perpendicular to the surface of the target 12. The vapor plasma stream 160 generated at the evaporating surface of the planar target 12 is further deflected by the magnetic field streamlines 160*a* generated by the deflecting coil 20 of the plasma duct (shown in FIG. 3*a*). It is turning metal vapor plasma toward coating chamber (shown in FIG. 3*a*) around the corner 90*a* of the cathode chamber 90 facing the coating chamber (shown in FIG. 3*a*) along the curvilinear magnetic field generated by linear deflecting conductor 20*a* facing the coating chamber (shown in FIG. 3*a*). Optionally, the metal vapor plasma starts turning toward coating chamber already within the cathode chamber 90 by the magnetic field produced by the linear conductor 80*a* of the offset deflecting coil 80 toward exit tunnel section of the plasma duct (shown in FIG. 3*a*). Optionally, a plurality of a generally coaxial stabilizing and steering coils 13*a* can be installed upstream of the planar cathode target 12 as illustrated schematically in FIG. 3*n* (coils 37,38,39), each of these coils is activated in turn providing a sweeping move of an arch-like steering and stabilizing magnetic field 158*a* at the evaporating surface of the cathode target 12 widening the erosion corridor and increasing the cathode target utilization rate. The planar cathode targets 12 used in rectangular primary cathodic arc sources can be of segmented design utilizing a bar segments of different elemental metals and/or alloys as shown schematically in FIG. 6*c*. The passive board may be used to restrict the area of magnetically steered cathodic arc spot movement. This design allows for a flow of multi-elemental metal vapor plasma created from a set of segments made from many different elemental metals or from alloys having a fewer number of elemental metals. The multi-elemental metal vapor plasma produced by evaporation of segmented multielemental targets will enter the plasma duct 44 turning into its exit tunnel portion 46 along the curvilinear magnetic force lines and will be mixed at the exit of exit tunnel section 46 forming a uniform multi-elemental metal vapor plasma flow at the entrance into the coating chamber 10 (shown in FIG. 3*a*).

In reference to FIG. 6*a*, cathode target 12 is installed in an offset position in relation to the exit portion of the cathode chamber 90, shifted away from the coating chamber (shown in FIG. 3*a*). This positioning is beneficial for achieving a higher output of the metal vapor ion flow 160 after the metal ions are passing the offset deflection coil 80 along the deflecting magnetic force lines 160*a* turning around the deflecting conductor 80*a* proximate to the coating chamber (shown in FIG. 3*a*) in the direction downstream of the cathode chamber 90, around its corner 90*a* facing coating chamber toward the exit tunnel section 46 of the plasma duct 44. In this setup, metal vapor plasma flow 160 starts turning toward the coating chamber already in cathode chamber 90 which is illustrated by the distribution of the metal vapor plasma flow lines 160. The offset position of cathode target 12 helps improve transport of metal vapor plasma flow 160 around the corner from cathode chamber 90 into plasma duct 44 in the direction toward the coating chamber.

FIG. 6*d* illustrates a variation of the FIG. 6*b* embodiment, wherein the primary cathodic arc source utilizes a rotating cylindrical target 12. Magnetic steering system 13*a*, implemented as a magnetic yoke, is enveloped within an evaporating cylindrical target tube 12*x*. In this embodiment, evaporating tubular cylindrical target 12*x* is positioned in the cathode chamber 90 upstream of the focusing coil 13*b*, while stationary magnetic steering system 13*a* is positioned immediately behind the evaporation area of cathode target 12*x* where metal vapor plasma stream 159 is generated by the vacuum cathodic arc process. The evaporating target-tube 12 is rotating around its axis as shown by the arrow in FIG. 6*d*. The cathodic arc discharge may be ignited by means of mechanical striker 12*b* driven by a spring coil 12*c* or, alternatively, by a laser igniter (shown in FIG. 3*a*). Shields 12*s* may be optionally provided to protect against arc spots escape from the evaporating area in front of the magnetic yoke 13*a*. This design has an advantage of increased target utilization rate.

FIG. 6*e* illustrates another variation of the FIG. 6*b* embodiment, wherein the cathode target 12 is provided with a heater 12*h* which allows heating the cathode target up to 1000° C. Such heating of cathode targets is beneficial when the cathode target material has high resistance at low temperature, but the resistance is decreasing when target temperature is increasing. Examples of such cathode target materials include boron and silicon and other materials having electrical conductivity near the level of the metallic conductivity necessary for running the vacuum arc discharge when their temperature exceeds 900° C. Cathode heater 12*h* is positioned immediately behind the cathode target 12 between cathode target 12 and steering coil 13*a*. The cathodic arc discharge may be ignited by striking the evaporating surface of the cathode target 12 by means of mechanical striker 12*b* driven by spring coil 12*c* or, alternatively, by a laser igniter (shown in FIG. 3*a*). An optional cathode shield 12*f* may be also provided as a barrier to prevent the cathodic arc spots from escaping the evaporating surface of cathode target 12. In one embodiment, cathode heater 12*h* is smaller than cathode target 12, thus providing a heated evaporating area smaller front surface area of target 12. In this embodiment, the peripheral area of target 12 where the temperature is lower has much higher electrical resistance and therefore serves as a barrier confining the cathodic arc spots within the hot evaporating area of cathode target 12.

FIG. 6*f* illustrates another variation of the FIG. 6*b* embodiment wherein the primary cathodic arc source includes stream baffles. In FIG. 6*f*, cathode chamber 90 houses the primary cathodic arc source having cathode target 12 powered by a primary arc power supply 19*a*. Arc steering coil 13*a* is positioned upstream of a cathode chamber 90 (behind cathode target 12), and focusing coil 13*b* is positioned downstream of a target 12. In this embodiment, cathode chamber 90 further includes an array of stream baffles 175 positioned across at least a portion of cathode chamber 90 downstream of cathode target 12. The metal vapor plasma stream 159 generated at cathode target 12 (*a*) propagates between the baffles 175, (b) is focused by a focusing field 158 created by focusing coil 13*b* toward the deflection section of the exit of cathode chamber 90, and (c) is further focused toward deflection section 44*a* of plasma duct 44 (shown in FIG. 3*a*) by deflecting magnetic force lines 160*a*, while macroparticles and neutral metal atoms are trapped by the baffles 175. The off-set deflecting coil 80 is optionally positioned downstream of focusing coil 13*b*, which allows beginning deflection of the metal vapor plasma stream 160, generated by cathode target 12, toward plasma duct 44 of the filtered arc source (shown in FIG. 3*a*) already within the cathode chamber 90. Offset coil 80 includes deflecting linear conductor 80*a* positioned near the front wall 90*a* of the cathode chamber 90 facing the coating chamber 10 (shown in FIG. 3*a*), proximate to the front wall 90*a* of the cathode chamber 90, while its closing linear conductor 80*b* is positioned distant from the back wall of the cathode chamber 90 facing away from the coating chamber 10 (shown in FIG. 3*a*). Offset coil 80 deflects metal vapor plasma stream 160 generated by cathode target 12 along cathode chamber 90 toward its exit around the corner where front wall 90*a* connects to deflection section 44*a* of the plasma duct 44 (shown in FIG. 3*a*).

Generally, stream baffles 175 may be positioned anywhere between the cathode 12 in a cathode chamber 90 and the exit of the tunnel portion 46 of the plasma duct 44 (shown in FIG. 3*a*). In one example, stream baffles 175 are installed in front of cathode target 12 in cathode chamber 90, as illustrated in FIG. 6*f*, typically spaced from the cathode target surface by a distance of 1 cm to 10 cm. Stream baffles 175 installed downstream of a cathode target 12 may have a positive potential in reference to the cathode 12 or be insulated and have a floating potential. When installed in front of cathode target 12, as shown in FIG. 6*f*, stream baffles 175 may be floated or serve as additional anode, powered by a power supply 19*b*, to improve the stability of cathodic arc spots on cathode target 12 and therefore reduce the probability of extinguishing the vacuum arc discharge. Installation of stream baffles 175 too close to the cathode target 12 surface (e.g., less than 1 cm) may cause extinguishing of the arc spots and/or overheating of the stream baffles 175. When stream baffles 175 are installed at the distance greater than 10 cm from the cathode target 12 surface, their influence on arc spot steering and sustainability of the vacuum arc process is found to be negligible. The metal vapor plasma 159 generated by cathode target 12 is propagating generally parallel to the axis of cathode chamber 90 at distances close to the surface of cathode target 12 and freely penetrates the array of stream baffles 175 along the gaps between the stream baffles 175. Next, metal vapor plasma 159 is focused toward the exit of the cathode chamber 90 along magnetic force lines 158, created by focusing coil 13*b*, and optionally deflected by offset coil 80 around the corner where front wall 90*a* connects to deflection section 44*a* of the plasma duct 44 (shown in FIG. 3*a*).

In a further embodiment of the sources for plasma assisted electric propulsion of present invention illustrated in FIG. 7*a*, the plasma duct chamber 44 is tubular. It comprises a plasma deflection portion 44*a* of the plasma duct chamber 44 and a focusing tunnel section 46 with primary cathode chambers 90 attached radially around the periphery of the deflection portion 44*a* of the plasma duct 44. The tunnel section 46 preferably has a smaller diameter than that of the plasma deflection section 44*a* by a step 90*c* of the corner of the deflection section 44*a* adjacent to the cathode chamber 90 and facing the coating chamber (shown in FIG. 3*a*). A focusing coil 21 surrounds the exit tunnel section 46 of the plasma duct chamber 44 to focus the deflected plasma stream 160 toward substrate chamber (shown in FIG. 3*a*)). The offset deflecting coils 80 surround the exit portion of each of the cathode chambers 90. The offset deflecting coils 80 have the same polarity as the focusing coil 21 creating a magnetically confined plasma corridor all the way from the target 12 throughout the cathode chamber 90 and the deflecting portion 44*a* of the plasma guide 44, and further along the tunnel focusing portion 46 of the plasma guide 44 toward substrates to be coated in a substrate chamber (not shown); the direction of the magnetic field streamlines 160*a* are on the same of side of the plasma guide facing the substrate chamber with a downstream portion of a bidirectional magnetic cusp directed toward the substrate chamber. An additional correctional coil 140 having opposite polarity to the focusing coil 21 may be optionally installed behind the plasma duct chamber 44, to deflect the magnetic streamlines directed toward substrate chamber. Baffles to trap macroparticles (shown in FIG. 8*d*) can be optionally installed both along the walls of the cathode chambers 90 downstream of the cathode targets 12 and along the walls of the plasma duct chamber 44.

In refinement, the exit tunnel portion of the plasma duct 46 shown in FIG. 7*a* can be made in a form of readily disconnected bolted flanged assembly as illustrated in FIG. 7*a*1, utilizing the tubular plasma duct tunnel 46 consisting of half-nipple with water-cooled fins 922, providing with the flange 913*a* on entry side for connection to the plasma deflection portion 44 of the plasma duct or directly to the primary cathodic arc camber 90 shown in FIG. 7*a*. In the plasma duct assembly 46, the flange 913*a* is bolted to the counter flange 917 of the deflecting section 44 of the plasma duct (shown in FIG. 7*a*), having the seal 913*c*, for example, in a form of Buna O-ring or Viton O-ring, positioned in the groove of the flange 913*c* for vacuum sealing the bolted flange connection of the tunnel section 46 to the deflection section 44 of the plasma duct. The opposite side of the tunnel section 46 has built-in (typically welded) flange 920 having the same OD as the exit section 46 of the plasma duct 46. The intermediate flange 911 can be connected to the tunnel section 46 by bolt 911*e*, which is vacuum-proof by the vacuum seal 911 in a form of Buna O-ring or Viton O-ring, positioned within the groove in the flange 911*a*. At the same time, the flange 911 can be connected to the counter flange 915 of the vacuum processing chamber 10*a* which is vacuum-proof via vacuum seal 911*d* (typically in a form of O-ring made of rubber, Buna or Viton elastomers). When the flange 911 is disconnected from the tunnel section 46 of the plasma duct, one or more focusing magnetic coils 21 can be placed, surrounding the OD side of the tunnel portion 46 of the plasma duct. The tubular wall-baffle 55, electrically isolated from the plasma duct 46 and optionally connected to the positive pole of additional arc power supply to ensure that the potential of this wall-baffle 55 is greater than that of the near-by plasma, is provided with macroparticles trapping pattern having saw-shape local cross section with each teeth of it having open angle $\alpha<45°$. The wall-baffle 55 is aligned along the walls of the tunnel portion 46 of the plasma duct for trapping neutrals and macroparticles while repelling the positively charged metal ions. If the angle between the baffle's teeth $\alpha>45°$, the effectiveness of macroparticles trapping is not sufficient, while at $\alpha<45°$, the effectiveness of macroparticles trapping is near 100%.

FIG. 7*a*2 illustrates a further variation of the embodiment of the sources for plasma assisted electric propulsion of present invention shown in FIG. 7*a*1 in which the primary cathodic arc source 34 is connected to the input tubular housing 10*a* of the processing chamber 10 (shown in FIG. 4L) via intermediate tubular plasma guide 320. The primary cathodic arc source 34 comprises the cathode chamber 90 with frustoconical cathode target 12 consisting of the evaporative target 12*a* attached to the extension conical base 12*b*. The mechanical igniter 14 driven by pneumatic actuator or, alternatively, by spark pulse plasma source, ignites the primary arc discharge at the bottom of the conical extension base 12*b*, after which the cathodic arc spots are moving toward the evaporation segment 12*a* according to the acute angle rule of cathodic arc motion, driven by magnetic steering in the direction of the acute angle between external focusing and steering magnetic field lines created by magnetic coil 13 and side surface of the conical extension base 12*b* and frustoconical target 12*a* toward top evaporative side of the cathode target 12*a*. The initial reduction of the macroparticles generated along with the metal vapor plasma by the cathode target 12*a* is trapped by the wall-baffles 55*a* positioned along the walls of the primary cathodic arc chamber 90. The primary cathodic arc source 34 is attached to the tunnel portion 46 of the coaxial tubular plasma guide 320, consisting of the electrically biased wall-baffles 55*b* positioned along the walls of the plasma duct 46, water-cooled by water-cool fins 922 and coaxial magnetic island 59 (optionally water-cooled), consisting of permanent magnet or electromagnetic coil to generate coaxial magnetic field coincided with magnetic field generating by external deflection magnetic coil 20 surrounding the entrance portion of the plasma duct 46 and focusing magnetic coil 21 surrounding the exit portion of the plasma duct 46. The plasma duct 46 is provided with wall-baffles 55*b*, while the magnetic island 59 is provided with baffles 55*c*, which are positively biased in relation to near-by plasma, for trapping macroparticles and repelling the positive metal ions. The tubular wall-baffle 55*b*, surrounding the magnetic island 59 as well as outer side of the magnetic island 59 are electrically isolated from the plasma duct and optionally connected to the positive pole of additional arc power supply, while its negative pole is connected to the arc cathode 12. The wall-baffles 55*b* and 55*c* are provided with macroparticles trapping pattern having saw-shape local cross section with each teeth having open angle $\alpha<45°$. Both magnetic island 59 and wall-baffles 55*b* are electrically biased positively in relation to the near-by plasma potential to repel positively charged metal ions while trapping negatively charged macroparticles. The metal vapor plasma generating by the primary cathodic arc source 34 is deflecting at the entrance 44 of the plasma guide 320, flowing around the magnetic island 59 within the gap between the baffles 55*b* and baffled side surface of the magnetic island 59, focusing within the exit tunnel 46 of the plasma guide 320 by the focusing coil 21 toward entry housing 10*a* of the vacuum processing chamber 10 (shown in FIG. 4L).

The sources for plasma assisted electric propulsion of present invention shown in FIGS. 7*a*1 and 7*a*2 don't necessary to be of tubular shape with circular cross-section but can be also be of rectangular cross section. For instance, the primary cathodic arc source 34 shown in FIG. 7*a*2 can be rectangular, utilizing the rectangular target as shown in FIG. 6*b* or rotary cylindrical target as shown in FIG. 6*d*. The magnetic island 59 in this rectangular design is also rectangular blocking the aperture for macroparticles and neutrals generated by the vacuum arc evaporating process and providing a magnetically guided passage for metal vapor plasma.

FIG. 7*b* illustrates a still further variation of the embodiment of the sources for plasma assisted electric propulsion of present invention shown in FIG. 7*a* in which the metal vapor plasma deflection system comprises a pair of offset deflecting coils 80 and 81 surrounding the deflection portion 44*a* of the plasma duct chamber 44 on opposite sides of all cathode chambers 90. The proximal offset deflecting coil 80 is attached to the side 90*a* of the cathode chambers 90 facing the substrate chamber (shown in FIG. 3*a*)), while the distal offset deflecting coil 81 is positioned behind the cathode chambers 90 distant from the cathode chamber back wall 90*b* facing away from the coating chamber The bidirectional cusp created by the coils 80 and 81 has a downstream portion directed toward the substrate chamber and upstream portion directed away from the substrate chamber. The distance between the distal offset deflecting coil 81 and the cathode chambers 90 is chosen to have a plane of symmetry of the cusp parallel to the axes of the cathode chambers 90 positioned within the cathode chambers 90 preferably within the portion of the cathode chamber 90 adjacent to the back wall 90*b* farthest from the substrate chamber (shown in FIG. 3*a*). The preferred variation of the embodiment of the present invention shown in FIG. 7*a* utilizes a multiple channel cylindrical filtered cathodic arc source design as illustrated in a plan view of embodiment of the sources for plasma assisted electric propulsion of present invention shown in FIG. 7*c*. It is appreciated that filtered cathodic arc plasma sources shown in FIGS. 7*a* and 7*b* can be of rectangular design with primary cathode chambers 90 attached to the opposite walls of the deflection portion 44*a* of the plasma duct chamber 44 and focusing coil 21 surrounding the entire exit tunnel portion 46 of the plasma duct chamber 44 (shown in FIG. 3*a*). In this case the axes of the axial symmetry of the tubular plasma duct will be replaced with the plane of symmetry dividing two opposite sides of the plasma duct chamber 44 (shown in FIG. 3*a*).

The unidirectional dual or multicathode filtered arc source can also serve as a powerful generator of reactive gaseous plasma used in a low pressure plasma assisted CVD (LP-PACVD) process. One way to accomplish this process stage is to use the primary cathodes 12 as electron emitters when the main and offset deflecting coils 20, 80, 81 are turned off and an auxiliary arc discharge is established between the primary cathode targets 12 and distant auxiliary anodes 70 as shown schematically in an embodiment of the sources for plasma assisted electric propulsion of present invention in FIG. 4*f*. Optionally the mechanically shutters (not shown) can be used to periodically close off the openings of the cathode chambers 90 interfacing the plasma duct 44. The shutters can be provided with openings which permit electrons to flow from the cathode chamber 90 into plasma duct 44, while completely blocking the heavy atomic particles such as ions, atoms, and other neutral particles from entering the plasma duct 44. Alternatively, additional gaseous plasma source can be attached to the back wall of the multi-cathode filtered arc source generally coaxial with the plasma duct 44 as shown in FIG. 7*d*. This gaseous plasma source has a discharge chamber 191 surrounded by coil 197 with thermionic cathode (or, alternatively, the hollow cathode) 192 heated by the heating power supply 193. The power supply 194 provides a negative potential of the cathode 192 in a reference to the ground which allows an arc discharge to be established in a chamber 191. A plasma carrier gas such as argon and a precursor metal-organic or halides reactive gases are supplied via gas supply lines 196. The stream of strongly ionized reactive gaseous plasma prepared in a chamber 191 enters the plasma duct 44 along its axes and merges the filtered vapor plasma incoming from the cathode chambers 90. This design provides a hybrid PVD+CVD deposition of multi-elemental multiphase coatings from the vapor flow consisting of metal vapor plasma in addition to reactive gaseous plasma. Instead of additional gaseous plasma source the hollow cathode or a set of hot cathodic filaments for generation of thermionic discharge can be positioned at the back side of the plasma duct chamber 44. It is appreciated that the vacuum arc cathode same as cathode 12 can be also used as an electron emitting source in the discharge chamber 191. The vacuum arc cathode can operate in almost any reactive gas atmosphere without degradation in a wide range of electron emitting arc currents from approximately 40 amperes up to 500 amperes. The cathodic arc source utilizing vacuum arc evaporating cathode can operate for a long time until the evaporating cathode target is consumed. The exit openings of the discharge chamber 191 can be also provided with mechanical shutter similar to that shown in FIG. 4*f*. This mechanical shutter (shown in FIG. 4*f*) should be impermeable for heavy particles such as ions and neutral particles generating by the electron emitting vacuum arc plasma source, but it should have openings, which permit electrons to flow via plasma duct 44 toward at least one distal anode 70 (shown in FIG. 4*f*) installed anywhere within the substrate chamber 42 (shown in FIG. 4*f*). To energize this remote arc discharge, the negative pole of the at least one power supply (not shown) should be connected to the cathode in the discharge chamber 191, while its positive pole is connected to the at least one distal anode 70 (shown in FIG. 4*f*) installed in the substrate chamber 42 (shown in FIG. 4*f*).

A still further variation of the embodiment of the sources for plasma assisted electric propulsion of present invention of the sources for plasma assisted electric propulsion of present invention dedicated for coating of internal surface of long tubular objects such as long metal tubes is shown in FIG. 7*e*. In this embodiment the substrate such as a long metal tube 541 is installed between (a) a tubular plasma generator 104, such as the one shown in FIG. 7*d* comprising one or more vacuum arc cathodes 12 in cathode chamber 90 or thermionic filament cathodes (or hollow cathodes) 192 installed in tubular plasma generator 104, on one side of tube 541, and (b) distal anode 551 installed in an anode chamber 106 on the other side of tube 541. Tubular plasma generator 104 includes one or more vacuum arc cathodes 12 in respective cathode chambers 90, and/or one or more thermionic filament cathodes (or hollow cathodes) 192. Tubular plasma generator 104 may be similar to the one shown in FIG. 7*d*, or be a variation of any one of the filtered cathodic arc sources shown in FIGS. 6*a*, 6*b*, 7*a*. Tube 541 is separated from tubular plasma generator 104 and anode chamber 106 by insulation spacers 501. The tubular solenoid 521 is optionally provided to generate a longitudinal magnetic field along the tube 541. The high negative voltage, in reference to the primary cathodes in the cathode chambers 90 and/or the cathode chamber associated with cathode 192, is provided to the tube 541 via terminal 531 connected to the negative pole of the high voltage power supply (not shown). In operation of the system shown in FIG. 7*e* the arc plasma is generated along the tube 541 between the cathodes installed in tubular plasma generator 104 and the anode 551 installed in anode chamber 106. The reactive gas such as methane, acetylene, silane, borazine, trimethylboron (TMB), trimethylsilane (TMS) metalorganic precursors or the mixture of reactive gases with argon is provided into the tube and high voltage pulses are applied to the tube via negative pole 531. The longitudinal magnetic field can be applied by solenoid 521 to increase the density and activity of the arc plasma environment inside the tube 541. The amplitude of high voltage pulses are ranging from 100 volts to 100,000 volts. Alternatively, the pulse arc discharge can be used to generate pulse arc plasma inside of the tube while negative high DC voltage is applied to the tube via terminal 531. In both cases the reactive species are decomposed and ionized in arc discharge plasma followed by deposition of different coatings such as diamond like carbon (DLC) coatings. Silicon coatings or ceramic coatings such as for example nitrides, oxides or carbides depending on reactive gas composition can be deposited on electrically biased internal surface of the tube.

FIG. 7*f* illustrates a variation of the embodiment of the sources for plasma assisted electric propulsion of present invention shown in FIG. 7*e* in which the arc plasma generator is replaced with high frequency (HF) plasma generator. Two HF electrodes 661*a* and 661*b* are installed at two ends of the tubular object 541 which internal surface is subjected to the coating deposition process. The HF electrodes are connected to HF generators 667 via dividing capacitors 665. In this embodiment of the invention the filtered cathodic arc plasma generator including a tubular plasma generator 104 on one side of the tube and the anode 551 installed in a plasma generator chamber 106 on the other side of the tube are used to generate an arc plasma column inside of the tube. The pulsed HF discharge with frequency ranging from 100 kHz to 10 GHz and preferably from 1 MHz to 3 GHz, is used for enhancing the plasma density inside the long tube 541. The HF generators 667 can be synchronized by using a common modulator which allows controlling the pulses of HF power generated by the generators 667 from 1 μs to 10 ms. The HF generators can generate a plasma column inside the long tube even without arc plasma discharge as illustrated in FIG. 7*g*. The high voltage bias pulses are applied to the tube 541 via negative pole 531. In refinement, the positive pulses can be also applied to the tube 541 via terminal 531 for electron bombardment of the internal surface of the tube 541.

In operation of the embodiment of the sources for plasma assisted electric propulsion of present invention shown in FIG. 7*g* for deposition of diamond-like carbon (DLC) coating, during the first, ion cleaning step, the argon as a plasma creating gas is injected along the tube to reach the operating pressure ranging from 0.1 mTorr to 100 mTorr. The high voltage high frequency pulses generated by the HF generators 667 are applied to HF electrodes 661 to generate the plasma column along the tube 541. The DC voltage ranging from 100 volts to 5000 volts is applied to the tube 541 by DC bias power supply (not shown), to accelerate argon ions and provide ion sputtering cleaning and conditioning of the internal surface the tube 541. This stage can last from 10 minutes to 2 hrs. During the second step the silane $SiH_4$ reactive gas-precursor is added to the argon with the partial pressure ranging from 0.001 to 0.5 of the total gas pressure. Silicon bondcoat is depositing on internal surface of the tube by attracting ionized fragments of silane molecules to the surface with ion energy ranging from 100 volts to 5000 volts. At the end of this stage the methane $CH_4$ gas-precursor can be added to the silane to for a gradient silicon carbide coating which is favorable to improve adhesion of the DLC topcoat layer. During the third step the mixture of argon with methane is used as a reactive gas atmosphere for deposition of DLC coating on internal surface of the tube 541.

FIGS. **7*f*1 through 7*f*6** illustrate a variation of the embodiments of the sources for plasma assisted electric propulsion of present invention shown in FIGS. 7*e*, 7*f* and 7*g*, which are dedicated for coating of internal surface of tubular objects such as tubes for oil transportation and gun barrels. In reference to FIG. **7*f*1, the vacuum vessel 1 consists of the grounded vacuum chamber 541 typically of tubular shape having a door flange 543 on one of its end for loading the tubular substrate to be coated 549. The position of the tubular substrate-to-be-coated 549 coaxial to the coating chamber 541 is supported by the set of ceramic bearings 542 securing electrical insulation of the tubular substrate 549 from the grounded chamber 541. The vessel 1 is divided in two compartments: the higher-pressure plasma processing compartment 1*c* is connected to the loading setup 106 comprising the door-flange 543 for loading the tubular substrate-to-be-coated and the remote anode chamber 1*b* with remote anode 551 positioned by the end of the chamber 541 near the loading flange-door 543 where the plasma-creating gas inlet 602 is also located; and the lower-pressure plasma generator compartment 118 comprising the primary arc chamber 109 with cathode 108 attached to the grounded primary arc chamber 109 in annular position. The primary arc chamber has pumping port connecting the chamber 541 to the pumping system (not shown). The higher-pressure compartment 1*c* is separated from the lower-pressure primary arc chamber 109 by the separating baffle 584 having a nozzle-opening 584*a* with minimal diameter ranging from 0.5 mm to 5 cm, but typically ranging from 1 to 30 mm. The sputtering electrode-target 583 made of different metals or a conductive composite material is placed coaxially to the tubular substrate-to-be-coated 549. The sputtering target 583 is connected to the DC power supply 535*b*, while, optionally, the sputtering of the target 583 can be powered by DC pulse power supply of RF power supply for DC pulse or RF sputtering deposition process. For the coating of internal surfaces of the gun barrels the sputtering target 583 can be made of Ta, while for deposition of low friction chemically inert DLC coating on ID surface of the oil transporting tube the sputtering electrode can be made of graphite or of composite material containing graphite doped with Teflon. The sputtering target 583 is, optionally, supported at its end opposite to the remote anode chamber 1*b* by a set of insulative washers 582 having gas-passage openings 582*a*. The coating deposition area is defined by the portion of the sputtering electrode 583 positioned inside of the tubular substrate 549. The external solenoid 521 is positioned coaxial to the tubular substrate-to-be coated 549 and, optionally coaxial to the tubular vacuum processing chamber 541 to create the longitudinal magnetic field with a strength typically ranging from 100 Gs to 1000 Gs, but usually within the range from 200 Gs to 500 Gs within the gap between the sputtering electrode 583 and the tubular substrate 549 to create the coaxial-magnetron type discharge for intensifying the sputtering coating deposition rate. The sputtering coating deposition process can be further enhanced by the remote arc plasma discharge conducting by the remote arc power supply 537 between the cathode 108 attached to the low-pressure primary arc chamber 109 and the remote anode 551 in the remote anode chamber 1*b*, protruding through the gap between the sputtering target 583 and tubular substrate 549, which allows to increase the plasma density in the coating deposition area within the gap between the sputtering target 583 and substrate 549 by the orders of magnitude. The cathode 108 used in this process is self-recreating cold hollow cathode consisting of the water-cooled cathode body 769 typically made of metal with high thermal conductivity such as high purity copper, having its internal water-cooled surface covered by the metal coating 767 with low boiling point and high saturated vapor pressure such as Bi, Ba, Cd, Ca, Yb, Sm, Se, Sb, or similar metal, while on the side of the primary arc chamber 109 the cathode cavity is closed by the floated diaphragm 761 made of refractory metal such as Mo, W, Ta, Hf, Nb or similar metal, separated from the water-cooled cathode cavity by ceramic spacer 763, typically made of BN ceramics, which allows to keep the flange 761 at high temperature exceeding the boiling temperature of the metal coating 767 covering the inner surface of the water-cooled cathode body 769 of the cathode 108, preventing the condensation of the vapors of the metal coating 767 with low boiling point and high pressure of saturated vapors from condensation on the surface of the hot flange-diaphragm 761, and ceramic insulator 763, while allow condensation of these metal vapors on water-cooled inner surfaces of the water-cooled cathode body 769, recreating this surface from erosion due to cathodic arc spots evaporation process, responsible for electron emission. In general, all internal surfaces of the cathode cavity 108 except for the inner surface of the water-cooled cathode body 769 must have a temperature greater than boiling temperature of the selected metals with low boiling point used for the metal coating 767, allowing condensation of the metal vapors of the low boiling point metal coating 767 only on the inner water-cooled surface of the cathode body 769, connected to the negative pole of the arc power supply 533, while repelling the vapors of the metal coating 767 and preventing their condensation at high temperature diaphragm 761 and insulator-spacer 763 as was originally proposed in U.S.S.R. Inventor's Certificate No. 289458 to Donin. In this design, the cathodic arc spots are generating on the surface of the metal coating 767 made of the metal with low boiling point, covering the inner surface of the water-cooled cathode body 769, effectively re-evaporating this metal coating 767 made of metal with high vapor saturating pressure, recycling this metal coating within the water-cooled cathode cavity 108 without consuming the material of the water-cooled metal wall 769, which extends the life time of the cathode 108 by orders of magnitude effectively providing self-sustaining, not consumable cold cathode arc plasma source. The diaphragm 761 typically consists of the flat plate 761***a* with the nozzle-opening 761*b* for conducting the primary arc current generating by the primary arc power supply 533 between the cathodic arc spots located on the inner surface 767 of the water-cooled cathode body 769, protruding through the opening 761*b* toward the grounded walls of the low-pressure primary arc chamber 109, while the remote arc discharge is expanding through the nozzle 584*a* in the separating baffle 584 followed by protruding through the openings 582*a* in the spacers 582, supporting the end of the target 583 and further protruding through the sputtering coating deposition gap between the target 583 and the tubular substrate 549 toward the remote anode 551. The heating of the diaphragm 761 and its nozzle-opening 761*b* is typically provided by the heat generated by arc discharge plasma propagating through the nozzle-opening 761*b*, nevertheless, the independent heating may be optionally provided by the auxiliary heater to maintain the high operating temperature of the diaphragm 761 and its nozzle-opening 761*b*, maintaining high temperature of the diaphragm 761 required for preventing the condensation of the high boiling point metal coating vapor independently of the heat generated by the arc plasma heating source as proposed in U.S. Pat. No. 5,587,207 to Gorokhovsky. In addition, the diaphragm 761 can be optionally provided with plurality of the nozzle-openings 761*b*, as proposed in U.S. Pat. No. 5,587,207 to Gorokhovsky. The diaphragm 584 with nozzle-opening 584*a* in addition to the optional set of the insulative supporting washers 582 with their openings 582*a* typically provide at least 2 times pressure drop between the coating compartment 1*d* and the primary arc chamber 109 in the low-pressure compartment 118, while the pressure inside of the cathode cavity 108 can be maintained at the level equal or smaller than that of the primary arc chamber 109. Typically the pressure inside of the cathode cavity 108 should be maintained within the range of 0.1 mTorr to 100 Torr. Pressure inside of the cathode cavity 108 less than 0.1 mTorr will result in excessive evaporation of the metal coating 767 of the metal with low boiling point, while the pressure inside of the cathode cavity 108 exceeding 100 Torr can slow down the fast motion of cathodic arc spots on the internal water-cooled surface 769 of the cathode cavity 108, which is detrimental for arc stability and longevity of the operation time of the cathode 108. To maintain the necessary low pressure inside of the cathode cavity 108 additional pumping port can be provided at the water-cooled side wall of the cathode cavity, as illustrated in the embodiment of the invention shown in FIG. 7*f*3. In this embodiment of the invention additional pumping port 771 is positioned at the water-cooled wall of the cathode cavity 108 separated from the cathode cavity by the mesh-metal screen 768 made of refractory metal such as Mo, W, Ta or a like. The screen 768 can be additionally provided with auxiliary heater (shown in FIG. 7*w*4) to maintain its temperature greater than the boiling point of the metal coating 767 to prevent condensation of the metal coating 767 vapors on the screen 768 as well as its penetration across the screen 768 through vacuum port 771 toward vacuum pumping system.

In a refinement, the apparatus 1 for sputtering coating deposition of the internal surface of tubular object shown in FIG. 7*f*1 is additionally provided with wire array anode composed of plurality of the metal wires 538 typically made of refractory metals such as tungsten, positioned parallel to the cylindrical sputtering target 583 within the gap created between the sputtering target 583 and inside surface of the tubular substrate-to-be-coated 549 as illustrated in FIG. 7*f*2. The wire anode electrodes 538 are holding by the wire holding brackets 538*a* attached to the sputtering target 583 via insulative ceramic spacers 538*b*. One of the wire holders 538*a* is connected to the positive pole of the magnetron sputtering power supply 535*b* while its negative pole is connected to the sputtering cylindrical target 583. Optionally the wire anode array is also connected to the positive pole of the intermediate remote arc power supply 535*c* via switch 539, while its negative pole is connected to the arc cathode 108 for enhancing the magnetron sputtering process by auxiliary remote arc plasma.

In operation, the tubular substrate 549 is loaded by reciprocal sliding at the ceramic bearings 542 through the opened door-flange 543 of the loading compartment 106. After the tubular target 549 is install in the processing position within the coating zone 1*c* the end of the sputtering target 583 facing the door flange 543 may be supported by the insulative brackets (not shown) to prevent its lever-shifting. The door-flange 543 is closed and the chamber 541 is evacuated to the ultimate vacuum typically below 1e-5 Torr. For deposition of thick metal coating on internal surface of the tubular substrate 549 the sputtering target 583 is made of the metal forming the requested coating composition. Argon as plasma-creating gas is supplied to the coating compartment 1*c* via gas supply line 602 to the pressure typically ranging from 1 to 100 mTorr while the pressure in the low-pressure primary arc chamber 109 is typically at least 2 times lower due to the hydraulic resistance of the nozzle opening 584*a* and optional openings 582*a*. The tubular substrate 549 is biased to the negative potential of −500V by the bias power supply 535*a* via sliding contact 536 for igniting the glow discharge for ion cleaning the internal surface of the tubular substrate 549. After the ion cleaning stage is completed, which typically takes from 10 min to 1 hr, the substrate bias is reduced to −50V and the cylindrical magnetron sputtering discharge is ignited within the gap between the sputtering target 583 and tubular substrate 549. The magnetic coil 521 is turned ON, creating the longitudinal magnetic field of about 300 Oe in the interelectrode gap between the sputtering target 583 and tubular substrate 549. The magnetron power supply 535*b* is turned ON to start magnetron sputtering discharge between the magnetron target 583 as a cathode and wire array 538 as an anode. Optionally, the remote arc discharge can be ignited to enhance the magnetron sputtering process by increasing ionization and activation of atomic species within the gap between the sputtering target 583 and tubular substrate 549. It starts from igniting the primary arc between the cathode 108 and the grounded walls of the primary arc chamber 109 serving as a primary arc anode, followed by ignition the main remote arc discharge between the cathode 108 and the remote anode 551 in the remote anode chamber 1*b*, initiating the remote arc current-carrying plasma propagating within the gap between the sputtering target 583 and tubular substrate 549. Optionally the switch 539 can be closed and additional (intermediate) remote arc plasma discharge can be ignited within the gap between the sputtering target 583 and tubular substrate 549 by the additional remote arc power supply 535*c* connected between the cathode 108 and the wire anode array 538, further strengthening the ionization and gas activation efficiency of the remote plasma within the deposition area. The coating deposition process is lasing until the specified coating thickness of the metal coating is deposited on the internal surface of the tubular substrate 549.

FIG. 7/3 illustrates a variation of the embodiments of the sources for plasma assisted electric propulsion of present invention shown in of FIGS. 7/1 and 7/2 dedicated for deposition of PVD coatings on internal surface of tubular objects utilizing tubular cathodic arc deposition source. In this design, the rod-shaped cylindrical cathode target 583 of the vacuum cathodic arc source is used instead of the magnetron sputtering target as a source of vapor plasma for the coating of internal surface of the tubular substrate 549. The rod cathode target 583 is positioned coaxial to the tubular substrate-to-be-coated 549 and equipped with igniter 594 for igniting the vacuum arc discharge. Two sensors 591*a* and 591*b*, typically ion collecting probes or optical sensors responding to the light spikes created when the cathodic arc spots appear near the probe's location, are positioned at opposite ends of the coating deposition area 1*d* to detect the cathodic arc spot appearance near one of the probe-sensors 591. The wire anode array 538 consists of refractory metal wires positioned along the axis of the substrate 549 within the gap between the cathode target 583 and substrate tube 549. The wire-anode electrodes are holding by the metal brackets 538*a* attached to the opposite ends of the cathode target 583 via insulative ceramic spacers 538*b*. The cathodic arc discharge plasma is created within the gap between the cathode target 583 and tubular substrate 549 when igniter 594 ignites the cathodic arc discharge between the rod-cathode target 583 and the wire array anode 538. This discharge is powered by the power supplies 535*a* and 535*b* which negative poles are connected to the opposite ends of the cathode-rod 583 via fast-responsive switches 592*a* and 592*b*, typically IGBT transistors, while the positive poles of arc power supplies 535*a* and 53*b* are connected to the wire anode array 538. In addition, the remote arc discharge can be created within the gap between the cathode target 583 and tubular substrate 549 by igniting the remote arc discharge between the cathode 108 in the low pressure compartment 118 and remote anode 551 in remote anode chamber 1*b*, powered by the remote arc power supply 537. Optionally, the cathode 108 can be also connected to the bracket 538*a* at the one end of the rod 583 to establish the intermediate remote arc discharge between the cathode 108 and wire array anode 538, powered by the intermediate remote arc power supply 535*c*, which is especially useful during the pre-deposition treatment of ID surface of tubular substrate 549 in remote arc gaseous plasma during ion cleaning, ion implantation and ionitriding. In operation, the cathodic arc spots, generated at the surface of the cathode target 583 by vacuum arc discharge process, are moving toward the end of the cathode rod 583 where one of two cathodic arc power supplies 535*a,b* is switched ON by closing one of the corresponding IGBT switches 592*a,b*, while keeping open the IGBT switch located at the opposite end of the cylindrical target 583. When the arc spots are detected by one of the sensors 591*a,b* near one of the ends of the cathode rod 583, the close-by IGBT switch, either 592*a* or 592*b*, is turned OFF while the other IGBT switch, located at the opposite end of the target 583 is turned ON, initiating the motion of the cathodic arc spots toward the opposite end of the cathode-rod 583, while magnetic steering of the cathodic arc spots in azimuthal direction around the cathode rod 583 is achieved by applying the longitudinal magnetic field generated by the external magnetic coil 521. Steering the cathodic arc spots along and around the cathode-rod 583, which is governed by the retrograde arc spots motion rule ["Handbook of Vacuum Arc Science and Technology", ed. by R. L. Boxman, D. M. Sanders, and P. J. Martin, Park Ridge, N. J.: Noyes Publications, 1995], results in uniform distribution of the metal or metal-ceramic coating along the internal surface of the tubular substrate 549, connected to the negative pole of the bias power supply 535.

FIG. 7/4 illustrate a variation of the embodiment of the sources for plasma assisted electric propulsion of present invention shown in FIG. 7/3, utilizing the anodic arc sensors 591*a* and 591*b* for detection of arc spots appearance near each end of the cathode target 583 either near the end of the target 583 facing the primary arc chamber 109 or near the opposite end of the cathode target 583 facing the remote anode chamber 1*b*. When the cathodic arc spots appear in the vicinity of one of the sensors 591*a, b*, large anodic current is conducted through one of the sensors 591*a, b* located in the vicinity of the cathodic arc spots creating a spike of arc current detected by the coaxial inductance current transformer sensors 592*d, c*. The anodic arc sensors 591*a, b* can be made of metal ring connected to the corresponding positive poles of the primary cathodic arc power supplies 535*a* or 535*b* via ballast resistors 592*e, f*, which are restricting the anodic arc current conducting through the sensors 591*a, b*. The spike of the anodic current detected by the anodic current sensors 592*c,d* trigger the IGBT switches 592*a,b*, which produce signals for switching the primary power supplies 535*a,b*, resulting in changing the direction of cathodic arc spots motion toward opposite end of the cathode target 583, hence providing the steering of the cathodic arc spots back-in-force along the cylindrical target 583, while arc spot steering in the azimuthal direction is provided by the longitudinal magnetic field generated by external coil 521.

FIG. 7/5 illustrates a variation of the embodiments of the sources for plasma assisted electric propulsion of present invention shown in FIG. 7/2, dedicated for deposition of PVD and PACVD coatings and plasma treatment of internal surface of tubular objects. In this design, the metal rod-electrode 583 which is inserted generally coaxially along the axes of the tubular substrate-to-be-coated 549 may be floated and serves as a holder of the array of multiple wire anodic electrodes 538 supported by the metal brackets 538*a* attached to the metal rod 583 via insulative ceramic spacers 538*b* near the opposite ends of the tubular substrate 549. The anodic wire electrodes 538 are connected to the positive terminal of the remote arc power supply 535*c* via metal bracket 538*a*, while its negative terminal is connected to the cathode 108 attached in annular position to the primary arc chamber 109. The rod 583 can be made of sputtering material and connected to the negative pole of the magnetron sputtering power supply 535*b* while its positive pole is connected to the wire anode array 538. The remote arc power supply 537 is installed between the cathode 108 and the remote anode 551 to conduct the remote arc discharge through the interelectrode gap between the target-electrode 583 and the internal surface of the tubular substrate-to-be-coated 549. Optionally, the RF generator can be also connected to the wire electrodes 538 via matching network unit and exit capacitor C, while inductances L are installed in the circuits of the intermediate remote arc power supply 535*c* and magnetron power supply 535*b* to protect them from RF signal. In operation, the intermediate remote arc discharge is ignited between the anodic wire electrodes array 538 and the cathode 108 while the main remote arc discharge can be optionally ignited between the cathode 108 and the remote anode 551. Optionally, the RF generator can be also turned ON providing additional RF power to the plasma discharge generated within the discharge gap between the rod 583 and ID surface of the tubular substrate 549. The tubular substrate-to-be-coated 549 is biased by DC or DC pulse power supply 535*a* to the requested negative bias potential to provide intense bombardment of the internal surface of the tubular substrate 549 by the ions generated by the remote arc discharge inside of the tubular substrate-to-be-coated 549. For example, this process can be used for deposition of Si-doped diamond like carbon (DLC) coating on ID surface of the tubular object 549. At the beginning, the remote arc plasma is ignited in Ar with additions of hydrogen and (optionally) oxygen, as plasma-creating gas mixture, during ion cleaning of the ID surface of the tubular substrate 549 by ion bombardment of the surface by gaseous ions of the remote arc discharge plasma. The total gas pressure in plasma coating compartment 1*c* during this technological stage is typically ranging from 20 mTorr to 1 Torr. The negative bias potential of the substrate 549 at this process stage is usually ranging from −300 to −500V. At the next stage the silane in mixture with argon as plasma-creating gas is supplied to the coating deposition area 1*c* via gas supply line 602 to deposit thin silicon interlayer having thickness typically ranging from 0.1 to 0.5 μm to secure adhesion of the Si-doped DLC film to internal surface of the tubular object 549. The negative bias potential during this stage, typically in DC-pulsed mode, is ranging from 300V to 5 kV. Finally, the Si-doped DLC coating is deposited by adding hydrocarbon gas precursor to the plasma-creating gas mixture within the coating compartment 1*c* via gas supply line 602. The gas pressure in the coating compartment 1*d* during deposition of Si interlayer and Si-doped DLC film is typically ranging from 20 mTorr to 100 Torr, but more exactly within the range from 50 mTorr to 10 Torr. Thickness of the Si-doped DLC films deposited on ID surface of the tubular objects 549 in remote arc plasma discharge is typically ranging from 0.5 to 10 μm.

Figure 9H:
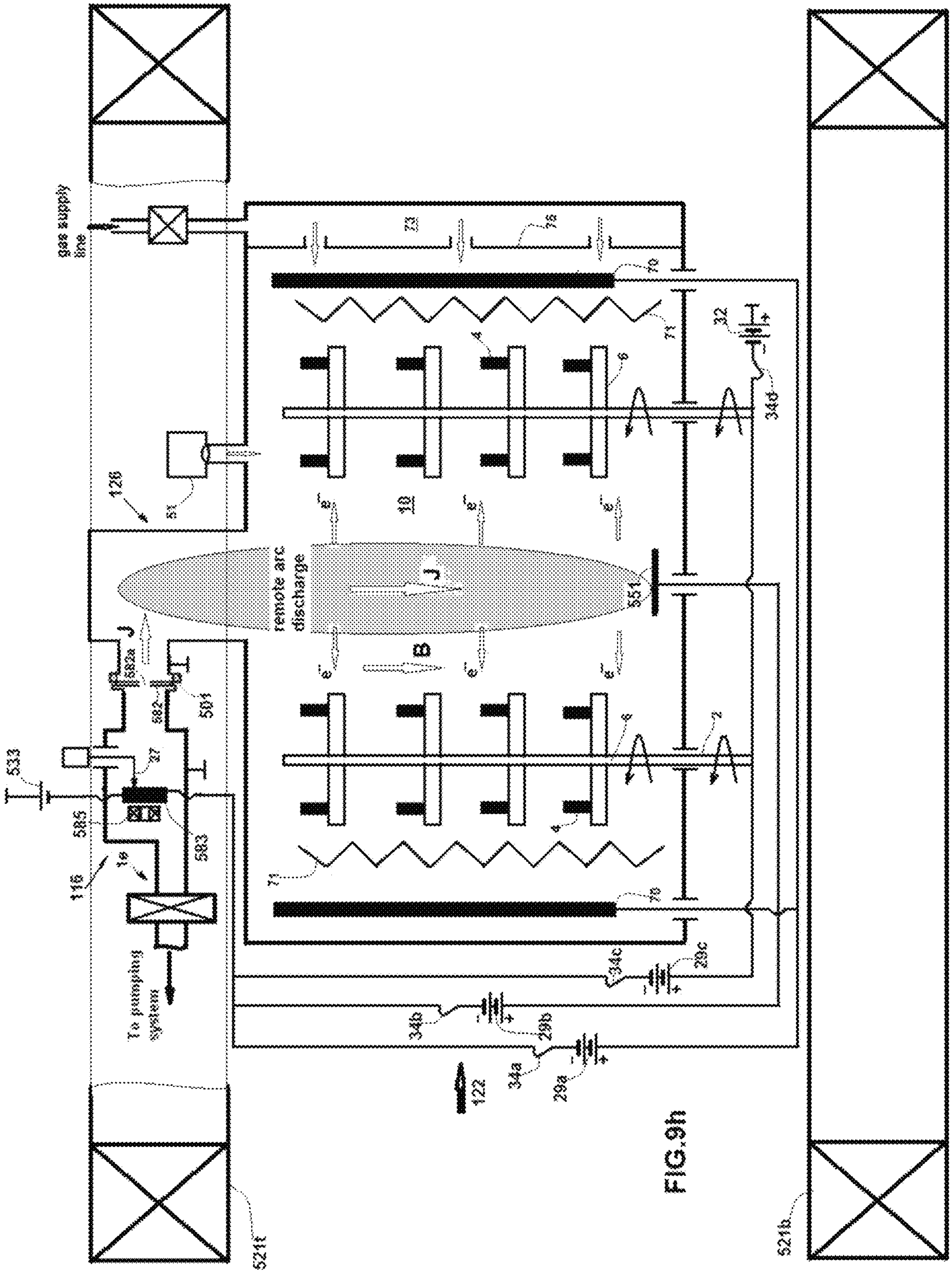

FIG. **7*f*6 illustrates the cathodic arc evaporator 1***e*, similar to one described in (G. L. Saksaganskiy, Electrophysical vacuum pumps, Energoatomisdat, Moscow, 1988, pg. 155, in Russian) with cylindrical rod-shaped target 583, which can be used for ID coatings in coating system arrangement shown in FIGS. **7*f*3, 7*f*4. In this vacuum cathodic arc metal vapor plasma generator the long cylindrical cathode target 583, which can be optionally water-cooled, is provided with two ring-anodes 538***a* and 538*b* positioned by the opposite ends of the cathode target 583 and spaced from the target 583 by electrically isolative ceramic spacers 538*c* and 538*d*. The optional one or more helical anode wires 538*e*, 538*f*, 538*g* are disposed coaxially to the target 583 with their ends connected to the corresponding ring-anodes 538*a* and 538*b*. The arc spot positioning anodic sensors 591*a* and 591*b* are positioned near the anode-rings 538*a* and 538*b* near the opposite ends of the cathode target 583. The arc positioning sensors 591 consists of anodic ring-sensors 591*e* and 591*f* enclosed within electrically isolated floated shields 591*c* and 591*d*, which may be optionally covered by ceramic insulation. The anodic ring-sensors 591*e* and 591*f* are connected to the anode-rings 538*a* and 538*b* via ballast resistors 592*e* and 592*f*, for restricting the anodic current conducting through the sensors 591*e* and 591*f*, having their conducting wires 592*i* and 592*j* routed through holes in the induction ring-transformer current sensors 592*c* and 592*d*. The arc ignition occurs when the igniter 594, typically driven by pneumatic actuator or spring-coil (not shown) strikes the target 583. The igniter 594 is connected to the anode 538 via ballast resistor 594*a*, typically ranging from 1 to 5 Ohm, which limits the current conducting through the igniter 594, preventing from cold-welding of the igniter 594 to the cathode target 583. The azimuthal steering of the cathodic arc spots can be achieved by coaxial external magnetic coil 521. In case when the cathodic arc source 1*e* is inserted into the tubular substrate-to-be-coated 549 (shown in FIG. **7*f*3) the magnetic coil 521 is positioned in coaxial position outside of the tubular substrate-to-be-coated 549 as shown in FIG. 7*f*3. The longitudinal magnetic field generating by the coil 21 along the cathode target 583 creates the motion of the cathodic arc spots in azimuthal direction around the target 583 as governed by the retrograde motion rule (Handbook of Vacuum Arc Science & Technology: Fundamentals and Applications edited by Raymond L. Boxman, David M. Sanders, Philip J. Martin, Noyes Publications, 1995). The steering of the cathodic arc spots along the cathode target 583 is achieved by switching the connection of the arc current to the opposite end of the cathode target 583, when cathodic arc spots are detected at one end. For instance, when the cathodic arc spots are located near the end 583***b* of the cathode target 583, which is indicated by the spike of current detected by the induction ring-transformer current sensor 592*d*, the controller 592*h* sends a signal to open the IGBT transistor switch 592*b* to disconnect the current from the power supply 535*b* and, at the same time to close the IGBT transistor switch 592*a* and connect arc current near the end 583*a* of the cathode target 583, changing the current direction along the target 583 toward opposite end 583*a*, which creates the azimuthal magnetic field around the circular target 583, driving the cathodic arc spots toward opposite end 583*a* of the target 583 per retrograde motion rule of cathodic arc spots. When the arc spots are detected near the end 583*a*, the controller 592*g* opens the IGBT transistor switch 592*a* and closes the IGBT transistor switch 592*b*, which is changing the direction of the arc current toward the opposite end 583*b* of the cathode target 583 resulting in retrograde motion of the cathodic arc spots toward opposite end 583*b* of the cathode target 583. The detection of the cathodic arc spots position near the ends of the cathode target 583 is indicated by a spike of anodic electron current conducting through the corresponding anodic-ring sensors 591*e, f* connected to the near-by arc anode rings 538*a, b* via current limiting ballast resistors 592*e, f*. The optional helical anode wires 538*e, f, g* cannot generate the azimuthal magnetic field interfering with cathodic arc steering along the target 583: they may only generate the longitudinal magnetic field parallel to the target 583, which may improve the azimuthal steering of the cathodic arc spots, complementary to the azimuthal steering providing by the external steering coil 521. Instead of the long magnetic coil 521 for azimuthal steering of the cathodic arc spots can be used a pair of short coils each positioned near the opposite ends of the target 583 as shown in FIGS. 9*g*, 9*h*.

FIG. 7*h* illustrates a variation of the embodiments of the sources for plasma assisted electric propulsion of present invention shown in of FIGS. 7*e*-7*g* dedicated for generation of energetic particles with energies ranging from 100 eV to 10 MeV. In reference to FIG. 7*h*, a tubular plasma generator 1 comprises a cathode chamber 108 with attached pumping system, a remote anode chamber 106 and a tubular plasma duct 1*c*, surrounded by magnetic solenoid 521. The shielded cathodic arc source is installed within the cathode chamber 108 which can also serve as a primary anode to sustain the primary arc discharge between the cathode 583 and the walls of the cathode chamber 108 serving as a primary anode. It is appreciated that the primary anode can be installed within the cathode chamber 108 isolated from the walls of the cathode chamber 108. The primary anode can be grounded or connected to the positive pole of the primary arc power supply 533. The cathodic arc source positioned in cathode chamber 108 comprises a cathode target 583 and a steering coil 585 disposed immediately behind the target 583 for steering the cathodic arc spots on the front side of the target 583. It is appreciated that the primary cathodic arc source in the cathode chamber can be also chosen from thermionic cathode source, hollow cathode source or other high current low voltage cathodic arc sources. The shield 581 is optionally installed in front of the cathode 583 to isolate the cathode from the plasma duct 1*c*. The shield 581 in front of the cathode 583 should be impermeable for heavy particles such as ions and neutral particles, generated from the cathodic arc spots on the front evaporating surface of the cathode target 583, but it has openings 581*a*, which permit electrons, emitted from the cathodic arc spots to flow into the tubular plasma duct 1*c* and continue its way further toward distal anode 551 installed within the anode chamber 106 which is vacuum sealed by the flange 552*a* to sustain the remote arc discharge along the tubular plasma duct 1*c*. The optional shield 581 in a cathode chamber 108 can have a shape of chevron with the gaps 581 between the neighbor strips preventing line-in-sight contact with the separating baffle 582 while the separating baffle 582 has at least one orifice 582*a* or an array of small holes about 0.1 mm to 5 cm in diameter as shown illustratively in FIG. 10*c*. The holes 582*a* in the separating baffle smaller than 0.1 mm can affect charge separation in plasma media while the holes 582*a* greater than 5 cm cannot produce a stationary shock-wave separation barrier across a holes 582*a* to secure high pressure high plasma potential in the remote anode plasma duct 1*c*, which is characterized by relatively small characteristic gas flow velocity, typically 3 times less than speed of sound at the gas temperature of the remote anode arc compartment and in most cases creating a stagnation zone with stationary plasma environment in the remote anode arc plasma duct 1*c*. At the same time, it keeps low pressure low plasma potential in the primary cathodic arc compartment 108, which is characterized by the high-speed plasma plume produced through the stationary shock-wave barrier developing across the orifice 582*a* with characteristic gas speed ranging from third of the speed of sound to 20 Mach, i.e. 20 times the speed of sound at the gas temperature in the remote anode plasma duct 1*c*. An optional separating wall 582, with at least one small opening 582*a* having diameter ranging from 0.1 mm to 5 cm, allows maintaining a pressure difference between plasma duct 1*c* and cathode chamber 108. The gas pressure in tubular or rectangular plasma duct 1*c* may range from 200 mTorr to 300 Torr (and, in pulse mode, up to atmospheric pressure), while the pressure in cathode chamber 108 may be less than 200 mTorr to allow operation of the primary vacuum cathodic arc source 583. In this case, the electron current of the remote arc discharge is conducting from the low-pressure area in the cathode chamber 108 toward the high-pressure area in the plasma duct 1*c* via bottleneck orifice 582*a* against gas flow directed from the anode chamber 106 toward cathode chamber 108. The voltage of the primary arc discharge in cathode chamber 108 is typically ranging from 20 to 50 volts, while primary arc current is ranging from 50 amperes to 500 amperes. The primary cathodic arc discharge is unstable when its voltage is less than 20 volts and typically does not exceed 50 V. The primary arc is typically getting unstable when the arc current is less than 50 amperes, while primary arc current exceeding 500 amperes will require unnecessary high consuming rate of the target which is not necessary for sustaining the primary cathodic arc discharge. It is appreciated that instead of the cathodic arc discharge with metal evaporating target the thermionic or hollow cathode arc discharge can be used. The remote arc discharge in the tubular plasma duct 1*c* is sustained by the electron current emitted from the primary arc discharge in the cathode chamber similar to one shown above in FIGS. 4*e*, *f* and 7*e*. The remote arc current and voltage are typically ranging from 50 to 10,000 amperes and from 30 to 500 volts respectively. The remote arc discharge current less than 50 amperes is not producing dense enough plasma for generating energetic particles while remote arc current exceeding 10000 amperes may trigger formation of anode spots within the plasma duct 1*c*, anode chamber 106 and cathode chamber 108 which will result in damage of reactor's components and extinguishing the discharge. The remote arc discharge is unstable when the discharge voltage is outside of the range within 30V<V (remote arc discharge) <500V. The tubular plasma duct 1*c* comprises the discharge tube 541 surrounded by magnetic solenoid 521. The discharge tube 541 is electrically insulated both from the cathode chamber 108 and from the anode chamber 106 by the insulators 501. In this embodiment of the invention, the discharge tube 541 is charged positively in reference to the primary cathode 583 in the cathode chamber 108 by connecting discharge tube 541 either to the positive terminal of the DC power supply 537 or to the unipolar pulse power supply 531 or both, while the negative terminals of the DC power supplies 537 and the pulse power supply 531 are connected to the primary cathode 583 in the cathode chamber 108. The unipolar pulse power supply 531, which is shown schematically in FIG. 7*h*, as an example, comprises the transformer 801, the rectifier 803 and the capacitor 805. When the switch 543 is closed the trigger 807 discharges the capacitor 805, generating the unipolar positive voltage pulses applied to the discharge tube 541 and the pulse arc current is conducting via remote arc discharge between the discharge tube 541 and the primary cathode 583. In a DC arc discharge mode, when the switch 543 is open and switch 539 is closed the secondary arc discharge is powered by the DC power supply 537 between the discharge tube 541 as a secondary anode and the primary cathode 583 in the cathode chamber 108.

Optionally, at least an additional intermediate anode 551*a* may be installed within the discharge tube 541 of the tubular plasma duct 1*c*, which may help extend the remote arc discharge in longer embodiments of tubular plasma duct 1*c* by effectively increasing the length of the remote arc discharge along the discharge tube 541 between the cathode 583 in the cathode chamber 108 and the remote anode 551 in the anode chamber 106. In a refinement, the igniting RF electrodes (not shown) may be also provided along the discharge tube 541 for triggering the remote arc discharge within long discharge tube 541. The blocking diodes 547 prevent the interference between power supplies 537, 531 and 549 in the discharge mode when all of these power supplies are operating simultaneously and switches 539, 543 and 545 are closed.

In a refinement, an array of thin wire anodes 591 is installed along the discharge tube 541 of the tubular plasma duct 1*c*. The wire anodes 591 can be straight wires parallel to the axes of the plasma duct 1*c* or have different shape such as helical or mesh cylinder coaxial to the plasma duct 1*c*. The wire anode array 591 can be connected to the discharge tube 541 as shown in FIG. 7*h* or, optionally, to the positive terminal of additional power supply. The wire anode array may be also connected to the unipolar pulse power supply 531 as illustrated in FIG. 7*h*. As shown illustratively in the cross-sectional view in FIG. 7*i*, the wire anode array 591 is disposed within the area 595 adjacent to the wall of the discharge tube 541 coaxially to the discharge tube 541 between the inner circle of the diameter d and the discharge tube of the diameter D, leaving the inner area 597 of the diameter d surrounding the axes of the discharge tube 541 unoccupied.

In operation, the primary arc discharge is established within the cathode chamber 108 between the primary cathode 583 and the grounded walls of the cathode chamber 108 powered by the primary arc power supply 533. Then the remote arc discharge is ignited along the discharge tube 541 of the tubular plasma duct 1*c* between the primary cathode 583 in the cathode chamber 108 and the remote anode 551 in the anode chamber 106, powered by the remote arc power supply 535. Initially, the switch 543 is opened, the switch 539 is closed and the walls of the discharge tube 541 together with attached array of the wire electrodes 591 are energized by the DC power supply 537 serving as intermediate remote anode. Optionally, the additional intermediate remote anode 551*a* is also energized by the additional DC power supply 549, when the switch 545 is closed. During this stationary remote arc discharge mode the plasma potential within the discharge tube is defined by the positive voltage applied to the discharge tube by the DC power supply 535, typically ranging from 30 to 500 volts. When the switch 543 is closed and high positive voltage pulses are applied to the discharge tube 541 together with the array of wire anodes 591, the plasma potential within the area 595, occupied by the array of the wire anodes 591, increases up to the amplitude of the positive pulses supplied by the pulse power supply 531. At the same time, within the inner zone 597, the plasma potential remains low as defined by the remote arc plasma column. This distribution of the plasma potential across the discharge tube 541 is illustrated graphically in FIG. 7*j*. In the example shown in FIG. 7*j* the plasma potential within the high voltage zone 595 reaches 1.5 kV as applied by the pulse power supply 531, while the plasma potential within the low voltage inner zone 597 remains approximately +100 V as defined by the plasma potential of the remote arc discharge plasma. The voltage amplitude of the positive high voltage pulses generated by the pulse power supply 531 typically ranges from 0.1 kV to 10 MV. The pulse voltage amplitude below 0.1 kV does not produce ions with necessary high energy while producing unipolar pulses with voltage amplitude exceeding 10 MV is impractical due to complexity of pulse power generator and insulation of the reactor's components. In a refinement, the remote arc low voltage high current potential can be applied to the discharge tube 541 only while the high voltage pulses are applied to both discharge tube 541 and wire electrodes array 591 which may protect the wire electrodes against overheating during the remote arc discharge mode. The current of the remote arc discharge is typically ranging from 50 A to 500 A, but may be increased up to 10 kA.

When the high voltage positive pulses are applied to the wire electrodes 591 immersed in the remote arc plasma, the plasma sheaths are created around each of the wire electrodes as illustrated by the circles surrounding the wire electrodes 591 in FIG. 7*i*. The value of the plasma potential within the plasma sheath areas surrounding the wire electrodes 591 is almost equal to the high voltage potential applied to the wire electrode by the pulse power supply 531. When the distance between the neighboring wire electrodes 591 in a wire electrode array is decreasing to the length comparable to the plasma sheath thickness, the plasma sheath areas surrounding the wire electrodes 591 overlap providing continuous uniform distribution of the high positive plasma potential within high voltage zone 595 adjacent to the discharge tube 541 as illustrated graphically in FIG. 7*j*. The diameter of the wire electrodes 591 is typically ranging from 0.01 mm to 1 mm. A wire electrode 591 diameter less than 0.01 mm may not be practical due to mechanical strength, whilst the wire electrodes 591 having diameters greater than 1 mm may capture high fluxes of electrons influencing plasma properties in the wire electrodes array zone 595. The distance d W between the neighboring wire electrodes 591 in the wire electrode array is typically ranging from 0.1 mm to 5 cm while the operating pressures of the remote arc discharge plasma are ranging from 0.001 mtorr to 100 torr. Distances between the wire electrodes less than 0.1 mm are not practical and will inflict large ion losses due to collisions of high energy ions with wire electrodes. When the distances between the neighboring wire electrodes exceed 5 cm it will require to apply more than 1 MV voltage for overlapping the plasma sheaths between the neighboring wire electrodes, which in most cases will be impractical. The preferable range of the distances between the wire electrodes 591 is from 1 mm to 1 cm. Keeping such distances between the neighboring wire electrodes 591 allows overlapping the plasma sheath areas between the wire electrodes 591 overlap at high voltage discharge mode providing uniform distribution of high positive plasma potential in the area 595 occupied by the wire electrode array 591. At the same time, distances between the neighboring wire electrodes 591 exceeding 0.1 mm are greater than the plasma sheath length surrounding the positively charged wire electrodes 591 during the remote arc discharge plasma mode. This allows the remote arc discharge plasma to expand from the central area 597 toward the walls of the discharge tube 541 providing uniform distribution of the plasma density across the discharge tube 541 during the period of time between high voltage impulses generating by the high voltage power supply 531 when the discharge tube 541 and wire electrodes 591 serve as an intermediate anode for the remote arc discharge. When the high plasma potential is established within the area occupied by the array of wire anodes 591, the positive ions from the high voltage zone 595 are accelerating toward the low voltage inner zone 597 surrounding the axes of the discharge tube 541, reaching the high kinetic energy at the level of the plasma potential within the high voltage zone 595, defined by the high positive voltage pulses generating by the pulse power supply 531. High energy ions are colliding within the low potential inner zone 597 releasing their kinetic energy in the collisions.

When the discharge gas is deuterium (D) or deuterium-tritium (D-T) mixture the fusion reactions occur by collisions of energetic ions within the inner zone 597 of the discharge tube 541, generating the high flux of energetic neutrons. 14.1 MeV neutrons are generating by D-T fusion reactions. In this case the plasma generator of this invention can serve as a thermonuclear fusion reactor to produce energy.

The gas pressure within plasma discharge tube 541 in operation is typically ranging from 0.001 mTorr to 100 Torr, but more preferably within the range from 0.01 mTorr to 30 Torr. When the pressure is less than 0.001 mtorr the process is ineffective due to low density of the reactive species in the reactor. When the pressure exceeds 100 Torr it creates too high energy losses of high energy ions by collisions of high energy ions generated within high voltage zone 595 with gas molecules, which reduces the energies of high energy ions reaching the central zone 597 of the reactor. To improve confinement of the remote arc plasma and accelerated ions, the external longitudinal magnetic field generated by the solenoid 521 is applied along the axes of the discharge tube 541, the magnitude of said magnetic field can be chosen to satisfy the following condition: $r_{ge}<d_w<r_{gi}$, where $r_{ge}$ and $r_{gi}$ are gyroradiuses of electrons and ions respectively. The plasma confining magnetic field is typically ranging from 0.01 T to 20 T. Magnetic field less than 0.01 T is inefficient for plasma confinement while magnetic field exceeding 20 T is impractical due to complexity of magnetic system and weight of the coil 521.

In FIG. 7*h* the plasma generator 1 is configured as a neutron generator proving the neutron reflecting cladding covering the inner side of the plasma discharge tube 541 walls 573 and the hollow remote anode 551 with the opening 552 for release of the neutron beam. The neutron reflecting cladding can be made of light materials such as graphite or beryllium or, alternatively, from heavy materials such as tungsten. The plasma generator 1 shown in FIG. 7*h* can be also used as an ion laser discharge tube as illustrated in FIG. 7*y*. In this case the laser mirrors 652*a* and 652*b* are installed at the opposite ends of the plasma duct 1*c* along the axes of the cascade discharge tube 541. The powerful laser beam may be generated in Ar or Kr plasma utilizing the energy of ion collisions within low potential central discharge zone 597 (shown in FIG. 7*i*). In this case the cathode chamber 108 with attached pumping system is installed to the side wall of the discharge tube perpendicular to the axes of the plasma duct 1*c* to prevent obstruction to alignment of laser optics as illustrated in FIG. 7*y*. The laser mirrors 652a and 652*b* can be also installed outside of the discharge chamber to prevent the influence of arc plasma on mirror surface. In this case the quartz glass window ports will be installed at both opposite ends of the discharge tube via vacuum seal arrangement. Other applications of this plasma generator can be in the field of plasma-chemical synthesis of nanomaterials and in aerospace propulsion. In this case the high energy particles generator shown in FIG. 7*h* can be used as plasma thruster utilizing heavy ions such as Kr or Xe accelerated to high speed within the central core area 597 and escaping throughout the hole or, optionally a nozzle-like structure replacing the vacuum seal flange 552*a* at the end of the anode chamber 106. It is appreciated that other primary plasma sources can be used to provide a primary plasma environment within discharge tube 541 prior to applying high voltage positive pulses the tube's wall 541 and to the wire electrodes 591. For instance, Electron Cyclotron Resonance (ECR) source, inductively coupled plasma (ICP) source or helicon wave source can be also used instead of arc plasma source in the cathode chamber 108.

FIG. 7*k* illustrates, in cross-sectional view, one exemplary hybrid reactor utilizing a cylindrical neutron generator 1 that may be used as a source of neutrons for hybrid fusion-fission reactors to improve nuclear fuel cycles of such hybrid fusion-fission reactors. The hybrid reactor of FIG. 7*k* is another preferred embodiment of the neutron generator 1 of FIG. 7*h*. The neutron generator of FIG. 7*k* includes vacuum-sealed plasma duct 1*c* (shown in FIG. 7*h*), a graphite block 641, and optionally coaxial magnetic confinement coil 521 positioned within graphite block 641. Graphite block 641 serves as a neutron moderator with fission nuclear fuel rods, containing, for example $U^{235}O_2$, inserted within nuclear fuel channels 651. The neutrons generated by the neutron generator 1 are propagating from the central area 597 of the fusion neutron generator toward the graphite block 641 (shown by radial arrows in FIG. 7*k*) where their speed is slowing down to the thermal neutron energy level required for activating the fission nuclear fuel.

In a variation of the embodiment of invention shown in FIG. 7*h*, additional plasma focus accelerating stage 681 is installed adjacent to the separating baffle 582 separating high pressure plasma duct 1*c* from the low pressure primary arc compartment 108 as illustrated in FIG. 7*h*1. It consists of the annular flanged electrically insulated ceramic nozzle 593, which disk-flange 593*b* is spaced from the separation baffle 582 by the ceramic spacer 501 and having tubular nozzle 593*a*, extended toward plasma duct 1*c*, coaxial to the opening 582*a* in the separation baffle 582. The frustoconical intermediate anode 595, electrically connected to the cylindrical discharge tube 541, fits into the outer corner of the ceramic nozzle 593. An array of anodic wire electrodes 591 connects the conical side of the intermediate anode 595 and the discharge tube 541. In this setup the discharge tube 541, the anodic wire array 591 and the frustoconical anode 595 are all electrically connected to the positive pole of the intermediate remote arc power supply 537 via switch 539, while its negative pole is connected to the cathode 583 in the primary arc compartment 108, forming a set of intermediate remote arc anode electrodes 681 and, at the same time, they are connected to the positive output of the unipolar pulse generator 531 via switch 543, forming a set of a plasma focus electrodes 681. In addition, the tubular remote anode 551*a* can be installed in the plasma duct 1*c*, in front of the plasma focus setup, connected to the positive pole of the remote arc power supply 549 via switch 545 while its negative pole is connected to the cathode 583 in the primary arc compartment 108. In operation, the primary arc discharge is ignited between arc cathode 583 and grounded walls of the low pressure primary arc chamber 108, while the main remote arc discharge is ignited between the cathode 585 and remote anode 551*a* in the high pressure plasma duct compartment 1*c* when switch 545 is closed. Simultaneously, the intermediate remote arc discharge is ignited between the cathode 583 and a set of the plasma focus electrodes 681 including the frustoconical anode 595, an array of anodic wires 591 and the discharge tube 541, filling the area occupied by the plasma focus electrodes 681 with dense remote arc plasma, which is further energized by applying high voltage positive impulses generating by the unipolar pulse generator 531 when the switch 543 is closed. When high voltage positive pulse is applied to the plasma focus electrodes 681 filled with intermediate remote arc plasma, the high positive potential is rapidly created within the portion of the plasma focus electrodes occupied by anodic wire array preliminary filled with dense remote arc plasma. This creates the shock wave toward the axes of the plasma duct 1*c*, which collapses near the axes of the plasma duct 1*c*, creating a spike of neutron radiation as a product of high energy fusion reaction when the discharge gas is deuterium (D) or deuterium-tritium (D-T) mixture. When the discharge gas is Xe, the spike of supersonic jet of Xe plasma will be generated along the axes of the plasma duct 1*c* toward the exit flange 552.

In a refinement, a multiple nozzle-openings 582*a*, 582*b* can be provided around the periphery of the central conical anode of the plasma focus electrodes 681 as illustrated in FIG. 7*h*2. In this design, the annular flanged electrically insulated tubular ceramic body 593, consisting of tubular cylindrical portion 593*a* positioned between the primary arc chamber 108 and discharge tube 541, and ceramic flange 593*b* with nozzle-openings 582*a*, 582*b*, which are disposed annularly around the conical anode 595, between the conical anode 595 and anode tube 596. The ceramic flange 593*b* is adjacent to the separation baffle 582 of the primary arc chamber 108, facing the plasma duct 1*c*. A set of plasma focus electrodes 681 consists of anodic tube in a form of tubular cylindrical electrode 596 positioned along the inner side of the ceramic tube 593*a*, the conical intermediate anode 595 and the array of anodic wires 591 connecting the conical anode 595 with anodic tube 596, forming a set of intermediate anode electrodes/plasma focus electrodes 681 connected to the positive pole of the intermediate anodic arc power supply 537 via switch 539 and protecting diode 547*a*, while its negative pole is connected to the cathode 583 in the primary arc chamber 108. At the same time a set of plasma focus electrodes 681 are connected to the positive pole of the unipolar pulse generator 531 via switch 543 forming a set of high voltage pulsed electrodes in the area 597 of the plasma duct 1*c*, adjacent to the cone anode 595, which is capable of generating plasma focus within the area 597, preliminary filled with dense remote anode plasma, when the high voltage positive pulse, generated by the unipolar high voltage pulse generator 531, is applied to the set of electrodes 681. In operation, the main remote arc plasma discharge is protruding from the cathode 583 in the cathode chamber 108 throughout the opening-nozzles 582*a* and 582*b*, which are disposed annularly around the conical anode 595, between the conical anode 595 and anode tube 596, toward the tubular remote anode 551*a* in the remote anode compartment 1*b*, powered by the remote arc power supply 549, while the intermediate remote arc discharge is ignited between the cathode 583 and plasma focus electrodes 681 within the area 597 of the plasma duct 1*c* adjacent to the cone anode 595, which is preliminary filled with the dense remote arc plasma. When high voltage positive pulse, generated by the unipolar high voltage pulse generator 531 is applied to the plasma focus electrodes 681, the high positive plasma potential zone is created within the area 597 of the plasma duct 1*c* where the set of the plasma focus electrodes 681 is positioned, between the conical anode 595 and tubular electrode 596 and across the area occupied by the array of anodic wire electrodes 591, which is filled with dense remote arc plasma, while relatively low plasma potential zone having plasma potential associated with remote arc plasma anode, which typically does not exceed 500V, but more often is less than 200V, is located initially in the central area of the plasma duct 1*c* along its axes. The spike of high voltage (>1000V) plasma potential within the anodic wire array 591 generates the shock wave, which collapses near the axes of the plasma duct 1*c* resulting in generation of supersonic jet along the axes of the plasma duct toward the exit flange 552 and also can create intense neutron radiation spike when the gas discharge consists of deuterium (D) or deuterium-tritium (D-T) mixture.

In another variation of the embodiments of invention shown in FIG. 7*h*, the remote arc discharge plasma includes generation of plasma cloud surrounding outer surfaces of aerospace vehicles operating as plasma actuator to control airflow around the vehicle as shown by example in FIGS. 7L through 7L6. FIG. 7L shows, in cross-sectional view, one exemplary embodiment of the sources for plasma assisted electric propulsion of present invention for application of the process of generation of energetic particles for drag reduction and radar cross-section (RCS) reduction of a hypersonic vehicle 118. In reference to FIG. 7L, the cathodic arc plasma generator 1*a* is positioned immediately behind the hole 775 in the top head 1*d* of the vehicle's body 1*c*, which is opened into the stagnation area 756 of the incoming outside air flow 773 at the front end of the head portion 1*d* of the body 1*c* of a high altitude hypersonic vehicle 118. The cathodic arc plasma generator 1*a* comprises a tunnel portion 1*e* connecting the opening 775 with cathode chamber 108. The cathode chamber 108 is optionally provided with pumping system as shown in FIG. 7*h*, which allows maintaining low pressure below 100 mTorr in cathode chamber 108, while the pressure in the outside air flow around the vehicle can range from 1 Torr to 1 atm. A remote arc plasma 774 is ignited by mechanical or pulse plasma discharge igniter 584 between the cathode 583, in the cathode chamber 108, and one or more remote anodes 752 installed downstream of the opening 775. Remote anodes 752 are insulated from the vehicle body by insulation spacers 755. Remote arc discharge plasma stream 774 propagates from the cathode 583 in the cathode chamber 108 to the remote anode(s) 752 throughout a small opening 775, optionally provided with a nozzle. Thus, remote arc discharge plasma stream 774 effectively envelopes the front portion 1*d* of the body 1*c* of the high-altitude hypersonic vehicle 118 resulting in drag reduction of hypersonic vehicle 118 flying in an environment where the atmospheric pressure may range from 1 Torr to 1 atm. The plasma cloud formed by remote arc discharge plasma stream 774 and surrounding at least a portion of the body of the vehicle may also reduce the radar cross-section (RCS) of the vehicle. In case of a spacecraft, the remote plasma cloud generated by remote arc discharge 774 may be used to control charging and suppression of arcing on the outer surface of the spacecraft by neutralizing the surface charge. To enhance this effect, an array of wire anodes 795 may be optionally positioned between the opening 775 and the remote anode(s) 752. Wire anodes 795 are isolated from the spacecraft body by isolation spacers 701 and may be also used to generate high energetic particles for neutralizing the charge of the spacecraft body. It should be noted that by switching the remote arc power supplies 535 between different remote anodes positioned at the different locations on the vehicle's body 1*c*, the dense plasma cloud can be generated at virtually any location over the vehicle's body 1*c* close to the currently active remote anode.

In refinement, the exit tunnel portion 1*e* of the arc plasma generator 1*a* is extended throughout the top end of the head of the vehicle 1*d* into the incoming outside air flow 773 as illustrated in FIG. 7L5. The tunnel portion 1*e* of the arc plasma generator 1*a* comprises of the narrow tube 757 with electrically insulative ceramics 753 covering its inner surface, which ends by the nozzle 754 facing the stagnation area 756 of the incoming outside air flow 773. The inner ceramic isolation 753 is extended toward the primary arc cathode chamber 108, isolating the body 789 of the cathode chamber 108 from the cathode 583. The primary arc discharge is ignited between the cathode 583 and the chevron baffle 581 serving as primary anode, powered by the primary arc power supply 19. The chevron baffle primary anode 581 has openings providing a passage for electrons to conduct the current for the remote arc discharge toward the remote anodes. The nozzle 754 is electrically connected to the vehicle's body 1*c* and serves as intermediate remote anode to ignite the intermediate remote arc discharge between the cathode 583 in the cathode chamber 108 and the intermediate anode nozzle 754, powered by the intermediate remote arc power supply 533, while the main remote arc discharge is extended beyond the stagnation area 756 toward the remote anodes 752 located elsewhere on the side wall of the vehicle's body 1*c*, electrically isolative of the vehicle's body by ceramic isolative spacers 755 as shown in FIG. 7L5 or, optionally, on the vehicle's wings, powered by remote arc power supplies 535.

FIG. 7L1 illustrates a variation of the embodiment of the sources for plasma assisted electric propulsion of present invention shown in FIG. 7L as a remote arc plasma actuator for the high-altitude hypersonic vehicle 118. In reference to FIG. 7L1, the exit tunnel 1*e* of the cathodic arc plasma generator 1*a*, is connecting the output nozzle-opening 754 located at the front-end of the top head 1*d* of the vehicle's body 1*c*, with cathode chamber 108 of the cathodic plasma generator 1*a*. The inner surface of the tube 1*e* is covered by electrically isolative ceramics 753 such as BN which also covers the inner surface of the body 789 of the cathode chamber 108, electrically isolating it from the cathode 583. The output nozzle 754 may be of the converging-diverging de Laval type, enclosed within the front-end of the top head 1*d* of the vehicle's body 1*c*, usually electrically connected to the vehicle's body 1*c*, which is isolated from the cathode 583 by ceramic insulation 753. The ceramic isolation 753 is extended toward the cathode chamber 108, electrically isolating the cathode 583 from the cathode chamber body 789, which may be connected to the vehicle's body 1*c* as shown in FIG. 7L1 or, preferably, electrically isolated and floated. The incoming air flow 773 is flowing around the vehicle's body 1*c* and is partially propagating through the nozzle opening 754 and pumping out from the cathode chamber 108. The magnetic coil 586 is optionally positioned between the tunnel portion 1*e* and the front portion of the vehicle's body 1*d* coaxially to the tunnel portion 1*e*, surrounding the nozzle 754 for the further improvement of the thermal isolation and stabilization of the plasma flow within the nozzle by magnetic isolation and also for magnetic isolation of the head 1*d* of the vehicle's body 1*c* from the external plasma flow, reducing the heat coming from the outside plasma flow toward the vehicle's body 1*c*. The magnetic field generated by the coil 586 outside of the vehicle forms a magnetic island which is repelling plasma stream from the head of the outer surface of the vehicle body 1*d*. In operation, the primary arc, powered by the primary arc power supply 19, is ignited by the igniter 584, between the cathode 583 and the chevron baffle 581, serving as primary anode positioned in front of the cathode target 583 and having openings for transmitting the electrons of the remote arc discharge. The intermediate remote arc discharge, powered by the intermediate arc power supply 533, is ignited between the cathode 583 and the anode-nozzle 754, electrically connected to the vehicle's body 1*c*, while the main remote arc discharge, powered by the remote arc power supplies of the group 535, including power supplies 535*a,b*, is conducted between the cathode 583 and the group of remote anodes 1*b* including remote anodes 752*a,b,c,d* isolated from the vehicle's body by ceramic isolation spacers 755*a,b,c,d*. The remote arc plasma column propagates through the tunnel 1*e*, converging-diverging nozzle 754 and protruding further along the external air flow around the vehicle's front side 1*d* and further through the remote anode openings 757*a, b, c, d* toward remote anodes 752*a, b, c, d*. As a result, the vehicle and, especially, its front end 1*d*, is enclosed in dense remote arc plasma cloud, which is concentrated near nozzle opening 754 and near the currently activated remote anodes, which reduces both the aerodynamic drag and RCS of the vehicle due to ability of dense plasma to reduce hydraulic resistance of the vehicle against incoming air flow and to absorb, deflect, and block the radar signals.

FIG. 7L2 illustrates a variation of the embodiment of remote arc plasma actuator of the sources for plasma assisted electric propulsion of present invention shown in FIGS. 7L, 7L1 for high altitude hypersonic vehicle 118. In reference to FIG. 7L2, the plasma torch 1*d* is installed by the front top portion 1*d* of the vehicle's body 1*c* consisting of the rod-cathode 583, electrically isolated from the plasma torch body 785 by the insulative ceramic cover 753 which is extended toward the plasma torch chamber also isolating the primary anode-nozzle 754 and plasma torch body 583 from the rod-cathode 583, while the anode-nozzle 754 and the plasma torch body 785 are electrically connected to the vehicle's body 1*c*. The primary arc is conducted between the rod-cathode 583 and the anode-nozzle 754, powered by the primary arc power supply 19, while the remote arc, powered by remote arc power supplies of the group 535, including power supplies 535*a,b*, is ignited between the rod-cathode 583 and the at least one remote anode 552*a,b,c,d* of the group 1*b*, installed downstream the vehicle's body 1*c* and opened to the outside air by the openings 757*a,b,c,d* for conducting the remote arc current to the remote anodes 1*b*. The plasma-creating gas is supplied via gas supply line 776 into the arc plasma torch 1*a* and protruding through the nozzle 754 into the incoming air flow 773 near the stagnation point 756 at the tip-end of the top-front head of the vehicle's body 1*d*.

FIG. 7L3 illustrates another variation of the embodiment of remote arc plasma actuator of filtered cathodic arc method and apparatus of present invention shown in FIGS. 7L, 7L1 and 7L2 for high altitude hypersonic vehicle 118. In reference to FIG. 7L3 the cathodic arc plasma sources 1*a*, utilizing hollow cathodes 583*a, b* are positioned on the side walls 1*c* of the vehicle's body while the remote anodic arc source 1*b* is located by the front end of the front head portion 1*d* of the vehicle 118. The cathodic arc sources 1*a* comprise cathode chambers bodies 785*a, b* having its inner surface covered by ceramic insulation 753*a, b*, insulating the rod-cathodes 583*a, b* from the cathode chambers bodies 785*a, b*. The cathodic arc sources 1*a* are provided with attached gas supply lines 777*a, b* for supplying plasma-creative gas into the cathode chambers 785. The cathodes 583*a, b* (shown in FIG. 7L3 as hollow cathodes, but, in general, can be also thermionic rod-cathodes or vacuum arc cathodes) are attached to the cathode chambers 585 via insulator ceramic spacers 753*a, b*. The cathode chambers 785*a, b* usually end by the anode-nozzles 786*a, b* opened through the vehicle body 1*c* to the outside airflow and electrically connected to the vehicle's body 1*c*, but can also end by simple opening with diameter ranging from 0.1 mm to 5 cm. The nozzle-orifices 786*a,b* and others in the vehicle's body smaller than 0.1 mm can affect charge separation in plasma media while the holes 786*a,b* greater than 5 cm cannot produce a stationary shock-wave separation barrier across a holes 786*a,b* to secure high pressure high plasma potential in the remote anode arc compartment 15, which is characterized by relatively small characteristic gas flow velocity, typically 3 times less than speed of sound at the gas temperature of the remote anode arc compartment and, in most cases, creating a stagnation zone with stationary plasma environment in the remote anode arc compartment 15. At the same time, it is developing a high-speed plasma plume produced through the stationary shock-wave barrier developing across the nozzle-orifices 786*a, b* with characteristic gas speed ranging from ⅓ of the speed of sound to 20 Mach, i.e. 20 times the speed of sound at the gas temperature in the remote anode arc compartment 15. The nozzles 786*a,b* are typically electrically connected to the side wall of the vehicle's body 1*c*, which serves as a primary anode to the primary arc discharge generating within the cathodic arc sources 1*a*, powered by the primary arc power supplies 533*a,b*, while the remote arc discharge is conducted between the cathodes 583*a,b* and the remote anode 755, attached to the remote anode chamber 1*b*, located by the head-front tip 1*d* of the vehicle, via insulator 752. The remote arc discharge, which is conducting along the side walls of the vehicle's body 1*c*, is generated by the remote arc power supplies 535*a, b* between the cathodes 583*a, b* and the remote anode 755. The plasma creating gas is supplied to the remote anode chamber via gas supply line 776 and propagates via nozzle 754 toward the stagnation area 756 of the incoming outer gas flow 773, which is flowing around the front part 1*d* of the vehicle's body 1*c*. The enthalpy of the flow injected into stagnation area 756 through the nozzle 754 from the anodic arc source 1*b* improves the aerodynamics characteristics of the vehicle as well as reduces RCS of the vehicle. Additional improvement of the aerodynamic characteristics can be achieved by the Joule heating of the surrounding gas flow 773 by the remote arc discharge conducted between the cathodes 583*a, b* and the remote anode 755. The remote arc plasma actuator of the present invention can operate in the outside pressure range from 0.1 mTorr to 100 Torr. When the outside pressure is less than 0.1 mTorr the remote arc discharge becomes unstable and often extinguishes. When the outside pressure exceeds 100 Torr the remote plasma become columnar and does not create uniform plasma cloud enveloping the vehicle. The distance between the opening of the cathode chamber 786 and the nozzle-opening 754 of the remote anode chamber 1*b* is ranging from 0.5 m to 10 m, but typically this distance is within the range from 1 m to 3 m. This distance can be further extended by using intermediate anodes positioned along the vehicle's body 1*c* downstream from the anode chamber 1*b* nozzle 754 located by the front-head tip 1*d* of the vehicle, similarly to the arrangement shown in FIG. 7*h*. The intermediate anodes can be located elsewhere over the body 1*c* of the aircraft between the cathodes 583 and remote anode chamber 1*b*, powered by intermediate arc discharge power supplies (shown in FIG. 7*h*).

In refinement, the cathodic arc source 1*a*, utilizing the hollow cathode, thermionic cathode or vacuum arc cathode can be located by the top point area of the head of the vehicle 1*d*, while the remote anodes can be positioned elsewhere over the side surface of the body of the vehicle 1*c* downstream of the stagnation area 756 at the top end of the top head area 1*d* of the vehicle's body 1*c*, as illustrated in FIG. 7L4 or on the wings of the vehicle (not shown). In reference to FIG. 7L4, the front arcjet plasma source 1*a* consists of the cathode chamber 785 located by the top of the vehicle head 1*d*. It comprises the cathode rod 755 made of refractory metal such as tungsten, installed coaxially to the cathode chamber 785 via insulative ceramic spacer 752*a* and the plasma-creating gas supply line 776. The cathode chamber opens to outside flow by the anode-nozzle opening 786 in the anode-nozzle 754, electrically connected to the vehicle's body 1*c*, serving as a primary anode to the primary arc discharge powered by the primary arc power supply 533. The anode-nozzle 754 is insulated from the cathode chamber body 785 by ceramic shielding 752*b*. The converging-diverging anode-nozzle 754 is opened into the stagnation area 756 of the incoming outside gas flow 773 through the nozzle's opening 786. The group of the remote arc anodic plasma sources 1*b* is located elsewhere over the vehicle's body downstream of anode-nozzle opening 786, distant from the cathode chamber nozzle-opening 786. The remote anode chambers 789*a, b* are positioned elsewhere over the side wall 1*c* of the vehicle 118 as shown in FIG. 7L4 or on its wings (not shown). The anode chambers 789 are opened to the outside flow by small nozzle-openings 754*a, b* located on vehicle side wall 1*c*. The remote anode chambers 789*a, b* comprises the remote anodes 753*a, b* typically in a form of a rods made of refractory metal such as tungsten or molybdenum, attached to the remote anode chamber via electrically insulative spacers 753*a, b*. The nozzles 754*a, b* are separated from the anode chamber body 789*a, b* by ceramic insulation 753*c, d*. The remote anode chambers 789*a, b* may be opened to the outside flow by the nozzle-openings 754*a, b* either electrically connected to the vehicle's body 1*c* or floated. The plasma-creating gas is supplied to the anode chambers 789*a, b* via gas supply lines 777*a, b*. The remote arc is powered by the remote arc power supplies 535*a, b* connected between the arc cathode 755 and remote arc anodes 583*a, b*.

FIG. 7L6 illustrates a still another variation of the embodiment of the remote arc plasma actuator of the sources for plasma assisted electric propulsion of present invention shown in FIG. 7L1, utilizing the cathodic arc plasma generator with self-recreating evaporation surface previously shown in FIGS. **7*f*1 through 7*f*5. In reference to FIG. 7L6, the primary cathodic arc source 1***a* used in this process is self-recreating hollow cold cathode consisting of the cathode chamber 108, comprising the water-cooled cathode body 769 typically made of metal with high thermal conductivity such as high purity copper, having its internal water-cooled surface covered by the metal with low boiling point and high saturated vapor pressure such as metal chosen from the group of Bi, Ba, Cd, Ca, Yb, Sm, Se, Sb, or similar, while on the side of the low-pressure primary arc compartment 109 the cathode cavity 108 is closed by the floated refractory baffle diaphragm 759 with nozzle-opening 761 made of refractory metal such as Mo, W, Ta, Hf, Nb or similar, separated from the water-cooled cathode cavity by the ceramic spacer 763. The cathode chamber 108 can be optionally provided with pumping port 777 to maintain a necessary low pressure inside of the cathode chamber 108 as was shown in FIG. **7*f*3,7*f*4. The pumping port 777 is separated from the cathode chamber 108 cavity by the mesh-screen 765 to prevent the loss of the low-boiling point metal coating from the cathode chamber 108. The mesh-screen 765 can be optionally heated by independent heater (not shown) to prevent condensation of the vapors of metal coating with low boiling point and high pressure of saturating vapors. The cathode 108 is opened to the primary arc plasma duct compartment 109 via opening 761 in the hot diaphragm 759. The primary arc discharge, powered by the primary arc power supply 19, is conducted between the water-cooled cathode chamber 108 throughout the nozzle-opening 761, usually kept at high temperatures, exceeding the boiling point of the metal coating 767, via primary arc plasma duct section 109 and further throughout the tubular tunnel channel 1***e* with electrically insulated walls 753 toward the exit anode-nozzle opening 754, opened into stagnation point 756 of the outside air flow 773 and electrically connected to the vehicle's body 1*c*. The primary arc plasma duct 109 typically has pumping port (shown in FIG. **7*f*5) for pumping out small amount of the outside air flow penetrating throughout the nozzle 754. The arc plasma is penetrating throughout the opening 761 keeping the diaphragm 759 hot, which is preventing condensation of the metal vapor of the metal coating 767 with high boiling point at the diaphragm 759 and ceramic spacer 763. The primary arc discharge is conducted between the cathode 108 and the walls 770 of the primary arc plasma duct 109, spaced from the cathode diaphragm 759 by ceramic spacer 771. The primary arc is powered by the primary arc power supply 19 connected between the cathode chamber 108 and the walls 770 of the primary arc plasma duct 109. The intermediate remote arc is conducted between the cathode 108 and the anode-nozzle 754 electrically connected to the vehicle's body 1***c*, powered by the intermediate remote arc power supply 533. The intermediate remote arc is protruding from the cathode cavity 108, through the opening 761 in the diaphragm 759, crossing the primary arc compartment 109 and continue its way along the tubular tunnel 1*e* with electrically isolated walls by ceramic isolation 753, ending by attachment to the anode-nozzle 754, electrically connected to the vehicle's body 1*c*. The external remote arc is conducted between the cathode 108 and a group of remote anodes 1*b*, including remote anodes 752*a, b, c, d*, which are opened to the outside air via remote anode opening 757*a, b, c, d* located downstream of the side walls of the vehicle's body 1*c*. The external remote arcs are attached to the remote anodes 752*a, b* and powered by the remote arc power supplies of the group 535 including 535*a,b*. The remote arc plasma discharge, powered by the remote arc power supplies 535*a,b*, is conducted between the cathode chamber 108 and at least one remote anode of the group 1*b*, which includes remote anodes 752*a,b,c,d* located elsewhere down the air stream 773 on side wall of the vehicle's body 1*c* or, optionally, on its wings (not shown), to create a current carrier plasma cloud enveloping the vehicle, which allows to improve its aerodynamics at hypersonic speeds and reduce its RCS.

In refinement, FIG. 7L7 illustrate the charge mitigation of the satellite equipped with reversed arc plasma (RAP) generators. The satellite 118 has Hall effect thruster 122*a* as electric propulsion engine. The thruster 122*a* has hollow cathode 12 producing the electron current by the primary thermionic discharge between the hollow cathode 12 and the anode-keeper 70*b*. When the primary thermionic arc discharge is ignited it can be extended through the thruster's channel 126 to ignite the main anode discharge of the thruster between the hollow cathode 12 and the thruster's anode 70*a*. The remote anodes 70 are positioned in the remote anode containers 15 having gas inlet for gas feed lines 602*a* and small nozzle-opening outlets 39 which are placed in strategic locations around the satellite body. The propellant gas, typically xenon or krypton, is supplied to the thruster 122*a* and to the remote anode containers 15 from the gas tank 602 via gas feed lines 602*a*. When the reversed arc plasma discharge is ignited between the hollow cathode and any of the remote anodes 70 it produces a plasma plume through the nozzle openings 39 into the outer space. As a result, a plasma cloud is produced near the active nozzle-opening 39 which is currently producing the plasma plume. This plasma cloud in the area surrounding the nozzle-opening 39 associated with the currently active remote anode 70 can mitigate the charging of the satellite at least in the area surrounding the currently active remote anode 70 plasma plume. Another application of the distributed reversed arc plasma sources include vector maneuvering of the satellite and the opportunity to rapidly increase the thrust in selected direction when satellite is changing the orbit or doing other maneuvers which are required large thrust magnitude during the relatively short period of time.

The process of generating high energy particles, as discussed above in reference to FIGS. 7*h*-7*j*, may be applied for deposition of various coatings and production of nanopowder by means of plasma-chemical synthesis activated by the energetic particles. FIG. 7*m* shows cross-sectional view of one embodiment of filtered cathodic arc method and apparatus for generation of energetic particles in coating deposition reactor for deposition of diamond coatings, as an improvement of the arc assisted CVD coating method and apparatus taught by U.S. Pat. Nos. 5,478,608 and 5,587,207 to Gorokhovsky, which are incorporated by reference. In reference to FIG. 7*m*, the plasma-chemical reactor 1*c* comprises the rectangular substrate chamber with substrates 4 to be coated positioned at the grounded bottom wall 2 of the reactor chamber 1*c* while the top wall 542 is connected to the secondary arc power supply 537 and the unipolar pulse power supply 531. The array of wire anodes 591 is installed along the reactor chamber connected to the top wall 542 by the side walls 542*a*, on side of the cathode chamber 108, and 542*b* on side of the remote anode chamber 106. The array of wire anodes 591 occupies the high voltage upper area 595 of the reactor chamber adjacent to the top wall 542, while the remote arc discharge is established within the low voltage area 597 between the array of the wire anodes 591 and the bottom wall 2 of the reactor 1*c*. For the synthesis of diamond coatings from the argon-methane-hydrogen reactive gas mixture, the bottom wall 2 of the reactor 1*c* may be heated by the heater 615. Heater 615 is powered by AC current connected via terminals 610, when the switch 611 is closed, to maintain a necessary temperature for synthesis of diamond coatings, which is typically ranging from 300 to 1050 deg C. When the substrate temperature Ts<300 deg C., the non-diamond phase will be predominantly nucleating. Substrate temperatures exceeding 1050 deg C. overheat and destroy both the substrate and the diamond coating. Ion bombardment of the substrates 4 to be coated by the energetic ions generated in the high plasma potential area 595 during the process of synthesis of the diamond coating may improve coating structure and morphology and allow deposition of nanocrystalline films at reduced reaction pressures and substrate temperatures.

The reactive gas is supplied via gas supply line 602 connected to anode chamber 106, while the pumping port is connected to cathode chamber 108. Cathode chamber 108 is separated from the plasma duct-reactor chamber 1*c* by baffle (separating wall) 582 with small orifice 582*a*, which allows maintaining large pressure drop between reactor chamber 1*c* and cathode chamber 108. The pressure within cathode chamber 108 is typically less than 200 mTorr and preferably less than 100 mTorr as required for operation of the vacuum arc discharge, while the pressure within reactor chamber 1*c* is typically greater than 300 mTorr and preferable greater than 0.5 Torr for deposition of polycrystalline diamond CVD coatings. The diameter of the orifice 582*a* is typically in the range from 0.1 mm to 5 cm. When the diameter of the orifice 582*a* is less than 0.1 mm it can disconnect the electron current emitted by the cathode target 583 cause the separation of charges in plasma effectively blocking the electrons from passing the orifice 582*a*, hence extinguishing the remote arc, whilst a diameter of the orifice 582*a* greater than 5 cm requires too high flow rate of the process gas and very high magnetic field pressure developed by the arc current conducting across the orifice 582*a* to maintain a necessary higher pressure within the plasma duct-reactor chamber 1*c*. When the remote arc discharge is transmitted through small orifice 582*a*, the current density within the orifice 582*a* increases by orders of magnitude resulting in increase of electron density and electron temperature followed by increase of decomposition, ionization and excitation of reaction species, such as nascent hydrogen, excited molecular hydrogen and hydro-carbon radicals It is also producing a high speed plasma plume which is characterized by the gas speed ranging ⅓-20 times of the speed of sound in the plasma duct chamber 1*c*, while the characteristic gas speed in the bulk area of the plasma duct 1*c* does not exceed ⅓ of the speed of sound and, in most cases, is near zero, creating a stagnation zone of a stationary plasma discharge within the plasma duct 1*c*. This increases the coating deposition rate and improves the coating microstructure and morphology. In this design, the electron current of the remote arc discharge emitted by cathode target 583 in cathode chamber 108 is directed from the lower pressure environment of cathode chamber 108 toward the higher pressure environment of coating chamber 1*c* via small orifice 582*a*. The electron current density across the orifice 582*a* is typically in the range from 1 A/cm$^2$ to 1E6 A/cm$^2$. A current density below 1 A/cm$^2$ is too small for substantially increasing the pressure gradient across the opening 582*a* by the friction of electrons against gas flow and for generating substantial magnetic pressure within the orifice, while a current density exceeding 1E6 A/cm$^2$ may overheat and melt the nozzle. On the other hand, the electron current density of the remote arc discharge across the plasma duct is typically in the range from 1 mA/cm$^2$ to 1000 A/cm$^2$. A current density of the remote arc across the plasma duct below 1 mA/cm$^2$ is too small for activation, dissociation and ionization of the reactive gases in coating deposition process, while a current density exceeding 1000 A/cm$^2$ may create plasma instabilities which will be detrimental to the uniformity of plasma density distribution across the plasma duct resulting in non-uniformity of coating distribution for substrates 2 to be coated positioned at different locations across the substrate holder 4 within the plasma duct.

Optionally, substrate holder 2 with substrates to be coated 4 is positively or negatively biased in reference to cathode 583 in cathode chamber 108 as illustrated in FIG. 7*n*. In this design, the positive pole of a remote anode arc power supply 535*a* is connected to substrate holder 2 via a switch 611*a*, while its negative pole is connected to cathode 583 in cathode chamber 108. In a parallel circuit, the negative pole of a bias power supply 535*b* is connected to substrate holder 2 via a switch 611*b*, while its positive pole is connected to cathode 583 or grounded. The primary vacuum arc discharge is initiated on the evaporation surface of cathode target 583 by electro-mechanical igniter 14. During diamond coating deposition process, substrate holder 2 may be consequently biased either positively or negatively resulting in laminating multilayer morphology and microstructure of the depositing coatings.

FIG. 7*o* illustrates one exemplary filtered cathodic arc apparatus for deposition of diamond coatings or other metal-ceramic coatings, which is a variation of the apparatus of FIGS. 7*m*, 7*n* further including a magnetron sputtering source 901 on wall 542 of either rectangular or circular tubular plasma duct 1*c* opposite to the wall occupied by substrate holder 2 with substrates to be coated 4. The magnetron sputtering source 901 includes a magnetic yoke 903 with a set of permanent magnets to create the arch-shaped magnetic field configuration that confines a magnetron discharge area 907 above the sputtering surface of a magnetron target 905 sitting on top of the magnetic poles and facing substrates to be coated 4. The magnetron sputtering occurs within high density plasma discharge area 907 in between the magnetic poles immediately above a magnetron sputtering target 905. Magnetron sputtering source 901 is electrically isolated from plasma duct 1*c* by ceramic insulators 501*a*. In operation, when switch 539 is closed and switch 543 is open, the array of anodic wire electrodes 591 serve as a stationary auxiliary anode in reference to cathode 583 in cathode chamber 108, thereby supporting a stationary auxiliary arc discharge between electrode array 591 and cathode 583. This stationary auxiliary arc discharge results in an increase of plasma density and plasma potential in the magnetron sputtering discharge area near magnetron target 905 and thus increases ionization and activation of metal sputtering flow generated by target 905. When switch 539 is opened and switch 543 is closed, the large positive pulse bias is applied to the array of wire electrodes 591, further increasing ionization and activation of metal sputtering flow generated at target 905. When both switches 539 and 543 are closed, the stationary remote anode potential, generated by power supply 537 in combination with high positive pulses generating by pulse power generator 531, are applied to the anode grid formed by the array of anode wires 591, creating dense plasma contiguous upon sputtering target 905.

FIG. 7*p* illustrates another variation of the design of remote arc plasma enhanced diamond coating CVD reactor of FIG. 7*n* or 7*m*, wherein wire electrodes 591 are removed and plasma duct 542*a* is grounded while the substrate holder 2 with substrates to be coated 4 is biased either positively or negatively in reference to cathode 583 in cathode chamber 108. Biasing of substrate holder 2 is achieved by the parallel circuit connecting the substrate holder 2 to cathode 583 in cathode chamber 108. Substrate holder 2 is biased negatively when the negative pole of the power supply 535*b* is connected to substrate holder 2 via closed switch 611*b*, while its positive pole is connected to cathode 583 or grounded. In this case the switch 611*a* is open. Substrate holder 2 is biased positively when the positive pole of power supply 535*a* is connected to substrate holder 2 via closed switch 611*a*, while its negative pole is connected to cathode 583 in cathode chamber 108. In this case, switch 611*b* is opened. As shown in FIGS. 7*n*, 7*o* and 7*p*, cathode chamber 108 with primary arc cathode 583 is separated from plasma duct 542 by separating baffle 582 with small orifice 582*a* which is impermeable for heavy particles (neutral atoms, ions and macroparticles) but allows electron current of the remote arc discharge emitted from the cathode 583 to be transmitted from the lower pressure cathode chamber 108 to the plasma duct and coating chamber 1*c* via small orifice 582*a* and further to the anode chamber 106. An unexpectedly large pressure gradient across the small opening 582*a* in the separating baffle 582 is created between the plasma duct 542 and the cathode chamber 108 with pressure in the plasma duct 542 more than an order of magnitude greater than the pressure in the cathode chamber 108 when the gas flow is directed toward the cathode chamber 108 from the plasma duct 542 through the small opening 582*a*, while the electron current of the remote arc discharge is directed in opposite direction from the cathode 583 toward the remote anode 551. High gas pressure in the plasma duct 542 is favorable both for high deposition rate of different PACVD coatings and for high rate of generation of energetic particles, while low pressure in the cathode chamber 108 is favorable for sustainable generation of the electron current by cathodic arc process. The pressure difference between the coating chamber 1*c* (high pressure) and the cathode chamber 108 is due initially to the hydraulic resistance of the small orifice 582*a* and increases dramatically after igniting of the remote arc discharge between the cathode 583 and remote anode 551 due, at least in part, to electrophoretic effect, partially due to the friction between electron current flow directed from the cathode 583 toward the remote anode 551 through small orifice or nozzle 582*a* and directed opposite to the gas flow directed from the coating chamber 1*c* toward cathode chamber 108, and in large number it is due to magnetic pressure generated by large arc current conducting throughout the small orifice. The friction forces between the electron flow and gas flow imposes the additional pressure difference between the coating chamber 1*c* and the cathode chamber 108 which is mostly located across the orifice 582*a*. The pressure difference due to remote arc discharge increases when the remote arc discharge current increases.

By virtue of large plasma density in remote arc plasma assisted CVD process, the reactors of FIGS. 7*m*, 7*m* and 7*p* can be used for deposition of different type of coatings, specifically the coatings selected from the group of metastable materials, such as alfa-alumina, cubic BN and diamond coatings of different morphologies, microstructures and architectures. For deposition of diamond and cBN coatings the remote arc plasma creating gas flowing the plasma duct 542 comprise reactive gas and, optionally, a carrier gas, the carrier gas being one or more noble gases and the reactive gas being selected from the group consisting (for example) of (a) a first gas mixture including hydrogen and carbon as, for instance, hydrogen and methane ($CH_4$) for depositing a diamond coating onto the substrates and (b) a second gas mixture including boron, hydrogen and nitrogen as, for instance, hydrogen, borane ($BH_3$) and ammonia ($NH_3$) for depositing a cubic boron nitride coating onto the substrates.

The plasma creating gas is supplied to the anode chamber 106 or, alternatively directly to plasma duct 1*c*, while the pumping system is connected to cathode chamber 108. In this case, the process pressure within the plasma duct is defined by the gas flow rate, the pumping speed of the pumping system and the size of the opening 582*a* in separating wall 582. This design allows for maintaining a relatively low pressure in cathode chamber 108 (typically below 200 mTorr) which is necessary for operation of vacuum arc, while the pressure in the plasma duct may be controlled in the range from 0.3 torr to 100 torr and, in pulsed remote anode mode, up to 1000 Torr depending on injecting gas flow rate and the area of opening 582*a*. In a refinement, the plasma duct is also provided with an optional pumping system 1*d* as illustrated in FIG. 7*p*.

In variation of this embodiment, an AC power supply such as single phase variable transformer may be used as remote arc power supply. In reference to FIG. 7*r*, a single phase variable transformer with electrically isolated output (or, alternatively, a pair of coupled variable transformer and step-up transformer) is used instead of DC power supply 535*b* (also shown in FIG. 7*r* as an option) to provide the power to substrate holder 2. To secure that only positive (anodic) voltage will be supplied to substrate holder 2 by transformer 692, a diode 593 is installed between the one output terminal of transformer 692 and substrate holder 2 while another output terminal of transformer 692 is connected to cathode target 583 via switch 611*a*. In operation, when variable transformer 692 is turned on and switch 611*a* is closed (while switch 611*b* is opened) the positive voltage pulses with the frequency corresponding to the frequency of the input power of the transformer 692 will be supplied to substrate holder 2. It is appreciated that unipolar DC pulse generator (shown in FIG. 7*n*) also may be used as a power supply to provide high current positive voltage pulses to substrate holder 2.

Optionally, the positive pole of DC power supply 535*c* is connected to the substrate holder 4 via switch 611*c*, while the negative pole of DC power supply 535*c* is connected to cathode 583. In operation, when sinusoidal voltage potential is applied to substrates 2, the plasma rectifying effect will produce the pulse plasma discharge only during positive half-period leaving substrate without plasma assistance during the negative half-period of the applied voltage potential. Each substrate 2 may be a silicon wafer or WC-6% Co carbide inserts. Each substrate 2 may be heated to a temperature in the range from 600° C. to 900° C. The polycrystalline diamond coating is deposited on substrates 2 during the half-period when the plasma is interfacing with substrates 2. During the half-period when the plasma is not present, the pyrolytic graphite phases are deposited. This alternation produces a mix of diamond with non-diamond carbon phases in carbon coating deposited on substrates 2 subjected to rectified sinusoidal bias potential applied by variac 692. This coating can serve as an interlayer in multilayer polycrystalline diamond coating architecture, in which the pure polycrystalline diamond layer is applied during the period of time when positive bias potential is applied to the substrate holder by DC power supply 535*c* when the switch 611*c* is closed while switches 611*a* and 611*b* are opened. This polycrystalline diamond layer is followed by mixed diamond-non-diamond carbon interlayer deposited when the bias potential to substrate holder 4 is applied by the variac 692 when switch 611*a* is closed while switches 611*b* and 611*c* are opened.

In the case of rectangular coating reactor, as shown in FIG. 7*s*, the remote arc column may be magnetically steered by a magnetic field perpendicular to the arc column. This magnetic field may be generated by a pair of magnetic coils 522*a* and 522*b* connected to the AC power supply (not shown) positioned in opposite sides of the reactor chamber 1*c*. In case of a tubular cylindrical reactor, as illustrated in FIG. 7*t*, three electromagnetic coils connected to 3-phase AC power supply (not shown) are positioned symmetrically around the reactor axis for generation of a rotating magnetic field for magnetic steering of remote arc column.

The voltage drop along the remote arc column increases with pressure. At higher pressures, the voltage drop along the remote arc column within the plasma duct 1*c* may exceed the voltage drop along the discharge tube 541, which may lead to the short circuiting of the arc via discharge tube 541 such that the remote arc current runs via discharge tube 541. To avoid the possibility of short circuiting of the remote arc discharge via discharge tube 541 in both energetic particles generator and coating deposition reactor operating at high pressure, wire electrodes 591 may be independently connected to the DC and/or DC pulse power supplies while discharge tube 541, or at least a part of discharge tube 541, is made of dielectric such as quartz or alumina (which may also serve as substrate holder in coating deposition reactor). Alternatively, the interior surface of the discharge tube 541 may be, at least partially, covered by a dielectric material preventing it from becoming an electrode in the remote arc plasma discharge. The dielectric material may be arranged as a dielectric liner attached to the interior surface of the plasma duct chamber 541. FIG. 7*u* shows one such embodiment. In this embodiment, to avoid remote arc shortening via wire electrodes, the diameter of wire electrodes 591 is both (a) small enough, typically from 10 to 100 μm and (b) made of metal alloy with high specific resistance such as Nichrome or Kanthal alloy. Alternatively, discharge tube 541 may be sectioned with alternating metal sections and dielectric ceramic sections that break the path of arc shortening current. FIG. 7*w* shows one such embodiment, wherein plasma duct housing 541 is built of a set of metal sections 541*a* separated by dielectric ceramic sections 541*b*, while the substrates to be coated 4 are positioned along the dielectric ceramic substrate holder 2 supported by end-flanges 3*b*. In operation, the remote arc plasma is conducted from the low pressure cathode chamber 108 via small orifice 582*a* in the separating baffle 582 along coating chamber 1*c* essentially within the ceramic substrate holder 2 with substrates to be coated 4 toward remote anode 551 in remote anode chamber 106. Optionally, substrates to be coated 4 are heated by external heaters (shown in FIG. 7*p*) in addition to the heating by remote arc discharge plasma. The reactive gas is supplied via remote anode chamber 106 while the pumping system is connected to cathode chamber 108 to maintain high pressure in coating chamber 1*c* while cathode chamber 108 remains under low pressure necessary for operating the vacuum arc discharge on cathode target 583.

In a variation of the embodiment of the filtered cathodic arc method and apparatus for generation of energetic particles in remote arc plasma assisted CVD reactor 1 for deposition of diamond coatings of FIG. 7*w* the cathodic arc plasma generator utilizes the vacuum arc cold cathode with self-recreating evaporation surface previously shown in FIGS. 7*f*1 through 7*f*5 and in FIG. 7L6 as illustrated in FIG. 7*w*1. In reference to FIG. 7*w*1 the reactor 1 comprises the enclosure 542 evacuating the inside area of the reactor 1 from the surrounding ambient atmosphere. The primary cathodic arc source 108 used in this process is self-recreating cold hollow cathode comprising the water-cooled cathode chamber 769 typically made of metal with high thermal conductivity such as high purity copper, having its internal water-cooled surface covered by the metal coating 767 made of metal with low boiling point and high saturated vapor pressure such as metals chosen from the group of Bi, Ba, Cd, Ca, Yb, Sm, Se, Sb, or similar, while on the side of the low-pressure primary arc compartment 118 the cathode cavity is closed by the floated diaphragm 759 made of refractory metal such as Mo, W, Ta, Hf, Nb or similar separated from the water-cooled cathode cavity by ceramic spacer 763. The floated diaphragm 759 has a nozzle 761 with the opening 761*a* opened to the primary arc compartment 118. The cathode 108 can be optionally provided with pumping port to maintain a necessary low pressure within the cathode 108 as shown in FIGS. 7*f*3, 7L6. The primary arc discharge is conducted between the cathode 108 and grounded walls of the primary arc compartment 118, powered by the primary arc power supply 533. The remote arc is conducted between the cathode 108 and remote anode 551 in remote anode compartment 106, powered by the remote arc power supply 535. The reaction gas supply line 602*a* is connected to the remote anode compartment 106 while additional optional buffer gas supply line 601*b* can be provided to the primary arc compartment 118 to dilute reaction by-products and prevent poisoning of the cathode chamber 108. The reaction zone is established within the plasma duct 1*c* located between the primary arc compartment 118 and remote anode compartment 106, separated from the cathode compartment by the baffle 582 with nozzle-opening 582*a*. The diameter of the opening 582*b* in the nozzle 582*a* is ranging from 0.1 mm to 2 cm, while typically within the range from 0.1 mm to 1 cm. The nozzle 582*a* with small opening 582*b* allows to substantially increase the operating pressure within the coating deposition area of the plasma duct 1*c* due to large hydraulic resistance of the gas passage through the narrow orifice 582*b* in the nozzle 582*a* due to plasma viscosity which increases dramatically with increase of the plasma temperature, electrophoretic effect due to friction of the neutral particles against opposite electron flow and large magnetic pressure, proportional to $B^2$, where B is magnetic field generated by the large remote arc current within narrow orifice 582*b*, which is generated by squeezing the current carrying plasma within the narrow opening 582*b*, adding the magnetic pressure produced by the electric current transmitted through the narrow nozzle opening 582*b* to the total gas pressure in the plasma duct 1*c*. If the diameter of the opening 582*b* less than 0.5 mm the nozzle 582*a* may not withstand the large heat flow from plasma and melt. When the opening is greater than 5 cm, the effect of pressure increase in coating deposition compartment 1*c* is insufficient. In a horizontal tubular reactor with rectangular cross-section the substrate holder typically consists of two water-cooled holder plates 542*a* and 542*b* adjacent to the bottom and top walls of the chamber 542, electrically isolated by the electrically insulative substrate holding ceramic cover 4 with substrates to be coated 2 facing the remote arc plasma flow. The substrate holding spacer 4 can be made, for example, from BN ceramics, alumina or fused quartz to prevent short circuiting of the remote arc discharge at increased pressures.

In another advanced embodiment of the filtered cathodic arc method and apparatus for generation of energetic particles in coating deposition reactor for deposition of diamond coatings of FIG. 7*w*1, FIG. 7*w*2 illustrates the horizontal tubular multi-arc reactor 1 with rectangular cross-section comprising the rectangular chamber 542 comprising the plasma duct 1*c* where the reaction area of the reactor is located with attached multiple set of cold vacuum arc hollow cathodes with self-recreating inner evaporating surface 108*a* through 108*d* on one side, electrically connected to the corresponding remote anodes 551*a* through 551*d* on the opposite side of the plasma duct 1*c* by a set of remote arc power supplies 535*a* through 535*d*. Each cathode chamber is connected to the independent pumping line via pumping line port protected by the mesh screens 568*a* through 568*d*, as was shown in FIG. 7*f*3. In this large area planar reactor the substrates-to-be-coated 2 are distributed across the areas of the remote arc plasma columns, which can be extended in transversal direction by magnetic scanning or rastering the current-carrying remote arc plasma columns by application of alternative external magnetic field perpendicular to the reactor's plane as shown in FIG. 7*s*, which makes the entire deposition area uniformly filled with dense remote arc plasma. In refinement, a set of intermediate primary arc compartments 109 can be disposed between each of the cathodes 108 and plasma duct 1*c* as illustrated in FIG. 7*w*3. The primary arc cathode compartments 109 with attached cathodes 108 are separated from each other by the separating baffles 584 and separated from the plasma duct 1*c* by the baffle 582 with nozzle-openings 582*a,b,c,d* located in each separate primary arc compartments 109*a,b,c,d* to prevent the remote arc generated by the given cathode of the set of cathodes 108 from passing throughout different primary arc compartment of the set of the primary arc compartments 109. In this setup the primary arc discharges are conducting within the primary arc chambers 109*a* through 109*d*, powered by the primary arc power supplies 533*a* through 533*d*, while the remote arc discharges are conducting between the cathodes 108*a* through 108*d* and corresponding remote anodes 551*a* through 551*d* protruding through primary arc chambers 109*a* through 109*d*, entering the plasma duct 1*c* through the nozzles 582*a* through 582*d* and crossing the plasma duct 1*c* toward the remote anodes 551*a* through 551*d*, powered by the remote arc power supplies 535*a* through 535*d*.

In advanced variation of the embodiment of the filtered cathodic arc method and apparatus for generation of energetic particles in coating deposition reactor for deposition of diamond coatings of FIG. 7*w*1, FIG. 7*w*4 shows the cross-section of the reactor 1 with cathode 108 attached in angular positions to the plasma duct 1*c*. The cathode 108 is attached to two primary arc compartments: 109*a* on side of the plasma duct 1*c* and 109*b* on opposite side of the cathode 108. Each primary arc compartment 109 has independent pumping ports: 603*a* for the primary arc compartment 109*a* and 603*b* for the primary arc compartment 109*b*. The primary arc compartment 109*a* is separated from the plasma duct 1*c* by the baffle 582 with nozzle 582*a* isolated from the baffle 582 by ceramic spacer 582*c*. The nozzle 582*a* has opening 582*b* to conduct the remote arc from the primary arc compartment 109*a* to the plasma duct 1*c*. The primary arc anode 552*a* is maintained in the primary arc compartment 109*a*, which is connected to the pumping station via pumping port 603*a*. The primary arc anode 552*b* is located in the opposite primary arc compartment 109*b*, which is connected to the pumping station via pumping port 603*b*. The primary arc discharge is ignited in the primary arc chamber 109*a* between the cathode 108 and the primary anode 552*a*, powered by the primary arc power supply 535*a* and, optionally, additional primary arc discharge ignited between the cathode 108 and the primary anode 552*b* in the opposite primary arc chamber 109*b*, powered by the primary arc power supply 535*b*, for increasing stability and non-interruptive operation of the primary arc plasma generation by the cathode 108. Optionally, the additional primary arc current is conducting to the grounded walls of the primary arc compartments 118*a* and 118*b*, powered by the primary arc power supply 533. The high temperature diaphragms 759 and 760 made of refractory materials are located at opposite sides of the cathode 108: the diaphragm 759 is facing the primary cathodic arc chamber 109*a* of the low pressure compartment 118*a*, which is connected to the plasma duct 1*c*, while the diaphragm 760 is located at the opposite wall of the cathode 108, facing the primary arc compartment 109*b* of the low pressure compartment 118*b*. The diaphragms 759 and 760 are optionally provided with heaters 759*a* and 760*a* to maintain its temperature greater than the boiling point of the metal coating 767 necessary for re-evaporation of the volatile metal coating 767, which covers the inner water-cooled walls 769 of the cathode 108. The metal coating 767 is typically made of Bismuth or similar metals having low boiling point and high pressure of saturation vapors to prevent condensation of the metal coating 767 vapor on hot diaphragms 759 and 760. The diaphragms 759 and 760 may also have cylindrical inserts 761 and 762 which can be optionally extended toward primary arc compartments 109*a* and 109*b* by nozzles 761*b* and 762*b* with openings 761*a* and 762*a* made of refractory metals, spaced from the diaphragms 759 and 760 by ceramic spacers 761*c* and 762*c*. The remote arc discharge ignited between the cathode 108 and the remote anode 551 in the remote anode compartment 106 is extended through the high pressure plasma duct 1*c* with substrates to be coated 2 positioned at the substrate-holding surface 4 of the electrically insulated ceramic plates 543*a* and 543*b* positioned on top of water-cooled holding plates 542*a* and 542*b* of the plasma duct 1*c*. The plasma duct 1*c* with primary arc compartment 118*a* and remote arc compartment 106 is optionally enclosed within the grounded chamber 542. The openings 542*c, d* are provided for equalizing the pressure between plasma duct 1*c* compartments 542*d, e*, enclosing the water-cooled holding plates 542*a* and 542*b*. The reactive gas is supplied through the gas supply line 602 positioned near the remote anode end 106, providing the reactive gas flow throughout the plasma duct 1*c* to the primary arc chamber 109*a* where it is pumped out through the pumping port 603*a*. The reactive gas is flowing throughout the opening 582*b* in the nozzle-opening 582*a*, spaced by ceramic spacer 582*c* from the baffle 582, separating the plasma duct 1*c* from the primary arc chamber 109*a*. Optionally, the portion of the reactive gas flow can go through the cathode chamber 108 toward the opposite primary arc chamber 109*b* where it is pumped out through the pumping port 603*b*. In case when the independent, second primary arc discharge, is established within the primary arc chamber 109*b*, it allows more flexibility for independent control of the remote arc discharge in the plasma duct 1*c* while keeping the primary arc discharge burning in the distant primary arc chamber 109*b* regardless of the conditions of the primary arc discharge in the proximate primary arc chamber 109*a*.

In another advanced embodiment of the filtered cathodic arc method and apparatus for generation of energetic particles in coating deposition reactor for deposition of diamond coatings of FIG. 7*p*, FIG. 7*w*5 illustrates the vertical tubular reactor 1 with substrates to be coated suspended within the plasma column by the rotating, high temperature electrically insulative, substrate-holding ceramic fiber cord 4. The ceramic fiber cord 4 can be made of alumina, basalt fiber cord, BN or quartz ceramic fiber to sustain in a temperature range from 700 C to 1100 C, typical for the diamond coating deposition process. In this reactor the primary arc discharge is ignited in primary arc compartment 118 between the self-recreating cold hollow cathode 108 and the grounded walls of the primary arc compartment 118, powered by the primary arc power supply 533, while the remote arc is conducted from the cathode 1098 through the low pressure primary arc compartment 118 and continue further through the nozzle 582*a* and further through the high pressure plasma duct 1*c* toward remote anode 551 in the remote anode compartment 106. The substrates-to-be-coated are suspended on rotating high temperature ceramic fiber cord as a substrate holder 4 along the high pressure plasma duct 1*c* for exposure to the reactive remote plasma environment for deposition of PACVD coatings, in particularly for deposition of polycrystalline diamond coatings when the plasma-creating gas composition consists, as for example, of the mixture of argon, methane and hydrogen in the typical pressure range 1-1000 Torr.

In a refinement, multiple primary cathodic arc sources are installed in cathode chamber 108 as illustrated in FIG. 7*x*. In this embodiment, several primary cathodic sources are attached to plasma duct 44 of the primary cathode chamber 108 similar to the design shown in FIG. 7*b*. This embodiment allows for using a set of primary cathodic arc sources for generation of reversed arc discharge plasma in coating chamber area 598.

In another advanced embodiment of the filtered cathodic arc method and apparatus for generation of energetic particles in coating deposition reactor for deposition of diamond coatings of FIG. 7*p*, FIG. 9*c* illustrates the industrial-scale reversed arc plasma assisted CVD reactor suitable for deposition of diamond coatings. The reactor of FIG. 9*c* includes cathode chamber 110 which, in this embodiment, includes a primary cathode arc plasma duct chamber 126 with three attached primary cathodic arc sources (without departing from the scope hereof, primary cathode arc plasma duct chamber 126 may include two, four or more primary cathodic arc sources). These three primary cathodic arc sources include top, central and bottom cathode chambers 90*t*, 90*c* and 90*u*, respective cathode targets 12*t*, 12*m* and 12*u* with respective mechanical igniters 27*t*, 27*c* and 27*b*. Each of these primary cathodic arc sources further includes steering and focusing coils 13 for stabilizing arc spots at the evaporating surface of the targets 12. In an embodiment, targets 12 are frustoconical. Optionally, the reactor of FIG. 9*c* further includes a set of vertical scanning coils 87 and a deflection coil 20 for manipulation with primary arc plasma plumes generated by vacuum arc cathode targets 12. The three primary arc discharges are powered by primary arc power supplies 26*t*, 26*c* and 26*b*, respectively. Substrates to be coated 4 are installed on substrate holders 6 connected to the shafts of the rotary substrate table 2. In the reactor of FIG. 9*c*, coating chamber 10 of reactor chamber 122 includes remote anode 70 powered by the remote arc anode power supply 131 via switch 134*c*. Without departing from the scope hereof, remote anode 70 may be installed elsewhere within the coating chamber 10 than shown in FIG. 9*c*. The substrate holding rotary table 2 may serve as remote anode powered by remote arc power supplies 29*t*, 29*c* and 29*b* having their positive terminals connected to the substrate holding rotary table 2 via switch 134*a*. The negative bias power supply 132 is connected to rotary table 2 via switch 134*b*. When switch 134*b* is open and both switches 134*a* and 134*c* are closed both rotary table 2 with substrates to be coated 4 and remote anode 70 are powered as remote anodes in reference to the primary cathode targets 12. Ballast resistors 30*t*, 30*c* and 30*b* are optionally installed between primary cathode targets 12 and remote anode 70 to limit the remote anode arc current of remote anode 70.

The gas supply line is connected to the coating chamber 10 via a gas distribution compartment 73 separated from the chamber 10 by a wall 75*b* with gas supply openings. A conventional radiation heater 71 is installed in coating chamber 10 to provide heating of substrates 4 in addition to the remote anode arc plasma heating. Radiation heater 71 allows for controlling substrate temperature within the range from 100 to 1100° C. depending on coating deposition process. The substrate temperature may be measured by an optional pyrometer 51. For ionitriding applications, the substrate temperature is typically established within the range 400-600° C. For diamond coatings, remote arc plasma assisted CVD deposition process the substrate temperature is typically in the range from 650 to 950° C. The cathode plasma duct 126 (an embodiment of plasma duct 1*c*) is provided with a pumping system to allow pumping cathode chamber 110 to lower pressures than reactor chamber 122, typically providing at least 5 times greater pressure in the coating chamber 10 than in the cathode chamber 110. Plasma duct 126 is separated from coating chamber 10 by a baffle 60 with small openings 65 impermeable for heavy particles (macroparticles, metal ions and metal atoms), while fully (or at least partly) transparent for conducting electron current of the remote arc discharge emitted by the cathode targets 12 toward remote anode 70 and/or rotary table 2. Optionally, opening 65 is provided with cylindrical shielding which may improve the stability of the remote arc discharge by the hollow cathode effect. In a refinement, each opening 65 is shielded by a disk-shape shield spaced from opening 65 and installed at either side of baffle 60 to block direct line-in-sight connection between the cathode targets 12 and coating chamber 10. Openings 65 may have a nozzle-like shape (shown in FIG. 9*e*), may be built in inserts made of refractory metals such as tungsten inserted into baffle 60, and may be provided with water cooling to prevent their overheating and degradation at high remote anode arc currents, which otherwise may generate large heat flux into the walls of openings 65. Openings 65 to enable keeping the pressure in coating chamber 10 relatively high (for example above 1 Torr) to achieve a high deposition rate of diamond coatings, while holding the pressure in the cathode chamber 110 relatively low (typically below 200 mTorr) to achieve stable operation of the vacuum cathodic arc sources. Alternatively, nozzles 65 and the baffle 60 can be made of tungsten, and/or one or more other refractory metals such as molybdenum and tantalum or from high-temperature ceramics such as alumina, and not water-cooled leaving thermal radiation losses as the only channel of cooling. In this case, in operation, when the remote arc current exceeds 100 Amperes, the temperature of the baffle 60 with openings 65 can exceed 1500 C resulting in production of large flux of nascent hydrogen in the reactor chamber 122, which increases the deposition rate of diamond coating in $H_2$—$CH_4$ reaction gas environment. A variation of the embodiment of PACVD reactor of FIG. 9*c* shown in FIG. 9*d* provides the primary cathodic arc source with a cylindrical rotational target 12 having high utilization rate. This cylindrical rotational target 12 is similar to the one shown in FIG. 6*d.*

Figure 9I:
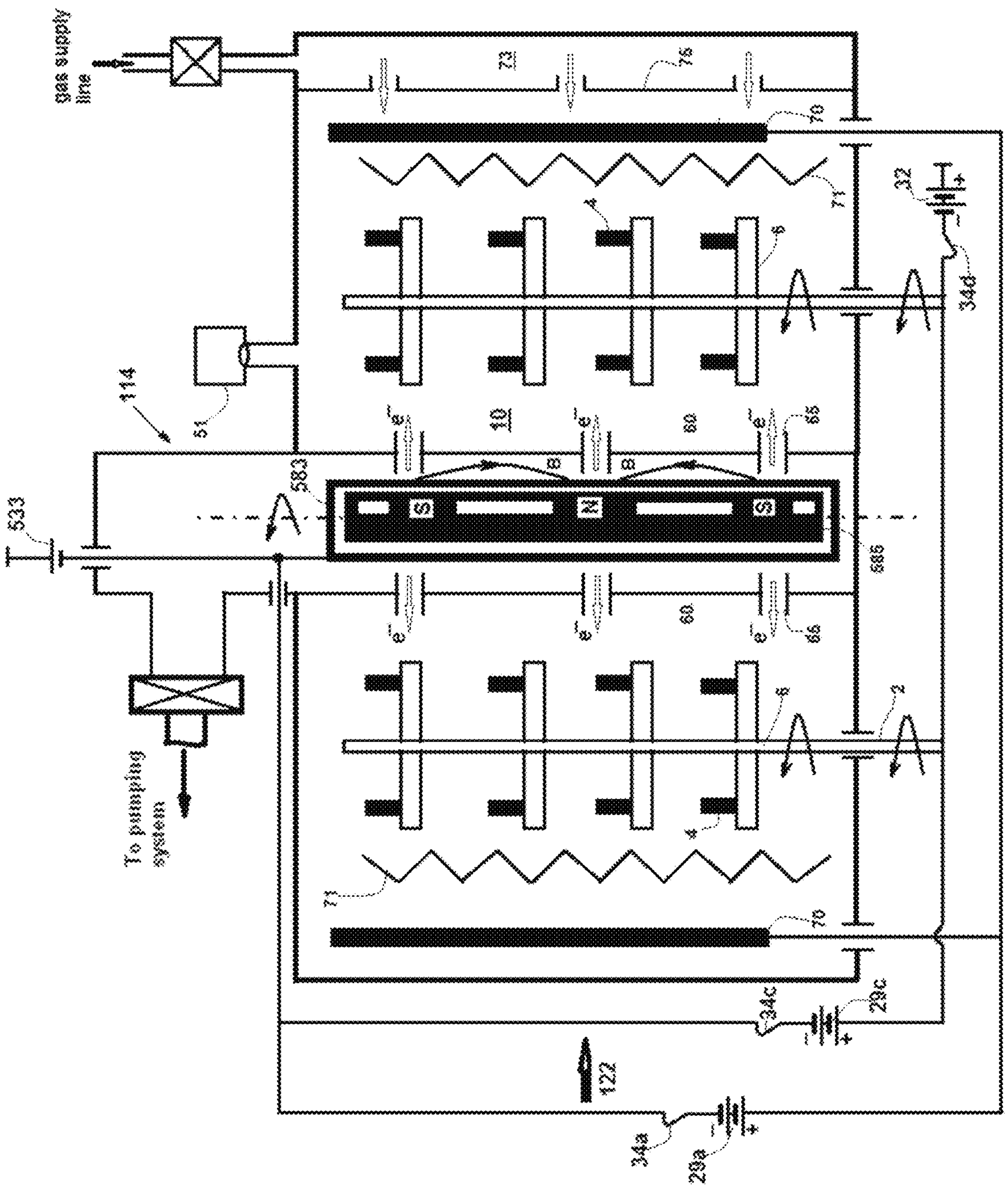

In a refinement, a cascaded reversed arc discharge can be used which allows further increasing the process pressure in coating deposition chamber 10. In reference to FIG. 9*g*, the intermediate remote arc discharge chamber 126 (an embodiment of plasma duct 1*c*) is installed axisymmetrically along the axes of reactor chamber 122. Primary cathodic arc chamber 116, which is attached to a pumping system, is connected to intermediate chamber 126 via small orifice 582*a* in the separating baffle 582 at one end of intermediate chamber 126 while remote anode 551 is positioned at the other end of intermediate chamber 126. The longitudinal magnetic field, generally parallel to the axis of reactor chamber 122, can be applied by the pair of magnetic coils 521: a top coil 521*t* is positioned around the top flange of chamber 10 and a bottom coil 521*b* is positioned around the bottom flange of chamber 10. In operation a first (intermediate) stage of the remote arc discharge is ignited between cathode 583 of the primary cathodic arc source in cathode chamber 116 and remote anode 551 in the intermediate discharge chamber 126. A second stage of the reversed arc discharge extends the first stage from the intermediate chamber through nozzle-openings 65 in baffle 60 toward remote anode 70 and/or substrate holders 2 in coating chamber 10. In a variation of this design, shown in FIG. 9*h*, the intermediate remote arc discharge is free burning between primary cathode 583 and intermediate remote anode 551 along the axis of reactor chamber 122. FIG. 9*i* shows a remote arc plasma assisted CVD reactor, suitable for deposition of diamond coatings, which is another variation of the design shown in FIG. 9*g*. In the variation shown in FIG. 9*i*, a primary cathodic arc chamber 114 with attached pumping system is positioned along the axis of reactor chamber 122. The cylindrical primary cathodic arc target 583, utilizing rotating magnetic yoke 585 is positioned along the cathode chamber 114. The electron emission arc steering area is rotating following rotation of the magnetic yoke 585 which generates an arch-shape steering magnetic field at the evaporation surface of cylindrical cathode target 583.

FIG. 9*e* shows another variation of the embodiment of FIG. 9*c*, wherein the reversed arc discharge comprises the primary cathodic arc, operating in a low pressure environment, and the anodic arc column extended into the high pressure high plasma potential remote arc compartment via small-diameter nozzle-like openings. This embodiment can be used as a plasma thruster for a spacecraft and also in place of tubular shielding of the openings 65 of the separating wall 60 of cathodic arc plasma duct 126 of PACVD reactors shown in FIGS. 9*c, d*. In reference to FIG. 9*e*, a primary cathodic arc source 1*y* includes cathode target 12 and magnetic steering coil 13 installed behind target 12. Target 12 is open to the low pressure or vacuum outer space. The vacuum cathodic arc is powered by a primary power supply 19 and ignited by the mechanical igniter 14 on cathode target 12. The vacuum cathodic arc spots are confined under the arch-shaped magnetic force lines 16*b* provided by steering coil 13 within the arc erosion corridor area 16*a* on front evaporating surface of the target 12. Primary cathodic arc source 1$y$ is attached to the arc plasma propulsion chambers 124 via ceramic insulator 501. Remote anodes 70 are installed within the plasma propulsion chambers 124 and are powered by remote arc power supplies 26. A remote arc plasma propellant 25*a* generated within plasma propulsion chambers 124 flows through small nozzle-shaped openings 15*b* in a front wall 15*a* of the plasma propulsion chambers 15, thus generating the driving thrust for the spacecraft.

In a variation, the reversed arc arcjet thruster shown in FIG. 9*e* can be transformed into low pressure plasma spray source as illustrated in FIG. 9*e*1. In this embodiment, the low pressure anodic arcjet plasma spray system 122 consists of the primary vacuum cathodic arc source 1$y$ located in low pressure area adjacent to the remote anode chamber 124. The cathodic arc source 1$y$ is generating the primary arc between the cathode 12 and grounded walls 15 of the anodic chamber 124, is ignited by the igniter 14 and powered by the primary arc power supply 19. The cathodic arc source 1$y$ consists of evaporated vacuum arc cathode target 12, which evaporating area is restricted by the electrically isolative ceramic barrier 501, preventing cathodic arc spots from escaping the evaporating area 16*a* and magnetic steering coil 13 positioned by the back side of the target 12. The remote arc discharge conducted between the cathode 12 and remote anode 70 located in the high pressure remote anode chamber 124. The remote arc discharge is extended from the cathode 12 toward the remote anode 70 via the water-cooled nozzle 1$x$ consisting of diverging-converging refractory metal insert-nozzle 39 spaced from the water-cooled walls 65 by ceramic spacer 502. Optionally the additional power can be added to the remote arc plasma within the area near the exit of the nozzle 1$x$ by additional power supply 26*b* connected via switch 17 between the cathode 12 and the insert-nozzle 39, which serves as intermediate remote anode. The powder supply arrangement 1$z$ can supply the plasma spray powder 37 into the plasma plume 25 near the exit of the insert-nozzle 39 in the high temperature zone of the remote arc discharge. The particles of the plasma spray powder 37 can melt and, at higher power regime even completely evaporate before getting in contact with substrate 2 located downstream from the nozzle 1$x$.

In a further variation, the reversed arc arcjet thruster shown in FIG. 9*e* may have a plurality of remote anode chambers with output anode-nozzles aligned in different directions for vector maneuvering of the space vehicle. In reference to FIG. 9*e*2, the vacuum cathodic arc source 1$y$ is attached to the side wall of the central remote arc chamber 124C, having its primary anode with chevron baffle 581 electrically connected to the walls 15 of the remote arc chamber 124C. The central remote anode chamber 124C has two anode-nozzles 15*b* of diverging type generating the plasma plume in the same direction as the direction of the cathodic arc spots metal erosion plasma producing by the vacuum arc cathode target 12. In addition this multi-source thruster has two more remote anode chambers, 124L and 124R with output nozzles aligned in the direction perpendicular to the direction of the nozzles of the chamber 124C, with nozzles of the chamber 124L directed in the direction opposite to the direction of the nozzles of the chamber 124R. Each remote anode 70L, C, R is powered by independent power supply 26L, C, R, which negative (cathodic) terminal is connected to the cathode 12. By changing the current in remote anodes 70R, C, L it is possible to control the direction of the thrust vector generating by this multi-source anodic arcjet thruster for vector maneuvering of space vehicles.

In refinement, the plasma torch-type reversed arc arcjet plasma source instead of vacuum cathodic arc source can be used as a source of electrons for the remote arc discharge as illustrated in FIG. 9*e*3. The plasma torch 1$y$ consists of the arc chamber 1*a* with gas supply line 602 and thermionic cathode 12 in a form of a rod made of thoriated tungsten. The arc chamber ends with tubular anode 18, having water-cooled channel 1*d*, which ends with converging-diverging nozzle 39 facing the outer space. The output primary converging-diverging anode-nozzle 39 can be in a form of copper tube 39, provided with water-cooled channel 1*d*. The magnetic coil 13 is installed by the output of the anode-nozzle 39, surrounding the anode-nozzle 39 for compressing the output plasma flow and magnetically steering the anode spots, improving the life span of the anode-nozzle 39. The primary arc is conducted within the arcjet 1$y$ between the thermionic rod-cathode 12 and surrounding walls of arc chamber 1*a* and anode-nozzle 39, powered by the primary arc power supply 19. The remote arc discharge is conducted between the cathode 12 and remote anodes 70 positioned in remote anode chambers 124, powered by remote arc power supplies 26*a, b*. The remote arc chambers 124 have gas supply lines 602*b, c* and have two output nozzle-openings 15*b*, having diverging end or may be of converging-diverging shape as shown in FIG. 9*e*1.

The cascade arc nozzles may be utilized both as nozzles 15*b* in reversed arc plasma thruster of FIG. 9*e* and in place of tubular shielding of the openings 65 of the separating wall 60 of cathodic arc plasma duct 126 of PACVD reactors shown in FIGS. 9*c, d* as illustrated in FIG. 9*f*. In this design, the remote arc plasma is conducted from primary cathode target 12 toward remote anode 70 through cascade arc channel 15*b*, wherein the cascade arc channel 15*b* includes a set of metal washer-sections 36 insulated by ceramic washer sections 36*b*. Optionally, the igniting circuit 3*c* includes a capacitor 141 and a bypass resistor 142 connected to selected metal sections 36 via a diode 146. In operation, capacitors 141 are discharged in turn when the arc plasma conductivity zone is moving along the cascade channel 15*b* allowing igniting arc along the narrow long cascade arc channel. The Ohmic heating of the remote arc plasma column within the narrow cascade arc channels 15*b* by the high density arc current provides higher plasma density and higher electron temperature both for coating deposition and plasma propulsion applications.

In a refinement, the anodic reversed arc arcjet thruster 122 similar to one shown in FIG. 9*f* can be provided with one-stage converging-diverging nozzle 1$x$ similar to the design shown in FIG. 9*e*1 as illustrated in FIG. 9*f*1. In this embodiment, the RF electrode 503 is inserted within the remote anode chamber 124 to increase stabilization of the remote arc discharge and ease the remote arc ignition. Two gas supply lines 602*a* for oxidizer and 602*b* for fuel can be optionally provided to the remote anode chamber 124 to contribute additional chemical energy of exothermal fuel oxidation reaction, adding to the enthalpy of the plasma plume 25, which increases the thrust generated by this anodic arcjet engine 122.

In a variation, the reversed arc anodic arcjet thruster shown in FIG. 9*f*1 can be utilized as a first stage of the two-stage arcjet/MPD electric propulsion engine 122 as illustrated in FIG. 9*f*2. This 2-stage thruster consists of at least one reversed arc anodic arcjet thruster similar to one shown in FIG. 9*f*1 as a first stage and magnetoplasmadynamic (MPD) plasma accelerator 126 as a stage 2. Typically, more than one first stage arcjet are distributed evenly in annular direction around the axes of the thruster 122, attached to the back side of the electrically insulated disk 29. The arcjet 1$^{st}$-stage thruster consists of the external primary cathodic arc source 1*y* and at least one remote anode chamber 124 attached to the back side of the electrically insulated disc 29. The water-cooled converging-diverging nozzle 1*x* is located between the remote arc chamber 124 and disk 29. The primary arc is ignited by igniter 14 between the cathode 12 of the cathodic arc source 1*y* and the primary anode in a form of chevron baffle attached to the cathode 1*y* via electrically insulative ceramic spacer 501, which is also protecting from cathodic arc spots escaping the evaporating area of the cathode target 12. The primary arc discharge is powered by the primary arc power supplies 19, while the remote arc is conducted between the cathode target 12 and at least one remote anode 70 in the at least one remote anode chamber 124 powered by the remote arc power supplies 26. The remote arc plasma is conducted from the cathode target 12, through the chevron baffle primary anode 581 and further through the MPD channel 126 and anode-nozzle(s) 39 toward at least one remote anode 70 in at least one remote anode chamber 124. The MPD plasma accelerating stage occurs within the discharge gap 126 between the central MPD rod-cathode 38 and surrounding hollow anode 36. The MPD stage 126 is attached to the front side of the disk 29, comprising the centrally located rod-cathode 38 spaced from the disk 29 by insulative ceramic spacer 28*a* and cylindrical MPD anode located in front of the disk 29, spaced from the disk 29 by insulative ceramic spacer 28*b*. The MPD plasma accelerator 126 is powered by the MPD power supply 27 connected between the rod-cathode 38 and hollow anode 36. In operation, the remote arc plasma plumes are generated by the at least one anodic arcjet source, located behind the MPD acceleration stage, generating its plasma plume through the converging-diverging nozzles 39 which is expanding through the nozzles 1*x* toward plasma accelerating gap between the central MPD rod-cathode 38 and cylindrical MPD anode 36. When the MPD stage 126 is activated the radial MPD current $I_{MPD}$ is generated between MPD anode 36 and rod-cathode 38 while the closing current is conducting along the rod cathode 38 and MPD cylindrical anode 36, generating azimuthal magnetic self-sustained field $B_{PHI}$, resulting in generation of the cross $I_{MPD}\times B_{PHI}$ configuration, which induces large Lorentz force, proportional to the product $I_{MPD}\times B_{PHI}$ within the arcjet plasma plume expanding within the MPD plasma accelerating gap 126 between MPD anode 36 and rod-cathode 38, which allows to substantially increase the total thrust generating by the arcjet/MPD 2-stage thruster 122 vs. one-stage arcjet thruster. The MPD stage 126 of the 2-stage arcjet/MPD thruster can work both in continuous power and in pulse power mode. In pulse power mode, the high energy accelerating pulses are imposed upon the plasma plume generated by the arcjet stage adding to the total thrust produced by the 2-stage thruster 122. The chemical energy can be also optionally added to the total thrust generated by this arcjet/MPD thruster by supplied nfuel and oxidizer into the remote anode chambers of the reversed arc anodic arcjet 1$^{st}$ stage through the gas supply lines 602*a, b, c, d.*

In a variation of the two-stage hybrid thruster shown in FIG. 9*f*2, a Hall effect thruster can be utilized as a second plasma accelerating stage 122*b* of the two-stage hybrid thruster 122 instead of MPD stage while keeping the reversed arc arcjet 1$^{st}$ stage, as illustrated in FIG. 9*f*3*a*. The second, Hall effect thruster stage 122*b*, comprises the annular ring-shape plasma channel 126, created by two coaxial cylindrical ceramic tubes: outer tube 28*a* and inner tube 28*b*, typically made of BN ceramics, built upon coaxial magnetic circuit 245, comprising outer cylindrical magnetic core 245*a* magnetized by outer magnetic coil 13*a* and central magnetic core 245*b*, magnetized by central magnetic coil 13*b* install on the back plate 245*c*. The magnetic core is made of sof magnet alloy such as Armco iron or Hyperco Fe—Co alloy. The primary cathodic arc source of electrons 1*y*, external to the channel 126, can be thermionic cathode, hollow cathode or vacuum cathodic arc source similar to one shown as a primary cathodic arc source 1*y* in FIGS. 7L3, 9*e*3, 9*f*1 and 9*f*8. In reference to FIG. 9*f*3*a*, the cold vacuum arc cathode, filament thermionic cathode or hollow cathode can be used as a cathodic arc source 1*y* of remote arc plasma discharge for the 2-stage anodic arcjet/Hall-effect thruster 122, utilizing the body of the thruster as primary anode-keeper, although, optionally, a separate anode-keeper can be used to support the primary arc discharge in front of the Hall effect thruster stage 122*b* channel exit as shown in FIG. 9*f*3*e*1*a*. The electron source 1*y* is also used as a cathode-neutralizer to neutralize the charged ion beam generated by the Hall effect thruster 2$^{nd}$ stage 122*b*. The ring-anode 70*a* of the Hall effect thruster stage 122*b*, positioned by the entrance of the ceramic channel 126 has at least one opening in a shape of converging-diverging nozzle 39. The exit opening of the nozzle 39 is facing the entrance of the annular ceramic channel 126, while the entrance of the nozzle 39 is opened to the remote anode chamber 124 with remote anode 70. The narrowest portion of the nozzle 39 in its critical cross-section can have diameter ranging from 0.1 mm to 1 cm. If the diameter of the narrowest opening of the nozzle 39 is less than 0.1 mm the separation of the negative and positive charges may occur, which will prevent the formation of the plasma flow through the nozzle 39. If the diameter of the nozzle 39 is greater than 1 cm the hydraulic resistance developed by the gas flow across the nozzle 39 will not be large enough to produce the large pressure difference between the remote anode chamber 124 and the channel 126 necessary for producing high-speed dense reversed arc plasma jet flowing through the nozzle 39 into the channel 126. The anode-nozzle 39 may be spaced from the remote anode chamber 124 by the back portion 28*c* of the isolative ceramic tubes 28*a* and 28*b*. Typically, a plurality of anode-nozzles 39 are inserted within the annular anode ring 70*a* positioned by the entrance of the channel 126, evenly spaced in angular direction from each other. The gas flow speed in the remote anode chamber 124 is slow, not exceeding ⅓ of the sound speed velocity at the gas temperature in the remote anode chamber 124, while the high speed gaseous plasma plume and a flow of high speed ions is produced across the nozzle-openings 39, having gas speed ranging from ⅓ to 20 times of the gas speed of sound at the temperature within the remote anode chamber 124. The primary arc discharge is conducted between the cathode 1*y* and the metallic walls of the enclosure of the outer side 245*a* of the coaxial magnetic system 245, powered by the primary arc power supply 19 with primary arc plasma located outside of the thruster 122, while the remote arc discharge is conducted between the cathode 1*y* and the remote anode 70 in the remote anode chamber 124 when the remote arc plasma is extending from the cathode 1*y*, through the annular channel 126 and further via anode-nozzle(s) 39 toward the remote anode 70. It is appreciated that the primary arc discharge is ignited between the cathode source 1*y*, typically of a hollow cathode type, and the anode-keeper positioned outside of the channel 126 of the thruster (shown in FIG. 9*f*3*e*1*a*). The plasma plume produced by the reversed remote anode arc discharge is extending from the anode nozzle 39 toward the accelerating area near the exit portion of the plasma channel 126. When the 2nd, Hall plasma accelerating stage 122*b*, is activated, powered by the Hall-effect $2^{nd}$ stage 122*b* power supply 27 connected between the cathode 1*y* and the annular anode ring 70*a* with inserted anode-nozzles 39 when the switch 17 is closed, the longitudinal ion-accelerating electrical field is created within the bulk plasma in the channel 126, as a result of interaction of the radial magnetic field produced by the coaxial magnetic system 245 within the gap between the inner and outer walls 28*a* and 28*b* of the plasma channel 126 and the azimuthal electron current produced by electrons trapped by the radial magnetic trap near the exit of the plasma channel 126. The electric field generated within the accelerating area in the exit portion of the channel 126 by the Hall-effect stage 122*b* of the 2-stage hybrid thruster 122 is typically larger than the electric field which is produced by the not-magnetized reversed arc plasma discharge generated by the remote anode 70 through the anode-nozzle 39, but the ion energies produced by acceleration of the ions by the plasma potential drop across the nozzle 39 of the $1^{st}$ stage reversed arc arcjet thruster 122*a* are contributing to the increase of the total ion energies generated by the 2-stage thruster 122. In addition the reversed remote anode arc discharge based arcjet produced by the remote anode 70 in the remote discharge chamber 124 is contributing to dramatic increase of the ionization in the ionization area adjacent to the anode-ring 70*a* at the entrance of the ceramic channel 126 resulting in the further increase of the thrust generating by the 2-stage thruster 122 in comparison with thrust generating by the each of its single stages 122*a* and 122*b*.

In a variation of the 2-stage hybrid anodic arcjet/Hall-effect thruster 122 shown in FIG. 9*f*3*a*, the remote anodes 70*a, b* in the high pressure remote anode chamber 124 can also serve as a Hall-effect thruster anode, skipping the connection between the cathode 1*y* and the ring-chambers 15*a, b*. In reference to FIG. 9*f*3*b*, the ring-shape primary cathodic arc source 1*y* embraces the 2-stage anodic arcjet/Hall-effect thruster 122, insulated from the outer magnets 245*a* enclosure 245*c* by ceramic spacer 501*e*, which is, together with outer insulator barrier 501*a* serves as a barrier to prevent the escape of the cathodic arc spots from the front evaporating surface of the cathode target 12. The cathodic arc spots on a surface of the cathode target 12 are magnetically steered by the magnetic steering coil 13 located behind the area of cathodic arc evaporation 16*a* on front surface of the ring-target 12, defined by arch-shaped magnetic field 16*b*. More magnetic steering coils can be added to the back side of the target 12 to increase the cathodic arc steering area as described above in the description to the FIG. 3*n*. The Hall-effect stage anode compartment in a form of a ring-cavity 124, containing at least one remote anode of the group of remote anodes 70 also has attached gas-propellant supply line 602. The remote anode chamber 124 is located by the entrance of the Hall-effect thruster ceramic channel 126, adjacent to the back side 501*d* of the ceramic channel 126. The anode chamber 124 is electrically floated and isolated from all electrically powered components of the thruster 122. The front wall of the anode chamber 124 has at least one narrow nozzle-opening connecting the anode chamber 124 with the channel 126. The primary arc discharge is running between the cathode target 12 and the metal enclosure 245*c*, serving as a primary anode and which also serves as a magnetic core, made of magnetically soft alloy such as Armco steel enclosing the outer magnets 245*a* of the Hall-effect stage. The primary arc discharge is powered by the primary arc power supplies 19*a, b*. The magnetic shunt back plate made of the soft magnetic alloy such as Armco iron can be placed behind the channel 126 to connect the outer magnetic core 245*c* and the inner magnetic core which can be positioned along the center line in the inner pole of the thruster as shown in FIG. 9*f*3*e*. The remote arc discharge is protruding from the cathode target 12 through the Hall-effect channel 126 and continue through the nozzles 39 toward remote anodes 70 in the remote anode chamber 124, powered by remote arc power supplies of the group 26*a, b*. The nozzle-orifices 39 critical diameter is ranging from 0.1 mm to 10 mm. If the diameter of the orifice 39 is smaller than 0.1 mm it can affect charge separation in the plasma media which can block the formation of the reversed arc jet trough the nozzle-orifice 39 while if the orifice 39 is greater than 1 cm it cannot produce a stationary bottleneck shock-wave separation barrier across the nozzle-orifice 39 to secure high pressure high plasma potential in the remote anode arc compartment 124 vs. low pressure low plasma potential in the channel 126, which is necessary for generation of high speed reversed arc jet. The high-speed reversed arc plasma plume produced through the stationary shock-wave barrier developing across the nozzle-orifices 39 is characterized by the gas speed ranging from third of the speed of sound to 20 Mach, i.e. 20 times the speed of sound at the gas temperature in the remote anode compartment 124, driving by the pressure difference between the remote anode arc compartment 124 and the outer space, while at the same time is characterized by large ion energies ranging from 50 to 200 eV due to the acceleration of the ions by the plasma potential barrier developing across the nozzle-orifice 39. In sharp contrast, the gas flow in the remote anode compartment 124 is characterized by relatively small gas flow velocity, typically 3 times less than speed of sound at the gas temperature of the remote anode arc compartment 124 and, in most cases, creating a stagnation zone with stationary arc plasma discharge environment in the remote anode arc compartment 124. In operation, the primary arc vacuum cathodic arc source 1*y* is ignited by striking its front evaporating surface by the igniter 14, which ignites the primary arc discharge between the cathode target 12 and the metal enclosure 245*c* of the outer magnets 245*a* of the Hall-effect stage thruster. After ignition the primary arc discharge the remote arc discharge is ignited between the cathode target 12 and the at least one remote anode 70*a, b* in the remote anode compartment 124. At this time a large plume of the reversed remote anode arc plasma jet is injected into the Hall-effect stage channel 126 where its ions are accelerating by the electric field generated within the channel 126 in the accelerating area near the exit of the channel 126 where the magnetic field is generally transversal to the walls of the channel 126. The thrust generated by the primary cathodic arc evaporation process by the vacuum arc source 1*y* is adding to the thrust generated by the Hall-effect thruster (HET) stage combined with the thrust generating by the reversed arc plasma jet.

In a variation, the Hall effect thruster 122 shown in FIG. 9*f*3*b*, additional ionization power can be superimposed upon the plasma flow within the HET channel 126 by applying either RF voltage or high voltage positive DC pulses upon remote anode chamber 15*a*. In reference to FIG. 9*f*3*c* the RF generator 540 is connected to the anode chamber 15*a* via capacitor 543 while the DC arc power supplies 19 and 26 are protected by inductance 571 and by-pass capacitor 575. In this design the RF voltage is superimposed upon DC discharge within the HET channel plasma flow.

In another variation of the HET 122 shown in FIG. 9*f*3*b*, the radial magnetic field within the HET channel 126 can be generated by a set of radially magnetized permanent magnet rings 245. In reference to FIG. **9*f*3*d*, a set of the outer ring magnets 245*a*1, 245*a*2 and 245*a*3 are surrounding the outer side of the HET ceramic ring-channel 126, while the inner ring magnets 245*b*1, 245*b*2 and 245*b*3 are installed along the inner pole 129 adjacent to the thruster's central line, surrounded by the inner wall of the ceramic channel 126. The permanent magnet rings 245*a* and 245*b* are magnetized radially in a way that the opposite magnetic poles are facing each other from the outer side of the inner rings 245*b* to the inner side of the outer rings 245*a*, creating the radial magnetic field near the exit portion of the HET channel 126. The width of the radially magnetized rings 245*a* and 245*b* as well as their magnetization level can be adjusted to optimize the distribution of the radial magnetic field within the channel 126 to increase the thrust and minimize the sputtering degradation of the ceramic channel 126** via magnetic shielding effect.

In a variation of the embodiment of the Hall effect thruster (HET) of FIG. **9*f*3*d*, the thruster 122 is embraced by the magnetic core 245 having outer pole 245out, back plate 245 back and inner pole 245in housing the hollow cathode 12 positioned in the bore of the inner pole 245in along the axes of the thruster 122. The hollow cathode is typically made of refractory metals such as Ta, Mo, W and has the outlet orifice 12*a* facing the exit side of the thruster 122. The hollow cathode 12 is electrically insulated from the inner pole 245in by ceramic sleeve 501*d*. The electron thermionic emission insert 12*c* made with barium oxide (BaO), lanthanum hexaboride (LaB6) or other composite materials consisting of components with low starting temperature of thermionic electron emission, is positioned at the end of the hollow cathode channel adjacent to the outlet opening 12*a*. The cylindrical inner portion of the magnetic core 245in ends by the anode-keeper 581*a* facing the outer space with outer opening 581*b* for releasing the thermionic arc plasma ignited between the hollow cathode 12 and the anode-keeper 581*a*, which is powered by the primary arc power supply 19 connected between the hollow cathode 12 and magnetic core 245. All inner sides of the radially magnetized ring-magnets 245*a*1, 245*a*2, 245*a*3 are chamfered toward the back side of the channel 126 to shift the inner magnetic poles toward the back side 501*a* of the ceramic channel 126. The additional, radially magnetized ring magnet 245*f*, also chamfered toward the back side of the channel 126 is positioned on the top of the outer tubular portion of the magnetic core 245out coaxial to the thruster 122. As a result, the magnetic force lines $B_{sh}$ inside of the channel 126 have concave shape with its radius of curvature directed toward the back side 501*a* of the ceramic channel 126, effectively shielding the ceramic walls 501*b* and 501*c* of the ceramic channel 126 from the sputtering by the energetic ions generating inside of the channel 126 by the E×B discharge plasma. The front ring-magnet 245*f* is generating the inner magnetic field lines Bin connected to the outer portion of the inner pole 245in while the outer magnetic force lines Bout are forming the magnetic cusp directed away from the thruster 122 toward the outer space, which creates a conversion-diversion magnetic nozzle in front of the thruster 122**.

In a refinement, the magnetic field of the thruster 122 is produced by a pair of permanent magnets with opposite magnetization, optionally enveloped within the magnetic core 245 as illustrated in FIG. **9*f*3*e*1*a*. The permanent ring-magnet 245*a*3 is positioned within the outer pole 245out of the optional magnetic core 245 surrounding the outer portion 501*b* of the ceramic channel 501, typically in the middle of the ceramic channel 501, distant from the top ring magnet 245*f* positioned on the top of the outer pole 245out. In reference to FIG. 9*f*3*e*1*a*, the anode-keeper is insulated from the inner pole magnetic core 245in by ceramic spacer 501*d*, while the hollow cathode 12 is insulated from the inner pole core 245in by ceramic sleeve 501*e*. The gas supply line 602*a* is provided to the back side of the remote anode compartment 124, while a separate gas supply line 602*b* is provided to the back side of the hollow cathode 12. The permanent ring magnets are magnetized in the opposite direction to each other to generate the magnetic field transversal to the channel 126 of the thruster in the ion acceleration area near the exit of the channel 126. In the area the electrons trapped in the radial magnetic field B r are drifting around the channel 126 under E×$B_r$ magnetic field, where E is electric field directed along the channel 126 is produced by the remote arc discharge conducted between the cathode 12 and the at least one remote anode 70 in the remote anode compartment 124. The remote arc plasma plume is released from the remote anode compartment 124 through the at least one nozzle-opening 39*a*, *b* toward the plasma generation area of the channel 126 adjacent to the front side 15*a* of the body 15 of the remote anode container 124. The magnetic field $B_z$, generally parallel to the axes of the thruster, is extended between the magnet ring 245*a*3 and the back ceramic plate 501*a*. The reversed arc plasma jet expanding from the remote anode compartment through the nozzle-opening 39*a*,*b* toward the channel 126 is further densified under the influence of the longitudinal portion of the magnetic field $B_z$ generated by the pair of the oppositely magnetized magnet rings 245*a*3 and 245*f* within the plasma generation area near the remote anode compartment 124 at the bottom portion of the channel 126**.

In a variation of the Hall effect thruster of FIG. **9*f*3*e*1*a* the radial magnetic field crossing the ceramic channel 126, necessary for running the Hall effect thruster discharge, can be produced by a pair of electromagnetic coils surrounding the channel 126 and having opposite direction of the magnetic fields as illustrated in FIG. 9*f*3*e*1*b*. In reference to the FIG. 9*f*3*e*1*b*, two electromagnetic coils are placed in a position surrounding the outer ceramic tube 501*b* of the ceramic channel 126: the top coil 245*a*, positioned near the exit portion of the ceramic channel 126 and the bottom coil 245*b* positioned typically in the middle of the channel 126. When this pair of magnetic coils produce the opposite magnetic fields, the inner radial portion of the produced magnetic force lines are crossing the channel 126 creating a transversal magnetic field necessary to support the Hall effect discharge plasma which is characterized by the azimuthal electron drift current Jar of the magnetized electrons in $E_z$×$B_r$ field, where $E_z$ is a longitudinal electric field directed along the axes of the channel 126 and Br is a radial magnetic field perpendicular to the axes of the channel 126. Optionally, the body of the thruster 245 can be made of soft magnetic metal such as Armco iron or Hyperco alloy to serve as a magnetic core for concentrating the magnetic field within the channel 126. This optional magnetic core includes the outer pole 245out with backplate 245*c* and optional inner pole 245in. The inner pole 245in is surrounding by the inner tube o501*a* of the ceramic channel 126, while it top end is shielded by the ceramic disc 501*d***.

The thruster of FIG. **9*f*3*e*1*b* is also utilizing the multilayer hollow cathode setup 12*y* positioned in the bore of the central pole 245in along the axes of the thruster 122. The hollow cathode setup 12*y* consists of the hollow cathode 12 typically made of thin-wall tube of refractory metal such as Ta, Mo or W. The gas feed line 602*b* is connected to the bottom end of the cathode tube 12. The anode-keeper 70*a* is made of metal tube coaxial to the hollow cathode 12 and separated from the cathode 12 by dielectric ceramic sleeve 501***e*, which can be made, for example, of quartz or alumina. The ceramic dielectric anode sleeve tube 501*f* is positioned along the outer surface of the anode-keeper tube 70*a* to prevent against the cascade arcing breakdown between the anode-keeper tube 70*a* and the inner pole 245in. The anode-keeper tube 70*a* has opening 39*b* to release the thermionic arc plasma plume for igniting the main discharge between the hollow cathode 12 and the remote anode 70 positioned in the main anode container 124 at the back of the thruster's ceramic channel 126. The gas feed line 602*a* is supplying the propellant gas, typically Xe or Kr, to the remote anode container 124. The active thermionic emission insert 12*c* typically made with barium oxide (BaO), lanthanum hexaboride (LaB6) or other composite materials consisting of components with low starting temperature of thermionic electron emission, is positioned at the end of the hollow cathode channel adjacent to the outer opening 12*d* of the hollow cathode tube 12. The thermionic arc discharge between the hollow cathode 12 and the anode-keeper 70*a* is located in the area 12*a* between the hollow cathode opening 12*d* and the anode-keeper opening 39*b*. The primary thermionic arc discharge between the cathode 12 and the anode-keeper 70*a* is powered by the primary arc power supply 19*a*. After the discharge between the cathode 12 and the anode-keeper 70*a* is ignited, the power supply 19*b* is powered the main discharge between the hollow cathode 12 and the remote anode 70 in the remote anode container 124 with attached propellant gas feed line 602*a* starting the operation of the thruster 122.

In a further variation of the Hall effect thruster of FIG. **9*f*3*e*1*a*, the thruster 122 is provided by the nested hollow cathode 12 positioned axisymmetrically within the bore of the inner pole of the thruster. In reference to FIG. 9*f*3*e*1*c*, the nested hollow cathode has the 1st primary cathode discharge stage consisting of the heated thermionic filament 12***b* positioned in the dielectric compartment 502*c*, typically made of quartz, positioned behind the inner pole 245in of the thruster 122. The primary thermionic cathode compartment 502*c* is provided with cathode gas feed inlet 602*b*. The filament 12*b*, typically made of BaO impregnated tungsten, is heated by the AC current conducted from the AC electric power supply via terminal 26*d*. The dielectric ceramic or quartz primary cathode discharge tube 502*a* is extended from the compartment 502*c* coaxially along the bore of the inner pole 245in forming the primary cathode discharge channel 502*b*, which is ending in a proximity to the front end of the inner pole 245in where the optional anode keeper disc 70*c* is positioned separated from the top end of the inner pole 245in by the ceramic spacer 501*e*. The hollow cathode tube 12*c*, typically made of refractory metals such as Ta, Mo, W, is surrounding the dielectric discharge tube 502*a* coaxially to the discharge tube 12*c*. The hollow cathode tube 12*c* ends in the vicinity of the front end of the inner pole 245in leaving a small cavity 12*d* between the end of the dielectric discharge tube 502*a* and the opening 12*a* at the end of the hollow cathode tube 12*c*, which is positioned close to the front end of the inner pole 245in. The thermionic emission insert made with barium oxide (BaO), lanthanum hexaboride (LaB6) or other composite materials consisting of components with low starting temperature of thermionic electron emission, is positioned at the end of the hollow cathode tube 12*c* adjacent to the outer opening 12*a*. Optionally, a ceramic or quartz sleeve 502*d* is covering the cathode tube 12*c* to prevent the arc breakdown between the hollow cathode tube 12*c* and the inner pole 245in. The primary thermionic arc discharge is powered by the primary arc power supply 19*a* installed between the thermionic primary cathode filament 12*b* and the hollow cathode tube 12*c* which serves as a primary anode for the primary thermionic arc discharge when the switch 26*e* is closed. The optional anode-keeper 70*c* is powered by the anode-keeper power supply 19*b* installed between the hollow cathode 12*c* and the anode-keeper 70*c* when the switch 26*c* is closed. The thruster's anode discharge is powered by at least one of the power supplies 26*a*, 26*b* installed between the hollow cathode tube 12*c* and the at least one of the thruster's remote anodes 70*a*, 70*b*. In operation, first, the primary thermionic arc discharge is ignited between the heated thermionic filament 12*b* and the hollow cathode tube 12*c* creating a primary thermionic arc discharge within the channel 502*b* inside of the dielectric sleeve 502*a*. The primary thermionic arc discharge is heating the active thermionic emission insert 12*e* positioned at the end of the hollow cathode discharge cavity 12*d* at the distant end of the hollow cathode tube 12*c*. When the thermionic emission insert 12*e* reaches the temperature of the thermionic emission, the switch 26*c* is closed and the power supply 19*b* is ON igniting the second thermionic arc discharge between the hollow cathode 12*c* and the optional anode-keeper 70*c*. After this stage, the power supplies 26*a*, 26*b* are ON and the main discharge between the hollow cathode 12*c* and at least one of the thruster's remote anodes 70*a*, 70*b* is ignited starting the thruster operation. The second stage of the thermionic arc discharge between the hollow cathode 12*c* and the optional anode-keeper 70*c* can be skipped and the main discharge between the filament 12*b* and the thruster's anodes 70*a*,70*b* can be ignited immediately after the first stage of the thermionic arc discharge between the filament 12*b* and the hollow cathode 12*c* is ignited.

In a variation of the two-stage hybrid anodic arcjet/Hall thrusters 122 shown in FIGS. **9*f*3*a*, 9*f*3*e*1*b*, the nested multi-stage thruster utilizing two parallel Hall effect ion acceleration stages enhanced by the reversed arc plasma generation stages is shown schematically in FIG. 9*f*3*e*1*d*. In this thruster, both Hall effect accelerating stages, the centrally positioned inner stage 122***b* and the outer stage 122*a*, are aligned axisymmetrically around the common axes. Both accelerating stages 122*a* and 122*b* are installed at the same bottom plate 245*a* made of magnetically soft metal (for example Armco steel, Hyperco and similar soft magnet alloys) and is a part of the comprehensive magnetic core 245 of the thruster 122. The inner Hall effect thruster stage 122*b* consists of the inner pole core built of central tubular part 245*d* connected to the disc 245*c* at its front end and screen 245*e*. Electromagnetic coil 14*b* is positioned in the gap between the tube 245*d* and the screen 245*e*. The hollow cathode 12 is positioned within the bore of the tube 245*c* coaxially to the thruster 122*b*. The dielectric ceramic channel 126*b* typically made of BN is covering all inner walls of the magnetic core and is also covering the top end sides 245*b* and 245*c* of the inner pole and outer pole of the inner thruster 122*b*. It is appreciated that the ceramic channel 126 of the plasma thruster can be also made of other ceramics as, for example, alumina or diamond-glass composite made of a mixture of diamond grid with borosilicate glass with additions of rare earth elements which is first molded in a green body followed by firing at the temperature ranging from 750 to 850° C. The ceramic channel 126*b* of the inner Hall effect thruster 122*b* is made of the inner ceramic wall 28*b* and the outer ceramic wall 28*a*. The ceramic channel 126*a* of the outer thruster 122*a* is made of the inner ceramic wall 28*c* and outer ceramic wall 28*d*. The anode-keeper 70*c* with hole 70*d* for release of the thermionic discharge plasma plume is positioned on the top disc portion 245*c* of the inner pole tube 245*d* separated from the disc 245*c* by the top portion 28*h* of the inner wall 28*b* of the ceramic channel 126*b*. When magnetic coils 14*a* and 14*b* are generating the magnetic field in the opposite directions, the transversal portion of the magnetic field lines is crossing the channel of the inner thruster 122*b* within the ion accelerating area 1*a*. The magnetic lens is developed by the portion of the magnetic field lines released through the gap 245*g* between the edge of the front disc portion of the tubular core 245*c* and the inner screen 245*e* of the inner pole of the thruster 122*b* and closing through the gap 245*h* between the top portion 245*b* of the outer pole and the outer screen 245*g*. The magnetic field produced by the magnetic lens near the exit of the ceramic channel 126*b* of the thruster 122*b* is shielding the ceramic walls of the thruster's channel 126*b* from erosion due to ion bombardment (magnetic shielding effect) and, at the same time producing the transversal magnetic field across the channel 126*b* of the inner thruster 122*b* forming an ion accelerating zone 1*a* of the inner thruster 122*b*. In the ion accelerating zone, the electrons trapped in the radial (transversal to the channel 126*b* axes) magnetic field Br are generating the azimuthal drift current $J_{dr}$ under influence of the $E_z \times B_r$ fields, while the ions are accelerating along the axes of the thruster by the longitudinal $E_z$ field. The pair of electromagnetic coils 13*a* and 13*b* surrounds the outer thruster 122*a*. They are generating the magnetic fields with opposite directions producing the transversal (radial) portion of the magnetic field lines across the channel 126*a* of the outer thruster 122*a*, forming the outer accelerating zone 2*a*. The primary cathodic arc discharge is ignited between the hollow cathode 12 with active thermionic insert 12*c* adjacent to the output hole 12*a* and the anode keeper 70*c* with hole 70*d* for the release of the current carried thermionic arc discharge plasma outside of the inner pole. The reversed arc discharge of the inner thruster 122*b* produces the intense ionization and generate the dense plasma plume flowing through the orifices 39*a*, 39*b* in the remote anode compartment 124*b* toward the channel 126*b*. The reversed arc plasma plume is entering the plasma generation area 1*i* adjacent to the remote anode compartment 124*b* with remote anode 70*b* and propellant feed line 602*b*. The reversed arc discharge plasma of the inner thruster 122*b* is generating within the high-pressure high plasma potential area inside of the remote anode compartment 124*b*, generating the dense plasma jet through the holes 39*a*, 39*b* in the body 15*b* of the anode cavity 124*b* increasing the ionization and plasma generation efficiency in the plasma generation zone 1*i* of the inner thruster 122*b*. The reversed arc discharge of the inner thruster 122*b* is powered by the power supply 26*b* connected between the hollow cathode 12 and the remote anode 70*b*. At the same time, the primary thermionic arc discharge is extended toward the remote anode 70*a* in the remote anode compartment 124*a* of the outer thruster 122*a*, forming the outer reversed arc discharge powered by the power supply 26*a* connected between the cathode 12 and the remote anode 70*a* in the remote anode compartment 124*a* of the outer thruster 122*a*. This reversed arc discharge generates the plasma jet flowing from the remote anode compartment 124*a* through the orifices 39*c*, 39*d* toward the channel 126*a* increasing ionization and plasma generation efficiency in the plasma generation zone 2*i* adjacent to the anode compartment 124*a* of the outer thruster 122*a*. In this design one hollow anode 12 is supplying the electron current to support two anode discharges: one of the outer thruster 122*a* and another one for the inner thruster 122*b* simultaneously generating dense plasma within the ionization zone of both inner and outer thrusters 122*a* and 122*b*, which result in improvement of the thrust, specific impulse Isp and effectiveness of the thruster.

In a variation of the two-stage hybrid anodic arcjet/Hall thruster 122 shown in FIGS. **9*f*3*a*, 9*f*3*b*, a thruster with anode layer or TAL thruster can be utilized as a second stage thruster 126 instead of Hall-effect thruster with long ceramic channel, making a hybrid anodic arcjet/TAL, two-stage thruster 122 as illustrated in FIG. 9*f*4. In TAL thruster the dielectric ceramic walls of the ceramic channel shown in FIG. 9*f*3*a* are replaced with metal walls while the radial magnetic field is produced by the permanent magnet or, optionally, magnetic coil 13***b*, positioned behind the anode ring 39*a*. The magnetic field lines of the radial magnetic field are extending generally parallel to the surface of the metal anode ring 39*a*, effectively trapping the magnetized electrons in front of the anode, producing the anodic plasma layer of magnetically trapped magnetized electrons, having high electric resistance across the layer (and across the radial magnetic field) allowing to sustain large electric field defined by the voltage drop across the anodic plasma layer of trapped electrons adjacent to the anode surface. The ions accelerated by this electric field across the anodic layer can reach the energy value about the voltage drop between the cathode 1*y* and the TAL anode 39*a*, typically ranging from 100V to 1000V, powered by TAL power supply 27. The converging-diverging anode-nozzle 1*z*, electrically isolated by ceramic tube 501*a* both from the walls 15 of the remote anode chamber 124 and, at the same time, from the TAL anode 39*a*, is positioned coaxially in the center of the opening in the anode 39*a*, immediately behind the anode 39*a*, spaced from the anode 39*a* by the ceramic guard ring 39*b*. The opening of the anode-nozzle 1*z* on diverging side 39*d* is merging with the diverging-opening of the anode ring 39*a* while the opposite, converging side 39*c* of the anode-nozzle 1*z*, is facing the remote anode chamber 124 with remote anode 70. Optionally, the anode-nozzle 1*z* can be electrically connected to the anode-ring 39*a*. The coil 13*b* is also serving as a focusing coil surrounding the anode-nozzle 1*z*. Primary arc discharge is ignited by igniter 14 between the vacuum arc cathode 12 and primary anode-baffle 581 of the external vacuum arc source 1*y*, powered by the primary arc power supply 19. The remote arc discharge is conducted between the vacuum arc cathode 12 and the remote anode 70 in the remote anode chamber 124, powered by the remote arc power supply 26*a*. The remote arc plasma is extending from the cathode target 12 through the anode ring 39*a* and further via the anode-nozzle 1*z* toward the remote arc anode 70. Optionally, the intermediate remote arc can be conducted between the cathode 12 and anode-nozzle 1*z*, powered by the intermediate arc power supply 26*b*. In operation, the plasma propellant such as Xe is supplied to the remote arc chamber 124 via gas supply line 602, remote arc discharge is ignited between the cathode 1*y* and remote anode 70 while the primary arc is ignited between the cathode target 12 and the primary anode-baffle 581. The remote arc plasma plume is extended from the remote anode chamber 124 throughout the anode-nozzle 1*z* and further expanding throughout the anode-ring 39*a* and away from the thruster toward the outer space. The total thrust of this 2-stage thruster 122 will consist of the arcjet thrust in addition to the thrust produced by the ions accelerated by the second TAL stage.

In a variation of the axisymmetric thruster shown in FIG. **9*f*1 a 2D arcjet thruster or plasma torch 122, utilizing the arc column in a crossfields of aerodynamic and magnetic forces is shown in FIGS. 9*f*5 through 9*f*8. The plane view of the 2D arcjet thruster setup shown in FIG. 9*f*5 comprises a cascaded remote anode chamber 124 made of a set of narrow sections 541***a* separated from each other by electrically insulative spacers 541*b*. In case of radiation cooling design, the sections 541*a* can be made of refractory metals such as Molybdenum or Tungsten, while spacers 541*b* can be made of alumina or BN ceramics. Alternatively, the cascaded stuck of sections 541*a* can be made of high purity copper and water cooled by providing the water channels throughout the sections 541*a* in which case the flexible sealing gaskets made of Viton or Buna O-rings synthetic rubber can be used in place of the insulative spacers 541*b*, separating the neighboring sections 541*a* and defining the water-cooling channels. The plasma creating gas or, in case of electric thruster, the propellant, is supplied via gas delivery port 602 and optionally spread evenly across the chamber 124 by shower-head type gas distribution arrangement. Two remote anodes 70*a* and 70*b* are positioned at both ends of the chamber 124, installed into side lids 29*a* and 29*b*, while the external cathodic arc source of electrons for remote arc discharge 1*y* is positioned outside of the chamber 124 adjacent to it in the low pressure area. It can be thermionic cathode as shown in FIG. 9*f*5, consisting of the thermionic filament 12 heated by AC or DC power supply 610 or, alternatively, hollow cathode or vacuum arc cold cathode. The primary arc is powered by the primary arc power supply 19 connected between the cathode 12 and the adjacent lid 29*b* of the remote anode chamber 124 while the remote arc is ignited between the cathode 12 and both remote anodes 70*a* and 70*b* powered by independent power supplies 26*a* and 26*b*. The cross section of the individual section 541*a* of the cascaded stuck of sections forming the remote anode chamber 124 is shown schematically in FIG. 9*f*8. It consists of the high pressure remote arc discharge cavity 1*c*, the output converging-diverging nozzle 1*z* with diverging portion 39 facing low pressure outside area and, optionally, water-cooling channels 1*d*. The plasma-creating gas is flowing throughout the arc column, which is confined and is holding by the magnetic field transversal to the arc current $J_a$, produced by a pair of external coils 13*a, b* positioned at opposite sides of the section 541*a*. The transversal magnetic field is interacting with arc current producing the Lorenz force proportional to the product $B \times J_a$, which is directed opposite to aerodynamic force imposed upon arc column by the transversal gas flow. The balance between Lorenz force and aerodynamic force keeps the arc in stable position along the anode chamber 124.

In refinement, the remote arc chamber 124 of the 2D arcjet thruster 122 can be equipped with additional cathodic arc compartment 118 attached to the side lid-flange 29*a* of the remote anode chamber 124 opposite to the remote anode 70 installed to the lid-flange 29*b*. The additional cathode compartment 118 comprises the primary arc chamber 109 with self-recreating cold hollow cathode 108 installed in annular position in relation to the axes of the anode chamber 124 as shown in FIG. 9*f*6. The self-recreating cathode 108 utilizes self-recreating metal coating 767 with low boiling point, covering water-cooled inner walls 769 of the cathode chamber 108 as shown in FIG. 9*f*6 and, in more details, explained in FIGS. 7*f*2, 7L6, 7*w*1. The primary arc is ignited within the primary arc compartment 109 between the cathode 108 and the walls of the arc compartment 109. The arc compartment 109 has a pumping port which pumps out the plasma-creating gas coming from the remote anode chamber 124 through the narrow opening 582*b* in the nozzle 582*a* located in the baffle 582, separating primary arc compartment 109 from the cascaded remote arc chamber 124. The plasma-creating gas is supplied to the remote arc chamber 124 via gas supply port 602. The pressure in the remote arc chamber exceeds the pressure in the primary arc chamber at least 2 times but typically more than by order of magnitude due to high hydraulic resistance of the nozzle-opening 582*a* and high magnetic pressure, proportional to $B^2$, where B is magnetic field, generating within the narrow opening 582*b* by large remote arc current conducting through the narrow opening 582*b*. Alternatively, the cathodic arc source attached to the lid-flange 29*a* can be of the type of thermionic cathode, hollow cathode or plasma torch similar to one shown in FIG. 9*e*3 as illustrated in FIG. 9*f*7.

In reference to FIG. 9*f*7, the plasma torch-type arc source 118, attached to the lid-flange 29*a* of the remote anode chamber 124 comprises the thermionic rod-cathode 12*b*, insulated from the walls 15 of the plasma torch chamber 118 by insulative ceramic spacer 501*a*, the arc chamber 118, optionally water-cooled, having the inner side of its walls 15 covered by electrically isolative ceramics 501*b* and output anode-nozzle 39 downstream from the rod-cathode 12*b*, facing the remote anode chamber 124, separated from the plasma torch walls 15 by insulative ceramics 501*b*, as shown schematically in FIG. 9*f*7. The primary arc discharge in plasma torch chamber 118 is conducting between the rod-cathode 12*b* and anode-nozzle 39, powered by plasma torch power supply 19*b*. The additional remote arc discharge is conducted along the remote anode chamber 124 between the cathode 12*b* and remote anode 70, powered by the additional remote arc power supply 26*b*, the direction of its arc current is shown by the arrow. The first remote arc discharge is conducted between the outside cathode 12*a* and remote anode 70, powered by first remote arc power supply 26*a*. The current of the additional remote arc discharge is directed from the remote anode 70 toward additional cathode 12*b* along the remote anode chamber 124 as shown in FIGS. 9*f*6, 9*f*7 by arrow. In this case the stability of the arc column position within the remote anode channel 124 is secured using the crossfields confinement by applying the external magnetic field B perpendicular to the additional arc current $I_a$ direction in such a way that the product Lorentz force $\sim I_a \times B$ is directed in opposite direction against the plasma creating gas flow which is crossing the arc column, imposing the aerodynamic forces on arc column directed toward the exit of the 2D nozzle of the remote arc chamber 124 as shown schematically in FIG. 9*f*8.

FIG. 9*f*9 shows another variation of the embodiment of arcjet thruster 122 shown in FIG. 9*f*1, utilizing the magnetic nozzle. In reference to FIG. 9*f*9, the arcjet thruster 122 comprises the remote anode chamber 124 provided with gas-propellant inlet 602 and output converging anode-nozzle 1*x*, optionally water-cooled (as shown in FIG. 9*e*1, which is useful mostly for applications other than electric propulsion), attached to the water-cooled walls 15 of the remote anode chamber 124. The remote anode 70 is connected to the outside cathode 1*y* via remote anode power supply 26*a*, whiles the converging anode-nozzle 1*x*, isolated from the walls 15 of the remote anode chamber 124 by the tubular ceramic insulator 501*a*, is connected to the outside cathode 1*y* via power supply 26*b* for conducting the intermediate remote arc discharge between the cathode 1*y* and the output anode-nozzle 1*x*. The primary arc is ignited between the primary anode shield 581 with chevron baffle positioned in front of the cathode target 12. The primary anode chevron shield 581 is transparent for the electrons emitted by the cathode target 12 which can flow freely through the chevron shield 581 toward outer space and contribute to production of the remote arc discharge. Two magnetic coils: the focusing coil 13*a* surrounding the anode-nozzle 1x and the magnetic nozzle coil 13b positioned ahead of the coil 13a and surrounding the arc plasma plume propagating along the discharge tube 501c, typically made of non-conductive ceramics such as fused quartz, alumina or BN are extended ahead of the anode-nozzle 1x and embracing the output plasma plume, generated by the anode-nozzle 1x. The magnetic field generated by the combination of the focusing coil 13a and the magnetic nozzle coil 13b has converging-diverging topology, with its converging portion merging with the converging output portion 39 of the anode-nozzle 1x, while its diverging portion is directed toward the outer space. This magnetic topology represents the converging-diverging magnetic nozzle 1z, which is enable to densify reversed arc discharge plasma plume leaving the converging portion 39 of the anode-nozzle 1x, while, at the same time, accelerating the highly ionized arc plasma propellant flow generated by the reversed arc discharge within the anode-nozzle 1x to hypersonic speeds increasing the thrust, generated by the thruster 122. Another positive effect of the magnetic nozzle 1z is detachment of the plasma propellant flow from the discharge tube 501c walls, since the operation of the magnetic nozzle 1z is based on contactless plasma confinement effect. In refinement, additional plasma focus ion acceleration stage is installed by the exit of the anode-nozzle 1x of the 2-stage thruster 122 as illustrated in FIG. 9/10. It consists of the remote anode chamber 124 with the remote anode 70 and the output anode-nozzle 1x consisting of the converging anode-nozzle channel 39 electrically insulated both from the walls 15 of the remote anode chamber 124 by the tubular ceramic insulation 501a and from the plasma focus anode 595 by the ceramic disk-spacer 501d. The high-voltage plasma focus acceleration stage 1w is attached to the exit of the anode-nozzle 1x, electrically insulated from the nozzle 1x by the ceramic insulation disk-spacer 501d. The plasma acceleration stage 1w comprises the tubular axisymmetric high-voltage anode 595 consisting of the outer tubular-cylindrical portion 595a, enclosed in electrically isolative tubular ceramic shield 501b and the inner high voltage frustoconical anode 595b positioned in the center of the anode 595. The high-voltage anode 595 is covered by the ceramic insulation shield, including the outer tubular portion 501b and the back disk portion 501d electrically insulating the high-voltage anode 595 from the anode-nozzle 1x positioned between the remote anode chamber 124 and the high-voltage anode 595. The central bore in the inner frustoconical portion 595b of the anode 595 has an optional central tubular ceramic insert 501c forming an electrically insulated ceramic channel 1u which is extending the channel 582 of the anode nozzle 1x. The optional metal anodic wire array 591 is positioned between the outer converging surface of the frustoconical anode 595b and the inner surface of the cylindrical walls of the outer portion 595a of the high-voltage anode 595. The wires in the anodic wire array 591 are generally parallel to each other and decline by the acute angle to the axes of the thruster 122. The external cathode assembly 1y comprises the cathode target 12, the igniter 14 and the primary anode shield 581a with front chevron baffle 581, which is positioned outside of the plasma acceleration area, attached by the metal anodic bracket 581b to the ceramic disc 501d, electrically isolated by ceramic spacers 501f and 501d. In operation, the primary arc discharge, powered by the primary arc power supply 19, is ignited between the cathode target 12 and the primary anode-shield 581a with chevron baffle 581 as a primary arc anode following by ignition of the remote arc discharge by extending the primary arc plasma through the chevron baffle 581 and further through the channel 1u in the frustoconical portion 595b of the high-voltage anode 595 and continue through the channel 582 of the anode-nozzle 1x toward the remote anode 70, powered by the remote arc power supply 26a, while the optional, intermediate remote arc discharge is established between the cathode target 12 and the anode-nozzle 1x, powered by the power supply 26b connected between the cathode 12 and anode-nozzle 1x via switch 26c, to further increase the power density in the remote arc plasma. Alternatively, switch 26c can be opened to keep the anode-nozzle 1x floated. The reversed arc plasma flow is expanding from the high pressure high plasma potential area within the remote anode chamber 124 through the propulsive anode-nozzle channel 582 and further through the channel 1u in the frustoconical section 595b filling with dense remote arc plasma the axisymmetric cavity 597 of the high-voltage anode 595. The anodic arc plasma density within the anodic plasma cavity 597 is further increasing by additional intermediate remote arc discharge between the cathode 12 and the high-voltage anode 595 with wire array 591, powered by the power supply 27. The plasma potential within the wire array 591 is higher, typically ranging from 30V to 200V in reference to the plasma potential near the axes of the thruster where the virtual cathodic plasma zone is established by the direct connection to the cathodic plasma area adjacent to the cathode 1y. The unipolar positive high voltage pulses are applied to the anodic plasma area 597 of the high-voltage anode 595 by the unipolar pulse power supply 531 when the switch 543 is closed, while the diode 547c is protecting the low voltage arc power supplies from high voltage pulses. The high positive voltage pulses applied to the high-voltage anode 595 are ranging from 50 V to 1 MV. If the amplitude of these high voltage pulses is less than 50V they do not provide additional acceleration of the DC anodic plasma generated within the wire anode cavity 597 filled by the reversed arc discharge plasma conducted between the cathode 1y and the high-voltage anode 595 in addition to the reversed arc plasma plume generated by the remote anode 70 through the nozzle 1x further extended toward the cavity 597 through the channel 1u. If the amplitude of the high voltage pulses exceeds 1 MV it may create problems with insulation of the anode 595 and, subsequently, short circuit of the second, plasma focusing accelerating stage, of the thruster. At the moment when the high voltage positive pulse is applied to the anode 595 the positively charged high voltage plasma potential is created within the cavity 597, occupied by the wire anode array 591 in reference to the virtual cathode area near the thruster axes. This high voltage drop accelerates the plasma ions toward the axes of the thruster creating the high-speed plasma jet near the axes of the thruster 122, flowing away from the thruster toward the outer space, which is contributing to increase of the generated propulsive thrust.

In a further variation of the thruster 122 shown in FIG. 9/1, in 2-stage arcjet thruster 122 shown in FIG. 9/1 both the vacuum arc discharge cathodic stage and the reversed arc discharge anodic stage are aligned coaxially as illustrated in FIG. 9/11. In this 2-stage thruster the vacuum cathodic arcjet stage 1y is located coaxially within the primary converging-diverging anode-nozzle 1x, isolated by the tubular ceramic enclosure 501a. The vacuum cathodic arcjet consists of the rod cathode 12 electrically isolated by the ceramic sleeve 501b, attached to the cathode holding bracket 12b. The gap between the rod cathode 12 and the walls 39 of the primary vacuum cathodic arc discharge anode-nozzle 1x are opened both to the high pressure high plasma potential remote anode chamber 1b, housing the remote anode 70, on the back side of the nozzle 1$x$ and to the low pressure low plasma potential outer space in front of the anode-nozzle 1$x$. The propellant gas supply line 602 is provided to the remote anode chamber 1$b$. Magnetic steering external coil 13 is positioned immediately behind the cathode rod 12 surrounding the anode-nozzle 1$x$ to generate the diverging magnetic field with magnetic force lines declined by acute angle to the side surface of the cathode rod 12, expanding away from the diverging portion of the anode nozzle 1$x$ toward outer space, which enable of steering the cathodic arc spots, directing their motion toward the outer end of the cathode rod 12, facing the outer space, which is governed by the acute angle rule of the magnetic steering motion of the arc spots ["Handbook of Vacuum Arc Science and Technology", ed. by R. L. Boxman, D. M. Sanders, and P. J. Martin, Park Ridge, N.J.: Noyes Publications, 1995]. The high voltage pulse spark plasma igniter 14$b$ connected to high voltage DC pulse power supply outlet 14 is located at the side wall of the diverging portion 39 of the anode-nozzle 1$x$. The arc igniter consists of ignition electrode 14$b$ electrically isolated from the anode-nozzle 1$x$ by ceramic sleeve 14$a$. The primary arc discharge between the cathode rod 12 and the anode nozzle 39 is powered by the primary arc power supply 19, while the remote arc power supply 26 is powered the reversed arc discharge between the cathode rod 12 and remote anode 70 which is protruding from the rod-cathode 12 throughout the nozzle 1$x$ toward the remote anode 70 filling the gap between the rod-cathode 12 and the walls 39 of the anode-nozzle 1$x$ with dense reversed arc plasma.

In refinement, the thrust generated by the vacuum arcjet thruster 122 shown in FIG. 9$f$11 can be further improved by superimposed unipolar DC pulse arc discharge applied within the discharge gap of the anode-nozzle 1$x$ between the rod-cathode 12 and the surrounding anode-nozzle walls 39 filled by the dense reversed arc plasma, as illustrated in FIG. 9$f$12. In this case, the external cathodic arc source 1$a$ is installed near the outer side wall of the remote anode chamber 1$b$, isolated from walls 15 of the anode chamber 1$b$ by ceramic spacer 501$b$, which is also limiting the evaporation area on the evaporation surface of the cathode target 12$e$, similar to the thrusters shown in FIGS. 9$f$ and 9$f$1. The ceramic spacer 501$b$ has a groove 501$d$ preventing against short circuiting of the cathode target 12$e$ to walls 15 of the anode chamber 1$b$ by the formation of the thin metal film deposited from the cathodic arc metal plasma plume producing by the cathode target 12$e$. The primary cathodic arc discharge is ignited between the cathode target 12$e$ of the external cathodic arc source 1$a$ and the wall 15 of the anode chamber 1$b$, powered by the primary arc power supply 19. The main stationery reversed arc discharge is ignited between the cathode 12$e$ of the cathodic arc source 1$a$ and the remote anode 70 in the anode chamber 1$b$, powered by the reversed arc power supply 26$a$. The reversed arc discharge is conducted from the cathode target 12$e$ of the external cathodic arc source 1$a$ through the anode-nozzle 1$x$ toward the main remote anode 70, filling the discharge gap between rod cathode 12 and the diverging portion 39 of the converging-diverging anode-nozzle 1$x$ with dense reversed arc discharge plasma. Optionally, additional, intermediate remote arc discharge, can be ignited between the cathode 12$e$ of the external cathodic arc source 1$a$ and the anode-nozzle 1$x$, powered by the intermediate arc power supply 26$b$ to further increase the reversed arc plasma density within the anode nozzle 1$x$. When the dense plasma is generated within the anode-nozzle 1$x$, the pulse accelerating power can be added to the remote arc plasma within the anode-nozzle 1$x$ discharge gap between the rod-cathode 12 and the diverging portion 39 of the anode-nozzle 1$x$ by applying the high voltage high current positive pulses generated by the unipolar pulse arc power supply 531 when the switch 543 is closed by discharging the capacitor 805, controlled by the trigger 807, while the diode 547$b$ separates the pulse power supply 531 from the stationary power supply 26$b$, optionally also connected to the anode-nozzle wall 39. Alternatively, the RF generator can be used instead of the DC pulse generator 531 to provide superimposed RF power to the rod-cathode 12 simultaneously with DC current providing by arc power supplies as was shown in FIGS. 3$m$1, 7$f$5, 9$f$3$c$. In this case the DC arc power supply should be protected by additional inductance installed in series with DC arc power supplies as shown in FIGS. 3$m$1, 7$f$5, 9$f$3$c$.

In a variation of the embodiment of vacuum arcjet thruster 122 shown in FIG. 9$f$12, the remote anode setup 106 comprises the remote anode chamber 1$b$ with sectional remote anode 70 enabling to reduce the remote arc current conducted to each section of remote anode 70 while maintaining high total remote arc current conducted between the external cathode 1$a$ and the sectional remote anode 70. In reference to FIG. 9$f$13 the remote anode sections 70$a$, 70$c$, 70$d$ and 70$e$, positioned in the remote anode chamber 1$b$, are powered by a set of independently controlled remote arc power supplies 26$a$, 26$c$, 26$d$ and 26$e$ connected between the cathode source 1$a$ and each of the corresponding sections of the group of sectional remote anode 70. Reducing the remote arc current conducted through each section of the remote anode stack 70 allows to eliminate the probability of formation of the anodic arc spot attachment on the surface of each remote anode section hence reducing or, practically completely eliminating the erosion and degradation of the remote anode during the reversed arcjet operation at high reversed arc currents, increasing the operation life span of the thruster.

In a further variation of the embodiment of arcjet thruster 122 with sectional remote anode setup 106 shown in FIG. 9$f$13, the remote anode setup 106 comprising the cylindrical sectional remote anode chamber 106 positioned immediately behind the output of the converging-diverging nozzle 1$x$, surrounding by the focusing magnetic coil 13$a$, as illustrated in FIG. 9$f$14. The set of the remote anode disc-sections 541$a$ through 541$f$ are positioned coaxially to the output converging-diverging nozzle 1$x$, forming a sectional cascaded reversed arc discharge channel 1$b$. Each anode section of the group of remote anode sections 541, typically in a form of disc made of refractory metal such as tungsten or molybdenum, is cooled by radiation, but can be also, optionally, made of high purity copper and water-cooled for applications different than electric propulsion. Each anode section is separated from each other by the isolative ceramic spacers 543$a$ through 543$f$. Each anode section is powered by individual power supply 26$a$ through 26$f$. In operation the gas propellant is supplied to the anode chamber 1$b$ via the gas supply line 602 connected to the back of the sectional remote anode chamber 106. The plasma creating gas is supplied tangentially to the walls of the reversed arc channel 1$b$, using swirling gas inlet 602$a$, to create a vortex gas flow for improvement of the arc column confinement along the axes of the reversed arc channel 1$b$ and preventing against formation of the anodic arc spots on the anode sections 541. In addition, the external magnetic coil 521 generates the longitudinal magnetic field parallel to the axes of the channel 1$b$ which improves the stability of the reversed arc column, densities the reversed arc discharge plasma and rotate the anodic attachments if they are formed on the anode sections to reduce or completely eliminate the anodic spots erosion of the anode sections 541. The primary vacuum cathodic arc source 1*a* is attached to the nozzle 1*x* by the anodic bracket 581*a*, insulated from the nozzle 1*x* by the ceramic shielding 501*a*. The primary arc discharge is ignited by the igniter 14 between the vacuum arc cathode 12 of the primary vacuum cathodic arc source 1*a* and the primary anode 581 in a form of chevron baffle positioned in front of the cathode target 12, powered by the primary arc power supply 19. After the primary arc is ignited a set of remote arc power supplies 26*a* through 26*f* are turned ON, igniting the remote arc plasma which extends from the cathode target 12 through the nozzle 1*x* toward the anode sections 541*a*, 541*b*, 541*c*, 541*d*, 541*e*, 541*f* of the remote anode chamber 106, splitting its anode attachments between the anode sections 541*a* through 541*f*, preventing against unwanted formation of the anode spots at high anode currents. The pressure in the reversed arc discharge channel 1*b* exceeds the outer pressure 10 to $10^6$ times and more, typically ranging from 1 Torr to few atmospheres due to large hydraulic resistance of the diverging-converging nozzle 1*x* with small constriction orifice in the critical cross-section of the nozzle between its converging and diverging portions for generation of the supersonic reversed arc outflow plasma jet of the thruster 122 with gas velocity ranging from ⅓ to 20 speeds of sound at the gas temperature inside of the channel 1*b*. The large difference of the gas pressure in the high pressure high plasma potential area inside of the channel 1*b* and low pressure low plasma potential downstream of the nozzle 1*x* is also due to high magnetic pressure generating within the constrictor area of the converging-diverging nozzle 1*x* when the large remote arc current is conducted through the narrow constrictor of the nozzle 1*x*. The large pressure difference between the channel 1*b* and the outer space, where the pressure is typically less than $10^{-3}$ Torr and, at high orbits, even less than $10^{-5}$ Torr, is also due to large magnetic pressure created when the arc current, typically ranging from tens of amperes to hundreds and thousands of amperes, is conducting through the narrow opening of the constrictor of the nozzle 1*x*. In sharp contrast, the gas flow inside of the channel 1*b* is relatively slow, not exceeding ⅓ of the speed of sound at the gas temperature within the channel 1*b*. Optionally, three magnetic coils are positioned at the end of the remote anode chamber 106, surrounding the output nozzle 1*x* to provide the magnetic nozzle effect upon the output reversed arc plasma plume with the opportunity to deflect the output plasma plume by deflecting magnetic field generating by the coils 13*b* and 13*c* positioned at acute angle to the axes of the thruster 122 in relation to the axially symmetric magnetic field generated by the central coil 13*d* magnetically coupled with the focusing coil 13*a*.

In a further variation of the embodiment of reversed arc discharge arcjet thruster 122 with sectional remote anode setup 106 shown in FIG. 9*f*14, additional plasma torch-type arc plasma source 1*y* can be installed at the entrance of the sectional remote anode chamber 106 to provide the following: (1) to increase the power consumption within the reversed arc channel 1*b*; (2) to increase the output plasma yield; (3) to increase the thrust generated by this thruster; and (4) to assist the ignition of the reversed arc and improve the reversed arc discharge stability in the remote arc chamber 106. In reference to FIG. 9*f*15 the plasma torch-type arc plasma source 1*y* is attached to the entrance of the remote anode chamber 1*b*, spaced from the chamber 1*b* by electrically isolative ceramic shielding 501*c*. The plasma torch 1*y* has independent gas supply line 602*b*, while the plasma-reactive gas flow is supplied directly to the remote anode chamber 106 using the gas supply line 602 through the tangential to the reversed arc channel 1*b* inlet 602*a* for producing a swirling gas flow in the channel 1*b*. The plasma torch 1*y* has design similar to one shown in FIG. 9*e*3, consisting of the arc chamber 1*a* with gas supply line 602*b* and thermionic cathode 12*b* in a form of a rod made of thoriated tungsten. The arc chamber ends with the converging-diverging anode-nozzle 1*z*, electrically isolated both from the walls 15 of the arc torch chamber 1*a* and from the remote anode chamber 106 by spacer 501*d* and ceramic shielding 501*c*. The primary arc in the arc torch chamber 1*a* is conducted between the thermionic rod-cathode 12*b* and the output converging-diverging anode-nozzle 1*z*, having its diverging portion 39*b* facing the channel 1*b* of the sectional remote anode chamber 106. The primary arc in the arc torch 1*y* is powered by the primary arc power supply 19, while, optionally, it can also supply additional current to the anode sections 541*a* through 541*f* using the remote arc power supply 26 connected between the rod-cathode 12*b* and a set of remote anode sections 541. The focusing magnetic coil 13*a* is installed by the output of the sectional remote anode chamber 106, surrounding the output converging-diverging nozzle 1*x* with its diverging portion 39*a* facing the outer space, for compressing the output plasma flow generated by the nozzle 1*x*.

In refinement, the primary vacuum cathodic arc source 1*y* shown in FIG. 9*e* can utilize a dome-shape cathode target 12 surrounded by the metal-mesh anode 581 with transparency typically better than 70% as illustrated in FIG. 9*f*16. In the design of the vacuum arc thruster 122 shown in FIG. 9*f*16, the convex hemispherical mesh-anode 581 which is positioned coaxially above the dome cathode target 12, at the distance typically ranging from 1 cm to 20 cm from the cathode 12, is electrically isolated from the walls 15*a* of the thruster chamber 15 by ceramic isolators 501*a*, while the hemispherical cathode target 12 is electrically isolated from the walls 15*a* of the thruster chamber 15 by ceramic isolators 501*b*. The distance between the dome cathode outer surface 12*a* and the mesh anode 581 less than 1 cm may create overheating and fast degradation of the mesh metal anode, while if this distance exceeds 20 cm, it may require large dimensions of the thruster, which is not practical for electric propulsion applications of this type of vacuum arc thruster for small satellites. The cathode current conductors are attached to the inner surface 12*b* of the cathode dome target 12 at different positions: central position 17*b* and side positions 17*a* and 17*c*, connected to the negative terminal of the primary arc power supply 19 via ballast resistors Ra (142*a*), Rb (142*b*) and Rc (142*c*) and IGBT-type switches 147*a*, 147*b* and 147*c*. Cathodic arc is ignited at the outer surface 12*a* of the hemispherical cathode target 12 by igniter 14, typically using spark pulse plasma ignition. When the arc current is conducting to the selected spot on the inner surface 12*b* of the dome cathode target 12, by opening one of the IGBT switches, while keeping other IGBT switches closed, the cathodic arc spots will be located within one of the areas 16*a*, 16*b* or 16*c*, on the outer surface 12*a* of the cathode target 12, opposite to one of the arc current connection spots 17*a*, 17*b* or 17*c* of the arc current conductor attachments to the inner side 12*b* of the cathode target 12, which is currently conducting the arc current. For example, if the arc current is conducting to the spot 17*c*, the cathodic arc spots will be located near the area 16*c* on outer surface 12*a* of the cathode target 12, opposite to the current conductor attachment 17*c* on the inner surface 12*b* of the cathode target 12. Optionally, electromagnetic coils 13*a*, 13*b* and 13*c* can be also provided to locate the cathodic arc spots within selected areas of the outer evaporating surface 12*a* of the hemispherical cathode target 12. When one of the cols 13*a*, 13*b* or 13*c* is activated the arc spots will be located on outer surface 12*a* of the cathode target 12 within of the areas 16*a*, 16*b* or 16*c*, opposite to the electromagnetic coil which is currently activated. For instance, if electromagnetic coil 13*c* is activated, the cathodic arc spots will be locating on the outer surface 12*a* of the cathode target 12 within the area shown by arrow 16*c*, opposite to the coil 13*c* attachment to the inner surface 12*b* of the cathode target 12. The effect of the steering coils 13 over performs the effect of the arc current attachment position. If steering coils are used for positioning the cathodic arc spots on outer surface 12*a* of the cathode target 12, it is enough to use just one arc current conductor without switches. The cathodic arc spots are generating the plasma plume consisting of neutral metal atoms, metal ions and macroparticles, which is expanding toward outer space throughout the mesh anode 581, generating the thrust. The thrust generated by the cathodic arc plasma is reduced by the amount of metal plasma captured by the metal mesh anode 581, but when the transparency of the metal mesh anode 581, typically exceeding 70% and can be as high as 90%, the loss of the vacuum arc cathode jet thrust by the anode mesh obstacle does not exceed 30% and may not exceed even 10%, representing high efficiency of this type of vacuum arc thruster (VAT). Switching the direction of the plasma plume by switching the location of the arc spots on the outer surface 12*a* of the cathode 12, results in switching of the correspondent direction of the reaction forces driving the space vehicle (satellite), allowing for vector maneuvering of the satellite without using multiple independently operating thrusters. The shape of the cathode target and the corresponding mesh anode of the VAT 122 do not have to be semispherical. It can be also cylindrical or made of almost full sphere with small opening for the current conductors or of other axially symmetrical 3D shape, having a top side for generating the thrust in axial symmetrical direction and side surface for generating thrust toward side directions for vector maneuvering of the satellite. In refinement, the concave shape of the vacuum cathodic arc target 12 of the VAT 122 can be used instead of the convex target as illustrated in FIG. **9*f*17. This design allows to mitigate and even completely eliminate the contamination of the spacecraft body by the metal vapor plasma plume generated by the VAT 122**.

In a variation, the remote anode chamber 124 can be attached directly to the back side of the cathodic arc source 1*y* with output de Laval nozzle 39 integrated within the vacuum arc cathode target 12 as shown in FIG. **9*f*18. In reference to FIG. 9*f*18, the remote anode chamber 124 is attached to the back side of the vacuum cathodic arc source 1***y*. The top wall 15*a* of the remote anode chamber 15 has a hole 15*b* having the diameter greater than the diameter of the cathodic assembly 12*a* The remote anode chamber 124 is positioning below the cathodic arc source 1*y* separated from the cathode assembly 12*a* by the ceramic spacer 501*a*. The top wall 15*a* of the remote anode chamber body 15 has a tubular wall 581 which is taller than the cathode assembly 12*a* and extended above the cathode target 12, surrounding the cathode target 12, and serving as a primary anode. The primary arc discharge is powered by the primary arc power supply 19 which is installed between the cathode 12 and the primary anode cylinder 581, while the reversed remote arc discharge is conducted between the cathode 12 and the remote anode 70 in the remote anode chamber 124, powered by the reversed arc power supply 26. The reversed remote arc discharge plasma plume is flowing throughout the de Laval nozzle 39 from the high pressure high plasma potential remote anode chamber 124 toward low pressure low plasma potential area of outer space, contributing to the total thrust generated between the vacuum cathodic arc and the plasma plume producing by the remote arc plasma through the nozzle 39.

The reversed remote arc discharge allows to use the insulative dielectric ceramic nozzles for arcjet thrusters. In reference to the FIG. **9*f*19, the cylindrical reversed arcjet thruster 122 has ceramic dielectric converging-diverging nozzle 39 which can be made of BN ceramics. The converging angle of the nozzle 39 is typically 60°, its diverging angle is ~30° while the diameter of the throat portion 39***a* can be as small as 0.1 mm. The rod-shaped remote anode 70 with arrow-head tip 70*t* inserted within the converging portion of the nozzle 39 with minimal distance to the nozzle, typically not exceeding 1 mm can be powered by the remote arc power supply 26 while its negative pole is connected to the hollow cathode 12 positioned in the outer space. The focusing magnetic coil 20 is focusing and densifying the plasma flow within the nozzle 39 and also protects the nozzle against sputtering by the magnetic shielding effect. Stationary shock-wave front is created within the throat 39*a* of the nozzle 39 separating the high pressure/high plasma potential area within the stagnation remote anode chamber 15 and low-pressure low plasma potential outer space. The ions are accelerated across the stationary shock-wave front creating across the bottleneck throat 39*a* of the nozzle 39 reaching the kinetic energy comparable to the remote anode potential in the stagnation remote arc chamber 15 typically ranging from 50 eV to 200 eV. The reversed arc discharge current carrying plasma is generated between the hollow cathode 12 and the remote anode 70 having large portion of ohmic energy dissipating within the bottleneck throat 39*a* of the nozzle 39 without its degradation by anode spots attachment typical for the conventional arcjets using metal anode-nozzles.

In refinement, the multiple-jet remote arc thruster 122 can utilize the multi-orifice diaphragm 39 as illustrated in FIG. **9*f*20, generating the increased thrust in comparison with single-nozzle thruster 122 shown in FIG. 9*f*19. In reference to the FIG. 9*f*20, the pressure within the remote anode chamber 15 is maintained at a significantly higher level than in the low-pressure area of the vacuum chamber or in outer space by the following factors: (1) high hydraulic resistance of the orifice with stationary shock wave front, (2) electrophoretic forces due to friction of the electron flow against opposite gas flow, and (3) magnetic pressure generated by the remote arc current squeezed within the small orifice. The increase of the pressure in the stagnation remote arc chamber 15 due to magnetic pressure generated by the arc current squeezed within the throats/orifices 39***a*, 39*b*, 39*c* and within other orifices of the separating plate 39 with multiple orifices can be estimated as the following:

$$\Delta p_M = \frac{\mu_e I_a^2}{4\pi^2 r_o^2}[\mathrm{Pa}]$$

where $I_a$ is arc current conducting across the given orifice, $\mu_e=4\pi 10^{-7}$ [N/A$^2$] is vacuum permeability, $r_0$ is radius of the single orifice. For instance, the pressure drops $\Delta p_M$ across the baffle 39 separating high-pressure remote arc area within the stagnation chamber 15 from the primary arc outer space area, produced by the self-inflicted magnetic field due to narrowing the arc current $I_a$=100 A within the orifice 39*a* having radius $r_o$=0.5 mm is $\Delta p_M$~1 Torr hence, producing the bottleneck effect holding the high pressure in the remote anode chamber 15.

The plasma potential, $V_p$, within the remote anode compartment 15 is much greater compared to the plasma potential in outer space downstream of the orifice 39*a*. The $V_p$ inside of the remote anode chamber 15 from the anode 70 down to the orifice 39*a* is approximately equal to the anode potential because the plasma impedance within the remote anode compartment is low resulting in a low voltage drop across the remote arc plasma discharge between the diaphragm 39 and the remote anode 70. At the same time the $V_p$ immediately outside of the orifice 39*a* in low pressure outer space is much lower due to the low plasma impedance in the low-pressure area and the low voltage drop across the primary arc between the hollow cathode 12 and the primary anode-keeper 581, which is provided with separate gas inlet 602*b* and with heater 71 which ease the starting of the primary arc discharge between the hollow cathode 12. As a result, a sharp discontinuity is developing across the orifice 39*a*, serving as a bottleneck, which separates the high pressure/high $V_p$ area upstream of the orifice 39*a* from the low pressure/low plasma potential $V_p$ area downstream of the orifice 39*a*. The bottleneck can be viewed as a strong frontal stationary shock wave that stands across the orifice 39*a* as illustrated by the down pointed arrow in the plasma potential distribution chart in the FIG. 9*f*20. The plasma plumes shown in the FIG. 9*f*20 consists of an intense flow of energetic ions, having a potential energy close to the plasma potential by the reversed arc discharge plasma throughout the array of orifices 39*a* spreads and accelerates downstream of the orifice toward low pressure and low $V_p$ outer space region with ion energies typically ranging from 50 eV to 200 eV while gas flow in the plasma plumes flowing from the chamber 15 throughout the orifices 39*a* in the outer space is ranging from ⅓ to 20 times of the speed of sound at the gas temperature within the remote anode chamber 15. In a sharp contrast, the gas flow speed within the stagnation remote anode chamber 15 is less than ⅓ of the speed of sound at the gas temperature in this chamber.

In refinement, the separating baffle 39 with multiple converging-diverging nozzles 39*a*, 39*b*, 39*c* is made of dielectric ceramics such as BN or sapphire, while the arrow-head remote anodes 70*a*, 70*b* and 70*c* are inserted into the converging area of the nozzles close to the converging side of the nozzles walls as illustrated in FIG. 9*f*21. The total outcome remote arc current generated through the nozzles 39*a*, 39*b* and 39*c* is almost equally divided between these nozzles thanks to the uprising voltage-current characteristics of the remote arc discharge when the remote arc voltage increases with increase of the remote arc current which keeps each of many parallel remote arcs stable. Optionally the ballast resistances Rb1, Rb2, Rb3 with equal resistance are installed in each parallel power circuit of each remote anode 70*a*, 70*b* and 70*c* collectively powered by the reversed arc power supply 26 installed between the hollow cathode 12 positioned in the outer space area downstream of the orifices 39*a*, 39*b* and 39*c* and the group of the remote anodes 70*a*, 70*b* and 70*c*. The ballast resistors Rb1, Rb2 and Rb3 are helping to equalize the currents conducting via each nozzle 39*a*, 39*b*, 39*c* toward remote anodes 70*a*, 70*b* and 70*c*.

In a variation of the multiple reversed remote arc thruster of the FIG. 9*f*21, the perforated remote anode plate made of Ta, W or Mo or other refractory metal with multiple openings 39*a*, 39*b*, etc. can be attached to the separating baffle 39 made of the dielectric ceramics such as BN or sapphire with multiple orifices 39*a*, 39*b*, etc. as illustrated in FIG. 9*f*22. The diameters of the orifices 39*a*, 39*b*, 39*c*, 39*d*, 39*e* are smaller than openings 70*a* of the anode plate 70, while keeping each orifice of the group of 39*a*-39*e* inside of the corresponding remote anode openings 70*a* for generating multiple arcjet plumes toward low pressure/low plasma potential area downstream of the separating baffle 39. Both thickness of the separating baffle 39 and orifice diameter can range from 0.1 mm to 5 mm. If the thickness of the separating baffle is less than 0.1 mm it loses mechanical stability. When the thickness of the separating baffle is greater than 5 mm it exposes large area of the inner walls of the orifice where the ions are neutralized and disappear, reducing the outcoming ion flow. The diameters of the orifices of the group 39*a*-39*e* are ranging from 0.1 mm to 5 mm. If the diameter of the orifice 39*a* is less than 0.1 mm it may affect separation of the positively and negatively charges particles in plasma which prevents from producing the energetic plasma plume through the orifices 39*a*-39*e*. If the opening of the orifices 39*a*-39*e* is greater than 5 mm the bottleneck effect created across the orifices 39*a*-39*e* is weakening and the orifices may not be able to support the large pressure and large plasma potential differences between the remote anode chamber 15 and the outer space.

In another advanced embodiment of the sources for plasma assisted electric propulsion the ion thruster 122 can utilize the reversed remote arc discharge for generating large flux of ions in the plasma generation chamber 1*c* of the ion thruster 122 as illustrated in FIG. 9*f*23. The walls 583 of the plasma generation chamber 1*c* are biased to high voltage associated with desirable ion acceleration energies while the cusp-type magnetic field is created along the walls 583 to mitigate the plasma diffusion losses at the walls 583 of the chamber 1*c*. The reversed arc plasma generator 124 includes the primary arc discharge conducted between the hollow cathode 12 and the primary anode-keeper 581 powered by the primary arc power supply 19 while the reversed remote arc discharge, powered by the reversed arc power supply 26 is generated between the hollow cathode 12 and the remote anode 70 in the remote anode chamber 15 attached to the ion thruster chamber wall 583 and equipped with the gas supply line 607. The walls 583 of the plasma generation chamber 1*c* typically have the same potential as the anode-keeper 581. The large ion flow is coming from the high-pressure remote anode chamber 15 through the multiple orifices 39*a* in the separation baffle 39 into the ion thruster plasma generation chamber 1*c*. The ions generated by the primary arc discharge and the ion flux generated by the reversed arc discharge are further accelerated toward outer space by the electrostatic acceleration grids 585. The accelerated ion beam generated by the ion thruster 122 is neutralized by the hollow cathode-neutralizer 21 which is conducting the hollow cathode arc discharge between the hollow cathode 21 and the anode-keeper 23. In refinement, the powder delivery line can be added to the plasma generation chamber 1*c* as shown in FIG. 9*f*23*a*. In reference to FIG. 9*f*23*a*, the powder feed 591 is connected to the plasma generation chamber 1*c* via powder feed line 591*a*. The magnetic filter comprising top magnet 80*a* and bottom magnet 80*b* creating a transversal magnetic field in front of the accelerating grids is installed at the exit of the plasma chamber 1*c* in front of the electrostatic acceleration grids. The electrons are captured by the anode 19*f* which is coupled to the hollow cathode 12, powered by the power supply 19*f*. The macroparticles (MP) which are charged negatively in the plasma environment of the plasma generation chamber 1*c* due to large mobility of the electrons compare to the positively charged ions, are entering the electrostatic accelerating stage at the exit of the plasma generation chamber 1*c* downstream of the magnetic filter 80*a,b* which accelerates the negatively charged MPs to hypervelocity speeds before they impact the substrate-to-be-coated 4 in the substrate holder 2.

In a variation, the multijet reversed remote arc discharge plasma source 122 can be used as a source of highly ionized plasma for the etching and PACVD reactors as illustrated in FIG. 9*f*24. In reference to the FIG. 9*f*24 the reversed remote arc multijet plasma generator 122 similar to one shown in FIG. 9*f*22 is installed in front of the substrate holder 2 with substrates to-be-treated 4. The substrate holder is optionally connected to the RF generator 540 via capacitor 543 for the further improvement of ion etching and coating deposition processes.

In refinement the reversed remote arc multi-jet plasma generator can be used as a source of large aperture low energy ion beam for ion beam sputtering deposition process as illustrated in FIG. 9*f*25. In reference to the FIG. 9*f*25, the large area reversed remote arc source 122 generates the low energy high current ion flow toward sputtering target 245 made of the coating material. The sputtering atomic flow is directed toward substrates holder 2 with substrates-to-be-coated 4 in ion beam sputtering deposition process. Characteristic energy of ions generated by the ion beam source 122 is about the potential of the remote anode 70 in the remote anode chamber 15 typically ranging from 50 eV to 200 eV.

In a variation of the reversed arc multijet planar plasma generator 122 of the FIG. 9*f*25, the magnetron-style arched magnetic field can be created above the array of the orifices in front of the ceramic diaphragm 39. In reference to FIG. 9*f*26, the magnetic yoke 903 comprising the permanent magnets 903*a*, 903*b*, 903*c* made of, for example, Sm—Co magnets and the magnetic shunt 903*d* made of soft magnetic metal alloy such as Armco iron or Hyperco alloy, is positioned immediately behind the ceramic diaphragm 39. A set of remote anodes 70 with the array of the openings 70*a*, 70*b* and others positioned behind the orifices 39*a*, 39*b* and others in the ceramic diaphragm 39. The array of the openings 39*a*, 39*b* and others are positioned under the arch-shape magnetic field produced between the poles of the permanent magnets of the magnetic yoke 903. In this case the arch-shape magnetic field will create a magnetic barrier for the plasma plumes generated through the orifices 39*a*, 39*b* and others by the reversed arc discharge conducted between the hollow cathode 12 and the remote anode 70, resulting in increase of the plasma potential within the dense plasma flowing through out the orifices 39*a*, 39*b* and others which allow to further increase the ion energies in the plasma flow generating by the planar reversed arc multi-jet plasma source 122, which, in turn will improve the thrust and other critical parameter when the plasma source 122 is used as a thruster. The average ion energies generating by the magnetized multi jet reversed arc discharge can range from 50 to 200 eV depending on arc current, gas flowrate and the strength of the magnetic field. This wide aperture planar plasma source 122 can be also used as a plasma source for deposition a various coating when the composition of the plasma creating gas in the remote anode stagnation chamber 124 consists of the required reactive species. For instance, if the composition of the plasma creating gas consists of the hydrocarbons such as methane or acetylene in addition to the buffer noble gas such as argon, the diamond-like carbon (DLC) coatings with improved functional properties can be deposited on large-size substrates positioned in front of the source 122 as illustrated in FIG. 9*f*3*e*27.

In another advanced embodiment of the sources for plasma assisted electric propulsion the plasma thruster 122 utilizing the reversed remote arc discharge can be used as a source of energetic highly electrically conductive plasma flow for generation the electric power by means of the MHD generator 122*a* and microturbine 122*b* as illustrated in FIG. 9*f*28. In reference to FIG. 9*f*28, the reversed remote arc plasma thruster 122 similar to one shown in FIG. 9*f*19 is provided with two gas supply lines: the oxidizer gas supply line 607*a* and the fuel gas supply line 607*b* which supply the oxidizer and fuel into the remote arc stagnation combustion chamber 15. The chemical energy generating by the combustion process is enhanced by the reversed remote arc plasma generating discharge between the primary hollow cathode 12 with cathode gas supply line 607*c* positioned downstream of the ceramic nozzle 39 in the low-pressure low plasma potential area and the remote anode 70 positioned inside of the stagnation high pressure high plasma potential combustion chamber 15. The primary arc discharge is conducted between the cathode 12 and the anode-keeper 581. The plasma plume flowing through the converging-diverging nozzle 39 with a throat 39*a* having a critical cross-section diameter ranging from 0.1 to 5 mm generated by this hybrid chemical/electrical thruster 122 has supersonic speed and high electric conductivity to be used as a work media for generating the electric power by the means of the MHD generator positioned downstream of the nozzle 39, which includes the duct 921 composed by two opposite electrodes: 921*t* (cathode) and 921*b* (anode), while the transversal magnetic field is superimposed upon the plasma plume generated by the hybrid chemical/electrical plasma thruster 122. The residual kinetic energy of the plasma plume generated by the plasma thruster 122 can be optionally consumed by the microturbine 122*b* positioned downstream of the MHD generator, which includes the blade setup 901 and the exhaust path 909.

The fact that macroparticles follow straight trajectories after being emitted from the target surface while the vapor plasma is deflected toward the turning direction of the deflecting and focusing magnetic force lines allows for the use of a "stream baffles" which can be installed in the plasma duct 44 across the vapor plasma flow to further enhance the filtration of macroparticles. As illustrated in an embodiment of the sources for plasma assisted electric propulsion of present invention shown in FIG. 8*a*, a preferred embodiment of the invention provides a vacuum chamber generally designated to house all components in a vacuum environment having a cathodic arc source with a steering coil 15*c* disposed upstream of a cathode chamber 90, a plasma duct 44, and a substrate holder 2 bearing substrates 4 to be coated mounted in a main chamber 10 downstream of the plasma duct 44. The cathode chamber 90 is surrounded by a focusing electromagnet 21*a* while the plasma duct chamber 22 is surrounding by a focusing electromagnet 21*b*. Optionally, focusing electromagnet 21*b* may be used for focusing plasma flow at the exit of the plasma duct 44.

The plasma duct 44 and cathode chamber 90 are provided with a series of wall baffles 30. The wall baffles 30 may be mounted on any walls not occupied by a cathodic arc sources and are disposed along the periphery of the plasma stream. The cathodic arc plasma source includes a cathode 12 which is connected to the negative pole of the current source (not shown), while positive pole of the arc power supply is grounded making the chamber walls with the baffles 30 positive in relation to the plasma potential. This helps to attract and effectively remove the macroparticles from the vapor plasma stream since they are generally charged negative due to more than 1000 times larger mobility of the negative light particles, the electrons, comparing to the heavy positive ions in a metal vapor plasma stream. When baffles have a positive potential in relation to the metal vapor plasma it is repelling the positively charged metal ions effectively reducing the losses of metal ions and increasing the metal ion transport efficiency of the filter resulting in higher deposition rates.

FIG. 8*b* illustrates a variation of the embodiment of the sources for plasma assisted electric propulsion of present invention shown in FIG. 8*a* in which the substrate holder 2 is mounted in the main chamber 10 offset from the optical axis of the cathodic arc source, so that the substrates 4 and the cathode target 12 of the arc source are not in optical alignment. The arc source consists of the target 12 connected to the negative pole of the arc power supply 16, a steering coil 15*c* and focusing coil 21. A deflecting magnetic system, which forces the plasma stream toward the substrates 4, is made up of linear conductors arranged in a coil 20*a* along the line of intersection 44*a*-44*b* of the cathode chamber 90 and the plasma duct 44 coupled with the focusing coil 20*b* surrounding the exit portion of the plasma duct 44.

According to the further embodiment of the invention shown in FIG. 8*b*, a series of stream baffles 41 may be disposed generally transverse to a plane parallel to the direction of plasma flow as represented by plasma stream lines 27 (and therefore also generally transverse to the magnetic force lines 25) within the plasma duct 44. In one embodiment, each stream baffle 41 is formed from a thin conductive (for example metal) strip to which is applied a potential which has to be generally positive in relation to the plasma potential. The macroparticles are mostly charged negative by absorbing a larger number of negatively charged electrons, which have much greater mobility than positively charged heavy metal ions. The faces of each of the stream baffle 41 are oriented to lie between the plane which is tangential to the magnetic field lines 25 (shown in solid lines in FIG. 8*b*) and a plane which is tangential to the plasma stream lines 27 (shown in phantom lines in FIG. 8*b*).

The radius of deflection of vacuum arc plasma ions in a curvilinear magnetic field is always slightly greater than the radius of curvature of the magnetic force lines 25. The degree to which deflection of particles and ions in the plasma stream "lag" behind the curvature of the magnetic force lines 25 is dependent upon the strength of the magnetic field, and the mass and charge of the ion or particle. The radius of deflection decreases as the strength of the deflecting magnetic field increases and increases in direct proportion to the ion mass/charge ratio of the ion or particle. Thus, in a constant magnetic field, for ions having the same charge less massive ions will follow the curvature of the magnetic force lines 25 more closely, and for ions having the same mass, those with a higher charge will follow the curvature of the magnetic force lines 25 more closely. The present invention takes advantage of this effect, by a technique termed herein "plasma optical filtering", to separate macroparticles and unwanted ions from the plasma stream 27, and even to separate isotopes.

In the embodiment shown in the FIG. 8*b*, with the magnetic field strength constant the degree of ion deflection at any particular point in the plasma stream is determined by the direction of the magnetic force lines 25 at that given point and the mass/charge ratio of the ion. It can be seen from the FIG. 8*b* that the radius of curvature of the magnetic force lines 25 is smallest adjacent to the inside corner 45*a* of the plasma duct 44 and steadily increases toward the outside corner 45*b* of the plasma duct 44. Thus, the radius of deflection of any particular ion will depend in part upon where it is disposed in the plasma stream 27. The stream baffles 41 are accordingly preferably individually adjustable, so that each can be rotated such that its faces lie in a plane tangential to the direction of motion of the target ions at that point in the plasma duct 44. It can thus be seen that the stream baffles 41 closest to the inside corner 44*a* are oriented more obliquely relative to the optical axis of the cathode 14*a* than the baffles 41 which are closer to the outer corner 44*b*.

The target ions pass through the spaces between the stream baffles 41, because their trajectory is such that only the thin edge of the stream baffles 41 is in the path of travel of the target ions and presents a very low probability of being struck by the target ions. Heavier and lighter ions, and those having a different charge than the target ions, have a different trajectory which follows a path obliquely into the faces of the baffles 41, and as such most are physically blocked by the baffles.

The stream baffles 41 serve the purpose of optically isolating the substrates 4 from macroparticles and neutral atoms and molecules as well as unwanted ions entrained in the plasma stream 27. The number and width of the stream baffles 41 should therefore be sufficient to optically isolate the substrates 4 from the operating surface of the arc cathode 12 for the vast majority of macroparticle trajectories in the plasma stream, as is schematically illustrated in FIGS. 8*a* and 8*b*. In FIG. 8*a* the stream baffles are disposed near the exit of the plasma duct 44 where vapor plasma streamlines converge following the focusing magnetic field lines created by the focusing coil 20*b*. In FIG. 8*b* the stream baffles 41 are disposed across the entrance to the plasma duct 44, at a point where the plasma stream 27 has just begun to deflect under the influence of the deflecting magnetic field. Stream baffles 41 can be employed in any apparatus in which a plasma is being deflected, however starting the deflection of the plasma stream at earlier stage (for example in a cathode chamber rather than in plasma duct as in the above embodiments) can enhance effectiveness of the stream baffles 41 and allow stream baffles 41 to be disposed in a cathode chamber 90 or at the intersection between the cathode chamber 90 and the plasma duct 44.

In general, the potential of the stream baffles 41 should be maintained positive in relation to the plasma potential, while the potential between the stream baffles and the cathode 12 in cathode chamber 90 may range from −150V to +150V. The baffle potential less than −150V may result in intense sputtering and contaminate the plasma flow. The baffle potential above +150V may overheat and melt the baffles. The positively charged stream baffles are better suited to attract and remove the negatively charged macroparticles from the vapor plasma stream while at the same time repelling the positively charge ions and reducing a metal vapor plasma losses effectively improving metal ion transport efficiency of the filter.

In the embodiment of FIG. 8*a*, in which the substrates 4 are in optical alignment with the cathodic arc source, the stream baffles 41 must be disposed across the plasma stream 27 as it is dispersing toward the walls of the plasma duct 44. This is an "inertial plasma filter", which relies entirely on the inertia of particles in the plasma stream 27, which in the dispersive phase (near the cathode 12) determines the trajectory of ions and other particles; macroparticles typically disperse from the cathode at an average angle of about 70° from the optical axis of the plasma stream lines 27 or 20° to the evaporating surface of cathode target 12, while a small portion of charged nanosized clusters and macroparticles can have trajectories nearly coaxial to the filtered arc metal vapor plasma flow. In contrast, the apparatus of FIG. 8*b* is an "optical plasma filter" system because the substrates 4 are offset from the optical axis of the plasma stream 27 and the plasma stream must therefore be deflected, by the deflecting magnetic coil 20*a*, toward the substrates 4.

The maximum ion current density for the target ions downstream of the stream baffles 41 is reached when the angle between the stream baffles 41 and the axis of the plasma duct 44 is approximately equal to the angle between the plasma stream 27 and axis of the plasma duct 44 at any given point of its cross-section. If the stream baffles 41 are disposed across the transverse cross-section of the plasma duct 44, as shown in FIG. 8*a*, the optimum inclination of each baffle 41 to the magnetic force lines 25 is the direction of the dispersing plasma flow.

To find the optimum orientation of the stream baffles 41 at any particular point within the arc plasma stream one need to determine the direction of the plasma flow at the given point of the plasma stream where the baffle 41 is disposed.

As shown in FIG. 8*a*, a planar disc-shaped Langmuir probe 53 can be placed at the selected point. The ion collecting Langmuir probe is charged negatively in reference to the nearby plasma potential to collect ions from the plasma stream. The probe 53 consists of the disc-electrode 53*b* which serves as ion collector. The ions from the plasma stream are collecting by the front ion collecting surface of the disc 53*b*, while the rest of the probe is shielded by insulated shield 53*a* to exclude ion collection by other sides of the probe than its front ion collecting surface 53*b*. The maximum ion saturation current will be collected when the axis of the probe 53 is parallel to the path of the arc plasma ion flow 27 or, the plane of the ion collecting disc surface 53*b* is perpendicular to the arc plasma ion flow 27. Alternatively, the mass flow collector such as quartz crystal microbalance (QCM) based probe as for example Inficon XTC/C thin film deposition controller, can be used to measure the mass flow of metal vapor ions within arc plasma ion flow 27. The QCM probe 54 is shown schematically in FIGS. 8*a* and 8*b*. In this design the probe position can be adjusted both by reciprocal movement and by rotation which allows changing the angular position of the quartz crystal in relation to the ion flow streamlines. The maximum metal ion flux will be collected by the QCM sensor when the quartz crystal plane 54*c* is oriented perpendicular to the arc plasma ion flow 27.

Orienting the stream baffle 41 to the direction generally perpendicular to the plane of the ion collecting area measuring maximum ion flux value, i.e. to minimize an angle between the plasma stream lines 27 and the faces of the baffles 41, will minimize target ion losses on the stream baffles 41, maximize the total ion current downstream of the stream baffles 41, and consequently the rate of deposition, will be at its maximum. Each stream baffle 41 may thus be provided with an adjusting means such as a knob or lever (not shown), to independently orient each stream baffle 41 tangentially relative to the plasma stream lines 27 traversing the stream baffle 41 at that point. Each stream baffle 41 can optionally also be provided with a means for the measurement the ion current collected by the baffle 41. In this case, via a feedback system the stream baffle's positioning drive will orient the baffles 41 in a way to minimize the ion current collecting by the baffle therefore minimizing the metal vapor plasma losses. Alternatively, the stream baffle orientation can be optimized by measuring the total ion current collecting by the substrate holder 2. The optimal orientation of the stream baffles 41 will be achieved when this output ion current reaches its maximum value.

It will thus be apparent that the stream baffles 41 can also be disposed across a portion of the plasma stream 27 which does not curve, in which case they are still working fairly effective for filtering macroparticles out of the plasma stream 27. Since ions in the arc plasma have (in general) trajectories that are parallel to the magnetic force lines 25 within the plasma duct 44, so long as the stream baffles 41 are oriented at a tangent to the magnetic force lines 25 a large portion of macroparticles entrained in the plasma stream 27 will be filtered out, while most ions of the selected charge will traverse the stream baffles 41 without difficulty. FIG. 8*a* illustrates an example of this embodiment, in which rough filtration of macroparticles takes place before the plasma stream 27 starts to deflect. In this case a single adjusting means can be used to adjust all baffles 41 simultaneously, since in the straight portion of the plasma stream all stream lines 27 are roughly parallel to one another. This preliminary macroparticle filtration allows a reduction both in the distance between the deflecting region of the plasma stream 27 and the substrates 4 and in the degree of curvature of the plasma duct 44, and results in an increase in productivity. Additional stream baffles 41 may be disposed across the deflecting portion of the plasma stream 27 for more precise filtration. In general, a set of stream baffles 41 can be disposed across the plasma vapor stream in any place between the cathode target and the exit flange of the exit tunnel portion 46 of the plasma duct, preferably aligned along the direction of the local magnetic field lines on site of their position, in which the baffles are oriented generally tangential to magnetic field force lines at the point of each of the respective locations of the baffles.

It will also be apparent that the stream baffles 41 can be used for both element and isotope separation. Ideally the stream baffles 41 are disposed where the arc plasma stream 27 has the smallest radius of deflection in the magnetic field, where ions with different ion mass/charge ratios have significantly different trajectories. In this case if the gaps or channels formed between adjacent stream baffles 41 are parallel to the trajectory of one given kind of ion with a specific mass/charge ratio, the stream baffles 41 will be virtually transparent to the selected ions. Other ions with different mass/charge ratios will have different trajectories and will largely run into the faces of the baffles 41 and be trapped, an effect which may be called "inertial plasma-optical separation." In comparison with a conventional mass spectrometer, which separates ion flows in a single path, the inertial plasma-optical separator separates ions in a high current plasma flow, which results in much greater productivity.

The axes of the stream baffles 41 can be aligned either parallel or transversal to the direction of the plasma flow, but the surface of the stream baffles 41 has to be aligned as close as possible to the direction parallel (tangential) to the direction of the plasma flow at the site of location of the stream baffles 41 so that the plasma flow streamlines will not cross the surface of the stream baffles 41. The best orientation of the stream baffles is tangential to the direction of the plasma flow at the location of the stream baffles 41. The closest approximation to this ideal orientation is to align the steam baffles 41 parallel (tangential) to the external magnetic deflecting and/or focusing force lines at the location of the stream baffles 41. In this case the axes of the stream baffles can be aligned either parallel or perpendicular to the external deflecting and/or focusing magnetic force lines. The easiest way to setup the orientation of the stream baffles 41 is to align them parallel (tangential) to the direction of the magnetic force lines 25 at the location of the stream baffles 41, in which the baffles 41 are oriented generally tangential to magnetic field force lines 25 at the point of each of the respective locations of the baffles 41. If stream baffles 41 made of metal strips are parallel (tangential) to the direction of the magnetic force lines 25 and electrically isolated, they will be charged positively due to the much larger mobility of heavy ions across the magnetic force lines 25 compared to magnetized electrons. The orientation of the stream baffles 41 in a direction tangential to the magnetic force lines 25 can be achieved by individual control of the position of each stream baffle 41 by suitable mechanical means. Alternatively, the stream baffles 41 or at least a portion of them can be made of magnetic materials which will result in their orientation along the magnetic force lines 25 automatically as illustrated in FIGS. 8*c* and 8*d*. In this embodiment of the invention stream baffles 185 are positioned at the exit of the cathode chamber 90 and made of ferro-magnetic alloy such as iron or Sm—Co which make them capable of automatically adjusting their orientation along the magnetic force lines 160*a* providing maximum transparency for the metal vapor plasma stream 160. The baffles made of magnetic material can be magnetized providing that the direction of the magnetic force lines between the neighbor baffles coincides with the direction of the external deflection and/or focusing magnetic field at the location of the given pair of the neighbor baffles. It is appreciated that only top and/or bottom of the baffles 185 are made of magnetic materials while the main portion of the baffles 185 can be made of stainless steel, titanium or other non-magnetic metal alloy or non-metal materials such as ceramics or glass.

Generally, the stream baffles 41 can be positioned anywhere between the cathode 12 in a cathode chamber 90 and the exit of the tunnel portion 46 of the plasma duct 44. For instance, the stream baffles 41 can be installed in front of the cathode 12 in cathode chamber 90, as illustrated in FIG. 8*a*, typically spaced from the cathode target surface at the distance of 1 cm to 10 cm where they can also serve as additional anode to improve the stability of cathodic arc spots on cathode target 12 and therefore reduce the probability of extinguishing the vacuum arc discharge. The baffles 41 installed in front of the cathode target 12 may have a positive potential in reference to the cathode 12 or be insulated and have a floating potential. When the baffles are installed too close to the cathode target 12 surface (e.g. less than 1 cm) it can result in extinguishing of the arc spots and overheating the baffles. When the baffles are installed at the distance greater than 10 cm from the cathode target 12 surface, their influence on arc spot steering and sustainability of the vacuum arc process is found to be negligible. The preferable position of the stream baffles will be in locations where the magnetic field force lines are bending. In this case the stream baffles will be declined in relation to the axes and walls of the cathode chamber 90 and/or plasma duct 44 and will trap the macroparticles, neutral particles and heavy ions more effectively. For instance, the stream baffles 41 can be positioned at the entrance of the plasma duct 44 adjacent to the cathode chamber 90 and the declining portion 44*a* of the plasma duct 44. Alternatively, the stream baffles 185 can be positioned at the entrance to the tunnel portion 46 of the plasma duct 44 as shown in an embodiment of the sources for plasma assisted electric propulsion of present invention shown in FIG. 8*d*. In this embodiment of the invention the stream baffles 185 made of magnetic alloy are positioned across the entrance of the tunnel portion 46 of the plasma duct 44. The stream baffles 185 are aligned along the magnetic force lines 25 providing optimized conditions for metal ion transport through the series of stream baffles 185 while at the same time dramatically increasing the efficiency of removing the macroparticles from the metal vapor plasma stream. Wall baffles (not shown) may also be installed on all walls not occupied by arc sources both in cathode chamber 90 and in plasma duct chamber 44.

Additionally, a cone macroparticle trap 203 can be installed at the back side of the plasma duct 44 as illustrated in an embodiment of the sources for plasma assisted electric propulsion of present invention shown in FIG. 8*e*. In the case of a circular plasma duct 44 this conical trap 203 can be made as a cone with cone angle preferably less than 45° which will allow effective trapping of any macroparticles that can impact the internal surface of the trap 203. In the case of a rectangular plasma duct 44 a back trap can be formed from two metal sheets declined to each other creating an opening as a planar angle of preferably less than 45° as illustrated in FIG. 8*f*. In this case the metal vapor plasma will be transported through the deflecting portion 44 of the plasma duct by a pair of offset declining coil 80 and (optionally) a pair of declining coils 20 followed by focusing at the exit tunnel portion 46 of the plasma duct 44 by the focusing coil 21, while the macroparticles will be effectively trapped inside of the flat angle trapping portion 44*a* of the plasma duct 44.

In a further variation of this embodiment, illustrated in FIG. 8*g*, the plasma stream radiates outwardly from the center and contacts all substrates 4 simultaneously. In this case a pair of coaxial deflecting coils 80 surrounds the main chamber 10. One coil 80*b* is positioned underneath the bottom flange 10*b* of the main chamber 10 and other 80*a* above the carousel substrate turntable 2. The cathode chamber 90 is connected to the top flange 10*a* of the main chamber 10. The cathode chamber 90 has a cathode assembly 12 with steering and focusing coils 13 and preferably wall baffles 18. The plasma duct 44 is effectively created by the substrates 4, the substrate turntable 2 and the wall 10*a* of the main chamber 10 adjacent to the plasma source. Stream baffles 67 may be installed on baffle holders 67*a* in front of the substrates 4, which makes this filtered cathodic arc source fully integrated into the main chamber 10 layout. Alternatively, the conical macroparticle trap with cone angle preferably less than 45°, integrated within the substrate holding platform 2, can be installed opposite to the cathode target 12 as illustrated in FIG. 8*h*. In a refinement, two or more primary cathodic arc sources 111 can be attached to the cylindrical plasma guide 46 positioned on top flange 10*a* of the radial filtered cathodic arc plasma processing chamber 10, as illustrated in FIG. 8*h*1. In this multi-cathode variation of the embodiment of radial filtered cathodic arc deposition system, two or more cathode chambers 90 are attached to the side wall of the cylindrical plasma guide 44. The cathodes 12 in cathode chamber 90 are generating the metal vapor plasma, which is focusing by the focusing coils 13*b* toward exit of the cathode chambers 90 and further deflecting around deflecting conductor 81*a* of the offset deflecting coil 81 toward exit tunnel portion 46 of the plasma guide 44 while the closing conductor 81*b* is positioned distant from the top sides of the cathode chambers 90 facing away from the chamber 10. The correcting coil 82 positioned by the top back flange of the plasma guide 44 allows to further improve the deflecting power of the coils 81. The metal vapor plasma streams generated by several cathodes 12 in cathode chambers 90 are merging within the exit tunnel portion 46 of the plasma guide 44 toward processing chamber 10, where it is further deflecting in the radial direction toward substrates to be coated 4 by the pair of coaxial deflecting coils 80, including the top coil 80*a* positioned by the top flange 10*a* of the chamber 10 and the opposite coil 80*b* positioned by the bottom flange 10*b* of the chamber 10. The magnetron sputtering source can be also optionally positioned by the side wall of the chamber 10 adding magnetron sputtering coating deposition capability and also enabling operation in the filtered arc assisted magnetron sputtering (FAAMS) mode.

Embodiments of the sources for plasma assisted electric propulsion of present invention provide a hybrid layout of the filtered cathodic arc source coupled with magnetron sputtering sources or gaseous plasma sources to increase mass flow rate and ionization of the metal-gaseous vapor plasma. Such embodiments are shown schematically in FIGS. 10*a, b, c, d* and *e*. FIG. 10*a* illustrates an apparatus embodying a preferred embodiment of the invention utilizing a filtered cathodic arc source containing two primary cathodic arc sources with cathode targets 12 disposed in two opposite cathode chambers 90 in communication with a plasma duct 44 and having a magnetron sputtering source 210 disposed (generally symmetrical in relation to the plane of symmetry of the rectangular plasma duct 44 or coaxial to the tubular plasma duct 44), magnetically coupled with filtered cathodic arc source. The magnetron 210 is installed in the plasma duct 44 along the plane of symmetry of the plasma duct 44. An optional coil 215 creates a magnetic field which overlaps the magnetron magnetic field in front of the magnetron target and has the same direction both as magnetron magnetic field in front of the magnetron target and the deflecting magnetic field produced by offset deflecting coils 80 and 81. The earlier deflection of the magnetic force line by offset deflection coils 80 and 81 allows the cathodic arc vapor plasma stream to flow past the magnetron without substantial losses on surface of the magnetron. This advantageous feature of the present invention is also allows the magnetron to be positioned further from the back wall 44*a* of the plasma duct 44 and closer to the entrance into the exit tunnel portion 46 of the plasma duct 44, which effectively increases the deposition rate of the magnetron sputtering source while providing a concurrent filtered cathodic arc-magnetron hybrid deposition process. The magnetron 210 can be optionally provided with mechanical shutter (as shown in FIG. 4*f*) which can be used to protect the magnetron target for poisoning by coatings deposited from the filtered cathodic arc vapor plasma flow coming from the adjacent cathode chambers 90 when the cathode targets 12 and sputtering target of the magnetron 210 are made of different materials. Alternatively, the exit openings of the cathode chambers 90 can be also provided with mechanical shutters similar to that shown in FIG. 4*f*. In this case the cathode chamber mechanical shutters should be impermeable for heavy particles such as ions and neutral particles, but they should have openings, which allow electrons freely passing throughout the shutters toward plasma duct 44 and continue its way further toward distal anode 70 installed within the substrate chamber 10. In this case the primary cathodic arc discharge will be extended from the cathode chamber 90 toward substrate chamber 10 by the power supply 26 in which the negative pole is connected to the cathode target 12 in cathode chamber 90 and the positive pole is connected to the distal anode 70 in the substrate chamber 10. This unidirectional hybrid filtered cathodic arc-magnetron vapor plasma source merges filtered cathodic arc plasma generated by the primary cathodic arc sources, respectively associated with cathode targets 12, of the filtered cathodic arc plasma source with a sputtering flow generated by the magnetron source 210 into one integrated vapor plasma stream having controlled concentration of metal ions directed toward the substrates 4 to be coated in the substrate chamber 10.

The cathodic arc targets 12 and the target of magnetron 210 can be made of the same material or different materials. In this design the magnetron can be a conventional DC, DC pulse or RF magnetron or a high pulse powered magnetron. This design allows for the simultaneous operation of all evaporation sources, providing a high sputtering rate of the planar magnetron source 210 concurrent with 100% ionized metal vapor flows coming from the cathode chamber 90 and overlapping the magnetron sputtering flow.

In the further variation of this embodiment illustrated schematically in FIG. 10*b*, the thermionic arc sources with thermionic filaments 312 and thermionic heating power supply (not shown) are be installed in a cathode chambers 90 instead of cathodic arc evaporators based on vacuum arc discharge. The thermionic filament 312 may be biased to the negative potential ranging from −10 volts to −25,000 volts by power supply 19. The filament bias less than −10V does not emit electrons with high enough energy for excitation and ionization of the plasma environment whilst filament bias exceeding −25,000 V may result in damage of filaments by intense sputtering and breakdowns. This primary plasma discharge may be extended from the cathode chamber 90 toward substrate chamber 10 by the power supply 26 in which the negative pole is connected to the filaments 312 and the positive pole is connected to the distal anode 70 in the substrate chamber 10. In this case, a powerful flow of energetic electrons will be generated toward the magnetron sputtering plasma discharge area, crossing the sputtering metal atomic flow generated by the magnetron. It will allow increasing the ionization rate of the metal sputtering flow generated by magnetron source by orders of magnitude due to ionizing collisions between electrons generated by thermionic filaments 312 and metal atoms sputtered by the magnetron 210. Alternatively, the hollow cathode or plasma cathode can be used in cathode chamber 90 instead of thermionic filament cathode. In this case the plasma generating high voltage glow discharge or low pressure gaseous arc discharge is established between the cathode in the cathode chamber 90 and the anode positioned downstream the cathode near the exit opening of the cathode chamber 90. The electrons may be extracted from this discharge and accelerated by additional positive electrodes. The resulting high energy electron beam may be directed toward magnetron plasma discharge area resulting in increase of ionization of the magnetron sputtering atoms. For instance, an anode grid 18 can be installed between the thermionic cathode and the exit of the cathode chamber 90. The high positive voltage ranging from 50 volts to 10,000 volts can be applied to the anode grid for forming and focusing a powerful electron beam directed toward the magnetron sputtering plasma area. The anode grid bias less than +50V does not generate electron beam with high enough energy for excitation and ionization of the magnetron sputtering plasma environment whilst anode bias exceeding +10,000 V may result in damage of anode or insulators by overheating and breakdowns. Optional focusing electrodes (not shown) can be installed in downstream to the cathode in a cathode chamber 90 to further increase the density of electron beams emitted toward magnetron discharge plasma area. Increase of the ionization rate of the metal sputtering atoms results in densification and improvement of structure and morphology of deposited coatings. At the same time by keeping the thermionic cathode filaments 312 within the cathode chambers 90 allows avoiding contamination of the magnetron target and the coating by metal atoms evaporated from the thermionic filaments. The exit openings of the cathode chambers 90 can be also provided with mechanical shutters (not shown) having the openings, which prevent the heavy particles such as ions and neutral particles from penetrating into the plasma duct, while at the same time allow electrons freely passing throughout the shutters toward the plasma duct 44 and continue its way further toward distal anode 70 installed within the substrate chamber 10.

FIG. 10*c* illustrates a variation of the embodiment shown in FIG. 10*b* in which the thermionic arc filaments 312 are positioned within the cathode chambers 90 which are installed on the common magnetic core with the magnetron target. The electrons emitted by thermionic filaments 312 are propagating along the magnetic field lines 319 toward the center of the magnetron target overlapping the magnetron plasma discharge 315. The energy of the electron beams as determined by the negative bias voltage applied to the thermionic filaments in reference to the ground and/or to the distal anode 70 in the substrate chamber 10 ranges from −10 volts to −25000 volts. The filament bias less than −10V does not emit electrons with high enough energy for excitation and ionization of the plasma environment whilst filament bias exceeding −25,000 V may result in damage of filaments by intense sputtering and breakdowns. In this embodiment the thermionic filaments can be also replaced with an array of hollow cathodes.

The magnetron sputtering source 210 may be replaced with an ion beam source 230, either with an accelerating grid or griddles as illustrated in FIG. 10*d*. The ion beam source 230 is also disposed generally symmetrical in relation to the plane of symmetry of the rectangular plasma duct 44 or coaxial to the tubular plasma duct 44. In this embodiment of the invention the optional magnetic coil 212 can be installed surrounding the ion beam source 230 providing additional isolating magnetic field around the side surface and the front face of the ion beam source in the same direction as the deflecting field produced by the offset deflecting coils 80 and 81. This embodiment of the invention is capable of performing an ion beam-assisted filtered cathodic arc deposition process enable to deposit coatings with ultra-fine structure and superior functional properties such as TiSiNC nanocomposite coating. Alternatively, the shielded vacuum arc cathode source can be used as a source of ionizing electron current instead of ion beam source. In this variation the cathode chamber 90 has a shield similar to one shown in FIG. 4*f*, positioned in front of the cathode target 12, which is impermeable for the heavy particles such as ions and neutral particles, but has an openings, which permit electrons to flow along the plasma duct 44 toward the distal anode 70 in the substrate chamber 10, when a secondary arc power supply (not shown) is turned on and a secondary arc is established between the cathode 12 in a shielded cathode chamber and the distal anode 70. The shielded cathode chamber 90 can also serve as a primary anode to sustain a primary arc discharge in a shielded cathode chamber 90.

Figure 10E:
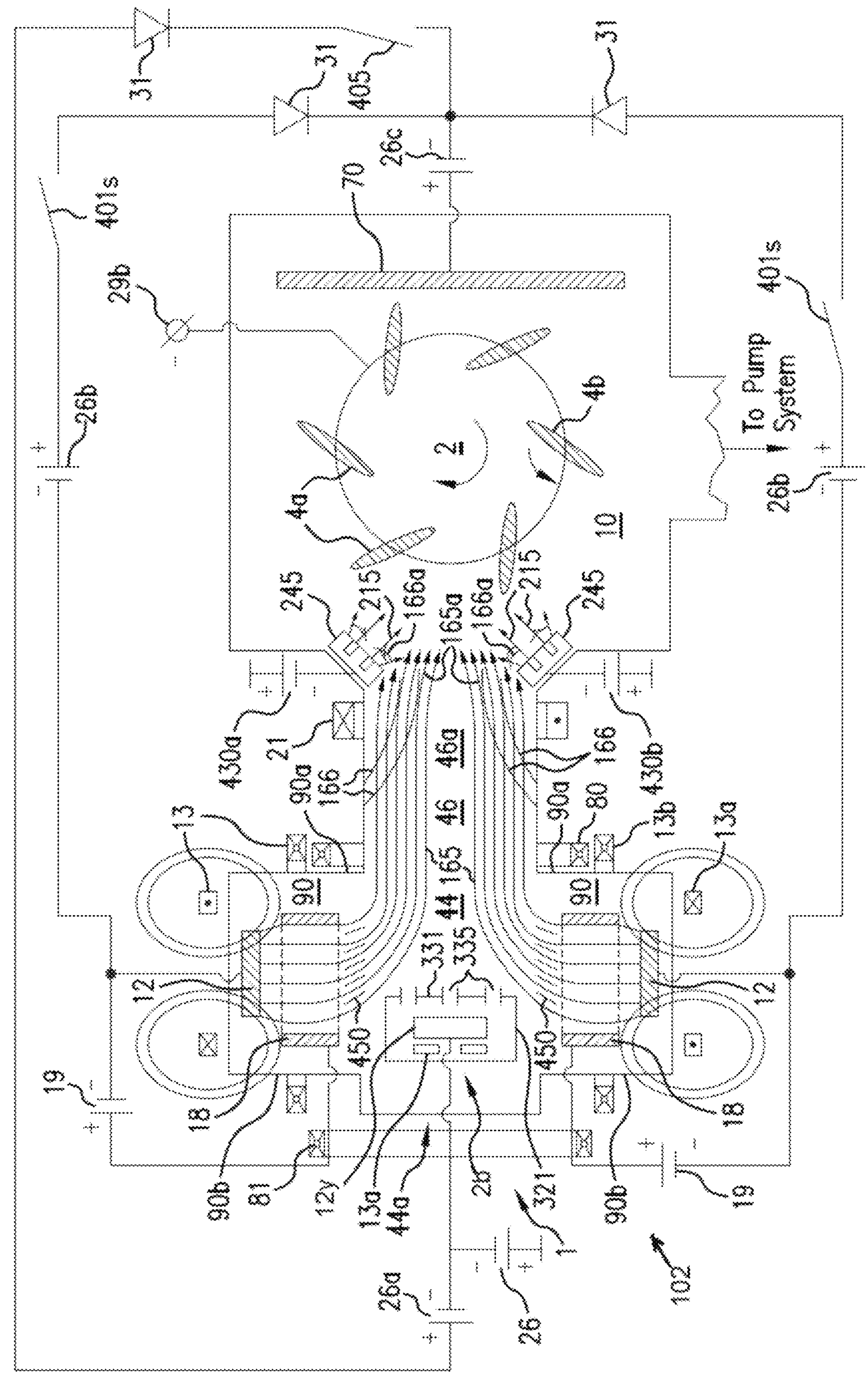

FIG. 10*e* illustrates a further preferred variation of a hybrid filtered cathodic arc-magnetron source 102, utilizing a shielded cathodic arc source 2*b* disposed generally symmetrical in relation to the plane of symmetry of the rectangular plasma duct 44 or coaxial to the tubular plasma duct 44, near the back wall 44*a* of the plasma duct 44 and two magnetron sputtering sources 245 magnetically coupled with the dual filtered cathodic arc source 1. The design of this variation incorporates the advanced coating and surface treatment system described in D. G. Bhat, V. I. Gorokhovsky, R. Bhattacharya, R. Shivpuri, K. Kulkarni, "Development of a Coating for Wear and Cracking Prevention in Die-Casting Dies by the Filtered Cathodic Arc Process," in Transactions of the North American Die Casting Association, 20th International Die Casting Congress and Exposition, Cleveland, OH, November 1999, pp. 391-399, the entire disclosures of which are hereby incorporated by reference and method of controlling vapor plasma flow taught by U.S. Pat. Application No. 2011/0100800 to Gorokhovsky which is incorporated by reference. The shielded cathodic arc source 2*b* consists of the cathode chamber 321 which can also serve as a primary anode to sustain the primary arc discharge between the cathode 12*y* and the cathode chamber 321 as a primary anode. It is appreciated that the primary anode can be installed within the cathode chamber 321 isolated from the cathode chamber 321. The primary anode can be grounded or connected to the positive pole of the primary arc power supply (not shown). The shield 331 has to be installed in front of the cathode 12*y* to isolate the cathode from the plasma duct 44. The shield 331 in front of the cathode 12*y* should be impermeable for heavy particles such as ions and neutral particles, but it should have openings 335, which permit electrons to flow into the plasma duct 44 and continue its way further toward distal anode 70 installed within the substrate chamber 10. The power supplies 26*a* and 26*c* are installed (in series) between the distal anode 70 in a substrate chamber 10 and the cathode 12*y* in the shielded cathode chamber 321 to establish a remote arc discharge between the cathode 12*y* of the shielded cathodic arc source 2*b* positioned inside of the plasma duct 44 of the hybrid filtered cathodic arc-magnetron source 102 and the distal anode 70. Alternatively, the shielded cathodic arc source 2*b* can be positioned elsewhere in the coating chamber 10 and distal anode 70 can be positioned within the plasma duct 44 of the hybrid filtered cathodic arc-magnetron source 102. In this case the secondary arc discharge can be established between the cathode 12*y* of the shielded cathodic arc source 2*b* disposed in the coating chamber 10 and the distal anode 70 positioned within the plasma duct 44 of the hybrid filtered cathodic arc-magnetron source 102, preferably adjacent to the back wall of the plasma duct 44. The secondary arc discharge improves ionization in the substrate chamber and is particularly useful for ion cleaning and plasma conditioning of the substrates prior to coating deposition process, for ion implantation, ionitriding and low pressure plasma assisted CVD coating deposition processes. The remote arc discharge can be also used to improve ionization of the magnetron sputtering plasma when magnetron sputtering sources 245, magnetically coupled with filtered cathodic arc source 1, are installed adjacent to the plasma duct 44 and the substrate chamber 10. In the variation of the invention illustrated in FIG. 10*e* the magnetron sources 245, magnetically coupled with filtered cathodic arc source 1, are positioned at the exit 46*a* of the tunnel portion 46 of the plasma duct 44 adjacent to the substrate chamber 10 and to the tunnel portion 46 of the plasma duct 44 facing the same spot at the substrate table 2 with substrates to be coated 4 as the exit tunnel 46 of the filtered arc source 1. The sputtering cathode targets of the magnetrons 245 are facing the substrates to be coated 4 such that the metal sputtering flow 215 generated by the magnetrons 245 is directed toward the substrates to be coated 4 in the substrate chamber 10. The focusing magnetic field force lines 166 generated by the focusing coil 21 at the exit 46*a* of the tunnel section 46 of the plasma duct 44 overlap a portion of the magnetron magnetic field 166*a* adjacent to the focusing coil 21 and directions of these force lines coincide. At the same time, the vapor plasma flow 165 generated by the cathodes 12 of the filtered cathodic arc source overlap the sputtering metal atomic flow 215 thereby providing a controlled ionization of the sputtering metal flow. The ionization rate of the metal sputtering atoms in the conventional DC magnetron sputtering flow is very low, generally below 0.1% of the sputtering atoms. The mixed filtered cathodic arc plasma/magnetron sputtering flow generated by the hybrid magnetron-filtered cathodic arc source shown in FIG. 10*e* overcomes this drawback of the conventional magnetron sputtering by providing a controllable ionization rate as the ion-to-(ion+atoms) ratio ranging from 0% to 100%. This can be accomplished either by balancing the ion current output of the filtered cathodic arc source by changing the cathodic arc currents or by operating the deflecting system of the filtered cathodic arc source in a pulse mode with duty cycle ranging from 0% to 100%. At the same time the power applied to the magnetron source can be varied to control the output of the mostly neutral sputtering atoms flow. The same goal of controlling the magnetron sputtering rate can be achieved by optionally using mechanical shutters (not shown) to periodically close off the sputtering targets of the magnetrons 245. The target's mechanical shutters can be also used to protect the magnetron target from the coatings deposited from the filtered cathodic arc vapor plasma flow 165 when the cathodes 12 in the cathode chamber 90 and targets of the magnetron sources 245 are made of different materials. The ionized metal vapor flow is known to be beneficial for the coating quality by increasing the density of the coatings, adhesion of the coatings to the substrates, reducing the roughness of the coatings and reducing the density of the coating defects via intense ion bombardment of the substrate surface during coating deposition process. The unidirectional hybrid magnetron-filtered cathodic arc source of FIG. 10*e* is also provided with switches 401*s* and 405 in the electrical circuit connecting cathodes 12 in a cathode chamber 90 to the distal anode 70 or connecting the cathode 12*y* in the cathode chamber 321 to the distal anode 70. When switches 401*s* are closed and switch 405 is open the secondary arc discharge can be established between the cathodes 12 in the cathode chambers 90 and the distal anode 70. When switches 401*s* are open and switch 405 is closed the secondary arc discharge can be established between the cathode 12*y* in cathode chamber 321 and the distal anode 70. In refinement the stream baffles previously shown in FIG. 8*d* can be added to the hybrid magnetron-filtered cathodic arc source design of FIG. 10*e*. The design of the hybrid magnetron-filtered cathodic arc source including set of stream baffles 450 positioned near the exit of the cathode chamber 90 adjacent to the deflecting section 44 of the plasma duct. Stream baffles 450 allow improving macroparticle removal from the cathodic arc vapor plasma generated by cathodic arc targets 12, especially those macroparticles and neutrals which are not intercepting by the wall baffles.

Other applications of the vacuum cathodic arc sources are based on their capability to emit large electron current at low pressures in reactive gaseous environment which make them a great candidates as primary sources of electrons for activation and ionization of metal vapor and gaseous environment in various plasma immersion PVD and PACVD processes such as magnetron sputtering, e-beam and thermal evaporation, plasma polymerization, plasma ionitriding, low energy ion implantation among many others. Plasma source ion nitriding and low energy ion implantation use an independent plasma source to ionize a nitrogen containing reactive gas atmosphere and then deliver a high flux of highly chemically active nitrogen-bearing atomic particles to the substrate surface [Handbook of Plasma Immersion Ion Implantation and Deposition, Ed. by André Anders, New York: John Wiley and Sons, 2000, p. 736]. The flux of nitrogen ions can be formed by ion beams or can be generated by different plasma discharges such as glow discharge, MW (microwave), RF or DC arc discharge ["Ion treatment by low pressure arc plasma immersion surface engineering processes," V. Gorokhovsky, P. Del Belluz. Surf Coat Tech, 215, 431-439 (2013)]. Low temperature ion nitriding and ion implantation processes can be performed in highly ionized dense plasma environments. In the case of plasma immersed ion nitriding processes, the operating pressure is determined by an independent plasma source, while the bias potential applied to the substrate can be varied over a wide range, independently from the plasma generator. In most cases, RF or thermionic DC plasma sources were used to generate the plasma environment for plasma immersed processes. At the same time, it was found that using a cold vacuum arc cathode to generate a plasma environment yields significant advantages over other electron emitters such as hollow cathodes or thermionic cathodes for plasma immersed processes as described and illustrated in U.S. Pat. No. 5,503,725 issued Apr. 2, 1996 to Sablev, U.S. Pat. No. 5,294,322 issued Mar. 14, 1994 to Vetter and in U.S. Pat. No. 9,761,424 issued Sep. 4, 1917 to Gorokhovsky, which are incorporated herein by reference. In this approach, the primary arc discharge is burnt between the vacuum arc cathode and the primary anode, powered by the primary arc power supply, while the primary anode is usually used as grounded walls of the vacuum processing chamber. The substrates subjected to ionitriding and other surface treatment processes are positioned in the plasma processing area, not in line-in-sight with the primary arc cathode. The remote arc discharge is extended to the processing area by the remote arc anode positioned elsewhere within the processing area of the vacuum processing chamber as was presented in FIG. 4*f*. The remote arc discharge is conducted between the primary cathode and the remote anode, powered by the remote arc power supply. The primary arc compartment housing the primary arc cathode is usually separated from the substrate processing area by the separating baffle-screen with openings which are impermeable for the heavy particles such as ions and neutral metal atoms to enter into plasma coating chamber 42 but permit electrons to flow into processing area of the vacuum chamber as it is illustrated in the FIGS. 4*f* and 10*f*.

Figure 10F:
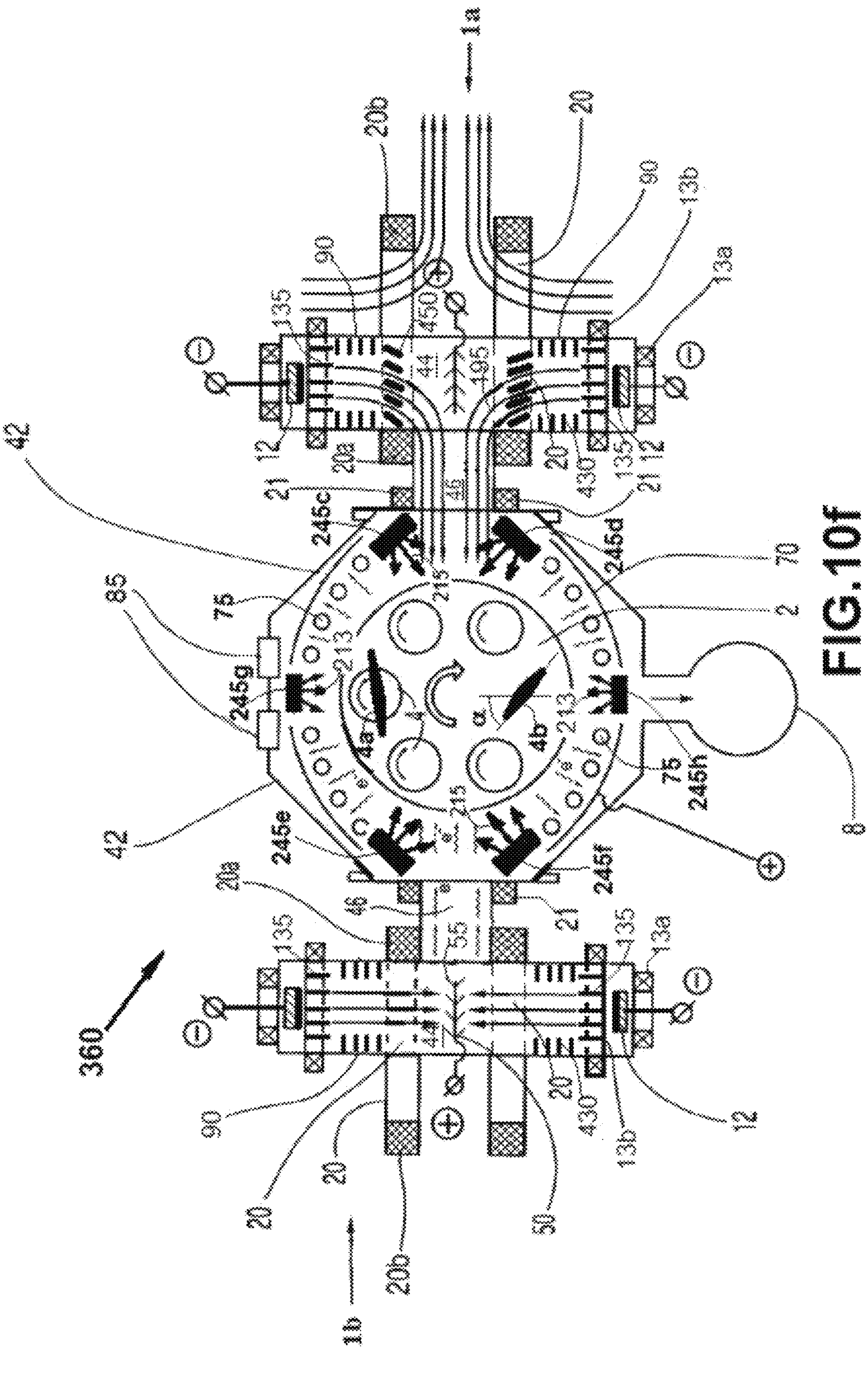

The variation of the embodiment of hybrid filtered arc assisted magnetron sputtering (FAAMS) coating deposition system illustrated in FIG. 10*e* utilizes two unidirectional dual filtered arc LAFAD sources 1*a* and 1*b* attached to the opposite sides of the coating chamber 42 as shown by the illustrative plan view in FIG. 10*f*. FIG. 10*f* illustrates one exemplary hybrid filtered arc-magnetron sputtering deposition apparatus 360 including magnetrons in coating chamber 42. In deposition apparatus 360, two filtered cathodic arc sources, 1*a* and 1*b*, are provided on opposite sides of coating chamber 42. Each filtered arc source contains (a) a pair of cathode targets 12, positioned by the entrance of opposite cathode chambers 90, (b) magnetic steering coils 13*a* located upstream of cathode target 12, (c) focusing coil 13*b* located downstream of the cathode target 12, (d) deflecting coil 20 located at the entrance of plasma duct deflection section 44, (e) and focusing coil 21 surrounding exit tunnel section 46 of the plasma duct. Deflecting coil 20 includes (a) linear deflecting conductor 20*a* adjacent to cathode chamber 90 and to plasma duct 44 proximate to the wall of cathode chamber 90 that faces coating chamber 42 and (b) closing conductor 20*b* positioned distant from the wall of the cathode chamber 90 that faces away from the coating chamber 42. Metal droplets of larger size and most of the non-ionized neutral species are trapped on the baffles 430, positioned on walls of cathode chambers not occupied with plasma sources and baffles 55 positioned on anode-separator plate 50 as well as along the walls of the plasma duct (not shown). In a refinement, the stream baffles 450 can be added to the hybrid magnetron-filtered cathodic arc source design of FIG. 10*f* (shown in filtered-arc source 1*a*).

The common disadvantage of the technical solutions proposed in U.S. Pat. No. 5,503,725 issued Apr. 2, 1996 to Sablev, U.S. Pat. No. 5,294,322 issued Mar. 14, 1994 to Vetter and in U.S. Pat. No. 9,761,424 issued Sep. 4, 1917 to Gorokhovsky, is overheating of the substrates in the coating chamber by the heat transfer from the remote arc plasma filling the entire coating chamber area. This can restrict this technology from treatment of temperature-sensitive substrates such as some sorts of steel and other metal alloys which are losing their mechanical strength at elevated temperatures and plastics. The main disadvantage of the surface engineering apparatus shown in FIGS. 4*f* and 10*f* is that it creates a relatively high temperature of the substrates to be coated as a result of their direct contact with hot remote arc plasma, which is filling the entire space of the coating deposition area within the coating chamber. The present invention overcomes the above primary art disadvantage by shielding the substrates to be coated from the direct contact with the remote arc plasma.

According to the invention the surface engineering apparatus is provided with a shield partially surrounding the substrates to be coated, preventing their direct contact with hot remote arc plasma, leaving only opening for access to the deposition metal vapor flow generating by metal vapor plasma sources, while the remote arc plasma is restricted to the narrow corridor between the shield and the walls of the coating chamber. In reference to FIG. 10*f*1, the solid separation barrier shield 65 is established between the rotary table substrate holding platform 2 and walls of the coating chamber 42, leaving a narrow corridor 66 for conducting the remote arc discharge between the cathodes 12 in the cathode chambers 90 of the LAFAD source 1*a* with closed load-lock shutter and the remote anodes 70 adjacent to the magnetron sputtering sources 245*g* and 245 *h* in the coating chamber 42 while the primary arc discharge is conducting within the cathode chambers 90 between the cathodes 12 and grounded walls of the chambers 90. The shield 65 has 2 pairs of openings: openings 68*a* and 68*b* which allows the deposition of the magnetron sputtering metal atoms flows generated by magnetron sputtering sources 245*g* and 245*h* and openings 68*c* and 68*d* which allows the deposition of fully ionized metal vapor plasma flows generating by the unidirectional dual arc LAFAD sources 1*a* and 1*b*. The separation shield 65 has movable door-shields 67 and 69 which can close the openings 68*c* and 68*d* to prevent the remote arc plasma from entering the substrate holding area of the rotary substrate holding table 2 with substrates-to-be-coated 4 to eliminate heating the substrates-to-be-coated 4 by heat transfer due to direct contact with hot remote arc plasma flow. In reference to FIG. 10*f*1 the sides 67*a* and 67*b* are closed preventing the remote arc plasma conducting between the cathodes 12 in cathode chambers 90 of the LAFAD source 1*a* and the remote anodes 70 adjacent to the magnetron sputtering sources 245*g* and 245*h* to enter the substrate holding area of the rotary table 2 and restricting the position of the remote arc plasma within the narrow corridor 66 between the separating shield 65 and coating chamber walls 42. At the same time the door 69 has both sides 69*a* and 69*b* open which allows the metal vapor plasma flow generating by the LAFAD source 2*b* to reach the substrates-to-be-coated 4 on substrate holding rotary-table 2. The plasma potential in the corridor defined by the separating shield 65 and the coating chamber walls 65 as well as within the opening areas 68*a* and 68*b* in front of the magnetron sputtering sources w245*g* and 245*h* is high in reference to the area within the substrate holding table 2 with the substrates-to-be-coated 4 resulting in increase of the positive ions flow from the area within the corridor 66 and openings 68*a* and 68*b* toward the substrate holding area on the substrate holding table with substrates-to-be-coated which enhances the ion bombardment assistance intensity during deposition of the magnetron sputtering coatings while at the same time preventing excessive heating of the substrates 4 by use of the separating barrier 65 which separate hot remote arc plasma positioning within the narrow corridor 66 from direct contact to the substrates to be coated 4 on substrate holding table 2.

FIG. 10*f*2 illustrates an embodiment of the hybrid filtered arc assisted magnetron sputtering (FAAMS) method and apparatus of present invention embodying one LAFAD unidirectional dual arc source 1*a* attached to the right side of the coating chamber 42 and single vacuum cathodic arc source 1*b* consisting of the cathode target 12 with igniter 14 and steering magnetic coil 13*a* positioned behind the target 12. The vacuum cathodic arc source is separated from the coating chamber 42 by the baffle-screen 455 with openings which are impermeable for the heavy particles such as ions and neutral metal atoms to enter into the plasma coating chamber 42 but permits electrons to flow into processing area of the vacuum chamber 42. The primary arc discharge in the cathode chamber 1*b* is powered by the primary arc power supply 19, while remote arcs conducting between the cathode 12 in the cathode chamber 1*b* and each of the remote anodes 70 adjacent to the magnetron sputtering sources 245*g* and 245*h* are restricted to the narrow corridor 66 between the separating barrier 65 and chamber walls 42. In this embodiment of the invention the substrate holding area on rotary table 2 with substrates-to-be-coated 4 is separated behind the solid shield 65 from the hot remote arc plasma conducting within the narrow corridor 66, preventing from overheating the substrates-to-be-coated 4 by heat transfer from the direct contact with remote arc plasma.

In a variation of the embodiment of the hybrid filtered arc assisted magnetron sputtering (FAAMS) method and apparatus of present invention, the remote anodes 70*a* and 70*b* positioned adjacent to the magnetron sputtering sources 245*g* and 245*h* can be expanded by additional grid or mesh components 71*a* and 71*b* positioned in front of the magnetron targets within the openings 68*a* and 68*b* as illustrated in FIG. 10*f*3. The remote arc plasma filling the narrow corridor 66 and the openings 68*a* and 68*b* is charged positive in reference to essentially negatively charged plasma within the substrate holding area at the substrate holding rotary table 2 with substrates-to-be-coated holders 4, which enhance the flow of ions from the area within the corridor 66 and openings 68*a* and 68*b* in front of the magnetron targets 245*g* and 245*h* by electric drift and diffusion mechanisms. The grids 71*a* and 71*b* can be made in a form of a set of thin wires positioned closed to each other which can enhance ionization of the metal sputtering flow generated by the magnetron sputtering sources 245*g* and 245*h*. Optionally, the grids 71*a* and 71*b* can be made in a form of flat serpentine antenna connected to the RF generator 540 via separating capacitor 543 for further increase of plasma ionization and activation capability of the grids 71*a* and 71*b*.

The remote anodes 70*a* and 70*b* with grids 71*a* and 71*b* are powered by two independent remote anode power supplies 26*a* and 26*b* connected between the cathode target 12 in the cathode chamber 1*a* and remote anodes 70*a* and 70*b* respectfully, while the primary arc in the cathode chamber 1*a* is powered by the primary arc power supply 19 connected between the cathode target 12 and primary anode which usually use the grounded walls of the cathode chamber 1*a*, but can be also made as independent electrode positioned within the cathode chamber 1*a*. To protect the remote arc power supplies 26*a* and 26*b* from the RF signal generated by the RF generator 540, the inductances 571*a* and 571*b* and bypassing capacitors 575*a* and 575*b* are installed in series with power supplies 26*a* and 26*b*. In this design the RF power can be provided to the remote anodes 70*a* and 70*b* simultaneously with remote anode current, increasing its ability to activate and ionize both gaseous environment and metal sputtering atoms within the openings 68*a* and 68*b* hence further improving the quality of the coatings deposited on substrates 4*a* and 4*b* positioned on substrate holders 4 installed in the substrate holding rotary table 2 by intense ion bombardment assistance during coating deposition process.

In refinement, the unidirectional pulse generators 531*a* and 531*b* can be used instead of RF generator for enhancing the activation and ionization ability of the remote anodes 70*a* and 70*b* as illustrated in FIG. 10*f*4. The pulse generators 531*a* and 531*b* generate the positive unipolar pulses by discharging the energy storage capacitors 805, charged by transformers 801 via rectifiers 803 when the triggers 807 are activated. The unipolar positive pulses are transmitted via blocking diodes 547*a* and 547*b* to the remote anodes 79*a* and 70*b* when the switches 543*a* and 543*b* are closed. To protect the remote arc power supplies 26*a* and 26*b* from the high voltage positive unipolar pulses generated by the pulse generators generator 531*a* and 531*b*, the inductances 571*a* and 571*b* and bypassing capacitors 575*a* and 575*b* are installed in series with power supplies 26*a* and 26*b*.

FIG. 10*f*5 illustrates an embodiment of the hybrid filtered arc assisted magnetron sputtering (FAAMS) method and apparatus of present invention embodying high voltage nanosecond unipolar pulse generator 531*c* which is installed parallel to the bias power supply 26*c* while both power supplies are connected to the substrate holding rotary-table 2 with substrates-to-be-coated 4. The pulse generator 531*c* generates essentially positive short high voltage pulses with duration ranging from 1 to 1 mks superimposed to the essentially negative DC or DC pulse bias voltage provided by the bias power supply 26*c*. To protect the bias power supply 26*c* from the high voltage positive unipolar pulses generated by the pulse generators generator 531*c*, the inductance 571*c* and bypassing capacitor 575*c* are installed in series with power supply 26*c*. The duration of the unipolar positive pulses less than 1 ns is difficult to transmit to the complex shape substrate holding rotary table while duration greater than 1 mks is not compatible with bias voltage provided by the bias power supply 26*c*. Superimposed ultra-short high voltage positive pulses can further densify and improve coating microstructure by annealing surface defects via electron bombardment without affecting the surface layer composition.

In the embodiments of the invention shown in FIGS. 10*f*1 through 10*f*5 the plasma-creating gas is supplied elsewhere in the coating system 360 while the pumping port is provided to the coating chamber 42. FIG. 10*f*6 illustrates an embodiment of the hybrid filtered arc assisted magnetron sputtering (FAAMS) method and apparatus of present invention when the gas supply line 8*a* is provided to the coating chamber 42 while the vacuum pumping port 8*b* is connected to the cathode chamber 1*a*, separated from the coating chamber 42 by the baffle-screen 455 which may be provided with small openings resulting in large hydraulic resistance between the coating chamber 42 and the cathode chamber 1*a*. In this case the gas pressure within the coating chamber 42 can be elevated in comparison to the pressure within the cathode chamber 1*a*, which may be beneficial for increasing the deposition rates of the coatings deposited by magnetron sputtering sources 245*g* and 24.

The anodic grids installed in front of the magnetron sputtering sources 245*g* and 245*h* as shown in FIGS. 10*f*3-10*f*6, can be divided in two portions as illustrated in FIG. 10*f*7. In reference to FIG. 10*f*7, the magnetron anodic grid is divided in two portions: the outer grid 70*a* is installed adjacent to the magnetron sputtering source 245*h* and connected to the positive terminal of the remote arc power supply 26*a* while its negative terminal is connected to the cathode 12 and the cathode chamber 1*b*. The outer grid 70*b* is installed adjacent to the magnetron sputtering source 245*g* and connected to the positive terminal of the remote arc power supply 26*b* while its negative terminal is connected to the cathode 12 and the cathode chamber 1*b*. The inner portion of the magnetron anodic grid 73*a* is positioned in front of the magnetron sputtering source 245*h* and connected to the output cable of the unipolar high voltage pulse generator 531*a*. The inner portion of the magnetron anodic grid 73*b* is positioned in front of the magnetron sputtering source 245*g* and connected to the output cable of the unipolar high voltage pulse generator 531*b*. The outer grids 70 are serving as remote anode to establish the remote arc discharge between the cathode 12 in cathode chamber 1*b* and the grids 70*a* and 70*b* adjacent to the magnetron sputtering sources 245*h* and 245*g*. The inner anodic grids 73*a* and 73*b* are powered by high voltage positive pulses generating by the unipolar high voltage pulse generators 531*a* and 531*b* which allow to increase ionization rate of magnetron sputtering metal atoms and also ionize and excite the gaseous plasma creating environment in front of the magnetron sputtering sources. The inductances 5781*a* and 571*b* and by-passing capacitors 575*a* and 575*b* are still installed in a circuits of the remote anodes 70*a* and 70*b* to protect the remote anode power supplies from the influence of high voltage positive pulses applied to the front anodic grids 73*a* and 73*b* by the pulse generators 531*a* and 531*b*.

Example 1

The process and a hybrid dual filtered cathodic arc-magnetron sputtering coating system similar to the one shown in FIG. 10*f*2 is used for deposition of superhard TiBCN nanocomposite coatings. The coupons made of O2 AISI tool steel 2"×2" are installed to the substrate holding rotary table 2 on substrate holders 4 with ability of single rotation around the axes of the rotary table 2. The O2 steel is starting to lose hardness already when it is heated above 200° C. therefore it cannot be overheated above this temperature during coating deposition process. The cathodic arc targets of LAFAD source are made of titanium while the targets of the magnetron sputtering sources 245*g* and 245*h* are made of B4C. The cathode target 12 of the shielded remote arc producing source 1*b* is made of SS. At the beginning of the process the chamber is filled with argon at pressure of 25 mTorr and glow discharge is created by applying 500V to the rotary table 2 with substrates-to-be-coated. The ion cleaning of the substrates in glow discharge argon plasma is performed during 30 min. After this stage the nitrogen and methane as reactive gases are added to the chamber and the pressure is reduced to 4 mTorr. The remote arc discharge is ignited between the cathode 12 in the cathode chamber 1*b* and remote anodes 70 adjacent to the magnetron sputtering sources 245*g* and 245*h* while the primary arc discharge in the cathode chamber 1*b* is ignited between the cathode 12 and the grounded walls of the chamber 1*b*. The LAFAD source is turned ON and its deflecting magnetic system is activated producing the fully ionized metal vapor plasma flow of titanium toward substrates-to-be-coated 4 in the coating chamber 42. The gas mixture consisting of argon, nitrogen and methane at the pressure of 4 mtorr is ionized and activated within the corridor 66 and within the openings 68*a* and 68*b* by remote arc discharge and within the opening 68*c* by the LAFAD plasma flow. The metal vapor plasma is flowing through the opening 68*c* in the shield 65 in front of the LAFAD source. The deposition of the TiCN sublayer continues for 30 min after which both magnetron sputtering sources 245*g* and 245*h* are also turned ON starting magnetron sputtering of B4C targets. The magnetron sputtering flow is reaching the substrates 4 through the openings 68*a* and 68*b* in the shield 65 in front of each magnetron sputtering source 245*g* and 245*h*. The substrates are rotating around the axes of the rotary table with rotation speed ranging from 4 to 12 RPM producing nano-multilayer coating consisting of nanolayers of TiCN followed by nanolayers of BCN, each nanolayer having thickness ranging from 0.5 to 4 nm. The coating deposition process continues for 1 hr for deposition of 5 μm TiBCN coating which is characterized by superhardness and high corrosion and wear resistant properties. It is understood that the foregoing examples are merely illustrative of the present invention. Certain modifications of the articles and/or methods employed may be made and still achieve the objectives of the invention. Such modifications are contemplated as within the scope of the claimed invention.

The embodiment of the sources for plasma assisted electric propulsion of present invention shown in FIG. 11 illustrates a hybrid filtered cathodic arc-EBPVD source, utilizing the EBPVD evaporator integrated in the plasma duct of the unidirectional dual filtered cathodic arc source, providing a concurrent filtered cathodic arc assisted electron beam evaporation capability which combines the high evaporation rate of an EB-PVD process with the high ionization rate of filtered cathodic arc plasma. In this design the crucible 291 with evaporate is installed in the plasma duct on the side of the converging magnetic cusp directed toward the main chamber 10 with substrates to be coated (not shown). Two arc plasma streams 27 generated by primary cathodic arc sources (not shown) flow from the opposite direction forming a converging streamline following the deflecting magnetic force lines 25. Two electron beam guns 250 and 250*a* are installed on flanges of the plasma duct chamber adjacent to the cathode chambers (not shown). The electron beam guns 250 and 250*a* generate two electron beams 260 and 260*a* which enter the plasma duct area from opposite directions, crossing the deflecting magnetic field lines 25 and arc plasma streamlines 27. Under the influence of deflecting field magnetic force lines 25 the electron beams 260 and 260*a* shift toward the center of the plasma duct and at the same time toward back side of the plasma duct opposite to the main chamber, which ultimately move the electron beams 260 and 260*a* toward the surface of evaporate in the crucible 291. The crucible 291 can be connected to the positive pole of the arc power supply while the negative pole is connected to one or more primary arc cathodes installed in cathode chambers. This effectively makes the crucible 291 serve as a second distant anode coupled with one or more primary arc cathodes. In this case a dense metal vapor plasma will be generated in the plasma duct by hot evaporated anode (HEA) having distributed diffused anode spot created on the surface of evaporate by e-beam heating combined with intense ionization as described in [R. L. Boxman, D. M. Sanders, and P. J. Martin, "Handbook of Vacuum Arc Science and Technology", Park Ridge, N.J.: Noyes Publications, 1995], which is incorporated herein by reference. The HEA plasma adds to ionization and activation ability of the filtered cathodic arc plasma stream.

Alternatively, the crucible 291 can be connected to the negative pole of additional arc power supply (not shown), while the positive pole can be grounded, which will make it serving as a cathode with distributed diffused cathode spots created in the area heated by electron beams 260. In this case a dense and strongly ionized metal vapor plasma will be generated in the plasma duct by hot evaporated cathode discharge (HEC), creating distributed diffused cathode spots on the surface of evaporate by e-beam heating combined with intense ionization, adding to ionization and activation ability of the filtered cathodic arc plasma stream as described in [R. L. Boxman, D. M. Sanders, and P. J. Martin, "Handbook of Vacuum Arc Science and Technology", Park Ridge, N.J.: Noyes Publications, 1995], which is incorporated herein by reference.

It will be appreciated that any type of PVD vapor plasma sources can be installed in a deflection area of the plasma duct 44 including, but not limited to, cathodic arc evaporator, magnetron sputtering sources, electron beam evaporator and thermal evaporator sources magnetically and/or electrically coupled with filtered cathodic arc source. This arrangement is useful for hybrid coating deposition processes comprising different types of vapor plasma sources installed in a deflection area of the plasma duct 44 facing the substrate holder 2 and generating the metal vapor plasma along the plasma duct in combination with filtered cathodic arc sources installed in a cathode chamber 90 off of the optical axis of the substrate holder 2, and generating the 100% ionized filtered cathodic arc vapor plasma stream concurrent with direct vapor generated by vapor sources installed in the deflection area of the plasma duct 44.

Figure 12A:
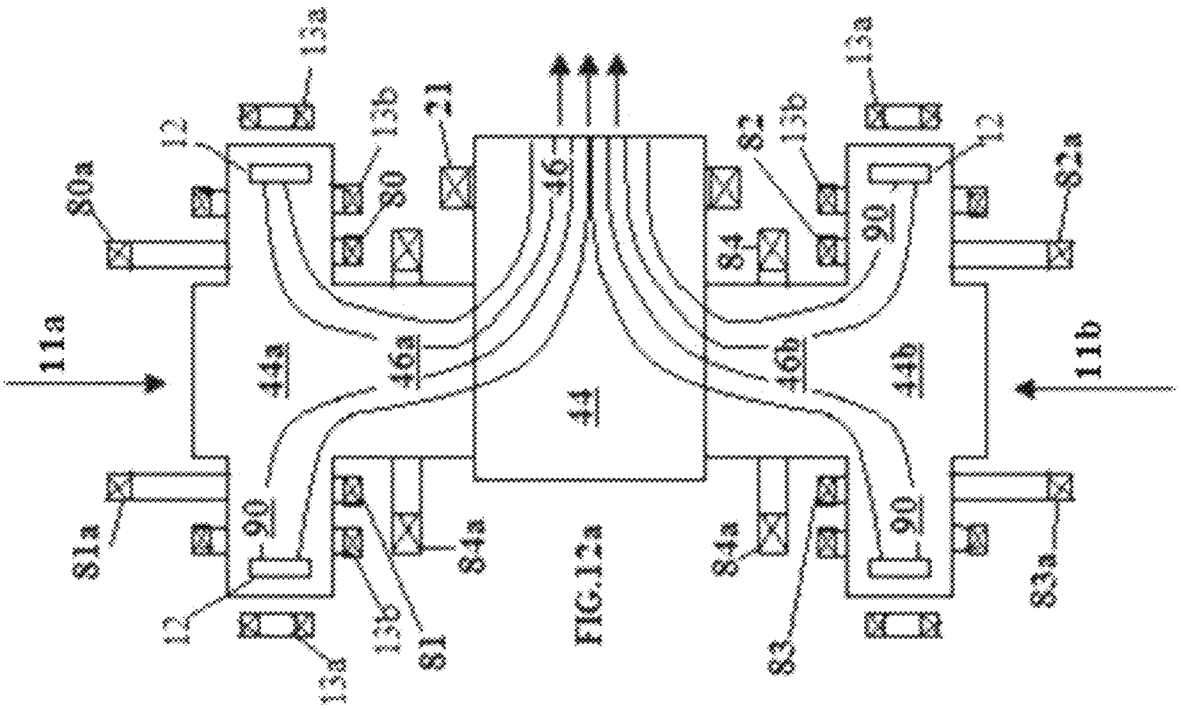

FIG. 12*a* shows an embodiment of the sources for plasma assisted electric propulsion of present invention, which utilizes a filtered cathodic arc source with an additional filtration stage. In this embodiment, two unidirectional dual filtered sources 11*a* and 11*b* are connected to the side walls of the plasma duct 44 of a third, a common plasma duct chamber. The cathodes 12 are disposed in cathode chambers 90 in communication with filtered plasma ducts 44*a* and 44*b* which are oriented substantially perpendicularly to the optical axes of the cathodes 12, and which in turn are oriented substantially perpendicularly to the main plasma duct 44. The dual filtered cathodic arc sources 11*a* and 11*b* serve the same role as cathode chambers 90 in a dual filtered cathodic arc source having one filtration stage, as was previously shown in FIGS. 3 and 4. The tunnel exit portions 46*a* and 46*b* are attached to the opposite side walls of the plasma duct portion 44 of the common plasma duct chamber. The offset deflecting coils 84 surrounds the exit portions of the exit tunnels 46*a* and 46*b* before they meet the walls of the plasma duct 44, which allows the filtered cathodic arc plasma to start deflecting before entering into the common plasma duct 44 resulting in substantial increase in vapor plasma transport efficiency in this dual filtration multi-target vapor plasma source design. This embodiment, by orienting the main plasma duct 44 off of the axes of tunnel exit portions 46*a* and 46*b*, provides the advantage of an additional filtration stage which can be useful in semiconductor and optical applications, where particularly clean plasma is required.

Figure 12B:
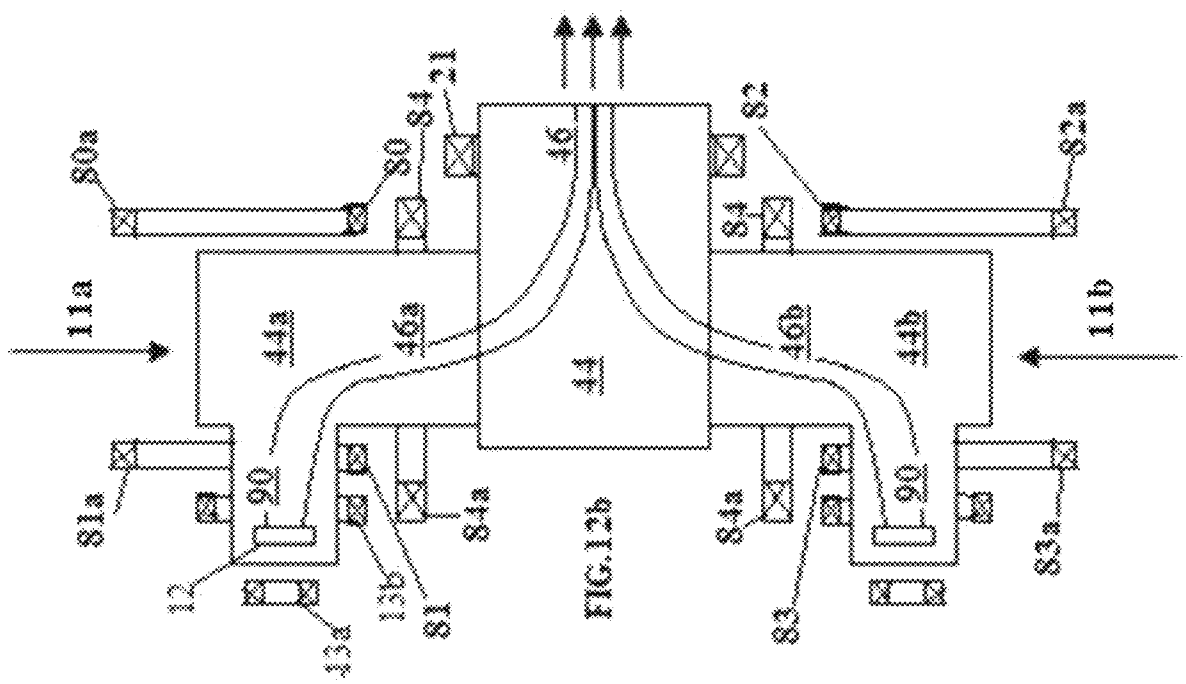

It will be appreciated that the plasma ducts 44*a* and 44*b* of the first filtration stage may have only one cathode chamber 90, attached to side wall of the deflection portion of the plasma ducts 44*a* and 44*b* as shown in a variation in FIG. 12*b*. In this case the pairs of offset deflecting cools 80, 81 of the primary filtered cathodic arc source 11*a* and pair of offset deflection coils 82, 83 of the primary filtered cathodic arc source 11*b* must have the same offset position in relation to the plasma duct 44 and the cathode chamber 90 as if both of their cathode chambers were installed into the opposite side walls of the plasma ducts 11*a* and 11*b* as that of FIG. 12*a*. It can be seen that dual filtration source shown in FIG. 12*b* thus has a distribution of the magnetic deflecting and focusing fields similar to that of FIG. 12*a*. Therefore, the plasma stream generated by the cathode targets 12 of the primary cathodic arc sources 11*a*, 11*b* installed at the top of cathode chambers 90 will follow the same trajectories as that shown in FIG. 12*a*.

FIGS. 13*a* and 13*b* illustrate variations of the embodiments of the sources for plasma assisted electric propulsion of present invention configured for plasma treatment, coating and functionalization of powder through fluidized bed vapor plasma condensation (FBVPC). Herein, a "powder" refers to a collection of particles. In FIG. 13*a*, a unidirectional multi-cathode filtered arc vapor plasma source, of design similar to that shown in FIG. 7*a*, generates vapor plasma flow toward a cloud of powder prepared in a fluidized bed rotary tubular reactor chamber 17 that is installed in a main chamber cabinet 10. The fluidized powder can be prepared by using a rotational fluid bed chamber 17 as shown in FIG. 13*a*, by subjecting of powder to vibration, using moving ribs or other means to agitate the powder.

In a refinement, the rotary fluidized bed chamber 17 shown in FIG. 13*a* can be designed as a reversed remote arc plasma enhanced rotary fluidized bed PECVD reactor chamber as shown schematically, for example, in FIG. 13*a*1. In this design, the rotating reactor chamber 17 is driven by a rotating drive through a coaxial shaft 18. The reactive gas is supplied in chamber 17 along shaft 18, while the remote anode 70 is mounted into the rotating shaft 18 inside the reactor chamber 17, which is characterized by high pressure, high plasma potential. The cathode chamber 108, which is characterized by low pressure low plasma potential, is connected to the pumping system via gas outlet line 603, while the gas supply line 602 is connected to the opposite, distant end of the reactor chamber 17 through the rotating shaft 18, sealed by the vacuum rotary feedthrough 503. The rotating reactor chamber 17 is separated from the cathode chamber 108 by the separating baffle 582 with small nozzle-orifice 582*a*, attached to the chamber 17 via seal 502. In this case, a large pressure difference can be established between the high pressure reactor chamber 17 and the low pressure cathode chamber 108 which allows processing diamond coating at higher pressures exceeding 1 Torr within the rotary reaction chamber 17, resulting in greater productivity of synthesis of diamond powder or coating of powder in the reactor chamber 17, while securing the low pressure typically below 200 mTorr in the cathode chamber 108 attached to the main low pressure reactor's cabinet 1*b*, where the low pressure is necessary for the operating of the vacuum cathodic arc plasma source 108, which include the primary cathode 583, the magnetic steering coil 585, powered by the primary arc power supply 533. The pressure difference between the reactor chamber 17 (high pressure) and the cathode chamber 108 increases when the current of the remote arc discharge ignited between the cathode 583 and the remote anode 70 in the reactor chamber 17, powered by the remote arc power supply 535, increases partially due to the friction forces between the electron current flow directing from the cathode 108 through the nozzle-orifice 582*a* toward remote anode 70 in the reversed remote arc discharge and the opposite gas flow directing from the high pressure fluidized bed rotary reaction chamber 17 toward low pressure chamber 1*b*, creating electrophoresis effect in addition to large hydraulic resistance and magnetic pressure resulting from the large arc current conducting through the small diameter orifice 582*a*. The pressure difference is mostly located across the nozzle 582*a* creating the bottleneck effect across the stationary shock-wave front within the nozzle-orifice 582*a*. The fluidized powder immersed in the reversed arc discharge plasma creates a reactive dusty plasma environment 291 within the reaction zone 1*c* of the rotary reactor chamber 17 which is characterized by relatively slow gas velocity less than ⅓ of the speed of sound at the gas temperature of the chamber 17, while more likely making a stagnation zone in the reaction area 1*c*. In sharp contrast the high-speed plasma plume with gas velocity ranging from ⅓ to 20 times of the speed of sound at the gas temperature in the chamber 17 is entering into the low-pressure chamber 1*b* housing the cathode 108. Chamber 17 can be optionally placed in the longitudinal magnetic field to increase the plasma density in the reaction area. Optionally, external heaters are installed around chamber 17 to independently control the temperature in the PECVD reaction area.

In a variation of the embodiment of the rotary tubular furnace reversed remote arc PECVD reactor shown in FIG. 13*a*1, the cathode 108 can be water-cooled hollow cathode with self-recreating inner metal coating 767 having high boiling point as illustrated in FIG. 13*a*2. In reference to FIG. 13*a*2, the cathode 108 assembly, utilizing the water-cooled body 769 of the hollow cathode with self-recreating inner metal coating having high boiling point (similar to one shown, for example, in FIGS. 7*f*1, 7*w*4, 7*w*5, 9*f*6), is attached to the reactor's cabinet 1*b*, coaxially with rotary fluidized bed reactor's chamber 17, outside of the reactor's cabinet 1*b* wall, spaced from the cabinet's 1*b* wall by the electrically insulative ceramic spacer 501, which also secure the vacuum seal of the reactor's cabinet 1*b*. The pressure within the reactor's cabinet 1*b* is maintained low by the pumping system connected to the cabinet 1*b* via pumping line 603. The outer shield 582*a* is attached to the reactor's flange 582, which is attached to the reactor's chamber wall 17 via electrically isolative spacer 502. The outer shield 582*a* is overlapped by the inner shield 582*b*, attached to the wall of the reactor's cabinet 1*b* in front of the cathode 108, coaxially both to the reactor's chamber 17 positioned inside of the cabinet 1*b* and to the cathode assembly 108 positioned outside of the cabinet 1*b*. The flange 582 is provided with the at least one nozzle 582*c*, having orifice 582*d*. The inner shield 582*b* together with the reactor's flange 582 form a primary arc chamber 109 where the primary arc discharge is ignited between the cathode 108 and the grounded inner shield 582*b*, powered by the primary arc power supply 533. The pressure within the primary arc chamber 109 is holding nearly equal to the pressure within the cabinet 1*b* by the opening of the primary arc chamber 109 to the reactor's cabinet 1*b* via the gap between the outer shield 582*a* and the inner shield 582*b*. The remote arc discharge is extended from the cathode 108 through the primary arc chamber 109 and further through the opening 582*d* in the nozzle 582*c* and further across the reactor's chamber 17 reaction zone 1*c* toward the remote anode 70 positioned at the distant opposite end of the rotating tubular reactor 1*c*. The reversed remote arc discharge between the cathode 108 and the remote anode 70 is powered by the remote arc power supply 535. The gas supply line 602 is connected to the rotating shaft 18 of the remote anode 70 which is sealed by the vacuum rotary feedthrough 503. The at least one small orifice 582*d* in the nozzle 582*c* represents a bottleneck separating the high pressure high plasma potential dusty plasma environment 291 of the reaction zone 1*c* within the rotary fluidized bed chamber 17 and the low pressure low plasma potential area of the cabinet 1*b* and the primary arc chamber 109.

Alternatively, the powder can be exposed in filtered metal vapor plasma during a free fall as shown in FIG. 13*b*. In this arrangement, the powder feeder injects the powder at the top of the cylindrical tube surrounded by solenoid 280. The cathode targets 12 in cathode chambers 90 are powered by the primary arc power supplies 19 and the remote anode 70 is powered by the remote arc power supply 26. The powder falls down throughout the column of the highly ionized and magnetized plasma generated by a multi-cathode filtered arc source similar to that shown in FIG. 7*a*. The coated powder is collected in a powder collector 295 attached to the back flange of the filtered cathodic arc source. In the preferred embodiment, the powder handling and treatment area is integrated into the filtered cathodic arc source plasma duct chamber 44.

The variation of the embodiment of the free fall reactor for treatment and coating of powders shown in FIG. 13*b* is vertical tubular reactor with swirled gas flow as illustrated in FIG. 13*b*1. The reactor chamber 1*c* consists of the discharge tube 541 made of dielectric ceramics such as quartz or alumina with metal top lid 541*t* and bottom lid 541*b*. The remote anode 70 is spaced from the top lid 541*t* by electrically isolative spacer 501*c*. The powder supply feeder 307 is attached to the side wall 71 of the tubular remote anode chamber 1*b* via powder supply line 307*a*. The powder is supplied along the axes of the reactor chamber 1*c* via the central opening 70*a* in the remote anode 70. The cylindrical walls 541*c* of the powder collection portion of the reactor 1*w* are attached to the bottom lid 541*b*. The powder collection portion 1*w* consists of the cylindrical tube 541*c* with the powder collector 295 attached to the bottom via frustoconical transfer section 541*d*. The bottom lid 541*b* can optionally have a central converging nozzle 541*e*. The primary arc chamber 109 is attached to the side wall of the powder collection portion 541*c* of the reactor. The primary arc chamber 109 is separated from the wall 541*c* by the baffle 582, spaced from the 541*c* by spacer 501*b*. The baffle 582 is opened to the powder collection portion 1*w* of the reactor by small opening 582*a* in the nozzle 582*b*. The cathode with self-recreating inner surface 108 is connected to the primary arc chamber 109 via electrically insulative spacer 501*a*. The self-recreating hollow cathode 108 comprises the water-cooled chamber 769 with inner surface coating 767 by the metal with high boiling point such as, for example, Bi. High temperature diaphragm 759, made of refractory metal such as Molybdenum or Tungsten, is positioned by the side of the cathode 108 facing the primary arc chamber 109, spaced from the cathode 108 by ceramic spacer 763 and also spaced from the primary arc chamber 109 by ceramic spacer 501*a*. The diaphragm 759 has a nozzle 761 with small opening 761*a*. In operation, when the primary arc discharge is ignited between the cathode 108 and the grounded primary arc chamber 109, powered by the primary arc power supply 19, the cathodic arc spots are created on the inner surface of the cathode chamber 769 evaporating the metal coating 767, which vapor is condensing on other portions of the inner water-cooled side of the cathode chamber 769, recreating the metal coating 767. The arc plasma protruding through the opening 761*a* is heating the diaphragm 759 to high temperature, exceeding the boiling point of the metal coating 767, protecting the diaphragm 759 from condensation of the metal coating 767 and blocking the metal vapor from penetrating throughout the opening 561*a* to the primary arc chamber 109. The reactive gas is supplied from the gas supply line 601*a* into the reactor chamber 1*c* in reversed vortex manner using the vortex creating tangential gas supply ring 112 positioned at the bottom side of the reactor chamber 1*c* and having a set of vortex-creating nozzles tangential to the chamber wall 541. The reversed vortex is forming a swirling gas flow 292 in the reactor chamber 1*c* from the bottom lid 541*b* to the top lid 541*t* closing by the backing jet flow 291, forming along the axes of the reactor chamber 1*c* and directed toward the bottom lid 541*b* and further, via nozzle 541*e* and powder collection portion 1*w*, through the nozzle 582*b* to the primary arc chamber 109 where it is pumped out through the gas pumping line. Optionally, additional gas supply line 601*b* can be provided to the anode chamber 1*b*. The remote arc discharge is ignited between the cathode 108 and the remote anode 70, powered by the remote arc power supply 26, filling the reactor chamber 1*c* and collection portion of the reactor 1*w* with dense remote arc plasma. Optionally the pair of magnetic coils 13*a* at the bottom of the chamber 1*c* and 13*b* at the top of the chamber 1*c* can be provided to produce the external longitudinal magnetic field along the reactor chamber 1*c* which will improve confinement of the remote arc plasma in the near-axes area of the reactor chamber 1*c*. The remote arc plasma density is reaching its maximum in the backing jet area 291 along the axes of the reactor where most of the powder cloud is also confined due to the centrifugal effect of the reversed vortex flow 292.

FIG. 13*c* illustrates a further preferred embodiment of the apparatus shown in FIG. 13*b* for producing concurrent composite powder/metal vapor plasma coatings. In this apparatus, the substrates to be coated 4 such as cutting tool carbide inserts are disposed on the substrate holder 2 at the bottom of the substrate chamber 10. The cathode targets 12 in cathode chambers 90 are powered by the primary arc power supplies and the remote anode 70 is powered by the remote arc power supply as shown in FIG. 13*b*. Substrate holder 2 can be connected to the bias power supply to provide a negative bias potential typically ranging from −10V to −1200V in reference to the ground during different stages of the coating deposition process. The macroparticles (MPs) powder which can contain both micro- and nanopowder, falls down throughout the column of highly ionized and magnetized plasma generated by a multi-cathode filtered arc source similar to that shown in FIG. 7*a* along the tubular upper tunnel portion of the plasma duct 290 and continues its free fall throughout the plasma duct 44 and its bottom exit portion 46 toward the bottom of the substrate chamber 10. During the time when solid particles are passing the plasma duct 44 they are getting partially coated by metal vapor plasma and also acquiring large negative charge as a result of interaction with dense metal vapor plasma in the tubular discharge channel. Some of these MPs are falling on the surface of the substrates 4 and the coating deposition process continues until a composite powder/metal vapor deposit is formed on the surface of substrates 4. This system can be considered as a variation of the vacuum cold spray equipment enable to produce powder spray coating encapsulated by the PVD deposit at pressures as low as $10^{-5}$ Torr.

In a refinement, the free fall reactor for PECVD coatings of powder is shown in FIG. 13*d*. In the reactor of FIG. 13*d*, the powder is exposed to the remote arc plasma generating between the cathode target 583 positioned in the cathode chamber 108 upstream of the reaction zone 290 and remote anode 70 positioned in the remote anode compartment 1*b* downstream of the reaction zone 290. The cathode chamber is connected to the top portion 44*t* of the reaction compartment 1*c* via flange 501. The low pressure low plasma potential compartment 108 is separated from the high pressure high plasma potential remote anode reactive area 290 via separating baffle 582 with small bottleneck orifice 582*a*. The electron current is conducted from the cathode 12 toward remote anode 70 throughout the orifice 582*a* while the reactive gas is flowing from the reactive zone 290 toward cathode compartment 108 throughout the orifice 582*a* in the direction opposite to the electron current in a reversed arc discharge plasma process. Furthermore, the fall of the powder is slowed by the flow of reactive gas from gas inlet 602 to the pumping system coupled to cathode chamber 108, which results in increased time spent in reaction zone 290 and thus increased coating time of the powder, which is supplied to the top portion 44*t* of the reaction compartment 1*c* from the powder supply unit 307. The coated powder is collected in a powder collector 295 at the bottom of the reactor.

In a variation of the free fall reactors shown in FIGS. 13*c* and 13*d*, the electrostatic acceleration stage can be integrated into the free fall reactor of FIG. 13*d* forming a vacuum cold spray apparatus as illustrated in FIG. 13*d*1.1, which makes it possible to accelerate the charged MPs to hypervelocities prior to their interaction with substrates-to-be-coated. The high voltage potential, negative in case if MPs are charged negatively and positive in case if MPs are charged positively, can be applied to the plasma generation chamber 72 similar to one shown in FIG. 8*h*1, including the top tubular compartment 290, the plasma duct 44 and the exit tunnel portion 46 together with attached cathode chambers 90, cathode targets 12, steering, deflecting and focusing magnetic coils 13, 20, 21, 22 and all associated power supplies. The top tunnel compartment 290 has remote anode 70*b* and gas inlet 602. The remote arc discharge is conducting between at least one of the cathode targets 12 of the cathodic arc sources 90 and remote anode 70*b* which increases ionization and activation of the gaseous plasma environment in the top tubular compartment 290. The top tubular compartment 290 is isolated by the insulative ceramic spacer 501*d* from the grounded top powder supply chamber 293 with vibratory powder supply system 591 connected to the powder supply chamber 293 by the powder supply line 609. The baffle 981*d* with frustoconical opening 981*e* is separating high voltage-biased plasma generation chamber 72 from the top grounded powder supply chamber 293 to prevent the penetration of the high potential plasma into the grounded top chamber 293. In reference to the FIG. 13*d*1.1 the electrostatic acceleration stage of the charged MPs is positioned downstream of the tunnel exit section 46 of the plasma duct 44 prior to the substrate chamber 10. The plasma column within the tubular exit tunnel section 46 is generated between the cathode targets 12 positioned in the cathode chambers 90 and the remote anode 70*a* positioned at the exit end of the tunnel 46, facing the substrate chamber 10. The pair of magnets 80*a* and 80*b*, forming a transversal magnetic field downstream of the tunnel 46 are forming a magnetic filter 80, to remove all electrons from the plasma discharge forming within the tunnel 46. The electrons are moving along the magnetic field lines perpendicular to the axes of the plasma generator chamber 72 toward remote anode tube 70*a*, positioned in the area crossing by the transversal magnetic field of the magnetic filter magnets 80*a* and 80*b*. The grid 981*c* is optionally inserted between the magnetic filter 80 and the exit tunnel 46 to reduce the density of the plasma flow generated by the filtered arc source within the plasma duct 44 and its exit tunnel section 46. The electrostatic acceleration stage including the screen grid electrode 981*a*, having potential close to the potential of the plasma chamber 72 and electrostatic accelerating grid electrode 981*b* which is biased positively in relation to the negatively biased plasma generation chamber 72, including the tunnel compartments 290, 46, plasma duct 44 and 46 and cathode chambers 90 with cathode targets 12. The grids 981*a* and 981*b* are insulated from each other and from the chamber 72 by ceramic insulators 501*a*, 501*b*, 501*c*. At the same time, the plasma generation chamber 72 is serving as a primary anode in relation to the vacuum cathodic arc sources 12 in the cathode chambers 90. The charged MPs entering the electrostatic acceleration stage are generally negatively charged by interaction with dense magnetized metal vapor plasma in the plasma duct 44 and its tunnel sections 290 and 46. The accelerating voltage applied to the acceleration grid electrode 981*b* having potential higher than that of the negatively charged potential typically ranges from 1 kV to 100 kV applied to the plasma generation chamber 72 and all its components, allowing to accelerate the MPs having diameters ranging from nanometric particles to particles of few microns up to hypervelocity speeds. Alternatively, the plasma chamber 72 with all attached plasma generation components can be biased to the potential only slightly lower than the ground, but the accelerating grid 981*b* will be biased to high voltage positive potential for accelerating the flow of the negatively charged MPs. Depending on high voltage potential applied to the plasma chamber 72 and accelerating grid electrode 981*b*, the negatively charged MPs can be accelerated to the velocities ranging from 0.5 to 10 km/s, where the smallest particles are usually accelerating to the greater speeds, providing the vacuum cold spray coating deposition process without any noticeable presence of the plasma-creating gas. The accelerating stage including the screen grid 981*a* and the accelerating grid 981*b* can be replaced by the baffle 982*a* with opening 982*b* as illustrated in FIG. 13*d*1.2. in this case the baffle 982*a* may be electrically connected to the chamber 72 to have the same high negative bias potential as chamber 72.

One of the advantages of the vacuum arc plasma source of charged micro- and nanoparticles is its ability to produce bursts of MPs consisting of myriads of MPs on a micro- and nano-scale with broad distribution of their velocities. This process allows one to modify the surface layer of different materials by incorporating nanoparticles which are not chemically or thermodynamically compatible with the matrix material, producing material with artificial surface composition which is forbidden from conventional fabrication technologies. Using vacuum cathodic arc metal vapor plasma source for production and charging of MPs allows to eliminate gaseous environment and produce vacuum cold spray coatings at extremely low pressures.

FIG. 13*d*2 illustrates a further preferred embodiment of the apparatus shown in FIGS. 13*d*1.1 and 13*d*1.2 for vacuum plasma spray coating deposition process utilizing the charged macroparticles (MPs) generated by the vacuum cathodic arc discharge. Efficient source of charged microand nanoparticles as MPs work media for electrostatic particle accelerator, based on the cascaded vacuum arc plasma setup, is shown schematically in FIG. **13*d*2. The initial flux of MPs can be emitted from the cathode spots of the vacuum arc cathode 12 in the primary arc compartment 1*a*, separated from the long remote arc plasma discharge tube, serving as MPs plasma charging chamber 1*b* by a diaphragm 582 with at least one small orifice 582*a* with diameter ranging from 0.1 mm to 5 cm for extracting the MPs and connecting the primary arc to the remote arc discharge column attached to the remote anode 70*c* adjacent to the magnetic filter 80 and, optionally, to the mid anodes 70*a*, 70*b* which allow to extend the remote arc plasma column through the long plasma charging chamber 1*b* via cascaded arc mechanism. The MPs emitted by the vacuum cathodic arc spots are extracted through the orifice 582*a* toward the remote arc chamber 1*b* where the remote arc plasma column is forming by confinement of the vacuum arc plasma in the focusing longitudinal magnetic field, generated by the magnetic coils 20. Alternatively, the MPs can be delivered in the magnetized remote arc plasma column from the separate powder container 591 via powder supply line 591*a*. The MPs are charged negatively by interacting with dense vacuum arc plasma in the remote arc chamber 1*b* followed by entering the electrostatic accelerating stage (shown in FIGS. 13*d*1.1 and 13*d*1.2) where MPs are accelerating to hypervelocities toward substrates-to-be-coated in the substrate chamber 10 (shown in FIG. 13*d*1.1), while high negative potential is applied to both primary arc chamber 1*a* with vacuum cathodic arc target 12 and the remote arc plasma charging chamber 1*b* with remote anode 70*c* and mid anodes 70*a* and 70*b* providing high potential energy to the negatively charged MPs. The gas flow velocity in the bulk of the remote arc chamber 1*b* is slow, not exceeding ⅓ of the speed of sound at the gas temperature of the chamber 1*b*, while the hypervelocity MPs flow is developing by electrostatic acceleration of the negatively charged MPs downstream of the magnetic filter 80. Both primary arc chamber 1*a* and remote arc chamber 1*b* with all attached electrodes are forming the plasma generation chamber 72 which is typically charged to high voltage negative potential in the reference to the ground to provide high potential energy for negatively charged MPs prior to them entering the accelerating electrostatic grids. The magnetic filter 80 is placed immediately downstream of the plasma generation chamber 72 to remove the electrons from the plasma column toward the remote anode 70*c* so only the negatively charged MPs will enter the plasma accelerating stage downstream of the magnetic filter 80. It should be appreciated that, alternatively, both primary chamber 1*a* and plasma charging chamber 1*b* can be floated and the acceleration energy can be provided to the flow of the negatively charged MPs downstream of the filter 80 by the high-voltage positively charge accelerating grid electrode (shown in FIGS. 13*d*1.1 and 13*d*1.2). In the vacuum plasma spray setup shown in FIG. 13*d*2, both the primary vacuum arc cathode 12 and the remote arc plasma column are placed in an axial longitudinal external magnetic field. In this setup, the magnetic constriction of both primary arc discharge attached to the vacuum arc cathode and the remote arc discharge attached to the remote arc anode 70*c* and mid anodes 70*a*, *b* result in formation of high plasma density within the long remote arc column. The MPs are subjected to intense charging to high negative charge during the increased residence time in dense plasma of the magnetically constricted long remote arc column prior to entering the electrostatic accelerating stage (shown in FIG. 13*d*1.1) which accelerates the charged MPs to hypervelocities before they impact the substrates-to-be-coated positioned in the substrate chamber downstream of the MPs acceleration electrodes in the vacuum cold spray coating deposition process. In refinement, the cathode 12 and the outlet of the gas pumping system 603 can be attached to the plasma charging compartment 1*a* which is characterized by low pressure and low plasma potential while the remote anode 70 is positioned in the remote anode compartment 1*b*, which is positioned by the entrance of the remote arc plasma charging compartment 1*a* as illustrated in FIG. 13*d*3. In reference to the FIG. 13*d*3, the gas supply inlet 602 is provided to the remote arc compartment 1*b*, which is characterized by high pressure, high plasma potential and plasma stagnation conditions with gas velocity not exceeding ⅓ of the speed of sound at the gas temperature in the remote arc compartment 1*b*. The primary arc plasma charging compartment 1*a* with attached gas pumping line 603 is separated from the plasma charging remote arc compartment 1*b* by the separating diaphragm 582 with at least one small nozzle-orifice 582*a* having diameter ranging from 0.1 mm to 5 cm. The cathode 12 can be thermionic filament cathode heated by AC power supply (not shown) via AC terminal 26*c* as shown in FIG. 13*d*3, but also can be hollow cathode as shown in FIG. 9*f*3*e* 1*b* or vacuum arc cold cathode as shown in FIGS. 13*d*2, 13*d*4. The flow of the MPs can be delivered in the magnetized remote arc plasma column of the plasma charging compartment 1*a* from the separate powder container 591 via powder supply line 591*a*. The plasma in the high-pressure high plasma potential remote anode compartment 1*b* is generally stationary, its characteristic velocity in the bulk of the remote arc compartment 1*b* does not exceed ⅓ of the speed of sound at the gas temperature of the compartment 1*b* while the high-speed plasma plume is developed by expansion of the plasma from the high pressure, high plasma potential remote anode compartment 1*b* into the low pressure, low plasma potential primary arc compartment 1*a* via at least one nozzle-orifice 582*a*, which diameter is ranging from 0.1 mm to 5 cm. The speed of the gas flow in the plasma plume entering the plasma charging compartment 1*a* from the remote anode chamber 1*b* through at least one orifice 582*a* is ranging from ⅓ to 20 times of the speed of sound at the gas temperature of the remote anode compartment 1*b*. In the plasma plume, the MPs are charging negatively due to much higher mobility of electrons compare to positively charged ions and under the influence of the high speed flow in the plasma plume are getting the initial velocity toward the electrostatic accelerating stage attached to the downstream side of the plasma charging compartment 1*a* downstream of the magnetic filter 80, which removes the electrons from the dusty plasma flow exiting the plasma charging chamber 1*b* (as shown in FIGS. 13*d*1.1 and 13*d*1.2). The magnetic filter 80 and the anode 70*c* are positioned at the end of the plasma charging compartment 1*a* in front of the entrance to the electrostatic accelerating stage, to filter out the electron component from the dusty plasma environment of the plasma charging compartment 1*a* to the anode 70*c*, which allows only the negatively charge MPs to enter the electrostatic accelerating stage to be accelerated to hypervelocities before deposited on substrates-to-be-coated in the substrate chamber (shown in FIG. 13*d*1.1). The filter's anode 70*c* is powered by the power supply 26*d* connected between the cathode 12 and the anode 70*c*. The mid anodes 1 and 2 positioned along the plasma charging compartment 1*a* are powered by the power supplies 26*a* and 26*b* connected between the cathode 12 and the corresponding mid anodes 70*a* and 70*b*. The remote anode 70 in the remote arc compartment 1*b* is powered by the power supply 26*b*** connected between the cathode 12 in the plasma charging compartment 1a and the remote anode 70 in the remote arc compartment 1b at the entrance of the plasma charging compartment 1a, which are separated by the separating baffle 582 with small nozzle-orifice 582a. The electron current of the reversed arc discharge plasma is conducting from the plasma charging compartment 1a through the at least one nozzle 582a toward remote anode 70 in the direction opposite to the direction of the gas and plasma flow which is directed from the high pressure remote arc compartment 1b through the nozzle 582a toward the plasma charging compartment 1a, creating a high speed plasma plume along the axes of the plasma charging compartment 1a toward electrostatic accelerating stage.

FIGS. 13e through 13e5 illustrate the further preferred embodiments of the reversed arc fluidized bed PECVD reactors for treatment of powders suspended in reactive plasma flow creating a dusty plasma media similar to that shown in FIGS. 13a, 13a1, 13a2,13b, 13c and 13d. In these reactors the composite ceramic powder with core-shall particles are fabricated by exposure the core particles in a dusty reactive plasma media where the shell layers are growing on a surface of the core particles. In the fluidized bed reactors shown in FIGS. 13e through 13e5 the particles no longer form a bed and are "conveyed" upwards by the upward reversed arc plasma flow. In reference to FIG. 13e, the vertical cylindrical reactor chamber 1c comprises the dielectric cylinder tube 541, typically made of quartz, BeO or alumina ceramics, which optionally can be water-cooled. Alternatively, the water-cooled cascade channel having a wall made of a set of metal and ceramic washers, similar to one shown in FIGS. 7w, 7y, instead of insulative ceramic cylinder 541, can be used as a fluidized remote arc plasma reactor chamber 1c. The cathode assembly 108 utilizing the water-cooled hollow cathode body 769 with self-recreating inner metal coatings 767 made of metal with low boiling point and high pressure of saturated vapors such as for example Bi, is attached to the primary arc chamber 109 located on top of the rector's tube 541 and connected to the reactor's tube 541 via flange 583, which is attached to the reactor's tube via vacuum seal 583a. At the bottom of the reactor's tube 541, the frustoconical water-cooled metal lid 70 is attached via vacuum seal 583b. The lid 70 is provided with axisymmetric gas supply inlet 602 connected to the bottom gas supply line 602a. The metal lid 70 is also serving as remote anode 70, powered by the remote arc power supply 26 which negative pole is connected to the cathode 108 to conduct the reversed remote arc plasma discharge between the primary cathode 108 and the remote anode 70, generating a dense plasma environment in the reactor chamber 1c. The cathode 108 is connected via electrically isolative ceramic spacer 501a to the primary arc chamber 109, which is connected to the pumping system via autonomous pumping line 1e. The arc nozzle disk 582 with nozzle-opening 582b having small opening 582a with diameter ranging from 0.1 mm to 5 cm, but typically not exceeding 2 cm, is attached to the bottom side of the flange 583 via ceramic insulative spacer 501b. The powder feeder 307 is connected to the periphery of the flange 583 of the primary arc chamber 109 of the reactor's chamber 1c via powder supply line 307a with the exit opening 307b. In operation, the reactive gas flow supplied through the gas inlet 602 into remote anode 70 frustoconical cavity is forming the upward reversed arc dusty plasma flow along the axes of the reactor chamber 1c. The reactive gaseous reversed arc plasma plume creates the vertical upward flow 292 within the chamber 1c fluidizing the cloud of the particles 291 suspended in the upward gaseous plasma flow of the powder supplied from the powder feeder 307 via powder supply line 307a. The MPs suspended in the vertical upward gaseous dusty plasma flow are charged negatively by interaction with plasma due to high mobility of the negatively charged electrons vs. low mobility of the typically positively charged ions. The charged MPs have greater surface reaction rate and the corresponding greater growth rate of the shell layer material deposited on the surface of the core MPs from the reactive plasma flow in the reaction chamber 1c. The velocity of the gas flow in the bulk of the reaction chamber 1c does not exceed ⅓ of the speed of sound at the gas temperature in the reaction chamber 1c. In sharp contrast, the exhaust reversed arc discharge plasma flowing from the reaction chamber 1c through the nozzle-opening 582a toward the primary arc chamber 109 is forming a high-speed plasma plume with speed ranging from ⅓ to 20 times of the speed of sound at the gas temperature in the reaction chamber 1c when it is expanding from the high pressure high plasma potential reaction chamber 1c toward the low pressure low plasma potential primary arc chamber 109. The plasma plume flow through the nozzle 582a toward the cathode chamber 109 is directed in the opposite direction to the direction of the reversed arc current which is directed from the cathode through the nozzle 582a toward the remote anode 70 in the reaction chamber 1c. The sharp stationary shock-wave front is developing across the nozzle-opening 582a separating the high pressure high plasma potential area in the reaction chamber 1c from the low pressure low plasma potential area of the cathode chamber 109, creating a barrier, preventing the macroparticles to penetrate into the cathode chamber 109 from the reaction chamber 1c. The primary arc is ignited within the primary arc chamber 109 between the cathode 108 and the primary arc chamber 109 walls, generating the primary arc plasma discharge, powered by the primary arc power supply 19, while the remote arc, powered by the remote arc power supply 26, is extended via the nozzle opening 582a and further throughout the reactor chamber 1c toward the remote anode-lid 70, filling the entire reactor chamber 1c with dense remote arc plasma which ionizes and activates the reactive gas and heat the fluidized powder within the reaction area 291 where the fluidized particles are exposed to the reactive plasma at high temperature resulting in deposition of the shell-coating on surface of the core ceramic particles suspended within the fluidized reaction zone 291 during the time, when the particles are residing within the fluidized zone 291 of the reactor 1c. The fluidized macroparticles with dimensions ranging from nano- to microparticles are immersed, suspended within the dense reversed arc plasma cloud, forming a dusty plasma environment where the MPs are charged negative by the interaction with surrounding plasma (plasma charging), which intensify the plasma-surface material synthesis reactions. After plasma exposure time the fluidized particles are eventually falling to the bottom of the reactor, accumulating within the powder collector 295. The improvement of the plasma density and its reaction activity can be achieved by external magnetic field produced by a pair of optional magnetic coils 13a and 13b positioned at the top and the bottom of the reactor coaxially with the reactor tube 541. The pressure within the primary arc chamber 109 is ranging from 1 mTorr to 100 Torr, while the pressure within the reactor chamber 1c is typically greater than 1 Torr and reaching up to atmospheric pressure, exceeding the pressure within the primary arc chamber 109 at least 2 times. The pressure within the primary arc chamber 109 less than 1 mTorr is undesirable because it can induce the increased flux of the metal coating 767 vapor leaving the hollow cathode 108 cavity. The pressure within the primary arc chamber 109 exceeding 100 Torr is undesirable because it can induce the stationary cathodic arc spot formation on the surface of the cathode 108, which can overheat and melt the walls of the cathode 108. The pressure within the reactor chamber 1*c* less than 1 Torr is undesirable because at such low pressure the powder will not be efficiently fluidized. In a typical composite powder synthesis process the seed powder supplied to the reactor from the powder feeder 307 can be SiC powder typically with 400 of higher mesh. The reactive gas consists of 65% Ar, 30% $H_2$ and 5% $CH_4$ optionally with addition of carbon dioxide $CO_2$. In Ar—$H_2$—$CH_4$ plasma the diamond shell coating is forming on a surface of the core SiC particles by the fluidized reversed remote arc PACVD process, producing superhard core-shell powder with composite core-shell particles consisting of SiC core and diamond shell.

In refinement, the vortex gas flow can be created within the reactor chamber 1*c*, which may substantially increase the resident time which is spending by the particles within the fluidized reaction area 291 in the reaction chamber 1*c* as illustrated in the close-loop fluidized bed reactor with circulating gas flow shown in FIG. 13*e* 1. In this embodiment of the reactor, the powder is supplied to the reactor chamber 1*c* from the powder feeder 307 through the powder supply pipeline 307*a*. The swirling gas flow in the reactor chamber 1*c* is created by supplying the portion of the reactive gas through the vortex creating tangential gas supply ring 112 positioned under the top lid flange 583. The gas supply ring 112 has the array of inlet-nozzles (not shown) directing the gas flow in the tangential direction relative to the walls of the reactor tube 541, forming the reversed vortex gas flow toward the water-cooled frustoconical remote anode-lid 70 with attached powder collector 295 at the bottom of the reactor chamber 1*c*, while the closing back jet flow is directing from the bottom to the top of the reactor tube 541 along the axes of the reactor chamber 1*c*, propagating through the opening 582*a* in the nozzle 582*b* positioned in the center of the baffle 582 toward the primary arc chamber 109, forming a high-speed exhaust reversed arc discharge plasma plume when expanding from the high pressure high plasma potential reaction chamber 1*c* toward the low pressure low plasma potential primary arc chamber 109 and, after passing the primary arc chamber 109 continue the flow toward the compressor chamber 110. The circulation of the reactive gas flow is producing by the compressor in the compressor chamber 110. The gas flow from the reactor chamber is directed to the primary arc chamber 109 and further, through the pipeline 111 to the compressor chamber 110 where it is forced to flow via pipeline 113 which is split and redirected through two other pipes: the pipe 113*a* is going toward the vortex gas supply inlet ring 112 to generate the reversed vortex flow in the reaction chamber 1*c* while a vertical pipe 113*b* is diverting a small portion of the flow generating by the compressor 110 defined by the gas restrictor 113*e* to enter the remote anode 70 cavity in the bottom of the reactor via the bottom gas inlet 602*b* at the end of the bottom portion of the remote anode gas supply line 113*c*. The segments of the anode gas supply pipes 113*b* and 113*c* are separated by the insulative spacer 501 installed in the interruptive joint 531 which electrically insulates the remote anode bottom portion of the reactor from the grounded cathode chamber 109 and compressor chamber 110. The compressor in compressor chamber 110 creates the area of low pressure in the primary arc chamber 109 relative to the reactor chamber, filled by the dense plasma produced by the reversed remote arc discharge ignited between the cathode 108 attached to the primary arc chamber 109 and the remote anode-lid 70 at the bottom of the reactor chamber 1*c*, powered by the remote arc power supply 26. The primary arc discharge is ignited between the cathode 108 and the walls of the primary arc chamber 109, serving as a primary anode, powered by the primary arc power supply 19. The primary arc chamber 109 can be provided with optional pumping port and additional gas supply line can be provided to the gas supply ring (shown in FIG. 13*b*1) to compensate for consuming a portion of reactive gas by deposition of shell-coatings on core fluidized powder particles.

In a variation, the circulating fluidized bed reactor for synthesis of core-shell composite ceramic powder utilizes DC arc plasma torch 108 as a source of dense plasma, filling the reactor chamber 1*c*, as illustrated in FIG. 13*e*2. In this reactor, the DC arc torch 108 is attached to the top lid 541*t* of the reactor chamber 1*c* in offset position, opened to the reactor chamber 1*c* via nozzle 39 with small opening 39*a*. The typical DC cascade arc plasma torch consists of the thermionic cathode 12 in the cathode compartment 12*a*, provided with gas inlet 602*b*, the downstream water-cooled primary anode in a shape of converging nozzle 18*a* followed by a set of the water-cooled interelectrode washer-sections 20, consisting a set of metal washers insulated from each other by ceramic washers forming arc channel 1*y*, which exits into the secondary anode channel 1*x* formed by the tubular water-cooled secondary anode 18*b* which ends by the water-cooled nozzle 39 connecting the plasma torch 108 with reactor chamber 1*c* through the small nozzle-orifice 39*a*. The anode channel 1*x* is connected to the vacuum pumping station via the outlet pipeline 603. In operation, the reactive gas is supplied to the reactor through gas supply line 602*a* into the filtration chamber 115 with fine filter 117, while non-reactive buffer gas, typically argon or other noble gas is supplied to the plasma torch 108 through the gas supply line 602*b*. The reactive gas is forced by the compressor 110 to flow along the pipelines from the filter chamber 115 through the compressor 110 to gas inlet ring 112 with array of tangential nozzles (not shown) forming the reverse vortex flow 292 in the reactor cyclone chamber 1*c* with water-cooled tubular wall 541, creating the high-pressure area within the cyclone reactor chamber 1*c* with a cloud of particles suspended in the upward gas flow in the top portion 291 of the reactor chamber 1*c*. The swirling gas flow 292 in the cyclone chamber 1*c* is directed to the bottom wall 541*a* of the chamber 1*c* where it forms the closing backing jet flow 292*a* along the axes of the chamber 1*c*, which flows through the central opening 5410 in the top flange 541*t* back to the filter chamber 115 closing the reactive gas circulating loop, while a small portion of the reactive gas flows through the opening 39*a* in the nozzle 39 to the anode channel 1*x* from where it is pumping out through the outlet line 603 together with the noble booster gas flow supplied through the plasma torch 108 gas inlet line 602*b* in the plasma torch 108 anode chamber 12*a*. The primary arc discharge is ignited within the plasma torch 108, first between the cathode 12 and the annular anode 18*a*, powered by power supply 19 followed by the cascade arc discharge extended through the arc channel 1*y* between the cathode 12 and the secondary tubular anode 18*b* in the anode channel 1*x*, powered by the power supply 26*a*, while the remote plasma filling the cyclone chamber 1*c* is ignited between the cathode 12 and the remote anode 70 positioned at the frustoconical bottom end 541*b* at the bottom of the cyclone chamber 1*c*, powered by the reversed remote arc power supply 26*b*. The seed ceramic powder can be supplied from the powder feeder 119 via powder supply line 119*a* and further through the plasma torch 108 followed by the exit into the cyclone chamber 1*c* via the nozzle 39, where it undergoes reactive plasma-chemical coating deposition treatment resulting in a formation of the shell-coating layer over core ceramic particles, while the nanoparticles of the shell-coating material can be synthesized volumetrically within the remote plasma area in the cyclone chamber 1*c*. Optionally, core powder can be supplied directly through the wall 541 in the cyclone chamber 1*c* from the powder feeder 121 via the powder supply line 121*a*. The core-shell ceramic particles are collected by the collector 295*a* at the bottom of the reactor chamber 1*c* while the nanoparticles synthesized in the reactor chamber 1*c* volumetrically are filtering from the circulating gas flow by the fine filter 117 and collected by the collector 295*b* at the bottom of the filtering chamber 115. For example, the core ceramic powder such as SiC powder, 400 mesh size or higher mesh, can be supplied from the feeder 121 into the cyclone reactor chamber 1*c*; and the reactive gas is a mixture of 70% Ar+28% $H_2$+2% $CH_4$ supplied to the filter chamber 115 via reactive gas supply line 602*a*. The fluidized macroparticles with dimensions ranging from nano- to microparticles are immersed, suspended within the dense reversed arc plasma cloud 291 in the top portion of the reactor chamber 1*c*, forming a dusty plasma environment where the MPs are charged negative by the interaction with surrounding plasma (plasma charging), which intensify the plasma-surface material synthesis reactions. The circulated fluidized bed gas-particle cloud is formed within the reversed vortex gas flow in the cyclone chamber 1*c*. The flowrate of the reaction gas is balanced by the leak flow through the nozzle 39 and regulated by the PID regulator to keep the pressure within the cyclone chamber 1*c* at constant level, at least two times greater than that of the anode channel 1*x* of the plasma torch 108. This process results in synthesis of core-shell powder consisting of diamond coated SiC particles accompanied by volumetric synthesis of the diamond-like nanocarbon powder.

FIG. 13*e*3 illustrates the cascaded multi-chamber reactor 1 as a variation of the embodiment of the reversed remote arc plasma enhanced CVD fluidized bed reactor shown in FIG. 13*e* in which 3 reactor sections of the fluidized bed chambers are positioned one below the other separated by the powder transportation valves 961*a, b* and powder transport pipes 602*b*. In reference to FIG. 13*e*3 the top reactor section It is provided with powder feeder 307 which supplies the core powder to the tubular reactor chamber 541 via powder supply line 307*a*. The top section It of the reactor 1 has water-cooled frustoconical remote anode 70 attached to the bottom of the tubular section 541 of the reactor chamber 1*c*. The tubular section 541 can be made of ceramic such as quartz, sealed by the Viton O-ring 583*b* or can be metallic, made, for instance, of tungsten or molybdenum, to mitigate the arcing on its walls, electrically isolated from the remote anode 70. The low pressure low plasma potential cathode chamber 109 is attached to the top of the tubular chamber 541, connected to the pumping station via outlet line 603. The cathode 108 utilizing self-recreating hollow cathode design similar to one shown in FIGS. 7*w*1 and 13*e* is attached to the cathode chamber 109. The primary arc discharge is generated between the cathode 108 and the walls of the cathode chamber 109, powered by the primary arc power supply 19, is serving as primary anode while the reversed remote arc discharge is conducted between the cathode 108 and the remote anode 70, powered by the reversed remote arc power supply 26. The gas is supplied to the bottom of the remote anode 70 to create the upward gas flow in the chamber 1*c*, fluidizing the powder in the top section 1*a* of the reactor 1, creating a cloud of the dusty plasma with powder suspended in the upward reversed arc plasma flow. The mid reactor section 1*m* positioned below the top section 1*t* is separated from the top section 1*t* by the powder transportation valve 961*t* and powder transport pipe 602*t*. The reactor section 1*m* is nearly identical to the top section 1*t* except for the powder transport line 602*t*: instead of the feeder 307 it uses the powder transport line 602*t* and the powder transportation valve 961*t*, which is closed when the powder is treated in the top section 1*t*. When the powder synthesis process in the top section It is finished, the reversed arc discharge in the top section 1*t* is extinguished and the gas flowrate is reduced to zero, the valve 961*t* is opened allowing the powder to be transported by gravity from the top section 1*t* through the powder transport line 602*t* to the middle section 1*m* where the powder synthesis based on the reversed arc plasma enhanced ALD or PACVD plasma-chemical processes continues, which may use different reactive gas. The transportation valve 961*t* is closed when the reactive core-shell powder synthesis process takes place in the chamber 1*m*. After the powder synthesis process is finished in the mid-section 1*m*, the transportation valve 941*b* is opened allowing the powder to be transported to the bottom section 1*b* of the multi-stage reactor 1 via powder transport line 602*b*. When the powder synthesis process is finished in the bottom reactor section 1*b* the powder is collected in the powder collector 295. In refinement, the RF ICP plasma generation, using RF coils 951 surrounding the reaction chambers 1*t*, 1*m* and 1*b* of the reactor 1 can be used instead of the reversed remote arc plasma generators as illustrated in FIG. 13*e*4.

The comparison between the fluidized bed reactors filled with conventional straight arc plasma jet typically generated by the plasma torch and the reversed arc plasma assisted CVD (RAPCVD) reactors of this invention is demonstrating the advantages of the RAPCVD process in case of synthesis of core-shall nanodiamond powder. In this process the core powder such as Si or SiC is fluidized in the flow of the $CH_4$—$H_2$—$CO_2$—Ar plasma-creating gas mixture, consisting of hydrocarbons such as methane, hydrogen and $CO_2$ in a mixture with buffer noble gas such as argon. In another application, the nanodiamond and/or microdiamond powder can be subjected to the treatment in the $H_2$—$O_2$—Ar plasma which is etching the sharp edges of the diamond particles to produce the diamond particles with oval or spherical shape without sharp edges which has extremely low friction. In reference to the FIG. 13*e*5, the conventional arc plasma assisted fluidized bed reactor 122*a* is typically comprises the arc plasma torch 109 installed at the bottom of the reactor so the upward plasma jet generating by the plasma torch can fluidize the powder and provide a necessary activation energy for the thermal-chemical synthesis process. The plasma-creating gas is supplied to the plasma torch via gas supply line 602 and is pumping out of the reactor chamber 541 via outlet pumping line 603. In this case the current-carried arc plasma is located only within the plasma torch, between the cathode 12 and the anode-nozzle 39, while the vertical upward flow in the reaction zone with fluidized macroparticles is only consisting of a hot gas with negligible ionization rate. In a sharp contrast, the RAPCVD fluidized bed reactor 122*b* is uniformly filled by the dense high temperature current-carried reversed remote arc discharge plasma as a result of the remote arc current conducting from the cathode 108 attached to the primary arc chamber 109 in the low pressure low plasma potential cathode chamber 109 located at the top of the reactor chamber 541 and connected to the pumping outlet 603, to the remote anode 70 positioned at the opposite bottom side of the high pressure high plasma potential reactor chamber 541 connected to the gas inlet port 602, distant from the small nozzle-orifice 582*a* positioned in the bottom flange 582 of the cathode chamber 109. The exhaust plasma flows through the orifice 582*a* from the high pressure high plasma potential chamber reactor 541 to the low pressure low plasma potential cathode chamber 109 in the direction opposite to the direction of the reversed arc current which is directed from the cathode 108 through the orifice 582*a* toward the remote anode 70. The reversed arc discharge current is crossing the entire volume of the reactor chamber 541, heating and activating the arc plasma environment in the entire reaction zone. Comparable cross-sectional views of the conventional arc plasma PECVD reactor versus a RAPCVD reactor of this invention are shown in FIG. 13*e*5. The specific advantages of the RAPCVD vs. conventional direct arc PECVD reactor for the core-shell nanodiamond powder production include:

1. In the RAPCVD reactor 122*b*, the current carried plasma fills the entire reactor volume, efficiently ionizing and activating the gas in the entire reactor. The conventional arc plasma in the conventional reactor 122*a* is only located between the cathode and the anode-nozzle, which fills the entire reactor with hot gas that has almost zero electron concentration and insufficient ability to ionize and activate the gas-particle cloud in the reaction zone;
2. In the RAPCVD reactor 12*b*, the plasma dynamics and fluidized bed gas dynamics can be modulated independently by modulating the gas flowrate and the reversed arc current, which cannot be done in the conventional 122*a* reactor;
3. The gas speed in the reaction chamber of the RAPCVD reactor 122*b* is relatively small and evenly distributed with gas speed velocity less than ⅓ of the speed of sound at the gas temperature of the reaction chamber favorable of the fluidized bed process, while the high speed plasma plume with gas speed ranging from ⅓ to 20 times of the speed of sound at the gas temperature in the reaction zone is entering in the cathode chamber 109 through the nozzle 582*a*. In sharp contrast, the high speed is high at the anode-nozzle exit 39*a* of the conventional direct arc reactor 122*a*
3. In the RAPCVD reactor 122*b*, a magnetic field may be used for further activation of the plasma environment in the entire reaction zone, which cannot be used in the conventional 122*a* PECVD reactor;
4. In the RAPCVD reactor 122*b*, the cathode is positioned outside of the reaction zone in a low-pressure primary arc area, which allows long operating life and durability of the cathode. In conventional reactor 122*a* the cathode 12 is exposed to the arc plasma at high pressures which shorten the lifetime of the cathode 12;
5. The RAPCVD reactor 122*b* provides a stable uniform dense plasma distribution across the entire reaction zone favorable for the growth of diamond and diamond-like carbon phases. In the conventional PECVD reactor 122*a* the dense plasma is located inside of the plasma torch while the bulk of the reaction area is filled by the hot gas with no ionization.

Following are examples of the treatment of substrates in the embodiments described above:

Example 2. Filtered Cathodic Arc Plasma Immersed Ion Cleaning

The arc coating apparatus shown in FIG. 4*f* was used in this process. The apparatus was equipped with two dual-filtered cathodic arc sources, having round conical cathode targets 12 measuring 3" in diameter and 2" in height, one filtered cathodic arc source having titanium targets and the other one having chromium targets. The exit openings of the filtered cathodic arc sources were equipped with load lock shutters 83*a*, 83*b*, electron-permeable to provide a free passage of electron current from the cathode targets 12 to distal auxiliary anodes 70 to thereby establish an auxiliary arc discharge. Augmented by the auxiliary arc discharge the ionization and activation of the gaseous component of the plasma environment in the coating chamber 42 was significantly increased (up to 3 to 4% in comparison with approximately 0.1% gas ionization rate in glow discharge without the auxiliary arc discharge) resulting in ion bombardment flux at the surface of the substrates exceeding 10 $mA/cm^2$.

HSS disc coupons as substrates 4, 2" diameter, ¼" thick, were washed in a water solution containing detergent and dried by isopropyl alcohol, and placed in a dry cabinet for 2 hours at 200° C. The substrates 4 were then loaded into the coating chamber 10 and attached to the rotary satellites of the substrate platform 2, for double rotation at a rotational speed of 12 rpm. The vacuum chamber was evacuated to $4\times10^{-6}$ Torr and then a gas mixture containing 80% argon, 18% hydrogen and 2% oxygen as an ion cleaning gas, was injected to create a total pressure ranging from $4\times10^{-4}$ to $8\times10^{-4}$ Torr. Both load lock shutters 83*a*, 83*b* were locked and cathodic arc sources, having respective cathode targets 12, were activated in at least one filtered cathodic arc source, preferably that with the titanium targets. The deflecting magnetic system was not activated. The auxiliary arc discharge was activated between the cathodes 12 of the active filtered cathodic arc source and the distal auxiliary anodes 70 installed in the coating chamber 42. The total auxiliary discharge current was established at 80 amps. The RF bias power supply was activated, and a self-bias potential was established at 600 volts. The ion cleaning stage was performed for 10 minutes.

Example 3. Plasma Immersed Ionitriding and Ion Implantation in the Auxiliary Arc Discharge The apparatus and substrate coupons 4 of Example 2 were used in this process. After the ion cleaning stage, the gas mixture was changed to nitrogen as an ionitriding gas, injected to create a total pressure ranging from $2\times10^{-4}$ to $8\times10^{-4}$ Torr. For ionitriding the substrates 4 were preliminary heated to 300° C. to 450° C. using conventional heaters (not shown) installed in front of the distal auxiliary anodes 70 in the coating chamber 42. A self-bias voltage was established at a range from 100 to 400 volts. The current applied to distal auxiliary anodes 70 was set at 100 amps and the ionitriding stage was performed for 1 hour.

For low-energy ion implantation the substrate temperature was set to a lower level, about 150 to 300° C., and the bias voltage ranged from 200 to 3000 volts. The ion implantation stage was performed for 1 hour.

The ionitriding and ion implanted layers were characterized by structure, thickness, microhardness depth profile, and surface roughness. It was found that ionitriding in this process provided a greater roughness of the substrate surface in comparison to ion implantation, while the rate of ionitriding was up to one order of magnitude greater than the rate of ion implantation. The rate of ionitriding for HSS steel had reached up to 1 μm/hr in comparison with 0.08 to 0.12

μm/hr for low energy ion implantation with the same 600 volt self-bias on the substrates 4.

Example 4. Auxiliary Arc Plasma Immersed Deposition of Chromium Nitride Filtered Cathodic Arc PVD Coating The apparatus of FIG. 4*f* was equipped with the same cathode targets 12 as in Example 2. The same substrate coupons 4 as in Example 1 were installed on the rotary satellites of substrate holder 2 with single rotation and preheated to 400° C. by conventional heaters installed in the coating chamber 10. After ion cleaning as described in Example 1 the load lock shutter 83*b* of the filtered cathodic arc source 1*b* with the chromium cathode targets 12 was opened and the gas was changed to pure nitrogen with total pressure of $2\times10^{-4}$ to $3\times10^{-4}$ Torr. The focusing and deflecting magnetic coils 13, 80 and 21 of the filtered cathodic arc source magnetic systems were activated to deflect the chromium plasma stream toward substrates. The deflecting anode 50 was electrically isolated and set at floating potential vs. surrounding plasma flow. The current between each of the chromium cathodes 12 and distal auxiliary anodes 70 was established at 50 amps. The currents between Cr cathode targets and the nearby primary ground anode was established at 150 amps to make a total arc current per one chromium target 200 amps. The load lock shutters 83*a* corresponding to the filtered cathodic arc source 1*a*, with the titanium cathode targets 12, remained locked and the corresponding offset deflecting coils 80 and deflecting anode 50 were inactive while both cathodic arc sources with titanium targets 12 were activated. Without the deflecting electromagnetic fields, the plasma stream remained substantially confined to the cathode chamber 90, and the titanium cathode targets served as electron emitters, providing additional current to the distal auxiliary anodes 70 up to 80 amps. Coating deposition was performed for 3 hours. The deposition rate of filtered cathodic arc CrN coating deposited by unidirectional dual filtered cathodic arc source 1*b* with offset deflecting coils was 3.8 μm/hr.

Example 5. Large Area TiN Filtered Cathodic Arc Coatings

The apparatus of FIG. 4*f* was equipped with the same cathode targets 12 as in Example 1. In this example the substrate coupons 4 were made from stainless steel as bars with a 1" width, ½" thickness and 14" length. The substrates 4 were installed on the rotary satellite positions of substrate platform 2, with double rotation. The substrates 4 were preheated to 400° C. before the deposition stage commenced.

After ion cleaning as described in Example 1 the load lock shutter 83*b* of filtered cathodic arc source 1*a* with the titanium cathode targets 12 was opened while filtered cathodic arc source 1*b* with chromium targets was inactive. The gas was changed to pure nitrogen with total pressure of $2\times10^{-4}$ to $3\times10^{-4}$ Torr. The deflecting and focusing magnetic coils 20, 80 and 21 of the filtered cathodic arc source magnetic systems were activated to deflect the titanium plasma stream toward substrates. The deflecting anode 50 was electrically isolated and set at floating potential vs. surrounding plasma flow. The currents between each of the titanium cathodes 12 and distal auxiliary anodes 70 were established at 50 amps. The currents between Ti cathode targets and the nearby primary ground anode were established at 150 amps to make a total arc current per one titanium target 200 amps. The load lock shutters 83*a* corresponding to the filtered cathodic arc source 1*b*, with the chromium cathode targets 12, remained locked and both cathodic arc sources with chromium targets 12 were remained inactive. Coating deposition was performed for 3 hours.

In this trial the alternative vertical magnetic field with a frequency of 60 Hz and amplitude (maximum value) of 70 Gs created by a pair of vertical scanning coils, one of them positioned on the top side of the plasma duct and another one positioned under the bottom of the plasma duct (not shown in FIG. 4*f*) was applied to raster the vapor plasma flow in a vertical direction transversal to the plane of rotation of the plasma stream. Scanning by the vertically rastering magnetic coils in this fashion allowed to reach up to 90% uniformity of coating thickness over the large area coating zone (14" in this example). By way of contrast, in a conventional direct cathodic arc deposition process it is not possible to scan the plasma flow with electromagnetic fields due to the neutral phase (atoms, clusters and macroparticles) which constitute up to 60% of the total erosion mass of the vacuum arc jet. The deposition rate of the TiN coating deposited by unidirectional dual filtered cathodic arc source 1*a* with offset deflecting coils was approximately 5 μm/hr.

In a refinement, this technology is applied for deposition of erosion and corrosion resistant coatings on airfoils of turbine engine. For example, the coating system shown schematically in FIG. 10*e* is used for this coating deposition process. The airfoils are installed at the turntable 2 either at the 60° to the radius as shown in airfoil samples 4*a*, or with double rotation as shown in airfoil sample 4*b* in FIG. 10*e*, wherein airfoil sample 4*b* further undergoes rotation about a longitudinal axis of airfoil sample 4*b*, which is parallel to the rotation axis of turntable 2. Both primary cathodic arc sources of the filtered cathodic arc source 1 are equipped with cathode targets 12 made of titanium. Both targets of the magnetron sputtering sources 245 are also made of titanium. The shielded cathodic arc source 2*b* in a cathode chamber 321 is also equipped with a titanium target 12*y*.

At the first stage, the remote arc discharge is ignited in argon at 2 mTorr between the cathode target 12*y* and the remote anode 70, powered by the power supplies 26*a* and 26*c*, while the primary arc discharge in chamber 321 is powered by power supply 26 between the cathode target 12*y* and grounded anode. The argon arc plasma is filling the substrate chamber 10 effectively immersing the substrate table 2 with substrates to be coated in dense strongly ionized plasma. The bias voltage of 250 V is applied to the substrate table 2 for 30 min for ion cleaning the substrates to be coated 4. The rotation speed of substrate table 2 is set at 4 rpm. At the second stage both cathodic arc sources of the filtered cathodic arc source 1 are activated, both the deflection and focusing magnetic coils of the plasma duct 44 are also activated to direct metal vapor plasma generated by the cathodic arc sources of the filtered cathodic arc source 1 toward substrates to be coated 4 in coating chamber 10. The substrate table 2 bias is increased to 1000 V for metal ion implantation of the substrates to be coated 4. The metal ion implantation stage is lasting for 3 min followed by filtered cathodic arc coating deposition stage. At this stage the substrate bias is reduced to 30 V and titanium adhesive sublayer is deposited during 10 min in argon at 2 mTorr. At the third stage nitrogen is added to the chamber to maintain $Ar:N_2$ ratio of 1:10 at 4 mTorr and TiN second sublayer is depositing during 15 min. At the fourth stage the pressure is increased to 2 mTorr and $Ar:N_2$ ratio is changed to 1:3. Both magnetron sputtering sources are activated without interruption of the filtered cathodic arc source at 5 W/cm$^2$ sputtering power and a hybrid filtered cathodic arc-magnetron coating deposition process continues for 3 to 5 hrs to deposit TiN coatings on airfoils. The coating thickness is typically ranging from 10 to 40 μm.

This technology is capable of producing a wide variety of coating architectures and structures. For example, by periodically turning OFF and ON the nitrogen supply line it is possible to deposit multilayer coatings with a sequence of ceramic (TiN) and metallic sublayers having thicknesses ranging from 50 nm to 1000 nm. Alternatively, by turning ON and OFF a magnetic deflecting coil with repetition frequencies typically ranging from 0.1-1000 Hz (magnetic shutter mode) the filtered cathodic arc vapor plasma flow generating by the filtered cathodic arc source can be periodically SHUT OFF and SHUT ON which can provide a periodical change in ion bombardment rate by metal ions (Ti) of growing magnetron sputtering TiN films. This generates a periodic multilayer structure of the TiN based coatings with sublayer thicknesses at nanometric scale, which is beneficial for the coating toughness, erosion and corrosion protection properties.

In advanced embodiment of the coating process for deposition of erosion and corrosion resistant cermet coatings on turbomachinery component the deposited coating is either nanocomposite or micro-nano-laminated. The coating system shown in FIG. 10*e* is used for this process. While this process may be used both for production of nanocomposite coatings and for production of micro/nano-laminated coatings, the following discussion pertains to micro/nano-laminated coatings. The micro/nano-laminated coating architecture is built by a sequence of metal-ceramic pairs comprising of the metal layers followed by ceramic layers. The arc cathode targets, magnetron targets and PACVD reactive gaseous precursors are selected for the plasma vapor generation as they are capable of forming hard, wear resistant, and erosion and corrosion resistant compounds by gaseous-metal plasma vapor deposition. The metallic and non-metallic elements which are preferred in such compound formation are titanium, chromium, vanadium, molybdenum, aluminum, hafnium, zirconium, niobium, tungsten, their alloys, carbon, boron, silicon, and elements of similar nature. The preferred reaction gaseous precursors are nitrogen, hydrogen, oxygen, hydro-carbon gases, borazin, boron trichloride, trimethylsilane (3MS) and gases of similar nature. During deposition of such a coating the gas atmosphere in the cathodic arc depositing device is controlled such that it can yield either a vapor deposited metal layer or a vapor deposited ceramic compound layer. The ceramic compounds that have desired wear resistance, corrosion resistance and hardness are the carbides, nitrides, carbonitrides, oxycarbides, oxynitrides, borides, silicates, of the above listed metals. The plasma for depositing the desired ceramic layers contains one or more of the following gases: nitrogen, methane or other hydro-carbon gas, borazin, 3MS and oxygen. In the vapor deposition of layers of the above listed metals only argon or similar inert gas containing plasma is used.

TABLE 1

| Item # | Metal Layer | Ceramic metal compound layer in combination with the metal, having desired wear resistant properties |
|---|---|---|
| 1 | Ti | TiC, TiN, Ti(CN), Ti(OCN) |
| 2 | Zr | ZrC, ZrN, Zr(CN), Zr(OCN) |
| 3 | V | VC, VN, V(CN), V(OCN) |
| 4 | Cr | CrN, CrC, CrCN |
| 5 | Hf | HfN |
| 6 | Mo | MoN |
| 7 | Nb | NbN, NbC |
| 8 | W | WC |
| 9 | Ti—Zr alloy | TiZrC, TiZrN, TiZr(CN), TiZr(OCN) |
| 10 | Ti—Cr alloy | TiCrC, TiCrN, TiCr(CN) |
| 11 | V—Ti alloy | VTiC, VTiN, VTi(CN) |
| 12 | Ti, Mo | TiMoN |
| 13 | Ti, Al | TiAlN, TiAlON |
| 14 | Ti, Al, Si | TiAlSiN |
| 15 | Ti, Nb | TiNbN |
| 16 | Al | AlN, $Al_2O_3$ |
| 17 | Cr, B | $CrB_2$ |
| 18 | Ti, B | $TiB_2$ |
| 19 | Al, B | $AlB_2$ |

Argon may also be utilized to dilute or carry the gases reacting with the metal vapor or metal deposit, to form the desired ceramic-metal compounds. The metal and ceramic compound combinations suitable for forming hard, wear, erosion and corrosion resistant coatings by vapor deposition in the present invention, are listed in Table 1. In addition to the coating compositions presented in Table 1 the carbon based diamond-like coatings with addition of different metals such as Ti, B, Si or Cr doped DLCs having hardness above 30 GPa can also be selected preferably for the top segment coating.

Example 6. TiBCN Erosion and Corrosion Resistant Nanocomposite Coatings on Compressor Blades (Airfoils) of Turbine Engine The process and a hybrid dual filtered cathodic arc-magnetron sputtering coating system similar to one used in Example 5 and shown in FIG. 10*e* is used for deposition of superhard TiBCN nanocomposite coatings on airfoils, a set of compressor blades of turbine engine. As shown in in FIG. 10*e*, the airfoils are installed at the rotational turntable 2. The airfoils 4 are installed either at acute angle ranging from 30 to 75 deg to the radius of turntable 2 as for example shown in FIG. 10*e* for airfoils 4*a* or with ability of double rotation as for example shown in FIG. 10*e* for airfoil 4*b*. Cathodic arc targets 12 of the primary cathodic arc sources of filtered arc source 1 are made of titanium, while the magnetron targets of the magnetrons 245 magnetically coupled with filtered arc source 1 are made of B4C ceramic. Cathode target 12 of shielded cathodic arc source 2*b* is also made of titanium and is further aimed on generation of remote arc discharge between the shielded cathodic arc target 12*y* and remote anode 70 in the coating chamber 10. The airfoils are subjected to wet blasting pre-treatment before being loaded in the vacuum chamber for plasma processing. After loading the airfoils, the vacuum chamber is pumped down to ultimate vacuum of 1E-6 Torr, after which argon as plasma creating gas is added to the pressure of 0.5 mTorr. The auxiliary arc discharge is ignited between shielded cathode 12*y* and remote anode 70. The current of the remote arc discharge is ranging from 100 to 200 amperes. At the same time, switch 407 is closed, switch 409 is opened, bias power supply 29*b* is turned off and electron heating power supply 29*a* is turned on to provide intensive electron heating of airfoils 4. The electron current conveyed to turntable 2 from shielded cathode 12*a* is ranging from 200 to 400 amperes.

Optionally, radiation heater 75 is used to stabilize the temperature of airfoils 4 within the range 400-450° C. (the substrate temperature may be measured by IR pyrometer, shown in FIG. 4*m*). The heating stage is following by the ion cleaning stage. During ion cleaning, switch 407 is opened, switch 409 is closed, power supply 29*a* is turned off, and bias power supply 29*b* is turned on. Negative bias potential of −400 volts is applied to turntable 2 with substrates to be coated (airfoils) 4 to provide ion cleaning in argon remote arc discharge plasma by means of ion bombardment for 30 min. After this stage, a short stage of metal ion etching is provided for 5 min specifically aimed to improve coating adhesion. During the metal ion etching stage, the bias potential provided by the power supply 29*b* is increased to −1000 volts. The primary cathodic arc sources of dual filtered cathodic arc source 1 are activated and vacuum arcs are ignited at the titanium cathode targets 12. The current of this primary arc discharge is ranging from 100 to 140 amperes. The deflecting and focusing magnetic system of dual filtered cathodic arc source 1 is activated by turning on deflecting pair of coils 80 and 81 and focusing coil 21 such that the titanium metal vapor plasma is directed toward airfoils 4 on turntable 2. After the metal etching stage, the bias potential of turntable 2 is reduced to −50 volts, the total arc current (a sum of the primary arc current and remote arc current) of each cathodic arc target 12 is in the range from 240 amperes to 400 amperes, and nitrogen is added to the reactive gas atmosphere in the coating chamber maintaining the ratio of partial pressures with argon $P_{N2}:P_{Ar}=10:1$ at a total gas pressure of 0.2 mTorr. The first ceramic layer of TiN is deposited from nearly 100% ionized titanium metal vapor plasma generated by cathode targets 12 in nitrogen reactive atmosphere with the rate of deposition (defining the intensity of metal ion bombardment) exceeding 3 μm/hr, but typically within the range from 3 to 30 μm/hr. The thickness of the first TiN layer typically ranges from 2 to 5 μm. After this stage, the pressure is increased to 2 mTorr by increasing the flowrate of argon while keeping the argon to nitrogen ratio $P_{N2}:P_{Ar}=1:3$. The magnetron sputtering sources 245 are activated with specific power (total power per 1 $cm^2$ of the target area) ranging from 3 to 20 $W/cm^2$, but typically within the range from 4 to 10 $W/cm^2$ and a nanocomposite TiBCN superhard coating is deposited by the hybrid filtered cathodic arc-magnetron sputtering process for 5 hrs to achieve a coating thickness in the range from 10 μm to 40 μm. During this stage, the TiN component deposition rate may be reduced to 1 μm/hr and the specific power applied to magnetron targets may be increased within the range from 3 to 20 $W/cm^2$. The deposition of the TiBCN nanocomposite layer may start from predominantly TiN filtered arc deposition by nearly 100% ionized titanium metal vapor plasma flow followed by a gradual reduction of the deposition rate of the filtered arc source and/or increase of the power applied to magnetron sputtering sources 245, which will result in a reduction of the ionization degree in a combined filtered arc-magnetron sputtering flow from nearly 100% at the beginning of the deposition of TiBCN layer to nearly 1% ionization at the end of deposition of the TiBCN layer. The ionization degree may be also modulated from 1% to 100% during deposition of the TiBCN layer by modulating the outcome of ion flux of the filtered arc source vs. the outcome of the metal atoms sputtering flux of the magnetron sputtering source. For example, in the magnetic shutter mode, by turning ON and OFF magnetic coils 80 and 81 and focusing coil 21 of filtered arc source 1, a nano-multilayer coating architecture with nanolayers of BCN followed by nanolayers of TiBCN may be deposited, which may improve the toughness and other functional properties of the coating.

Example 7. Large Area Filtered Cathodic Arc Deposition of Diamond-Like Coatings (DLC)

This example uses an embodiment of the arc coating apparatus shown in FIG. 4*f*, wherein each of the two dual unidirectional filtered cathodic arc sources implements the design shown in FIG. 8*d* with stream baffles 185. In this example, stream baffles 185 were made of pure iron strips installed at entrance 44*a* into tunnel portion 46 of plasma duct 44, such that stream baffles 185 are electrically isolated from the coating chamber. The primary cathodic arc sources installed in cathode chambers 90 of the filtered cathodic arc source 1*a* were equipped with targets 12 made of pyrolytic graphite and provided with pulse operation mode using pulse electrical ignition. The primary cathodic arc sources installed in cathode chambers 90 of the filtered cathodic arc source 1*b* were equipped with targets 12 made of titanium. Stream baffles 185 and regular wall baffles were used to further reduce the macroparticle content in the coating. Indexable carbide inserts as substrate coupons 4 were installed on the satellites of substrate platform 2 with single rotation at a rotational speed of 12 r.p.m. The apparatus was evacuated to 5×10−6 Torr and a 13.56 MHz RF bias voltage was set up to establish a self-biasing potential of turntable 2 with substrates 4 during coating deposition process. After an ion cleaning stage similar to that described in Example 1, high voltage metal ion etching was performed using filtered cathodic arc source 1*b* equipped with titanium primary cathode targets 12. During this stage, the load lock shutter of filtered cathodic arc source 1*b* was open, while the load lock shutter of filtered cathodic arc source 1*a* (equipped with graphite primary cathode targets 12) was closed. Filtered cathodic arc source 1*b* was turned ON. The steering coils 13*a*, offset deflection coils 80 and focusing coils 21 of the filtered cathodic arc source 1*b* were activated. The autopolarized bias of turntable 2 was set at 1000 volts. The metal ion etching stage lasted 2 minutes and was followed by deposition of TiC bond coat interfacial layer. The TiC bond coat was deposited by filtered cathodic arc source 1*b* following a procedure similar to that of Example 4, but with a mixture of argon and methane as a reactive gas at a pressure of 1 mtorr. The thickness of the TiC bond coat was 0.5 μm. In some processes, an ultra-thin titanium layer having thickness in the range from 5 to 20 nm was deposited between the substrate surface and the TiC bond coat layer. After the TiC bond coat deposition stage, the gas supply line was closed to stop injecting both reactive (methane) and buffer (argon) gases in the coating chamber, titanium filtered cathodic arc source 1*b* was turned off and filtered cathodic arc source 1*a* with graphite targets was turned ON to commence a DLC deposition process. The DLC deposition process lasted 5 hrs. During this stage, load lock shutter 83*a* of filtered cathodic arc source 1*b* with titanium targets was shut off, while load lock shutter 83*a* of filtered cathodic arc source 1*a* was opened. Cathodic arcs were ignited on the side surface of the conical graphite targets using the pulse electrical ignition. Pulse cathodic arc sources with graphite targets 12 were activated with a pulse arc discharge repetition frequency of 10 Hz. During the first minute of this process, the self-bias potential of substrates 4 was established at 1000 volts to provide a sublayer between the TiC bond coat interlayer and the DLC film while, during deposition of DLC coating, the self-bias potential of the substrates was reduced to 100 volts. The microhardness of DLC deposited in this process has reached 65 Gpa. The use of stream baffles 185 facilitated a reduction of the density of defects in DLC film by two orders of magnitude. The rate of deposition of DLC over a 12" high and 20" diameter coating zone have reached 0.6 μm/hr.

Example 8. Large Area Deposition of Remote Arc Plasma Assisted Polycrystalline Diamond CVD Coatings In this example, the apparatus of FIG. **7*p* was used for deposition of polycrystalline diamond CVD coatings on Si wafers. Boron-doped conductive Si wafers 3 inches in diameter as substrates 4 were positioned on top of substrate holder 2. Prior to loading into the plasma processing reactor, substrates 4 were subjected to pre-treatment in sub-micron diamond slurry under ultrasonic agitation conditions to improve the density of diamond nucleation sites. After loading substrates 4 into the reactor, the reactor was evacuated and filled with argon to pressure of 100 mTorr. Argon (along with reactive gases during the later stages of the coating deposition process) was supplied via gas inlet 602 in anode chamber 106. This processing gas flows along the plasma duct 1*c* and propagates into cathode chamber 108 across the small opening 582*a* in separating baffle 508. The processing gas is pumped out by pumping system 1*e* connected to cathode chamber 108. The pressure in plasma duct 1*c* during deposition of diamond coatings was typically in the range from 300 mTorr to 100 Torr, but preferably from 0.5 Torr to 10 Torr. This pressure range was controlled by the balance between the flow rate of gas supply system 602 and the pumping speed of pumping system 1*d* attached to plasma duct 1*c*, while a low pressure below 200 mTorr during the entire process was established in the cathode chamber 108 by pumping system 1*e*. An additional improvement of the pumping speed in cathode chamber 108 was provided by gettering of residual gases by condensation of the titanium film on (a) grounded and optionally water-cooled walls of the cathode chamber and/or (b) negatively biased water-cooled chevron baffle 581 consisting of enclosure 581*a* with openings 581*b*, wherein baffle 581 serves as negatively biased electrode immersed into the primary vacuum arc discharge, while cathode chamber 108 walls serve as primary arc anode as illustrated in FIG. 7*m*. In this design, the pumping system valve can be closed and the pumping of the cathode chamber 108 can be performed exclusively by gettering by condensation of the metal vapor on walls of the cathode chamber 108 and baffle 581. A highly ionized titanium metal vapor was generated by vacuum arc evaporation of the cathode target 583 of the primary cathodic arc source in the cathode chamber 108. During a first (conditioning) stage of the plasma deposition process, the heater was turned ON and the temperature of substrates to be coated 4 was established in the range 700-950° C. A substrate temperature below 700° C. or above 950° C. may result in a decrease of the quality of the depositing diamond polycrystalline coatings. After conditioning in argon for 15 min, the processing gas was changed to high purity hydrogen with 2% of methane. A remote arc with 200A current and voltage ranging from 50V to 150V was ignited between primary cathode 583 in cathode chamber 108 and remote anode 551 in anode chamber 106, and plasma duct 1*c* was filled with remote arc plasma. The remote arc plasma typically had density in the range from $10^9$ $cm^{-3}$ to $10^{13}$ $cm^{-3}$ and electron temperature in the range from 1 to 5 eV. The electrons emitted from primary cathode 583 in cathode chamber 108 were extracted through small orifice 582*a* in separation baffle 582 separating plasma duct 1*c* from the cathode chamber 108, while heavy particles (atoms, ions and macroparticles were captured within cathode chamber 108 through condensing on the water-cooled walls of this chamber. The electron current density within opening 582*a* reaches 200 A/$cm^2$ resulting in increase of pressure in plasma duct up to 3 Torr from initial pressure (before igniting the remote arc discharge) of 1.5 Torr, while the pressure in the cathode chamber remains almost undisturbed within the range 20-50 mTorr. When the electron current is conducted through opening 582*a*, the pressure in the plasma duct 1*c* increases when the electron current density of the remote arc discharge within the opening 258*a* increases, while keeping the pressure in the cathode chamber almost unchanged. Further increase of the pressure in the plasma duct 1*c* up to atmospheric pressure (1000 Torr) can be achieved by using the cascade nozzle shown in FIG. 9*f* in place of the opening 582*a*. The nucleation stage in $H_2$+2% $CH_4$ plasma at the pressure of 3 Torr continued for 10 to 20 min and was followed by diamond coating deposition stage. During the diamond coating deposition stage, the methane concentration in the $H_2$+$CH_4$ mixture was reduced to 0.5%. During the diamond coating deposition stage, the pressure in plasma duct was typically in the range from 300 mTorr to 100 Torr, typically about 3 Torr, and can be increased up to 1000 Torr (1 atm) in pulsed remote arc mode with repetition frequency typically ranging from 50 to 2000 Hz. A pressure below 300 mTorr is too small to provide sufficient deposition rate of diamond coatings, while a pressure above 100 Torr is typically too high for operation of remote arc discharge in a constant current mode. However, in a pulse mode the operating pressure may be as high as atmospheric pressure (1000 Torr). During the diamond deposition process, substrate holder 2 with substrates to be coated 4 was connected to the positive terminal of remote arc power supply 535*a* when switch 611*a* was closed while switch 611*b* was open. In this case, the substrate holder served as an additional remote anode in reference to primary cathode 583 in cathode chamber 108. The current of remote arc power supply 535*a* conducted to substrate holder 2 in anodic mode was typically in the range from 50 to 500 A. Anodic mode of the operation of the substrate holder 2 was periodically switched to the negatively biased mode by opening switch 611*a* and closing switch 611*b*. In this cathodic mode of operation, the substrate holder was biased negatively by bias power supply 535*b* at a potential typically in the range from −10 to −100V in reference to primary arc cathode 583. During cathodic mode, the coating morphology and microstructure may be changed, which allows deposition of multilayer diamond coating with polycrystalline diamond layer interrupted by thin diamond layer of different morphology and microstructure. At a process pressure of 1-10 Torr, the deposition rate of the diamond coating in remote arc assisted diamond CVD process was typically in the range from 1 to 3 μm/hr. The deposition rate may be further increased by applying an external longitudinal magnetic field along the plasma duct (as shown in FIG. 7*h***).

Example 9. Large Area Filtered Cathodic Arc Deposition of TiN Coating on Diamond Powder In this example the apparatus of FIG. **13*a* was equipped with the same targets as in Example 5. The drum was loaded with 200 mesh diamond powder. In this case the inside surface of the drum 2 was provided with the ribs coaxial to the drum 17. The rotating speed of the drum 17 was set at 6 RPM to create a fluidized diamond powder inside of the drum 17**. The coating process was performed identical to that of the Example 4 resulting in a deposition of TiN bondcoat on the surface of the diamond powder. The strength of the coated polycrystalline diamond particles has increased by 50% in comparison with uncoated powder.

Example 10. Synthesis of Diamond Powder in Rotating Remote Arc Plasma Assisted CVD Reactor In this example, the apparatus of FIG. 13*e* is used for synthesis of diamond powder on seed tungsten powder. The seed tungsten powder with average size of 3 μm is placed in the rotating fluidized bed chamber 17. Chamber 17 is rotated at 12 RPM. After evacuating the reactor, the reactive gas mixture of $H_2$+1% $CH_4$ is supplied along the rotating shaft 18*a* and the heater is used to establish a temperature within chamber 17 of about 800° C. The magnetic solenoid is turned on to establish a longitudinal magnetic field of 100 gauss along chamber 17. The primary arc discharge is ignited in primary cathodic arc chamber 108, where the pressure is set to 50 mTorr. The initial pressure in reaction chamber 17 is kept at 3 Torr by gas flow rate of 1500 sccm (standard cubic centimeters per minute). The remote arc discharge is conducted between primary cathode target 583 in cathode chamber 108 and remote anode 70 in fluidized bed chamber 17. The diamond coating deposition process lasts for 10 hrs resulting in synthesis of diamond powder having average size of 10 μm.

Example 11. Deposition of Diffusion Barrier Coating on Drug Powders

In this example, the Si-based inorganic diffusion barrier topcoat-shell is deposited on fine paclitaxel prepared by mechanical attrition. The coating deposition process, called the fluidized bed vapor plasma condensation (FBVPC) process, is conducted in a vacuum chamber equipped with a fluidized bed arrangement schematically shown in FIG. 13*a* which is capable of making a powder cloud in a vacuum against a RF-magnetron equipped with Si-target (not shown). The RF-magnetron coupled with filtered cathodic arc source can be installed within deflection section 44*a* of the plasma duct 44 similar to the arrangement shown in FIG. 10*a*. The plasma assisted CVD PACVD) source can be also used instead of magnetron to ionize and activate the Si-contained plasma environment for deposition of Si-based coating on powder. The PACVD plasma source can be attached to the back wall of the plasma duct 44 in the arrangement similar to that shown in FIG. 7*d*. The gas compositions during different coating deposition processes vary as according to the Table 2. The FBVPC process is capable of depositing a uniform continuous topcoat on a fluidized drug nanopowder, as opposed to the partially coated drug particles from multi-cycled magnetron sputtering. In the FBVPC process, a vapor, sputtering plasma, and/or a high-energy ion beam will interact with the cloud of fluidized drug nanopowder in the vacuum processing chamber as schematically illustrated in FIG. 13*a*. For coating deposition on fluidized powder substrates, the rotating drum-like fluidized powder container with seed bulk powder will be installed on the substrate holder platform. Our experimental work on the coating of sugar particles using the FBVPC process also indicated no structural or thermally-inspired degradation of the drug particles during the coating process thanks to low heating of powder exposed in FBVPC process. The FBVPC process is capable of forming a uniform continuous inorganic topcoat over drug-containing particles.

In one embodiment of the present invention, in order to prepare the drug-eluting nanocomposites, the coated drug particles will be deposited on a metal surface by conventional or ultrasonically enhanced electrophoretic deposition (EPD) process from a suspension of the organic-inorganic core-shell drug-containing nanoparticles mixed with a silica colloidal dispersion. The dimensions of the drug nanoparticles produced by mechanical attrition will range from 50 to 500 nm while the colloidal silica nanoparticles of 5 to 20 nm will fill the gaps between the core-shell drug particles and will provide an interfacial toughening and will block the drug's outward boundary diffusion and inward diffusion from the surrounding media of the compacted nanocomposite material.

TABLE 2

Examples of Si-based topcoats deposited by RF-magnetron sputtering.

| Item # | Coating description | Thickness (nm) | % Porosity | Crystallinity | Gas Composition |
|---|---|---|---|---|---|
| 1 | a-Si | 10-100 | Porous (30%, 60%) | amorphous | Ar |
| 2 | a-Si | 10-100 | non-porous | amorphous | Ar |
| 3 | nc-Si | 10-100 | Porous (30%, 60%) | nano-crystalline | Ar |
| 4 | nc-Si | 10-100 | non-porous | nano-crystalline | Ar |
| 5 | a-Si—H | 10-100 | non-porous | amorphous | Ar + 10% H2 |
| 6 | a-Si—H | 10-100 | non-porous | amorphous | Ar + 20% H2 |
| 7 | a-Si—H | 10-100 | non-porous | amorphous | Ar + 30% H2 |
| 8 | a-Si—H | 10-100 | non-porous | amorphous | Ar + 40% H2 |
| 9 | a-Si—H | 10-100 | non-porous | amorphous | Ar + 50% H2 |
| 10 | $SiO_2$ | 10-100 | Porous (30%, 60%) | nanocrystalline | Ar + 30% O2 |
| 11 | $SiO_2$ | 10-100 | non-porous | nanocrystalline | Ar + 30% O2 |
| 12 | a-SiCH | 10-100 | non-porous | amorphous | Ar + 10% H2 |
| 13 | a-SiCH | 10-100 | non-porous | amorphous | Ar + 20% H2 |
| 14 | a-SiCH | 10-100 | non-porous | amorphous | Ar + 30% H2 |
| 15 | a-SiCH | 10-100 | non-porous | amorphous | Ar + 10% SiH4 + 30% H2 |
| 16 | nc-SiCH | 10-100 | non-porous | nanocrystalline | Ar + 10% H2 |
| 17 | nc-SiCH | 10-100 | non-porous | nanocrystalline | Ar + 20% H2 |
| 18 | nc-SiCH | 10-100 | non-porous | nanocrystalline | Ar + 30% H2 |
| 19 | nc-SiCH | 10-100 | non-porous | nanocrystalline | Ar + 10% SiH4 + 30% H2 |

In an embodiment of the sources for plasma assisted electric propulsion of present invention shown in FIG. 13*a*, the inorganic topcoat-shell deposited on the drug-containing powder must be chosen to provide the same charge of the core-shell drug-containing particles as that of the colloidal silica nanoparticles in colloidal dispersion. Both inorganic coating and colloidal particles must have low conductivity which secure large electrical field between cathode and anode within the EPD setup. Appropriate surfactants can be also optionally added to the colloidal dispersion to prevent agglomeration of the drug-containing core-shell powder in dispersion. In this case the surfactant will be chosen to have the same charge in dispersion as colloidal silica and drug-containing core-shell powder. As both drug-containing particles and colloidal silica nanoparticles have the same charge they will move toward the same electrode (anode in anodic deposition or cathode in cathodic deposition) in EPD process forming a nanocomposite drug-containing organic-inorganic coating on metal substrate connected to appropriate electrode (anode or cathode). It is found in our experimental work that using different Si-based coatings, including pure silicon, silica, hydrogenated silicon carbide, or silicon nitride as a topcoat-shell deposited over the core-drug-containing particles results in fabrication of core-shell particles which have the same charge as silica in a colloidal dispersion. Without wishing to be bound by theory, this may be explained by the formation of an ultra-thin oxide scale forming a nm-thin silica layer on the surface of the Si-based compounds which secure the same charge of the coated core-shell powder as silica nanoparticles in a colloidal dispersion during the EPD of the drug-containing organic-inorganic nanocomposite coating.

Example 12. Simultaneous Fabrication of Tungsten-Coated Diamond Powder and WC Nanopowder for Sintering of Diamond-WC Composites In this example the circulating cyclone reactor shown in FIG. 13*e*4 was used for simultaneous fabrication of tungsten-coated diamond powder and synthesis of WC nanopowder for sintering of diamond-WC composites, used in oil drilling. Argon as a plasma-creating gas is supplied to the plasma torch via gas supply line 601*b* at the flowrate ~50 sccm, while mixture of 90% hydrogen with 10% methane is supplied through the reactive gas supply line 601*a* to the filtering chamber 115. The circulating of the reactive gas within the circulating loop including filtering chamber 115-compressor 110-cyclon chamber 1*c*-filtering chamber 115 is provided by compressor 110. The pressure in the cyclone chamber is keeping constant at the level at least 10% greater than that in the anode channel 1*x*, which allow a small portion of the reaction gas flow to leak through the nozzle 39 and pump out away from the reactor via pumping line 602. The pressure in the cyclone chamber 1*c* is controlled by PID regulator balancing between the reactive gas supply flowrate through the reactive gas supply line 601*a* and leaking reactive gas through the nozzle 39 into anode channel 1*x* from where it is pumping out through pumping line 602. The primary arc discharge is ignited within the plasma torch 108 in two stages: first, between the cathode 12 and the anode-nozzle 18*a*, powered by the power supply 19; and second, by expanding the arc column through the cascade channel 20 to the anode 18*b*, powered by the power supply 26*a*. After igniting the primary arc discharge in the plasma torch 108, the remote arc discharge is ignited between the cathode 12 and remote anode 70 filling the cyclone chamber 1*c* with dense remote arc plasma. In this process diamond powder with 0.5 mm average size of particles is supplied from the feeder 119 via powder supply line 119*a* into the plasma torch 108. The diamond particles are heated to high temperature, typically exceeding 1000 C, during free fall through the plasma torch channel before it is entering the cyclone chamber 1*c* through the nozzle opening 39*a* in the nozzle 39. At the same time WO3 fine powder with particles size typically below 50 nm is supplied directly to the reaction zone of the reversed vortex cyclone flow from the feeder 121 via powder supply line 121*a*. The WO3 powder is heating and plasma-chemically interacting with diamond in the reduced H2-CH4 atmosphere of the cyclone reactor chamber 1*c* resulting in producing of WC nanoparticles with size typically <50 nm and, at the same time, forming of WC/W coating on surface of diamond particles during their free fall throughout the reaction zone in the reactor chamber 1*c* toward powder collector 295*a*. The WC nanopowder is flowing toward filtering chamber 115 where it is capturing by the filter 117 and collecting by the nanopowder collector 295*b*. The mixture of WC/W coated diamond powder with WC nanopowder is further used for sintering of diamond-WC nanocomposite inserts for oil drilling.

Features described above as well as those claimed below may be combined in various ways without departing from the scope hereof. For example, it will be appreciated that aspects of one filtered cathodic arc deposition method or apparatus described herein may incorporate or swap features of another filtered cathodic arc deposition method or apparatus described herein. The following examples illustrate possible, non-limiting embodiments and combinations of embodiments described above. It should be clear that many other changes and modifications may be made to the methods and apparatuses herein without departing from the spirit and scope of this invention:

(A1) A filtered cathodic arc deposition apparatus may include (i) at least one cathodic arc source having at least one respective cathode located in at least one respective cathode chamber, (ii) a substrate chamber for holding, non-coincidentally with an optical axis of each of the at least one cathode, at least one substrate to be coated, (iii) a plasma duct in communication with the cathode chamber and the substrate chamber, and (iv) at least one offset deflecting coil, disposed adjacent to a side of the at least one cathode chamber, respectively, and spaced from the plasma duct, that generates a deflecting magnetic field within the at least one cathode chamber, respectively, for filtering output of the at least one cathodic arc source, respectively, by deflecting a plasma flow from therefrom into the plasma duct.

(A2) In the filtered cathodic arc deposition apparatus denoted as (A1), the at least one cathodic arc source may further include at least one respective stabilizing coil, disposed behind a respective one of the at least one cathode or surrounding a respective one of the at least one cathode, for controlling position of an arc discharge generated by the at least one cathodic arc source.

(A3) In the filtered cathodic arc deposition apparatuses denoted as (A1) and (A2), the at least one cathodic arc source may further include at least one anode associated with the at least one cathode for generating arc discharge.

(A4) The filtered cathodic arc deposition apparatuses denoted as (A1) through (A3) may include at least one focusing conductor adjacent to a focusing tunnel section of the plasma duct for generating a focusing magnetic field, wherein the focusing tunnel section is in communication with the substrate chamber.

(A5) In the filtered cathodic arc deposition apparatus denoted (A4), the deflecting magnetic field may couple with the focusing magnetic field to direct plasma toward a substrate holder in the substrate chamber.

(A6) The filtered cathodic arc deposition apparatuses denoted as (A1) through (A5) may include at least one deflecting coil adjacent to the plasma duct and the at least one cathode chamber.

(A7) In the filtered cathodic arc deposition apparatuses denoted as (A1) through (A6), the at least one offset deflecting coil may include at least one respective proximate offset conductor disposed adjacent to a side of the cathode chamber facing the substrate chamber, generating a saddle-shaped concave deflecting magnetic field in a part of the at least one cathode chamber closer to the substrate chamber for deflecting a plasma flow from the cathodic arc source into the plasma duct toward the substrate chamber.

(A8) In the filtered cathodic arc deposition apparatus denoted as (A7), the at least one offset deflecting coil may include at least one respective distal offset conductor disposed adjacent to a side of the cathode chamber that faces away from the substrate chamber, generating a saddle-shaped concave deflecting magnetic field in a part of the at least one cathode chamber further from the substrate chamber for deflecting a plasma flow from the at least one cathodic arc source into the plasma duct.

(A9) In the filtered cathodic arc deposition apparatus denoted as (A8), midpoint between corresponding ones of the at least one proximate offset conductor and at least one distal offset conductor may be located within a corresponding one of the at least one cathode chamber.

(A10) In the filtered cathodic arc deposition apparatus denoted as (A8), distance between corresponding ones of the at least one distal offset conductor and center of the at least one cathode may be 1.2 to 10 times distance between the center of the at least one cathode and back wall of a corresponding one of the at least one cathode chamber, wherein the back wall is a wall of the corresponding one of the at least one cathode chamber that is away from the substrate chamber.

(A11) In the filtered cathodic arc deposition apparatuses denoted as (A1) through (A6), the at least one offset deflecting coil may include at least one pair of distal offset conductors, disposed adjacent to a side of the at least one cathode chamber facing away from the substrate chamber on opposite sides of the plasma duct, generating a saddle-shaped concave deflecting magnetic field in a part of the at least one cathode chamber further from the substrate chamber for deflecting a plasma flow from the cathodic arc source into the plasma duct.

(A12) The filtered cathodic arc deposition apparatuses denoted as (A1) through (A11), may include a gaseous plasma source disposed at an end of the plasma duct opposite the substrate chamber.

(A13) In the filtered cathodic arc deposition apparatus denoted as (A12), the gaseous plasma source may include an electron-permeable shield permitting electrons to flow toward the substrate chamber.

(A14) The filtered cathodic arc deposition apparatuses denoted as (A12) and (A13) may include an arc plasma enhanced magnetron sputtering source in combination with one or more low pressure arc sources, selected from the group consisting of filtered arc, hollow cathode arc, thermionic arc, and any combination thereof, wherein each arc source couples with a magnetron source to increase an ionization rate of a magnetron sputtering flow.

(A15) In the filtered cathodic arc deposition apparatuses denoted as (A1) through (A14), the substrate chamber may include a substrate holder for holding the at least one substrate.

(A16) The filtered cathodic arc deposition apparatuses denoted as (A1) through (A15) may include baffles to trap the macroparticles, said baffles disposed at the walls of the plasma duct and/or cathode chamber.

(A17) The filtered cathodic arc deposition apparatuses denoted as (A1) through (A16) may include additional baffles to trap the macroparticles, said baffles disposed in the cathode camber in front of the cathode spaced from the cathode at 1 to 10 cm and having generally positive potential in reference to the cathode or be insulated and have a floating potential or be electrically grounded.

(A18) In the filtered cathodic arc deposition apparatus denoted as (A1) through (A16), the at least one cathode chamber may include a plurality of cathode chambers, each cathode chamber provided with an offset deflecting coil and a rastering coil with at least one rastering conductor parallel to the plane of rotation of metal plasma flow and disposed near the end of the cathode chamber adjacent to the plasma duct.

(A19) The filtered cathodic arc deposition apparatuses denoted as (A1) through (A18), may include electron beam evaporator disposed in the plasma duct near the stagnation area of the magnetic cusp created by the deflecting magnetic coils while at least one electron beam gun is positioned at the wall of the plasma duct adjacent to the wall occupied by the cathode chamber.

(B1) A filtered cathodic arc deposition apparatus may include (i) at least one cathodic arc source having at least one respective cathode located in at least one respective cathode chamber, (ii) a substrate chamber for holding, non-coincidentally with an optical axis of each of the at least one cathode, at least one substrate to be coated, (iii) a plasma duct in communication with the cathode chamber and the substrate chamber, (iv) at least one coil generating a deflecting magnetic field for deflecting the plasma toward the substrate chamber; and (v) a plurality of stream baffles having a positive potential relative to the plasma, installed in the plasma duct generally at an angle to a plane parallel to a direction of plasma flow, at position of the plurality of stream baffles, to enhance filtration of macroparticles.

(B2) In the filtered cathodic arc deposition apparatus denoted as (B1), the at least one cathodic arc source may further include at least one respective stabilizing coil, disposed behind a respective one of the at least one cathode or surrounding a respective one of the at least one cathode, for controlling position of an arc discharge generated by the at least one cathodic arc source.

(B3) In the filtered cathodic arc deposition apparatuses denoted as (B1) and (B2), the at least one cathodic arc source may further include at least one anode associated with the at least one cathode for generating arc discharge.

(B4) In the filtered cathodic arc deposition apparatuses denoted as (B1) through (B3), each of the plurality of stream baffles may be generally oriented to lie between a plane tangential to magnetic field lines at position of the plurality of stream baffles and a plane tangential to plasma stream lines at the position of the plurality of stream baffles.

(B5) In the filtered cathodic arc deposition apparatuses denoted as (B1) through (B3), the plurality of stream baffles may include adjustable stream baffles having adjustable orientation and an optimal orientation that is generally tangential to the plasma flow at the position of the plurality of stream baffles.

(B6) The filtered cathodic arc deposition apparatus denoted as (B5) may further include at least one probe, selected from the group of a Langmuir ion collecting probe and a mass flux collecting probe, for determining the optimal orientation, wherein the at least one probe (i) is disposed in the deflecting magnetic field or in a focusing magnetic field, (ii) has an ion collecting area with adjustable orientation, and (iii) measures a maximum ion current when the ion collecting area is perpendicular to the plasma flow.

(B7) In the filtered cathodic arc deposition apparatuses denoted as (B1) through (B5), the plurality of stream baffles may include a magnetic material for substantially tangential alignment of the stream baffles with field lines of the deflecting magnetic field, or field lines of a focusing magnetic field, under magnetic influence of the deflecting magnetic field.

(B8) The filtered cathodic arc deposition apparatuses denoted as (B1) through (B7) may include at least one focusing conductor adjacent to a focusing tunnel section of the plasma duct for generating a focusing magnetic field, wherein the deflecting magnetic field couples with the focusing magnetic field to direct plasma toward the at least one substrate.

(B9) The filtered cathodic arc deposition apparatuses denoted as (B1) through (B8) may include at least one offset deflecting coil, disposed adjacent to a side of the at least one cathode chamber facing the substrate chamber, which generates a deflecting magnetic field within the cathode chamber that deflects a plasma flow from the cathodic arc source into the plasma duct toward the substrate chamber.

(B10) The filtered cathodic arc deposition apparatuses denoted as (B1) through (B9) may include a gaseous plasma source disposed at an end of the plasma duct opposite the substrate chamber.

(B11) In the filtered cathodic arc deposition apparatus denoted as (B10), the gaseous plasma source may include an electron-permeable shield permitting electrons to flow toward the substrate chamber.

(B12) The filtered cathodic arc deposition apparatuses denoted as (B10) and (B11) may include an arc plasma enhanced magnetron sputtering source in combination with one or more low pressure arc sources, selected from the group consisting of filtered arc, hollow cathode arc, thermionic arc, and any combination thereof, wherein each arc source couples with a magnetron source to increase an ionization rate of a magnetron sputtering flow.

(C1) A filtered cathodic arc deposition apparatus may include (i) at least one cathodic arc source having at least one respective cathode located in at least one respective cathode chamber, (ii) a substrate chamber for holding, non-coincidentally with an optical axis of each of the at least one cathode, at least one substrate to be coated, (iii) a plasma duct in communication with the cathode chamber and the substrate chamber, (iv) at least one focusing coil surrounding a focusing tunnel section of the plasma duct for generating a focusing magnetic field, (v) at least one deflecting coil generating a deflecting magnetic field for deflecting the plasma along a path toward the substrate chamber, and (vi) at least one magnetron facing the at least one substrate, the magnetron being positioned such that at least a portion of magnetic force lines of the focusing magnetic field overlap and are substantially parallel with at least a portion of magnetic force lines generated by the magnetron, wherein each arc source couples with a magnetron source to increase an ionization rate of a magnetron sputtering flow.

(C2) In the filtered cathodic arc deposition apparatus denoted as (C1), the at least one cathodic arc source may further include at least one respective stabilizing coil, disposed behind a respective one of the at least one cathode or surrounding a respective one of the at least one cathode, for controlling position of an arc discharge generated by the at least one cathodic arc source.

(C3) In the filtered cathodic arc deposition apparatuses denoted as (C1) and (C2), the at least one cathodic arc source may further include at least one anode associated with the at least one cathode for generating arc discharge.

(C4) The filtered cathodic arc deposition apparatuses denoted as (C1) through (C3) may include a gaseous plasma source disposed at an end of the plasma duct opposite the substrate chamber to improve ionization of gaseous plasma component within filtered arc metal vapor plasma flow.

(C5) In the filtered cathodic arc deposition apparatus denoted as (C4), the gaseous plasma source may include an electron-permeable shield permitting electrons to flow toward the substrate chamber.

(C6) The filtered cathodic arc deposition apparatuses denoted as (C4) and (C5) may include an arc plasma enhanced magnetron sputtering source in combination with one or more low pressure arc sources, selected from the group consisting of filtered arc, hollow cathode arc, thermionic arc, and any combination thereof, wherein each arc source couples with a magnetron source to increase an ionization rate of a magnetron sputtering flow.

(C7) The filtered cathodic arc deposition apparatuses denoted as (C1) through (C6) may include at least one metal vapor source and a plurality of deflecting conductors, each of the plurality of deflecting conductors respectively associated with the at least one cathodic arc source and the metal vapor source, wherein at least some of the plurality of deflecting conductors can be independently activated to alternate between deposition of vapor associated with the at least one filtered arc source and metal vapor from the at least one metal vapor source.

(C8) The filtered cathodic arc deposition apparatuses denoted as (C1) through (C7) may include at least one offset deflecting coil, disposed adjacent to a side of the at least one cathode chamber facing the substrate chamber, which generates a deflecting magnetic field within the cathode chamber for deflecting a plasma flow from the arc source into the plasma duct toward substrate chamber.

(C9) The filtered cathodic arc deposition apparatuses denoted as (C1) through (C8) may further include at least one deflecting coil adjacent to the plasma duct and the at least one cathode chamber.

(C10) The filtered cathodic arc deposition apparatuses denoted as (C1) through (C9) may include a plurality of stream baffles, having a positive potential relative to the plasma, installed in the plasma duct generally at an angle to a plane parallel to a direction of plasma flow, to enhance filtration of macroparticles.

(C11) In the filtered cathodic arc deposition apparatuses denoted as (C1) through (C10), each of the plurality of stream baffles may be generally oriented to lie between a plane tangential to magnetic field lines at position of the stream baffles and a plane tangential to plasma stream lines at the position of the stream baffles.

(C12) In the filtered cathodic arc deposition apparatuses denoted as (C1) through (C11), the plurality of stream baffles may include a magnetic material for substantially tangential alignment of the stream baffles with field lines of the deflecting magnetic field under magnetic influence of the deflecting magnetic field.

(C13) The filtered cathodic arc deposition apparatuses denoted as (C1) through (C12) may include at least one focusing conductor adjacent to the focusing tunnel section for generating at least a portion of the focusing magnetic field.

(C14) In the filtered cathodic arc deposition apparatus denoted as (C13), the deflecting magnetic field may couple with the focusing magnetic field to direct plasma toward the at least one substrate.

(D1) A method of coating a substrate located in a substrate chamber that is in indirect communication with a cathode chamber via a plasma duct includes (i) generating an arc discharge using a cathode located in the cathode chamber and having an optical axis non-coincidental with the substrate, and (ii) deflecting plasma flow, from the cathode toward the plasma duct, before the plasma exits the cathode chamber.

(D2) The method denoted as (D1) may include generating a magnetic field for performing the step of deflecting.

(D3) A method of coating a substrate located in a substrate chamber includes (i) generating an arc discharge in a cathode chamber using a cathode having an optical axis non-coincidental with the substrate, and (ii) applying a potential voltage to a plurality of stream baffles, located in a plasma duct in communication with the cathode chamber and the substrate chamber in a potential range from −150V to +150V relative to the cathode.

(D4) The method denoted as (D3) may include (iii) orienting at least some of the plurality of stream baffles in an orientation generally transverse to a plane parallel to a direction of plasma flow in a section of the plasma duct, in which the plasma flow is deflected towards the substrate chamber.

(D5) In the methods denoted as (D3) and (D4), target ions may pass through spaces between the stream baffles while macroparticles and/or ions having a different weight or charge than the target ions follow a trajectory into faces of the baffles, such that at least some ions having different weight, different charge, or different weight and charge, as compared to the target ions, are blocked from reaching the substrates.

(D6) The methods denoted as (D4) and (D5) may include generating a magnetic field to deflect the plasma flow towards the substrate chamber.

(D7) The methods denoted as (D3) through (D6) may include orienting the plane of at least some of the plurality of stream baffles in an orientation that is generally parallel to magnetic force lines in the section of the plasma duct in which the plasma flow is deflected towards the substrate chamber.

(D8) The methods denoted as (D3) through (D7) may include orienting the plane of at least some of the plurality of stream baffles in an orientation that is generally parallel to streamlines of plasma flow in the section of the plasma duct in which the plasma flow is deflected towards the substrate chamber.

(D9) In the methods denoted as (D7) and (D8), the at least some of the plurality of stream baffles may be located in a section of the plasma duct, in which the plasma flow is deflected towards the substrate chamber.

(D10) In the methods denoted as (D7) through (D9), the at least some of the plurality of stream baffles may be located in front of the cathode in cathode chamber.

(D11) The methods denoted as (D3) through (D10) may include deflecting plasma flow, from the cathode toward the plasma duct, before the plasma exits the cathode chamber.

(E1) In the filtered cathodic arc deposition apparatus denoted as (A1), the at least one cathode chamber may include a plurality of cathode chambers, each provided with an offset deflecting coil and a rastering coil with at least one rastering conductor parallel to the plane of rotation of metal plasma flow and disposed near the end of the cathode chamber adjacent to the plasma duct.

(E2) In the filtered cathodic arc deposition apparatus denoted as (E1), the deflection section of the plasma duct may be a section of the plasma duct, in which the plasma flow is deflected toward the substrate chamber.

(E3) In the filtered cathodic arc apparatuses denoted as (E1) and (E2), each of the at least one cathode chamber may be generally tubular.

(E4) In the filtered cathodic arc apparatuses denoted as (E1) through (E3), the plasma duct may be generally tubular, and the cathode chambers are positioned coaxially around the deflecting section of the plasma duct.

(E5) The filtered cathodic arc apparatuses denoted as (E1) through (E4) may include at least one gaseous plasma source located in the plasma duct generally concentric with the plasma duct.

(E6) In the filtered cathodic arc apparatus denoted as (E5), the gaseous plasma source may include a discharge chamber having a thermionic cathode, hollow cathode or vacuum arc cathode, wherein the discharge chamber has at least one opening facing the substrate chamber to permit plasma to flow from the discharge chamber into the plasma duct.

(E7) In the filtered cathodic arc apparatus denoted as (E6), the at least one substrate may be a tubular substrate in communication with an exit of the plasma duct.

(E8) The filtered cathodic arc apparatus denoted as (E7) may include at least one distal anode in an anode chamber in communication with the side of the tubular substrate opposite the plasma duct.

(E9) In the filtered cathodic arc apparatus denoted as (E8), the tubular substrate may be electrically insulated from the at least one cathode chamber and anodes associated therewith, and be connected to a negative pole of a high voltage power supply.

(E10) In the filtered cathodic arc apparatuses denoted as (E5) through (E9), the at least one substrate may include a flowable medium and the substrate chamber may include a mechanism for agitation of the medium.

(E11) In the filtered cathodic arc apparatus denoted as (E10), the flowable medium may be a powder.

(E12) The filtered cathodic arc apparatuses denoted as (E10) and (E11) may be used to coat or surface treat the flowable medium.

(E13) In the filtered cathodic arc apparatuses denoted as (E10) through (E12), the substrate chamber may be disposed vertically allowing the flowable medium to fall through the plasma.

(E14) The filtered cathodic arc apparatuses denoted as (E1) through (E13) may further include an additional anode disposed in the plasma duct for repelling ions, macroparticles, or a combination thereof.

(E15) In the filtered cathodic arc apparatus denoted as (E14), the additional anode may include baffles for capturing macroparticles.

(E16) In the filtered cathodic arc apparatuses denoted as (E14) and (E15), the additional anode may include at least one focusing coil for focusing the plasma vapor, rastering the plasma vapor, or a combination thereof.

(E17) In the filtered cathodic arc apparatuses denoted as (E14) through (E16), the additional anode may include a vapor source and an evaporation opening in optical alignment with the substrate chamber.

(E18) The filtered cathodic arc apparatus denoted as (E17) may include a crucible disposed in the plasma duct and an electron beam gun disposed on the opposite side of the substrate holder coaxially with the plasma duct.

(E19) The filtered cathodic arc apparatuses denoted as (E1) through (E18) may include baffles disposed in front of a cathode target at a distance from the evaporating surface of the cathode target ranging from 10 to 100 mm.

(E20) In the filtered cathodic arc apparatus denoted as (E19), the baffles may be insulated and have a floating potential or be electrically grounded.

(E21) In the filtered cathodic arc apparatus denoted as (E19), the baffles may be connected to a positive pole of a power supply and serve as an additional proximate anode improving arc stability.

(E22) The filtered cathodic arc apparatuses denoted as (E1) through (E21) may include a solenoid, disposed about a focusing tunnel section of the plasma duct, to create a magnetic field cusp in the plasma guide having a plane of symmetry transversal to an axis of the plasma guide.

(E23) The filtered cathodic arc apparatus denoted as (E22) may include a positively charged repelling solenoid disposed adjacent to a back wall of the plasma duct in alignment with the solenoid disposed about the focusing tunnel, the back wall of the plasma duct being a wall that is located on the side of the plasma duct that is away from the substrate chamber.

(E24) The filtered cathodic arc apparatuses denoted as (E1) through (E23) may include at least one set of baffles located in the plasma duct parallel to the plane of rotation of a filtered arc flow.

(E25) In the filtered cathodic arc apparatus denoted as (E24), the at least one set of baffles may be surrounded by a magnetic field.

(E26) The filtered cathodic arc apparatuses denoted as (E1) through (E25) may include two cathode chambers disposed in opposition and one or more solenoids disposed in a saddle configuration including conductors aligned along the intersections of the plasma duct with the cathode chambers and conductors extending obliquely toward a back wall of the plasma guide, generating a poloidal magnetic field confining the filtered arc vapor plasma flow and toroidal magnetic field directing the filtered arc vapor plasma flow toward the coating chamber, the back wall of the plasma duct being a wall that is located on the side of the plasma duct that is away from the substrate chamber.

(E27) The filtered cathodic arc apparatus denoted as (E26), may include focusing solenoids disposed around the front and back of the plasma duct to create a magnetic cusp configuration in the plasma duct, wherein the back of the plasma duct is further from the substrate chamber, as compared to the front of the plasma duct.

(E28) The filtered cathodic arc deposition apparatuses denoted as (E1) and (E14) through (E18), may include electron beam evaporator disposed in the plasma duct, near the stagnation area of the magnetic cusp created by the deflecting magnetic coils, while at least one electron beam gun is positioned at the wall of the plasma duct adjacent to the wall occupied by the cathode chamber.

(F1) A filtered cathodic arc apparatus for generating energetic particles may include (i) a shielded cathodic arc source, positioned in a cathode chamber coupled to a proximal end of a plasma duct, for generating and delivering electrons to the proximal end of the plasma duct, (ii) a magnetic solenoid surrounding at least a portion of the plasma duct for radially confining plasma in the plasma duct, (iii) at least one distal anode associated with the cathode of the cathodic arc source for generating a remote arc discharge along the plasma duct, and (iv) an output port for outputting energetic particles generated within the plasma duct.

(F2) The filtered cathodic arc apparatus denoted as (F1) may include a gas handling system for providing discharge gas.

(F3) Either or both of the filtered cathodic arc apparatuses denoted as (F1) and (F2) may include a baffle that is (a) positioned between the cathode chamber and the plasma duct and (b) configured to restrict flow of gas between the cathode chamber and the plasma duct.

(F4) In the filtered cathodic arc apparatus denoted as (F3), the baffle may be configured with only a single opening between the cathode chamber and the plasma duct.

(F5) In the filtered cathodic arc apparatus denoted as (F4), the single opening may have diameter, or similar transverse extent if the single opening is not circular, in the range from 0.1 mm to 5 cm.

(F6) Any of the filtered cathodic arc apparatuses denoted as (F3) through (F5) may include (a) a gas inlet for receiving discharge gas into the plasma duct and (b) a gas outlet for removing gas from the cathode chamber, such that the gas inlet and the gas outlet may cooperate with the baffle to maintain a higher pressure in the plasma duct than in the cathode chamber.

(F7) Any of the filtered cathodic arc apparatuses denoted as (F1) through (F6) may include an anode chamber for containing the distal anode, wherein the anode chamber is coupled to a distal end of the plasma duct opposite the proximal end.

(F8) In the filtered cathodic arc apparatus denoted as (F7), a gas inlet may be connected to the anode chamber to receive the discharge gas into the plasma duct via the anode chamber.

(F9) Any of the filtered cathodic arc apparatuses denoted as (F1) through (F8) may include a power supply for providing positive voltage to the plasma duct to accelerate ions generated by the remote arc discharge and generate the energetic particles through collisions between the ions.

(F10) Any of the filtered cathodic arc apparatus denoted as (F1) through (F9) may be configured to accelerate the ions in a direction that is substantially perpendicular to a longitudinal axis of the plasma duct.

(F11) Any of the filtered cathodic arc apparatuses denoted as (F1) through (F10) may be configured to generate the energetic particles from collisions between ions accelerating towards a longitudinal axis of the plasma duct.

(F12) In any of the filtered cathodic arc apparatuses denoted as (F1) through (F11), the energetic particles may be neutrons.

(F13) In any of the filtered cathodic arc apparatuses denoted as (F1) through (F12), the cathodic arc source may include an electron-permeable shield permitting electrons to flow toward the plasma duct.

(F14) In any of the filtered cathodic arc apparatuses denoted as (F1) through (F13), the plasma duct may include at least one intermediate anode to extend the remote arc discharge along the plasma duct.

(F15) In the filtered cathodic arc apparatus denoted as (F14), the at least one intermediate anode may include an array of wire electrodes disposed coaxially with plasma duct for generating a plasma sheath around each of the wire electrodes.

(F16) In the filtered cathodic arc apparatus denoted as (F15), the array of wire electrodes may be electrically connected to the plasma duct.

(F17) The filtered cathodic arc apparatus denoted as (F16) may include a direct current (DC) power supply having positive output connected to the plasma duct and negative output connected to the cathode for generating a remote arc discharge plasma within the array of wire electrodes.

(F18) In the filtered cathodic arc apparatus denoted as (F17), the DC power supply may be configured to generate the remote arc discharge plasma with discharge current in the range from 50 Amperes to 10,000 Amperes and discharge voltage in the range from 30 Volts 500 Volts.

(F19) The filtered cathodic arc apparatus denoted as (F16) may include a unipolar pulse power supply, having positive output connected to the plasma duct and negative output connected to the cathode, for generating a high voltage potential within the array of wire electrodes.

(F20) In the filtered cathodic arc apparatus denoted as (F19), the unipolar pulse power supply may be configured to generate the positive potential in the range from 0.1 kV to 10,000 kilovolt.

(F21) In any of the filtered cathodic arc apparatuses denoted as (F15) through (F20), the array of wire electrodes may have density such that the plasma sheaths respectively associated with the wire electrodes overlap and provide a positive plasma potential throughout the array of wire electrodes.

(F22) In the filtered cathodic arc apparatus denoted as (F21), the array of wire electrodes may have density such that the positive plasma potential is uniform within the array of wire electrodes.

(F23) In either or both of the cathodic arc apparatuses denoted as (F21) and (F22), the diameter of each of the wire electrodes may range from 0.01 mm to 1 mm, and the distance between neighboring wire electrodes may range from 0.1 mm to 5 cm.

(F24) In any of the filtered cathodic arc apparatuses denoted as (F15) through (F23), the array of wire electrodes may radially surround a region that is coaxial with the plasma duct.

(F25) In the filtered cathodic arc apparatus denoted as (F24), the region may be substantially centered about the longitudinal axis of the magnetic solenoid.

(F26) In any of the filtered cathodic arc apparatuses denoted as (F1) through (F25), the plasma duct may be tubular.

(F27) A filtered cathodic arc method for generating energetic particles may include (i) injecting gas into a plasma duct, (ii) pumping out the gas through a cathode chamber connected to the plasma duct and, optionally, through the plasma duct, (iii) generating primary arc discharge in the gas in the cathode chamber, (iv) generating a remote arc discharge in the gas in the plasma duct, (v) generating a magnetic field in the plasma duct, substantially along a longitudinal direction of the plasma duct, to at least partially confine, in the radial dimension, a plasma created by the remote arc discharge and the ions, and (vi) applying a positive pulse voltage to the plasma duct to accelerate ions in the plasma duct and generate energetic particles from collisions between the ions.

(F28) The method denoted as (F27) may further include a step of restricting gas flow from the plasma duct to the cathode chamber to maintain a higher pressure in the plasma duct than in the cathode chamber to provide (a) a lower pressure environment in the cathode chamber favorable for generating the primary arc discharge and (b) a higher pressure environment in the plasma duct favorable for producing the energetic particles.

(F29) In the method denoted as (F28), the steps of restricting, injecting, and pumping may cooperate to produce (a) a pressure in the plasma duct in the range from 300 mTorr to 1000 Torr, or up to 1 atmosphere in pulse mode, and (b) a pressure in the cathode chamber less than 200 mTorr.

(F30) In the method denoted as (F28), the steps of restricting, injecting, and pumping may cooperate to produce a pressure in the plasma duct that is at least three times the pressure in the cathode chamber.

(F31) In the method denoted as (F30), the pressure in the cathode chamber may be less than 200 mTorr.

(F32) In any of the methods denoted as (F27) through (F31), the step of injecting may include injecting the gas into the plasma duct via an anode chamber, wherein the anode chamber is coupled to a distal end of the plasma duct and the cathode chamber is coupled to a proximal end of the plasma duct opposite the distal end.

(F33) In any of the methods denoted as (F27) through (F32), the step of generating the primary arc discharge may include generating the primary arc discharge between a cathode and a proximal anode, wherein both the cathode and the proximal anode are located in the cathode chamber.

(F34) In any of the methods denoted as (F27) through (F33), the step of generating the primary arc discharge may include generating the primary arc discharge with a current in the range from 50 Amperes to 500 Amperes and a voltage in the range from 20 Volts to 50 Volts.

(F35) In any of the methods denoted as (F27) through (F34), the step of generating the remote arc discharge may include generating the remote arc discharge between a cathode, located in the cathode chamber, and a distal anode located in an anode chamber coupled to a distal end of the plasma duct, wherein the cathode chamber is coupled to a proximate end of the plasma duct opposite the distal end.

(F36) In any of the methods denoted as (F27) through (F35), the step of generating the magnetic field may include generating a magnetic field of strength between 0.01 Tesla and 20 Tesla.

(F37) In any of the methods denoted as (F27) through (F36), the step of applying the positive pulse voltage may include applying a voltage in the range from 0.1 kilovolt to 10,000 kilovolt.

(F38) Any of the methods denoted as (F27) through (F37) may include generating an intermediate arc discharge, between a cathode, in the cathode chamber, and an array of wire electrodes in the plasma duct, wherein the wire electrodes are oriented substantially parallel to the longitudinal direction.

(F39) In the method denoted as (F38), the step of generating the intermediate arc discharge may include generating the intermediate arc discharge with current in the range from 50 Amperes to 10,000 Amperes and voltage in the range from 30 Volts to 500 Volts.

(F40) In any of the methods denoted as (F27) through (F39), the step of injecting gas may include injecting a deuterium-tritium mixture.

(F41) In the method denoted as (F40), the energetic particles may be neutrons that are generated in fusion reactions between accelerated deuterium and tritium ions within the plasma duct.

(F42) In the method denoted as (F41), the neutrons may have energy of 14.1 Megaelectronvolt (MeV).

(F43) A filtered cathodic arc apparatus for energetic ion deposition may include (i) a shielded cathodic arc source, positioned in a cathode chamber coupled to a proximal end of a plasma duct, for generating and delivering electrons to the proximal end of the plasma duct, (ii) at least one distal anode associated with the cathode of the cathodic arc source for generating a remote arc discharge along the plasma duct, (iii) at least one intermediate anode associated with the cathode of the cathodic arc source for generating energetic ions within the plasma duct, and (iv) a substrate holder within the plasma duct for holding substrates to be coated by the energetic ions.

(F44) In the apparatus denoted as (F43), the substrate holder may be grounded, insulated, or have floating potential.

(F45) Either of both of the filtered cathodic arc apparatuses denoted as (F43) and (F44) may be configured to accelerate the ions toward the substrate holder.

(F46) In any of the filtered cathodic arc apparatuses denoted as (F43) through (F45), the substrate holder may include a heater to heat the substrates to be coated.

(F47) In any of the filtered cathodic arc deposition apparatuses denoted as (F43) through (F46), the substrate holder may be positively biased by connecting to positive pole of an auxiliary arc power supply while its negative pole is connected to the cathode of the shielded cathodic arc source.

(F48) In any of the filtered cathodic arc deposition apparatuses denoted as (F43) through (F46), the substrate holder may be negatively biased by connecting to negative pole of an auxiliary arc power supply while its positive pole is connected to the cathode of the shielded cathodic arc source or grounded.

(F49) In any of the filtered cathodic arc apparatuses denoted as (F43) through (F48), the gas composition in the plasma duct may include argon, methane and hydrogen for deposition of polycrystalline diamond coatings.

(F50) Any of the filtered cathodic arc apparatuses denoted as (F43) through (F49) may include a gas handling system for providing discharge gas.

(F51) The filtered cathodic arc apparatuses denoted as (F50) may include a baffle that is (a) positioned between the cathode chamber and the plasma duct and (b) configured to restrict flow of gas between the cathode chamber and the plasma duct.

(F52) In the filtered cathodic arc apparatus denoted as (F51), the baffle may be configured with only a single opening between the cathode chamber and the plasma duct.

(F53) In the filtered cathodic arc apparatus denoted as (F52), the single opening may have diameter, or similar transverse extent if the single opening is not circular, in the range from 0.1 mm to 5 cm.

(F54) Any of the filtered cathodic arc apparatuses denoted as (F51) through (F53) may include (a) a gas inlet for receiving discharge gas into the plasma duct and (b) a gas outlet for removing gas from the cathode chamber, such that the gas inlet and the gas outlet may cooperate with the baffle to maintain a higher pressure in the plasma duct than in the cathode chamber.

(F55) Any of the filtered cathodic arc apparatuses denoted as (F43) through (F54) may include an anode chamber for containing the distal anode, wherein the anode chamber is coupled to a distal end of the plasma duct opposite the proximal end.

(F56) In the filtered cathodic arc apparatus denoted as (F55), the gas inlet may be connected to the anode chamber to receive the discharge gas into the plasma duct via the anode chamber.

(F57) In any of the filtered cathodic arc apparatuses denoted as (F43) through (F56), the cathodic arc source may include an electron-permeable shield permitting electrons to flow toward the plasma duct.

(F58) In any of the filtered cathodic arc apparatuses denoted as (F43) through (F57), the at least one intermediate anode may include an array of wire electrodes disposed coaxially with plasma duct for generating a plasma sheath around each of the wire electrodes.

(F59) In the filtered cathodic arc apparatus denoted as (F58), the array of wire electrodes may be electrically connected to the plasma duct.

(F60) The filtered cathodic arc apparatus denoted as (F59) may include a direct current (DC) power supply having positive output connected to the plasma duct and negative output connected to the cathode for generating a remote arc discharge plasma within the array of wire electrodes.

(F61) In the filtered cathodic arc apparatus denoted as (F60), the DC power supply may be configured to generate the remote arc discharge plasma with discharge current in the range from 50 Amperes to 10,000 Amperes and discharge voltage in the range from 30 Volts 500 Volts.

(F62) The filtered cathodic arc apparatus denoted as (F59) may include a unipolar pulse power supply, having positive output connected to the plasma duct and negative output connected to the cathode, for generating a high voltage potential within the array of wire electrodes.

(F63) In the filtered cathodic arc apparatus denoted as (F62), the unipolar pulse power supply may be configured to generate the positive potential in the range from 0.1 kV to 10,000 kilovolt.

(F64) In any of the filtered cathodic arc apparatuses denoted as (F58) through (F63), the array of wire electrodes may have density such that the plasma sheaths respectively associated with the wire electrodes overlap and provide a positive plasma potential throughout the array of wire electrodes.

(F65) In the filtered cathodic arc apparatus denoted as (F64), the array of wire electrodes may have density such that the positive plasma potential is uniform within the array of wire electrodes.

(F66) In either or both of the cathodic arc apparatuses denoted as (F64) and (F65), the diameter of each of the wire electrodes may range from 0.01 mm to 1 mm, and the distance between neighboring wire electrodes may range from 0.1 mm to 5 cm.

(F67) In any of the filtered cathodic arc apparatuses denoted as (F58) through (F66), the array of wire electrodes may radially surround a region that is coaxial with the plasma duct.

(F68) In the filtered cathodic arc apparatus denoted as (F67), the region may be substantially centered about the longitudinal axis of the magnetic solenoid.

(F69) In any of the filtered cathodic arc apparatuses denoted as (F43) through (F68), the plasma duct may be rectangular.

(F70) A reactor for plasma assisted chemical vapor deposition may include (a) a plasma duct configured to contain one or more substrates to be coated by ions, (b) a remote arc discharge generation system for generating a flow of electrons through the plasma duct in direction from a proximal end of the plasma duct toward a distal end of the plasma duct, (c) a gas inlet coupled to the distal end for receiving a reactive gas, (d) a gas outlet coupled to the proximal end for removing at least a portion of the reactive gas to generate a flow of the reactive gas through the plasma duct in direction from the distal end toward the proximal end, so as to generate the ions from collisions between the electrons and the reactive gas, and (e) a separating baffle positioned between the plasma duct and the gas outlet for restricting flow of the reactive gas out of the plasma duct to maintain a high pressure in the plasma duct to increase rate of deposition of the ions onto the substrates, wherein the separating baffle is configured with at least one opening between the cathode chamber and the plasma duct, and wherein each of the at least one opening has transverse extent in the range from 0.1 mm to 5 cm.

(F71) The reactor denoted as (F70) may further include, within the plasma duct, at least one intermediate anode associated with the cathode for extending the remote arc discharge along the plasma duct to assist generation of the ions.

(F72) In the reactor denoted as (F71), the at least one intermediate anode may include an array of wire electrodes disposed coaxially with the plasma duct for generating a plasma sheath around each of the wire electrodes when the wire electrodes are positively biased.

(F73) In any of the reactors denoted as (F70) through (F72), the remote arc discharge generation system may include (i) a shielded cathodic arc source, positioned in a cathode chamber coupled to the proximal end, for generating the electrons and (ii) a distal anode for cooperating with cathode of the cathodic arc source to generate the flow of electrons.

(F74) In the reactor denoted as (F73), the separating baffle may be positioned between the plasma duct and the cathode chamber, and the gas outlet may be implemented in the cathode chamber, to (1) maintain the high pressure in the plasma duct while maintaining a lower pressure in the cathode chamber favorable for generation of the electrons and (2) achieve overlapping counter-propagating flow of the electrons and the reactive gas through the at least one opening of the separating baffle.

(F75) In either or both of the reactors denoted as (F73) and (F74), the distal anode may further serve as a substrate holder for holding the substrates.

(F76) In any of the reactors denoted as (F73) through (F75), the shielded cathodic arc source may be configured to produce metal vapor that condenses on walls of the cathode chamber to form a getter pump for pumping the reactive gas out of the plasma duct through the separating baffle.

(F77) In any of the reactors denoted as (F73) through (F76), the substrate holder may be a rotatable substrate holder configured to rotate the substrates during deposition of the ions thereon.

(F78) In the reactor denoted as (F77), the rotating substrate holder may be positioned coaxially to axis of the remote arc discharge column formed between shielded cathode chamber and remote anode.

(F79) Any of the reactors denoted as (F70) through (F78) may include a substrate holder for holding the substrates and a magnetron sputtering source, facing the substrate holder, for generating a metal sputtering flow to deposit metal on the substrates.

(F80) The reactor denoted as (F79) may further include at least one intermediate anode that includes an array of wire electrodes disposed adjacent to a target surface of the magnetron sputtering source for ionization of metal flow generated by the magnetron sputtering source when the wire electrodes are positively biased.

(F81) Any of the reactors denoted as (F70) through (F80) may further include a heated substrate holder for holding and heating the substrates.

(F82) In any of the reactors denoted as (F70) through (F81), at least a portion of interior surface of the plasma duct may be dielectric.

(F83) Any of the reactors denoted as (F80) through (F82) may further include at least one magnetic coil for producing a magnetic field, transverse to longitudinal axis of the plasma duct, to bias a remote arc plasma column toward periphery of reaction zone for reactions between the electrons and the reactive gas.

(F84) In any of the reactors denoted as (F70) through (F83), the separating baffle may implement each of the at least one opening as an alternating stack of metal washers and dielectric washers.

(F85) In any of the reactors denoted as (F70) through (F83), the separating baffle may be formed at least in part by refractory metal, wherein each of the at least one opening is formed the refractory metal to prevent heat-induced damage to the separating baffle.

(F86) Any of the reactors denoted as (F70) through (F85) may further including a water-cooling system coupled with the separating baffle to prevent overheating of the separating baffle.

(F87) In the reactor denoted as (F70), the substrates may be particles of a powder and the plasma duct may be a rotatable barrel for coating of the particles disposed in the rotatable barrel onto the substrates in a fluidized bed process, wherein the rotatable barrel is configured for having its rotation axis be non-parallel to force of gravity such that the powder, during rotation of the rotatable barrel, continuously falls through the rotatable barrel to be coated by the ions.

(F88) In the reactor denoted as (F70), the substrates may be particles of a powder, and the plasma duct may include an inlet for receiving a powder at the proximal end such that, when the plasma duct is oriented with the proximal end above the distal end, gravity causes the particles to fall from the proximal end to the distal end while being coated by the ions.

(F89) The reactor denoted as (F88) may further include a reservoir, at the distal end, for collecting the powder.

(F90) A reactor-based method for plasma assisted chemical vapor deposition may include (a) flowing a reactive gas through a plasma duct in direction from a distal end of the plasma duct toward a proximal end of the plasma duct, the plasma duct containing one or more substrates to be coated, (b) flowing electrons through the plasma duct in direction from the proximal end toward the distal end to cooperate with the reactive gas to form a remote arc discharge plasma throughout the plasma duct so as to deposit, onto the substrates, ions generated in the remote arc discharge plasma, and (c) restricting gas flow out of the plasma duct to maintain a high pressure of the reactive gas in the plasma duct to increase rate of deposition of the ions onto the substrates.

(F91) In the coating deposition method denoted as (F90), the steps of flowing a reactive gas and restricting gas flow may cooperate to maintain a pressure in the plasma duct in the range from 300 mTorr to 1 atmosphere.

(F92) In either of both of the coating deposition methods denoted as (F90) and (F91), the step of flowing electrons may include producing an electron current density across the plasma duct in the range from 1 mA/cm$^2$ to 1000 A/cm$^2$.

(F93) In any of the coating deposition methods denoted as (F90) through (F92), the step of flowing a reactive gas may include flowing the reactive gas and a carrier gas through the plasma duct.

(F94) In the coating deposition method denoted as (F93), the carrier gas may be one or more noble gases.

(F95) In the coating deposition method denoted as (F94), the reactive gas may include hydrogen and carbon for depositing a diamond coating onto the substrates.

(F96) In the coating deposition method denoted as (F94), the reactive gas may include boron, hydrogen and nitrogen for depositing a cubic boron nitride coating onto the substrates.

(F97) In any of the coating deposition methods denoted as (F90) through (F96), the steps of flowing a reactive gas and restricting gas flow may include letting the reactive gas into the plasma duct at the distal end, and pumping the reactive gas out of the proximal end through a flow-restricting separating baffle positioned at the proximal end.

(F98) In the coating deposition method denoted as (F97), the step of flowing electrons may include generating a remote arc discharge between (i) a cathode located in a cathode chamber coupled to the proximal end and (ii) a distal anode, such that the remote arc discharge passes through the flow-restricting separating baffle and through at least a portion of the plasma duct from the proximal end toward the distal end.

(F99) The coating deposition method denoted as (F98) may further include extending, using at least one positively biased intermediate anode disposed within the plasma duct, the remote arc discharge along the plasma duct to assist generation of the ions.

(F100) In the coating deposition method denoted as (F99), the at least one intermediate anode may include an array of wire electrodes disposed coaxially with the plasma duct for generating a plasma sheath around each of the wire electrodes.

(F101) In any of the coating deposition methods denoted as (F98) through (F100), the steps of flowing a reactive gas and restricting gas flow may cooperate to maintain a pressure in the plasma duct in range from 300 mTorr to 1 atmosphere, while maintaining a pressure in the cathode chamber below 200 mTorr to provide low-pressure conditions favorable for the step of generating the remote arc discharge.

(F102) In any of the coating deposition methods denoted as (F98) through (F101), in the step of generating, the distal anode may be selected from the group consisting of the substrate holder, the substrates, and a combination thereof.

(F103) The coating deposition method denoted as (F102) may further include heating the substrates using a heater external to the substrates and the substrate holder.

(F104) Any of the coating deposition methods denoted as (F90) through (F103) may further include generating metal ions using a magnetron sputtering source located in the plasma duct and facing the substrates, and depositing the metal ions onto the substrates.

(F105) A reactor for plasma-assisted generation of energetic particles may include (a) a plasma duct, (b) a shielded cathodic arc source positioned in a cathode chamber coupled to a proximal end of the plasma duct, (c) a distal anode, positioned in an anode chamber at a distal end of the plasma duct, for cooperating with cathode of the cathodic arc source to generate a remote arc discharge through the plasma duct, (d) a gas inlet coupled to the distal end for receiving a reactive gas to facilitate reactions between the reactive gas and electrons of the remote arc discharge, (d) an array of wire electrodes disposed coaxially with the plasma duct for, when the wire electrodes are positively biased, extending the remote arc discharge and generating a plasma sheath around each of the wire electrodes to further facilitate the reactions, (e) a magnetic solenoid surrounding at least a portion of the plasma duct for radially confining plasma, associated with the remote arc discharge, in the plasma duct, and (f) an output port for outputting energetic ions generated from the reactions and accelerated by applying a positive bias voltage to the plasma duct.

(F106) In the reactor denoted as (F105), the array of wire electrodes may have density such that the plasma sheaths respectively associated with the wire electrodes overlap and provide a positive plasma potential throughout the array of wire electrodes.

(F107) In the reactor denoted as (F106), the array of wire electrodes may radially surround a region that is coaxial with the plasma duct.

(F108) Any of the reactors denoted as (F105) through (F107) may further include (i) a gas outlet coupled to the proximal end for removing at least a portion of the reactive gas to generate a flow of the reactive gas through the plasma duct in direction from the distal end toward the proximal end, and (ii) a separating baffle positioned between the plasma duct and the gas outlet for restricting flow of the reactive gas out of the plasma duct to maintain a high pressure in the plasma duct, the separating baffle including at least one opening for flowing the reactive gas and electrons of the remote arc discharge through the at least one opening in opposite directions.

(G1) A filtered cathodic arc deposition apparatus, may include (a) at least one cathodic arc source having (i) at least one cathode and at least one igniter contained within at least one cathode chamber, (ii) at least one anode associated with the cathode for generating arc discharge, and (iii) at least one stabilizing coil, disposed behind or surrounding a respective cathode for controlling position of arc discharge; (b) a substrate chamber containing a substrate holder for mounting at least one substrate to be coated, the substrate holder being non-coincidental with an optical axis of each cathode; (c) a plasma duct with a deflection section in communication with the cathode chamber and a focusing tunnel section in communication with the substrate chamber; and (d) at least one offset deflecting coil disposed adjacent to a side of the cathode chamber, and spaced from the plasma duct, generating a deflecting magnetic field within the cathode chamber for filtering output of the cathodic arc source by deflecting plasma flow therefrom into the plasma duct.

(G2) The filtered cathodic arc apparatus denoted as (G1) may include at least one focusing conductor adjacent to the focusing tunnel section for generating a focusing magnetic field.

(G3) The filtered cathodic arc apparatuses denoted as (G1) and (G2) may further include at least one deflecting coil adjacent to the plasma duct and the at least one cathode chamber.

(G4) In the filtered cathodic arc apparatus denoted as (G2), the deflecting magnetic field may couple with the focusing magnetic field to direct plasma toward the substrate holder.

(G5) In the filtered cathodic arc apparatuses denoted as (G1) through (G4), the at least one offset deflecting coil may include at least one respective proximate conductor disposed adjacent to a side of the at least one cathode chamber facing the substrate chamber, generating a saddle-shaped concave deflecting magnetic field in a part of the cathode chamber closer to the substrate chamber for deflecting a plasma flow from the at least one cathodic arc source into the plasma duct toward the substrate chamber.

(G6) In the filtered cathodic arc apparatus denoted as (G5), the at least one offset deflecting coil may include at least one respective distal offset conductor disposed adjacent to a side of the at least one cathode chamber facing away from the substrate chamber, generating a saddle-shaped concave deflecting magnetic field in a part of the at least one cathode chamber further from the substrate chamber for deflecting a plasma flow from the at least one cathodic arc source into the plasma duct.

(G7) In the filtered cathodic arc apparatuses denoted as (G1) through (G6), at least one proximate deflecting coil may include at least one respective pair of proximate offset conductors, disposed adjacent to a side of the at least one cathode chamber facing the substrate chamber on opposite sides of the plasma duct, generating a saddle-shaped concave deflecting magnetic field in a part of the at least one cathode chamber closer to the substrate chamber for deflecting a plasma flow from the at least one cathodic arc source into the plasma duct toward the substrate chamber.

(G8) In the filtered cathodic arc apparatuses denoted as (G1) through (G7), at least one distal deflecting coil may include at least one respective pair of distal offset conductors, disposed adjacent to a side of the at least one cathode chamber facing away from the substrate chamber on opposite sides of the plasma duct, generating a saddle-shaped concave deflecting magnetic field in a part of the at least one cathode chamber further from the substrate chamber for deflecting a plasma flow from the at least one cathodic arc source into the plasma duct.

(G9) In the filtered cathodic arc apparatus denoted as (G6), midpoint between corresponding ones of the at least one proximate offset conductor and the at least one distal offset conductor may be located within a corresponding one of the cathode chambers.

(G10) In the filtered cathodic arc apparatuses denoted as (G6) and (G9), distance between corresponding ones of the at least one distal offset conductor and center of the at least one cathode may be 1.2 to 10 times distance between the center of the at least one cathode and back wall of a corresponding one of the at least one cathode chamber, the back wall being a wall of the corresponding one of the at least one cathode chamber that is away from the plasma duct.

(G11) The filtered cathodic arc apparatuses denoted as (G1) through (G8) may include a gaseous plasma source disposed at an end of the plasma duct opposite the substrate chamber.

(G12) In the filtered cathodic arc apparatus denoted as (G11), the gaseous plasma source may include an electron-permeable shield permitting electrons to flow toward the substrate chamber.

(G13) The filtered cathodic arc apparatuses denoted as (G11) and (G12) may include an arc plasma enhanced magnetron sputtering source in combination with one or more low pressure arc sources, selected from the group consisting of filtered arc, hollow cathode arc, thermionic arc, and any combination thereof, wherein each arc source couples with a magnetron source to increase an ionization rate of a magnetron sputtering flow.

(G14) A filtered cathodic arc apparatus includes (a) at least one cathodic arc source including (i) at least one cathode and at least one igniter contained within at least one cathode chamber, (ii) at least one anode associated with the at least one cathode for generating arc discharge, and (iii) at least one stabilizing coil, disposed behind or surrounding a respective cathode for controlling position of the arc discharge; (b) a substrate chamber containing a substrate holder for mounting at least one substrate to be coated, the substrate holder being positioned non-coincidental with an optical axis of the at least one cathode; (c) a plasma duct in communication with the cathode chamber and the substrate chamber; (d) at least one coil generating a deflecting magnetic field for deflecting the plasma toward the substrate chamber; and (e) a plurality of stream baffles having positive potential relative to the plasma to enhance filtration of macroparticles when in the plasma duct generally at an angle to a plane parallel to direction of plasma flow.

(G15) In the filtered cathodic arc apparatus denoted as (G14), each of the plurality of stream baffles may be generally oriented to lie between a plane tangential to magnetic field lines at position of the plurality of stream baffles and a plane tangential to plasma stream lines at the position of the plurality of stream baffles.

(G16) In the filtered cathodic arc apparatuses denoted as (G14) and (G15), the plurality of stream baffles may include adjustable stream baffles having adjustable orientation and an optimal orientation that is generally tangential to the plasma flow at the position of the plurality of stream baffles.

(G17) The filtered cathodic arc apparatus denoted as (G16) may further include at least one probe, selected from the group of a Langmuir ion collecting probe and a mass flux collecting probe, for determining the optimal orientation, the at least one probe (i) being disposed in the deflecting magnetic field, (ii) having an ion collecting area with adjustable orientation, and (iii) measuring a maximum ion current when the ion collecting area is perpendicular to the plasma flow.

(G18) In the filtered cathodic arc apparatuses denoted as (G14) through (G16), the stream baffles may include a magnetic material for substantially tangential alignment of the stream baffles with field lines of the deflecting magnetic field lines under magnetic influence of the deflecting magnetic field.

(G19) The filtered cathodic arc apparatuses denoted as (G14) though (G18) may include at least one focusing conductor adjacent to a focusing tunnel section of the plasma duct for generating a focusing magnetic field, wherein the deflecting magnetic field couples with the focusing magnetic field to direct plasma toward the substrate holder.

(G20) The filtered cathodic arc apparatuses denoted as (G14) through (G19) may include at least one offset deflecting coil disposed adjacent to a side of the at least one cathode chamber facing the substrate chamber, generating a deflecting magnetic field within the cathode chamber for deflecting a plasma flow from the cathodic arc source into the plasma duct.

(G21) The filtered cathodic arc apparatuses denoted as (G14) through (G20) may include a gaseous plasma source disposed at an end of the plasma duct opposite from the substrate chamber.

(G22) In the filtered cathodic arc apparatus denoted as (G21), the gaseous plasma source may include an electron-permeable shield permitting electrons to flow toward the substrate chamber.

(G23) The filtered cathodic arc apparatuses denoted as (G21) and (G22) may include an arc plasma enhanced magnetron sputtering source in combination with one or more low pressure arc sources, selected from the group consisting of filtered arc, hollow cathode arc, thermionic arc, or any combination thereof, wherein each arc source couples with a magnetron source to increase an ionization rate of a magnetron sputtering flow.

(G24) A filtered cathodic arc apparatus may include (a) a cathodic arc source including (i) at least one cathode and at least one igniter contained within at least one cathode chamber, respectively, (ii) at least one anode associated with the cathode for generating arc discharge, and (iii) at least one stabilizing coil, disposed behind or surrounding a respective cathode, for controlling position of the arc discharge; (b) a substrate chamber containing a substrate holder for mounting at least one substrate to be coated, the substrate holder being positioned non-coincidental with an optical axis of the at least one cathode; (c) a plasma duct, in communication with each cathode chamber and the substrate chamber and comprising (i) at least one focusing coil surrounding a focusing tunnel section of the plasma duct for generating a focusing magnetic field and (ii) at least one deflecting coil generating a deflecting magnetic field for deflecting the plasma along a path toward the substrate chamber; and (d) at least one magnetron facing the substrate holder, the magnetron being positioned such that at least a portion of magnetic force lines of the focusing magnetic field overlap and are substantially parallel with at least a portion of magnetic force lines generated by the magnetron, wherein each arc source couples with a magnetron source to increase an ionization rate of a magnetron sputtering flow.

(G25) The filtered cathodic arc apparatus denoted as (G24) may include a gaseous plasma source disposed at an end of the plasma duct opposite the substrate chamber.

(G26) In the filtered cathodic arc apparatus denoted as (G25), the gaseous plasma source may include an electron-permeable shield permitting electrons to flow toward the substrate chamber.

(G27) The filtered cathodic arc apparatuses denoted as (G24) through (G26) may include an arc plasma enhanced magnetron sputtering source in combination with one or more low pressure arc sources, selected from the group consisting of filtered arc, hollow cathode arc, thermionic arc, and any combination thereof, wherein each arc source couples with a magnetron source to increase an ionization rate of a magnetron sputtering flow.

(G28) The filtered cathodic arc apparatuses denoted as (G24) through (G27) may include at least one metal vapor source and a plurality of deflecting conductors, each of the plurality of deflecting conductors respectively associated with each cathodic arc source and the metal vapor source, wherein at least some of the plurality of deflecting conductors can be independently activated to alternate between deposition of vapor associated with the at least one filtered arc source and metal vapor from the at least one metal vapor source.

(G29) The filtered cathodic arc apparatuses denoted as (G24) through (G28) may include at least one offset deflecting coil respectively disposed adjacent to a side of each cathode chamber facing the substrate chamber, generating a deflecting magnetic field within the cathode chamber for deflecting a plasma flow from the arc source into the plasma duct.

(G30) The filtered cathodic arc apparatuses denoted as (G24) through (G29) may further include at least one deflecting coil adjacent to the plasma duct and each cathode chamber, respectively.

(G31) The filtered cathodic arc apparatuses denoted as (G24) through (G30) may include a plurality of stream baffles, having a positive potential relative to the plasma, installed in the plasma duct generally at an angle to a plane parallel to a direction of plasma flow, to enhance filtration of macroparticles.

(G32) In the filtered cathodic arc apparatus denoted as (G31), each of the plurality of stream baffles may be generally oriented to lie between a plane tangential to magnetic field lines at position of the stream baffles and a plane tangential to plasma stream lines at the position of the stream baffles.

(G33) In the filtered cathodic arc apparatuses denoted as (G31) and (G32), the plurality of stream baffles may include a magnetic material for substantially tangential alignment of the stream baffles with field lines of the deflecting magnetic field under magnetic influence of the deflecting magnetic field.

(G34) The filtered cathodic arc apparatuses denoted as (G24) through (G33) may include at least one focusing conductor adjacent to the focusing tunnel section for generating at least a portion of the focusing magnetic field, wherein the deflecting magnetic field couples with the focusing magnetic field to direct plasma toward the substrate holder.

(H1) A hybrid filtered arc-magnetron sputtering deposition apparatus, comprising:

- a coating chamber including a substrate holder for holding a substrate to be coated;
- a filtered vapor plasma source for generating and delivering a filtered vapor plasma to the substrate; and
- a first magnetron sputtering source, located in the coating chamber, for generating a flow of sputtered metal atoms such that deposition of the sputtered metal atoms onto the substrate spatially coincides with deposition of the filtered vapor plasma onto the substrate.

(H2) The deposition apparatus of claim H[00627], the first magnetron sputtering source (a) facing side of the substrate subjected to said deposition of the filtered vapor plasma, (b) being located adjacent flow path of the filtered vapor plasma into the coating chamber, and (c) being magnetically coupled with the filtered vapor plasma source.

(H3) The deposition apparatus of claim H[00628], further comprising a second magnetron sputtering source for generating a flow of second sputtered metal atoms such that deposition of the second sputtered metal atoms onto the substrate spatially coincides with deposition of both the filtered vapor plasma and the sputtered metal atoms onto the substrate, the second magnetron sputtering source (a) facing side of the substrate subjected to said deposition of the filtered vapor plasma and (b) being located inside the coating chamber adjacent the flow path on side of the flow path opposite the first magnetron sputtering source.

(H4) The deposition apparatus of claim H[00627], the filtered vapor plasma source comprising:

- a vapor plasma source for generating a vapor plasma; and
- at least one coil for generating a first magnetic field to (a) deflect ions of the vapor plasma to produce the filtered vapor plasma such that the filtered vapor plasma is ionized, and (b) direct the filtered vapor plasma to the substrate.

(H5) The deposition apparatus of claim H[00630], the vapor plasma source being a cathodic arc source.

(H6) The deposition apparatus of claim H[00630], the vapor plasma source being a third magnetron sputtering source.

(H7) The deposition apparatus of claim H[00630], further comprising:

- an anode located proximate the vapor plasma source; and
- a cathode ionizer located in the coating chamber and electrically coupled to the anode, to produce an arc discharge that overlaps with the vapor plasma through region of deflection of ions by the first magnetic field, so as to enhance ionization of the filtered vapor plasma.

(H8) The deposition apparatus of claim H[00632], the anode being configured as an array of wires positioned in front of target of the vapor plasma source.

(H9) The deposition apparatus of claim H[00630], further comprising:

a cathode chamber for respectively containing the vapor plasma source, and a plasma duct including an entrance that is connected to the cathode chamber and an exit that is connected to the coating chamber and out of sight of the vapor plasma source; and the at least one coil comprising:

a first deflection coil surrounding the cathode chamber adjacent to the entrance and configured to deflect the ions in direction toward the coating chamber, and a focusing coil surrounding the plasma duct adjacent to the exit and configured to focus the ions onto the substrate to be coated.

(H10) The deposition apparatus of claim H[00634], the first magnetron sputtering source being magnetically coupled with magnetic field produced by the focusing coil.

(H11) The deposition apparatus of claim H[00634], the at least one coil further comprising an offset deflection coil surrounding the cathode chamber and having magnetic center offset from working axis of the vapor plasma source so as to initiate, within the cathode chamber, deflection of the ions in direction toward the coating chamber.

(H12) The deposition apparatus of claim H[00630], magnetic field lines of the first magnetron sputtering source co-directionally overlapping with magnetic field lines of the first magnetic field within the coating chamber.

(H13) The deposition apparatus of claim H[00630], further comprising, in the plasma duct, a plurality of stream baffles for removing macroparticles from the vapor plasma, the plurality of stream baffles being placed (a) in region of deflection of the ions from neutral components by the first magnetic field and (b) parallel to propagation direction of the ions to allow passage of the ions while blocking at least some of the macroparticles.

(H14) A hybrid filtered arc-magnetron sputtering deposition apparatus, comprising:

a coating chamber including a substrate holder for holding a substrate to be coated;

a filtered vapor plasma source for generating and delivering a filtered vapor plasma to the substrate, the filtered vapor plasma source including:

(a) a vapor plasma source for generating a vapor plasma, (b) a cathode chamber for respectively containing the vapor plasma source, (c) a plasma duct including an entrance that is connected to the cathode chamber and an exit that is connected to the coating chamber and out of sight of the vapor plasma source, (d) at least one coil for generating the first magnetic field to (i) deflect ions of the vapor plasma through the plasma duct and toward the coating chamber to produce the filtered vapor plasma such that the filtered vapor plasma is ionized, and (ii) direct the filtered vapor plasma to the substrate, and (e) a plurality of stream baffles, located in the plasma duct, for removing macroparticles from the vapor plasma; and a first magnetron sputtering source, located in the plasma duct, for generating a flow of sputtered metal atoms such that deposition of the sputtered metal atoms onto the substrate spatially coincides with deposition of the filtered vapor plasma onto the substrate, the first magnetron sputtering source having magnetic field lines that co-directionally overlap with magnetic field lines of the first magnetic field.

(H15) The deposition apparatus of claim H[00639], the at least one coil comprising:

a first deflection coil surrounding the cathode chamber adjacent to the entrance and configured to deflect the ions in direction toward the coating chamber, and a focusing coil surrounding the plasma duct adjacent to the exit and configured to focus the ions onto the substrate to the coated; and the first magnetron sputtering source being magnetically coupled with magnetic field produced by the focusing coil.

(H16) The deposition apparatus of claim H[00640], the at least one coil further comprising an offset deflection coil surrounding the cathode chamber and having magnetic center offset from working axis of the vapor plasma source so as to initiate, within the cathode chamber, deflection of the ions in direction toward the coating chamber.

(H17) The deposition apparatus of claim H[00639], the magnetron sputtering source being located in the plasma duct and facing the substrate holder such that the flow of sputtered metal atoms overlaps with flow of the filtered vapor plasma through at least a portion of the plasma duct and into the coating chamber onto the substrate.

(H18) The deposition apparatus of claim H[00639], further comprising:

an anode located in the cathode chamber; and a cathode ionizer located in the coating chamber and electrically coupled to the anode, to produce an arc discharge through the plasma duct, between the coating chamber and the cathode chamber, so as to enhance ionization of the filtered vapor plasma.

(H19) The deposition apparatus of claim H[00643], the anode being configured as an array of wires positioned in front of target of the vapor plasma source.

(H20) The deposition apparatus of claim H[00639], the plurality of stream baffles being placed (a) in region of deflection of the ions from neutral components by the first magnetic field and (b) parallel to propagation direction of the ions to allow passage of the ions while blocking at least some of the macroparticles.

(H21) The deposition apparatus of claim H[00627], the filtered vapor plasma source further comprising one or more additional vapor plasma sources and a filtering system for cooperatively producing the filtered vapor plasma from the vapor plasma source and the additional vapor plasma sources.

(H22) A hybrid filtered arc-magnetron sputtering deposition method, comprising:

producing a vapor plasma;

filtering the vapor plasma to produce a filtered vapor plasma that is at least partially ionized;

sputtering metal atoms from a target; and simultaneously depositing the filtered vapor plasma and the metal atoms onto a substrate, such that deposition onto the substrate of the sputtered metal atoms spatially overlaps with deposition onto the substrate of the filtered vapor plasma.

(H23) The deposition method of claim H[00647], comprising:

using a filtered vapor plasma source to perform the steps of producing and filtering; and using a magnetron sputtering source to perform the step of sputtering, the magnetron source being magnetically coupled with the filtered vapor plasma source.

(H24) The deposition method of claim H[00647], the step of simultaneously depositing comprising:

depositing the filtered vapor plasma as an essentially ionized vapor plasma; and depositing the sputtered metal atoms essentially as neutral atoms.

H25) The deposition method of claim H[00649], further comprising adjusting relative intensity of the filtered vapor plasma and the sputtered metal atoms deposited onto the substrate, to control ionization ratio of hybrid deposition.

(H26) The deposition method of claim H[00647], the step of filtering comprising:

generating a first magnetic field to (a) deflect ions of the vapor plasma from neutral components of the vapor plasma to produce the filtered vapor plasma at least in part from the ions, and (b) magnetically direct the filtered vapor plasma toward the substrate.

(H27) The deposition method of claim H[00651], the step of sputtering comprising:

producing the metal atoms using a magnetron sputtering source having magnetic field lines that co-directionally overlap with magnetic field lines of the first magnetic field.

(H280 The deposition method of claim H[00651], further comprising:

generating an arc discharge that overlaps with the vapor through region of deflection of the ions from the neutral components by the first magnetic field, so as to enhance ionization of the filtered vapor plasma.

H29) The deposition method of claim H[00651], comprising:

merging the sputtered metal atoms with the filtered vapor plasma after deflecting the ions from the neutral components using the first magnetic field.

(H30) The deposition method of claim H[00651], comprising:

merging the sputtered metal atoms with the filtered vapor plasma within region of deflection of the ions from the neutral components by the first magnetic field.

(H31) The deposition method of claim H[00651], further comprising:

removing macroparticles from the vapor plasma using a plurality of stream baffles having a positive potential relative to the plasma, the plurality of stream baffles being placed (a) in region of deflection of the ions from the neutral components by the first magnetic field and (b) parallel to propagation direction of the ions to allow passage of the ions while blocking at least a portion of the macroparticles.

(H32) The deposition method of claim H[00651], the step of generating comprising generating a deflection magnetic field to initiate deflection of the ions from the neutral components within a cathode chamber, wherein the vapor plasma is generated, prior to directing the ions out of the cathode chamber, through a plasma duct, and toward a coating chamber housing the substrate.

(H32) The deposition method of claim H[00651], the step of generating comprising generating a deflection magnetic field to initiate deflection of the ions from the neutral components within a cathode chamber, wherein the vapor plasma is generated, prior to directing the ions out of the cathode chamber, through a plasma duct, and toward a coating chamber housing the substrate.

(H33) A hybrid filtered arc-magnetron sputtering deposition apparatus, comprising:

a coating chamber including a substrate holder for holding a substrate to be coated installed on rotary platform;

at least one filtered vapor plasma source for generating and delivering a filtered vapor plasma to the substrate, the filtered vapor plasma source including:

(a) a vapor plasma source for generating a vapor plasma, (b) a cathode chamber for respectively containing the vapor plasma source, (c) a plasma duct including an entrance that is connected to the cathode chamber and an exit that is connected to the coating chamber and out of sight of the vapor plasma source, (d) at least one coil for generating the first magnetic field to (i) deflect ions of the vapor plasma through the plasma duct and toward the coating chamber to produce the filtered vapor plasma such that the filtered vapor plasma is ionized, and (ii) direct the filtered vapor plasma to the substrate, and (e) a plurality of stream baffles, located in the plasma duct, for removing macroparticles from the vapor plasma;

(f) a shielded cathodic arc source for emitting the electron current of the remote arc discharge, wherein the shield has openings transparent for conducting the electron current, but opaque for the metal ions and macroparticles, generating by the cathodic arc source;

(g) at least one distal anode to flow the electron current generated by the shielded cathodic arc source, to conduct the current of the remote arc discharge;

(g) at least one magnetron sputtering source, located in the plasma duct between the shielded cathodic arc source and distal anode, for generating a flow of sputtered metal atoms;

wherein the substrate holder has a surrounding shield which restricts the current of the remote arc discharge to the gap between the shield and the chamber walls, the shield has opening in front of the at least one magnetron sputtering source.

(H34) A hybrid arc-magnetron sputtering apparatus of claim H33, the shield surrounding the substrate holder has opening in front of the filtered arc source.

(H35) A hybrid arc-magnetron sputtering apparatus of claim H34, the shield surrounding the substrate holder has a moving screen(s) which allows to open and to close the shield opening in front of the at least one filtered arc source.

(I1) A source for plasma assisted processes and associated methods, comprising:

a plasma duct configured to contain high pressure high potential plasma;

a cathode chamber coupled to a proximal end of the plasma duct;

a remote arc discharge generation system for generating a flow of electrons through the plasma duct in direction from the proximal end of the plasma duct toward a distal end of the plasma duct, the remote arc discharge generation system including (a) a cathodic arc source, positioned in the cathode chamber, for generating the electrons and (b) a distal anode, positioned in the plasma duct or past the distal end, for causing the flow of electrons;

a gas inlet coupled to the distal end for receiving a plasma-creating gas;

a gas outlet in the gas outlet compartment, coupled to the proximal end for removing at least a portion of the plasma-creating gas to generate a flow of the ionized gas through the plasma duct in direction from the distal end toward the proximal end, so as to generate the ions from collisions between the electrons and the plasma-generating gas;

a separating baffle positioned between the proximal end and the cathode chamber for restricting flow of the reactive gas out of the plasma duct to maintain (a) a high pressure and high plasma potential in the plasma duct to generate the high density high voltage remote arc plasma with gas speed not exceeding ⅓ of the speed of sound, (b) a low pressure low plasma potential in the cathode chamber favorable for generation of the electrons, (c) a high plasma potential in the plasma duct to increase the ion energies, and (d) a low plasma potential in the cathode chamber to generate the plasma plume with gas speed ranging from ⅓ to 20 times of the speed of sound, the separating baffle being configured with at least one orifice between the cathode chamber and the plasma duct, each of the at least one orifice having transverse extent in range from 0.1 mm to 5 cm to maintain a stationary shock-wave front across the orifice separating high pressure high plasma potential in the plasma duct from low pressure low plasma potential in the cathode chamber to generate the plasma plume with gas speed ranging from ⅓ to 20 times of the speed of sound to achieve overlapping counter-propagating flow of the electrons and the plasma-generating gas through the at least one opening of the separating baffle.

(I2) A source of claim I1, the at least one opening in separating baffle is made in a form of straight nozzle-opening, converging nozzle or converging-diverging de Laval supersonic nozzle for generation of a supersonic plasma plume within cathode chamber.

(I3) A source of claim I2 having the cathode chamber opened to the outer space to generate thrust for space vehicle.

(I4) A source of claim I3 in which the plasma plume generated by the remote arc plasma flowing through the nozzle-orifice is injecting into the second ion accelerating stage for generation of the thrust for moving the space vehicle.

(I5) A source claim I4, the second ion accelerating stage is magnetoplasmadynamic thruster accelerator stage positioned in front of the nozzle, the reversed remote arc current is conducting from the cathode positioned outside of the thruster through the magnetoplasmadynamic channel and continuing through the nozzle toward the distal anode.

(I6) A source of claim I4, the second acceleration stage is plasma focus acceleration stage.

(I7) A source of claim I4, the second ion accelerating stage is Hall-effect accelerator stage having the nozzle positioned at the entrance of the ceramic channel, the reversed remote arc current is conducting from the cathode positioned outside of the thruster through the ceramic channel and continuing through the nozzle toward the distal anode.

(I8) A source of claim I7, the plasma duct is connected to the positive pole of the additional DC power supply while its negative pole is connected to the cathode to deliver additional power into the channel in which configuration the plasma duct is serving as additional anode of the Hall-effect accelerator.

(I9) A source of claim I7, the plasma duct is connected to RF generator to deliver the RF power into Hall thruster channel coinciding with DC discharge power.

(I10) A source of claim I7, the cathode is vacuum arc cold cathode.

(I11) A source of energetic particles of claim I7, the cathode is hollow cathode.

(I12) A source of energetic particles of claim I11, the hollow cathode is positioned coaxially along the axes of the thruster.

(I13) A source of claim I12, the intermediate anode-keeper is positioned in front of the hollow cathode.

(I14) A source of claim I12, the cathode is configured as a nested cathode with first thermionic filament stage positioned behind the thruster followed by hollow cathode stage, the hollow cathode is coupled to the filament cathode as intermediate anode while at the same time is coupled to the distal anode in the plasma duct and/or to the plasma duct anode, the thermionic arc discharge between the filament cathode and the hollow cathode tip is located in the dielectric tube isolated the filament from the hollow cathode.

(I15) A source of claim I1, the separating baffle is dielectric and the distal anode with at least one hole is positioned immediately behind the separating baffle, wherein the at least one orifice in the separating baffle is located inside of the at least one hole in the distal anode.

(I16) A source of claim I15, the at least one hole in the separating baffle is located under the arch-shape portion of the magnetron-type magnetic field created in front of the separated baffle to generate high energy ions.

(I17) A source of claim I1, the powder delivery line is attached to the plasma duct to create dusty plasma for coating and treatment of powder in the plasma duct.

(I18) A source of claim I17, the electrostatic accelerating stage is positioned at the proximate end of the plasma duct to accelerate the particles.

(I19) A source of claim I18, the magnetic filter is positioned in the plasma duct prior to the electrostatic acceleration stage to remove the electrons before the negatively charged particles are entering the electrostatic acceleration stage.

(I20) A source of claim I17, the plasma duct is configured as rotating tubular reactor for suspension of the powder in dusty plasma.

(I21) A source of claim I17, the plasma duct is configured as fluidized bed reactor for suspension of the powder in the upward gas flow.

(I22) A source of claim I21, the vortex gas flow is produced in the plasma duct to contain the dusty plasma around the axis of the plasma duct.

(I23) A source of claim I17, the gas flow is circulating between the cathode chamber and the plasma duct.

(I24) A source of claim I21, a cascade of the plasma duct reactor chambers are positioned on a top of each other, the neighbor chambers are connected by the powder transport lines.

(I25) A source of claim I7, a transversal magnetic field in the channel is produced by a pair of electromagnetic coils installed by the inner pole and outer pole of the magnetic core made of soft magnetic metal alloy embracing the thruster.

(I26) A source of claim I25, a pair of magnetic screens made of soft magnetic metal alloy adjacent to the inner pole and to the outer pole of the magnetic core, coaxial to the thruster, to produce a magnetic shielding effect mitigating the sputtering erosion of the ceramic channel.

(I27) A source of claim I25, a transversal magnetic field is produced by a coaxial pair of magnetic coils surrounding the channel and having opposite direction of magnetic field.

(I28) A source of claim I25, a transversal magnetic field is produced by a set of radially magnetized permanent magnets positioned within the inner and the outer pole.

(I29) A source of claim I13, a hollow cathode is tubular, the anode-keeper is tubular coaxial to the cathode and, separated by the tubular ceramic spacer.

(I30) A source of claim I29, the tubular anode-keeper is separated from the inner pole by the tubular ceramic spacer.

(I31) A source of claim I2, the nozzle is made of refractory metal.

(I32) A source of claim I2, the nozzle is made of dielectric ceramic.

(I33) A source of claim I2, the nozzle is water-cooled.

(I34) A source of claim I4, a second acceleration stage is electrostatic ion acceleration (ion thruster) stage.

(I35) A source of claim I34, a powder delivery line is attached to the ion accelerating chamber and magnetic filter is installed in front of the electrostatic acceleration stage fop filtering out the electrons allowing only negatively charged particles to enter the electrostatic acceleration stage.

(I36) A source of claim I17, a cathode is hollow water-cooled cathode with self-recreating inner wall covered by the metal with low boiling point and hot diaphragm with refractory nozzle-opening.

I claim:

1. A reactor configured for plasma assisted treatment of a powder, comprising:

a plasma duct configured to contain a high pressure, high potential, plasma; a cathode chamber coupled to a proximal end of the plasma duct;

a remote arc discharge generation system configured to generate a flow of electrons through the plasma duct in a direction from the proximal end of the plasma duct toward a distal end of the plasma duct, the remote arc discharge generation system including (a) a cathodic arc source, positioned in the cathode chamber, configured to generate the electrons of the flow of electrons and (b) a distal anode, positioned in the plasma duct or past the distal end, configured to cause the flow of electrons;

a gas inlet coupled to the distal end for receiving a plasma-generating gas;

a gas outlet, coupled to the proximal end configured to remove at least a portion of the plasma-generating gas to generate a flow of an ionized gas through the plasma duct in direction from the distal end toward the proximal end, so as to generate ions from collisions between the electrons and the plasma-generating gas;

a separating baffle, positioned between the proximal end and the cathode chamber, for restricting a flow of the ionized gas out of the plasma duct to at least one orifice of the separating baffle and maintain (a) a high pressure and a high plasma potential in the plasma duct to generate a high density, high voltage remote arc plasma, (b) a low pressure and a low plasma potential in the cathode chamber favorable for generation of the electrons, (c) the high plasma potential in the plasma duct to increase energies of the ions, and (d) the low plasma potential in the cathode chamber to generate a plasma plume from an overlapping counter-propagating flow of the electrons and the plasma-generating gas through the at least one orifice, each orifice of the at least one orifice having a transverse extent in a range from 0.1 mm to 5 cm to maintain a stationary shock-wave front across the at least one orifice, the stationary shock-wave front separating the high pressure and the high plasma potential in the plasma duct from the low pressure and the low plasma potential in the cathode; and a powder injector configured to inject the powder into the plasma duct for plasma treatment and surface modification of the powder;

wherein each orifice of the at least one orifice is a straight nozzle-opening, a converging nozzle, or a converging-diverging de Laval supersonic nozzle for generating a supersonic plasma plume within the cathode chamber, (f) the cathode chamber is connected to a vacuum pumping system to maintain the low pressure in the cathode chamber, (g) the plasma duct is oriented vertically, the powder to be treated is suspended within a flow of the plasma-generating gas, and (h) at least a portion of a reactive gas is recirculating.

2. The reactor of claim 1 comprising at least one gas inlet coupled to the distal end and configured for tangential gas injection configured to create a circumferential gas flow to generate a vortex flow within the plasma duct to stabilize an arc discharge in the plasma duct and contain the powder near an axis of the plasma duct.

3. The reactor of claim 2 where the at least one gas inlet for injection of the tangential gas flow is coupled to the proximal end of the plasma duct.

4. The reactor of claim 1 where the powder injector is positioned near the proximal end of the plasma duct.

5. The reactor of claim 1 where the powder injector is positioned near the distal end of the plasma duct.

6. The reactor of claim 1 where the distal end of the plasma duct is frustoconical.

7. The reactor of claim 1 where a powder collector is positioned by the distal end of the plasma duct.

8. The reactor of claim 1 where the plasma duct is made of dielectric material.

9. The reactor of claim 1 wherein the plasma treatment and surface modification of the powder includes chemical vapor deposition.

10. The reactor of claim 1 where a longitudinal magnetic field is generated along the plasma duct by magnetic coils positioned coaxial to the plasma duct.

11. The reactor of claim 1 where the plasma generator is attached to the at least one gas inlet for injecting a plasma jet into the reactive gas in the plasma duct.

12. The reactor of claim 1 where the plasma in the plasma duct is generated by RF induction excitation.

13. The reactor of claim 1 wherein the plasma treatment and surface modification of the powder includes atomic layer etching or atomic layer deposition.

14. The reactor of claim 1 where the cathode chamber is attached to a top end of the plasma duct, and the anode is positioned at a bottom end of the plasma duct in front of a powder collector.

15. A reactor configured for plasma assisted treatment of a powder, comprising:

a plasma duct configured to contain a high pressure, high potential, plasma;

a cathode chamber coupled to a proximal end of the plasma duct;

a remote arc discharge generation system configured to generate a flow of electrons through the plasma duct in a direction from the proximal end of the plasma duct toward a distal end of the plasma duct, the remote arc discharge generation system including (a) A cathodic arc source, positioned in the cathode chamber, configured to generate the electrons of the flow of electrons and (b) A distal anode, positioned in the plasma duct or past the distal end, configured to cause the flow of electrons;

a gas inlet coupled to the distal end for receiving a plasma-generating gas;

a gas outlet, coupled to the proximal end configured to remove at least a portion of the plasma-generating gas to generate a flow of an ionized gas through the plasma duct in direction from the distal end toward the proximal end, so as to generate ions from collisions between the electrons and the plasma-generating gas;

a separating baffle, positioned between the proximal end and the cathode chamber, for restricting a flow of the ionized gas out of the plasma duct to at least one orifice of the separating baffle and maintain (a) A high pressure and a high plasma potential in the plasma duct to generate a high density, high voltage remote arc plasma, (b) A low pressure and a low plasma potential in the cathode chamber favorable for generation of the electrons, (c) the high plasma potential in the plasma duct to increase energies of the ions, and (d) the low plasma potential in the cathode chamber to generate a plasma plume from overlapping counter propagating flows of the electrons and the plasma-generating gas through the at least one orifice, each orifice of the at least one orifice having a transverse extent in a range from 0.1 mm to 5 cm to maintain a stationary shock-wave front across the at least one orifice, the stationary shock-wave front separating the high pressure and the high plasma potential in the plasma duct from the low pressure and the low plasma potential in the cathode; and a powder injector configured to inject the powder into the plasma duct for plasma treatment and surface modification of the powder;

wherein (e) each orifice of the at least one orifice is a straight nozzle-opening, a converging nozzle, or a converging-diverging de Laval supersonic nozzle for generating a supersonic plasma plume within the cathode chamber, (f) the cathode chamber is connected to a vacuum pumping system to maintain the low pressure in the cathode chamber, (g) the plasma duct is oriented vertically, and the powder to be treated is suspended within a flow of the plasma-generating gas, and (h) A chain of the plasma ducts are attached to each other in parallel, each plasma duct of the chain of plasma ducts being provided with a respective cathode chamber, a respective remote anode, and a respective cathode.

16. A reactor configured for plasma assisted treatment of a powder, comprising:

a plasma duct configured to contain a high pressure, high potential, plasma;

a cathode chamber coupled to a proximal end of the plasma duct;

a remote arc discharge generation system configured to generate a flow of electrons through the plasma duct in a direction from the proximal end of the plasma duct toward a distal end of the plasma duct, the remote arc discharge generation system including (a) A cathodic arc source, positioned in the cathode chamber, configured to generate the electrons of the flow of electrons and (b) A distal anode, positioned in the plasma duct or past the distal end, configured to cause the flow of electrons;

a gas inlet coupled to the distal end for receiving a plasma-generating gas;

a gas outlet, coupled to the proximal end configured to remove at least a portion of the plasma-generating gas to generate a flow of an ionized gas through the plasma duct in a direction from the distal end toward the proximal end, so as to generate ions from collisions between the electrons and the plasma-generating gas;

a separating baffle, positioned between the proximal end and the cathode chamber, for restricting a flow of the ionized gas out of the plasma duct to at least one orifice of the separating baffle and maintain (a) A high pressure and a high plasma potential in the plasma duct to generate a high density, high voltage remote arc plasma, (b) A low pressure and a low plasma potential in the cathode chamber favorable for generation of the electrons, (c) the high plasma potential in the plasma duct to increase energies of the ions, and (d) the low plasma potential in the cathode chamber to generate a plasma plume from overlapping counter propagating flows of the electrons and the plasma-generating gas through the at least one orifice, each orifice of the at least one orifice having a transverse extent in a range from 0.1 mm to 5 cm to maintain a stationary shock-wave front across the at least one orifice, the stationary shock-wave front separating the high pressure and the high plasma potential in the plasma duct from the low pressure and the low plasma potential in the cathode; and a powder injector configured to inject the powder into the plasma duct for plasma treatment and surface modification of the powder;

wherein (e) each orifice of the at least one orifice is a straight nozzle-opening, a converging nozzle, or a converging-diverging de Laval supersonic nozzle for generating a supersonic plasma plume within the cathode chamber, (f) the cathode chamber is connected to a vacuum pumping system to maintain low pressure in the cathode chamber, (g) the plasma duct is oriented vertically, the powder to be treated is suspended within a flow of the plasma generating gas, and (h) the cathode chamber is attached to the proximal end of the plasma duct coaxially to the plasma duct, and the powder is injected at the distal end of the plasma duct and falls through the plasma duct and the cathode chamber by gravity and collects in a powder collector attached to the proximal end of the cathode chamber.

17. The reactor of claim 16 where the cathode chamber is surrounded by a magnetic coil to generate a longitudinal magnetic field along the cathode chamber.

18. The reactor of claim 17 where the cathodic arc source comprises two cathodic arc sources attached to opposite sides of the cathode chamber and surrounded by focusing and deflecting magnetic coils.

19. The reactor of claim 18 where substrates-to-be-coated are positioned at a bottom of the powder collector, a substrate holder is connected to a negative pole of a bias power supply, wherein both metal vapor cathodic arc plasma flow and the powder flow coincide for deposition of a coating over said substrates-to-be-coated.

20. The reactor of claim 19 where at least one additional anode is positioned downstream of the cathode chamber in front of the powder collector.

21. The reactor of claim 20 where two magnets are positioned on both sides of the at least one additional anode to generate a perpendicular magnetic field across the at least one additional anode for isolation of the electrons from the substrates-to-be-coated in the powder collector.

22. The reactor of claim 21 where electrostatic grids are positioned between the at least one additional anode and the substrate holder for accelerating negatively charged particles of the powder toward the substrates-to-be-coated.

23. The reactor of claim 22 where the at least one orifice is positioned in a positively charged diaphragm between the at least one additional anode and the substrate holder for accelerating the negatively charged particles toward substrate-to-be-coated.

24. The reactor of claim 22 where one or more additional anodes are positioned coaxially to the plasma duct between the anode placed in the perpendicular magnetic field and the cathode chamber to extend a length of the plasma in the plasma duct.

25. The reactor of claim 24 where the cathode is positioned near the at least one additional anode positioned in the perpendicular magnetic field, at the proximal end of the cathode chamber, and wherein the distal anode positioned in the plasma duct is attached to the distal end of the cathode chamber.

26. A reactor configured for plasma assisted treatment of a powder, comprising:

- a plasma duct configured to contain a high pressure, high potential, plasma;
- a cathode chamber coupled to a proximal end of the plasma duct;
- a remote arc discharge generation system configured to generate a flow of electrons through the plasma duct in a direction from the proximal end of the plasma duct toward a distal end of the plasma duct, the remote arc discharge generation system including (a) A cathodic arc source, positioned in the cathode chamber, configured to generate the electrons of the flow of electrons and (b) A distal anode, positioned in the plasma duct or past the distal end, configured to cause the flow of electrons;
- a gas inlet coupled to the distal end for receiving a plasma-generating gas;
- a gas outlet, coupled to the proximal end configured to remove at least a portion of the plasma-generating gas to generate a flow of an ionized gas through the plasma duct in direction from the distal end toward the proximal end, so as to generate ions from collisions between the electrons and the plasma-generating gas;
- a separating baffle, positioned between the proximal end and the cathode chamber, for restricting a flow of the ionized gas out of the plasma duct to at least one orifice of the separating baffle and maintain (a) A high pressure and a high plasma potential in the plasma duct to generate a high density, high voltage remote arc plasma, (b) A low pressure and a low plasma potential in the cathode chamber favorable for generation of the electrons, (c) the high plasma potential in the plasma duct to increase energies of the ions, and (d) the low plasma potential in the cathode chamber to generate a plasma plume from overlapping counter propagating flows of the electrons and the plasma-generating gas through the at least one orifice, each orifice of the at least one orifice having a transverse extent in a range from 0.1 mm to 5 cm to maintain a stationary shock-wave front across the at least one orifice, the stationary shock-wave front separating the high pressure and the high plasma potential in the plasma duct from the low pressure and the low plasma potential in the cathode; and
- a powder injector configured to inject the powder into the plasma duct for plasma treatment and surface modification of the powder;
- wherein (e) each orifice of the at least one orifice is a straight nozzle-opening, a converging nozzle, or a converging-diverging de Laval supersonic nozzle for generating a supersonic plasma plume within the cathode chamber, (f) the cathode chamber is connected to a vacuum pumping system to maintain the low pressure in the cathode chamber, (g) the plasma duct is oriented horizontally being a rotatable barrel for coating of particles of the powder disposed in the rotatable barrel in a fluidized bed process, and (h) at least a portion of a reactive gas is recirculating.

27. The reactor of claim 26 where the plasma duct is enclosed within the vacuum chamber and the cathode is positioned elsewhere in the vacuum chamber.

* * * * *